US012481844B2

(12) United States Patent
Itoi et al.

(10) Patent No.: US 12,481,844 B2
(45) Date of Patent: Nov. 25, 2025

(54) ORGANIC ELECTROLUMINESCENT ELEMENT, ELECTRONIC DEVICE, AND COMPOUND

(71) Applicant: IDEMITSU KOSAN CO., LTD., Tokyo (JP)

(72) Inventors: Hiroaki Itoi, Tokyo (JP); Yu Kudo, Tokyo (JP); Shintaro Ban, Tokyo (JP); Taro Yamaki, Tokyo (JP); Takamoto Morita, Tokyo (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 18/682,323

(22) PCT Filed: Jul. 13, 2022

(86) PCT No.: PCT/JP2022/027577

§ 371 (c)(1),
(2) Date: Feb. 8, 2024

(87) PCT Pub. No.: WO2023/017704

PCT Pub. Date: Feb. 16, 2023

(65) Prior Publication Data

US 2024/0403575 A1 Dec. 5, 2024

Related U.S. Application Data

(63) Continuation-in-part of application No. 17/566,224, filed on Dec. 30, 2021, now Pat. No. 11,527,720.

(30) Foreign Application Priority Data

Aug. 13, 2021 (JP) ................................ 2021-131972

(51) Int. Cl.
*G06Q 30/00* (2023.01)
*G06K 1/12* (2006.01)

(52) U.S. Cl.
CPC .................................. *G06K 1/121* (2013.01)

(58) Field of Classification Search
CPC .. G06K 1/121; G06K 19/07722; H10K 50/11; H10K 50/15; H10K 50/16; H10K 50/00
(Continued)

(56) References Cited

U.S. PATENT DOCUMENTS 11,527,720 B1 * 12/2022 Kudo .................. H10K 85/658
11,552,259 B1 1/2023 Tasaki et al.
(Continued)

FOREIGN PATENT DOCUMENTS

CN 113429399 A 9/2021
JP 2019-161218 A 9/2019
(Continued)

OTHER PUBLICATIONS

International Searching Authority, "International Search Report," issued in connection with International Patent Application No. PCT/JP2022/027577, dated Sep. 6, 2022.
(Continued)

*Primary Examiner* — Daniel St Cyr
(74) *Attorney, Agent, or Firm* — Foley & Lardner LLP

(57) ABSTRACT

An organic electroluminescence device includes an emitting region provided between an anode and a cathode, in which the emitting region includes a first emitting layer and a second emitting layer, a ratio $D_{EM1}/D_{EM2}$ of a film thickness $D_{EM1}$ of the first emitting layer to a film thickness $D_{EM2}$ of the second emitting layer is in a range from 2/3 to 3/2, the first emitting layer contains a first host material and a first luminescent compound, the second emitting layer contains a second host material and a second luminescent compound, and the first host material is a compound represented by a formula (1) below having a group represented by a formula (10).

(Continued)

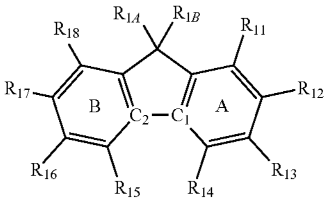

(1)

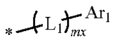

(10)

16 Claims, 2 Drawing Sheets

Figure 1:
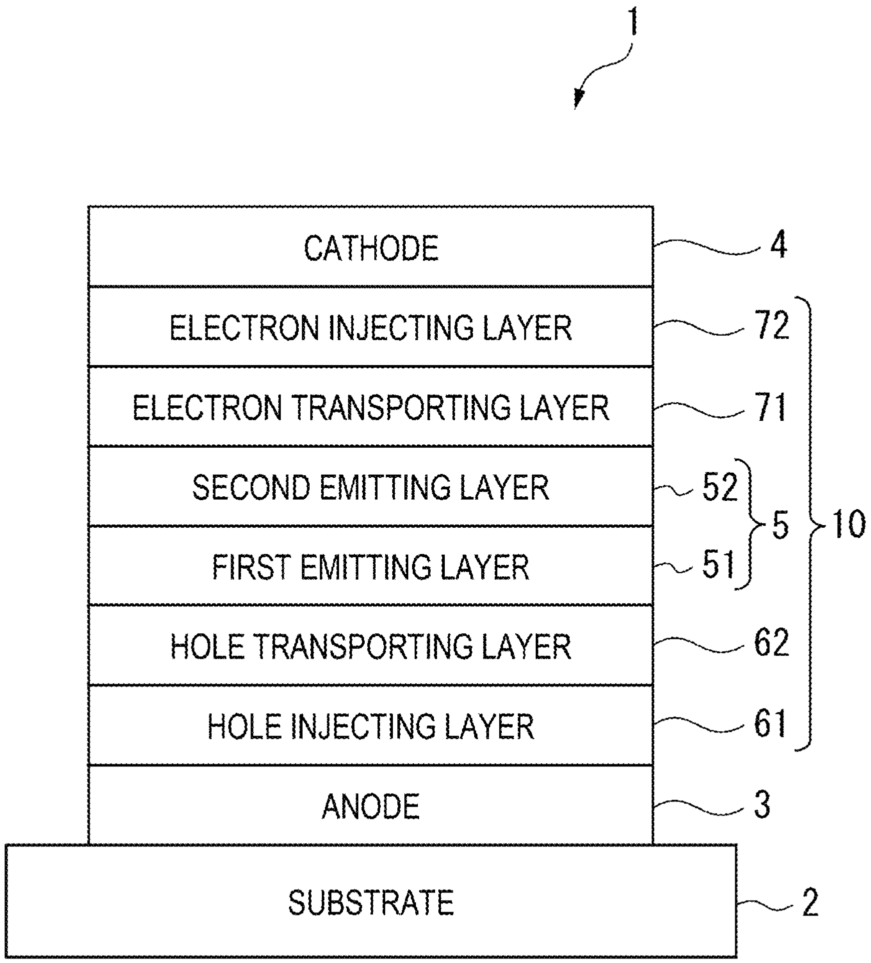

(58) Field of Classification Search
USPC .......................................................... 235/385
See application file for complete search history.

(56) References Cited

U.S. PATENT DOCUMENTS

2010/0289013 A1* 11/2010 Ito .......................... C07C 15/20 257/E51.026
2010/0295444 A1* 11/2010 Kuma .................. H10K 50/165 313/504
2010/0301318 A1 12/2010 Kuma et al.
2013/0270539 A1 10/2013 Kuma et al.
2016/0181543 A1* 6/2016 Ito ........................ C07D 307/91 585/27
2019/0280209 A1 9/2019 Fujita
2020/0235320 A1* 7/2020 Yen ...................... H10K 85/654
2021/0083193 A1 3/2021 Tasaki et al.
2022/0348522 A1 11/2022 Tasaki et al.
2023/0276706 A1 8/2023 Cha et al.

FOREIGN PATENT DOCUMENTS

WO WO-2009/081774 A1 7/2009
WO WO-2010/134350 A1 11/2010
WO 2021049653 * 3/2021 ............. C07C 13/62
WO WO-2021/049653 A1 3/2021
WO WO-2021/049662 A1 3/2021
WO WO-2022/025511 A1 2/2022

OTHER PUBLICATIONS

International Searching Authority, "Written Opinion," issued in connection with International Patent Application No. PCT/JP2022/027577, dated Sep. 6, 2022.

PCT International Preliminary Report on Patentability, dated Feb. 13, 2024, which includes a Translation of International Searching Authority, "Written Opinion," issued in connection with International Patent Application No. PCT/JP2022/027577, dated Sep. 6, 2022.

* cited by examiner

ORGANIC ELECTROLUMINESCENT ELEMENT, ELECTRONIC DEVICE, AND COMPOUND

CROSS-REFERENCE TO RELATED APPLICATIONS

The present application claims priority under 35 U.S.C. § 371 to International Patent Application No. PCT/JP2022/027577, filed Jul. 13, 2022, which claims priority to and the benefit of Japanese Patent Application No. 2021-131972, filed Aug. 13, 2021, and U.S. patent application Ser. No. 17/566,224, filed on Dec. 30, 2021. The contents of these applications are hereby incorporated by reference in their entireties.

TECHNICAL FIELD

The present invention relates to an organic electroluminescence device, an electronic device, and a compound.

BACKGROUND ART

An organic electroluminescence device (hereinafter, occasionally referred to as "organic EL device") has found its application in a full-color display for mobile phones, televisions, and the like. When voltage is applied to an organic EL device, holes are injected from an anode and electrons are injected from a cathode into an emitting layer. The injected holes and electrons are recombined in the emitting layer to form excitons. Specifically, according to the electron spin statistics theory, singlet excitons and triplet excitons are generated at a ratio of 25%:75%.

For instance, in Patent Literatures 1 and 2, various studies have been made on layering a plurality of emitting layers of an organic EL device in order to enhance the performance of the organic EL device. In addition, in order to enhance the performance of the organic EL device, Patent Literature 3 describes a phenomenon in which a singlet exciton is generated by collision and fusion of two triplet excitons (hereinafter, occasionally referred to as a Triplet-Triplet Fusion (TTF) phenomenon).

The performance of the organic EL device is evaluable in terms of, for instance, luminance, emission wavelength, chromaticity, luminous efficiency, drive voltage, and lifetime.

CITATION LIST

Patent Literature(s)

Patent Literature 1: JP 2019-161218 A
Patent Literature 2: International Publication No. WO 2021/049662
Patent Literature 3: International Publication No. WO 2010/134350

SUMMARY OF THE INVENTION

Problem(s) to be Solved by the Invention

An object of the invention is to provide an organic electroluminescence device with a low drive voltage and a high luminous efficiency, to provide a compound for decreasing a drive voltage of an organic electroluminescence device and improving a luminous efficiency thereof, and to provide an electronic device including the organic electroluminescence device.

Means for Solving the Problem(s)

According to an aspect of the invention, there is provided an organic electroluminescence device including: an anode; a cathode; and an emitting region provided between the anode and the cathode, in which the emitting region includes a first emitting layer and a second emitting layer, a ratio $D_{EM1}/D_{EM2}$ of a film thickness of the first emitting layer $D_{EM1}$ to a film thickness of the second emitting layer $D_{EM2}$ is in a range from 2/3 to 3/2, the first emitting layer includes a first host material and a first luminescent compound, the second emitting layer includes a second host material and a second luminescent compound, the first host material is a compound represented by a formula (1) below, the first host material and the second host material are mutually different, and the first luminescent compound and the second luminescent compound are mutually the same or different.

[Formula 1]

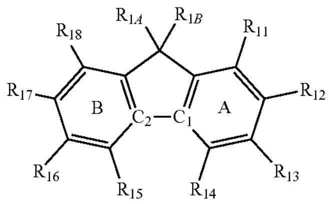

(1)

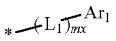

(10)

In the formula (1):

$R_{1A}$ and $R_{1B}$ are each independently a substituted or unsubstituted alkyl group having 1 to 15 carbon atoms, a substituted or unsubstituted aryl group having 6 to 17 ring carbon atoms, or a substituted or unsubstituted heterocyclic group having 5 to 17 ring atoms;

at least one of $R_{1A}$ or $R_{1B}$ is a substituted or unsubstituted alkyl group having 1 to 15 carbon atoms;

at least one combination of combinations of adjacent two or more of $R_{11}$ to $R_{14}$ or combinations of adjacent two or more of $R_{15}$ to $R_{18}$ are mutually bonded to form a substituted or unsubstituted monocyclic ring, or mutually bonded to form a substituted or unsubstituted fused ring;

when a substituted or unsubstituted monocyclic ring or a substituted or unsubstituted fused ring is formed with the ring A, a group represented by the formula (10) is bonded to a carbon atom bonded to $R_{12}$ or, of carbon atoms forming the monocyclic ring with the ring A and the fused ring with the ring A, a carbon atom farthest from a carbon atom $C_1$ of the ring A, the carbon atom $C_1$ being bonded with a single bond to a carbon atom $C_2$ of a ring B;

when a substituted or unsubstituted monocyclic ring or a substituted or unsubstituted fused ring is formed with not the ring A but the ring B, a group represented by the formula (10) is bonded to a carbon atom bonded to $R_{12}$;

$R_{12}$ not bonded with a group represented by the formula (10), and $R_{11}$, $R_{13}$, $R_{14}$, and $R_{15}$ to $R_{18}$ forming neither the substituted or unsubstituted monocyclic ring nor the substituted or unsubstituted fused ring are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by $-Si(R_{901})(R_{902})(R_{903})$, a group represented by $-O-(R_{904})$, a group represented by $-S-(R_{905})$, a group represented by $-N(R_{906})(R_{907})$, a substituted or unsubstituted aralkyl group having 7 to 50 carbon atoms, a group represented by $-C(=O)R_{801}$, a group represented by $-COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

In the formula (10):

$Ar_1$ is a substituted or unsubstituted aryl group having four or more fused rings or a substituted or unsubstituted heterocyclic group having four or more fused rings;

$L_1$ is a single bond, a substituted or unsubstituted arylene group having 6 to 17 ring carbon atoms, or a substituted or unsubstituted divalent heterocyclic group having 5 to 17 ring atoms;

mx is 0, 1, or 2;

* represents a bonding position to an atom forming a ring of the formula (1); and the first host material does not have, in a molecule, three or more groups of a substituted or unsubstituted aryl group having four or more fused rings and a substituted or unsubstituted heterocyclic group having four or more fused rings.

In the first host material, $R_{901}$, $R_{902}$, $R_{903}$, $R_{904}$, $R_{905}$, $R_{906}$, $R_{907}$, $R_{801}$ and $R_{802}$ are each independently a hydrogen atom, a substituted or unsubstituted alkyl group having 1 to 50 carbon atoms, a substituted or unsubstituted cycloalkyl group having 3 to 50 ring carbon atoms, a substituted or unsubstituted aryl group having 6 to 17 ring carbon atoms, or a substituted or unsubstituted heterocyclic group having 5 to 17 ring atoms;

when a plurality of $R_{901}$ are present, the plurality of $R_{901}$ are mutually the same or different;

when a plurality of $R_{902}$ are present, the plurality of $R_{902}$ are mutually the same or different;

when a plurality of $R_{903}$ are present, the plurality of $R_{903}$ are mutually the same or different;

when a plurality of $R_{904}$ are present, the plurality of $R_{904}$ are mutually the same or different;

when a plurality of $R_{905}$ are present, the plurality of $R_{905}$ are mutually the same or different;

when a plurality of $R_{906}$ are present, the plurality of $R_{906}$ are mutually the same or different;

when a plurality of $R_{907}$ are present, the plurality of $R_{907}$ are mutually the same or different;

when a plurality of $R_{801}$ are present, the plurality of $R_{801}$ are mutually the same or different; and when a plurality of $R_{802}$ are present, the plurality of $R_{802}$ are mutually the same or different.

According to another aspect of the invention, there is provided a compound represented by a formula (1A) below.

[Formula 2]

(1A)

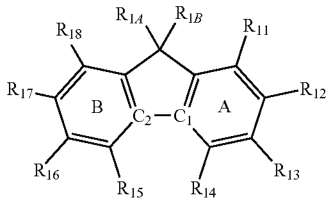

(10A)

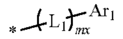

In the formula (1A):

$R_{1A}$ and $R_{1B}$ are each independently a substituted or unsubstituted alkyl group having 1 to 15 carbon atoms, a substituted or unsubstituted aryl group having 6 to 17 ring carbon atoms, or a substituted or unsubstituted heterocyclic group having 5 to 17 ring atoms;

at least one of $R_{1A}$ or $R_{1B}$ is a substituted or unsubstituted alkyl group having 1 to 15 carbon atoms;

at least one combination of a combination of $R_{11}$ and $R_{12}$, a combination of $R_{12}$ and $R_{13}$, a combination of $R_{16}$ and $R_{17}$, or a combination of $R_{17}$ and $R_{18}$ are mutually bonded to form a substituted or unsubstituted monocyclic ring, or mutually bonded to form a substituted or unsubstituted fused ring; and at least one combination of a combination of $R_{11}$ and $R_{12}$, a combination of $R_{12}$ and $R_{13}$, a combination of $R_{16}$ and $R_{17}$, or a combination of $R_{17}$ and $R_{18}$ are mutually bonded to form a ring represented by a formula (11A) below as the substituted or unsubstituted monocyclic ring.

[Formula 3]

(11A)

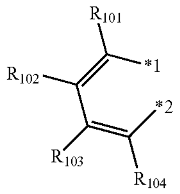

When a combination of $R_{11}$ and $R_{12}$ or a combination of $R_{12}$ and $R_{13}$ are mutually bonded to form a substituted or unsubstituted monocyclic ring or a substituted or unsubstituted fused ring with a ring A, a group represented by a formula (10A) above is bonded to, of carbon atoms forming the monocyclic ring with the ring A and the fused ring with the ring A, a carbon atom farthest from a carbon atom $C_1$ of the ring A, the carbon atom $C_1$ being bonded with a single bond to a carbon atom $C_2$ of a ring B;

$R_{12}$ forming neither the substituted or unsubstituted monocyclic ring nor the substituted or unsubstituted fused ring is a group represented by the formula (10A);

$R_{11}$, $R_{13}$, $R_{14}$, and $R_{15}$ to $R_{18}$ forming neither the substituted or unsubstituted monocyclic ring nor the substituted or unsubstituted fused ring, and $R_{101}$ to $R_{104}$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a group represented by —N($R_{906}$)($R_{907}$), a substituted or unsubstituted aralkyl group having 7 to 50 carbon atoms, a group represented by —C(═O)$R_{801}$, a group represented by —COOR$_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

In the formula (10A):

$Ar_1$ is a substituted or unsubstituted aryl group having four or more fused rings or a substituted or unsubstituted heterocyclic group having four or more fused rings;

$L_1$ is a single bond, a substituted or unsubstituted arylene group having 6 to 17 ring carbon atoms, or a substituted or unsubstituted divalent heterocyclic group having 5 to 17 ring atoms;

mx is 0, 1, or 2; and

* represents a bonding position to an atom forming a ring of the formula (1A).

In the formula (11A), *1 and *2 each represent a bonding position to an atom forming a ring of the formula (1A); and a compound represented by the formula (1A) does not have, in a molecule, three or more groups of a substituted or unsubstituted aryl group having four or more fused rings and a substituted or unsubstituted heterocyclic group having four or more fused rings.

In a compound represented by the formula (1A), $R_{901}$, $R_{902}$, $R_{903}$, $R_{904}$, $R_{905}$, $R_{906}$, $R_{907}$, $R_{801}$ and $R_{802}$ are each independently a hydrogen atom, a substituted or unsubstituted alkyl group having 1 to 50 carbon atoms, a substituted or unsubstituted cycloalkyl group having 3 to 50 ring carbon atoms, a substituted or unsubstituted aryl group having 6 to 17 ring carbon atoms, or a substituted or unsubstituted heterocyclic group having 5 to 17 ring atoms;

when a plurality of $R_{901}$ are present, the plurality of $R_{901}$ are mutually the same or different;

when a plurality of $R_{902}$ are present, the plurality of $R_{902}$ are mutually the same or different;

when a plurality of $R_{903}$ are present, the plurality of $R_{903}$ are mutually the same or different;

when a plurality of $R_{904}$ are present, the plurality of $R_{904}$ are mutually the same or different;

when a plurality of $R_{905}$ are present, the plurality of $R_{905}$ are mutually the same or different;

when a plurality of $R_{906}$ are present, the plurality of $R_{906}$ are mutually the same or different;

when a plurality of $R_{907}$ are present, the plurality of $R_{907}$ are mutually the same or different;

when a plurality of $R_{801}$ are present, the plurality of $R_{801}$ are mutually the same or different; and when a plurality of $R_{802}$ are present, the plurality of $R_{802}$ are mutually the same or different.

According to still another aspect of the invention, there is provided a compound represented by a formula (1C) below.

[Formula 4]

(1C)

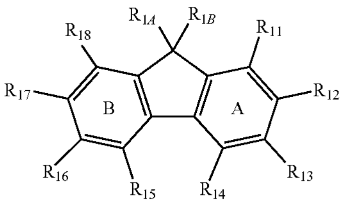

(10C)

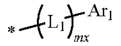

In the formula (1C):

$R_{1A}$ and $R_{1B}$ are each independently a substituted or unsubstituted alkyl group having 1 to 15 carbon atoms, a substituted or unsubstituted aryl group having 6 to 17 ring carbon atoms, or a substituted or unsubstituted heterocyclic group having 5 to 17 ring atoms;

at least one of $R_{1A}$ or $R_{1B}$ is a substituted or unsubstituted alkyl group having 1 to 15 carbon atoms;

at least one combination of a combination of $R_{13}$ and $R_{14}$ or a combination of $R_{15}$ and $R_{16}$ are mutually bonded to form a substituted or unsubstituted aryl ring having 6 to 50 ring carbon atoms;

at least one combination of a combination of $R_{11}$ and $R_{12}$ or a combination of $R_{17}$ and $R_{18}$ are mutually bonded to form a substituted or unsubstituted aryl ring having 6 to 50 ring carbon atoms, or not mutually bonded;

only one or two combinations of a combination of $R_{11}$ and $R_{12}$, a combination of $R_{13}$ and $R_{14}$, a combination of $R_{15}$ and $R_{16}$, or a combination of $R_{17}$ and $R_{18}$ form the substituted or unsubstituted aryl ring having 6 to 50 ring carbon atoms;

a group represented by the formula (10C) is bonded to the substituted or unsubstituted aryl ring having 6 to 50 ring carbon atoms formed by a combination of $R_{11}$ and $R_{12}$, a combination of $R_{13}$ and $R_{14}$, a combination of $R_{15}$ and $R_{16}$, or a combination of $R_{17}$ and $R_{18}$, or bonded to the ring A or the ring B;

when a combination of $R_{13}$ and $R_{14}$ are mutually bonded and none of a combination of $R_{11}$ and $R_{12}$, a combination of $R_{15}$ and $R_{16}$, and a combination of $R_{17}$ and $R_{18}$ are mutually bonded, a group represented by the formula (10C) is bonded to the substituted or unsubstituted aryl ring having 6 to 50 ring carbon atoms formed by a combination of $R_{13}$ and $R_{14}$ or bonded to the ring A, and when a combination of $R_{15}$ and $R_{16}$ are mutually bonded and none of a combination of $R_{11}$ and $R_{12}$, a combination of $R_{13}$ and $R_{14}$, and a combination of $R_{17}$ and $R_{18}$ are mutually bonded, a group represented by the formula (10C) is bonded to the substituted or unsubstituted aryl ring having 6 to 50 ring carbon atoms formed by a combination of $R_{15}$ and $R_{16}$ or bonded to the ring B;

$R_{11}$ to $R_{18}$ not forming the substituted or unsubstituted aryl ring having 6 to 50 ring carbon atoms are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —$Si(R_{901})(R_{902})(R_{903})$, a group represented by —O—($R_{904}$), a group represented by —S—($R_{905}$), a group represented by —$N(R_{906})(R_{907})$, a substituted or unsubstituted aralkyl group having 7 to 50 carbon atoms, a group represented by —$C(=O)R_{801}$, a group represented by —$COOR_{802}$, a halogen atom, a cyano group, a nitro group, a substituted or unsubstituted aryl group having 6 to 17 ring carbon atoms, a substituted or unsubstituted heterocyclic group having 5 to 17 ring atoms, or a group represented by the formula (10C);

in the formula (10C):

$Ar_1$ is a substituted or unsubstituted aryl group having four or more fused rings or a substituted or unsubstituted heterocyclic group having four or more fused rings;

$L_1$ is a single bond, a substituted or unsubstituted arylene group having 6 to 17 ring carbon atoms, or a substituted or unsubstituted divalent heterocyclic group having 5 to 17 ring atoms;

mx is 0, 1, or 2;

* represents a bonding position to an atom forming a ring of the formula (1C); and a compound represented by the formula (1C) does not have, in a molecule, three or more groups of a substituted or unsubstituted aryl group having four or more fused rings and a substituted or unsubstituted heterocyclic group having four or more fused rings.

In a compound represented by the formula (1C), $R_{901}$, $R_{902}$, $R_{903}$, $R_{904}$, $R_{905}$, $R_{906}$, $R_{907}$, $R_{801}$ and $R_{802}$ are each independently a hydrogen atom, a substituted or unsubstituted alkyl group having 1 to 50 carbon atoms, a substituted or unsubstituted cycloalkyl group having 3 to 50 ring carbon atoms, a substituted or unsubstituted aryl group having 6 to 17 ring carbon atoms, or a substituted or unsubstituted heterocyclic group having 5 to 17 ring atoms;

when a plurality of $R_{901}$ are present, the plurality of $R_{901}$ are mutually the same or different;

when a plurality of $R_{902}$ are present, the plurality of $R_{902}$ are mutually the same or different;

when a plurality of $R_{903}$ are present, the plurality of $R_{903}$ are mutually the same or different;

when a plurality of $R_{904}$ are present, the plurality of $R_{904}$ are mutually the same or different;

when a plurality of $R_{905}$ are present, the plurality of $R_{905}$ are mutually the same or different;

when a plurality of $R_{906}$ are present, the plurality of $R_{906}$ are mutually the same or different;

when a plurality of $R_{907}$ are present, the plurality of $R_{907}$ are mutually the same or different;

when a plurality of $R_{801}$ are present, the plurality of $R_{801}$ are mutually the same or different; and when a plurality of $R_{802}$ are present, the plurality of $R_{802}$ are mutually the same or different.

According to a further aspect of the invention, there is provided a compound represented by a formula (1B) below.

[Formula 5]

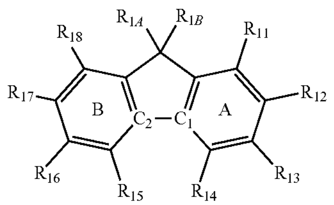

(1B)

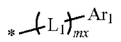

(10B)

In the formula (1B):

$R_{1A}$ and $R_{1B}$ are each independently a substituted or unsubstituted alkyl group having 1 to 15 carbon atoms, a substituted or unsubstituted aryl group having 6 to 17 ring carbon atoms, or a substituted or unsubstituted heterocyclic group having 5 to 17 ring atoms;

at least one of $R_{1A}$ or $R_{1B}$ is a substituted or unsubstituted alkyl group having 1 to 15 carbon atoms;

at least one combination of combinations of adjacent two or more of $R_{11}$ to $R_{14}$ or combinations of adjacent two or more of $R_{15}$ to $R_{18}$ are mutually bonded to form a substituted or unsubstituted monocyclic ring, or mutually bonded to form a substituted or unsubstituted fused ring;

a group represented by the formula (10B) is bonded to a carbon atom bonded to $R_{12}$ or, of carbon atoms forming the monocyclic ring with the ring A and the fused ring with the ring A, a carbon atom farthest from a carbon atom $C_1$ of the ring A, the carbon atom $C_1$ being bonded with a single bond to a carbon atom $C_2$ of the ring B;

when a substituted or unsubstituted monocyclic ring or a substituted or unsubstituted fused ring is formed with not the ring A but the ring B, a group represented by the formula (10) is bonded to a carbon atom bonded to $R_{12}$;

$R_{12}$ not bonded with a group represented by the formula (10B), and $R_{11}$, $R_{13}$, $R_{14}$ and $R_{15}$ to $R_{18}$ forming neither the substituted or unsubstituted monocyclic ring nor the substituted or unsubstituted fused ring are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —$Si(R_{901})(R_{902})(R_{903})$, a group represented by —O—($R_{904}$), a group represented by —S—($R_{905}$), a group represented by —$N(R_{906})(R_{907})$, a substituted or unsubstituted aralkyl group having 7 to 50 carbon atoms, a group represented by —$C(=O)R_{801}$, a group represented by —$COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

In the formula (10B):

$Ar_1$ is a substituted or unsubstituted aryl group having four or more fused rings or a substituted or unsubstituted aryl group having four or more fused rings, and $Ar_1$ is not a substituted or unsubstituted pyrenyl group;

$L_1$ is a single bond, a substituted or unsubstituted arylene group having 6 to 17 ring carbon atoms, or a substituted or unsubstituted divalent heterocyclic group having 5 to 17 ring atoms;

mx is 0, 1, or 2;

* represents a bonding position to an atom forming a ring of the formula (1B); and a compound represented by the formula (1B) does not have, in a molecule, three or more groups of a substituted or unsubstituted aryl group having four or more fused rings and a substituted or unsubstituted heterocyclic group having four or more fused rings.

In a compound represented by the formula (1B), $R_{901}$, $R_{902}$, $R_{903}$, $R_{904}$, $R_{905}$, $R_{906}$, $R_{907}$, $R_{801}$ and $R_{802}$ are each independently a hydrogen atom, a substituted or unsubstituted alkyl group having 1 to 50 carbon atoms, a substituted or unsubstituted cycloalkyl group having 3 to 50 ring carbon atoms, a substituted or unsubstituted aryl group having 6 to 17 ring carbon atoms, or a substituted or unsubstituted heterocyclic group having 5 to 17 ring atoms;

when a plurality of $R_{901}$ are present, the plurality of $R_{901}$ are mutually the same or different;

when a plurality of $R_{902}$ are present, the plurality of $R_{902}$ are mutually the same or different;

when a plurality of $R_{903}$ are present, the plurality of $R_{903}$ are mutually the same or different;

when a plurality of $R_{904}$ are present, the plurality of $R_{904}$ are mutually the same or different;

when a plurality of $R_{905}$ are present, the plurality of $R_{905}$ are mutually the same or different;

when a plurality of $R_{906}$ are present, the plurality of $R_{906}$ are mutually the same or different;

when a plurality of $R_{907}$ are present, the plurality of $R_{907}$ are mutually the same or different;

when a plurality of $R_{801}$ are present, the plurality of $R_{801}$ are mutually the same or different; and when a plurality of $R_{802}$ are present, the plurality of $R_{802}$ are mutually the same or different.

According to a still further aspect of the invention, an electronic device including the organic electroluminescence device according to the above aspect of the invention is provided.

The above aspects of the invention can provide an organic electroluminescence device with a low drive voltage and a high luminous efficiency, provide a compound for decreasing a drive voltage of an organic electroluminescence device and improving a luminous efficiency thereof, and provide an electronic device including the organic electroluminescence device.

BRIEF EXPLANATION OF DRAWING(S)

FIG. 1 schematically illustrates an exemplary arrangement of an organic electroluminescence device according to an exemplary embodiment of the invention.

Figure 2:
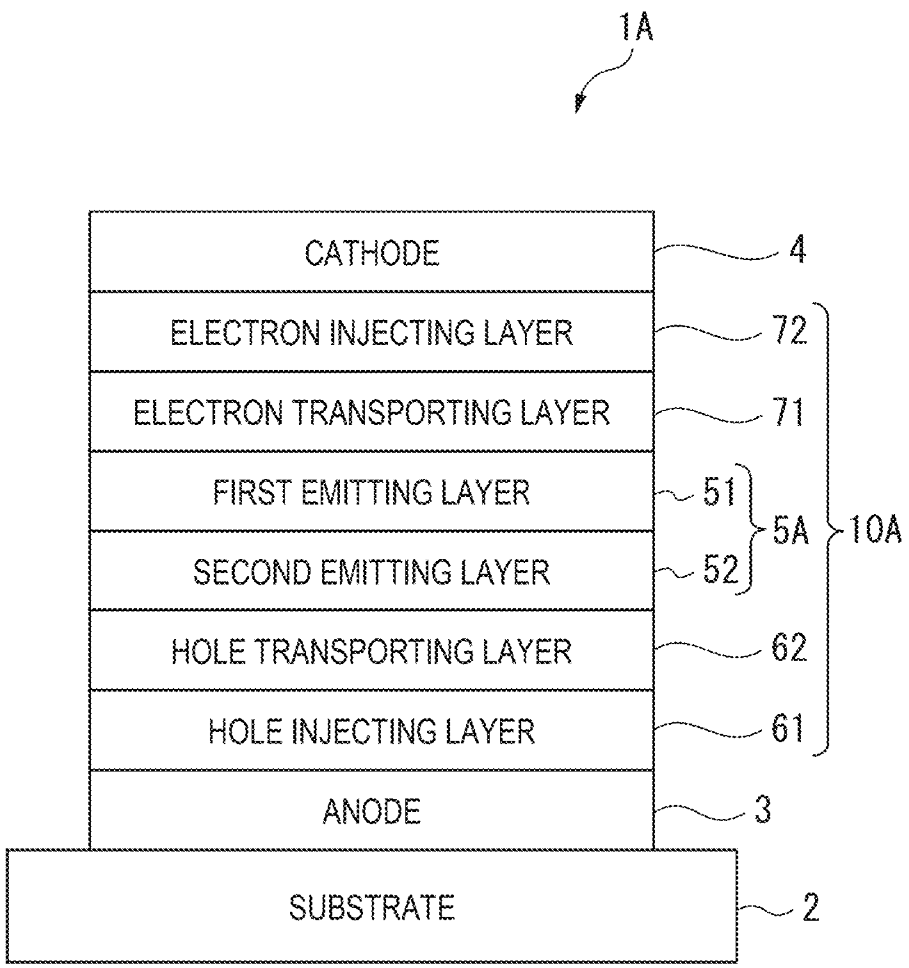

FIG. 2 schematically illustrates another exemplary arrangement of the organic electroluminescence device according to the exemplary embodiment of the invention.

DESCRIPTION OF EMBODIMENT(S)

Definitions

Herein, a hydrogen atom includes isotope having different numbers of neutrons, specifically, protium, deuterium and tritium.

In chemical formulae herein, it is assumed that a hydrogen atom (i.e. protium, deuterium and tritium) is bonded to each of bondable positions that are not annexed with signs "R" or the like or "D" representing a deuterium.

Herein, the ring carbon atoms refer to the number of carbon atoms among atoms forming a ring of a compound (e.g., a monocyclic compound, fused-ring compound, cross-linking compound, carbon ring compound, and heterocyclic compound) in which the atoms are bonded to each other to form the ring. When the ring is substituted by a substituent(s), carbon atom(s) contained in the substituent(s) is not counted in the ring carbon atoms. Unless specifically described, the same applies to the "ring carbon atoms" described later. For instance, a benzene ring has 6 ring carbon atoms, a naphthalene ring has 10 ring carbon atoms, a pyridine ring has 5 ring carbon atoms, and a furan ring 4 ring carbon atoms. For instance, a 9,9-diphenylfluorenyl group has 13 ring carbon atoms and 9,9'-spirobifluorenyl group has 25 ring carbon atoms.

When a benzene ring is substituted by a substituent (e.g., an alkyl group), the number of carbon atoms of the alkyl group is not counted in the number of the ring carbon atoms. Accordingly, the benzene ring substituted by an alkyl group has 6 ring carbon atoms. When a naphthalene ring is substituted by a substituent in a form of, for instance, an alkyl group, the number of carbon atoms of the alkyl group is not counted in the number of the ring carbon atoms of the naphthalene ring. Accordingly, the naphthalene ring substituted by an alkyl group has 10 ring carbon atoms.

Herein, the ring atoms refer to the number of atoms forming a ring of a compound (e.g., a monocyclic compound, fused-ring compound, cross-linking compound, carbon ring compound, and heterocyclic compound) in which the atoms are bonded to each other to form the ring (e.g., monocyclic ring, fused ring, and ring assembly). Atom(s) not forming the ring (e.g., hydrogen atom(s) for saturating the valence of the atom which forms the ring) and atom(s) in a substituent by which the ring is substituted are not counted as the ring atoms. Unless otherwise specified, the same applies to the "ring atoms" described later. For instance, a pyridine ring has 6 ring atoms, a quinazoline ring has 10 ring atoms, and a furan ring has 5 ring atoms. For instance, the number of hydrogen atom(s) bonded to a pyridine ring or the number of atoms forming a substituent is not counted as ring atoms of the pyridine ring. Accordingly, a pyridine ring bonded to a hydrogen atom(s) or a substituent(s) has 6 ring atoms. For instance, the hydrogen atom(s) bonded to carbon atom(s) of a quinazoline ring or the atoms forming a substituent are not counted as the quinazoline ring atoms. Accordingly, a quinazoline ring bonded to hydrogen atom(s) or a substituent(s) has 10 ring atoms.

Herein, "XX to YY carbon atoms" in the description of "substituted or unsubstituted ZZ group having XX to YY carbon atoms" represent carbon atoms of an unsubstituted ZZ group and do not include carbon atoms of a substituent(s) of the substituted ZZ group. Herein, "YY" is larger than "XX," "XX" representing an integer of 1 or more and "YY" representing an integer of 2 or more.

Herein, "XX to YY atoms" in the description of "substituted or unsubstituted ZZ group having XX to YY atoms" represent atoms of an unsubstituted ZZ group and does not include atoms of a substituent(s) of the substituted ZZ group. Herein, "YY" is larger than "XX," "XX" representing an integer of 1 or more and "YY" representing an integer of 2 or more.

Herein, an unsubstituted ZZ group refers to an “unsubstituted ZZ group” in a “substituted or unsubstituted ZZ group,” and a substituted ZZ group refers to a “substituted ZZ group” in a “substituted or unsubstituted ZZ group.”

Herein, the term “unsubstituted” used in a “substituted or unsubstituted ZZ group” means that a hydrogen atom(s) in the ZZ group is not substituted with a substituent(s). The hydrogen atom(s) in the “unsubstituted ZZ group” is protium, deuterium, or tritium.

Herein, the term “substituted” used in a “substituted or unsubstituted ZZ group” means that at least one hydrogen atom in the ZZ group is substituted with a substituent. Similarly, the term “substituted” used in a “BB group substituted by AA group” means that at least one hydrogen atom in the BB group is substituted with the AA group.

Substituents Mentioned Herein

Substituents mentioned herein will be described below.

An “unsubstituted aryl group” mentioned herein has, unless otherwise specified herein, 6 to 50, preferably 6 to 30, more preferably 6 to 18 ring carbon atoms.

An “unsubstituted heterocyclic group” mentioned herein has, unless otherwise specified herein, 5 to 50, preferably 5 to 30, more preferably 5 to 18 ring atoms.

An “unsubstituted alkyl group” mentioned herein has, unless otherwise specified herein, 1 to 50, preferably 1 to 20, more preferably 1 to 6 carbon atoms.

An “unsubstituted alkenyl group” mentioned herein has, unless otherwise specified herein, 2 to 50, preferably 2 to 20, more preferably 2 to 6 carbon atoms.

An “unsubstituted alkynyl group” mentioned herein has, unless otherwise specified herein, 2 to 50, preferably 2 to 20, more preferably 2 to 6 carbon atoms.

An “unsubstituted cycloalkyl group” mentioned herein has, unless otherwise specified herein, 3 to 50, preferably 3 to 20, more preferably 3 to 6 ring carbon atoms.

An “unsubstituted arylene group” mentioned herein has, unless otherwise specified herein, 6 to 50, preferably 6 to 30, more preferably 6 to 18 ring carbon atoms.

An “unsubstituted divalent heterocyclic group” mentioned herein has, unless otherwise specified herein, 5 to 50, preferably 5 to 30, more preferably 5 to 18 ring atoms.

An “unsubstituted alkylene group” mentioned herein has, unless otherwise specified herein, 1 to 50, preferably 1 to 20, more preferably 1 to 6 carbon atoms.

Substituted or Unsubstituted Aryl Group

Specific examples (specific example group G1) of the “substituted or unsubstituted aryl group” mentioned herein include unsubstituted aryl groups (specific example group G1A) below and substituted aryl groups (specific example group G11B). (Herein, an unsubstituted aryl group refers to an “unsubstituted aryl group” in a “substituted or unsubstituted aryl group”, and a substituted aryl group refers to a “substituted aryl group” in a “substituted or unsubstituted aryl group.”) A simply termed “aryl group” herein includes both of an “unsubstituted aryl group” and a “substituted aryl group”.

The “substituted aryl group” refers to a group derived by substituting at least one hydrogen atom in an “unsubstituted aryl group” with a substituent. Examples of the “substituted aryl group” include a group derived by substituting at least one hydrogen atom in the “unsubstituted aryl group” in the specific example group G1A below with a substituent, and examples of the substituted aryl group in the specific example group G1B below. It should be noted that the examples of the “unsubstituted aryl group” and the “substituted aryl group” mentioned herein are merely exemplary, and the “substituted aryl group” mentioned herein includes a group derived by further substituting a hydrogen atom bonded to a carbon atom of a skeleton of a “substituted aryl group” in the specific example group G1B below, and a group derived by further substituting a hydrogen atom of a substituent of the “substituted aryl group” in the specific example group G1B below.

Unsubstituted Aryl Group (Specific Example Group G1A):

a phenyl group, p-biphenyl group, m-biphenyl group, o-biphenyl group, p-terphenyl-4-yl group, p-terphenyl-3-yl group, p-terphenyl-2-yl group, m-terphenyl-4-yl group, m-terphenyl-3-yl group, m-terphenyl-2-yl group, o-terphenyl-4-yl group, o-terphenyl-3-yl group, o-terphenyl-2-yl group, 1-naphthyl group, 2-naphthyl group, anthryl group, benzanthryl group, phenanthryl group, benzophenanthryl group, phenalenyl group, pyrenyl group, chrysenyl group, benzochrysenyl group, triphenylenyl group, benzotriphenylenyl group, tetracenyl group, pentacenyl group, fluorenyl group, 9,9'-spirobifluorenyl group, benzofluorenyl group, dibenzofluorenyl group, fluoranthenyl group, benzofluoranthenyl group, perylenyl group, and monovalent aryl group derived by removing one hydrogen atom from cyclic structures represented by formulae (TEMP-1) to (TEMP-15) below.

[Formula 6]

(TEMP-1)

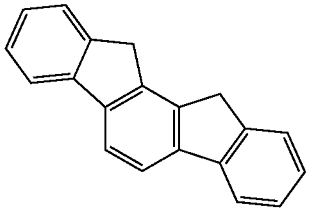

(TEMP-2)

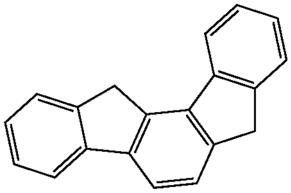

(TEMP-3)

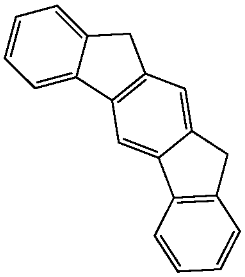

(TEMP-4)

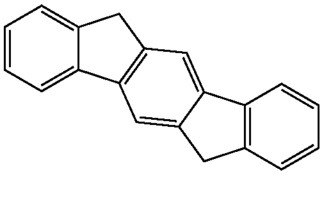

-continued (TEMP-5)

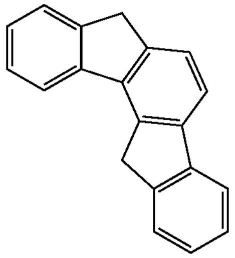

(TEMP-6)

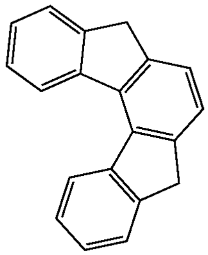

(TEMP-7)

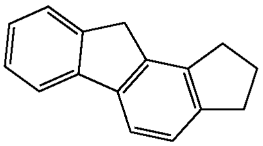

(TEMP-8)

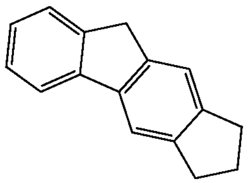

(TEMP-9)

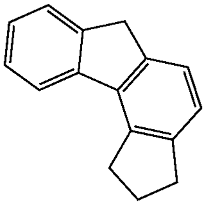

[Formula 7]

(TEMP-10)

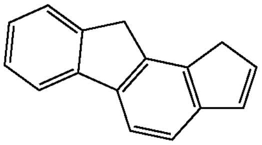

(TEMP-11)

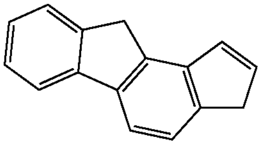

(TEMP-12)

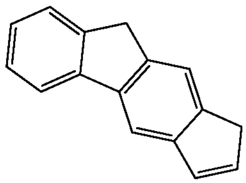

-continued (TEMP-13)

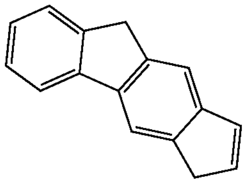

(TEMP-14)

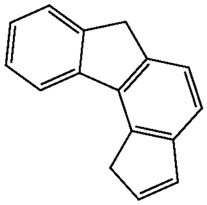

(TEMP-15)

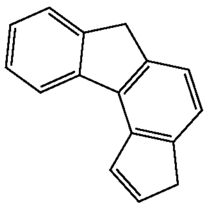

Substituted Aryl Group (Specific Example Group G1B):

an o-tolyl group, m-tolyl group, p-tolyl group, para-xylyl group, meta-xylyl group, ortho-xylyl group, para-isopropylphenyl group, meta-isopropylphenyl group, ortho-isopropylphenyl group, para-t-butylphenyl group, meta-t-butylphenyl group, ortho-t-butylphenyl group, 3,4,5-trimethylphenyl group, 9,9-dimethylfluorenyl group, 9,9-diphenylfluorenyl group, 9,9-bis(4-methylphenyl)fluorenyl group, 9,9-bis(4-isopropylphenyl)fluorenyl group, 9,9-bis(4-t-butylphenyl)fluorenyl group, cyanophenyl group, triphenylsilylphenyl group, trimethylsilylphenyl group, phenylnaphthyl group, naphthylphenyl group, and group derived by substituting at least one hydrogen atom of a monovalent group derived from one of the cyclic structures represented by the formulae (TEMP-1) to (TEMP-15) with a substituent.

Substituted or Unsubstituted Heterocyclic Group

The "heterocyclic group" mentioned herein refers to a cyclic group having at least one hetero atom in the ring atoms. Specific examples of the hetero atom include a nitrogen atom, oxygen atom, sulfur atom, silicon atom, phosphorus atom, and boron atom.

The "heterocyclic group" mentioned herein is a monocyclic group or a fused-ring group.

The "heterocyclic group" mentioned herein is an aromatic heterocyclic group or a non-aromatic heterocyclic group.

Specific examples (specific example group G2) of the "substituted or unsubstituted heterocyclic group" mentioned herein include unsubstituted heterocyclic groups (specific example group G2A) and substituted heterocyclic groups (specific example group G2B). (Herein, an unsubstituted heterocyclic group refers to an "unsubstituted heterocyclic group" in a "substituted or unsubstituted heterocyclic group," and a substituted heterocyclic group refers to a "substituted heterocyclic group" in a "substituted or unsubstituted heterocyclic group.") A simply termed "heterocyclic group" herein includes both of an "unsubstituted heterocyclic group" and a "substituted heterocyclic group."

The "substituted heterocyclic group" refers to a group derived by substituting at least one hydrogen atom in an "unsubstituted heterocyclic group" with a substituent. Specific examples of the "substituted heterocyclic group" include a group derived by substituting at least one hydrogen atom in the "unsubstituted heterocyclic group" in the specific example group G2A below with a substituent, and examples of the substituted heterocyclic group in the specific example group G2B below. It should be noted that the examples of the "unsubstituted heterocyclic group" and the "substituted heterocyclic group" mentioned herein are merely exemplary, and the "substituted heterocyclic group" mentioned herein includes a group derived by further substituting a hydrogen atom bonded to a ring atom of a skeleton of a "substituted heterocyclic group" in the specific example group G2B below, and a group derived by further substituting a hydrogen atom of a substituent of the "substituted heterocyclic group" in the specific example group G2B below.

The specific example group G2A includes, for instance, unsubstituted heterocyclic groups including a nitrogen atom (specific example group G2A1) below, unsubstituted heterocyclic groups including an oxygen atom (specific example group G2A2) below, unsubstituted heterocyclic groups including a sulfur atom (specific example group G2A3) below, and monovalent heterocyclic groups (specific example group G2A4) derived by removing a hydrogen atom from cyclic structures represented by formulae (TEMP-16) to (TEMP-33) below.

The specific example group G2B includes, for instance, substituted heterocyclic groups including a nitrogen atom (specific example group G2B1) below, substituted heterocyclic groups including an oxygen atom (specific example group G2B2) below, substituted heterocyclic groups including a sulfur atom (specific example group G2B3) below, and groups derived by substituting at least one hydrogen atom of the monovalent heterocyclic groups (specific example group G2B4) derived from the cyclic structures represented by formulae (TEMP-16) to (TEMP-33) below.

Unsubstituted Heterocyclic Groups Including Nitrogen Atom (Specific Example Group G2A1):

a pyrrolyl group, imidazolyl group, pyrazolyl group, triazolyl group, tetrazolyl group, oxazolyl group, isoxazolyl group, oxadiazolyl group, thiazolyl group, isothiazolyl group, thiadiazolyl group, pyridyl group, pyridazynyl group, pyrimidinyl group, pyrazinyl group, triazinyl group, indolyl group, isoindolyl group, indolizinyl group, quinolizinyl group, quinolyl group, isoquinolyl group, cinnolyl group, phthalazinyl group, quinazolinyl group, quinoxalinyl group, benzimidazolyl group, indazolyl group, phenanthrolinyl group, phenanthridinyl group, acridinyl group, phenazinyl group, carbazolyl group, benzocarbazolyl group, morpholino group, phenoxazinyl group, phenothiazinyl group, azacarbazolyl group, and diazacarbazolyl group.

Unsubstituted Heterocyclic Groups Including Oxygen Atom (Specific Example Group G2A2):

a furyl group, oxazolyl group, isoxazolyl group, oxadiazolyl group, xanthenyl group, benzofuranyl group, isobenzofuranyl group, dibenzofuranyl group, naphthobenzofuranyl group, benzoxazolyl group, benzisoxazolyl group, phenoxazinyl group, morpholino group, dinaphthofuranyl group, azadibenzofuranyl group, diazadibenzofuranyl group, azanaphthobenzofuranyl group, and diazanaphthobenzofuranyl group.

Unsubstituted Heterocyclic Groups Including Sulfur Atom (Specific Example Group G2A3):

a thienyl group, thiazolyl group, isothiazolyl group, thiadiazolyl group, benzothiophenyl group (benzothienyl group), isobenzothiophenyl group (isobenzothienyl group), dibenzothiophenyl group (dibenzothienyl group), naphthobenzothiophenyl group (nahthobenzothienyl group), benzothiazolyl group, benzisothiazolyl group, phenothiazinyl group, dinaphthothiophenyl group (dinaphthothienyl group), azadibenzothiophenyl group (azadibenzothienyl group), diazadibenzothiophenyl group (diazadibenzothienyl group), azanaphthobenzothiophenyl group (azanaphthobenzothienyl group), and diazanaphthobenzothiophenyl group (diazanaphthobenzothienyl group).

Monovalent Heterocyclic Groups Derived by Removing One Hydrogen Atom from Cyclic Structures Represented by Formulae (TEMP-16) to (TEMP-33) (Specific Example Group G2A4):

[Formula 8]

(TEMP-16)

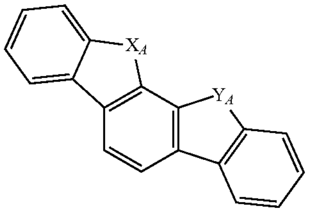

(TEMP-17)

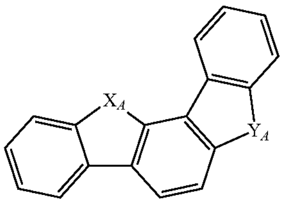

(TEMP-18)

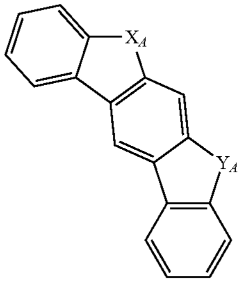

(TEMP-19)

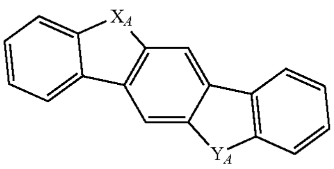

-continued (TEMP-20)

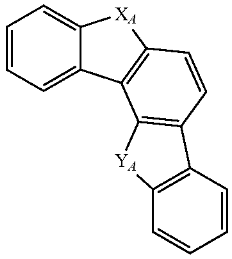

(TEMP-21)

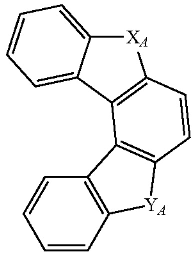

(TEMP-22)

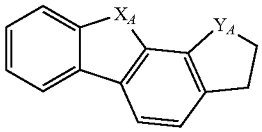

(TEMP-23)

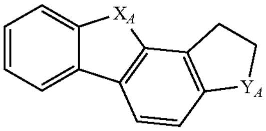

(TEMP-24)

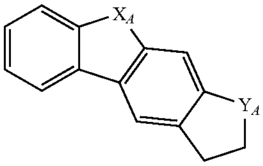

[Formula 9]

(TEMP-25)

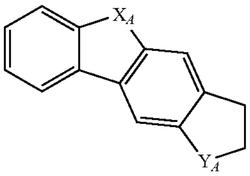

(TEMP-26)

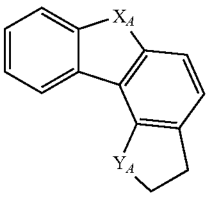

(TEMP-27)

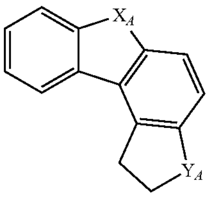

-continued (TEMP-28)

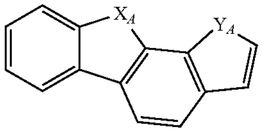

(TEMP-29)

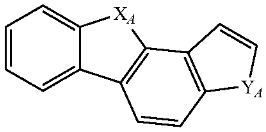

(TEMP-30)

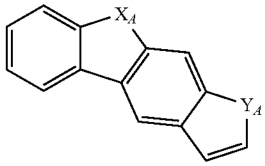

(TEMP-31)

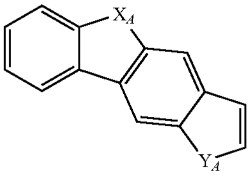

(TEMP-32)

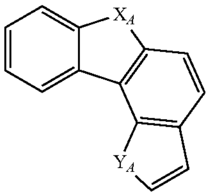

(TEMP-33)

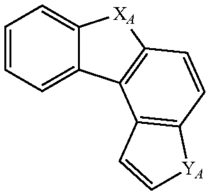

In the formulae (TEMP-16) to (TEMP-33), $X_A$ and $Y_A$ are each independently an oxygen atom, a sulfur atom, NH or $CH_2$, with a proviso that at least one of $X_A$ or $Y_A$ is an oxygen atom, a sulfur atom, or NH.

When at least one of $X_A$ or $Y_A$ in the formulae (TEMP-16) to (TEMP-33) is NH or $CH_2$, the monovalent heterocyclic groups derived from the cyclic structures represented by the formulae (TEMP-16) to (TEMP-33) include a monovalent group derived by removing one hydrogen atom from NH or $CH_2$.

Substituted Heterocyclic Groups Including Nitrogen Atom (Specific Example Group G2B1):

(9-phenyl)carbazolyl group, (9-biphenylyl)carbazolyl group, (9-phenyl)phenylcarbazolyl group, (9-naphthyl) carbazolyl group, diphenylcarbazole-9-yl group, phenylcarbazole-9-yl group, methylbenzimidazolyl group, ethylbenzimidazolyl group, phenyltriazinyl group, biphenylyltriazinyl group, diphenyltriazinyl group, phenylquinazolinyl group, and biphenylquinazolinyl group.

Substituted Heterocyclic Groups Including Oxygen Atom (Specific Example Group G2B2):

phenyldibenzofuranyl group, methyldibenzofuranyl group, t-butyldibenzofuranyl group, and monovalent residue of spiro[9H-xanthene-9,9'-[9H]fluorene].

Substituted Heterocyclic Groups Including Sulfur Atom (Specific Example Group G2B3):

a phenyldibenzothiophenyl group, methyldibenzothiophenyl group, t-butyldibenzothiophenyl group, and monovalent residue of spiro[9H-thioxanthene-9,9'-[9H]fluorene].

Groups Obtained by Substituting at Least One Hydrogen Atom of Monovalent Heterocyclic Group Derived from Cyclic Structures Represented by Formulae (TEMP-16) to (TEMP-33) with Substituent (Specific Example Group G2B4):

The "at least one hydrogen atom of a monovalent heterocyclic group" means at least one hydrogen atom selected from a hydrogen atom bonded to a ring carbon atom of the monovalent heterocyclic group, a hydrogen atom bonded to a nitrogen atom of at least one of XA or YA in a form of NH, and a hydrogen atom of one of XA and YA in a form of a methylene group (CH2).

Substituted or Unsubstituted Alkyl Group

Specific examples (specific example group G3) of the "substituted or unsubstituted alkyl group" mentioned herein include unsubstituted alkyl groups (specific example group G3A) and substituted alkyl groups (specific example group G3B) below. Herein, an unsubstituted alkyl group refers to an "unsubstituted alkyl group" in a "substituted or unsubstituted alkyl group," and a substituted alkyl group refers to a "substituted alkyl group" in a "substituted or unsubstituted alkyl group." A simply termed "alkyl group" herein includes both of an "unsubstituted alkyl group" and a "substituted alkyl group".

The "substituted alkyl group" refers to a group derived by substituting at least one hydrogen atom in an "unsubstituted alkyl group" with a substituent. Specific examples of the "substituted alkyl group" include a group derived by substituting at least one hydrogen atom of an "unsubstituted alkyl group" (specific example group G3A) below with a substituent, and examples of the substituted alkyl group (specific example group G3B) below. Herein, the alkyl group for the "unsubstituted alkyl group" refers to a chain alkyl group. Accordingly, the "unsubstituted alkyl group" include linear "unsubstituted alkyl group" and branched "unsubstituted alkyl group." It should be noted that the examples of the "unsubstituted alkyl group" and the "substituted alkyl group" mentioned herein are merely exemplary, and the "substituted alkyl group" mentioned herein includes a group derived by further substituting a hydrogen atom of a skeleton of the "substituted alkyl group" in the specific example group G3B, and a group derived by further substituting a hydrogen atom of a substituent of the "substituted alkyl group" in the specific example group G3B.

Unsubstituted Alkyl Group (Specific Example Group G3A):

a methyl group, ethyl group, n-propyl group, isopropyl group, n-butyl group, isobutyl group, s-butyl group, and t-butyl group.

Substituted Alkyl Group (Specific Example Group G3B):

a heptafluoropropyl group (including isomer thereof), pentafluoroethyl group, 2,2,2-trifluoroethyl group, and trifluoromethyl group.

Substituted or Unsubstituted Alkenyl Group

Specific examples (specific example group G4) of the "substituted or unsubstituted alkenyl group" mentioned herein include unsubstituted alkenyl groups (specific example group G4A) and substituted alkenyl groups (specific example group G4B). Herein, an unsubstituted alkenyl group refers to an "unsubstituted alkenyl group" in a "substituted or unsubstituted alkenyl group," and a substituted alkenyl group refers to a "substituted alkenyl group" in a "substituted or unsubstituted alkenyl group." A simply termed "alkenyl group" herein includes both of an "unsubstituted alkenyl group" and a "substituted alkenyl group".

The "substituted alkenyl group" refers to a group derived by substituting at least one hydrogen atom in an "unsubstituted alkenyl group" with a substituent. Specific examples of the "substituted alkenyl group" include an "unsubstituted alkenyl group" (specific example group G4A) substituted by a substituent, and examples of the substituted alkenyl group (specific example group G4B) below. It should be noted that the examples of the "unsubstituted alkenyl group" and the "substituted alkenyl group" mentioned herein are merely exemplary, and the "substituted alkenyl group" mentioned herein includes a group derived by further substituting a hydrogen atom of a skeleton of the "substituted alkenyl group" in the specific example group G4B with a substituent, and a group derived by further substituting a hydrogen atom of a substituent of the "substituted alkenyl group" in the specific example group G4B with a substituent.

Unsubstituted Alkenyl Group (Specific Example Group G4A):

a vinyl group, allyl group, 1-butenyl group, 2-butenyl group, and 3-butenyl group.

Substituted Alkenyl Group (Specific Example Group G4B):

a 1,3-butanedienyl group, 1-methylvinyl group, 1-methylallyl group, 1,1-dimethylallyl group, 2-methylallyl group, and 1,2-dimethylallyl group.

Substituted or Unsubstituted Alkynyl Group

Specific examples (specific example group G5) of the "substituted or unsubstituted alkynyl group" mentioned herein include unsubstituted alkynyl groups (specific example group G5A) below. (Herein, an unsubstituted alkynyl group refers to an "unsubstituted alkynyl group" in a "substituted or unsubstituted alkynyl group.") A simply termed "alkynyl group" herein includes both of "unsubstituted alkynyl group" and "substituted alkynyl group".

The "substituted alkynyl group" refers to a group derived by substituting at least one hydrogen atom in an "unsubstituted alkynyl group" with a substituent. Specific examples of the "substituted alkynyl group" include a group derived by substituting at least one hydrogen atom of the "unsubstituted alkynyl group" (specific example group G5A) below with a substituent.

Unsubstituted Alkynyl Group (Specific Example Group G5A):

an ethynyl group.

Substituted or Unsubstituted Cycloalkyl Group

Specific examples (specific example group G6) of the "substituted or unsubstituted cycloalkyl group" mentioned herein include unsubstituted cycloalkyl groups (specific example group G6A) and substituted cycloalkyl groups (specific example group G6B). Herein, an unsubstituted cycloalkyl group refers to an "unsubstituted cycloalkyl group" in a "substituted or unsubstituted cycloalkyl group," and a substituted cycloalkyl group refers to a "substituted cycloalkyl group" in a "substituted or unsubstituted cycloalkyl group." A simply termed "cycloalkyl group" herein includes both of "unsubstituted cycloalkyl group" and "substituted cycloalkyl group".

The "substituted cycloalkyl group" refers to a group derived by substituting at least one hydrogen atom of an "unsubstituted cycloalkyl group" with a substituent. Specific examples of the "substituted cycloalkyl group" include a group derived by substituting at least one hydrogen atom of the "unsubstituted cycloalkyl group" (specific example group G6A) below with a substituent, and examples of the substituted cycloalkyl group (specific example group G6B) below. It should be noted that the examples of the "unsubstituted cycloalkyl group" and the "substituted cycloalkyl group" mentioned herein are merely exemplary, and the "substituted cycloalkyl group" mentioned herein includes a group derived by substituting at least one hydrogen atom bonded to a carbon atom of a skeleton of the "substituted cycloalkyl group" in the specific example group G6B with a substituent, and a group derived by further substituting a hydrogen atom of a substituent of the "substituted cycloalkyl group" in the specific example group G6B with a substituent.

Unsubstituted Cycloalkyl Group (Specific Example Group G6A):

a cyclopropyl group, cyclobutyl group, cyclopentyl group, cyclohexyl group, 1-adamantyl group, 2-adamantyl group, 1-norbornyl group, and 2-norbornyl group.

Substituted Cycloalkyl Group (Specific Example Group G6B):

a 4-methylcyclohexyl group.

Group Represented by —Si($R_{901}$)($R_{902}$)($R_{903}$)

Specific examples (specific example group G7) of the group represented herein by —Si($R_{901}$)($R_{902}$)($R_{903}$) include: —Si(G1)(G1)(G1); —Si(G1)(G2)(G2); —Si(G1)(G1)(G2); —Si(G2)(G2)(G2); —Si(G3)(G3)(G3); and —Si(G6)(G6)(G6);

where:

G1 represents a "substituted or unsubstituted aryl group" in the specific example group G1;

G2 represents a "substituted or unsubstituted heterocyclic group" in the specific example group G2;

G3 represents a "substituted or unsubstituted alkyl group" in the specific example group G3;

G6 represents a "substituted or unsubstituted cycloalkyl group" in the specific example group G6;

a plurality of G1 in —Si(G1)(G1)(G1) are mutually the same or different;

a plurality of G2 in —Si(G1)(G2)(G2) are mutually the same or different;

a plurality of G1 in —Si(G1)(G1)(G2) are mutually the same or different;

a plurality of G2 in —Si(G2)(G2)(G2) are mutually the same or different;

a plurality of G3 in —Si(G3)(G3)(G3) are mutually the same or different; and a plurality of G6 in —Si(G6)(G6)(G6) are mutually the same or different.

Group Represented by —O—($R_{904}$)

Specific examples (specific example group G8) of a group represented by —O—($R_{904}$) herein include: —O(G1); —O(G2); —O(G3); and —O(G6);

where:

G1 represents a "substituted or unsubstituted aryl group" in the specific example group G1;

G2 represents a "substituted or unsubstituted heterocyclic group" in the specific example group G2;

G3 represents a "substituted or unsubstituted alkyl group" in the specific example group G3; and G6 represents a "substituted or unsubstituted cycloalkyl group" in the specific example group G6.

Group Represented by —S—($R_{905}$)

Specific examples (specific example group G9) of a group represented herein by —S—($R_{905}$) include: —S(G1); —S(G2); —S(G3); and —S(G6);

where:

G1 represents a "substituted or unsubstituted aryl group" in the specific example group G1;

G2 represents a "substituted or unsubstituted heterocyclic group" in the specific example group G2;

G3 represents a "substituted or unsubstituted alkyl group" in the specific example group G3; and G6 represents a "substituted or unsubstituted cycloalkyl group" in the specific example group G6.

Group Represented by —N($R_{906}$)($R_{907}$)

Specific examples (specific example group G10) of a group represented herein by —N($R_{906}$)($R_{907}$) include: —N(G1)(G1); —N(G2)(G2); —N(G1)(G2); —N(G3)(G3); and —N(G6)(G6), where:

G1 represents a "substituted or unsubstituted aryl group" in the specific example group G1;

G2 represents a "substituted or unsubstituted heterocyclic group" in the specific example group G2;

G3 represents a "substituted or unsubstituted alkyl group" in the specific example group G3;

G6 represents a "substituted or unsubstituted cycloalkyl group" in the specific example group G6;

a plurality of G1 in —N(G1)(G1) are mutually the same or different;

a plurality of G2 in —N(G2)(G2) are mutually the same or different;

a plurality of G3 in —N(G3)(G3) are mutually the same or different; and a plurality of G6 in —N(G6)(G6) are mutually the same or different.

Halogen Atom

Specific examples (specific example group G11) of "halogen atom" mentioned herein include a fluorine atom, chlorine atom, bromine atom, and iodine atom.

Substituted or Unsubstituted Fluoroalkyl Group

The "substituted or unsubstituted fluoroalkyl group" mentioned herein refers to a group derived by substituting at least one hydrogen atom bonded to at least one of carbon atoms forming an alkyl group in the "substituted or unsubstituted alkyl group" with a fluorine atom, and also includes a group (perfluoro group) derived by substituting all of hydrogen atoms bonded to carbon atoms forming the alkyl group in the "substituted or unsubstituted alkyl group" with fluorine atoms. An "unsubstituted fluoroalkyl group" has, unless otherwise specified herein, 1 to 50, preferably 1 to 30, more preferably 1 to 18 carbon atoms. The "substituted fluoroalkyl group" refers to a group derived by substituting at least one hydrogen atom in a "fluoroalkyl group" with a substituent. It should be noted that the examples of the "substituted fluoroalkyl group" mentioned herein include a group derived by further substituting at least one hydrogen atom bonded to a carbon atom of an alkyl chain of a "substituted fluoroalkyl group" with a substituent, and a group derived by further substituting at least one hydrogen atom of a substituent of the "substituted fluoroalkyl group" with a substituent. Specific examples of the "unsubstituted fluoroalkyl group" include a group derived by substituting at least one hydrogen atom of the "alkyl group" (specific example group G3) with a fluorine atom.

Substituted or Unsubstituted Haloalkyl Group

The "substituted or unsubstituted haloalkyl group" mentioned herein refers to a group derived by substituting at least one hydrogen atom bonded to carbon atoms forming the alkyl group in the "substituted or unsubstituted alkyl group" with a halogen atom, and also includes a group derived by substituting all hydrogen atoms bonded to carbon atoms forming the alkyl group in the "substituted or unsubstituted alkyl group" with halogen atoms. An "unsubstituted haloalkyl group" has, unless otherwise specified herein, 1 to 50, preferably 1 to 30, and more preferably 1 to 18 carbon atoms. The "substituted haloalkyl group" refers to a group derived by substituting at least one hydrogen atom in a "haloalkyl group" with a substituent. It should be noted that the examples of the "substituted haloalkyl group" mentioned herein include a group derived by further substituting at least one hydrogen atom bonded to a carbon atom of an alkyl chain of a "substituted haloalkyl group" with a substituent, and a group derived by further substituting at least one hydrogen atom of a substituent of the "substituted haloalkyl group" with a substituent. Specific examples of the "unsubstituted haloalkyl group" include a group derived by substituting at least one hydrogen atom of the "alkyl group" (specific example group G3) with a halogen atom. The haloalkyl group is sometimes referred to as a halogenated alkyl group.

Substituted or Unsubstituted Alkoxy Group

Specific examples of a "substituted or unsubstituted alkoxy group" mentioned herein include a group represented by —O(G3), G3 being the "substituted or unsubstituted alkyl group" in the specific example group G3. An "unsubstituted alkoxy group" has, unless otherwise specified herein, 1 to 50, preferably 1 to 30, more preferably 1 to 18 carbon atoms.

Substituted or Unsubstituted Alkylthio Group

Specific examples of a "substituted or unsubstituted alkylthio group" mentioned herein include a group represented by —S(G3), G3 being the "substituted or unsubstituted alkyl group" in the specific example group G3. An "unsubstituted alkylthio group" has, unless otherwise specified herein, 1 to 50, preferably 1 to 30, more preferably 1 to 18 carbon atoms.

Substituted or Unsubstituted Aryloxy Group

Specific examples of a "substituted or unsubstituted aryloxy group" mentioned herein include a group represented by —O(G1), G1 being the "substituted or unsubstituted aryl group" in the specific example group G1. An "unsubstituted aryloxy group" has, unless otherwise specified herein, 6 to 50, preferably 6 to 30, more preferably 6 to 18 ring carbon atoms.

Substituted or Unsubstituted Arylthio Group

Specific examples of a "substituted or unsubstituted arylthio group" mentioned herein include a group represented by —S(G1), G1 being the "substituted or unsubstituted aryl group" in the specific example group G1. An "unsubstituted arylthio group" has, unless otherwise specified herein, 6 to 50, preferably 6 to 30, more preferably 6 to 18 ring carbon atoms.

Substituted or Unsubstituted Trialkylsilyl Group

Specific examples of a "trialkylsilyl group" mentioned herein include a group represented by —Si(G3)(G3)(G3), G3 being the "substituted or unsubstituted alkyl group" in the specific example group G3. A plurality of G3 in —Si(G3)(G3)(G3) are mutually the same or different. Each of the alkyl groups in the "trialkylsilyl group" has, unless otherwise specified herein, 1 to 50, preferably 1 to 20, more preferably 1 to 6 carbon atoms.

Substituted or Unsubstituted Aralkyl Group

Specific examples of a "substituted or unsubstituted aralkyl group" mentioned herein include a group represented by -(G3)-(G1), G3 being the "substituted or unsubstituted alkyl group" in the specific example group G3, G1 being the "substituted or unsubstituted aryl group" in the specific example group G1. Accordingly, the "aralkyl group" is a group derived by substituting a hydrogen atom of the "alkyl group" with a substituent in a form of the "aryl group," that is, the "aralkyl group" is an example of the "substituted alkyl group." An "unsubstituted aralkyl group," which is an "unsubstituted alkyl group" substituted by an "unsubstituted aryl group," has, unless otherwise specified herein, 7 to 50 carbon atoms, preferably 7 to 30 carbon atoms, more preferably 7 to 18 carbon atoms.

Specific examples of the "substituted or unsubstituted aralkyl group" include a benzyl group, 1-phenylethyl group, 2-phenylethyl group, 1-phenylisopropyl group, 2-phenylisopropyl group, phenyl-t-butyl group, α-naphthylmethyl group, 1-α-naphthylethyl group, 2-α-naphthylethyl group, 1-α-naphthylisopropyl group, 2-α-naphthylisopropyl group, β-naphthylmethyl group, 1-β-naphthylethyl group, 2-β-naphthylethyl group, 1-β-naphthylisopropyl group, and 2-β-naphthylisopropyl group.

Preferable examples of the substituted or unsubstituted aryl group mentioned herein include, unless otherwise specified herein, a phenyl group, p-biphenyl group, m-biphenyl group, o-biphenyl group, p-terphenyl-4-yl group, p-terphenyl-3-yl group, p-terphenyl-2-yl group, m-terphenyl-4-yl group, m-terphenyl-3-yl group, m-terphenyl-2-yl group, o-terphenyl-4-yl group, o-terphenyl-3-yl group, o-terphenyl-2-yl group, 1-naphthyl group, 2-naphthyl group, anthryl group, phenanthryl group, pyrenyl group, chrysenyl group, triphenylenyl group, fluorenyl group, 9,9'-spirobifluorenyl group, 9,9-dimethylfluorenyl group, and 9,9-diphenylfluorenyl group.

Preferable examples of the substituted or unsubstituted heterocyclic group mentioned herein include, unless otherwise specified herein, a pyridyl group, pyrimidinyl group, triazinyl group, quinolyl group, isoquinolyl group, quinazolinyl group, benzimidazolyl group, phenanthrolinyl group, carbazolyl group (1-carbazolyl group, 2-carbazolyl group, 3-carbazolyl group, 4-carbazolyl group, or 9-carbazolyl group), benzocarbazolyl group, azacarbazolyl group, diazacarbazolyl group, dibenzofuranyl group, naphthobenzofuranyl group, azadibenzofuranyl group, diazadibenzofuranyl group, dibenzothiophenyl group, naphthobenzothiophenyl group, azadibenzothiophenyl group, diazadibenzothiophenyl group, (9-phenyl)carbazolyl group ((9-phenyl)carbazole-1-yl group, (9-phenyl)carbazole-2-yl group, (9-phenyl)carbazole-3-yl group, or (9-phenyl)carbazole-4-yl group), (9-biphenylyl)carbazolyl group, (9-phenyl)phenylcarbazolyl group, diphenylcarbazole-9-yl group, phenylcarbazole-9-yl group, phenyltriazinyl group, biphenylyltriazinyl group, diphenyltriazinyl group, phenyldibenzofuranyl group, and phenyldibenzothiophenyl group.

The carbazolyl group mentioned herein is, unless otherwise specified herein, specifically a group represented by one of formulae below.

[Formula 10]

(TEMP-Cz1)

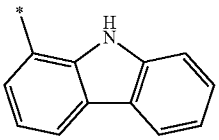

-continued (TEMP-Cz2)

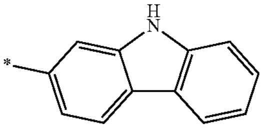

(TEMP-Cz3)

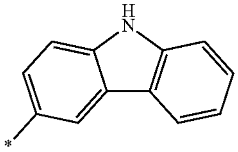

(TEMP-Cz4)

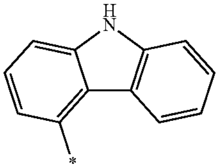

(TEMP-Cz5)

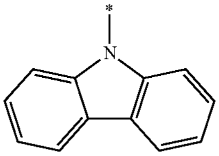

The (9-phenyl)carbazolyl group mentioned herein is, unless otherwise specified herein, specifically a group represented by one of formulae below.

[Formula 11]

(TEMP-Cz6)

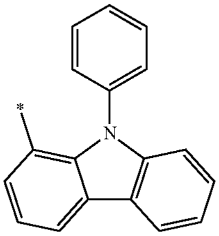

(TEMP-Cz7)

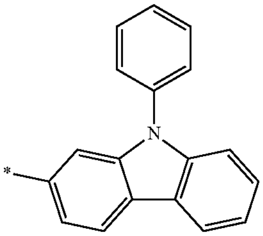

(TEMP-Cz8)

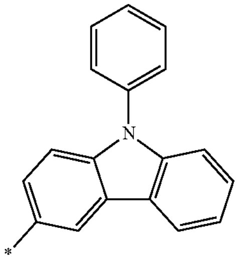

-continued

TEMP-Cz9)

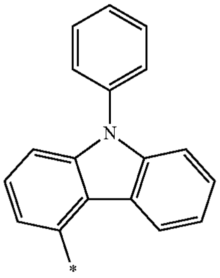

In the formulae (TEMP-Cz1) to (TEMP-Cz9), * represents a bonding position.

The dibenzofuranyl group and dibenzothiophenyl group mentioned herein are, unless otherwise specified herein, each specifically represented by one of formulae below.

[Formula 12]

(TEMP-34)

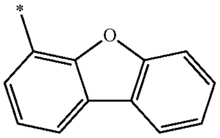

(TEMP-35)

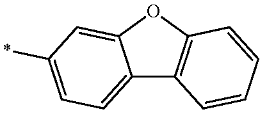

(TEMP-36)

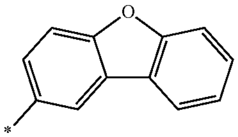

(TEMP-37)

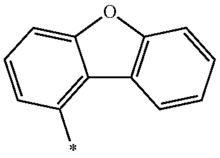

(TEMP-38)

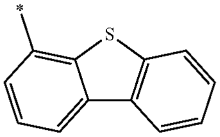

(TEMP-39)

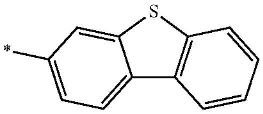

(TEMP-40)

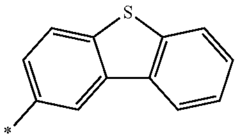

-continued (TEMP-41)

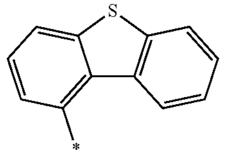

In the formulae (TEMP-34) to (TEMP-41), * represents a bonding position.

Preferable examples of the substituted or unsubstituted alkyl group mentioned herein include, unless otherwise specified herein, a methyl group, ethyl group, propyl group, isopropyl group, n-butyl group, isobutyl group, and t-butyl group.

Substituted or Unsubstituted Arylene Group

The "substituted or unsubstituted arylene group" mentioned herein is, unless otherwise specified herein, a divalent group derived by removing one hydrogen atom on an aryl ring of the "substituted or unsubstituted aryl group." Specific examples of the "substituted or unsubstituted arylene group" (specific example group G12) include a divalent group derived by removing one hydrogen atom on an aryl ring of the "substituted or unsubstituted aryl group" in the specific example group G1.

Substituted or Unsubstituted Divalent Heterocyclic Group

The "substituted or unsubstituted divalent heterocyclic group" mentioned herein is, unless otherwise specified herein, a divalent group derived by removing one hydrogen atom on a heterocyclic ring of the "substituted or unsubstituted heterocyclic group." Specific examples of the "substituted or unsubstituted divalent heterocyclic group" (specific example group G13) include a divalent group derived by removing one hydrogen atom on a heterocyclic ring of the "substituted or unsubstituted heterocyclic group" in the specific example group G2.

Substituted or Unsubstituted Alkylene Group

The "substituted or unsubstituted alkylene group" mentioned herein is, unless otherwise specified herein, a divalent group derived by removing one hydrogen atom on an alkyl chain of the "substituted or unsubstituted alkyl group." Specific examples of the "substituted or unsubstituted alkylene group" (specific example group G14) include a divalent group derived by removing one hydrogen atom on an alkyl chain of the "substituted or unsubstituted alkyl group" in the specific example group G3.

The substituted or unsubstituted arylene group mentioned herein is, unless otherwise specified herein, preferably any one of groups represented by formulae (TEMP-42) to (TEMP-68) below.

[Formula 13]

(TEMP-42)

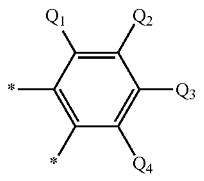

-continued (TEMP-43)

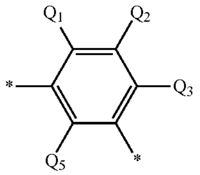

(TEMP-44)

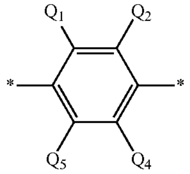

(TEMP-45)

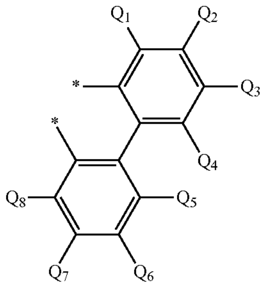

(TEMP-46)

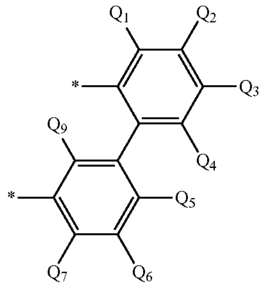

(TEMP-47)

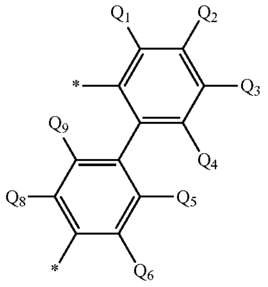

[Formula 14]

(TEMP-48)

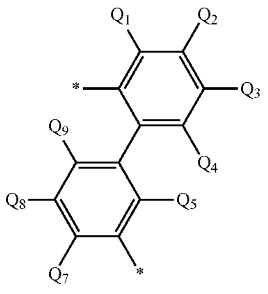

-continued
(TEMP-49)
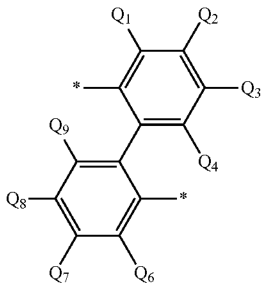
(TEMP-50)
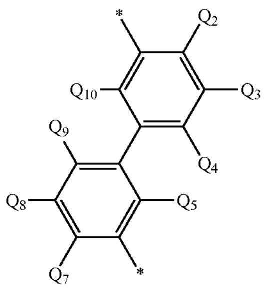
(TEMP-51)
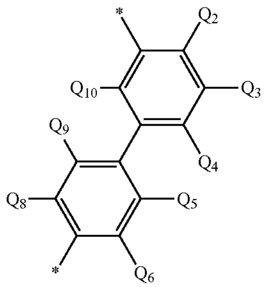
(TEMP-52)
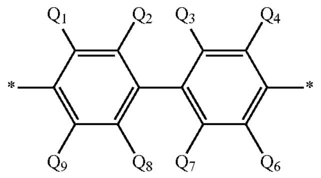
In the formulae (TEMP-42) to (TEMP-52), $Q_1$ to $Q_{10}$ are each independently a hydrogen atom or a substituent.
In the formulae (TEMP-42) to (TEMP-52), * represents a bonding position.
[Formula 15]
(TEMP-53)
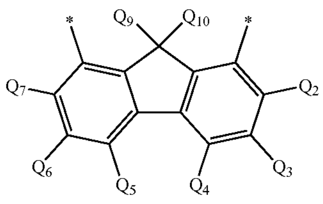
-continued
(TEMP-54)
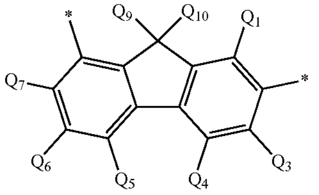
(TEMP-55)
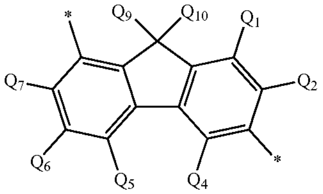
(TEMP-56)
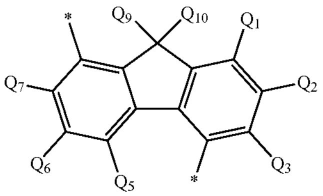
(TEMP-57)
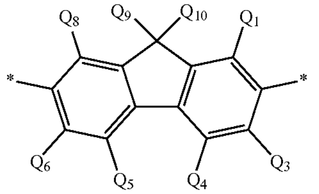
(TEMP-58)
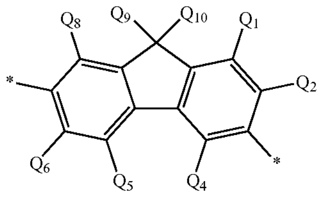
(TEMP-59)
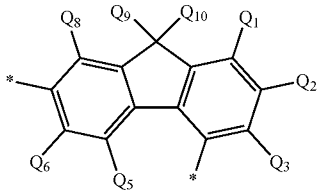
(TEMP-60)
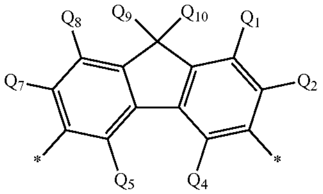
(TEMP-61)
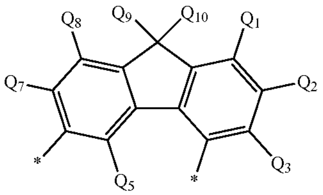

-continued (TEMP-62)

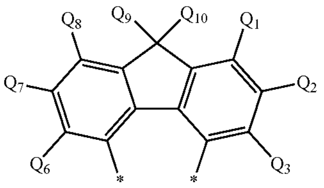

In the formulae (TEMP-53) to (TEMP-62), $Q_1$ to $Q_{10}$ are each independently a hydrogen atom or a substituent.

In the formulae, $Q_9$ and $Q_{10}$ may be mutually bonded through a single bond to form a ring.

In the formulae (TEMP-53) to (TEMP-62), * represents a bonding position.

[Formula 16]

(TEMP-63)

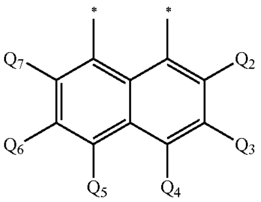

(TEMP-64)

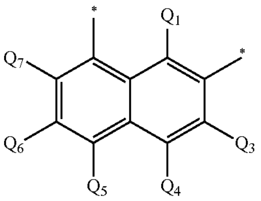

(TEMP-65)

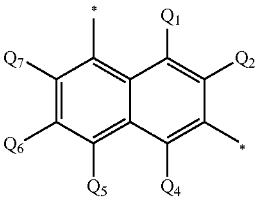

(TEMP-66)

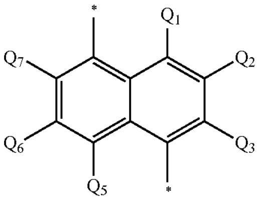

(TEMP-67)

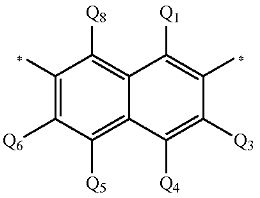

-continued (TEMP-68)

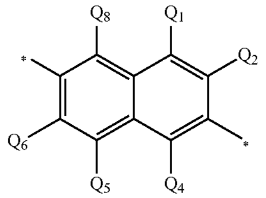

In the formulae (TEMP-63) to (TEMP-68), $Q_1$ to $Q_8$ are each independently a hydrogen atom or a substituent.

In the formulae (TEMP-63) to (TEMP-68), * represents a bonding position.

The substituted or unsubstituted divalent heterocyclic group mentioned herein is, unless otherwise specified herein, preferably a group represented by any one of formulae (TEMP-69) to (TEMP-102) below.

[Formula 17]

(TEMP-69)

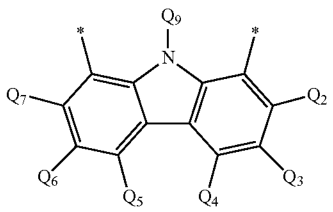

(TEMP-70)

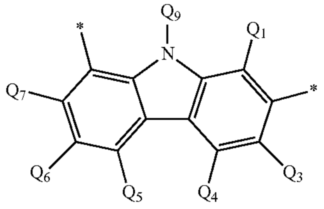

(TEMP-71)

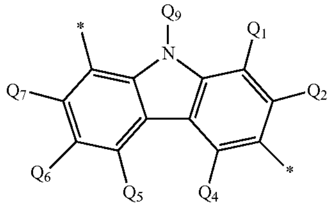

(TEMP-72)

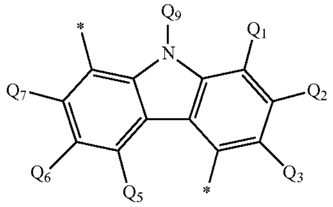

(TEMP-73)

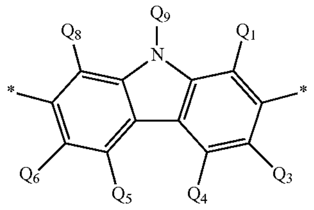

-continued
(TEMP-74)
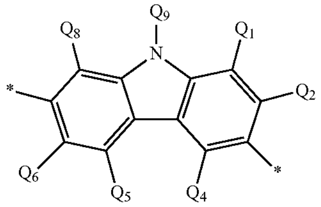
[Formula 18]
(TEMP-75)
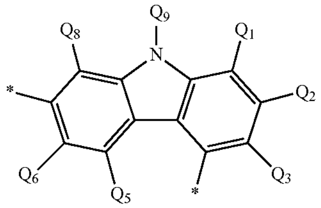
(TEMP-76)
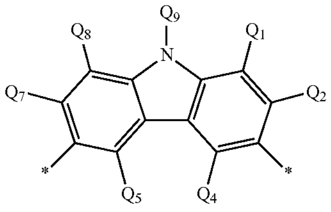
(TEMP-77)
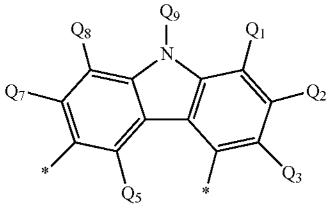
(TEMP-78)
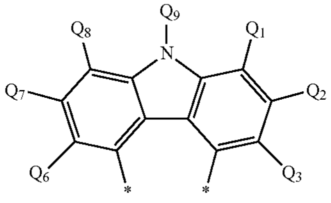
(TEMP-79)
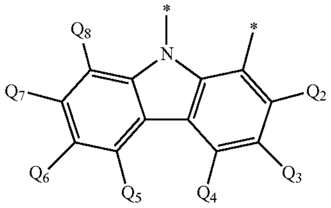
(TEMP-80)
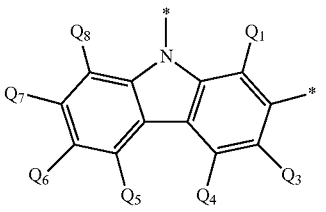
-continued
[Formula 19]
(TEMP-81)
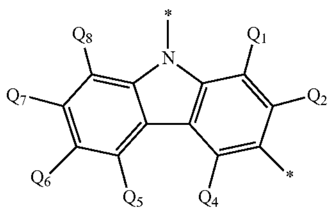
(TEMP-82)
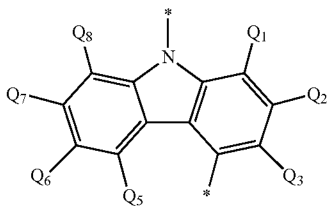
In the formulae (TEMP-69) to (TEMP-82), $Q_1$ to $Q_9$ are each independently a hydrogen atom or a substituent.
[Formula 20]
(TEMP-83)
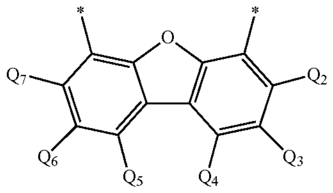
(TEMP-84)
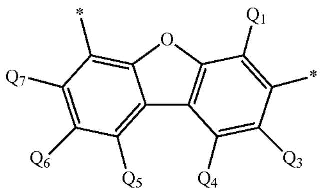
(TEMP-85)
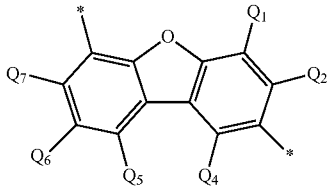
(TEMP-86)
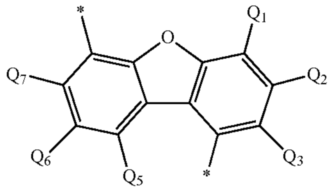
(TEMP-87)
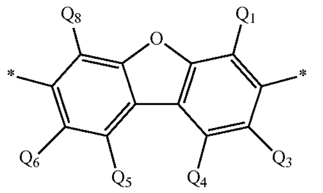

-continued
(TEMP-88)
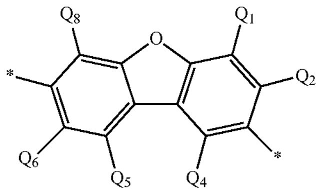
[Formula 21]
(TEMP-89)
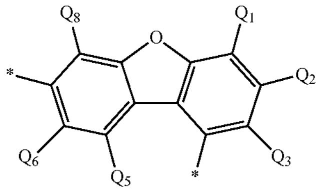
(TEMP-90)
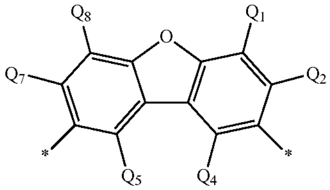
(TEMP-91)
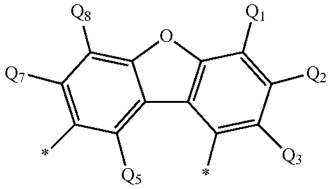
(TEMP-92)
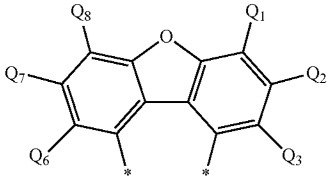
[Formula 22]
(TEMP-93)
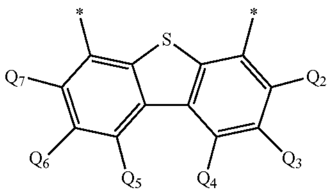
(TEMP-94)
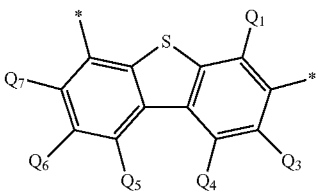
-continued
(TEMP-95)
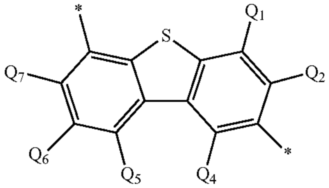
(TEMP-96)
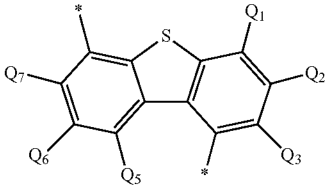
(TEMP-97)
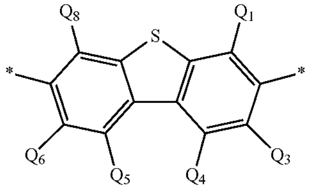
(TEMP-98)
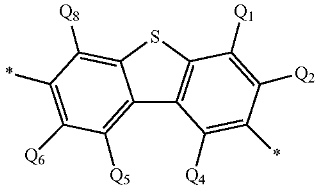
[Formula 23]
(TEMP-99)
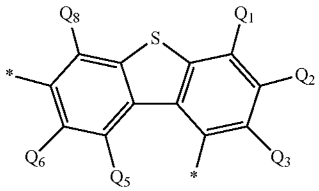
(TEMP-100)
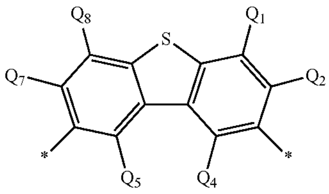
(TEMP-101)
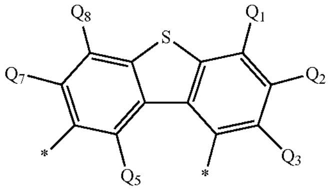

-continued (TEMP-102)

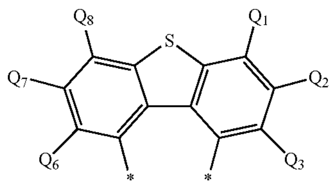

In the formulae (TEMP-83) to (TEMP-102), $Q_1$ to $Q_8$ are each independently a hydrogen atom or a substituent.

The substituent mentioned herein has been described above.

Instance of "Bonded to Form Ring"

Instances where "at least one combination of adjacent two or more (of . . . ) are mutually bonded to form a substituted or unsubstituted monocyclic ring, mutually bonded to form a substituted or unsubstituted fused ring, or not mutually bonded" mentioned herein refer to instances where "at least one combination of adjacent two or more (of . . . ) are mutually bonded to form a substituted or unsubstituted monocyclic ring, "at least one combination of adjacent two or more (of . . . ) are mutually bonded to form a substituted or unsubstituted fused ring," and "at least one combination of adjacent two or more (of . . . ) are not mutually bonded."

Instances where "at least one combination of adjacent two or more (of . . . ) are mutually bonded to form a substituted or unsubstituted monocyclic ring" and "at least one combination of adjacent two or more (of . . . ) are mutually bonded to form a substituted or unsubstituted fused ring" mentioned herein (these instances will be sometimes collectively referred to as an instance of "bonded to form a ring" hereinafter) will be described below. An anthracene compound having a basic skeleton in a form of an anthracene ring and represented by a formula (TEMP-103) below will be used as an example for the description.

[Formula 24]

(TEMP-103)

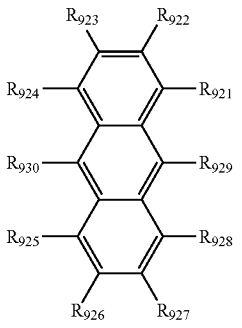

For instance, when "at least one combination of adjacent two or more of $R_{921}$ to $R_{930}$ are mutually bonded to form a ring," the combination of adjacent ones of $R_{921}$ to $R_{930}$ (i.e. the combination at issue) is a combination of $R_{921}$ and $R_{922}$, a combination of $R_{922}$ and $R_{923}$, a combination of $R_{923}$ and $R_{924}$, a combination of $R_{924}$ and $R_{930}$, a combination of $R_{930}$ and $R_{925}$, a combination of $R_{925}$ and $R_{926}$, a combination of $R_{926}$ and $R_{927}$, a combination of $R_{927}$ and $R_{928}$, a combination of $R_{928}$ and $R_{929}$, or a combination of $R_{929}$ and $R_{921}$.

The term "at least one combination" means that two or more of the above combinations of adjacent two or more of $R_{921}$ to $R_{930}$ may simultaneously form rings. For instance, when $R_{921}$ and $R_{922}$ are mutually bonded to form a ring $Q_A$ and $R_{925}$ and $R_{926}$ are simultaneously mutually bonded to form a ring $Q_B$, the anthracene compound represented by the formula (TEMP-103) is represented by a formula (TEMP-104) below.

[Formula 25]

(TEMP-104)

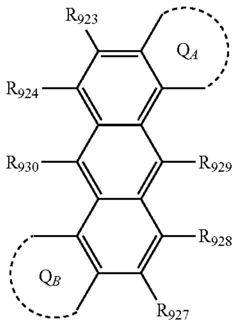

The instance where the "combination of adjacent two or more" form a ring means not only an instance where the "two" adjacent components are bonded but also an instance where adjacent "three or more" are bonded. For instance, $R_{921}$ and $R_{922}$ are mutually bonded to form a ring $Q_A$ and $R_{222}$ and $R_{223}$ are mutually bonded to form a ring $Q_C$, and mutually adjacent three components ($R_{921}$, $R_{922}$ and $R_{923}$) are mutually bonded to form a ring fused to the anthracene basic skeleton. In this case, the anthracene compound represented by the formula (TEMP-103) is represented by a formula (TEMP-105) below. In the formula (TEMP-105) below, the ring $Q_A$ and the ring $Q_C$ share $R_{922}$.

[Formula 26]

(TEMP-105)

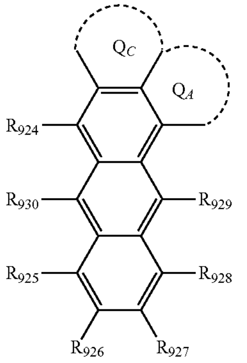

The formed "monocyclic ring" or "fused ring" may be, in terms of the formed ring in itself, a saturated ring or an unsaturated ring. When the "combination of adjacent two" form a "monocyclic ring" or a "fused ring," the "monocyclic ring" or "fused ring" may be a saturated ring or an unsaturated ring. For instance, the ring $Q_A$ and the ring $Q_B$ formed in the formula (TEMP-104) are each independently a "monocyclic ring" or a "fused ring." Further, the ring $Q_A$ and the ring $Q_C$ formed in the formula (TEMP-105) are each a "fused ring." The ring $Q_A$ and the ring $Q_C$ in the formula (TEMP-105) are fused to form a fused ring. When the ring $Q_A$ in the formula (TEMP-104) is a benzene ring, the ring $Q_A$ is a monocyclic ring. When the ring $Q_A$ in the formula (TEMP-104) is a naphthalene ring, the ring $Q_A$ is a fused ring.

The "unsaturated ring" represents an aromatic hydrocarbon ring or an aromatic heterocycle. The "saturated ring" represents an aliphatic hydrocarbon ring or a non-aromatic heterocycle.

Specific examples of the aromatic hydrocarbon ring include a ring formed by terminating a bond of a group in the specific examples of the specific example group G1 with a hydrogen atom.

Specific examples of the aromatic heterocyclic ring include a ring formed by terminating a bond of an aromatic heterocyclic group in the specific examples of the specific example group G2 with a hydrogen atom.

Specific examples of the aliphatic hydrocarbon ring include a ring formed by terminating a bond of a group in the specific examples of the specific example group G6 with a hydrogen atom.

The phrase "to form a ring" herein means that a ring is formed only by a plurality of atoms of a basic skeleton, or by a combination of a plurality of atoms of the basic skeleton and one or more optional atoms. For instance, the ring $Q_A$ formed by mutually bonding $R_{921}$ and $R_{922}$ shown in the formula (TEMP-104) is a ring formed by a carbon atom of the anthracene skeleton bonded to $R_{921}$, a carbon atom of the anthracene skeleton bonded to $R_{922}$, and one or more optional atoms. Specifically, when the ring $Q_A$ is a monocyclic unsaturated ring formed by $R_{921}$ and $R_{922}$, the ring formed by a carbon atom of the anthracene skeleton bonded to $R_{921}$, a carbon atom of the anthracene skeleton bonded to $R_{922}$, and four carbon atoms is a benzene ring.

The "optional atom" is, unless otherwise specified herein, preferably at least one atom selected from the group consisting of a carbon atom, nitrogen atom, oxygen atom, and sulfur atom. A bond of the optional atom (e.g. a carbon atom and a nitrogen atom) not forming a ring may be terminated by a hydrogen atom or the like or may be substituted by an "optional substituent" described later. When the ring includes an optional element other than carbon atom, the resultant ring is a heterocycle.

The number of "one or more optional atoms" forming the monocyclic ring or fused ring is, unless otherwise specified herein, preferably in a range from 2 to 15, more preferably in a range from 3 to 12, further preferably in a range from 3 to 5.

Unless otherwise specified herein, the ring, which may be a "monocyclic ring" or "fused ring," is preferably a "monocyclic ring."

Unless otherwise specified herein, the ring, which may be a "saturated ring" or "unsaturated ring," is preferably an "unsaturated ring."

Unless otherwise specified herein, the "monocyclic ring" is preferably a benzene ring.

Unless otherwise specified herein, the "unsaturated ring" is preferably a benzene ring.

When "at least one combination of adjacent two or more" (of . . . ) are "mutually bonded to form a substituted or unsubstituted monocyclic ring" or "mutually bonded to form a substituted or unsubstituted fused ring," unless otherwise specified herein, at least one combination of adjacent two or more of components are preferably mutually bonded to form a substituted or unsubstituted "unsaturated ring" formed of a plurality of atoms of the basic skeleton, and 1 to 15 atoms of at least one element selected from the group consisting of carbon, nitrogen, oxygen and sulfur.

When the "monocyclic ring" or the "fused ring" has a substituent, the substituent is the substituent described in later-described "optional substituent." When the "monocyclic ring" or the "fused ring" has a substituent, specific examples of the substituent are the substituents described in the above under the subtitle "Substituent Mentioned Herein."

When the "saturated ring" or the "unsaturated ring" has a substituent, the substituent is the substituent described in later-described "optional substituent." When the "monocyclic ring" or the "fused ring" has a substituent, specific examples of the substituent are the substituents described in the above under the subtitle "Substituent Mentioned Herein."

The above is the description for the instances where "at least one combination of adjacent two or more (of . . . ) are mutually bonded to form a substituted or unsubstituted monocyclic ring" and "at least one combination of adjacent two or more (of . . . ) are mutually bonded to form a substituted or unsubstituted fused ring" mentioned herein (sometimes referred to as an instance of "bonded to form a ring").

Substituent for Substituted or Unsubstituted Group

In an exemplary embodiment herein, the substituent for the substituted or unsubstituted group (sometimes referred to as an "optional substituent". hereinafter), is for instance, a group selected from the group consisting of an unsubstituted alkyl group having 1 to 50 carbon atoms, an unsubstituted alkenyl group having 2 to 50 carbon atoms, an unsubstituted alkynyl group having 2 to 50 carbon atoms, an unsubstituted cycloalkyl group having 3 to 50 ring carbon atoms, —Si($R_{901}$)($R_{902}$)($R_{903}$), —O—($R_{904}$), —S—($R_{905}$), —N($R_{906}$)($R_{907}$), a halogen atom, a cyano group, a nitro group, an unsubstituted aryl group having 6 to 50 ring carbon atoms, and an unsubstituted heterocyclic group having 5 to 50 ring atoms, $R_{901}$ to $R_{907}$ are each independently a hydrogen atom, a substituted or unsubstituted alkyl group having 1 to 50 carbon atoms, a substituted or unsubstituted cycloalkyl group having 3 to 50 ring carbon atoms, a substituted or unsubstituted aryl group having 6 to 50 ring carbon atoms, or a substituted or unsubstituted heterocyclic group having 5 to 50 ring atoms;

when two or more $R_{901}$ are present, the two or more $R_{901}$ are mutually the same or different;

when two or more $R_{902}$ are present, the two or more $R_{902}$ are mutually the same or different;

when two or more $R_{903}$ are present, the two or more $R_{903}$ are mutually the same or different;

when two or more $R_{904}$ are present, the two or more $R_{904}$ are mutually the same or different;

when two or more $R_{905}$ are present, the two or more $R_{905}$ are mutually the same or different;

when two or more $R_{906}$ are present, the two or more $R_{906}$ are mutually the same or different; and when two or more $R_{907}$ are present, the two or more $R_{907}$ are mutually the same or different.

In an exemplary embodiment, the substituent for the substituted or unsubstituted group is a group selected from the group consisting of an alkyl group having 1 to 50 carbon atoms, an aryl group having 6 to 50 ring carbon atoms, and a heterocyclic group having 5 to 50 ring atoms.

In an exemplary embodiment, the substituent for the substituted or unsubstituted group is a group selected from the group consisting of an alkyl group having 1 to 18 carbon atoms, an aryl group having 6 to 18 ring carbon atoms, and a heterocyclic group having 5 to 18 ring atoms.

Specific examples of the above optional substituent are the same as the specific examples of the substituent described in the above under the subtitle "Substituent Mentioned Herein."

Unless otherwise specified herein, adjacent ones of the optional substituents may form a "saturated ring" or an "unsaturated ring," preferably a substituted or unsubstituted saturated five-membered ring, a substituted or unsubstituted saturated six-membered ring, a substituted or unsubstituted unsaturated five-membered ring, or a substituted or unsubstituted unsaturated six-membered ring, more preferably a benzene ring.

Unless otherwise specified herein, the optional substituent may further include a substituent. Examples of the substituent for the optional substituent are the same as the examples of the optional substituent.

Herein, numerical ranges represented by "AA to BB" represent a range whose lower limit is the value (AA) recited before "to" and whose upper limit is the value (BB) recited after "to."

Herein, a numerical formula represented by "A B" means that the value A is equal to the value B, or the value A is larger than the value B.

Herein, a numerical formula represented by "A s B" means that the value A is equal to the value B, or the value A is smaller than the value B.

First Exemplary Embodiment

Organic Electroluminescence Device

An organic EL device according to a first exemplary embodiment includes an anode, a cathode, and an emitting region provided between the anode and the cathode, in which the emitting region includes a first emitting layer and a second emitting layer, a ratio $D_{EM1}/D_{EM2}$ of a film thickness of the first emitting layer $D_{EM1}$ to a film thickness of the second emitting layer $D_{EM2}$ is in a range from 2/3 to 3/2, the first emitting layer contains a first host material and a first luminescent compound, the second emitting layer contains a second host material and a second luminescent compound, the first host material is a compound represented by the formula (1), the first host material and the second host material are mutually different, and the first luminescent compound and the second luminescent compound are mutually the same or different.

The organic EL device of the exemplary embodiment includes the first emitting layer and the second emitting layer in the emitting region and the first emitting layer contains a compound represented by a formula (1) below as the first host material, thereby decreasing the drive voltage and improving the luminous efficiency. In a compound represented by the formula (1), since at least one of $R_{1A}$ or $R_{1B}$ is a substituted or unsubstituted alkyl group having 1 to 15 carbon atoms, these compounds are likely to interact with each other, whereby improvement in electron mobility is expectable. Moreover, since a compound represented by the formula (1) does not have, in a molecule of the first host material, three or more groups of a substituted or unsubstituted aryl group having four or more fused rings and a substituted or unsubstituted heterocyclic group having four or more fused rings, a decrease in the electron mobility due to a decrease in interaction between molecules is expectable to be inhibited. In the organic EL device according to the exemplary embodiment, the ratio $D_{EM1}/D_{EM2}$ of the film thickness of the first emitting layer to the film thickness of the second emitting layer is in a range from 2/3 to 3/2. The ratio of the film thickness of the first emitting layer to the film thickness of the second emitting layer is larger than a film thickness ratio in a typical emitting-layer-laminated organic EL device (e.g., an organic EL device including the first emitting layer having a 5-nm-film thickness and the second emitting layer having a 20-nm-film thickness with a film thickness ratio $D_{EM1}/D_{EM2}$ being 1/4). Even with the above-described film thickness ratio of the organic EL device according to the exemplary embodiment, since the organic EL device contains a compound represented by a formula (1) below as the first host material, it is expected that the drive voltage of the organic EL device is lowered and the luminous efficiency is improved.

In the first host material, for instance, a pyrenyl group and a benzanthryl group are each an aryl group in which four rings (6-membered rings) are fused, an anthryl group is an aryl group in which three rings (6-membered rings) are fused, and a dibenzofuranyl group and a dibenzothienyl group are each a heterocyclic group in which three rings (two 6-membered rings and one 5-membered ring) are fused.

In the organic EL device according to the exemplary embodiment, the film thickness ratio $D_{EM1}/D_{EM2}$ of the first emitting layer to the second emitting layer may be in a range from 0.67 to 1.50 or may be in a range from 0.75 to 1.25.

Any film thickness satisfying the above-described range of the film thickness ratio $D_{EM1}/D_{EM2}$ is usable as the film thickness of the first emitting layer and the film thickness of the second emitting layer. For instance, the film thickness of the first emitting layer and the film thickness of the second emitting layer are preferably each independently in a range from 5 nm to 25 nm, and more preferably in a range from 5 nm to 15 nm.

First Host Material

The first host material is a compound represented by the formula (1) below. A compound represented by the formula (1) is sometimes referred to as a first compound.

[Formula 27]

(1)

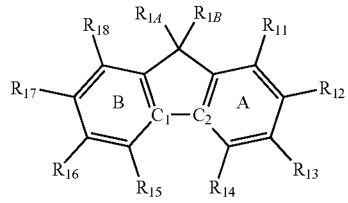

(10)

In the formula (1):

$R_{1A}$ and $R_{1B}$ are each independently a substituted or unsubstituted alkyl group having 1 to 15 carbon atoms, a substituted or unsubstituted aryl group having 6 to 17 ring carbon atoms, or a substituted or unsubstituted heterocyclic group having 5 to 17 ring atoms, at least one of $R_{1A}$ or $R_{1B}$ is a substituted or unsubstituted alkyl group having 1 to 15 carbon atoms;

at least one combination of combinations of adjacent two or more of $R_{11}$ to $R_{14}$ or combinations of adjacent two or more of $R_{15}$ to $R_{18}$ are mutually bonded to form a substituted or unsubstituted monocyclic ring, or mutually bonded to form a substituted or unsubstituted fused ring;

when a substituted or unsubstituted monocyclic ring or a substituted or unsubstituted fused ring is formed with the ring A, a group represented by the formula (10) is bonded to a carbon atom bonded to $R_{12}$ or, of carbon atoms forming the monocyclic ring with the ring A and the fused ring with the ring A, a carbon atom farthest from a carbon atom $C_1$ of the ring A, the carbon atom $C_1$ being bonded with a single bond to a carbon atom $C_2$ of a ring B;

when a substituted or unsubstituted monocyclic ring or a substituted or unsubstituted fused ring is formed with not the ring A but the ring B, a group represented by the formula (10) is bonded to a carbon atom bonded to $R_{12}$;

$R_{12}$ not bonded with a group represented by the formula (10), and $R_{11}$, $R_{13}$, $R_{14}$, and $R_{15}$ to $R_{18}$ forming neither the substituted or unsubstituted monocyclic ring nor the substituted or unsubstituted fused ring are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by $-Si(R_{901})(R_{902})(R_{903})$, a group represented by $-O-(R_{904})$, a group represented by $-S-(R_{905})$, a group represented by $-N(R_{906})(R_{907})$, a substituted or unsubstituted aralkyl group having 7 to 50 carbon atoms, a group represented by $-C(=O)R_{801}$, a group represented by $-COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

In the formula (10):

$Ar_1$ is a substituted or unsubstituted aryl group having four or more fused rings or a substituted or unsubstituted heterocyclic group having four or more fused rings;

$L_1$ is a single bond, a substituted or unsubstituted arylene group having 6 to 17 ring carbon atoms, or a substituted or unsubstituted divalent heterocyclic group having 5 to 17 ring atoms;

mx is 0, 1, or 2;

* represents a bonding position to an atom forming a ring of the formula (1); and the first host material does not have, in a molecule, three or more groups of a substituted or unsubstituted aryl group having four or more fused rings and a substituted or unsubstituted heterocyclic group having four or more fused rings.

In the first host material, $R_{901}$, $R_{902}$, $R_{903}$, $R_{904}$, $R_{905}$, $R_{906}$, $R_{907}$, $R_{801}$ and $R_{802}$ are each independently a hydrogen atom, a substituted or unsubstituted alkyl group having 1 to 50 carbon atoms, a substituted or unsubstituted cycloalkyl group having 3 to 50 ring carbon atoms, a substituted or unsubstituted aryl group having 6 to 17 ring carbon atoms, or a substituted or unsubstituted heterocyclic group having 5 to 17 ring atoms;

when a plurality of $R_{901}$ are present, the plurality of $R_{901}$ are mutually the same or different;

when a plurality of $R_{902}$ are present, the plurality of $R_{902}$ are mutually the same or different;

when a plurality of $R_{903}$ are present, the plurality of $R_{903}$ are mutually the same or different;

when a plurality of $R_{904}$ are present, the plurality of $R_{904}$ are mutually the same or different;

when a plurality of $R_{905}$ are present, the plurality of $R_{905}$ are mutually the same or different;

when a plurality of $R_{906}$ are present, the plurality of $R_{906}$ are mutually the same or different;

when a plurality of $R_{907}$ are present, the plurality of $R_{907}$ are mutually the same or different;

when a plurality of $R_{801}$ are present, the plurality of $R_{801}$ are mutually the same or different; and when a plurality of $R_{802}$ are present, the plurality of $R_{802}$ are mutually the same or different.

In the organic EL device according to the exemplary embodiment, it is also preferable that only one combination of combinations of adjacent two or more of $R_{11}$ to $R_{14}$ and combinations of adjacent two or more of $R_{15}$ to $R_{18}$ are mutually bonded to form a substituted or unsubstituted monocyclic ring or a substituted or unsubstituted fused ring.

In the organic EL device according to the exemplary embodiment, the substituted or unsubstituted aryl group having 6 to 17 ring carbon atoms is preferably a substituted or unsubstituted aryl group having 6 to 14 ring carbon atoms.

In the organic EL device according to the exemplary embodiment, the substituted or unsubstituted heterocyclic group having 5 to 17 ring atoms is preferably a substituted or unsubstituted heterocyclic group having 5 to 14 ring atoms.

In the organic EL device according to the exemplary embodiment, the substituted or unsubstituted arylene group having 6 to 17 ring carbon atoms is preferably a substituted or unsubstituted arylene group having 6 to 14 ring carbon atoms.

In the organic EL device according to the exemplary embodiment, the substituted or unsubstituted divalent heterocyclic group having 5 to 17 ring atoms is preferably a substituted or unsubstituted divalent heterocyclic group having 5 to 14 ring atoms.

In the organic EL device according to the exemplary embodiment, $R_{1A}$ and $R_{1B}$ are preferably each independently a substituted or unsubstituted alkyl group having 1 to 15 carbon atoms or a substituted or unsubstituted aryl group having 6 to 17 ring carbon atoms.

In the organic EL device according to the exemplary embodiment, $R_{1A}$ and $R_{1B}$ are preferably each independently a substituted or unsubstituted alkyl group having 1 to 15 carbon atoms. It easily decreases a drive voltage that $R_{1A}$ and $R_{1B}$ are a substituted or unsubstituted alkyl group having 1 to 15 carbon atoms.

In the organic EL device according to the exemplary embodiment, $R_{1A}$ and $R_{1B}$ are preferably each independently a substituted or unsubstituted alkyl group having 1 to 10 carbon atoms.

In the organic EL device according to the exemplary embodiment, it is preferable that when at least one combination of adjacent two or more of $R_{11}$ to $R_{14}$ are mutually bonded to form a substituted or unsubstituted monocyclic ring or a substituted or unsubstituted fused ring, and when at least one combination of adjacent two or more of $R_{15}$ to $R_{18}$ are mutually bonded to form a substituted or unsubstituted monocyclic ring or a substituted or unsubstituted fused ring, the substituted or unsubstituted monocyclic ring is a group represented by a formula (11) below, and the substituted or unsubstituted fused ring is a ring represented by a formula (12) below.

[Formula 28]

(11)

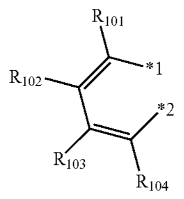

(12)

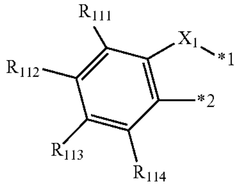

In the formula (11):

at least one combination of adjacent two or more of $R_{101}$ to $R_{104}$ are mutually bonded to form a substituted or unsubstituted monocyclic ring, mutually bonded to form a substituted or unsubstituted fused ring, or not mutually bonded.

In the formula (12):

$X_1$ is $C(R_{115})(R_{116})$, $NR_{117}$, an oxygen atom, or a sulfur atom, $R_{115}$, $R_{116}$, and $R_{117}$ are each independently a substituted or unsubstituted alkyl group having 1 to 15 carbon atoms, a substituted or unsubstituted aryl group having 6 to 17 ring carbon atoms, or a substituted or unsubstituted heterocyclic group having 5 to 17 ring atoms;

at least one of $R_{115}$ or $R_{116}$ is a substituted or unsubstituted alkyl group having 1 to 15 carbon atoms;

at least one combination of adjacent two or more of $R_{111}$ to $R_{114}$ are mutually bonded to form a substituted or unsubstituted monocyclic ring, mutually bonded to form a substituted or unsubstituted fused ring, or not mutually bonded;

$R_{101}$ to $R_{104}$ and $R_{111}$ to $R_{114}$ forming neither the substituted or unsubstituted monocyclic ring nor the substituted or unsubstituted fused ring are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by $-Si(R_{901})(R_{902})(R_{903})$, a group represented by $-O-(R_{904})$, a group represented by $-S-(R_{905})$, a group represented by $-N(R_{906})(R_{907})$, a substituted or unsubstituted aralkyl group having 7 to 50 carbon atoms, a group represented by $-C(=O)R_{801}$, a group represented by $-COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms; and

*1 and *2 each represent a bonding position to an atom forming a ring of the formula (1).

In the organic EL device according to the exemplary embodiment, when $X_1$ is $C(R_{115})(R_{116})$, $R_{115}$ and $R_{116}$ are preferably each independently a substituted or unsubstituted alkyl group having 1 to 15 carbon atoms or a substituted or unsubstituted aryl group having 6 to 17 ring carbon atoms, and more preferably a substituted or unsubstituted alkyl group having 1 to 15 carbon atoms.

In the organic EL device according to the exemplary embodiment, $R_{12}$ is also preferably a group represented by the formula (10).

In the organic EL device according to the exemplary embodiment, the first host material is preferably a compound represented by a formula (101) below.

[Formula 29]

(101)

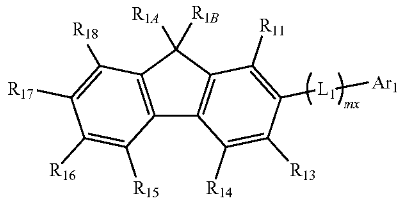

In the formula (101):

$R_{1A}$, $R_{1B}$, $R_{11}$, $R_{13}$, $R_{14}$, and $R_{15}$ to $R_{18}$ respectively represent the same as $R_{1A}$, $R_{1B}$, $R_{11}$, $R_{13}$, $R_{14}$, and $R_{15}$ to $R_{18}$ in the formula (1A); and $Ar_1$, $L_1$, and mx respectively represent the same as $Ar_1$, $L_1$, and mx in the formula (10).

In the organic EL device according to the exemplary embodiment, it is also preferable that at least one combination of adjacent two or more of $R_{15}$ to $R_{18}$ are mutually bonded to form a substituted or unsubstituted monocyclic ring, or mutually bonded to form a substituted or unsubstituted fused ring.

In the organic EL device according to the exemplary embodiment, it is also preferable that a combination of $R_{16}$ and $R_{17}$ are mutually bonded to form a substituted or unsubstituted monocyclic ring, or mutually bonded to form a substituted or unsubstituted fused ring.

In the organic EL device according to the exemplary embodiment, it is also preferable that a combination of $R_{16}$ and $R_{17}$ are mutually bonded to form a substituted or unsubstituted monocyclic ring.

When one combination of combinations of adjacent two or more of $R_{15}$ to $R_{18}$ are mutually bonded to form a substituted or unsubstituted monocyclic ring or a substituted or unsubstituted fused ring, a ring directly fused with the ring B is preferably a six-membered ring, and more preferably a ring represented by the formula (11). It makes the drive voltage likely to decrease that the ring directly fused with the ring B is a six-membered ring.

In the organic EL device according to the exemplary embodiment, the first host material is also preferably a compound represented by a formula (102), (102A), or (102B) below.

[Formula 30]

(102)

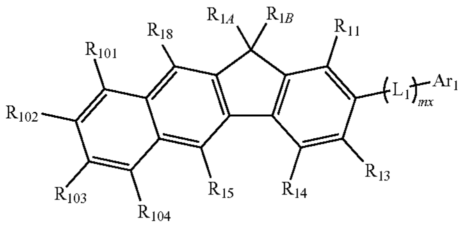

[Formula 31]

(102A)

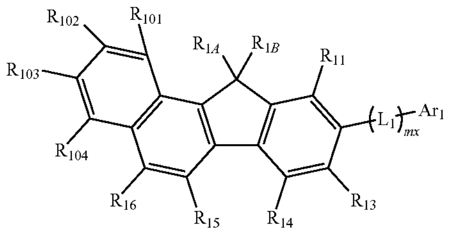

(102B)

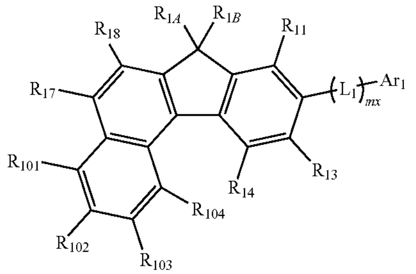

In the formulae (102), (102A), and (102B):

$R_{1A}$, $R_{1B}$, $R_{11}$, $R_{13}$, $R_{14}$, $R_{15}$, $R_{16}$, $R_{17}$, and $R_{18}$ respectively represent the same as $R_{1A}$, $R_{1B}$, $R_{11}$, $R_{13}$, $R_{14}$, $R_{15}$, $R_{16}$, $R_{17}$, and $R_{18}$ in the formula (1);

$Ar_1$, $L_1$, and mx respectively represent the same as $Ar_1$, $L_1$, and mx in the formula (10);

none of at least one combination of adjacent two or more of $R_{101}$ to $R_{104}$ are bonded to each other; and $R_{101}$ to $R_{104}$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —$Si(R_{901})(R_{902})(R_{903})$, a group represented by —O—$(R_{904})$, a group represented by —S—$(R_{905})$, a group represented by —$N(R_{906})(R_{907})$, a substituted or unsubstituted aralkyl group having 7 to 50 carbon atoms, a group represented by —C(═O)$R_{801}$, a group represented by —$COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

In the organic EL device according to the exemplary embodiment, the first host material is also preferably a compound represented by a formula (104), (105), (106), or (107) below.

[Formula 32]

(104)

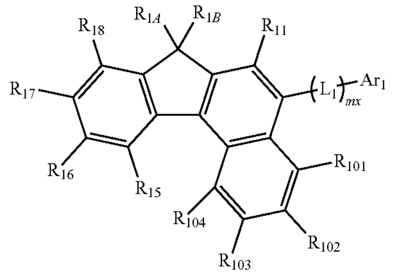

(105)

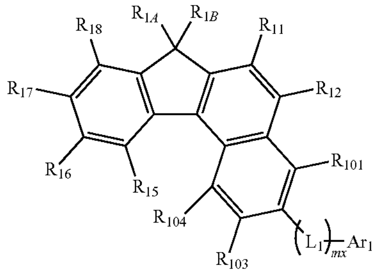

(106)

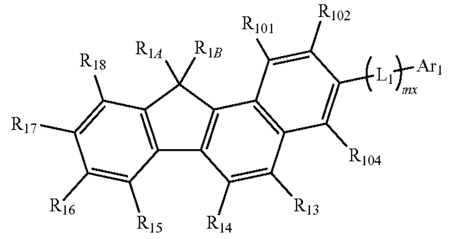

(107)

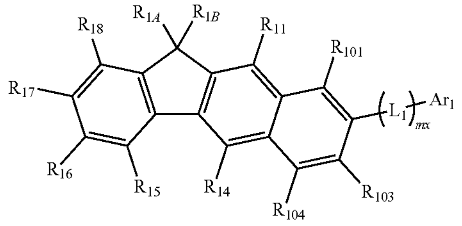

In the formulae (104) to (107):

$R_{1A}$, $R_{1B}$, and $R_{11}$ to $R_{18}$ respectively represent the same as $R_{1A}$, $R_{1B}$, and $R_{11}$ to $R_{18}$ in the formula (1);

$Ar_1$, $L_1$, and mx respectively represent the same as $Ar_1$, $L_1$, and mx in the formula (10);

none of at least one combination of adjacent two or more of $R_{101}$ to $R_{104}$ are bonded to each other; and $R_{101}$ to $R_{104}$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —$Si(R_{901})(R_{902})(R_{903})$, a group represented by —O—$(R_{904})$, a group represented by —S—$(R_{905})$, a group represented by —$N(R_{906})(R_{907})$, a substituted or unsubstituted aralkyl group having 7 to 50 carbon atoms, a group represented by —C(═O)$R_{801}$, a group represented by —$COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

The compound represented by the formula (104) is an exemplary compound in which a substituted or unsubstituted monocyclic ring is formed with the ring A and a group represented by the formula (10) is bonded to a carbon atom bonded to $R_{12}$. In the formula (104), a substituted or unsubstituted monocyclic ring formed with the ring A is a ring represented by the formula (11) that is bonded with a combination of $R_{13}$ and $R_{14}$.

The compounds represented by the formulae (105) to (107) are exemplary compounds each in which a substituted or unsubstituted monocyclic ring is formed with the ring A and a group represented by the formula (10) is bonded to a carbon atom, of carbon atoms forming the monocyclic ring with the ring A, farthest from a carbon atom $C_1$ of the ring A, the carbon atom $C_1$ being bonded with a single bond to a carbon atom $C_2$ of the ring B.

In the organic EL device according to the exemplary embodiment, the first host material is also preferably a compound represented by a formula (102C), (102D), (102E), (102F), (102G), or (102H) below.

[Formula 33]

(102C)

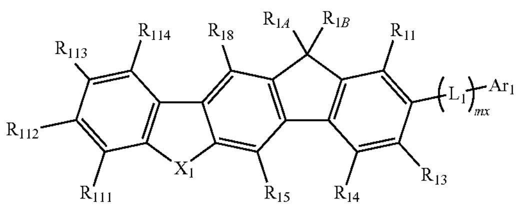

(102D)

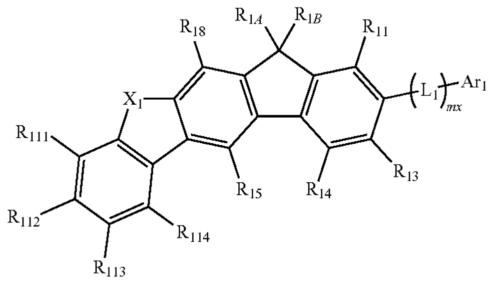

(102E)

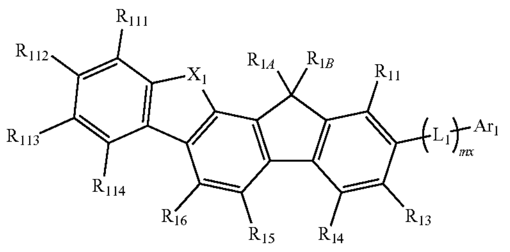

-continued (102F)

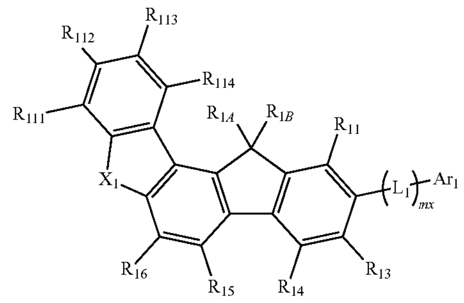

(102G)

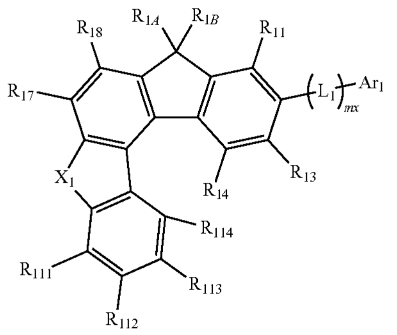

(102H)

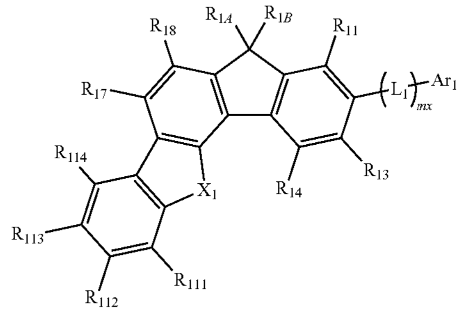

In the formulae (102C), (102D), (102E), (102F), (102G), and (102H):

$R_{1A}$, $R_{1B}$, $R_{11}$, $R_{13}$, $R_{14}$, $R_{15}$, $R_{16}$, $R_{17}$, and $R_{18}$ respectively represent the same as $R_{1A}$, $R_{1B}$, $R_{11}$, $R_{13}$, $R_{14}$, $R_{15}$, $R_{16}$, $R_{17}$, and $R_{18}$ in the formula (1);

$Ar_1$, $L_1$, and mx respectively represent the same as $Ar_1$, $L_1$, and mx in the formula (10); and $X_1$ and $R_{111}$ to $R_{114}$ respectively represent the same as $X_1$ and $R_{111}$ to $R_{114}$ in the formula (12).

In the organic EL device according to the exemplary embodiment, mx is preferably 0.

In the organic EL device according to the exemplary embodiment, $L_1$ is preferably a single bond or a substituted or unsubstituted arylene group having 6 to 17 ring carbon atoms, and preferably a single bond or a substituted or unsubstituted phenylene group.

In the organic EL device according to the exemplary embodiment, the first host material is preferably a compound represented by a formula (103), (103A), or (103B) below.

[Formula 34]

(103)

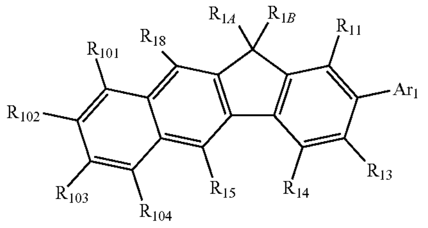

[Formula 35]

(103A)

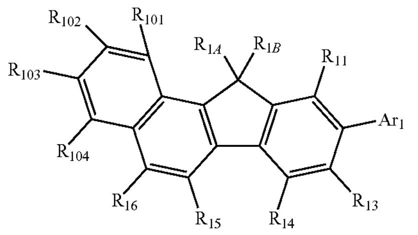

(103B)

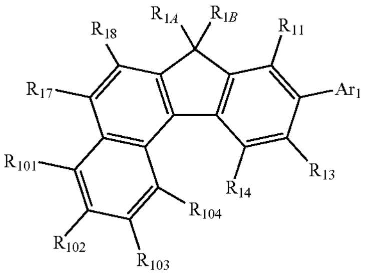

In the formulae (103), (103A), and (103B):

$R_{1A}$, $R_{1B}$, $R_{11}$, $R_{13}$, $R_{14}$, $R_{15}$, $R_{16}$, $R_{17}$, and $R_{18}$ respectively represent the same as $R_{1A}$, $R_{1B}$, $R_{11}$, $R_{13}$, $R_{14}$, $R_{15}$, $R_{16}$, $R_{17}$, and $R_{18}$ in the formula (1);

$R_{101}$ to $R_{104}$ each represent the same as $R_{101}$ to $R_{104}$ in the formulae (102), (102A), and (102B); and $Ar_1$ represents the same as $Ar_1$ in the formula (10).

In the organic EL device according to the exemplary embodiment, $R_{12}$ not being bonded with a group represented by the formula (10), $R_{11}$, $R_{13}$, $R_{14}$, and $R_{15}$ to $R_{18}$ forming neither the substituted or unsubstituted monocyclic ring nor the substituted or unsubstituted fused ring are preferably each independently a hydrogen atom or a substituted or unsubstituted alkyl group having 1 to 15 carbon atoms, more preferably a hydrogen atom or a substituted or unsubstituted alkyl group having 1 to 10 carbon atoms, and still more preferably a hydrogen atom.

In the organic EL device according to the exemplary embodiment, $R_{101}$ to $R_{104}$ and $R_{111}$ to $R_{114}$ forming neither the substituted or unsubstituted monocyclic ring nor the substituted or unsubstituted fused ring are preferably each independently a hydrogen atom or a substituted or unsubstituted alkyl group having 1 to 15 carbon atoms, more preferably a hydrogen atom or a substituted or unsubstituted alkyl group having 1 to 10 carbon atoms, and still more preferably a hydrogen atom.

In the organic EL device according to the exemplary embodiment, $Ar_1$ is preferably a substituted or unsubstituted aryl group having four to six fused rings or a substituted or unsubstituted heterocyclic group having four to six fused rings, and more preferably a substituted or unsubstituted aryl group having four to six fused rings.

In the organic EL device according to the exemplary embodiment, $Ar_1$ is also preferably a group derived from a substituted or unsubstituted fluoranthene ring, a substituted or unsubstituted benzofluoranthene ring, a substituted or unsubstituted benzanthracene ring, or a substituted or unsubstituted benzoxanthene ring.

In the organic EL device according to the exemplary embodiment, $Ar_1$ is also preferably a group represented by a formula (110), (114), (120), (130), (140), (150), (160), (170), (171), (180) or (190).

Group Represented by Formula (110)

[Formula 36]

(110)

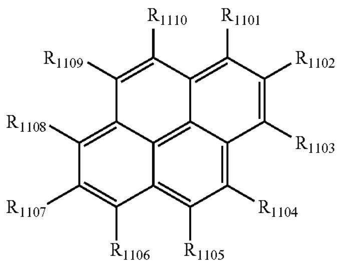

In the formula (110): one of $R_{1101}$ to $R_{1110}$ is a bonding position to $L_1$; and $R_{1101}$ to $R_{1110}$ not being the bonding position to $L_1$ each independently represent a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by $-Si(R_{901})(R_{902})(R_{903})$, a group represented by $-O-(R_{904})$, a group represented by $-S-(R_{905})$, a group represented by $-N(R_{906})(R_{907})$, a substituted or unsubstituted aralkyl group having 7 to 50 carbon atoms, a group represented by $-C(=O)R_{801}$, a group represented by $-COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

In the organic EL device according to the exemplary embodiment, $Ar_1$ is also preferably a group represented by a formula (111), a formula (112), or a formula (113) below.

[Formula 37]

(111)

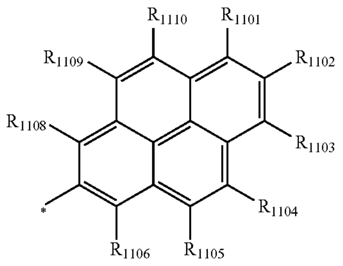

-continued (112)

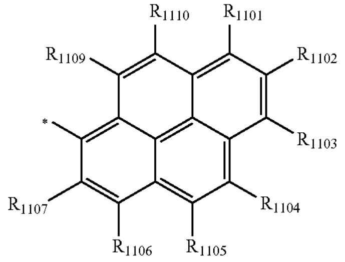

(113)

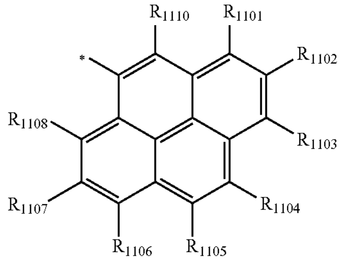

In the formulae (111), (112), and (113): $R_{1101}$ to $R_{1110}$ respectively represent the same as $R_{1101}$ to $R_1$110 in the formula (110); and * represents a bonding position to $L_1$.

In the organic EL device according to the exemplary embodiment, $R_{1101}$ to $R_{1110}$ that are each not a bonding position to $L_1$ are preferably each independently a hydrogen atom or a substituted or unsubstituted aryl group having 6 to 14 ring carbon atoms, and more preferably a hydrogen atom or a substituted or unsubstituted phenyl group.

In the organic EL device according to the exemplary embodiment, $Ar_1$ is also preferably a group represented by the formula (112).

In the organic EL device according to the exemplary embodiment, it is also preferable that $Ar_1$ is a group represented by the formula (112) and mx is 0. In this case, the first host material is a compound represented by a formula (103C) below.

In the organic EL device according to the exemplary embodiment, the first host material is also preferably a compound represented by the formula (103C) below.

[Formula 38]

(103C)

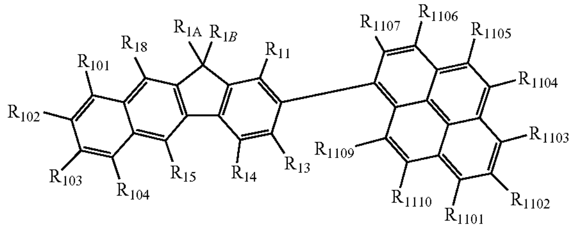

In the formula (1030):

$R_{1A}$, $R_{1B}$, $R_{11}$, $R_{13}$, $R_{14}$, $R_{15}$, and $R_{18}$ respectively represent the same as $R_{1A}$, $R_{1B}$, $R_{11}$, $R_{13}$, $R_{14}$, $R_{15}$, and $R_{18}$ in the formula (1);

$R_{101}$ to $R_{104}$ each represent the same as $R_{101}$ to $R_{104}$ in the formula (102); and $R_{1101}$ to $R_{1107}$, $R_{1109}$, and $R_{1110}$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a group represented by —N($R_{906}$)($R_{907}$), a substituted or unsubstituted aralkyl group having 7 to 50 carbon atoms, a group represented by —C(═O)$R_{801}$, a group represented by —COO$R_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

Group Represented by Formula (120)

[Formula 39]

(120)

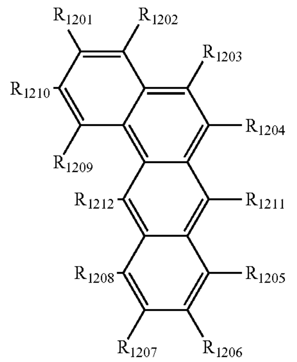

In the formula (120): one of $R_{1201}$ to $R_{1212}$ is a bonding position to $L_1$, and $R_{1201}$ to $R_{1212}$ not being the bonding position to $L_1$ each independently represent a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a group represented by —N($R_{906}$)($R_{907}$), a substituted or unsubstituted aralkyl group having 7 to 50 carbon atoms, a group represented by —C(═O)$R_{801}$, a group represented by —COO$R_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

In the organic EL device according to the exemplary embodiment, $R_{1211}$ or $R_{1212}$ in the formula (120) is preferably a bonding position to $L_1$.

In the organic EL device according to the exemplary embodiment, $R_{1211}$ in the formula (120) is preferably a bonding position to $L_1$.

In the organic EL device according to the exemplary embodiment, $Ar_1$ is also preferably a group represented by a formula (121) or (122) below.

[Formula 40]

(121)

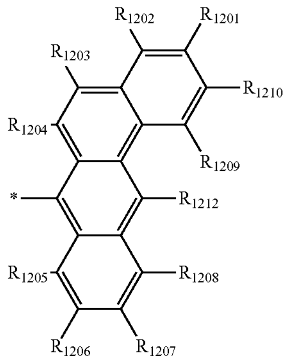

(122)

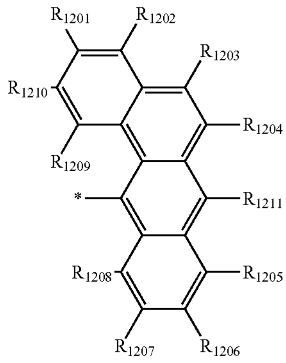

In the formulae (121) and (122): $R_{1201}$ to $R_{1212}$ respectively represent the same as $R_{1201}$ to $R_{1212}$ in the formula (120); and * represents a bonding position to $L_1$.

In the organic EL device according to the exemplary embodiment, $R_{1201}$ to $R_{1212}$ that are each not a bonding position to $L_1$ are preferably each independently a hydrogen atom or a substituted or unsubstituted aryl group having 6 to 14 ring carbon atoms, and more preferably a hydrogen atom or a substituted or unsubstituted phenyl group.

Group Represented by Formula (130)

[Formula 41]

(130)

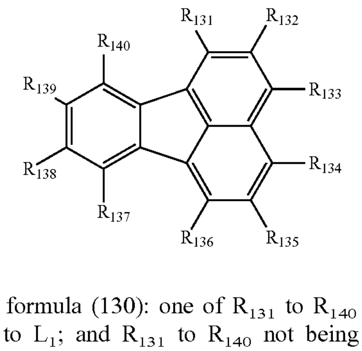

In the formula (130): one of $R_{131}$ to $R_{140}$ is a bonding position to $L_1$; and $R_{131}$ to $R_{140}$ not being the bonding position to $L_1$ each independently represent a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by $—Si(R_{901})(R_{902})(R_{903})$, a group represented by $—O—(R_{904})$, a group represented by $—S—(R_{905})$, a group represented by $—N(R_{906})(R_{907})$, a substituted or unsubstituted aralkyl group having 7 to 50 carbon atoms, a group represented by $—C(═O)R_{801}$, a group represented by $—COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

In the organic EL device according to the exemplary embodiment, $Ar_1$ is also preferably a group represented by a formula (131) or (132) below.

[Formula 42]

(131)

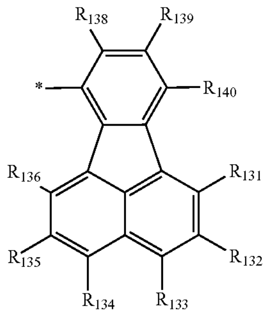

(132)

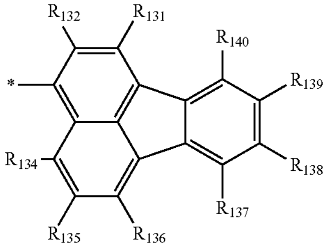

In the formulae (131) and (132): $R_{131}$ to $R_{140}$ respectively represent the same as $R_{131}$ to $R_{140}$ in the formula (130); and * represents a bonding position to $L_1$.

In the organic EL device according to the exemplary embodiment, $R_{131}$ to $R_{140}$ that are each not a bonding position to $L_1$ are preferably each independently a hydrogen atom or a substituted or unsubstituted aryl group having 6 to 14 ring carbon atoms, and more preferably a hydrogen atom or a substituted or unsubstituted phenyl group.

Group Represented by Formula (140)

[Formula 43]

(140)

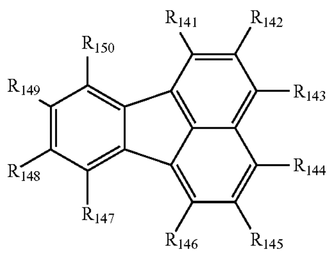

In the formula (140):

at least one combination of adjacent two or more of $R_{141}$ to $R_{150}$ are mutually bonded to form a substituted or unsubstituted monocyclic ring, or mutually bonded to form a substituted or unsubstituted fused ring;

any carbon atom selected from the group consisting of carbon atoms forming the substituted or unsubstituted monocyclic ring, carbon atoms forming the substituted or unsubstituted fused ring, and carbon atoms bonded with $R_{141}$ to $R_{150}$ is bonded to $L_1$;

$R_{141}$ to $R_{150}$ not bonded to $L_1$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a group represented by —N($R_{906}$)($R_{907}$), a substituted or unsubstituted aralkyl group having 7 to 50 carbon atoms, a group represented by —C(═O)$R_{801}$, a group represented by —COO$R_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

In the organic EL device according to the exemplary embodiment, $Ar_1$ is also preferably a group represented by a formula (141), (142), (143), or (144) below.

[Formula 44]

(141)

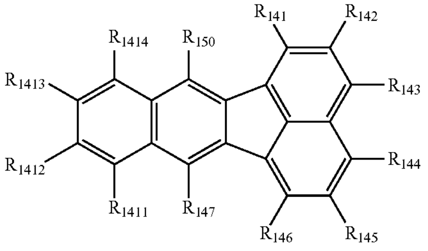

(142)

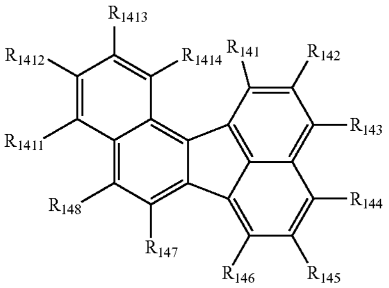

-continued (143)

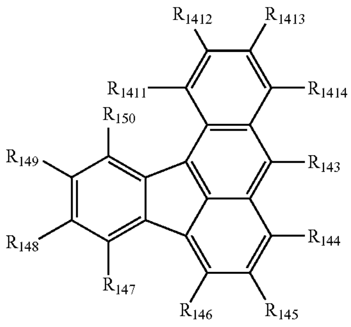

(144)

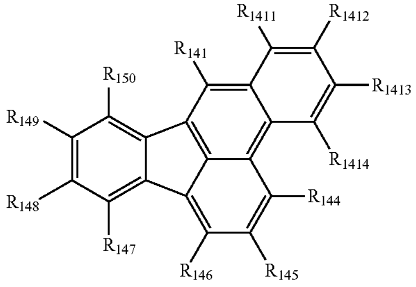

In the formulae (141) to (144): any carbon atom selected from the group consisting of carbon atoms bonded with $R_{141}$ to $R_{150}$ and $R_{1411}$ to $R_{1414}$ is bonded to $L_1$; and $R_{141}$ to $R_{150}$ and $R_{1411}$ to $R_{1414}$ not bonded to $L_1$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a group represented by —N($R_{906}$)($R_{907}$), a substituted or unsubstituted aralkyl group having 7 to 50 carbon atoms, a group represented by —C(═O)$R_{801}$, a group represented by —COO$R_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

In the organic EL device according to the exemplary embodiment, $Ar_1$ is also preferably a group represented by a formula (145), a formula (146), or a formula (147) below.

[Formula 46]

(145)

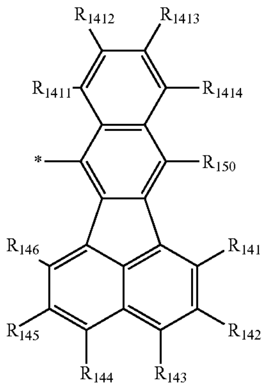

(146)

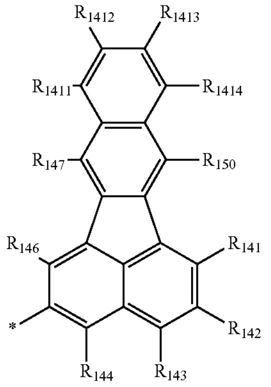

(147)

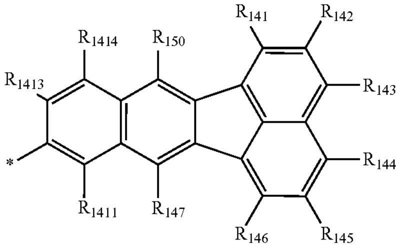

In the formulae (145) to (147): $R_{141}$ to $R_{147}$, $R_{150}$ and $R_{1411}$ to $R_{1414}$ each represent the same as $R_{141}$ to $R_{147}$, $R_{150}$ and $R_{1411}$ to $R_{1414}$ in the formula (141); and * represents a bonding position to $L_1$.

$R_{141}$ to $R_{150}$ and $R_{1411}$ to $R_{1414}$ each not being a bonding position to $L_1$ are preferably each independently a hydrogen atom or a substituted or unsubstituted aryl group having 6 to 14 ring carbon atoms, and more preferably a hydrogen atom or a substituted or unsubstituted phenyl group.

Group Represented by Formula (150)

[Formula 47]

(150)

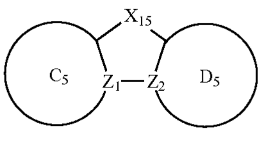

In the formula (150):

a ring $C_5$ and a ring $D_5$ are each independently a cyclic structure selected from the group consisting of a substituted or unsubstituted aryl ring having 6 to 50 ring carbon atoms, and a substituted or unsubstituted heterocyclic ring having 5 to 50 ring atoms;

at least one of the ring $C_5$ or the ring $D_5$ is a cyclic structure selected from the group consisting of a substituted or unsubstituted aryl ring having 10 to 50 ring carbon atoms, and a substituted or unsubstituted heterocyclic ring having 10 to 50 ring atoms;

$X_{15}$ is an oxygen atom, a sulfur atom, $NR_{71}$, $C(R_{72})(R_{73})$, $Si(R_{74})(R_{75})$, or $P(=O)(R_{76})$;

$Z_1$ and $Z_2$ are each independently a carbon atom or a nitrogen atom;

a combination of $R_{72}$ and $R_{73}$ are mutually bonded to form a substituted or unsubstituted monocyclic ring, mutually bonded to form a substituted or unsubstituted fused ring, or not mutually bonded;

a combination of $R_{74}$ and $R_{75}$ are mutually bonded to form a substituted or unsubstituted monocyclic ring, mutually bonded to form a substituted or unsubstituted fused ring, or not mutually bonded;

the ring $C_5$ and the ring $D_5$ are mutually bonded to form a substituted or unsubstituted monocyclic ring, mutually bonded to form a substituted or unsubstituted fused ring, or not mutually bonded;

any carbon atom selected from the group consisting of carbon atoms forming the ring $C_5$, carbon atoms forming the ring $D_5$, carbon atoms forming the substituted or unsubstituted monocyclic ring formed by mutual bonding of the ring $C_5$ and the ring $D_5$, and carbon atoms forming the substituted or unsubstituted fused ring formed by mutual bonding of the ring $C_5$ and the ring $D_5$ is bonded to $L_1$;

$R_{71}$ to $R_{76}$ forming neither the substituted or unsubstituted monocyclic ring nor the substituted or unsubstituted fused ring are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by $-Si(R_{901})(R_{902})(R_{903})$, a group represented by $-O-(R_{904})$, a group represented by $-S-(R_{905})$, a substituted or unsubstituted aralkyl group having 7 to 50 carbon atoms, a group represented by $-C(=O)R_{801}$, a group represented by $-COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms; and a group represented by the formula (150) does not have a substituted or unsubstituted pyrenyl group as a substituent.

In the organic EL device according to the exemplary embodiment, one of $Z_1$ and $Z_2$ in the formula (150) is preferably a carbon atom, and both of $Z_1$ and $Z_2$ are more preferably carbon atoms.

In the organic EL device according to the exemplary embodiment, the ring $C_5$ and the ring $D_5$ in the formula (150) are preferably each independently a cyclic structure selected from the group consisting of a substituted or unsubstituted benzene ring, a substituted or unsubstituted naphthalene ring, a substituted or unsubstituted phenanthrene ring, a substituted or unsubstituted phenalene ring, a substituted or unsubstituted pyrene ring, a substituted or unsubstituted crysene ring, a substituted or unsubstituted triphenylene ring, a substituted or unsubstituted fluorene ring, a substituted or unsubstituted benzofluorene ring, a substituted or unsubstituted dibenzofluorene ring, a substituted or unsubstituted fluoranthene ring, a substituted or unsubstituted perylene ring, a substituted or unsubstituted pyridine ring, a substituted or unsubstituted pyrimidine ring, a substituted or unsubstituted azanaphthalene ring, a substituted or unsubstituted azaanthracene ring, a substituted or unsubstituted azaphenanthrene ring, and a substituted or unsubstituted phenanthroline ring.

Group Represented by Formula (160)

[Formula 48]

(160)

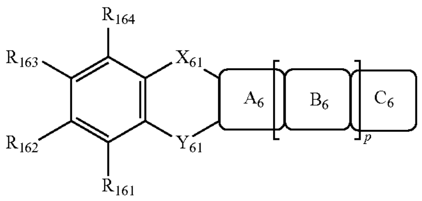

[Formula 49]

(161)

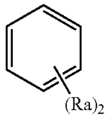

(162)

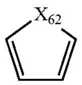

(163)

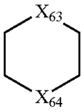

(164)

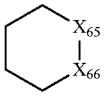

(165)

(166)

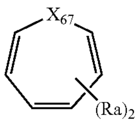

[Formula 50]

(161A)

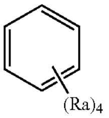

(162A)

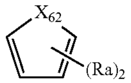

In the formula (160):

a ring $A_6$ and a ring $B_6$ are each independently a cyclic structure represented by any one of the formulae (161) to (166), the ring $A_6$ and the ring $B_6$ being fused with adjacent ring(s) at any position(s);

p is 1, 2, or 3;

when a plurality of $B_6$ are present, the plurality of $B_6$ are mutually the same or different;

a ring $C_6$ is a cyclic structure represented by any one of the formulae (161A) and (162A), the ring $C_6$ being fused with adjacent ring at any position;

$X_{61}$ is an oxygen atom, a sulfur atom, $NR_{71}$, $C(R_{72})(R_{73})$, $Si(R_{74})(R_{75})$, $P(=O)(R_{76})$, or $C=C(R_{77})(R_{78})$;

$Y_{61}$ is a single bond, an oxygen atom, a sulfur atom, $NR_{71B}$, $C(R_{72B})(R_{73B})$, $Si(R_{74B})(R_{75B})$, $P(=O)(R_{76B})$, or $C=C(R_{77B})(R_{78B})$;

a combination of $R_{72}$ and $R_{73}$ are mutually bonded to form a substituted or unsubstituted monocyclic ring, mutually bonded to form a substituted or unsubstituted fused ring, or not mutually bonded;

a combination of $R_{74}$ and $R_{75}$ are mutually bonded to form a substituted or unsubstituted monocyclic ring, mutually bonded to form a substituted or unsubstituted fused ring, or not mutually bonded;

a combination of $R_{77}$ and $R_{78}$ are mutually bonded to form a substituted or unsubstituted monocyclic ring, mutually bonded to form a substituted or unsubstituted fused ring, or not mutually bonded;

a combination of $R_{72B}$ and $R_{73B}$ are mutually bonded to form a substituted or unsubstituted monocyclic ring, mutually bonded to form a substituted or unsubstituted fused ring, or not mutually bonded;

a combination of $R_{74B}$ and $R_{75B}$ are mutually bonded to form a substituted or unsubstituted monocyclic ring, mutually bonded to form a substituted or unsubstituted fused ring, or not mutually bonded;

a combination of $R_{77B}$ and $R_{78B}$ are mutually bonded to form a substituted or unsubstituted monocyclic ring, mutually bonded to form a substituted or unsubstituted fused ring, or not mutually bonded; and at least one combination of adjacent two or more of $R_{161}$ to $R_{164}$ are mutually bonded to form a substituted or unsubstituted monocyclic ring, mutually bonded to form a substituted or unsubstituted fused ring, or not mutually bonded.

In the formulae (161) to (166) and (161A) to (162A):

$X_{62}$ to $X_{67}$ are each independently an oxygen atom, a sulfur atom, $NR_{71A}$, $C(R_{72A})(R_{73A})$, $Si(R_{74A})(R_{75A})$, $P(=O)(R_{76A})$, $C=O$, or $C=C(R_{77A})(R_{78A})$;

a combination of $R_{72A}$ and $R_{73A}$ are mutually bonded to form a substituted or unsubstituted monocyclic ring, mutually bonded to form a substituted or unsubstituted fused ring, or not mutually bonded;

a combination of $R_{74A}$ and $R_{75A}$ are mutually bonded to form a substituted or unsubstituted monocyclic ring, mutually bonded to form a substituted or unsubstituted fused ring, or not mutually bonded;

a combination of $R_{77A}$ and $R_{78A}$ are mutually bonded to form a substituted or unsubstituted monocyclic ring, mutually bonded to form a substituted or unsubstituted fused ring, or not mutually bonded;

at least one combination of adjacent two or more of a plurality of Ra are mutually bonded to form a substituted or unsubstituted monocyclic ring, mutually bonded to form a substituted or unsubstituted fused ring, or not mutually bonded;

any carbon atom selected from the group consisting of carbon atoms forming the ring $A_6$, carbon atoms forming the ring $B_6$, carbon atoms forming the ring $C_6$, and carbon atoms bonded with $R_{161}$ to $R_{164}$ is bonded to $L_1$.

In the formulae (160), (161) to (166) and (161A) to (162A):

at least one combination of adjacent two or more of $R_{161}$ to $R_{164}$ not being a bonding position to $L_1$, $R_{71}$ to $R_{78}$, $R_{71A}$ to $R_{78A}$, and $R_{71B}$ to $R_{78B}$ or a plurality of Ra are mutually bonded to form a substituted or unsubstituted monocyclic ring, mutually bonded to form a substituted or unsubstituted fused ring, or not mutually bonded;

$R_{161}$ to $R_{164}$ not being a bonding position to $L_1$ and forming neither the substituted or unsubstituted monocyclic ring nor the substituted or unsubstituted fused ring, and $R_{71}$ to $R_{78}$, $R_{71A}$ to $R_{78A}$, $R_{71B}$ to $R_{78B}$, and Ra forming neither the substituted or unsubstituted monocyclic ring nor the substituted or unsubstituted fused ring are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by $—Si(R_{901})(R_{902})(R_{903})$, a group represented by $—O—(R_{904})$, a group represented by $—S—(R_{905})$, a substituted or unsubstituted aralkyl group having 7 to 50 carbon atoms, a group represented by $—C(═O)R_{801}$, a group represented by $—COOR_{802}$, a halogen atom, a cyano group, a nitro group, a substituted or unsubstituted aryl group having 6 to 17 ring carbon atoms, a substituted or unsubstituted heterocyclic group having 5 to 17 ring atoms, or a group represented by $-(L_{900})nx-Ar_{900}$;

when a plurality of groups represented by $-(L_{900})nx-Ar_{900}$ are present, the plurality of groups represented by $-(L_{900})nx-Ar_{900}$ are mutually the same or different;

$L_{900}$ is a single bond, a substituted or unsubstituted arylene group having 6 to 17 ring carbon atoms, or a substituted or unsubstituted divalent heterocyclic group having 5 to 17 ring atoms;

$Ar_{900}$ is a substituted or unsubstituted aryl group having 6 to 17 ring carbon atoms, or a substituted or unsubstituted heterocyclic group having 5 to 17 ring atoms;

nx is 0, 1, 2, or 3;

when two or more $L_{900}$ are present, the two or more $L_{900}$ are mutually the same or different;

when two or more $Ar_{900}$ are present, the two or more $Ar_{900}$ are mutually the same or different;

a plurality of Ra are mutually the same or different;

when a plurality of $X_{62}$ are present, the plurality of $X_{62}$ are mutually the same or different;

when a plurality of $X_{63}$ are present, the plurality of $X_{63}$ are mutually the same or different;

when a plurality of $X_{64}$ are present, the plurality of $X_{64}$ are mutually the same or different;

when a plurality of $X_{65}$ are present, the plurality of $X_{65}$ are mutually the same or different;

when a plurality of $X_{66}$ are present, the plurality of $X_{66}$ are mutually the same or different;

when a plurality of $X_{67}$ are present, the plurality of $X_{67}$ are mutually the same or different;

when a plurality of $R_{71A}$ are present, the plurality of $R_{71A}$ are mutually the same or different;

when a plurality of $R_{72A}$ are present, the plurality of $R_{72A}$ are mutually the same or different;

when a plurality of $R_{73A}$ are present, the plurality of $R_{73A}$ are mutually the same or different;

when a plurality of $R_{74A}$ are present, the plurality of $R_{74A}$ are mutually the same or different;

when a plurality of $R_{75A}$ are present, the plurality of $R_{75A}$ are mutually the same or different;

when a plurality of $R_{76A}$ are present, the plurality of $R_{76A}$ are mutually the same or different;

when a plurality of $R_{77A}$ are present, the plurality of $R_{77A}$ are mutually the same or different; and when a plurality of $R_{78A}$ are present, the plurality of $R_{78A}$ are mutually the same or different.

Group Represented by Formula (170)

[Formula 51]

(170)

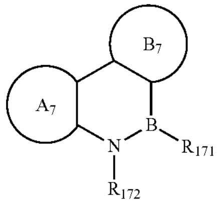

In the formula (170):

a ring $A_7$ and a ring $B_7$ are each independently a cyclic structure selected from the group consisting of a substituted or unsubstituted aryl ring having 6 to 50 ring carbon atoms, and a substituted or unsubstituted heterocyclic ring having 5 to 50 ring atoms;

the ring $A_7$ and the ring $B_7$ are mutually bonded to form a substituted or unsubstituted monocyclic ring, mutually bonded to form a substituted or unsubstituted fused ring, or not mutually bonded;

the ring $A_7$ and $R_{172}$ are mutually bonded to form a substituted or unsubstituted monocyclic ring, mutually bonded to form a substituted or unsubstituted fused ring, or not mutually bonded;

the ring $B_7$ and $R_{17}$ are mutually bonded to form a substituted or unsubstituted monocyclic ring, mutually bonded to form a substituted or unsubstituted fused ring, or not mutually bonded;

a combination of $R_{171}$ and $R_{172}$ are mutually bonded to form a substituted or unsubstituted monocyclic ring, mutually bonded to form a substituted or unsubstituted fused ring, or not mutually bonded;

$L_1$ in the formula (10) is bonded to any carbon atom selected from the group consisting of carbon atoms forming the ring $A_7$, carbon atoms forming the ring $B_7$, carbon atoms forming the substituted or unsubstituted monocyclic ring or the substituted or unsubstituted fused ring formed by mutual bonding of the ring $A_7$ and the ring $B_7$, carbon atoms forming the substituted or unsubstituted monocyclic ring or the substituted or unsubstituted fused ring formed by mutual bonding of the ring $A_7$ and $R_{172}$, carbon atoms forming the substituted or unsubstituted monocyclic ring or the substituted or unsubstituted fused ring formed by mutual bonding of the ring $B_7$ and $R_{171}$, and carbon atoms forming the substituted or unsubstituted monocyclic ring or the substituted or unsubstituted fused ring formed by mutual bonding of $R_{171}$ and $R_{172}$, $R_{171}$ and $R_{172}$ not being a bonding position to $L_1$ and forming neither the substituted or unsubstituted monocyclic ring nor the substituted or unsubstituted fused ring are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —$Si(R_{901})(R_{902})(R_{903})$, a group represented by —O—($R_{904}$), a group represented by —S—($R_{905}$), a substituted or unsubstituted aralkyl group having 7 to 50 carbon atoms, a group represented by —C(═O)$R_{801}$, a group represented by —$COOR_{802}$, a halogen atom, a cyano group, a nitro group, a substituted or unsubstituted aryl group having 6 to 17 ring carbon atoms, a substituted or unsubstituted heterocyclic group having 5 to 17 ring atoms, or a group represented by -$(L_{910})$px-$Ar_{910}$;

when a plurality of groups represented by -$(L_{910})$px-$Ar_{910}$ are present, the plurality of groups represented by -$(L_{910})$px-$Ar_{910}$ are mutually the same or different;

$L_{910}$ is a single bond, a substituted or unsubstituted arylene group having 6 to 17 ring carbon atoms, a substituted or unsubstituted divalent heterocyclic group having 5 to 17 ring atoms, or a group represented by —$Si(R_{901A})(R_{902B})$—;

$R_{901A}$ and $R_{902B}$ are each independently a hydrogen atom, a substituted or unsubstituted alkyl group having 1 to 18 carbon atoms, a substituted or unsubstituted haloalkyl group having 1 to 18 carbon atoms, a substituted or unsubstituted cycloalkyl group having 3 to 18 ring carbon atoms, a substituted or unsubstituted aryl group having 6 to 17 ring carbon atoms, or a substituted or unsubstituted heterocyclic group having 5 to 17 ring atoms;

$Ar_{910}$ is a substituted or unsubstituted aryl group having 6 to 17 ring carbon atoms, or a substituted or unsubstituted heterocyclic group having 5 to 17 ring atoms;

px is 0, 1, 2, or 3;

when two or more $L_{910}$ are present, the two or more $L_{910}$ are mutually the same or different; and when two or more $Ar_{910}$ are present, the two or more $Ar_{910}$ are mutually the same or different.

Group Represented by Formula (171)

[Formula 52]

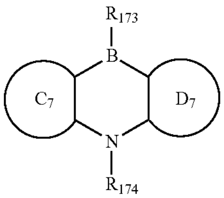

(171)

In the formula (171):

a ring $C_7$ and a ring $D_7$ are each independently a cyclic structure selected from the group consisting of a substituted or unsubstituted aryl ring having 6 to 50 ring carbon atoms, and a substituted or unsubstituted heterocyclic ring having 5 to 50 ring atoms;

$R_{173}$ and at least one of the ring $C_7$ or the ring $D_7$ are mutually bonded to form a substituted or unsubstituted monocyclic ring, mutually bonded to form a substituted or unsubstituted fused ring, or not mutually bonded;

$R_{174}$ and at least one of the ring $C_7$ or the ring $D_7$ are mutually bonded to form a substituted or unsubstituted monocyclic ring, mutually bonded to form a substituted or unsubstituted fused ring, or not mutually bonded;

$L_1$ in the formula (10) is bonded to any carbon atom selected from the group consisting of carbon atoms forming the ring $C_7$, carbon atoms forming the ring $D_7$, carbon atoms forming the substituted or unsubstituted monocyclic ring or the substituted or unsubstituted fused ring formed by mutual bonding of $R_{173}$ and at least one of the ring $C_7$ or the ring $D_7$, and carbon atoms forming the substituted or unsubstituted monocyclic ring or the substituted or unsubstituted fused ring formed by mutual bonding of $R_{174}$ and at least one of the ring $C_7$ or the ring $D_7$; and $R_{173}$ to $R_{174}$ not being a bonding position to $L_1$ and forming neither the substituted or unsubstituted monocyclic ring nor the substituted or unsubstituted fused ring each independently represent the same as $R_{171}$ and $R_{172}$ in the formula (170).

Group Represented by Formula (180)

[Formula 53]

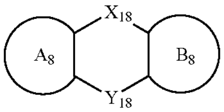

(180)

In the formula (180):

a ring $A_8$ and a ring $B_8$ are each independently a cyclic structure selected from the group consisting of a substituted or unsubstituted aryl ring having 6 to 50 ring carbon atoms, and a substituted or unsubstituted heterocyclic ring having 5 to 50 ring atoms;

$X_{18}$ is an oxygen atom, a sulfur atom, $NR_{71}$, $C(R_{72})(R_{73})$, $Si(R_{74})(R_{75})$, or P(═O)($R_{76}$);

$Y_{18}$ is a sulfur atom, $NR_{71A}$, $C(R_{72A})(R_{73A})$, $Si(R_{74A})(R_{75A})$, or P(═O)($R_{76A}$).

a combination of $R_{72}$ and $R_{73}$ are mutually bonded to form a substituted or unsubstituted monocyclic ring, mutually bonded to form a substituted or unsubstituted fused ring, or not mutually bonded;

a combination of $R_{74}$ and $R_{75}$ are mutually bonded to form a substituted or unsubstituted monocyclic ring, mutually bonded to form a substituted or unsubstituted fused ring, or not mutually bonded;

at least one of $R_{71}$ to $R_{76}$ and at least one of the ring $A_8$ or the ring $B_8$ are mutually bonded to form a substituted or unsubstituted monocyclic ring, mutually bonded to form a substituted or unsubstituted fused ring, or not mutually bonded;

a combination of $R_{72A}$ and $R_{73A}$ are mutually bonded to form a substituted or unsubstituted monocyclic ring, mutually bonded to form a substituted or unsubstituted fused ring, or not mutually bonded;

a combination of $R_{74A}$ and $R_{75A}$ are mutually bonded to form a substituted or unsubstituted monocyclic ring, mutually bonded to form a substituted or unsubstituted fused ring, or not mutually bonded;

at least one of $R_{71A}$ to $R_{76A}$ and at least one of the ring $A_8$ or the ring $B_8$ are mutually bonded to form a substituted or unsubstituted monocyclic ring, mutually bonded to form a substituted or unsubstituted fused ring, or not mutually bonded;

when $X_{18}$ is an oxygen atom and $Y_{18}$ is $C(R_{72A})(R_{73A})$, a ring formed by bonding $R_{72A}$ with the ring $A_8$ or the ring $B_8$ is not a substituted or unsubstituted benzene ring, and a ring formed by bonding $R_{73A}$ with the ring $A_8$ or the ring $B_8$ is not a substituted or unsubstituted benzene ring;

$L_1$ in the formula (10) is bonded to any carbon atom selected from the group consisting of carbon atoms forming the ring $A_8$, carbon atoms forming the ring $B_8$, carbon atoms forming the substituted or unsubstituted monocyclic ring or the substituted or unsubstituted fused ring formed by mutual bonding of at least one of $R_{71}$ to $R_{76}$ and at least one of the ring $A_8$ or the ring $B_8$, and carbon atoms forming the substituted or unsubstituted monocyclic ring or the substituted or unsubstituted fused ring formed by mutual bonding of at least one of $R_{71A}$ to $R_{76A}$ and at least one of the ring $A_8$ or the ring $B_8$; and $R_{71}$ to $R_{76}$ and $R_{71A}$ to $R_{76A}$ not being a bonding position to $L_1$ and forming neither the substituted or unsubstituted monocyclic ring nor the substituted or unsubstituted fused ring are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by $-Si(R_{901})(R_{902})(R_{903})$, a group represented by $-O-(R_{904})$, a group represented by $-S-(R_{905})$, a substituted or unsubstituted aralkyl group having 7 to 50 carbon atoms, a group represented by $-C(=O)R_{801}$, a group represented by $-COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

Group Represented by Formula (190)

[Formula 54]

(190)

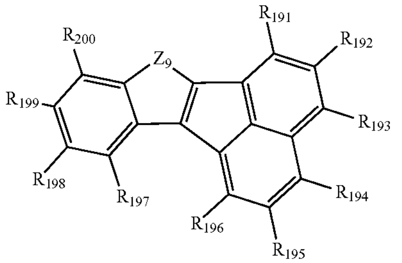

In the formula (190):

$Z_9$ is an oxygen atom, a sulfur atom, $NR_{71}$, $C(R_{72})(R_{73})$, $Si(R_{74})(R_{75})$, or $P(=O)(R_{76})$;

a combination of $R_{72}$ and $R_{73}$ are mutually bonded to form a substituted or unsubstituted monocyclic ring, mutually bonded to form a substituted or unsubstituted fused ring, or not mutually bonded;

a combination of $R_{74}$ and $R_{75}$ are mutually bonded to form a substituted or unsubstituted monocyclic ring, mutually bonded to form a substituted or unsubstituted fused ring, or not mutually bonded;

at least one combination of adjacent two or more of $R_{191}$ to $R_{196}$ are mutually bonded to form a substituted or unsubstituted monocyclic ring, mutually bonded to form a substituted or unsubstituted fused ring, or not mutually bonded;

at least one combination of adjacent two or more of $R_{197}$ to $R_{200}$ are mutually bonded to form a substituted or unsubstituted monocyclic ring, mutually bonded to form a substituted or unsubstituted fused ring, or not mutually bonded;

$L_1$ in the formula (10) is bonded to any carbon atom selected from the group consisting of carbon atom bonded with $R_{191}$ to $R_{200}$, carbon atoms forming the substituted or unsubstituted monocyclic ring or the substituted or unsubstituted fused ring formed by mutually bonding a combination of adjacent two or more of $R_{191}$ to $R_{196}$, and carbon atoms forming the substituted or unsubstituted monocyclic ring or the substituted or unsubstituted fused ring formed by mutually bonding a combination of adjacent two or more of $R_{197}$ to $R_{200}$;

$R_{191}$ to $R_{200}$ and $R_{71}$ to $R_{76}$ not being a bonding position to $L_1$ and forming neither the substituted or unsubstituted monocyclic ring nor the substituted or unsubstituted fused ring are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by $-Si(R_{901})(R_{902})(R_{903})$, a group represented by $-O-(R_{904})$, a group represented by $-S-(R_{905})$, a substituted or unsubstituted aralkyl group having 7 to 50 carbon atoms, a group represented by $-C(=O)R_{801}$, a group represented by $-COOR_{802}$, a halogen atom, a cyano group, a nitro group, a substituted or unsubstituted aryl group having 6 to 17 ring carbon atoms, a substituted or unsubstituted heterocyclic group having 5 to 17 ring atoms, or a group represented by $-(L_{920})qx-Ar_{920}$;

when a plurality of groups represented by $-(L_{920})qx-Ar_{920}$ are present, the plurality of groups represented by $-(L_{920})qx-Ar_{920}$ are mutually the same or different;

$L_{920}$ is a single bond, a substituted or unsubstituted arylene group having 6 to 17 ring carbon atoms, or a substituted or unsubstituted divalent heterocyclic group having 5 to 17 ring atoms;

$Ar_{920}$ is a substituted or unsubstituted aryl group having 6 to 17 ring carbon atoms, or a substituted or unsubstituted heterocyclic group having 5 to 17 ring atoms;

qx is 0, 1, 2, or 3;

when two or more $L_{920}$ are present, the two or more $L_{920}$ are mutually the same or different; and when two or more $Ar_{920}$ are present, the two or more $Ar_{920}$ are mutually the same or different.

Group Represented by Formula (114)

[Formula 55]

(114)

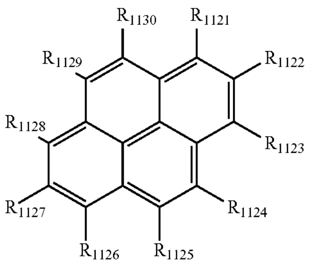

(115)

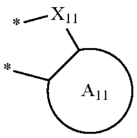

In the formula (114):

at least one combination of a combination of $R_{1121}$ and $R_{1122}$, a combination of $R_{1122}$ and $R_{1123}$, a combination of $R_{1124}$ and $R_{1125}$, a combination of $R_{1126}$ and $R_{1127}$, a combination of $R_{1127}$ and $R_{1128}$, or a combination of $R_{1129}$ and $R_{1130}$ are mutually bonded to form a ring represented by the formula (115);

$L_1$ in the formula (10) is bonded to any carbon atom selected from the group consisting of carbon atoms forming the ring $A_{11}$ and carbon atoms bonded with $R_{1121}$ to $R_{1130}$;

$R_{1121}$ to $R_{1130}$ not being bonded to $L_1$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a substituted or unsubstituted aralkyl group having 7 to 50 carbon atoms, a group represented by —C(=O)$R_{801}$, a group represented by —COO$R_{802}$, a halogen atom, a cyano group, a nitro group, a substituted or unsubstituted aryl group having 6 to 17 ring carbon atoms, a substituted or unsubstituted heterocyclic group having 5 to 17 ring atoms, or a group represented by -($L_{930}$)rx-$Ar_{930}$;

when a plurality of groups represented by -($L_{930}$)rx-$Ar_{930}$ are present, the plurality of groups represented by -($L_{930}$)rx-$Ar_{930}$ are mutually the same or different;

$L_{930}$ is a single bond, a substituted or unsubstituted arylene group having 6 to 17 ring carbon atoms, or a substituted or unsubstituted divalent heterocyclic group having 5 to 17 ring atoms;

$Ar_{93}0$ is a substituted or unsubstituted aryl group having 6 to 17 ring carbon atoms, or a substituted or unsubstituted heterocyclic group having 5 to 17 ring atoms;

rx is 0, 1, 2, or 3;

when two or more $L_{930}$ are present, the two or more $L_{930}$ are mutually the same or different;

when two or more $Ar_{930}$ are present, the two or more $Ar_{930}$ are mutually the same or different; and two * in the formula (115) represent bonding positions to carbon atoms of a pyrene ring.

In the formula (115):

a ring $A_{11}$ is a cyclic structure selected from the group consisting of a substituted or unsubstituted aryl ring having 6 to 50 ring carbon atoms, and a substituted or unsubstituted heterocyclic ring having 5 to 50 ring atoms;

$X_{11}$ is an oxygen atom, a sulfur atom, $NR_{71}$, C($R_{72}$)($R_{73}$), Si($R_{74}$)($R_{75}$), or P(=O)($R_{76}$);

a combination of $R_{72}$ and $R_{73}$ are mutually bonded to form a substituted or unsubstituted monocyclic ring, mutually bonded to form a substituted or unsubstituted fused ring, or not mutually bonded;

a combination of $R_{74}$ and $R_{75}$ are mutually bonded to form a substituted or unsubstituted monocyclic ring, mutually bonded to form a substituted or unsubstituted fused ring, or not mutually bonded; and $R_{71}$ to $R_{76}$ forming neither the substituted or unsubstituted monocyclic ring nor the substituted or unsubstituted fused ring each independently represent the same as $R_{1121}$ to $R_{1130}$ in the formula (114).

A compound represented by the formula (1) may be a compound in which $Ar_1$ is not a substituted or unsubstituted pyrenyl group.

In the first host material according to the exemplary embodiment, the groups specified to be "substituted or unsubstituted" are each preferably an "unsubstituted" group.

Production Method of First Host Material

The first compound as the first host material can be produced by application of known substitution reactions and materials depending on a target compound, according to a synthesis method described in Examples described later or in a similar manner as the synthesis method.

Specific Examples of First Host Material

Specific examples of the first compound as the first host material include the following compounds. It should however be noted that the invention is not limited to the specific examples of the first compound.

In the specific examples of the compounds herein, D represents a deuterium atom, Me represents a methyl group, and tBu represents a tert-butyl group.

[Formula 256]
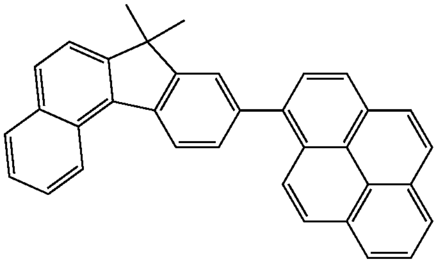
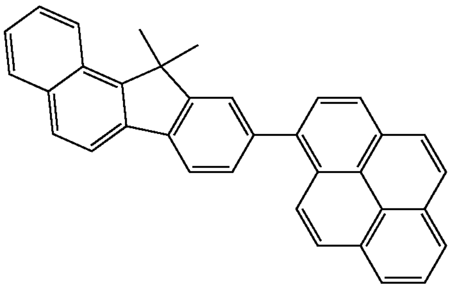
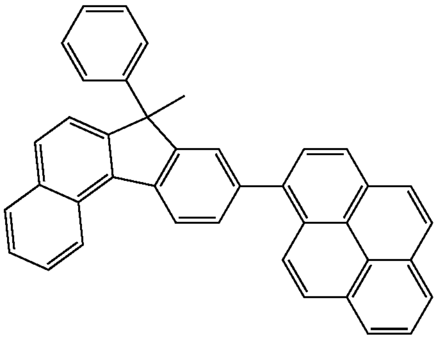
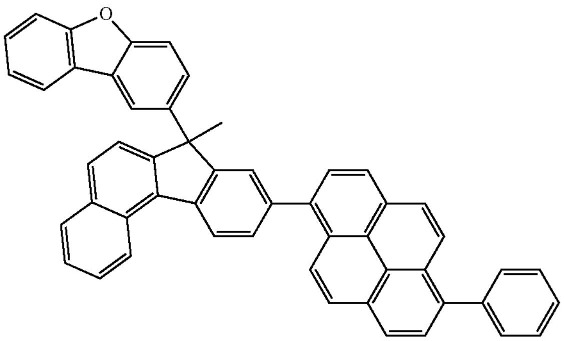
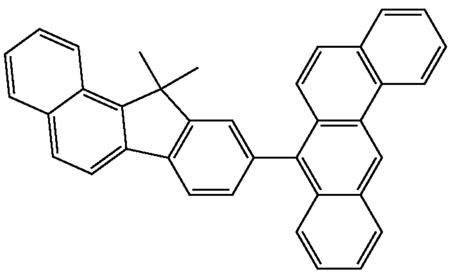
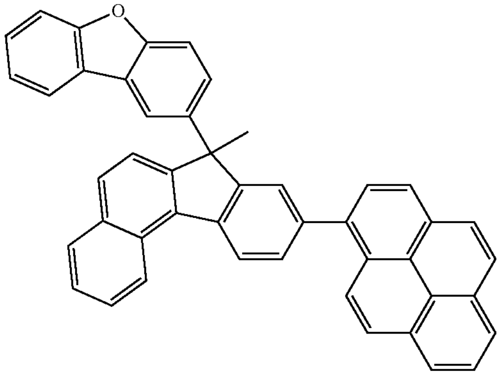
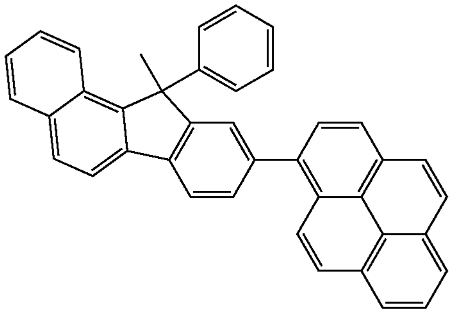
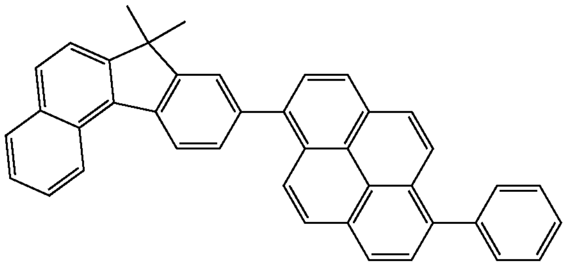
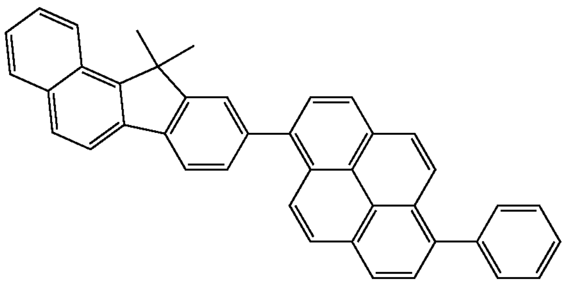
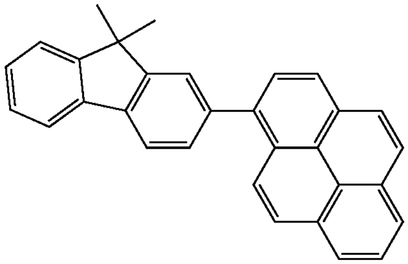

-continued
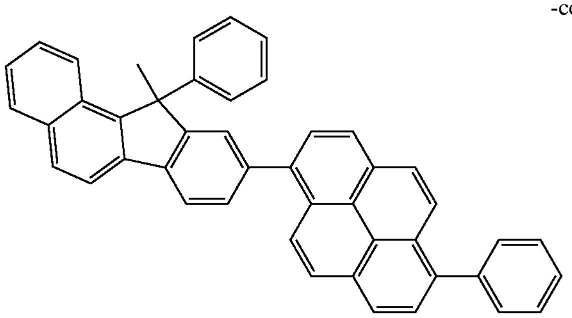
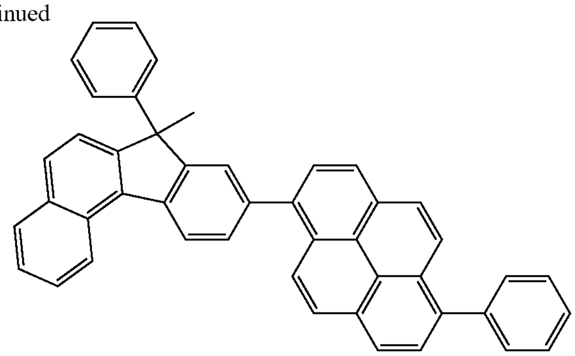
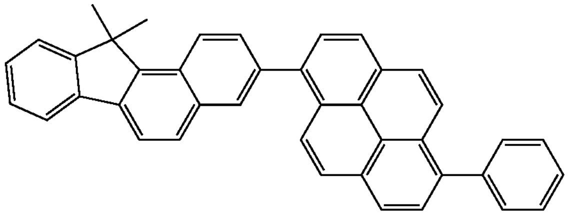
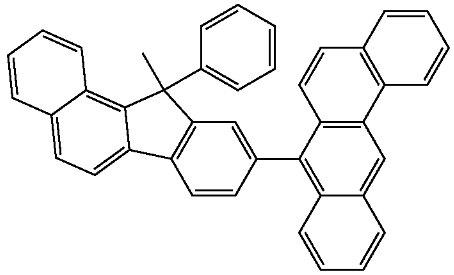
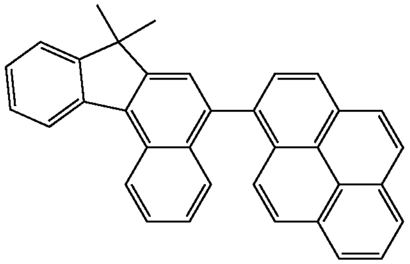
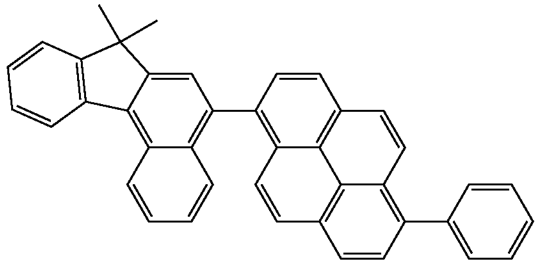
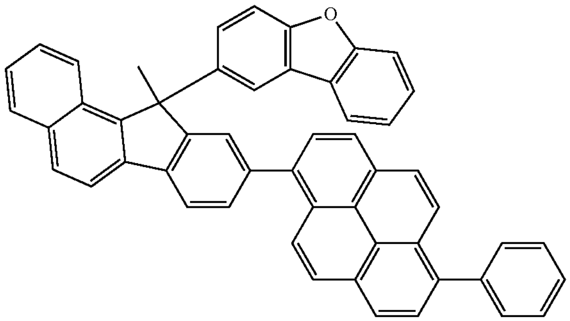
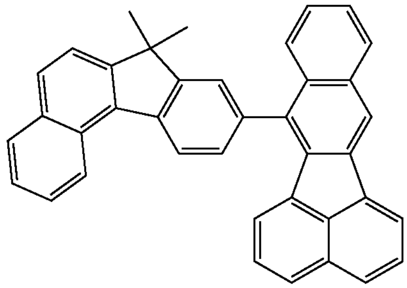
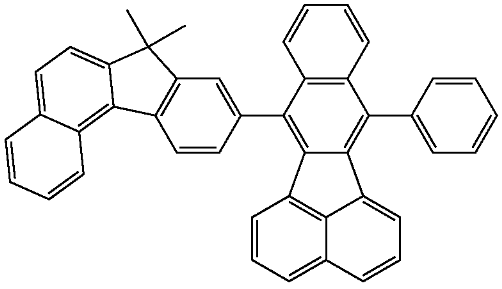
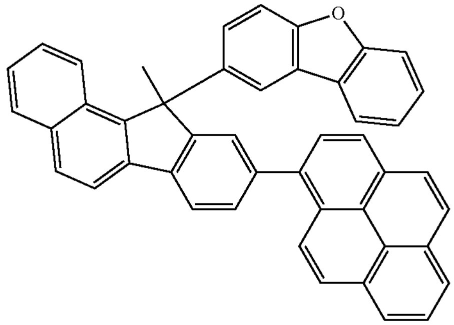

-continued
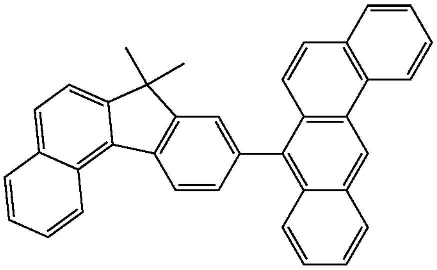
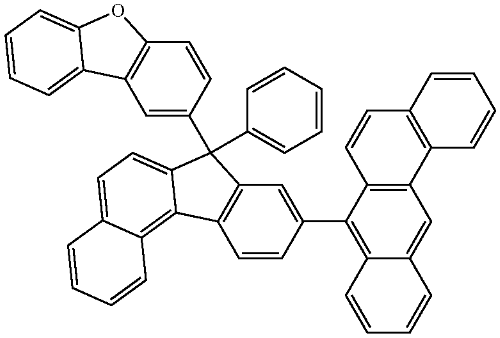
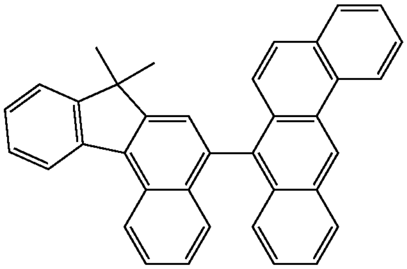
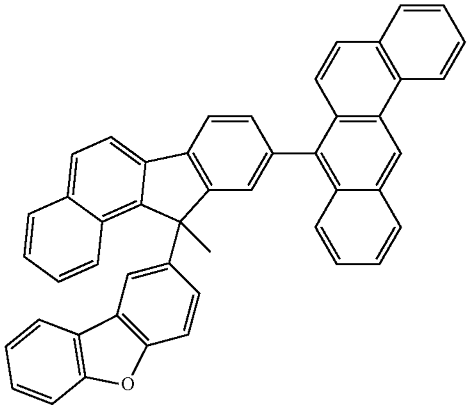
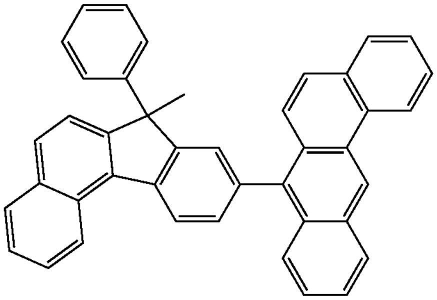
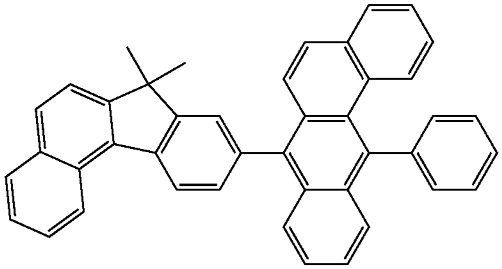
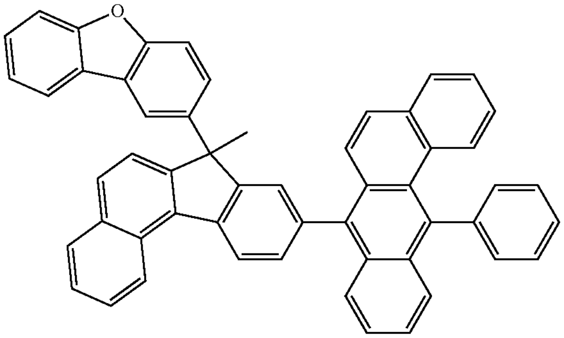
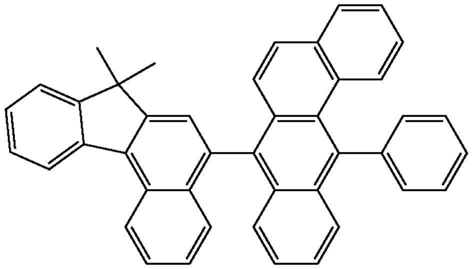

-continued
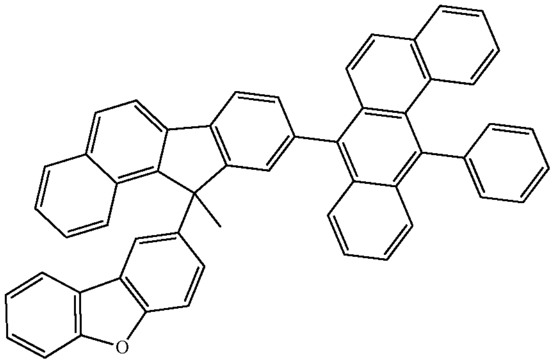
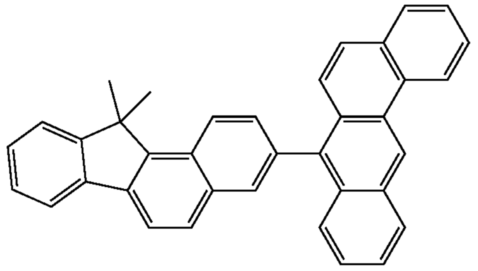
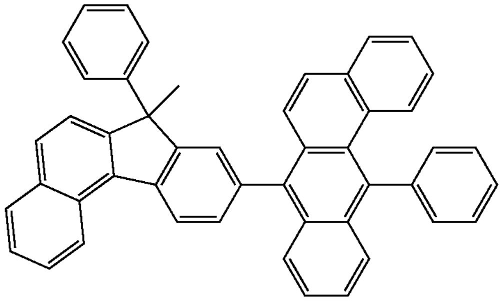
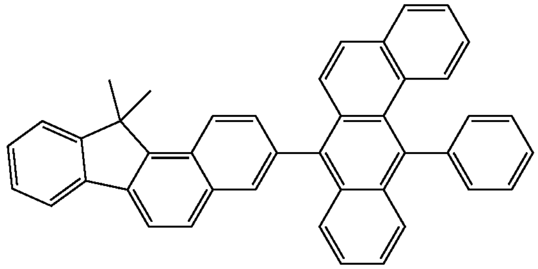
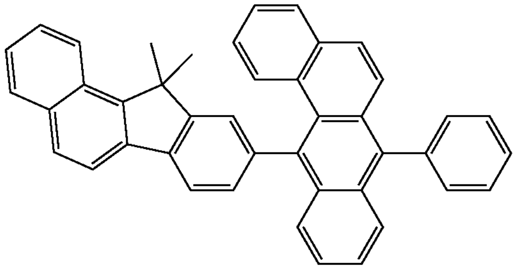
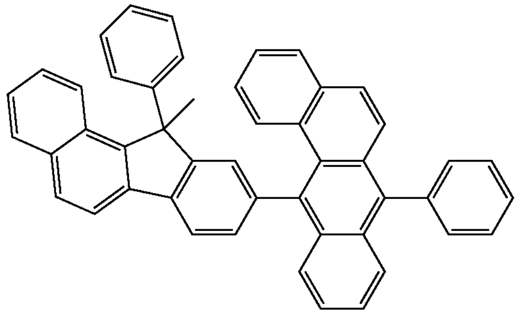
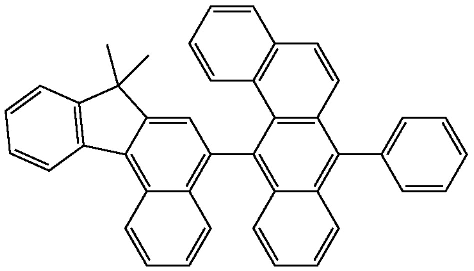
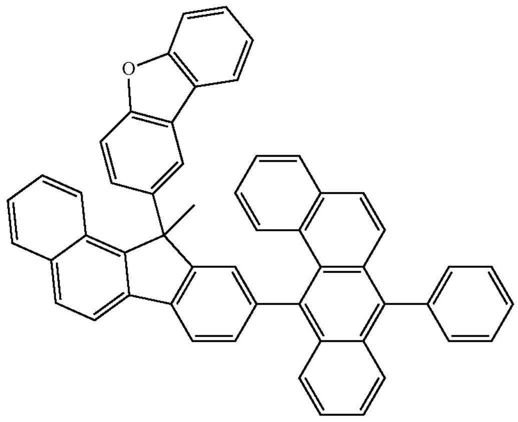
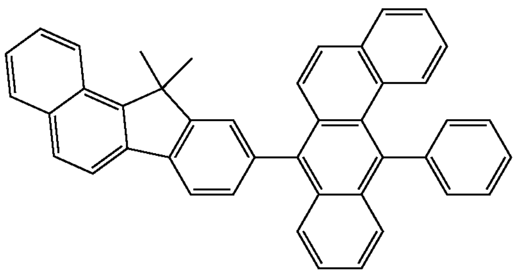
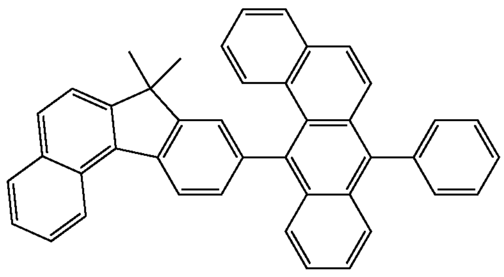

-continued
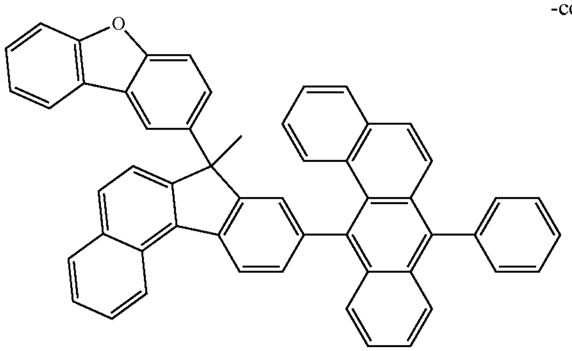
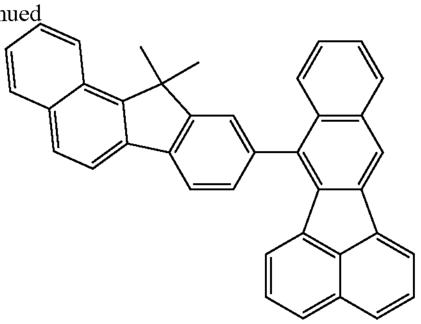
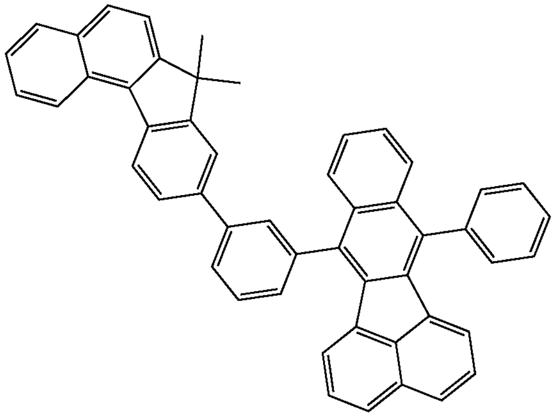
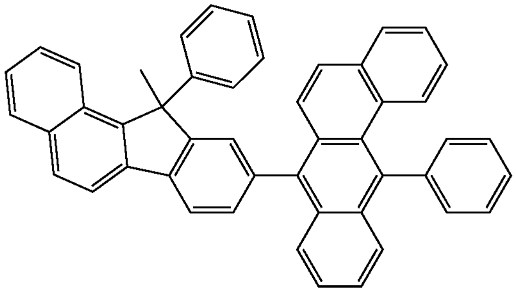
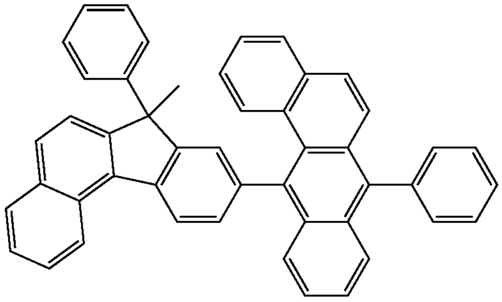
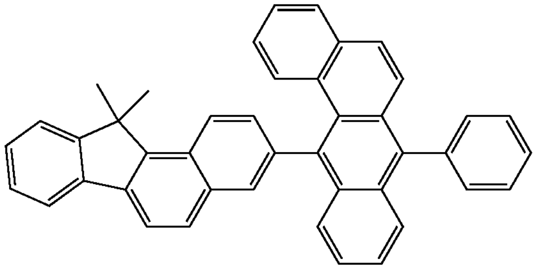
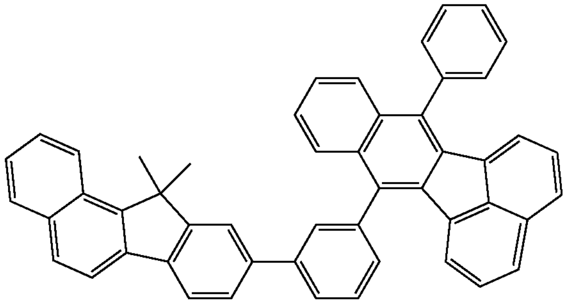
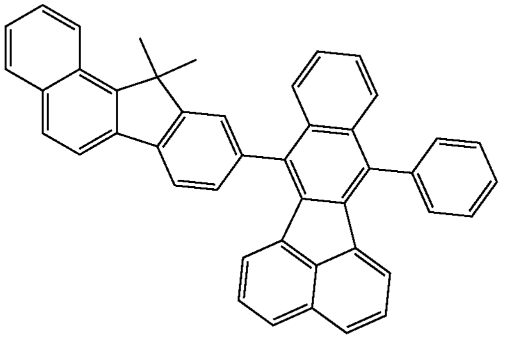

-continued
[Formula 57]
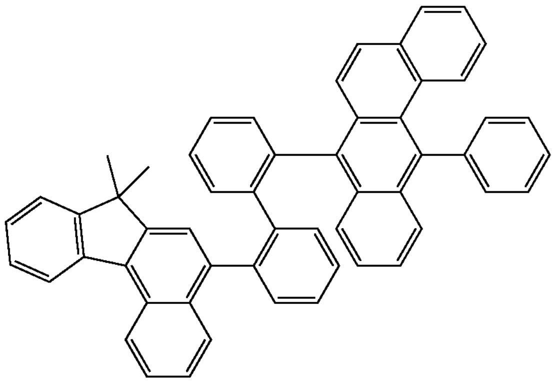
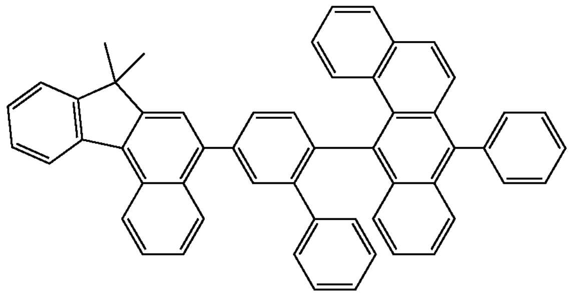
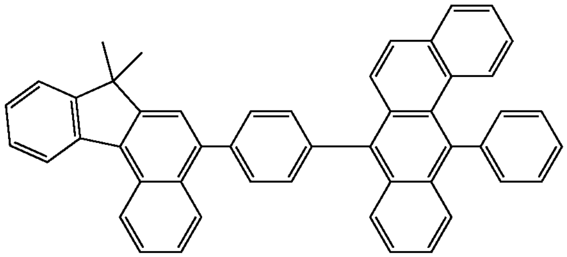
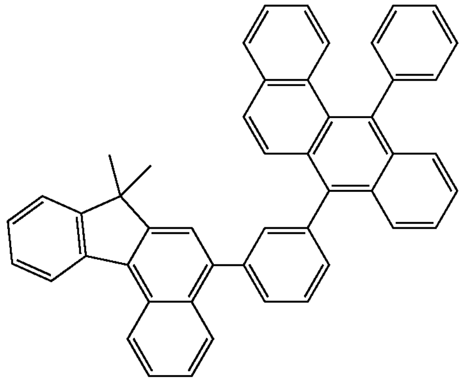
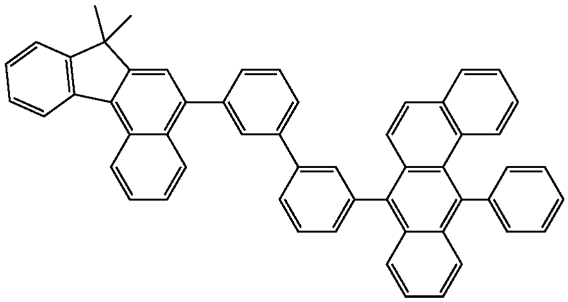
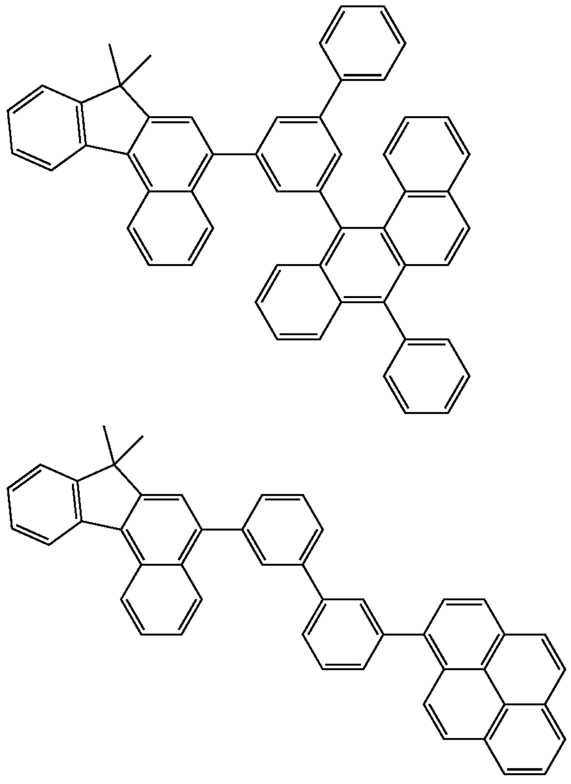
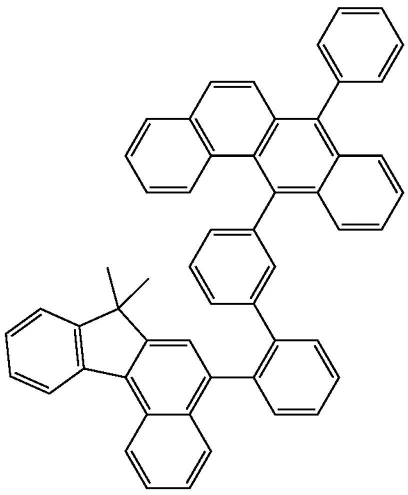

-continued
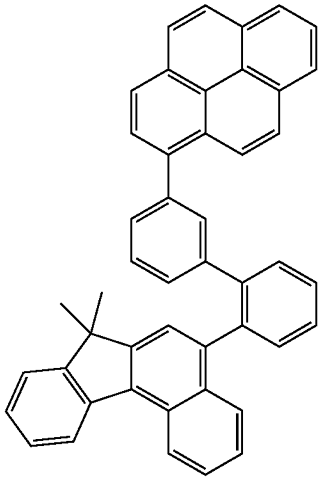
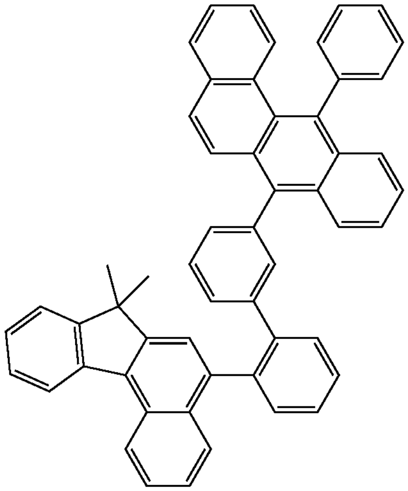
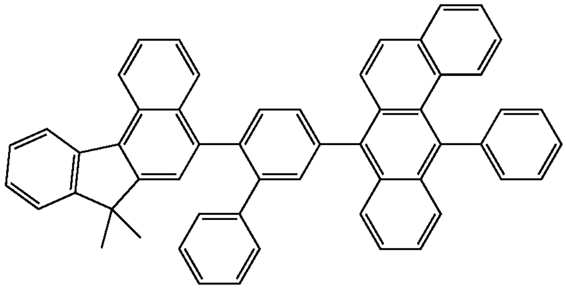
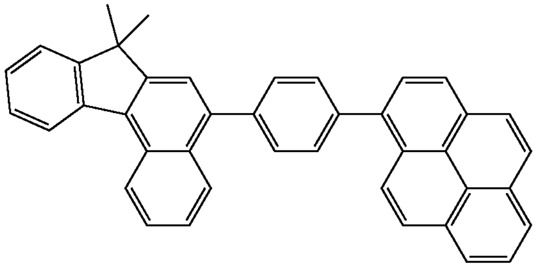
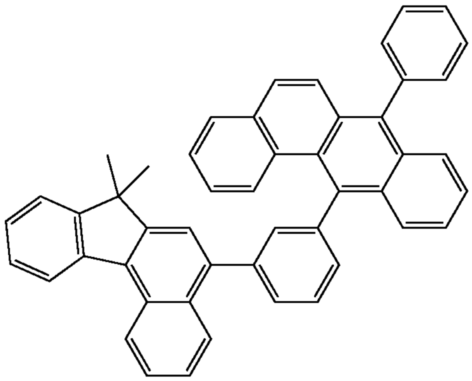
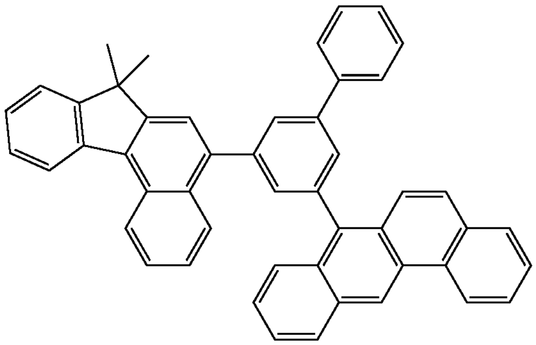
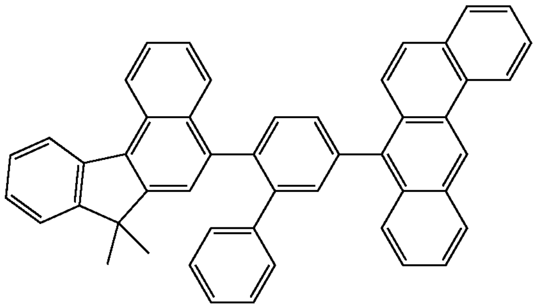
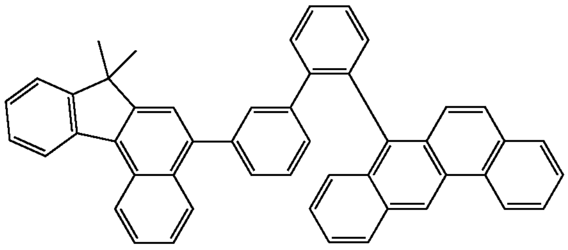

-continued
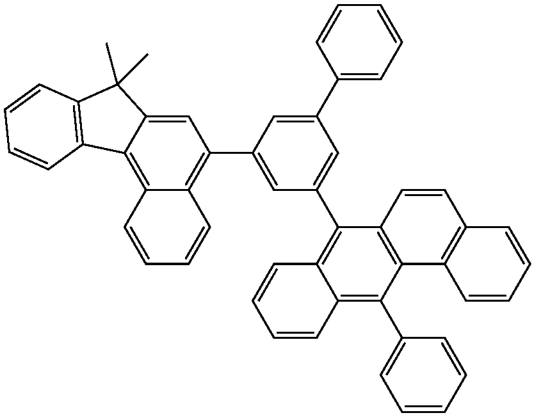
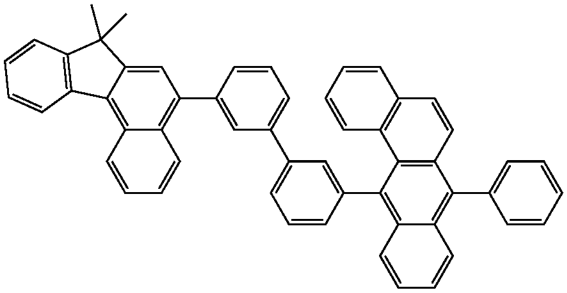
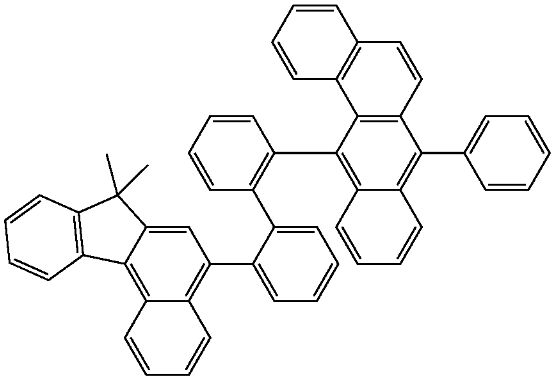
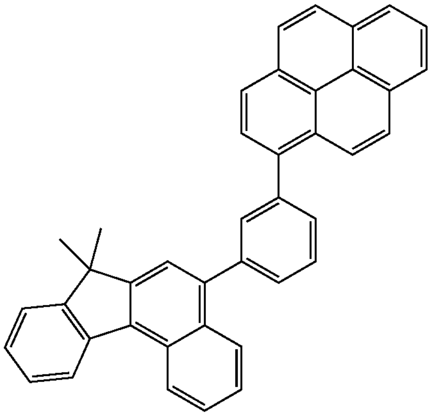
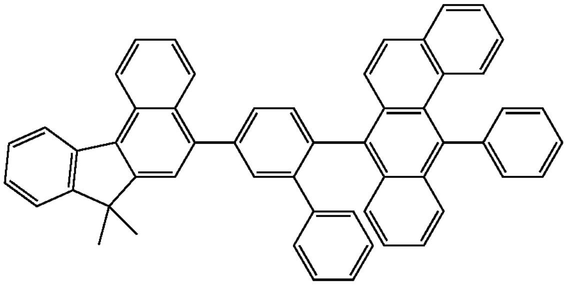
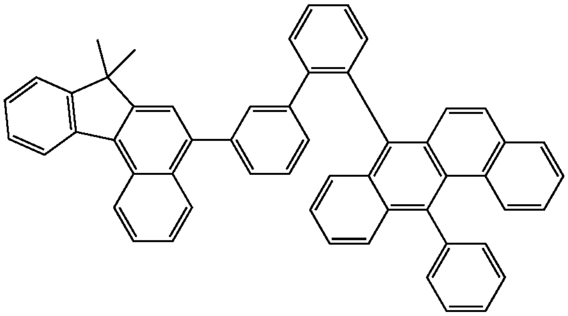
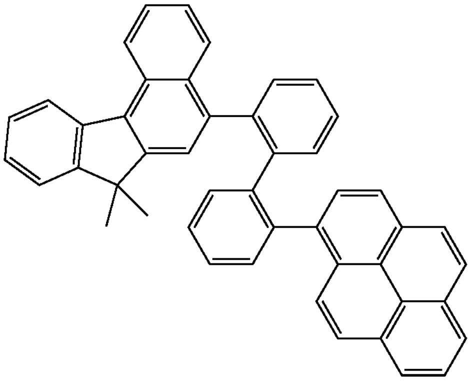

-continued
[Formula 58]
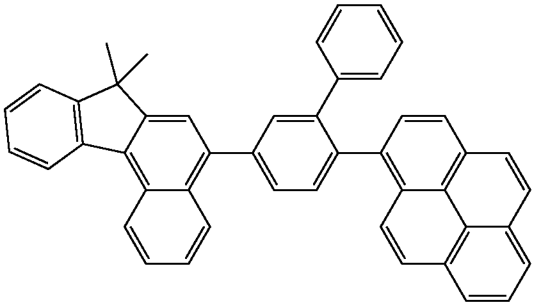
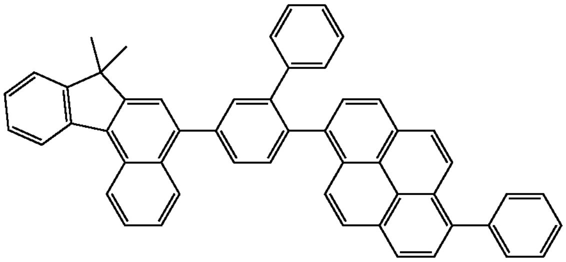
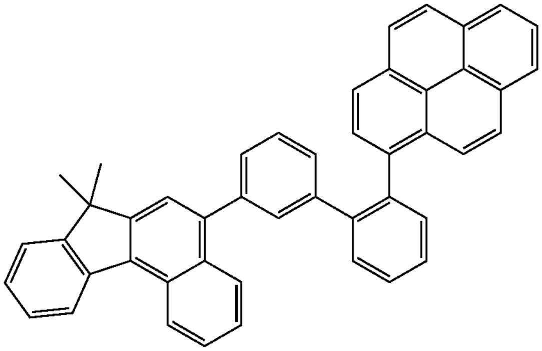
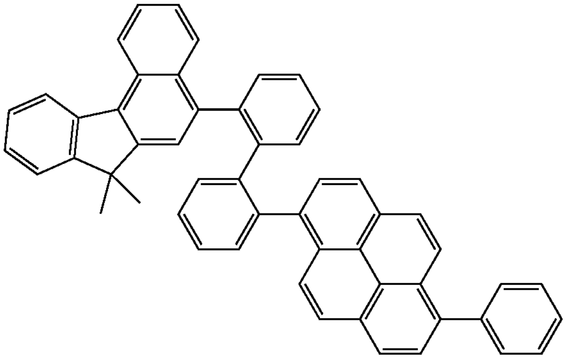
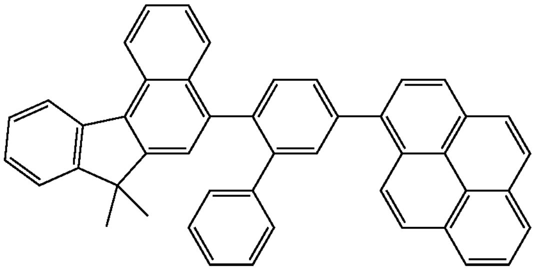
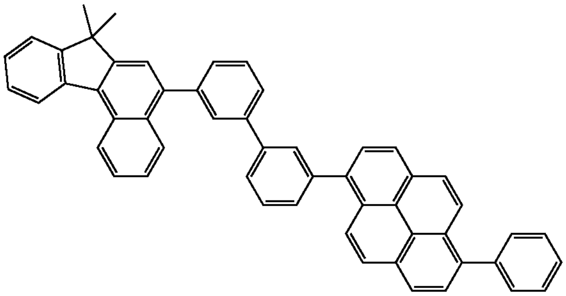
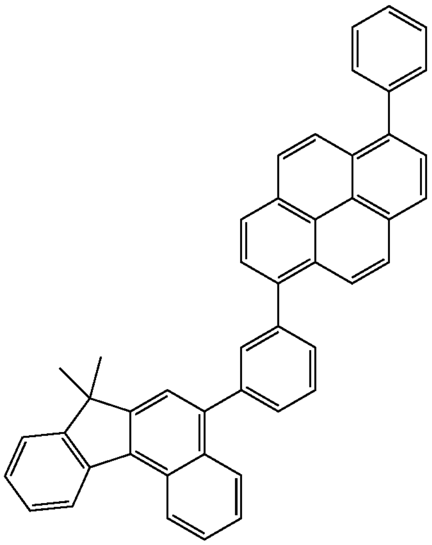
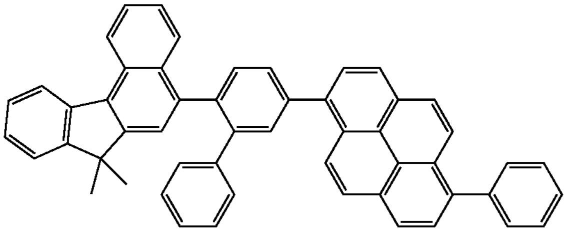

-continued
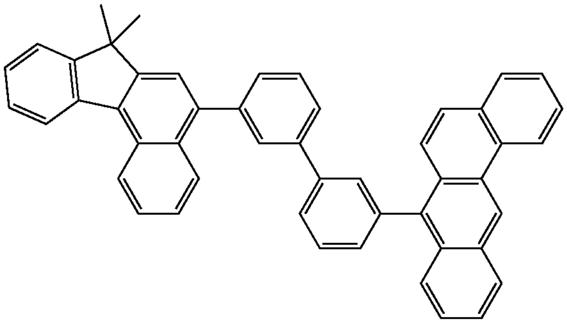
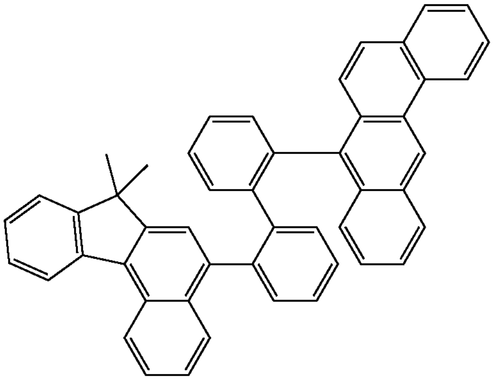
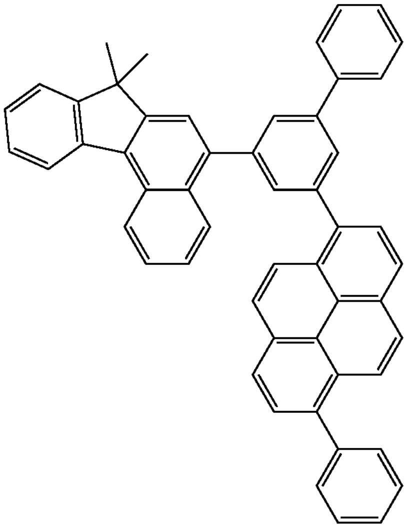
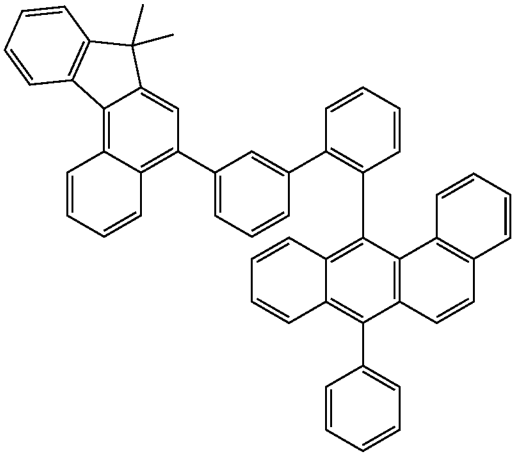
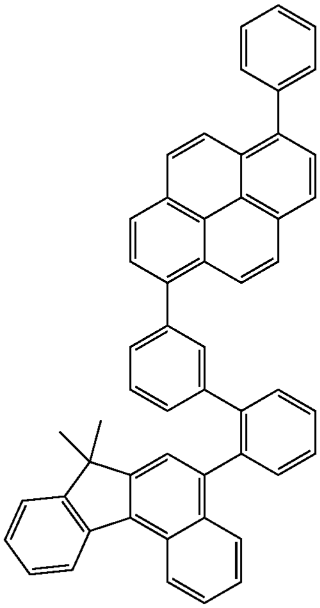
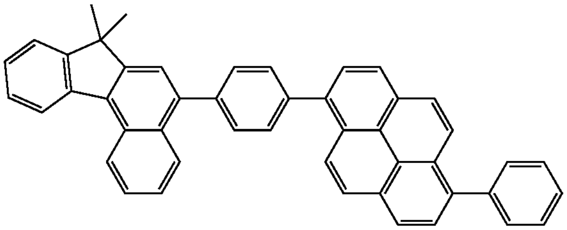

-continued
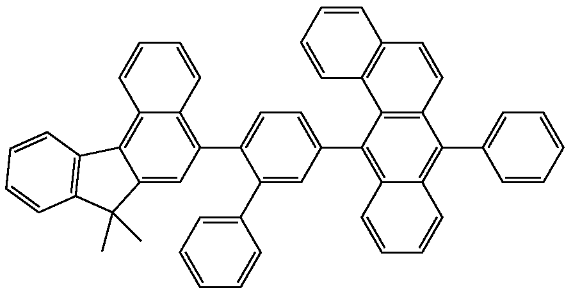
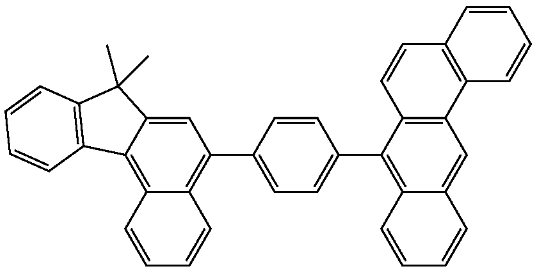
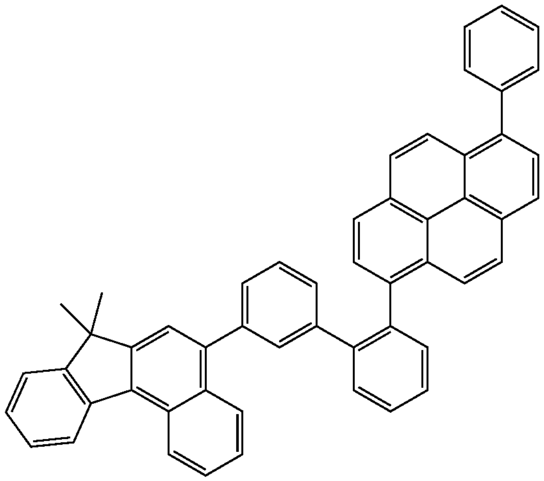
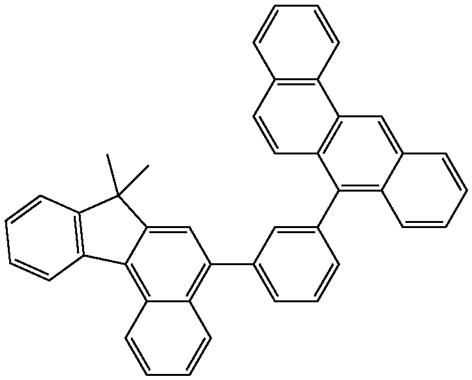
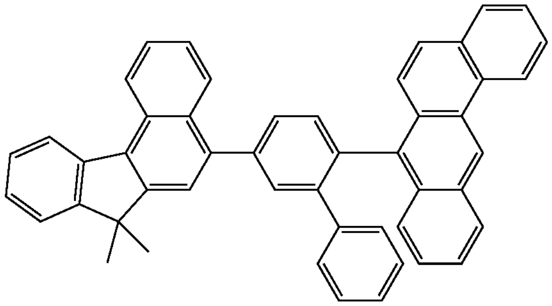
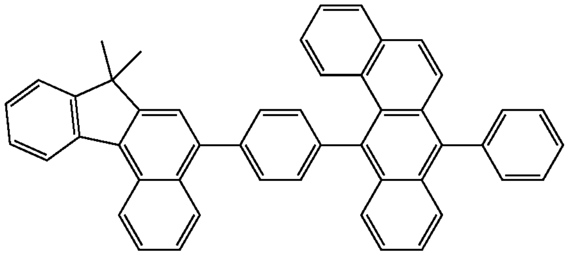
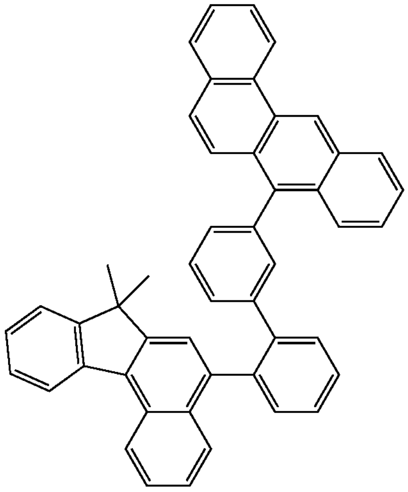
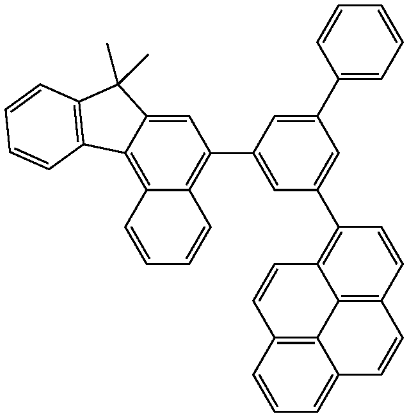

-continued
[Formula 59]
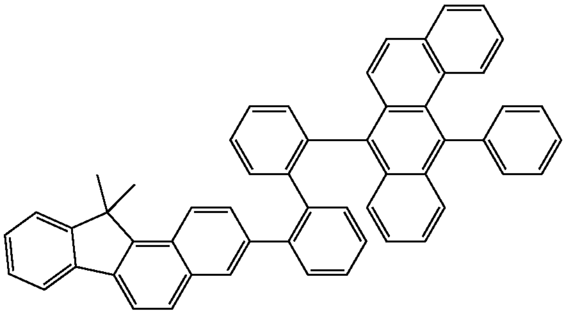
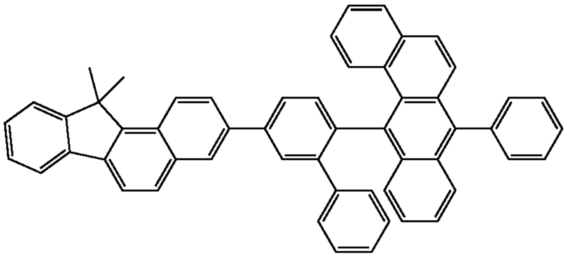
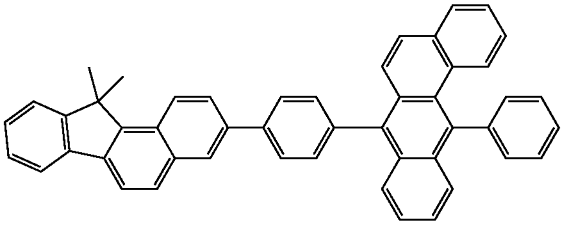
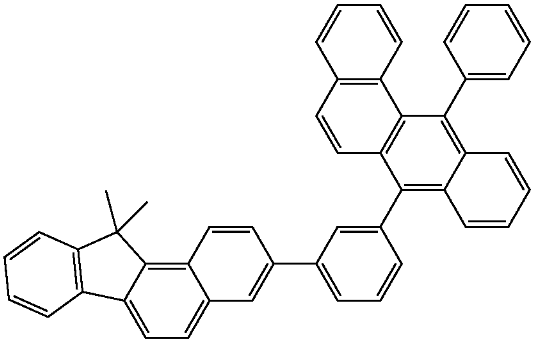
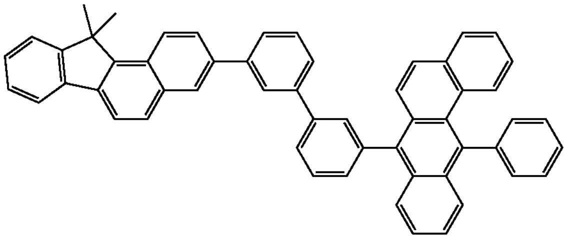
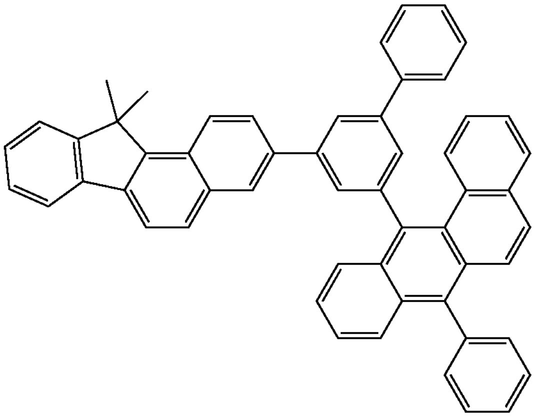
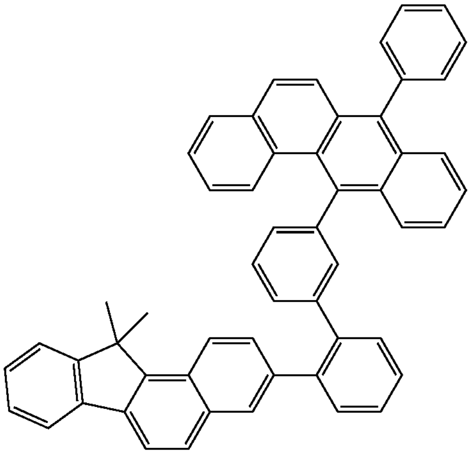
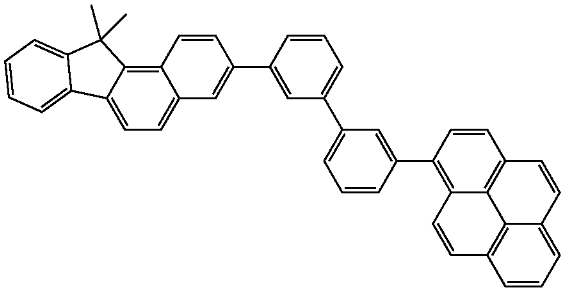

-continued
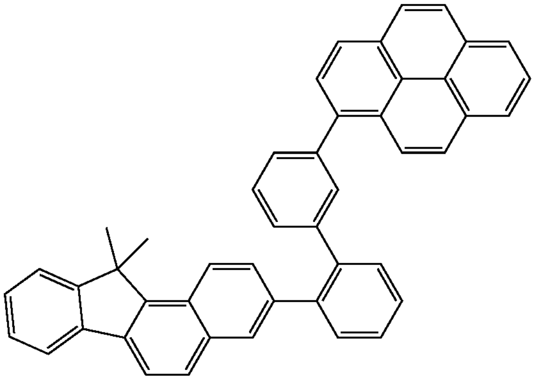
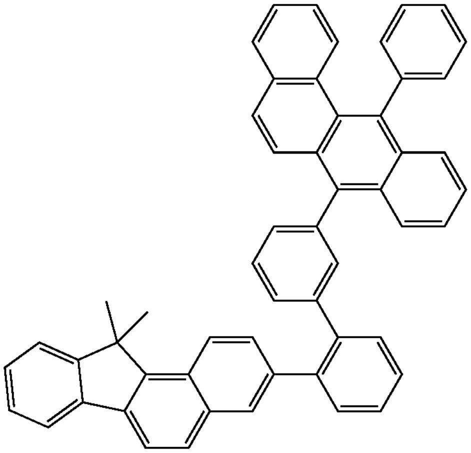
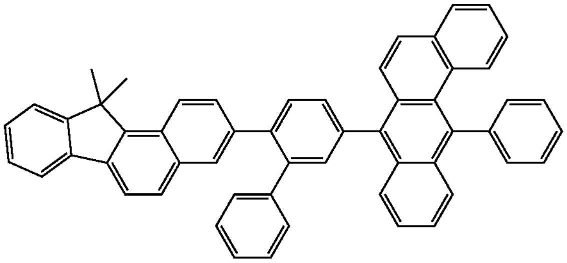
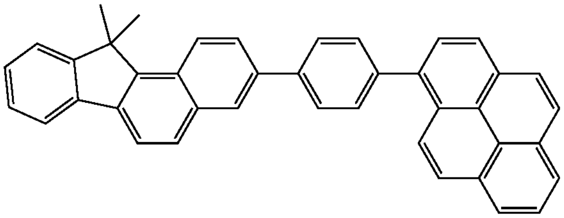
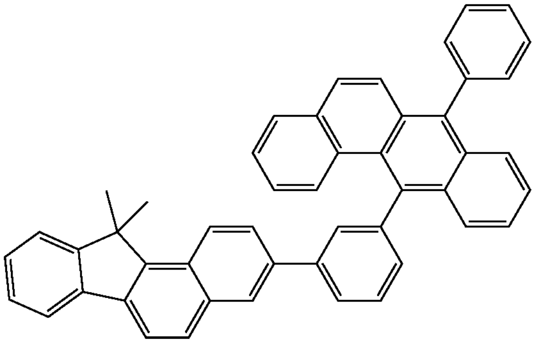
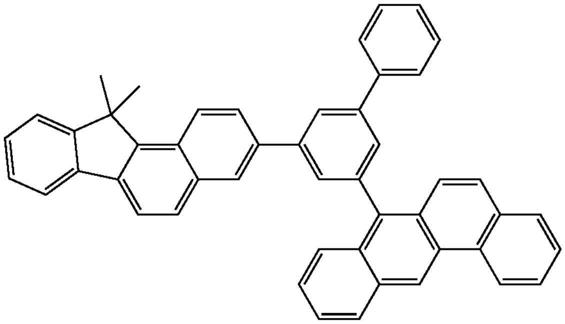
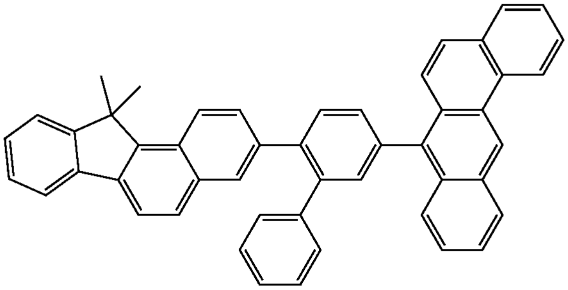

-continued
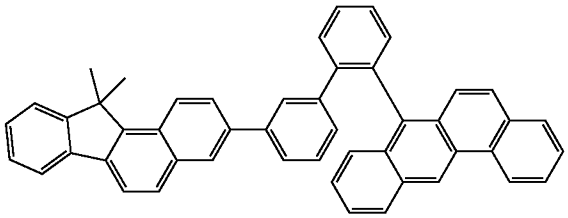
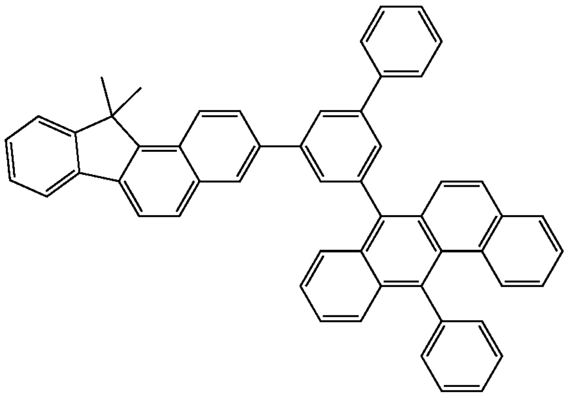
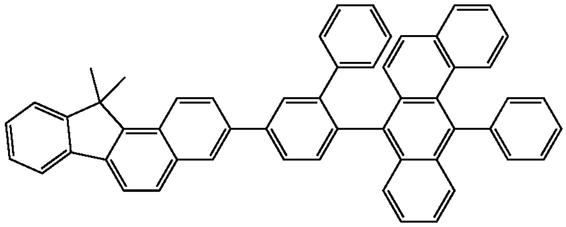
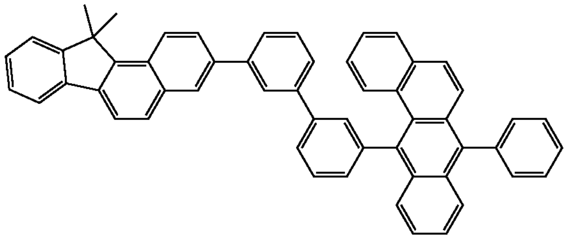
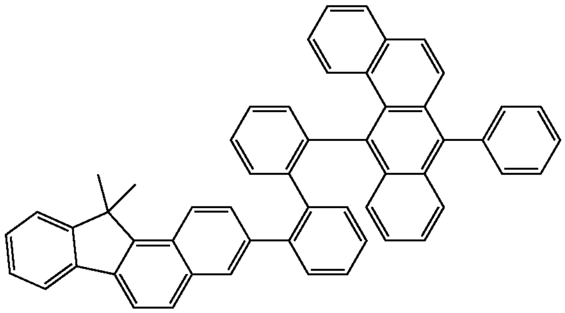
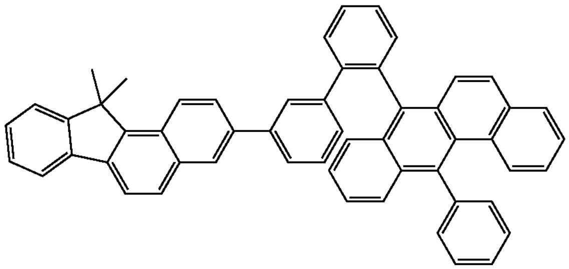
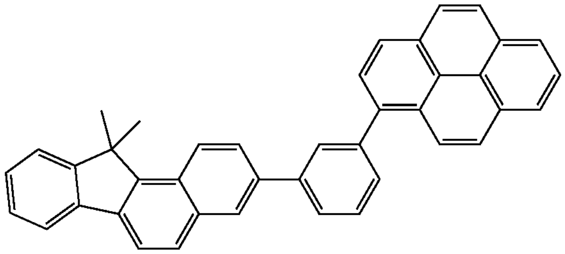
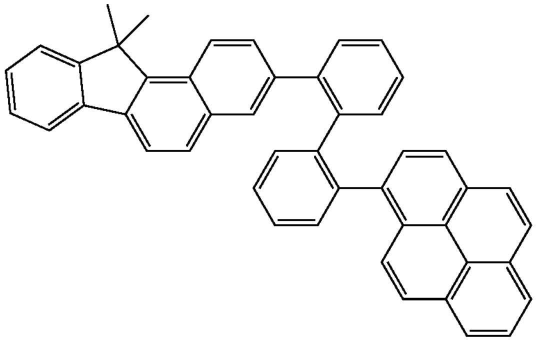
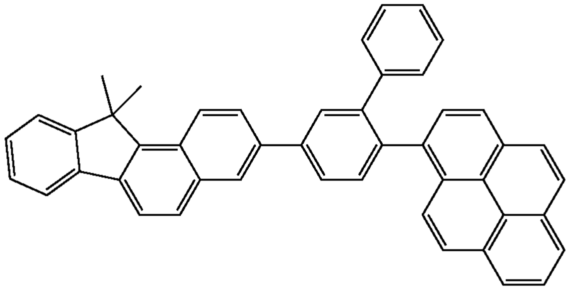

-continued
[Formula 60]
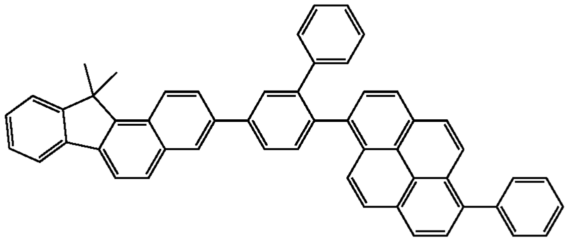
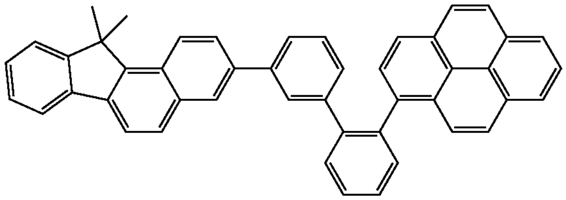
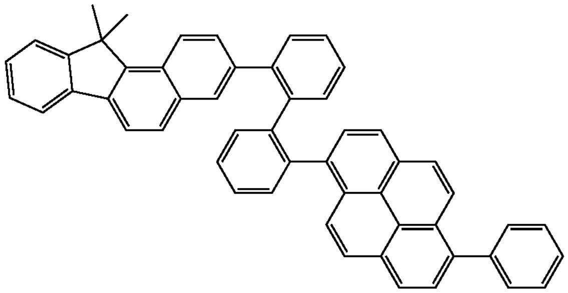
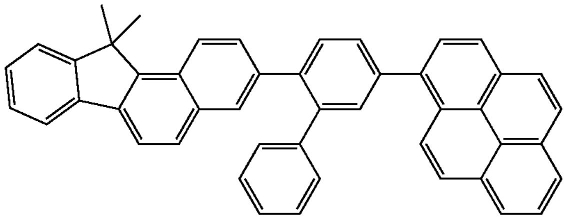
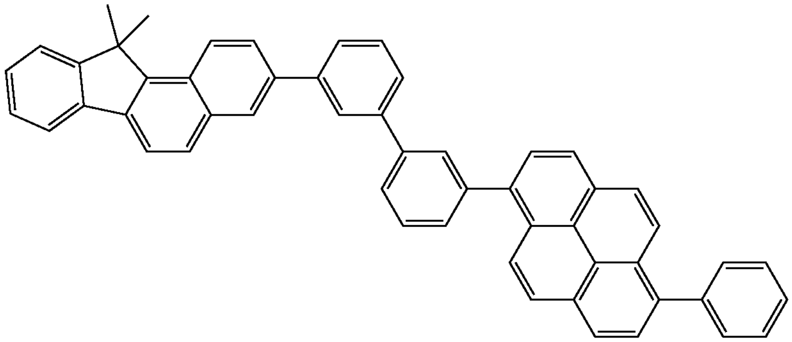
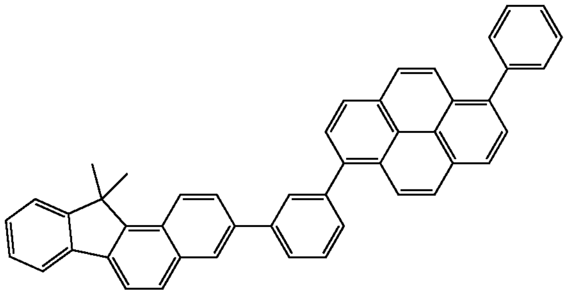
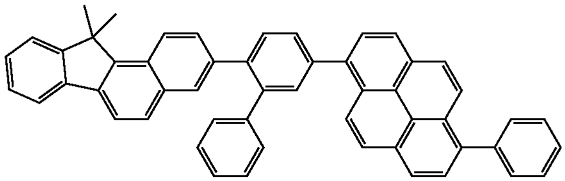
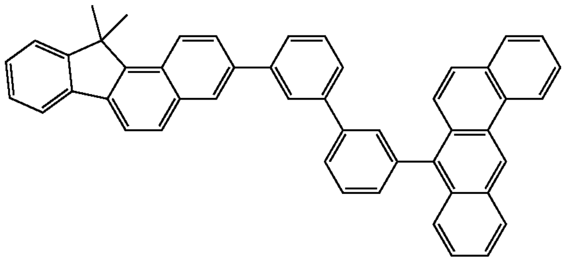
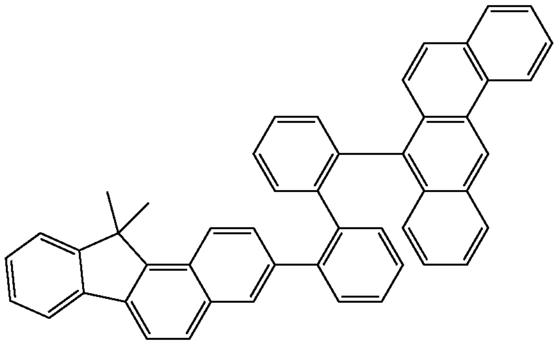

-continued
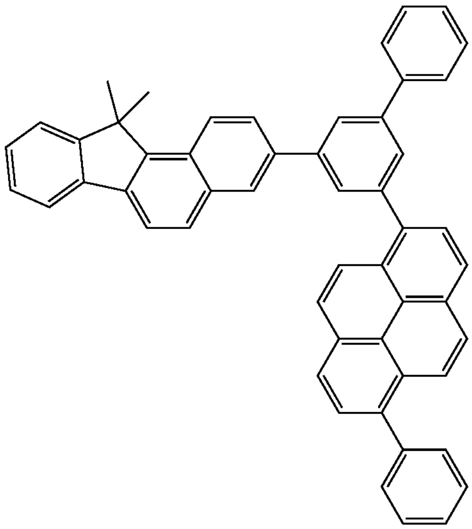
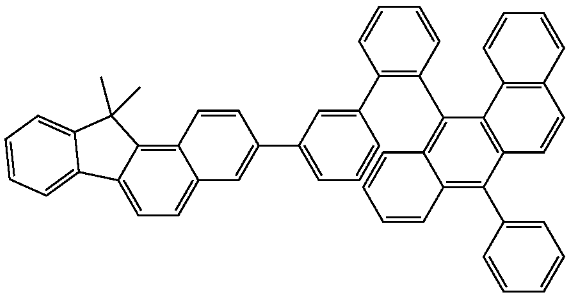
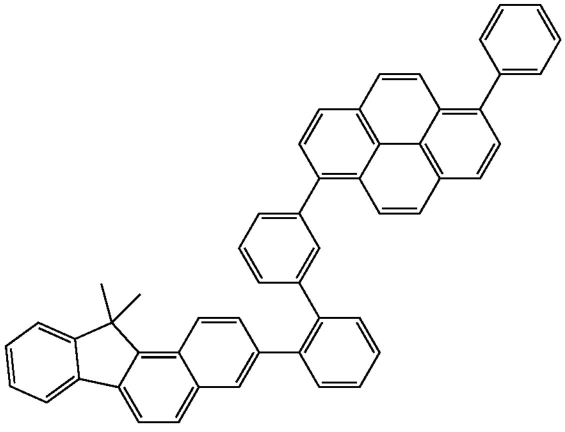
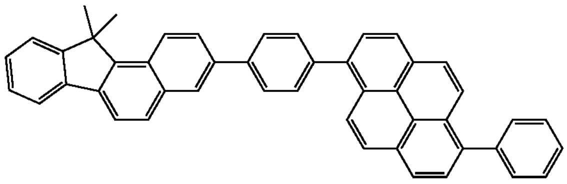
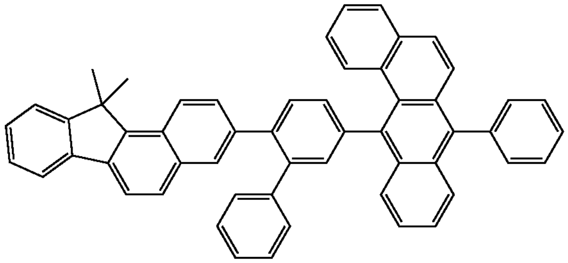
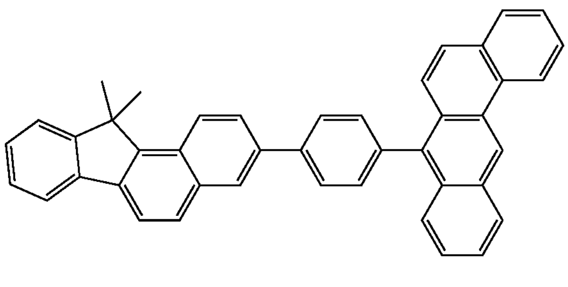
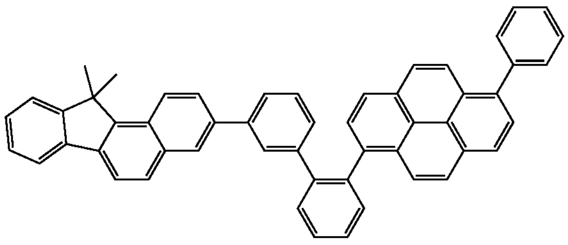

-continued
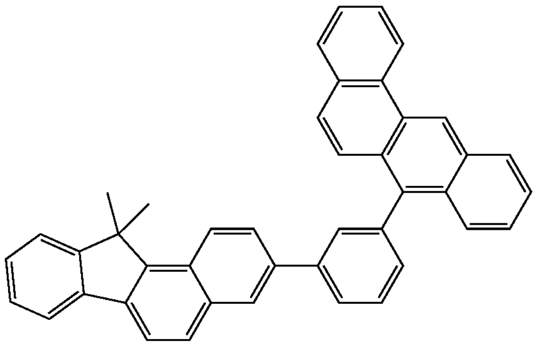
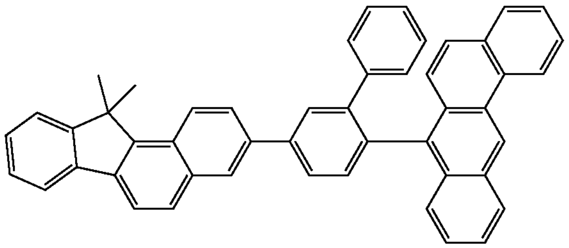
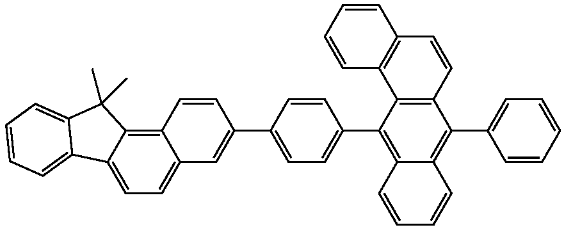
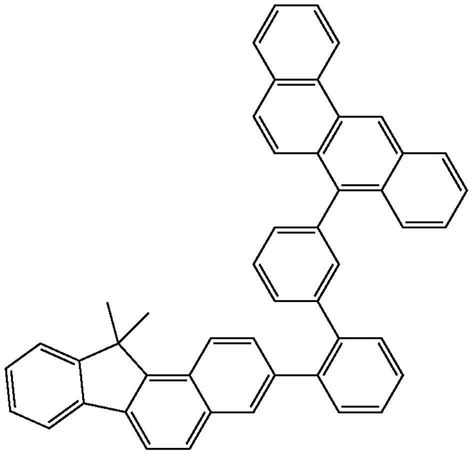
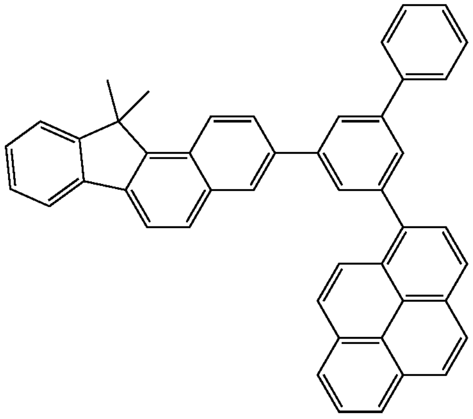
[Formula 61]
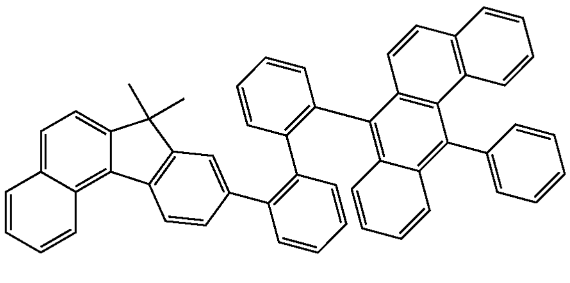
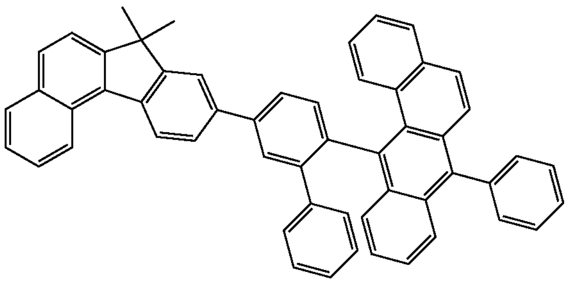

-continued
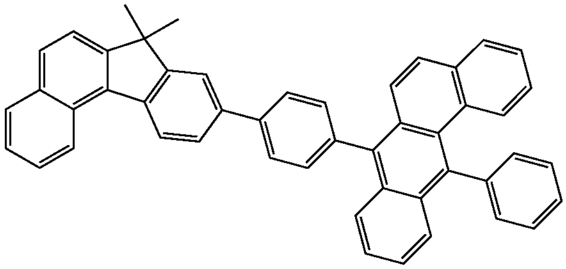
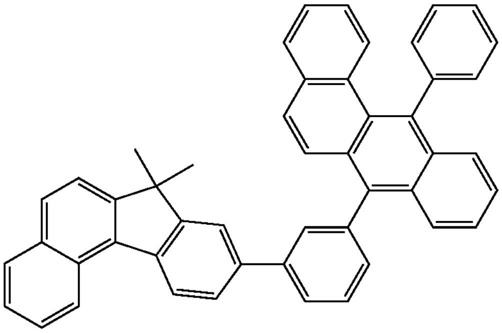
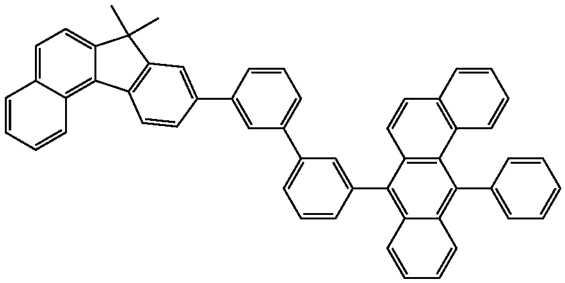
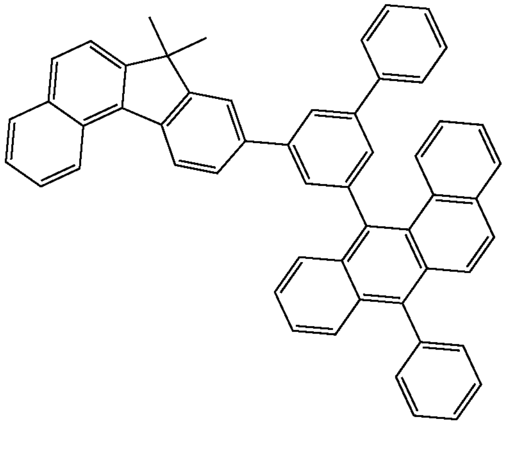
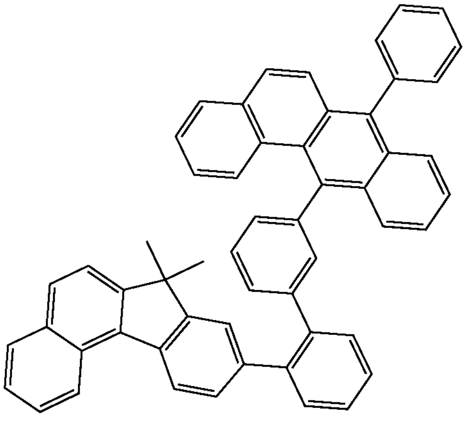
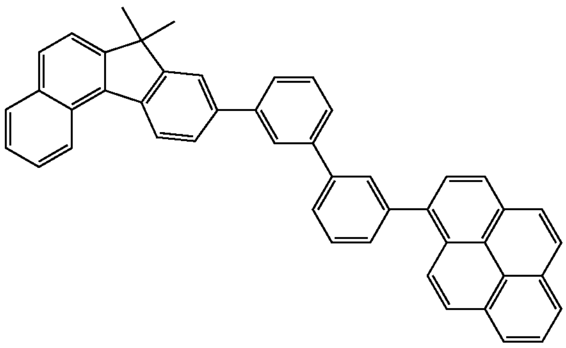
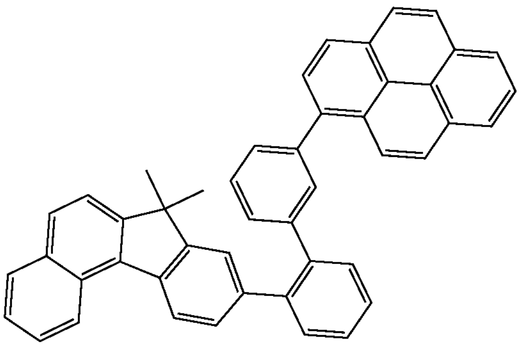

-continued
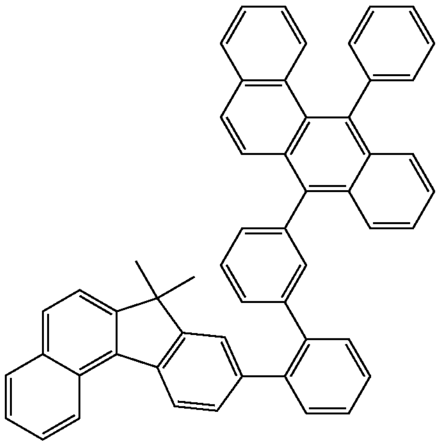
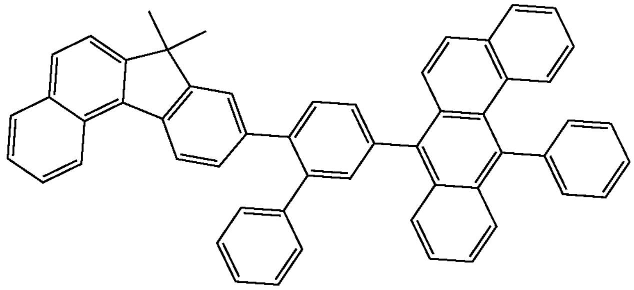
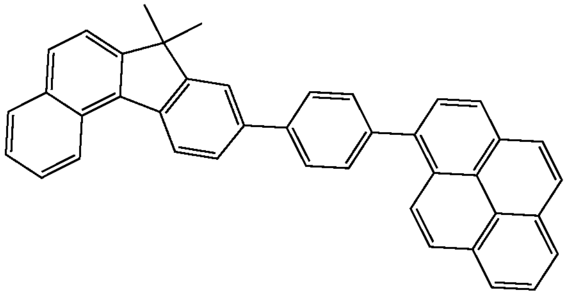
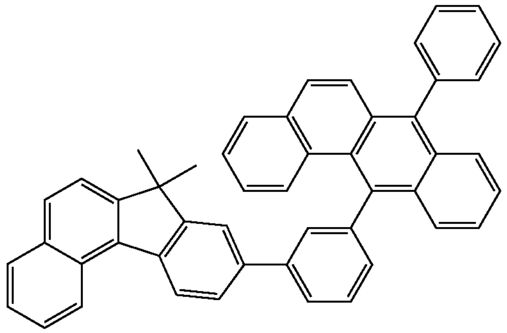
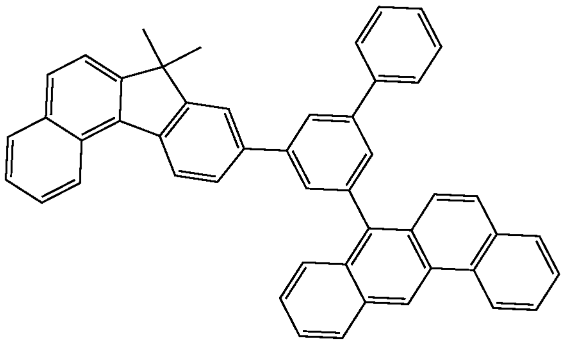
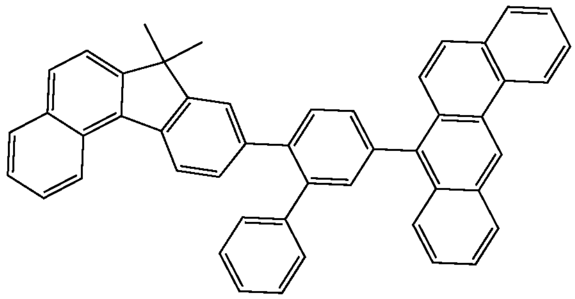
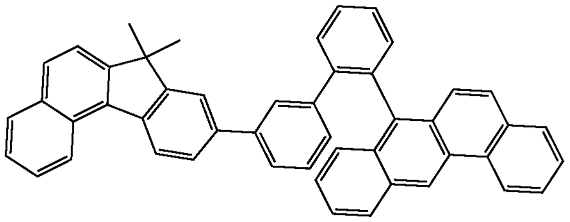
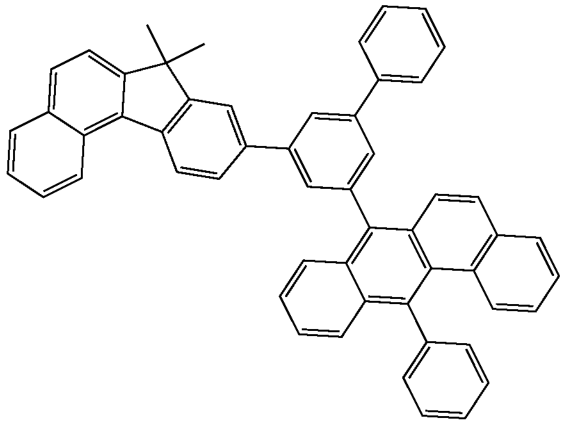

-continued
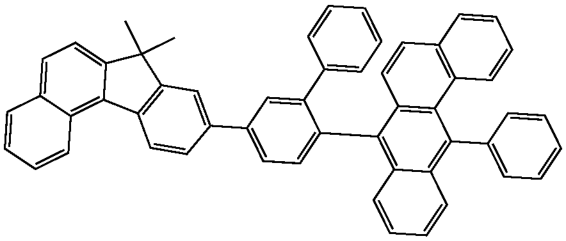
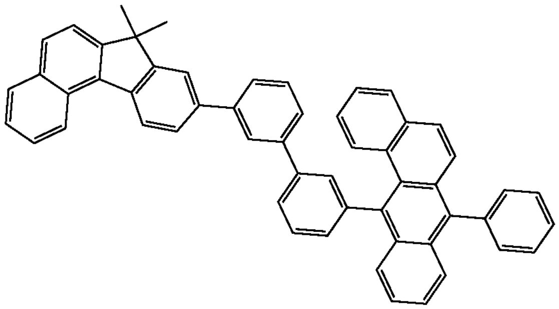
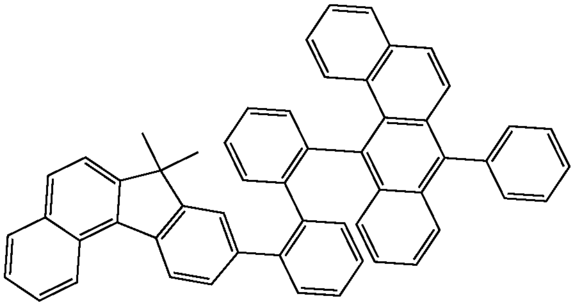
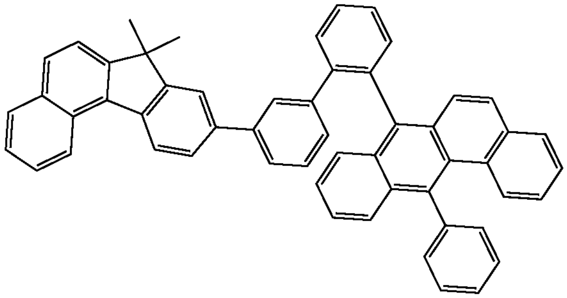
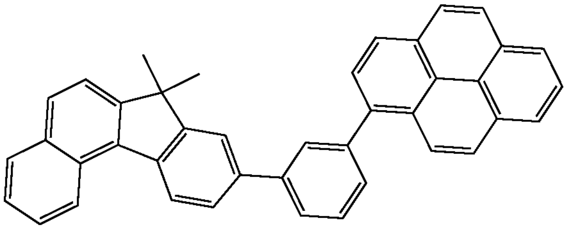
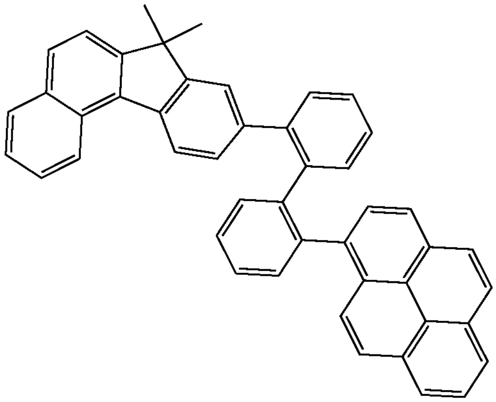
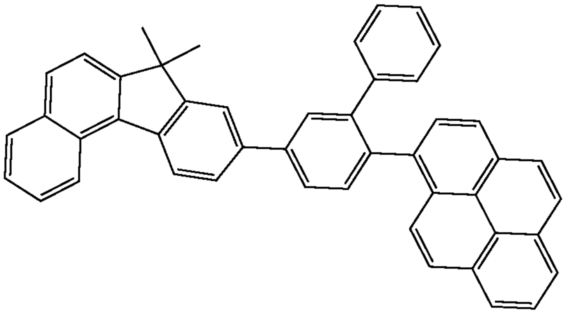
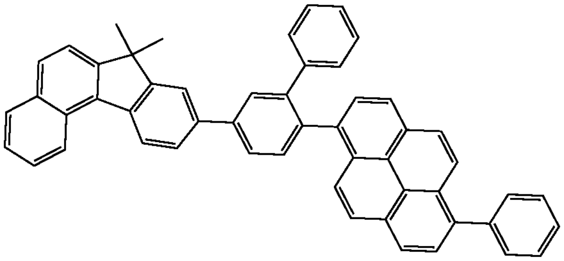

-continued
[Formula 62]
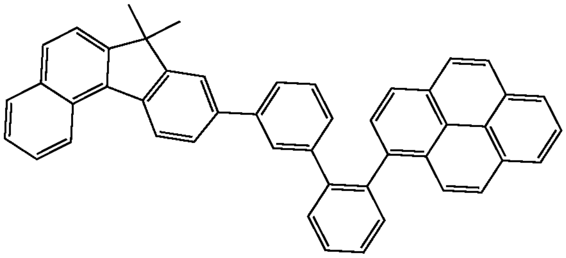
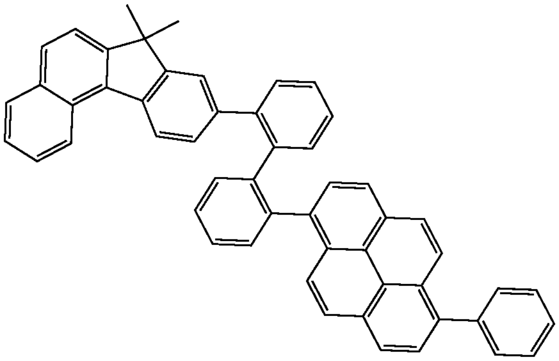
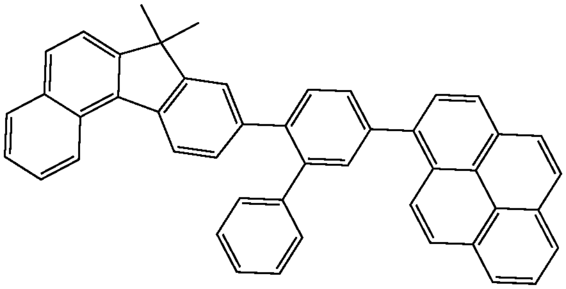
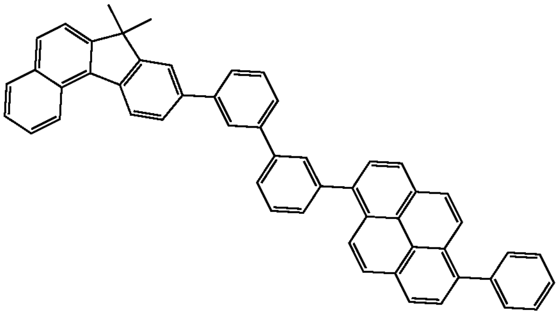
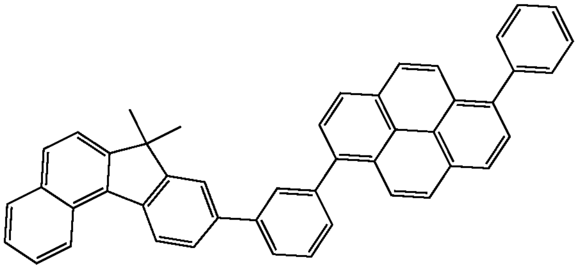
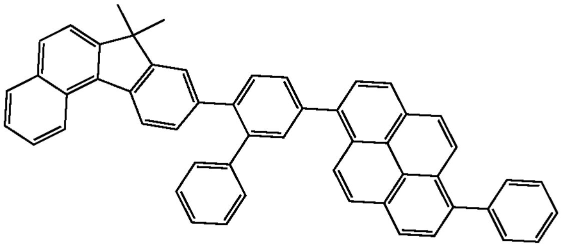

-continued
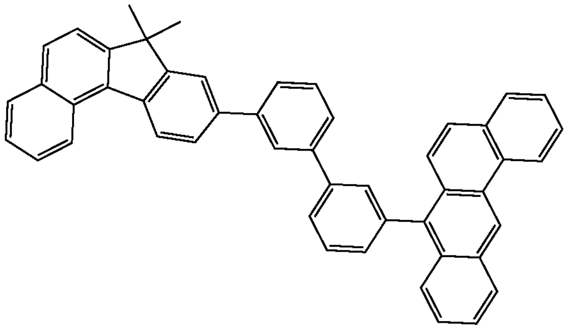
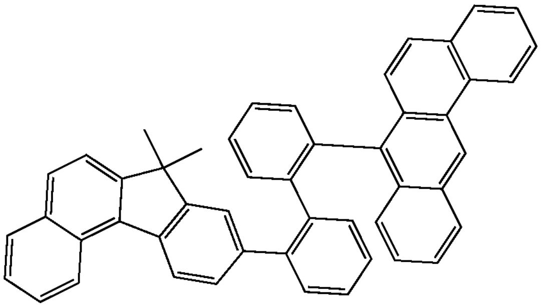
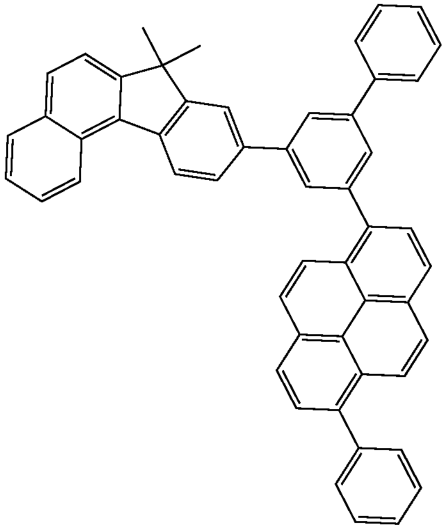
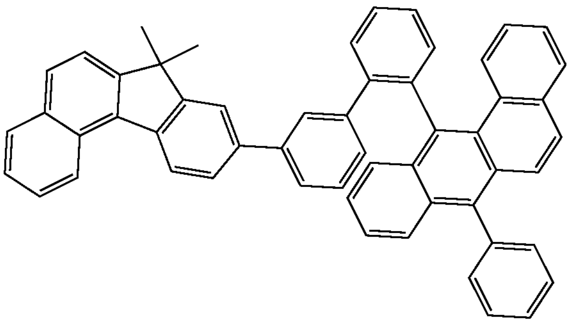
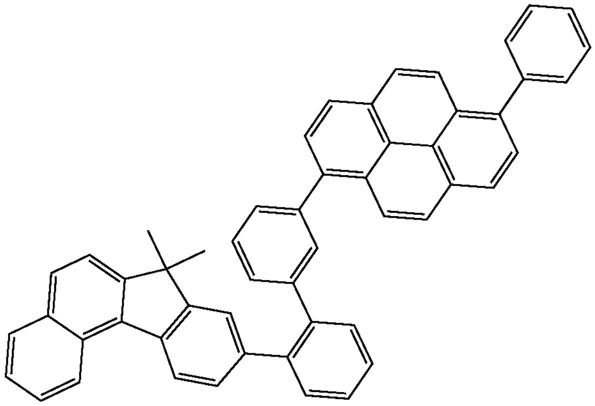
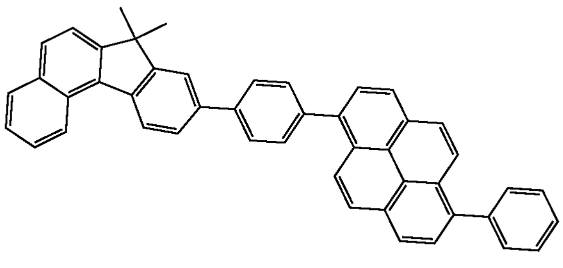
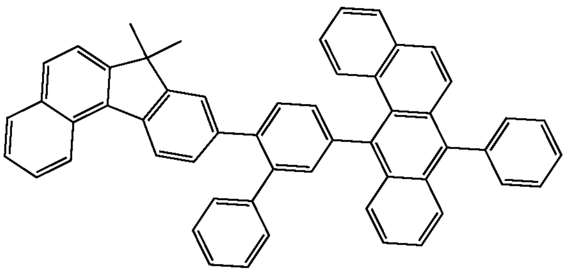

-continued
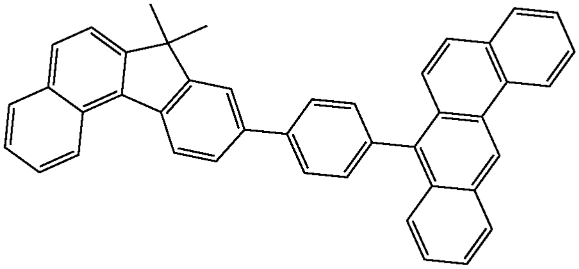
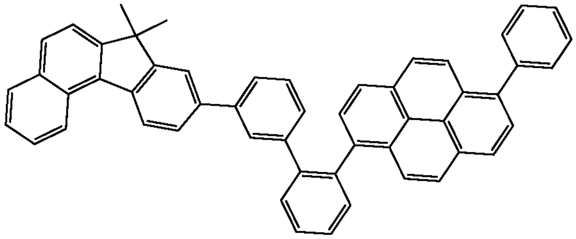
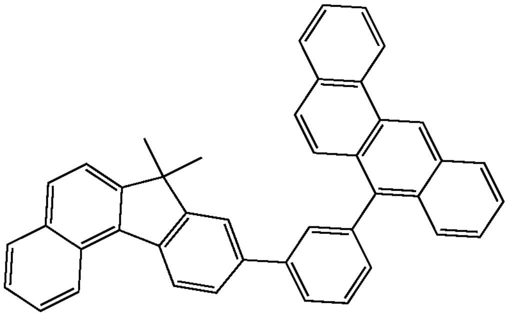
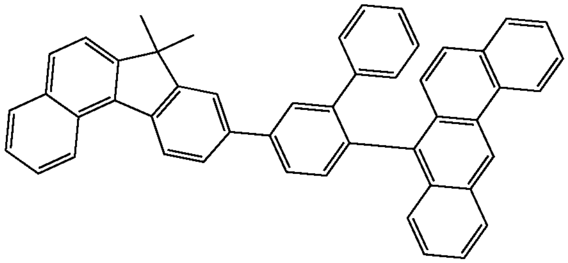
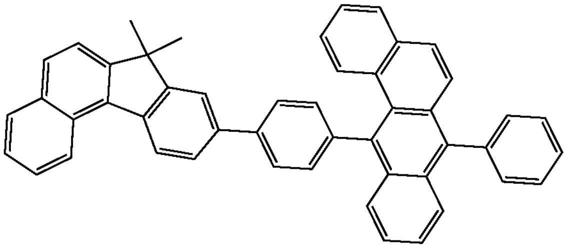
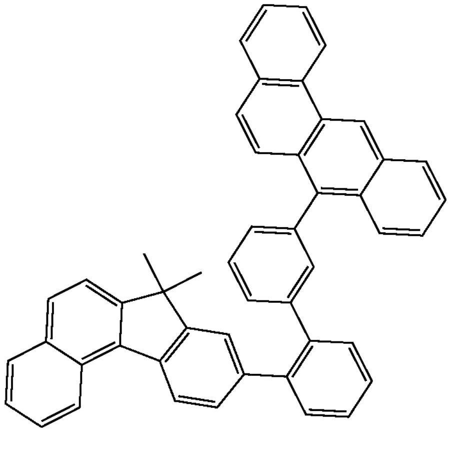
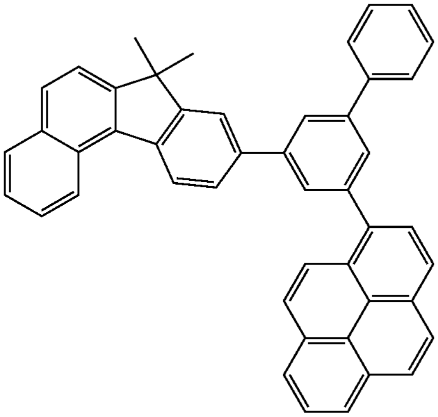

-continued
[Formula 63]
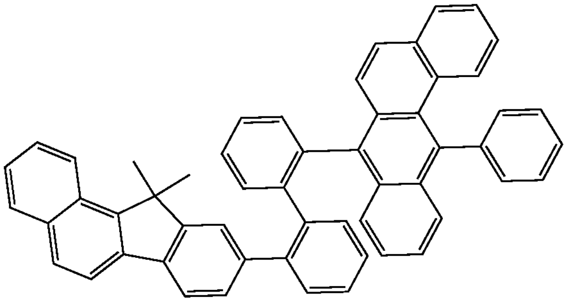
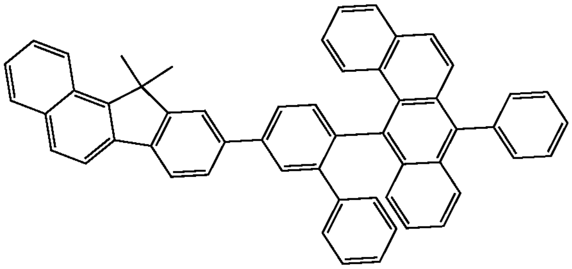
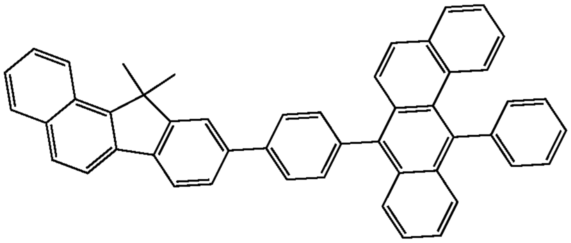
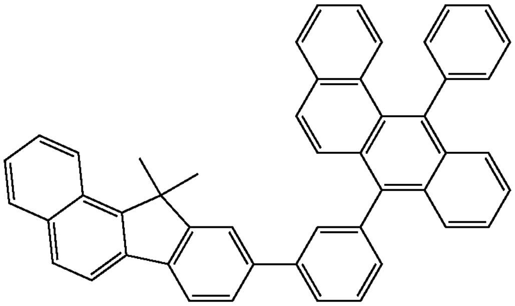
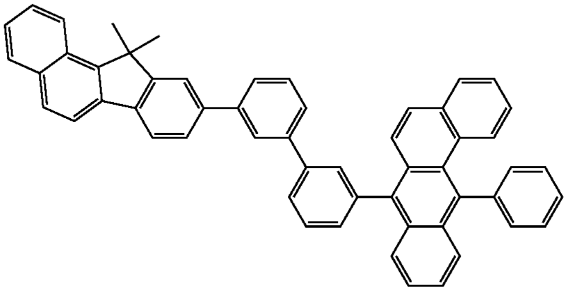
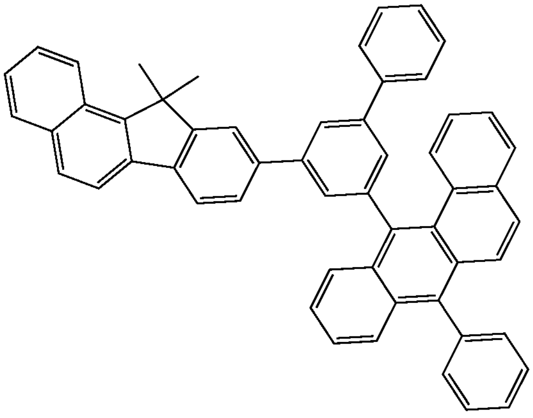
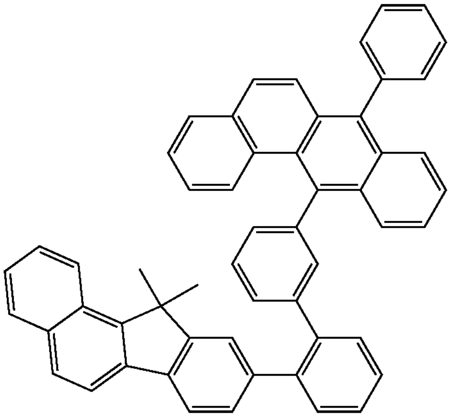

-continued
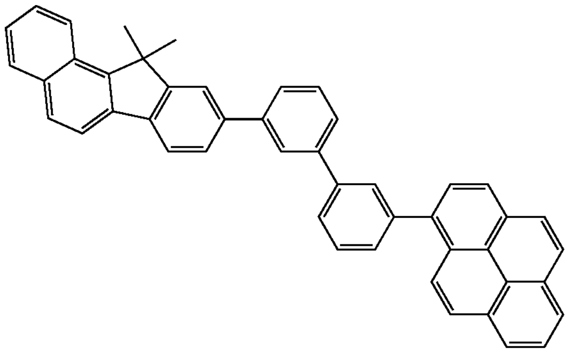
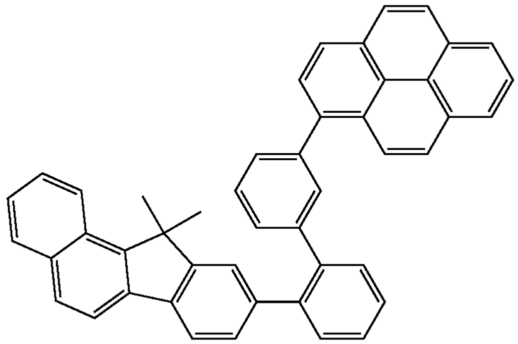
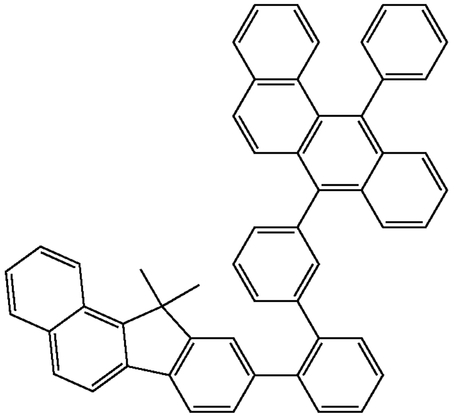
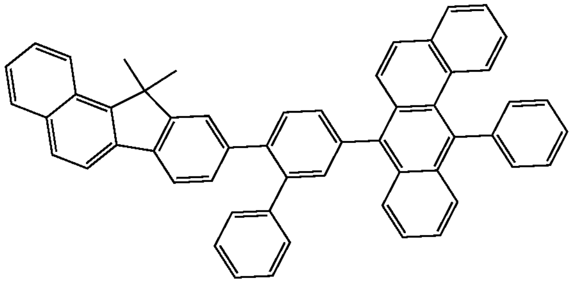
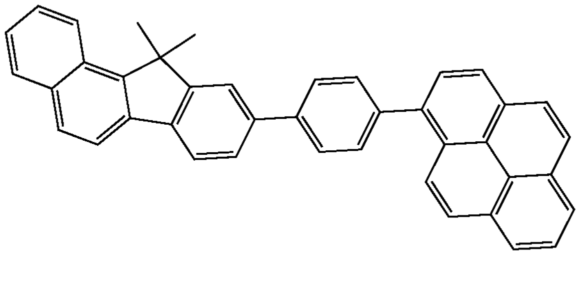
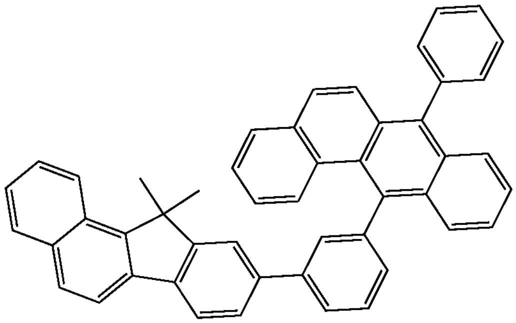
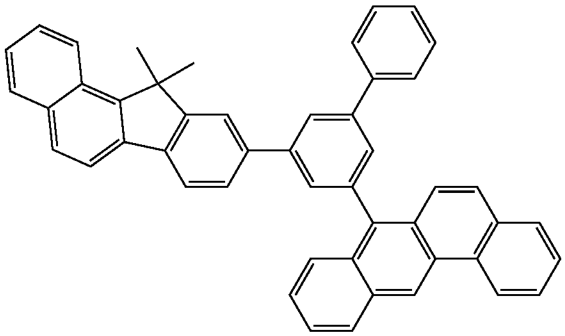
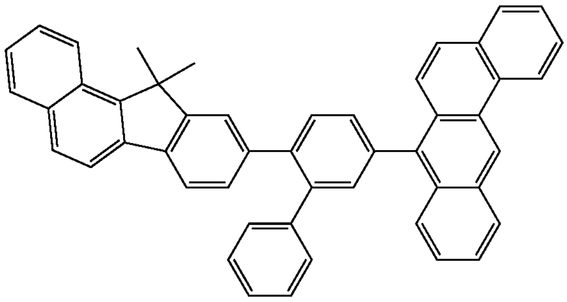

-continued
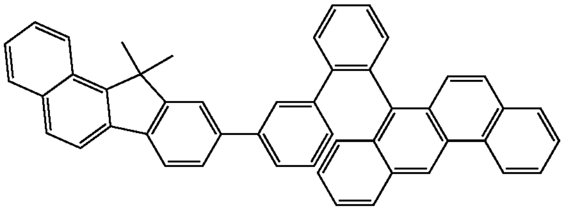
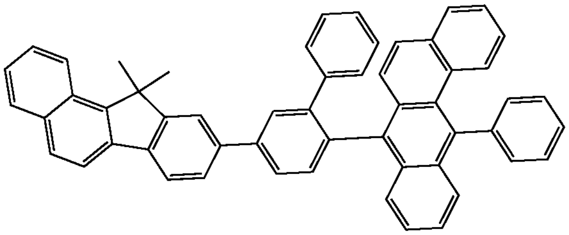
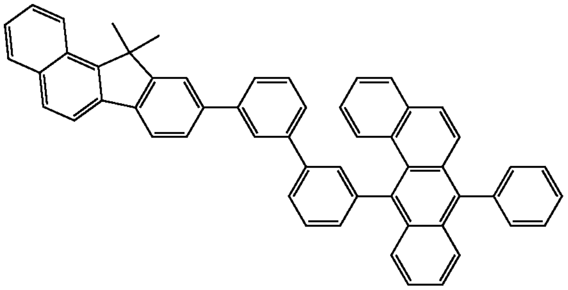
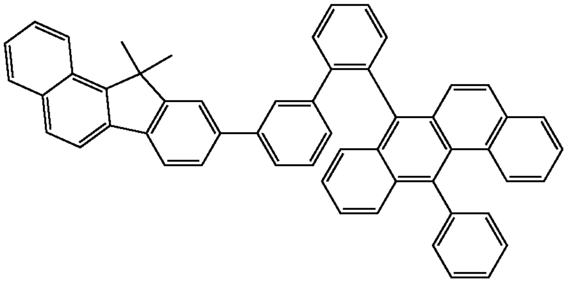
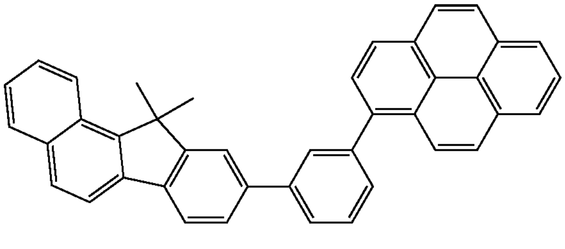
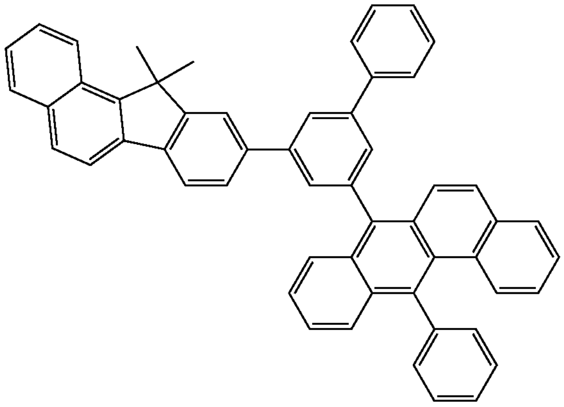
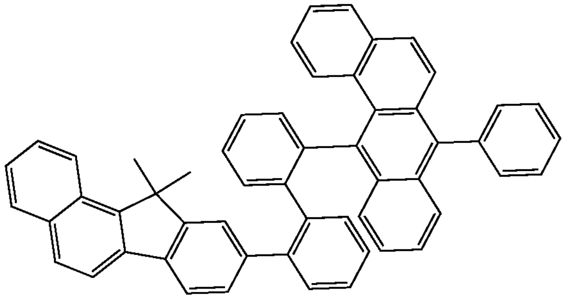
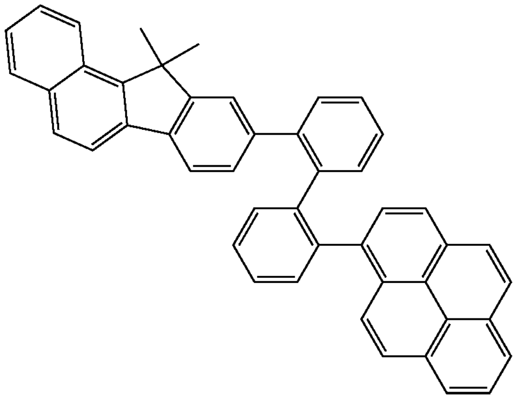

-continued
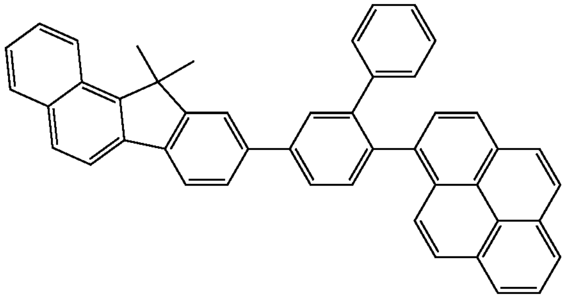
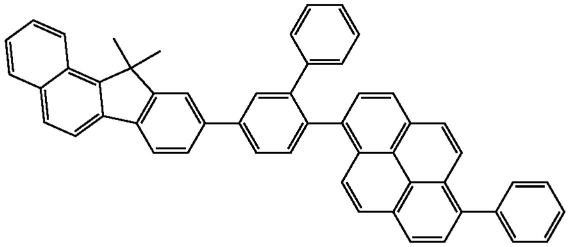
[Formula 64]
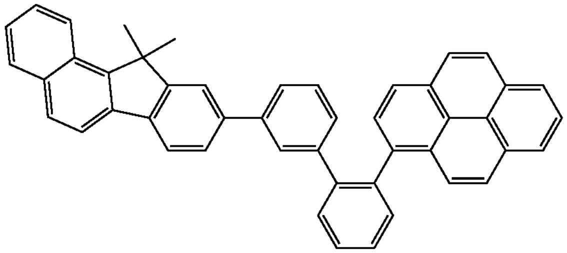
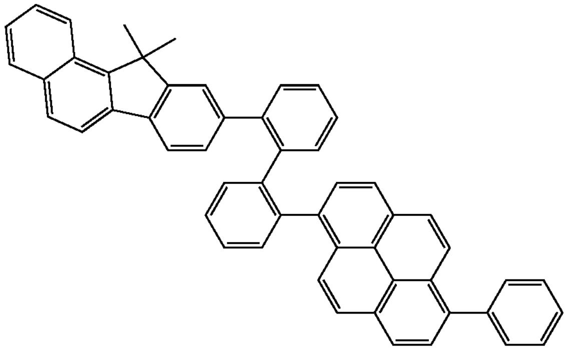
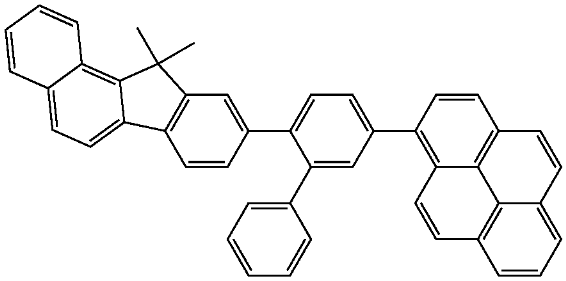
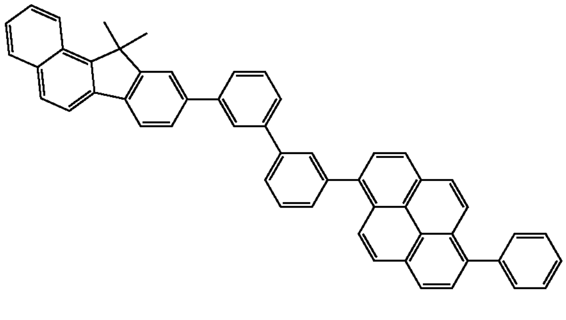
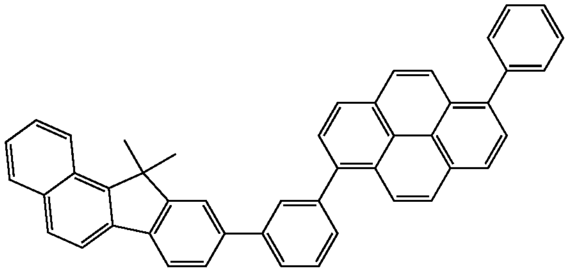
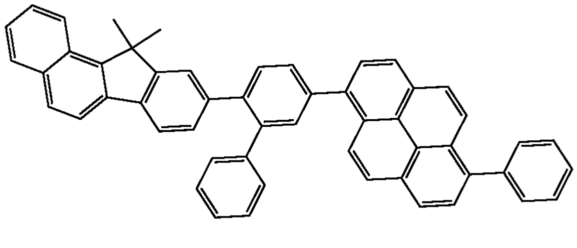
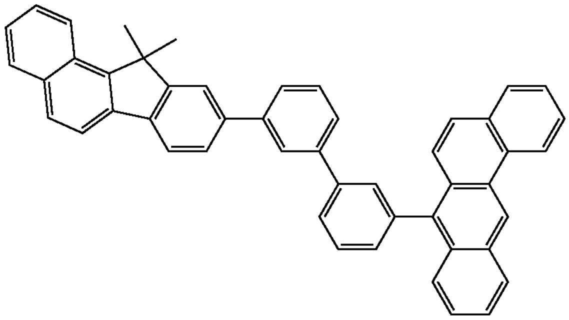

-continued
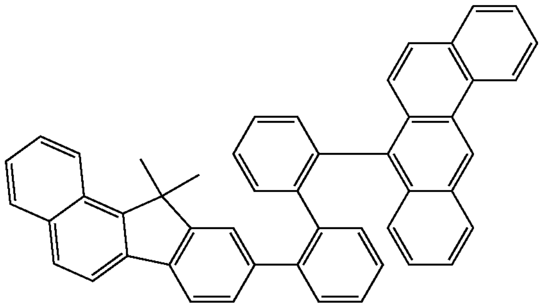
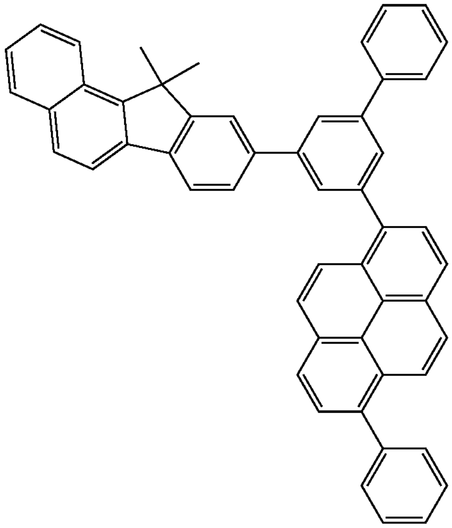
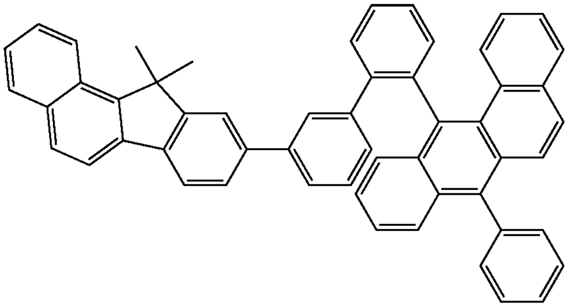
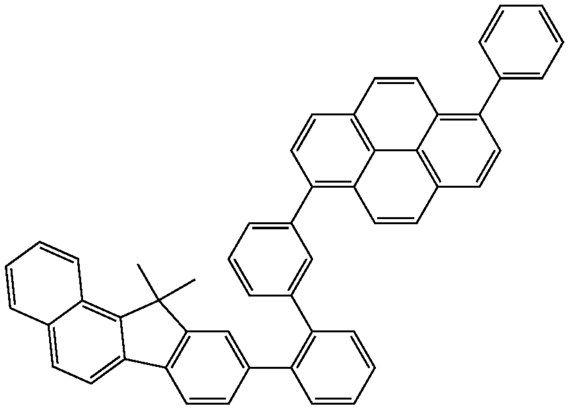
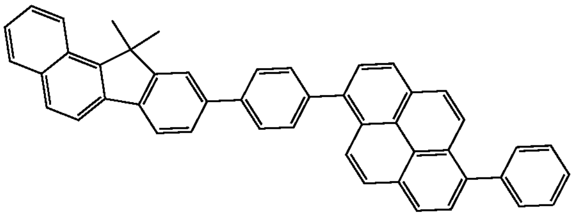
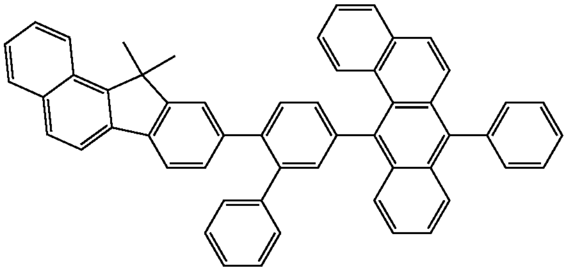

-continued
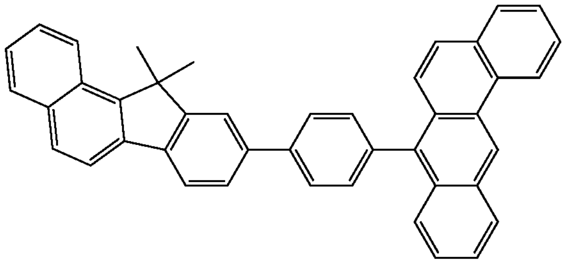
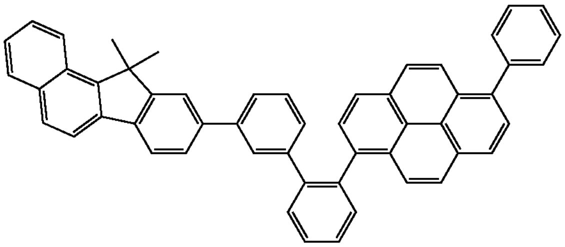
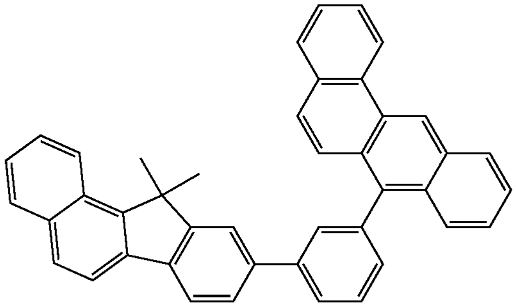
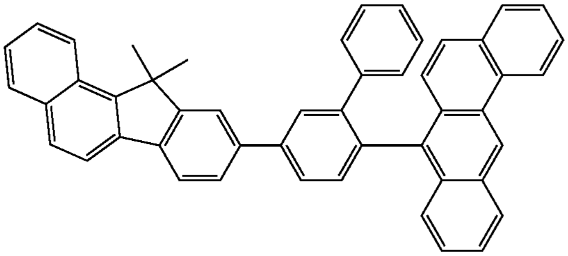
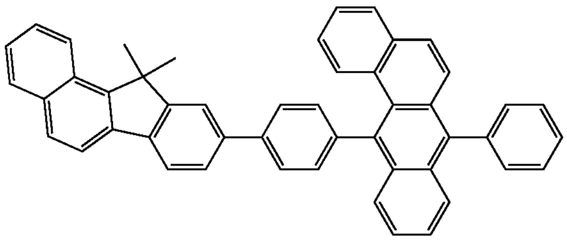
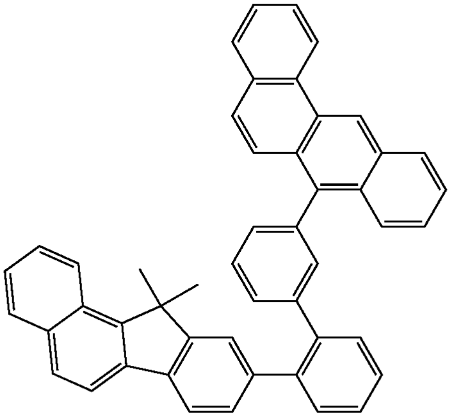
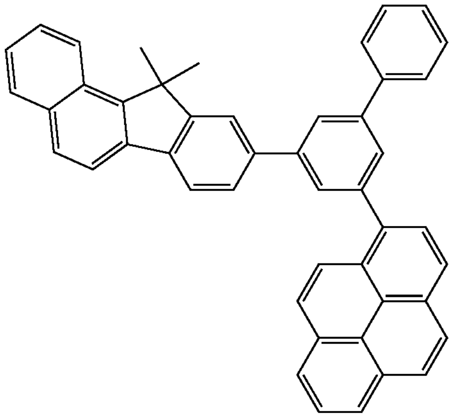
[Formula 65]
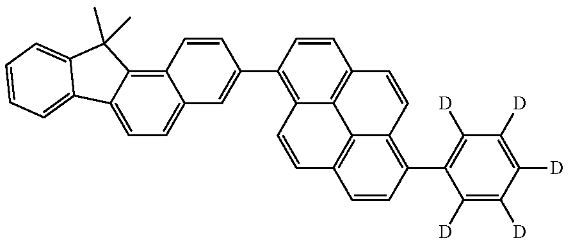

-continued
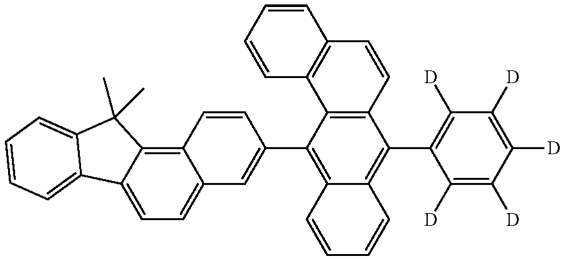
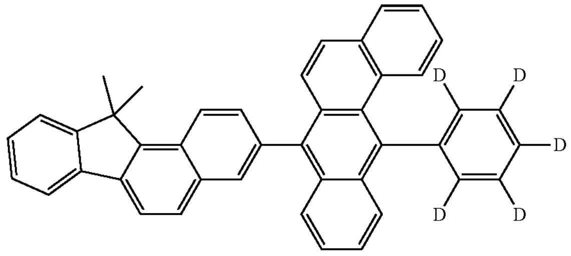
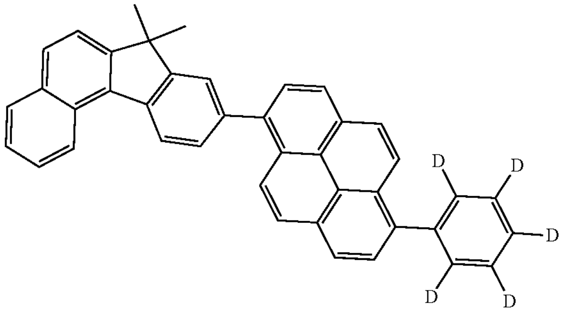
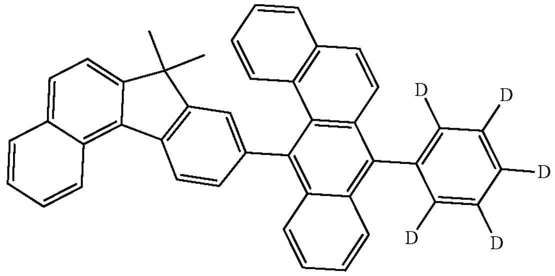
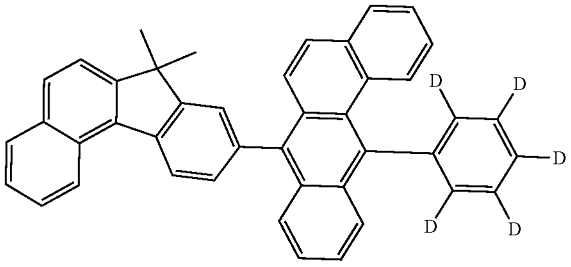
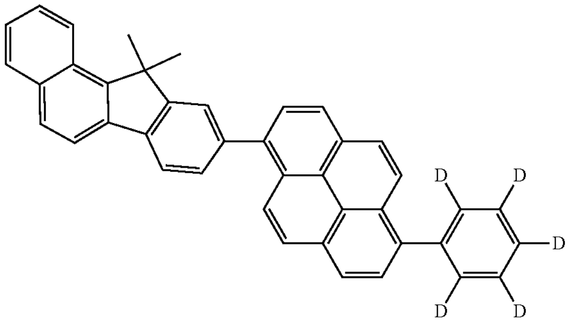
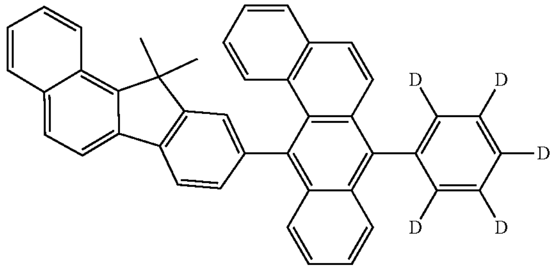
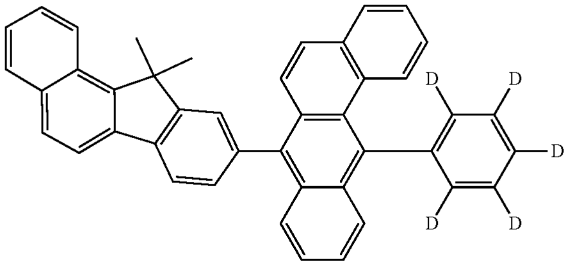

-continued
[Formula 66]
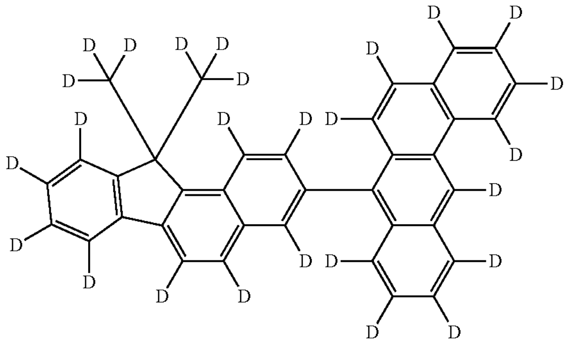
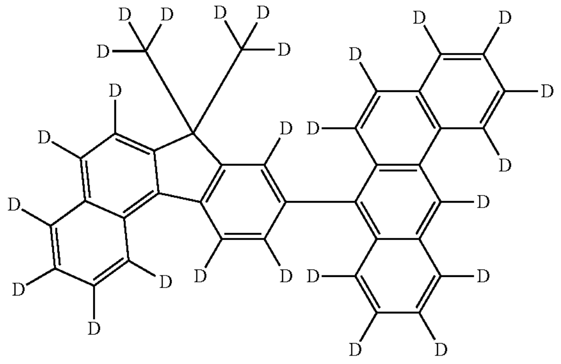
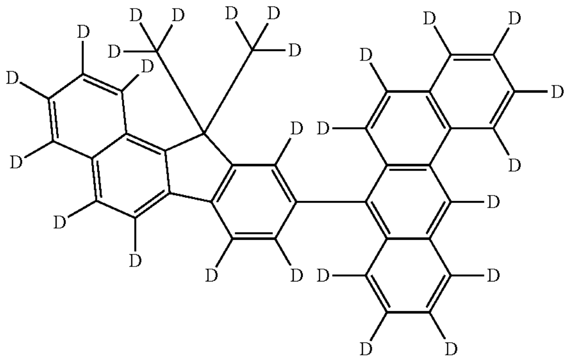
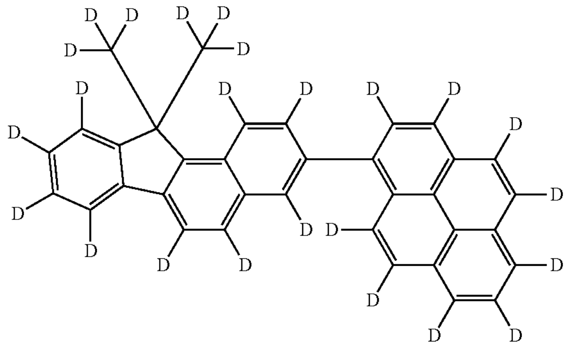
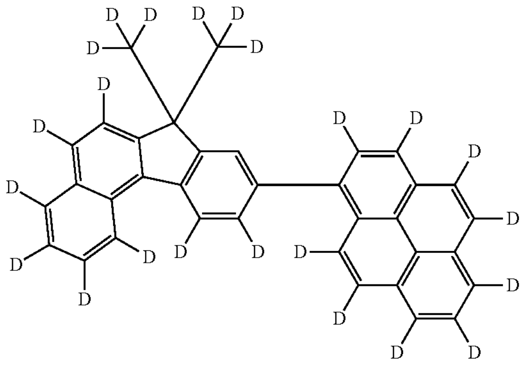
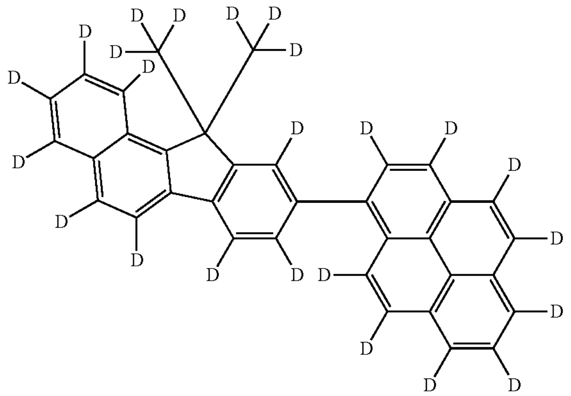
[Formula 67]
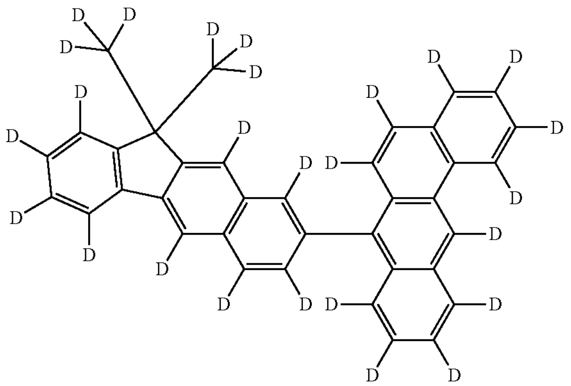

-continued
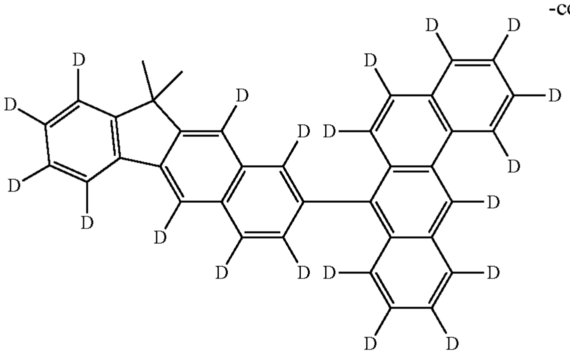
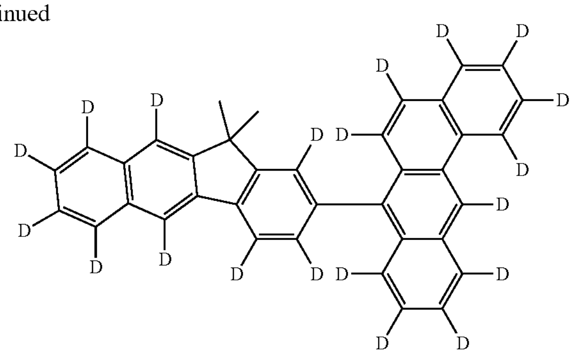
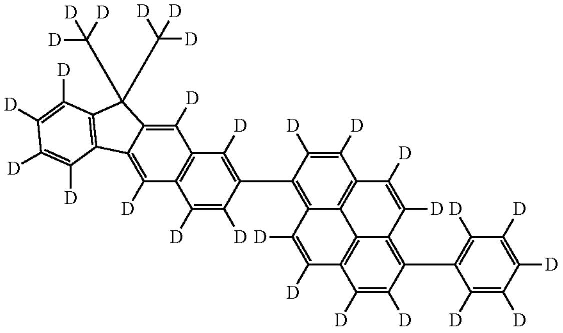
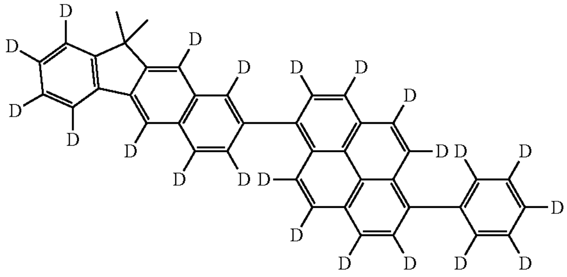
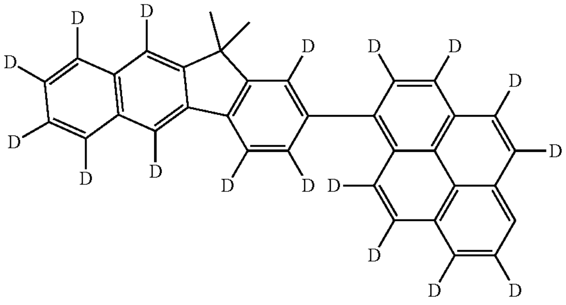
[Formula 68]
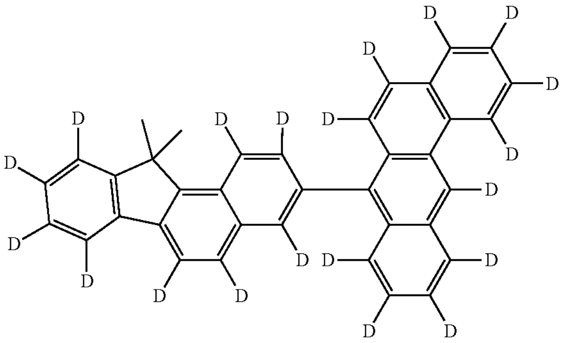
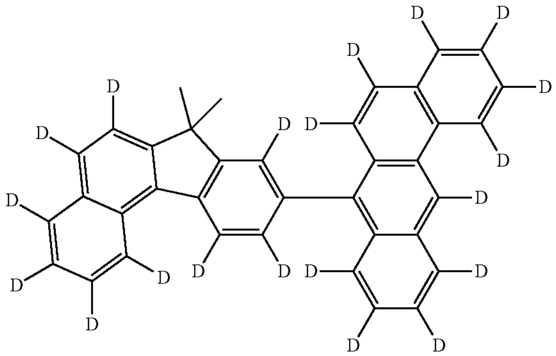
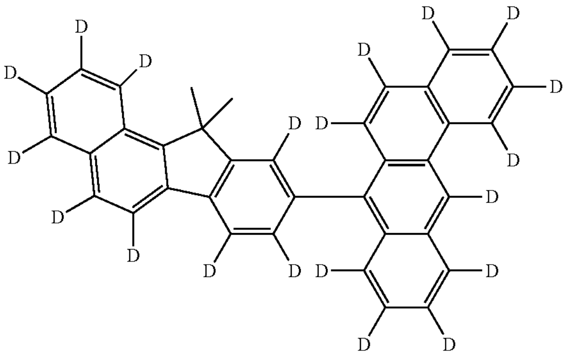
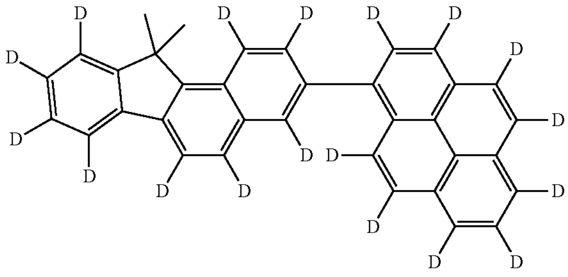

-continued
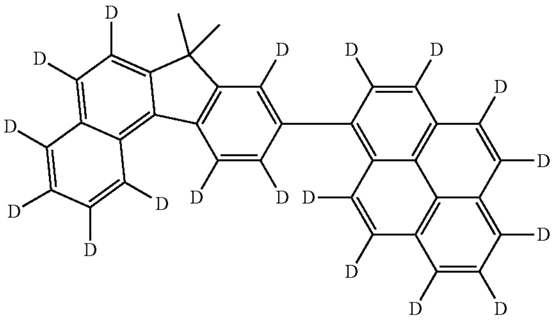
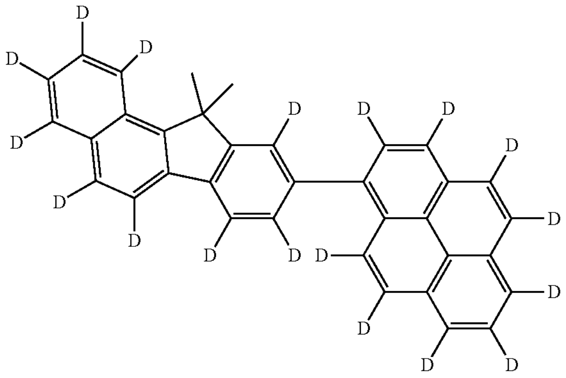
[Formula 69]
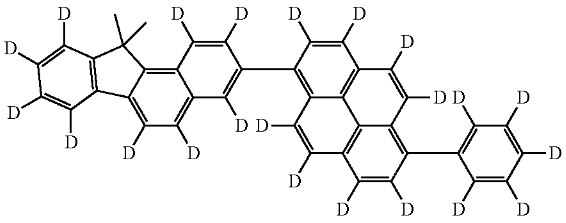
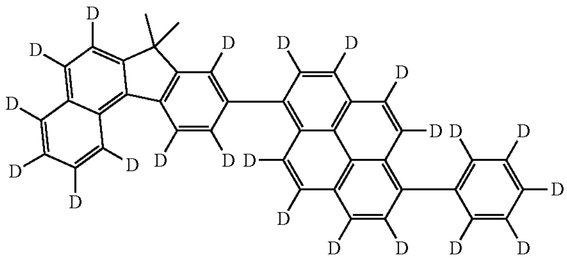
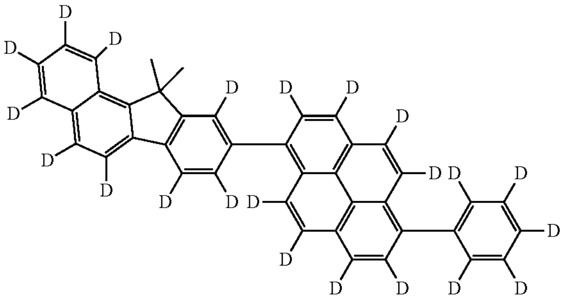
[Formula 70]
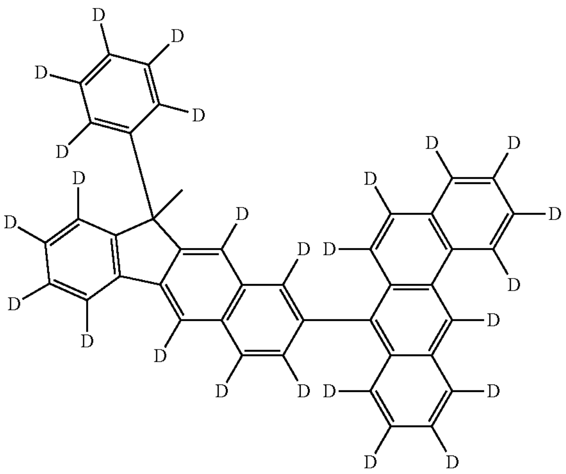
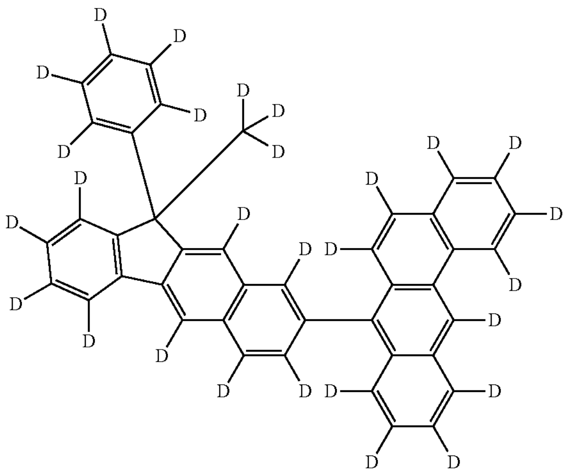

-continued
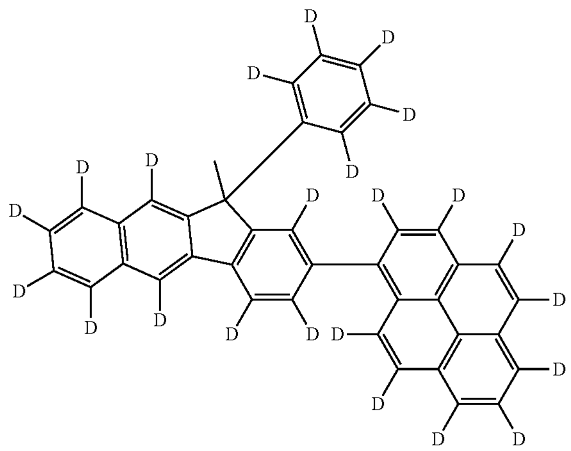
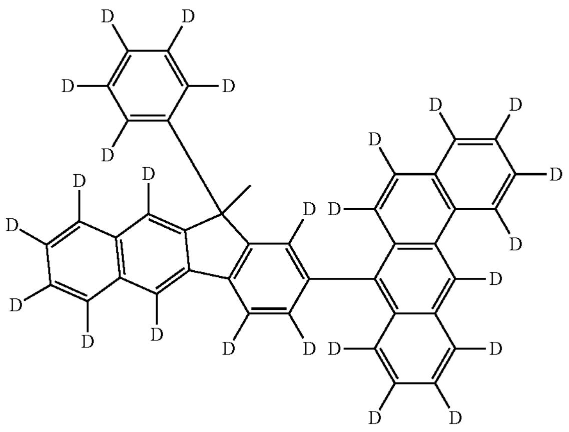
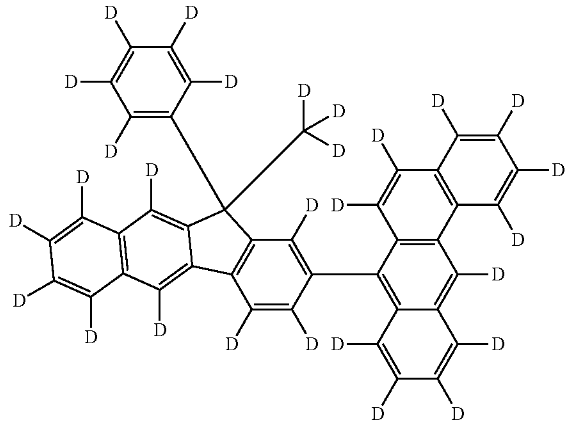
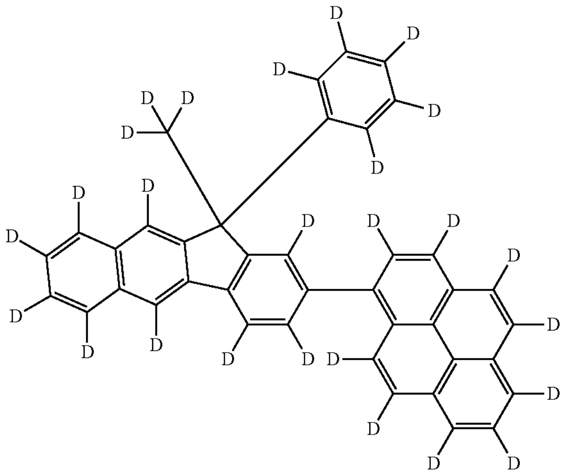
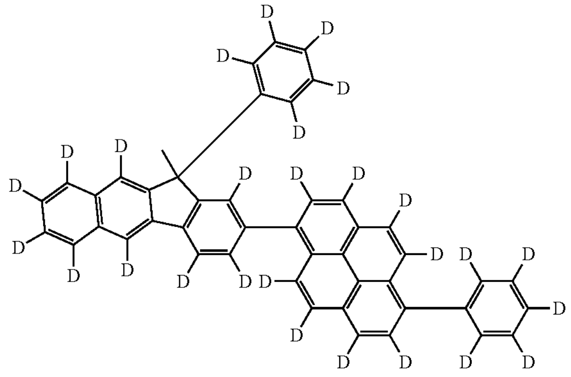
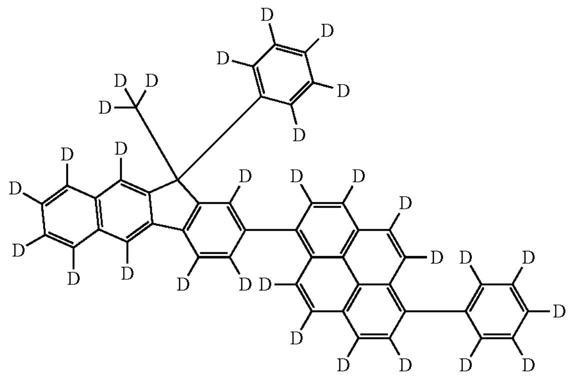

-continued
[Formula 71]
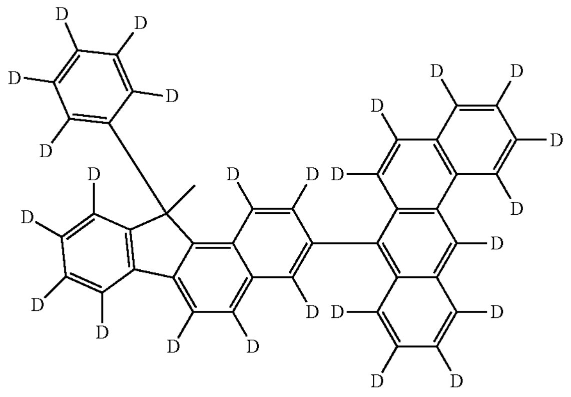
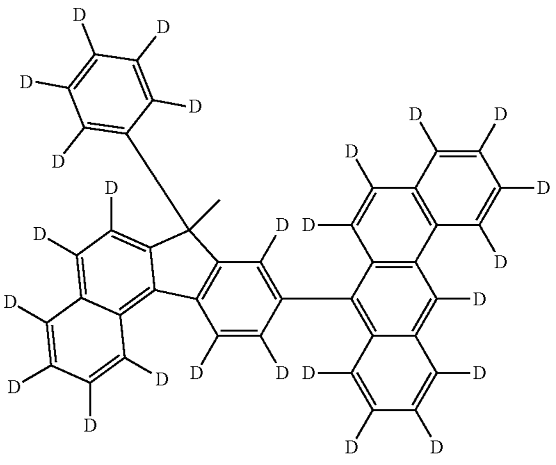
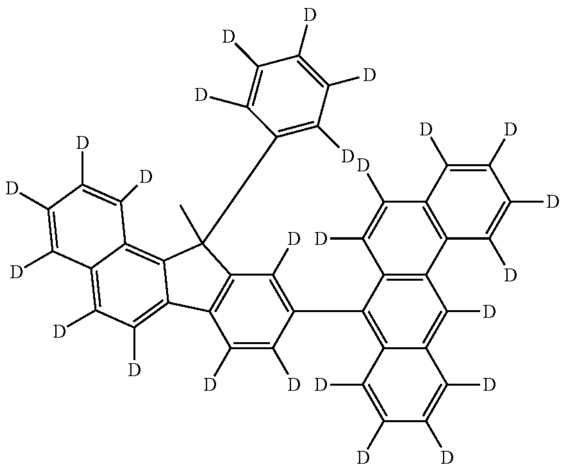
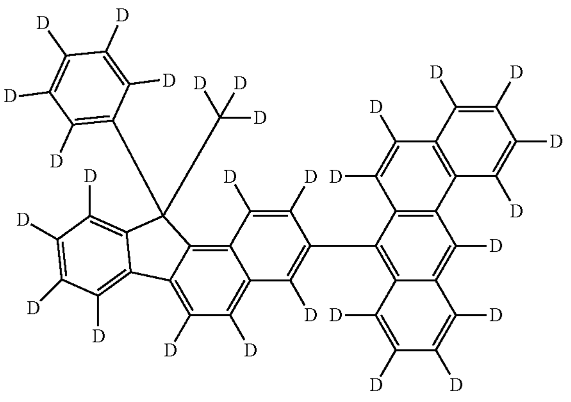

-continued
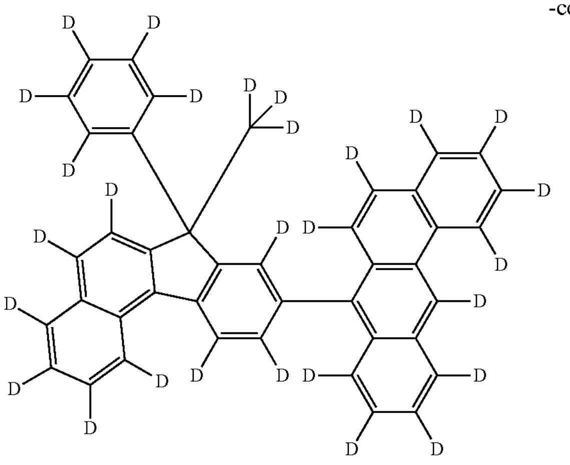
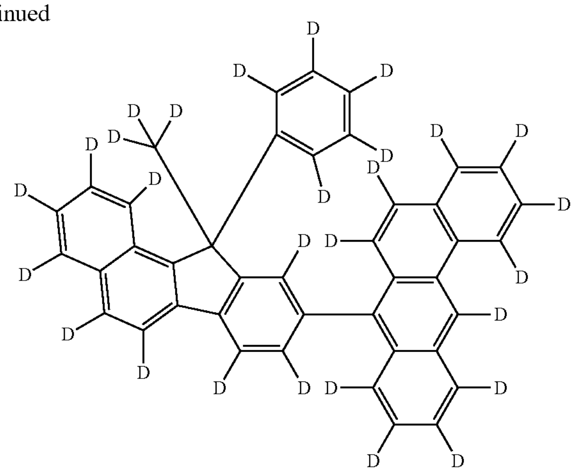
[Formula 72]
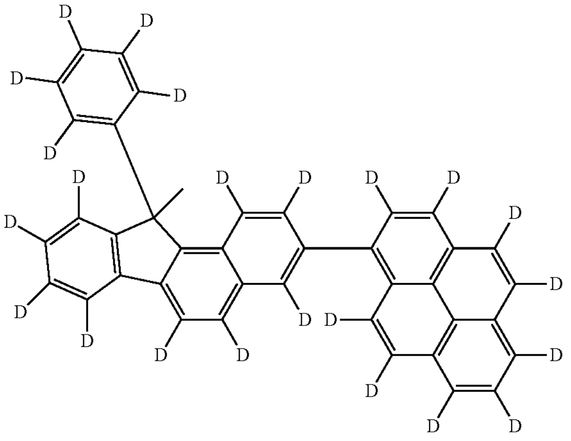
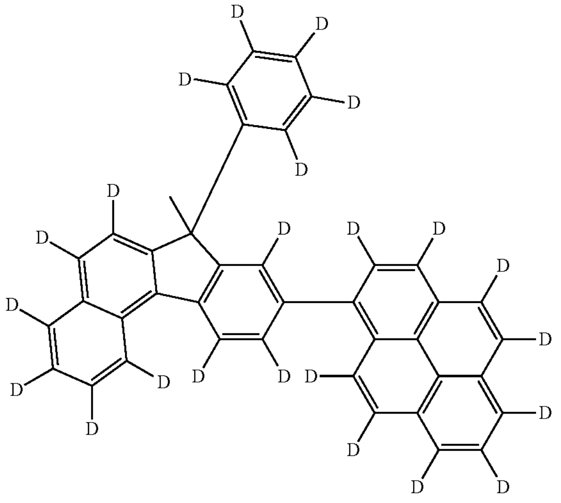
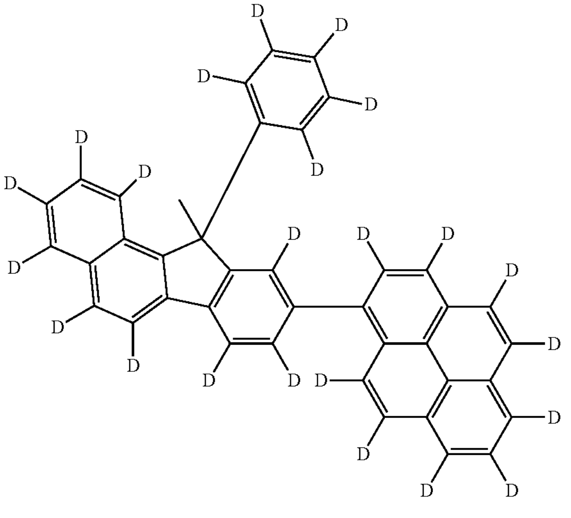

-continued
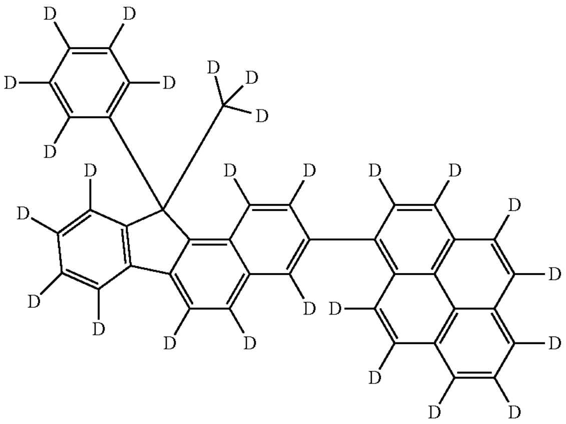
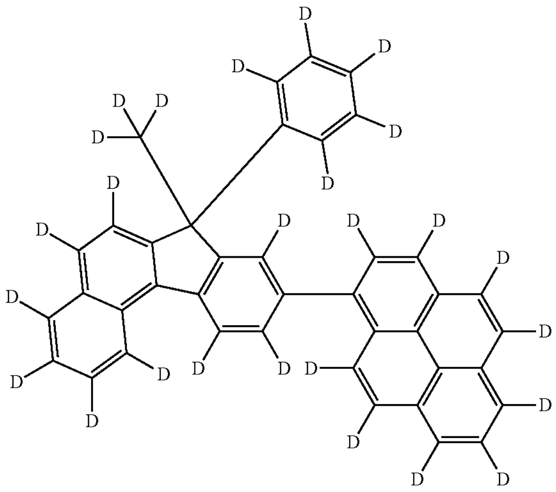
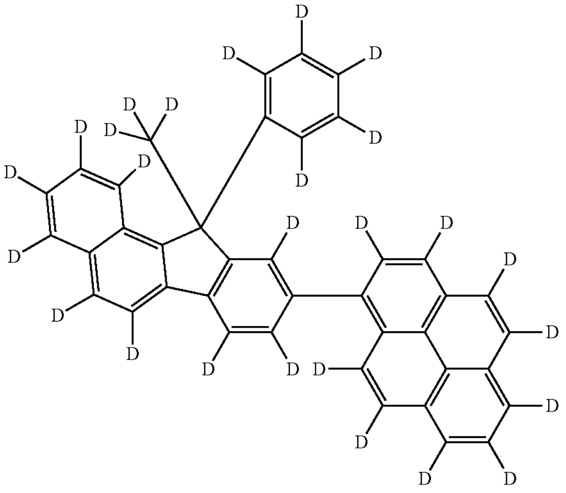
[Formula 73]
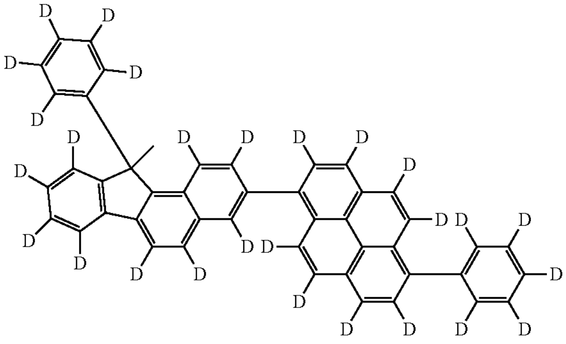
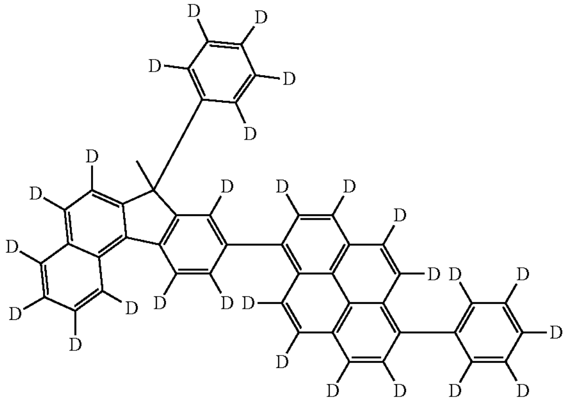

-continued
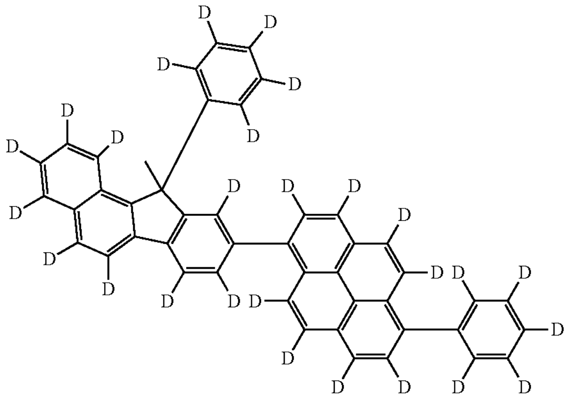
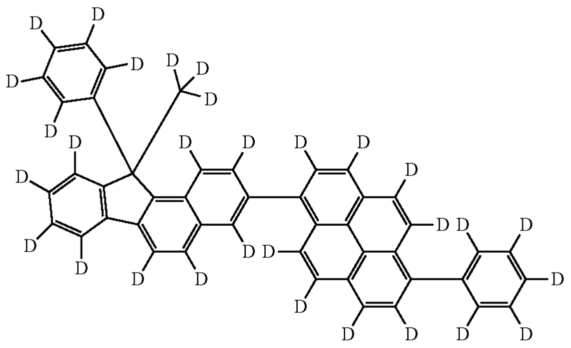
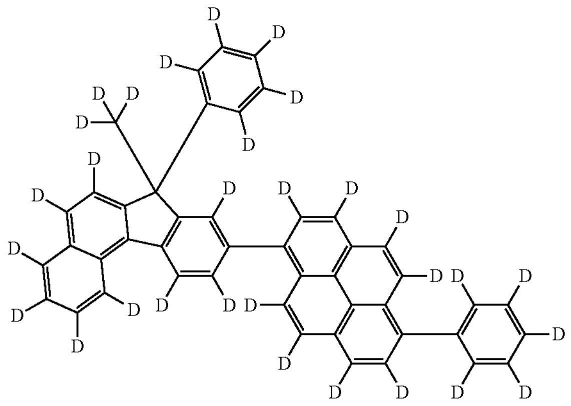
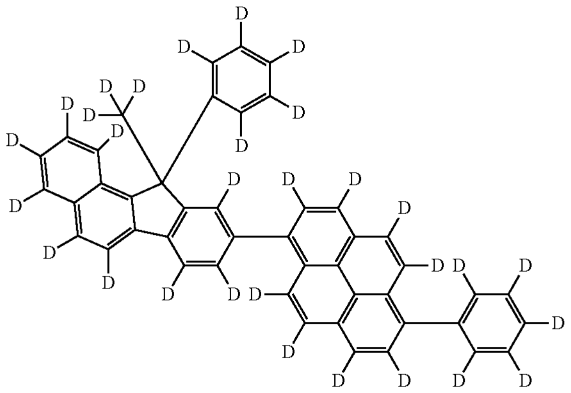
[Formula 74]
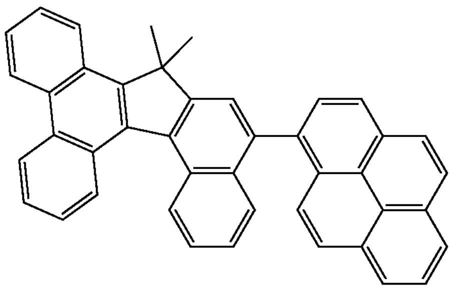

-continued

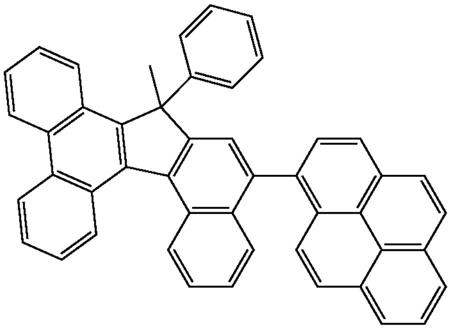

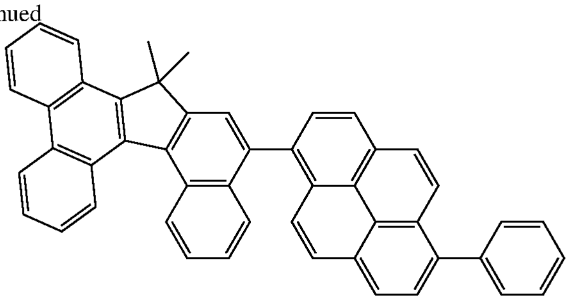

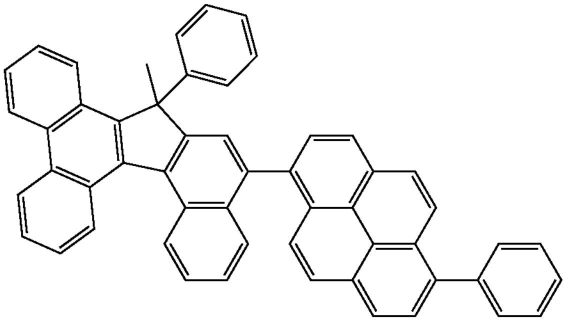

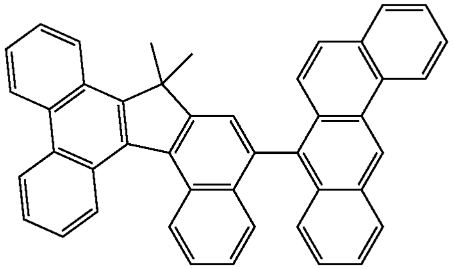

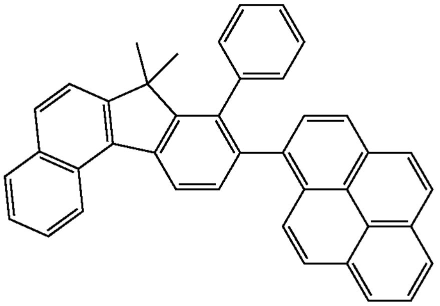

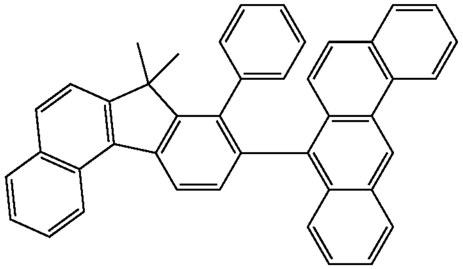

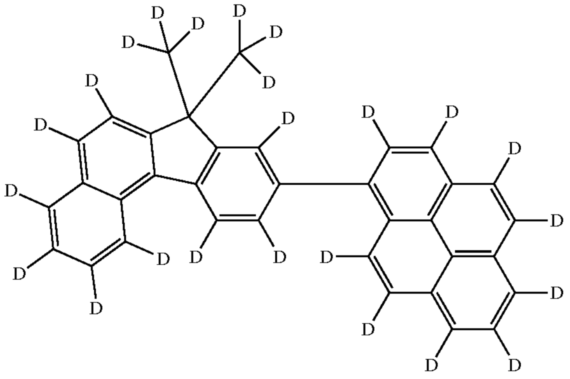

In the organic EL device according to the exemplary embodiment, the triplet energy of the first host material $T_1$(H1) and the triplet energy of the second host material $T_1$(H2) preferably satisfy a relationship of a numerical formula (Numerical Formula 1) below.

$$T_1(H1) > T_1(H2) \quad \text{(Numerical Formula 1)}$$

According to an exemplary arrangement of the exemplary embodiment, an organic electroluminescence device having an improved luminous efficiency can be provided.

Typically, Triplet-Triplet-Annihilation (occasionally referred to as TTA) has been known as a technology for improving the luminous efficiency of the organic EL device. TTA is a mechanism in which triplet excitons collide with one another to generate singlet excitons. The TTA mechanism is also referred to as a TTF mechanism as described in Patent Literature 3.

The TTF phenomenon will be described. Holes injected from an anode and electrons injected from a cathode are recombined in an emitting layer to generate excitons. As for the spin state, as is conventionally known, singlet excitons account for 25% and triplet excitons account for 75%. In a conventionally known fluorescent device, light is emitted when singlet excitons of 25% are relaxed to the ground state.

The remaining triplet excitons of 75% are returned to the ground state without emitting light through a thermal deactivation process. Accordingly, the theoretical limit value of the internal quantum efficiency of the conventional fluorescent device is believed to be 25%.

The behavior of triplet excitons generated within an organic substance has been theoretically examined. According to S. M. Bachilo et al. (J. Phys. Chem. A, 104, 7711 (2000)), assuming that high-order excitons such as quintet excitons are quickly returned to triplet excitons, triplet excitons (hereinafter abbreviated as $^3A^*$) collide with one another with an increase in density thereof, whereby a reaction shown by the following formula occurs. In the formula, $^1A$ represents the ground state and $^1A^*$ represents the lowest singlet excitons.

$$^3A^* + {}^3A^* \rightarrow (4/9)^1A + (1/9)^1A^* + (13/9)^3A^*$$

In other words, $5^3A^* \rightarrow 4^1A + 1A^*$ is satisfied, and it is expected that, among triplet excitons initially generated, which account for 75%, one fifth thereof (i.e., 20%) is changed to singlet excitons. Accordingly, the amount of singlet excitons which contribute to emission is 40%, which is a value obtained by adding 15% (75%×(1/5)=15%) to 25%, which is the amount ratio of initially generated singlet excitons. At this time, a ratio of luminous intensity derived from TTF (TTF ratio) relative to the total luminous intensity is 15/40, i.e., 37.5%. Assuming that singlet excitons are generated by collision of initially generated triplet excitons accounting for 75% (i.e., one singlet exciton is generated from two triplet excitons), a significantly high internal quantum efficiency of 62.5% is obtained, which is a value obtained by adding 37.5% (75%×(1/2)=37.5%) to 25% (the amount ratio of initially generated singlet excitons). At this time, the TTF ratio is 37.5/62.5=60%.

According to the organic EL device according to an example of the exemplary embodiment, it is considered that triplet excitons generated by recombination of holes and electrons in the first emitting layer and existing on an interface between the first emitting layer and organic layer(s) in direct contact therewith are not likely to be quenched even under the presence of excessive carriers on the interface between the first emitting layer and the organic layer(s). For instance, the presence of a recombination region locally on an interface between the first emitting layer and a hole transporting layer or an electron blocking layer is considered to cause quenching by excessive electrons. Meanwhile, the presence of a recombination region locally on an interface between the first emitting layer and an electron transporting layer or a hole blocking layer is considered to cause quenching by excessive holes.

The organic electroluminescence device according to an example of the exemplary embodiment includes at least two emitting layers (i.e., the first and second emitting layers) satisfying a predetermined relationship, in which the triplet energy of the first host material $T_1(H1)$ in the first emitting layer and the triplet energy of the second host material $T_1(H2)$ in the second emitting layer satisfy the relationship of the numerical formula (Numerical Formula 1).

By including the first emitting layer and the second emitting layer so as to satisfy the relationship of the numerical formula (Numerical Formula 1), triplet excitons generated in the first emitting layer can transfer to the second emitting layer without being quenched by excessive carriers and be inhibited from back-transferring from the second emitting layer to the first emitting layer. Consequently, the second emitting layer exhibits the TTF mechanism to effectively generate singlet excitons, thereby improving the luminous efficiency.

As described above, since the organic electroluminescence device includes, as different regions, the first emitting layer mainly generating triplet excitons and the second emitting layer mainly exhibiting the TTF mechanism using triplet excitons having transferred from the first emitting layer, and has a difference in triplet energy provided by using a compound having a smaller triplet energy than that of the first host material in the first emitting layer as the second host material in the second emitting layer, the luminous efficiency is improved.

In the organic EL device according to the exemplary embodiment, the triplet energy of the first host material $T_1(H1)$ and the triplet energy of the second host material $T_1(H2)$ preferably satisfy a relationship of a numerical formula (Numerical Formula 1B) below.

$$T_1(H1) > T_1(H2) > 0.03 \text{ eV} \qquad \text{(Numerical Formula 1B)}$$

Herein, the "host material" refers to, for instance, a material that accounts for "50 mass % or more of the layer". That is, for instance, the first emitting layer contains 50 mass % or more of the first host material with respect to the total mass of the first emitting layer. For instance, the second emitting layer contains 50 mass % or more of the second host material with respect to the total mass of the second emitting layer.

First Emitting Layer

The first emitting layer contains the first host material. The first host material is a compound different from the second host material contained in the second emitting layer.

The first emitting layer preferably contains the first luminescent compound. The first luminescent compound preferably has a maximum peak wavelength of 500 nm or less, and more preferably has a maximum peak wavelength of 480 nm or less. The first luminescent compound preferably has a maximum peak wavelength of 430 nm or more.

The first luminescent compound is preferably a fluorescent compound that emits fluorescence having a maximum peak wavelength of 500 nm or less, and more preferably a fluorescent compound that emits fluorescence having a maximum peak wavelength in a range from 480 nm or less. The first luminescent compound is preferably a fluorescent compound that emits fluorescence having a maximum peak wavelength of 430 nm or more.

In the organic EL device according to the exemplary embodiment, the first luminescent compound is preferably a compound containing no azine ring structure in a molecule.

In the organic EL device according to the exemplary embodiment, the first luminescent compound is preferably not a boron-containing complex, more preferably not a complex.

In the organic EL device according to the exemplary embodiment, the first emitting layer preferably does not contain a metal complex. In the organic EL device according to the exemplary embodiment, the first emitting layer also preferably does not contain a boron-containing complex.

In the organic EL device according to the exemplary embodiment, the first emitting layer preferably does not contain a phosphorescent material (dopant material).

Further, the first emitting layer preferably does not contain a heavy-metal complex and a phosphorescent rare earth metal complex. Examples of the heavy-metal complex herein include iridium complex, osmium complex, and platinum complex.

A measurement method of the maximum peak wavelength of the compound is as follows. A toluene solution of a measurement target compound at a concentration of 5 μmol/L is prepared and put in a quartz cell. An emission spectrum (ordinate axis: luminous intensity, abscissa axis: wavelength) of each of the samples is measured at a normal temperature (300K). The emission spectrum can be measured using a spectrophotometer (machine name: F-7000) produced by Hitachi High-Tech Science Corporation. It should be noted that the apparatus for measuring the emission spectrum is not limited to the apparatus used herein.

A peak wavelength of the emission spectrum exhibiting the maximum luminous intensity is defined as the maximum peak wavelength. Herein, the maximum peak wavelength of fluorescence is occasionally referred to as a maximum fluorescence peak wavelength (FL-peak).

In an emission spectrum of the first emitting compound, where a peak exhibiting a maximum luminous intensity is defined as a maximum peak and a height of the maximum peak is defined as 1, heights of other peaks appearing in the emission spectrum are preferably less than 0.6. It should be noted that the peaks in the emission spectrum are defined as local maximum values.

Moreover, in the emission spectrum of the first luminescent compound, the number of peaks is preferably less than three.

In the organic EL device according to the exemplary embodiment, the first emitting layer emits light whose maximum peak wavelength is preferably 500 nm or less and more preferably 480 nm or less when the device is driven.

The maximum peak wavelength of the light emitted from the emitting layer when the device is driven is measured as follows.

Maximum Peak Wavelength λp of Light Emitted from Emitting Layer when Organic EL Device is Driven For a maximum peak wavelength $\lambda p_1$ of light emitted from the first emitting layer when the organic EL device is driven, the organic EL device is produced by using the material of the first emitting layer for the first emitting layer and the second emitting layer, and voltage is applied to the organic EL device so that a current density becomes 10 $mA/cm^2$, where spectral radiance spectrum is measured by a spectroradiometer CS-2000 (produced by Konica Minolta, Inc.). The maximum peak wavelength $\lambda p_1$ (unit: nm) is calculated from the obtained spectral radiance spectrum.

For a maximum peak wavelength $\lambda p_2$ of light emitted from the second emitting layer when the organic EL device is driven, the organic EL device is produced by using the material of the second emitting layer for the first emitting layer and the second emitting layer, and voltage is applied to the organic EL device so that a current density becomes 10 $mA/cm^2$, where spectral radiance spectrum is measured by a spectroradiometer CS-2000 (produced by Konica Minolta, Inc.). The maximum peak wavelength $\lambda p_2$ (unit: nm) is calculated from the obtained spectral radiance spectrum.

In the organic EL device according to the exemplary embodiment, a singlet energy of the first host material $S_1(H1)$ and a singlet energy of the first luminescent compound $S_1(D1)$ preferably satisfy a relationship of a numerical formula (Numerical Formula 5) below.

$$S_1(H1) > S_1(D1) \quad \text{(Numerical Formula 5)}$$

The singlet energy $S_1$ means an energy difference between the lowest singlet state and the ground state.

When the first host material and the first luminescent compound satisfy the relationship of the numerical formula (Numerical Formula 5), singlet excitons generated on the first host material easily transfer from the first host material to the first luminescent compound, thereby contributing to emission (preferably fluorescence) of the first luminescent compound.

In the organic EL device according to the exemplary embodiment, a triplet energy of the first host material $T_1(H1)$ and a triplet energy of the first luminescent compound $T_1(D1)$ preferably satisfy a relationship of a numerical formula (Numerical Formula 6) below.

$$T_1(D1) > T_1(H1) \quad \text{(Numerical Formula 6)}$$

When the first host material and the first luminescent compound satisfy the relationship of the numerical formula (Numerical Formula 6), triplet excitons generated in the first emitting layer transfer not onto the first luminescent compound having higher triplet energy but onto the first host material, thereby easily transferring to the second emitting layer.

The organic EL device according to the exemplary embodiment preferably satisfies a numerical formula (Numerical Formula 20B) below.

$$T_1(D1) > T_1(H1) > T_1(H2) \quad \text{(Numerical Formula 20B)}$$

Triplet Energy $T_1$

A method of measuring a triplet energy $T_1$ is exemplified by a method below.

A measurement target compound is dissolved in EPA (diethylether:isopentane:ethanol=5:5:2 in volume ratio) so as to fall within a range from $10^{-5}$ mol/L to $10^{-4}$ mol/L, and the obtained solution is encapsulated in a quartz cell to provide a measurement sample. A phosphorescence spectrum (ordinate axis: phosphorescent luminous intensity, abscissa axis: wavelength) of the measurement sample is measured at a low temperature (77K). A tangent is drawn to the rise of the phosphorescence spectrum close to the short-wavelength region. An energy amount is calculated by a conversion equation (F1) below on a basis of a wavelength value $\lambda_{edge}$ [nm] at an intersection of the tangent and the abscissa axis. The calculated energy amount is defined as triplet energy $T_1$.

$$T_1[\text{eV}] = 1239.85/\lambda_{edge} \quad \text{Conversion Equation (F1)}$$

The tangent to the rise of the phosphorescence spectrum close to the short-wavelength region is drawn as follows. While moving on a curve of the phosphorescence spectrum from the short-wavelength region to the local maximum value closest to the short-wavelength region among the local maximum values of the phosphorescence spectrum, a tangent is checked at each point on the curve toward the long-wavelength of the phosphorescence spectrum. An inclination of the tangent is increased along the rise of the curve (i.e., a value of the ordinate axis is increased). A tangent drawn at a point of the local maximum inclination (i.e., a tangent at an inflection point) is defined as the tangent to the rise of the phosphorescence spectrum close to the short-wavelength region.

A local maximum point where a peak intensity is 15% or less of the maximum peak intensity of the spectrum is not counted as the above-mentioned local maximum peak intensity closest to the short-wavelength region. The tangent drawn at a point that is closest to the local maximum peak intensity closest to the short-wavelength region and where the inclination of the curve is the local maximum is defined as a tangent to the rise of the phosphorescence spectrum close to the short-wavelength region.

For phosphorescence measurement, a spectrophotofluorometer body F-4500 (manufactured by Hitachi High-Technologies Corporation) is usable. Any device for phosphorescence measurement is usable. A combination of a cooling unit, a low temperature container, an excitation light source and a light-receiving unit may be used for phosphorescence measurement.

Singlet Energy $S_1$

A method of measuring a singlet energy $S_1$ with use of a solution (occasionally referred to as a solution method) is exemplified by a method below.

A toluene solution of a measurement target compound at a concentration ranging from $10^{-5}$ mol/L to $10^{-4}$ mol/L is prepared and put in a quartz cell. An absorption spectrum (ordinate axis: absorption intensity, abscissa axis: wavelength) of the thus-obtained sample is measured at a normal temperature (300K). A tangent is drawn to the fall of the absorption spectrum close to the long-wavelength region, and a wavelength value $\lambda_{edge}$ (nm) at an intersection of the tangent and the abscissa axis is assigned to a conversion equation (F2) below to calculate singlet energy.

$$S_1\,[\text{eV}] = 1239.85/\lambda_{edge} \qquad \text{Conversion Equation (F2)}$$

Any apparatus for measuring absorption spectrum is usable. For instance, a spectrophotometer (U3310 manufactured by Hitachi, Ltd.) is usable.

The tangent to the fall of the absorption spectrum close to the long-wavelength region is drawn as follows. While moving on a curve of the absorption spectrum from the local maximum value closest to the long-wavelength region, among the local maximum values of the absorption spectrum, in a long-wavelength direction, a tangent at each point on the curve is checked. An inclination of the tangent is decreased and increased in a repeated manner as the curve falls (i.e., a value of the ordinate axis is decreased). A tangent drawn at a point where the inclination of the curve is the local minimum closest to the long-wavelength region (except when absorbance is 0.1 or less) is defined as the tangent to the fall of the absorption spectrum close to the long-wavelength region.

The local maximum absorbance of 0.2 or less is not counted as the above-mentioned local maximum absorbance closest to the long-wavelength region.

In the organic EL device according to the exemplary embodiment, the first luminescent compound is preferably contained at 0.5 mass % or more in the first emitting layer. That is, the first emitting layer contains the first luminescent compound preferably at 0.5 mass % or more, more preferably at 1.0 mass % or more, still more preferably at 1.2 mass % or more, and still further more preferably at 1.5 mass % or more with respect to the total mass of the first emitting layer.

The first emitting layer contains the first luminescent compound preferably at 10 mass % or less, more preferably at 7 mass % or less, and still more preferably at 5 mass % or less with respect to the total mass of the first emitting layer.

In the organic EL device according to the exemplary embodiment, the first emitting layer contains a first compound as the first host material preferably at 60 mass % or more, more preferably at 70 mass % or more, still more preferably at 80 mass % or more, still further more preferably at 90 mass % or more, and yet still further more preferably at 95 mass % or more, with respect to the total mass of the first emitting layer.

The first emitting layer preferably contains the first host material at 99 mass % or less with respect to the total mass of the first emitting layer.

When the first emitting layer contains the first host material and the first luminescent compound, the upper limit of a total of the content ratios of the first host material and the first luminescent compound is 100 mass %.

In the exemplary embodiment, the first emitting layer may further contain any other material than the first host material and the first luminescent compound.

The first emitting layer may contain a single type of the first host material alone or may contain two or more types of the first host material. The first emitting layer may contain a single type of the first luminescent compound alone or may contain two or more types of the first luminescent compound.

Second Emitting Layer

The second emitting layer preferably contains the second host material. The second host material is a compound different from the first host material contained in the first emitting layer.

The second emitting layer preferably contains the second luminescent compound. The first luminescent compound and the second luminescent compound may be mutually the same or different.

The second luminescent compound preferably has a maximum peak wavelength of 500 nm or less, and more preferably has a maximum peak wavelength of 480 nm or less. The second luminescent compound preferably has a maximum peak wavelength of 430 nm or more.

The second luminescent compound is preferably a fluorescent compound that emits fluorescence having a maximum peak wavelength of 500 nm or less, more preferably a fluorescent compound that emits fluorescence having a maximum peak wavelength of 480 nm or less. The second luminescent compound is preferably a fluorescent compound that emits fluorescence having a maximum peak wavelength of 430 nm or more.

A method of measuring a maximum peak wavelength of a compound is as follows.

In the organic EL device according to the exemplary embodiment, the second emitting layer emits light whose maximum peak wavelength is preferably 500 nm or less and more preferably 480 nm or less when the device is driven.

In the organic EL device of the exemplary embodiment, the second luminescent compound preferably has a full width at half maximum in a range from 1 nm to 20 nm at a maximum peak.

In the organic EL device according to the exemplary embodiment, a Stokes shift of the second luminescent compound preferably exceeds 7 nm.

When the Stokes shift of the second luminescent compound exceeds 7 nm, a decrease in the luminous efficiency due to self-absorption is easily inhibited.

The self-absorption is a phenomenon in which emitted light is absorbed by the same compound to reduce luminous efficiency. The self-absorption is notably observed in a compound having a small Stokes shift (i.e., a large overlap between an absorption spectrum and a fluorescence spectrum). Accordingly, in order to reduce the self-absorption, it is preferable to use a compound having a large Stokes shift (i.e., a small overlap between the absorption spectrum and the fluorescence spectrum). The Stokes shift can be measured by a method described below.

A measurement target compound is dissolved in toluene at a concentration of $2.0\times10^{-5}$ mol/L to prepare a measurement sample. The measurement sample is put into a quartz cell and is irradiated with continuous light falling within an ultraviolet-to-visible region at a room temperature (300K) to measure an absorption spectrum (ordinate axis: absorbance, abscissa axis: wavelength). A spectrophotometer exemplified by U-3900/3900H produced by Hitachi High-Tech Science Corporation is usable for the absorption spectrum measurement. A measurement target compound is dissolved in toluene at a concentration of $4.9\times10^{-6}$ mol/L to prepare a measurement sample. The measurement sample was put into a quartz cell and was irradiated with excited light at a room temperature (300K) to measure fluorescence spectrum (ordinate axis: fluorescence intensity, abscissa axis: wavelength). A spectrophotofluorometer exemplified by F-7000 produced by Hitachi High-Tech Science Corporation is usable for the fluorescence spectrum measurement.

A difference between an absorption local-maximum wavelength and a fluorescence local-maximum wavelength is calculated from the absorption spectrum and the fluorescence spectrum to obtain a Stokes shift (SS). A unit of the Stokes shift (SS) is denoted by nm.

In the organic EL device according to the exemplary embodiment, a triplet energy of the second luminescent compound $T_1$(D2) and the triplet energy of the second host material $T_1$(H2) preferably satisfy a relationship of a numerical formula (Numerical Formula 8) below.

$$T_1(D2) > T_1(H2) \qquad \text{(Numerical Formula 8)}$$

In the organic EL device according to the exemplary embodiment, when the second luminescent compound and the second host material satisfy the relationship of the numerical formula (Numerical Formula 8), in transfer of triplet excitons generated in the first emitting layer to the second emitting layer, the triplet excitons energy-transfer not onto the second luminescent compound having higher triplet energy but onto molecules of the second host material. In addition, triplet excitons generated by recombination of holes and electrons on the second host material do not transfer to the second luminescent compound having higher triplet energy. Triplet excitons generated by recombination on molecules of the second luminescent compound quickly energy-transfer to molecules of the second host material.

Triplet excitons in the second host material do not transfer to the second luminescent compound but efficiently collide with one another on the second host material to generate singlet excitons by the TTF phenomenon.

In the organic EL device according to the exemplary embodiment, a singlet energy of the second host material $S_1$(H2) and the singlet energy of the second luminescent compound $S_1$(D2) preferably satisfy a relationship of a numerical formula (Numerical Formula 7) below.

$$S_1(H2) > S_1(D2) \qquad \text{(Numerical Formula 7)}$$

In the organic EL device according to the exemplary embodiment, when the second luminescent compound and the second host material satisfy the relationship of the numerical formula (Numerical formula 7), the singlet energy of the second luminescent compound is smaller than the singlet energy of the second host material, so that singlet excitons generated by the TTF phenomenon energy-transfer from the second host material to the second luminescent compound, thereby contributing to fluorescence of the second luminescent compound.

In the organic EL device according to the exemplary embodiment, the second luminescent compound is preferably a compound containing no azine ring structure in a molecule.

In the organic EL device of the exemplary embodiment, the second luminescent compound is preferably not a boron-containing complex, more preferably not a complex.

In the organic EL device according to the exemplary embodiment, the second emitting layer preferably does not contain a metal complex. In the organic EL device according to the exemplary embodiment, the second emitting layer also preferably does not contain a boron-containing complex.

In the organic EL device according to the exemplary embodiment, the second emitting layer preferably does not contain a phosphorescent material (dopant material).

Further, the second emitting layer preferably does not contain a heavy-metal complex and a phosphorescent rare earth metal complex. Examples of the heavy-metal complex herein include iridium complex, osmium complex, and platinum complex.

In the organic EL device according to the exemplary embodiment, the second luminescent compound is preferably contained at 0.5 mass % or more in the second emitting layer. That is, the second emitting layer contains the second luminescent compound preferably at 0.5 mass % or more, more preferably at 1.0 mass % or more, still more preferably at 1.2 mass % or more, and still further more preferably at 1.5 mass % or more with respect to the total mass of the second emitting layer.

The second emitting layer contains the second luminescent compound preferably at 10 mass % or less, more preferably at 7 mass % or less, and still more preferably at 5 mass % or less with respect to the total mass of the second emitting layer.

The second emitting layer contains a second compound as the second host material preferably at 60 mass % or more, more preferably at 70 mass % or more, still more preferably at 80 mass % or more, still further more preferably at 90 mass % or more, and yet still further more preferably at 95 mass % or more, with respect to the total mass of the second emitting layer.

The second emitting layer preferably contains the second host material at 99 mass % or less with respect to the total mass of the second emitting layer.

When the second emitting layer contains the second host material and the second luminescent compound, the upper limit of the total of the content ratios of the second host material and the second luminescent compound is 100 mass %.

In the exemplary embodiment, the second emitting layer may further contain any other material than the second host material and the second luminescent compound.

The second emitting layer may contain a single type of the second host material alone or may contain two or more types of the second host material. The second emitting layer may contain a single type of the second luminescent compound alone or may contain two or more types of the second luminescent compound.

In the organic EL device according to the exemplary embodiment, a triplet energy of the first luminescent compound or the second luminescent compound $T_1$(DX), the triplet energy of the first host material $T_1$(H1), and the triplet energy of the second host material preferably satisfy a relationship of a numerical formula (Numerical Formula 10) below.

$$2.6\,\text{eV} > T_1(DX) > T_1(H1) > T_1(H2) \quad \text{(Numerical Formula 10)}$$

The triplet energy of the first luminescent compound $T_1$(D1) preferably satisfies a relationship of a numerical formula (Numerical Formula 10A) below.

$$2.6\,\text{eV} > T_1(D1) > T_1(H1) > T_1(H2) \quad \text{(Numerical Formula 10A)}$$

The triplet energy of the second luminescent compound $T_1$(D2) preferably satisfies a relationship of a numerical formula (Numerical Formula 10B) below.

$$2.6\,\text{eV} > T_1(D2) > T_1(H1) > T_1(H2) \quad \text{(Numerical Formula 10B)}$$

In the organic EL device according to the above exemplary embodiment, the triplet energy of the first luminescent compound or the second luminescent compound $T_1$(DX) and the triplet energy of the first host material $T_1$(H1) preferably satisfy a relationship of a numerical formula (Numerical Formula 11) below.

$$0\,\text{eV} < T_1(DX) - T_1(H1) < 0.6\,\text{eV} \quad \text{(Numerical Formula 11)}$$

The triplet energy of the first luminescent compound $T_1$(D1) preferably satisfies a relationship of a numerical formula (Numerical Formula 11A) below.

$$0\,\text{eV} < T_1(D1) - T_1(H1) < 0.6\,\text{eV} \quad \text{(Numerical Formula 11A)}$$

The triplet energy of the second luminescent compound $T_1$(D2) preferably satisfies a relationship of a numerical formula (Numerical Formula 11B) below.

$$0\,\text{eV} < T_1(D2) - T_1(H2) < 0.8\,\text{eV} \quad \text{(Numerical Formula 11B)}$$

In the organic EL device according to the exemplary embodiment, the triplet energy of the first host material $T_1$(H1) preferably satisfies a relationship of a numerical formula (Numerical Formula 12) below.

$$T_1(H1) > 2.0\,\text{eV} \quad \text{(Numerical Formula 12)}$$

In the organic EL device according to the exemplary embodiment, the triplet energy of the first host material $T_1$(H1) also preferably satisfies a relationship of a numerical formula (Numerical Formula 12A) below, or also preferably satisfies a relationship of a numerical formula (Numerical Formula 12B).

$$T_1(H1) > 2.10\,\text{eV} \quad \text{(Numerical Formula 12A)}$$

$$T_1(H1) > 2.15\,\text{eV} \quad \text{(Numerical Formula 12B)}$$

In the organic EL device according to the exemplary embodiment, when the triplet energy of the first host material $T_1$(H1) satisfies the relationship of the numerical formula (Numerical Formula 12A) or the numerical formula (Numerical Formula 12B), triplet excitons generated in the first emitting layer easily transfer to the second emitting layer, and also are easily inhibited from back-transferring from the second emitting layer to the first emitting layer. Consequently, singlet excitons are efficiently generated in the second emitting layer, thereby improving luminous efficiency.

In the organic EL device according to the exemplary embodiment, the triplet energy of the first host material $T_1$(H1) also preferably satisfies a relationship of a numerical formula (Numerical Formula 12C) below, or also preferably satisfies a relationship of a numerical formula (Numerical Formula 12D) below.

$$2.08\,\text{eV} > T_1(H1) > 1.87\,\text{eV} \quad \text{(Numerical Formula 12C)}$$

$$2.08\,\text{eV} > T_1(H1) > 1.90\,\text{eV} \quad \text{(Numerical Formula 12D)}$$

In the organic EL device according to the exemplary embodiment, when the triplet energy of the first host material $T_1$(H1) satisfies the relationship of the numerical formula (Numerical Formula 12C) or the numerical formula (Numerical Formula 12D), energy of triplet excitons generated in the first emitting layer is decreased, so that the organic EL device is expected to have a long lifetime.

In the organic EL device according to the exemplary embodiment, the triplet energy of the first luminescent compound $T_1$(D1) also preferably satisfies a relationship of a numerical formula (Numerical Formula 14A) below, or also preferably satisfies a relationship of a numerical formula (Numerical Formula 14B) below.

$$2.60\,\text{eV} > T_1(D1) \quad \text{(Numerical Formula 14A)}$$

$$2.50\,\text{eV} > T_1(D1) \quad \text{(Numerical Formula 14B)}$$

Since the first emitting layer contains the first luminescent compound satisfying the relationship of the numerical formula (Numerical Formula 14A) or (Numerical Formula 14B), the lifetime of the organic EL device is prolonged.

In the organic EL device according to the exemplary embodiment, the triplet energy of the second luminescent compound $T_1$(D2) also preferably satisfies a relationship of a numerical formula (Numerical Formula 14C) below, or also preferably satisfies a relationship of a numerical formula (Numerical Formula 14D) below.

$$2.60\,\text{eV} > T_1(D2) \quad \text{(Numerical Formula 14C)}$$

$$2.50\,\text{eV} > T_1(D2) \quad \text{(Numerical Formula 14D)}$$

Since the second emitting layer contains the second luminescent compound satisfying the relationship of the numerical formula (Numerical Formula 14C) or (Numerical Formula 14D), the lifetime of the organic EL device is prolonged.

In the organic EL device according to the exemplary embodiment, the triplet energy of the second host material $T_1$(H2) preferably satisfies a relationship of a numerical formula (Numerical Formula 13) below.

$$T_1(H2) > 1.9\,\text{eV} \quad \text{(Numerical Formula 13)}$$

In the organic EL device according to the exemplary embodiment, the triplet energy of the second host material $T_1$(H2) also preferably satisfies a relationship of a numerical formula (Numerical Formula 13A) below.

$$1.9\,\text{eV} \geq T_1(H2) \geq 1.8\,\text{eV} \quad \text{(Numerical Formula 13A)}$$

In the organic EL device according to the exemplary embodiment, when the first emitting layer and the second emitting layer are layered in this order from a side on which the anode is provided, the electron mobility of the first host material μe(H1) and the electron mobility of the second host material μe(H2) also preferably satisfy a formula (Numerical Formula 30) below.

$$\mu e(H2) > \mu e(H1) \quad \text{(Numerical Formula 30)}$$

When the first host material and the second host material satisfy a relationship of the numerical formula (Numerical Formula 30), a recombination ability between holes and electrons in the first emitting layer is improved.

In the organic EL device according to the exemplary embodiment, when the first emitting layer and the second emitting layer are layered in this order from a side on which the anode is provided, the hole mobility of the first host material μh(H1) and the hole mobility of the second host material μh(H2) also preferably satisfy a formula (Numerical Formula 31) below.

$$\mu h(H1) > \mu h(H2) \quad \text{(Numerical Formula 31)}$$

In the organic EL device according to the exemplary embodiment, when the first emitting layer and the second emitting layer are layered in this order from a side on which the anode is provided, the hole mobility of the first host material μh(H1), the electron mobility of the first host material μe(H1), the hole mobility of the second host material μh(H2), and the electron mobility of the second host material μe(H2) also preferably satisfy a formula (Numerical Formula 32) below.

$$(\mu e(H2)/\mu h(H2)) > (\mu e(H1)/\mu h(H1)) \quad \text{(Numerical Formula 32)}$$

Electron mobility can be measured by measuring impedance using a device for mobility evaluation produced according to the following steps. The device for mobility evaluation is produced, for instance, according to the following steps.

A compound Target, which is to be measured for the electron mobility, is vapor-deposited on a glass substrate provided with an aluminum electrode (anode) in a manner to cover the aluminum electrode, thereby forming a measurement target layer. A compound ET-A below is vapor-deposited on the measurement target layer to form an electron transporting layer. LiF is vapor-deposited on the formed electron transporting layer to form an electron injecting layer. Metal aluminum (Al) is vapor-deposited on the electron injecting layer to form a metal cathode.

An arrangement of the above device for mobility evaluation is roughly shown as follows.

glass/Al (50)/Target (200)/ET-A (10)/LiF (1)/Al (50)

Numerals in parentheses represent a film thickness (nm).

[Formula 75]

ET-A

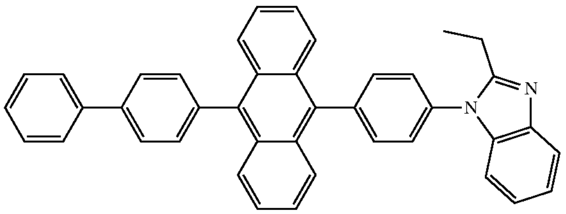

The device for evaluating electron mobility is set in an impedance measurement apparatus and an impedance measurement is performed. In the impedance measurement, a measurement frequency is swept from 1 Hz to 1 MHz. At this time, an alternating current amplitude of 0.1 V and a direct current voltage V are applied to the device. A modulus M is calculated from a measured impedance Z using a relationship of a calculation formula (C1) below.

$$M = j\omega Z \quad \text{Calculation Formula (C1)}$$

In the calculation formula (C1), j is an imaginary unit whose square is −1 and ω is an angular frequency [rad/s].

In a bode plot in which an imaginary part of the modulus M is represented by an ordinate axis and the frequency [Hz] is represented by an abscissa axis, an electrical time constant τ of the device for mobility evaluation is obtained from a frequency fmax showing a peak using a calculation formula (C2) below.

$$\tau = 1/(2\pi f max) \quad \text{Calculation Formula (C2)}$$

π in the calculation formula (C2) is a symbol representing a circumference ratio.

An electron mobility μe is calculated from a relationship of a calculation formula (C3-1) below using τ obtained above.

$$\mu e = d^2/(V\tau) \quad \text{Calculation Formula (C3-1)}$$

d in the calculation formula (C3-1) is a total film thickness of organic thin film(s) forming the device. In a case of the device arrangement for electron mobility evaluation, d=210 [nm] is satisfied.

Hole mobility can be measured by measuring impedance using a device for mobility evaluation produced according to the following steps. The device for mobility evaluation is produced, for instance, according to the following steps.

A compound HA-2 below is vapor-deposited on a glass substrate having an ITO transparent electrode (anode) so as to cover the transparent electrode, thereby forming a hole injecting layer. A compound HT-A was vapor-deposited on the hole injecting layer to form a hole transporting layer. Subsequently, a compound Target, which is to be measured for the hole mobility, is vapor-deposited to form a measurement target layer. Metal aluminum (Al) is vapor-deposited on the measurement target layer to form a metal cathode.

An arrangement of the above device for mobility evaluation is roughly shown as follows.

ITO (130)/HA-2 (5)/HT-A (10)/Target (200)/Al (80)

Numerals in parentheses represent a film thickness (nm).

[Formula 76]

HA-2

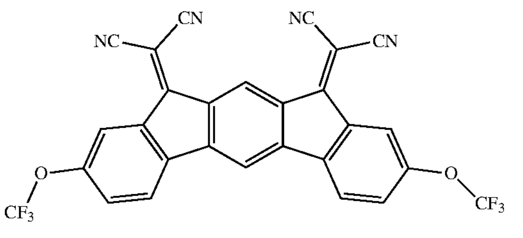

-continued

HT-A

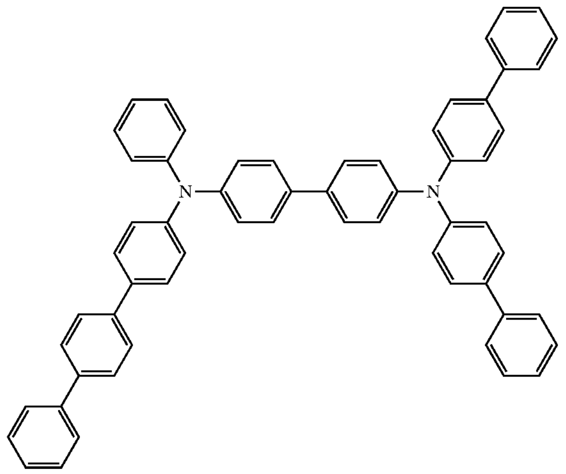

The device for evaluating hole mobility is set in an impedance measurement apparatus and an impedance measurement is performed. In the impedance measurement, a measurement frequency is swept from 1 Hz to 1 MHz. At this time, an alternating current amplitude of 0.1 V and a direct current voltage V are applied to the device. A modulus M is calculated from the measured impedance Z using a relationship of the above calculation formula (C1).

In a bode plot in which an imaginary part of the modulus M is represented by an ordinate axis and the frequency [Hz] was represented by an abscissa axis, an electrical time constant T of the device for mobility evaluation is obtained from a frequency fmax showing a peak using the above calculation formula (C2).

A hole mobility μh is calculated from a relationship of a calculation formula (C3-2) below using T obtained according to the calculation formula (C2).

$$\mu h = d^2/(V\tau) \quad \text{Calculation Formula (C3-2)}$$

d in the calculation formula (C3-2) is a total film thickness of organic thin film(s) forming the device. In a case of the device arrangement for hole mobility evaluation, d=215 [nm] is satisfied.

The hole mobility and electron mobility herein each are a value obtained in a case where a square root of an electric field intensity meets $E^{1/2}$=500 [$V^{1/2}/cm^{1/2}$]. The square root of the electric field intensity, $E^{1/2}$, can be calculated from a relationship of a calculation formula (C4) below.

$$E^{1/2} = V^{1/2}/d^{1/2} \quad \text{Calculation Formula (C4)}$$

For the impedance measurement, a 1260 type by Solartron Analytical is used as the impedance measurement apparatus, and for a higher accuracy, a 1296 type dielectric constant measurement interface by Solartron Analytical can be used together therewith.

In the organic EL device according to the exemplary embodiment, the first emitting layer is preferably in direct contact with the second emitting layer.

Herein, a layer arrangement in which "the first emitting layer and the second emitting layer are in direct contact with each other" may include, for instance, one of embodiments (LS1), (LS2), and (LS3) below.

(LS1) An embodiment in which a region containing both the first host material and the second host material is generated in a process of vapor-depositing the compound of the first emitting layer and vapor-depositing the compound of the second emitting layer, and is present on the interface between the first emitting layer and the second emitting layer.

(LS2) An embodiment in which in a case of containing an luminescent compound in the first emitting layer and the second emitting layer, a region containing the first host material, the second host material and the luminescent compound is generated in a process of vapor-depositing the compound of the first emitting layer and vapor-depositing the compound of the second emitting layer, and is present on the interface between the first emitting layer and the second emitting layer.

(LS3) An embodiment in which in a case of containing an luminescent compound in the first emitting layer and the second emitting layer, a region containing the luminescent compound, a region containing the first host material or a region containing the second host material is generated in a process of vapor-depositing the compound of the first emitting layer and vapor-depositing the compound of the second emitting layer, and is present on the interface between the first emitting layer and the second emitting layer.

Third Emitting Layer

The organic EL device according to the exemplary embodiment may further include a third emitting layer.

The third emitting layer preferably contains a third host material. The first host material, the second host material, and the third host material are preferably mutually different.

The third emitting layer preferably contains a third luminescent compound. The third luminescent compound preferably has a maximum peak wavelength of 500 nm or less. The third luminescent compound is preferably a fluorescent compound that emits fluorescence having a maximum peak wavelength of 500 nm or less. A method of measuring a maximum peak wavelength of a compound is as follows. The first luminescent compound, the second luminescent compound, and the third luminescent compound are mutually the same or different.

When the organic EL device according to the exemplary embodiment includes the third emitting layer, the triplet energy of the first host material $T_1(H1)$ and a triplet energy of the third host material $T_1(H3)$ preferably satisfy a relationship of a numerical formula (Numerical Formula 1C) below.

$$T_1(H1) > T_1(H3) \quad \text{(Numerical Formula 1C)}$$

When the organic EL device according to the exemplary embodiment includes the third emitting layer, the triplet energy of the second host material $T_1(H2)$ and the triplet energy of the third host material $T_1(H3)$ also preferably satisfy a relationship of a numerical formula (Numerical Formula 1D) below, and also preferably satisfy a relationship of a numerical formula (Numerical Formula 1E) below.

$$T_1(H3) > T_1(H2) \quad \text{(Numerical Formula 1D)}$$

$$T_1(H1) > T_1(H3) > T_1(H2) \quad \text{(Numerical Formula 1E)}$$

When the organic EL device according to the exemplary embodiment includes the third emitting layer, the triplet energy of the second host material $T_1(H2)$ and the triplet energy of the third host material $T_1(H3)$ also preferably satisfy a relationship of a numerical formula (Numerical Formula 1F) below, and also preferably satisfy a relationship of a numerical formula (Numerical Formula 1 G) below.

$$T_1(H2) > T_1(H3) \quad \text{(Numerical Formula 1F)}$$

$$T_1(H1) > T_1(H2) > T_1(H3) \quad \text{(Numerical Formula 1G)}$$

When the organic EL device according to the exemplary embodiment includes the third emitting layer, the first emitting layer and the second emitting layer may be in direct contact with each other and the second emitting layer and the third emitting layer may be in direct contact with each other.

Herein, a layer arrangement in which "the second emitting layer and the third emitting layer are in direct contact with each other" may include, for instance, one of embodiments (LS4), (LS5), and (LS6) below.

(LS4) An embodiment in which a region containing both the second host material and the third host material is generated in a process of vapor-depositing the compound of the second emitting layer and vapor-depositing the compound of the third emitting layer, and is present on the interface between the second emitting layer and the third emitting layer.

(LS5) An embodiment in which in a case of containing a luminescent compound in the second emitting layer and the third emitting layer, a region containing the second host material, the third host material and the luminescent compound is generated in a process of vapor-depositing the compound of the second emitting layer and vapor-depositing the compound of the third emitting layer, and is present on the interface between the second emitting layer and the third emitting layer.

(LS6) An embodiment in which in a case of containing a luminescent compound in the second emitting layer and the third emitting layer, a region containing the luminescent compound, a region containing the second host material or a region containing the third host material is generated in a process of vapor-depositing the compound of the second emitting layer and vapor-depositing the compound of the third emitting layer, and is present on the interface between the second emitting layer and the third emitting layer.

Interposed Layer

The organic EL device according to the exemplary embodiment may include an interposed layer as an organic layer disposed between the first emitting layer and the second emitting layer.

In the exemplary embodiment, in order to inhibit an overlap between a Singlet emitting region and a TTF emitting region, the interposed layer contains no luminescent compound or may contain a luminescent compound in an insubstantial amount provided that the overlap can be inhibited.

For instance, the interposed layer contains 0 mass % of a luminescent compound. Alternatively, for instance, the interposed layer may contain a luminescent compound provided that the luminescent compound contained is a component accidentally mixed in a producing process or a component contained as impurities in a material.

For instance, when the interposed layer consists of a material A, a material B, and a material C, the content ratios of the materials A, B, and C in the interposed layer are each 10 mass % or more, and the total of the content ratios of the materials A, B, and C is 100 mass %.

In the following, the interposed layer is occasionally referred to as a "non-doped layer". A layer containing the luminescent compound is occasionally referred to as a "doped layer".

It is considered that luminous efficiency is improvable in an arrangement including layered emitting layers because the Singlet emitting region and the TTF emitting region are typically likely to be separated from each other.

In the organic EL device of the exemplary embodiment, when the interposed layer (non-doped layer) is disposed between the first emitting layer and the second emitting layer in the emitting region, it is expected that a region where the Singlet emitting region and the TTF emitting region overlap with each other is reduced to inhibit a decrease in TTF efficiency which may otherwise be caused by collision between triplet excitons and carriers. That is, it is considered that providing the interposed layer (non-doped layer) between the emitting layers contributes to the improvement in TTF emission efficiency.

The interposed layer is the non-doped layer.

The interposed layer contains no metal atom. The interposed layer thus contains no metal complex.

The interposed layer contains an interposed layer material. The interposed layer material is not a luminescent compound.

The interposed layer material may be any material except for the luminescent compound.

Examples of the interposed layer material include: 1) a heterocyclic compound such as an oxadiazole derivative, benzimidazole derivative, or phenanthroline derivative; 2) a fused aromatic compound such as a carbazole derivative, anthracene derivative, phenanthrene derivative, pyrene derivative or chrysene derivative; and 3) an aromatic amine compound such as a triarylamine derivative or a fused polycyclic aromatic amine derivative.

One or both of the first host material and the second host material may be used as the interposed layer material. The interposed layer material may be any material provided that the Singlet emitting region and the TTF emitting region are separated from each other and the Singlet emission and the TTF emission are not hindered.

In the organic EL device according to the exemplary embodiment, the respective content ratios of all the materials forming the interposed layer in the interposed layer are 10 mass % or more.

The interposed layer contains the interposed layer material as a material forming the interposed layer.

The interposed layer preferably contains 60 mass % or more of the interposed layer material, more preferably contains 70 mass % or more of the interposed layer material, still more preferably contains 80 mass % or more of the interposed layer material, still further more preferably 90 mass % or more of the interposed layer material, and yet still further more preferably 95 mass % or more of the interposed layer material, with respect to the total mass of the interposed layer.

The interposed layer may contain a single type of the interposed layer material or may contain two or more types of the interposed layer material.

When the interposed layer contains two or more types of the interposed layer material, the upper limit of the total of the content ratios of the two or more types of the interposed layer material is 100 mass %.

It should be noted that the interposed layer of the exemplary embodiment may further contain any other material than the interposed layer material.

The interposed layer may be provided in the form of a single layer or a laminate of two or more layers.

As long as the overlap between the Singlet emitting region and the TTF emitting region is inhibited, the film thickness of the interposed layer is not particularly limited, but each layer in the interposed layer is preferably in a range from 3 nm to 15 nm, more preferably in a range from 5 nm to 10 nm.

The interposed layer having a film thickness of 3 nm or more easily separates the Singlet emitting region from the emitting region derived from TTF.

The interposed layer having a film thickness of 15 nm or less easily inhibits a phenomenon in which the host material of the interposed layer emits light.

It is preferable that the interposed layer contains the interposed layer material as a material forming the interposed layer and the triplet energy of the first host material $T_1(H1)$, the triplet energy of the second host material $T_1(H2)$, and a triplet energy of at least one interposed layer material $T_1(M_{mid})$ satisfy a relationship of a numerical formula (Numerical Formula 21) below.

$$T_1(H1) \geq T_1(M_{mid}) \geq T_1(H2) \quad \text{(Numerical Formula 21)}$$

When the interposed layer contains two or more interposed layer materials as a material forming the interposed layer, the triplet energy of the first host material $T_1(H1)$, the triplet energy of the second host material $T_1(H2)$, and a triplet energy of each interposed layer material $T_1(M_{EA})$ more preferably satisfy a relationship of a numerical formula (Numerical Formula 21A) below.

$$T_1(H1) \geq T_1(M_{EA}) \geq T_1(H2) \quad \text{(Numerical Formula 21A)}$$

Additional Layers of Organic EL Device

The organic EL device according to the exemplary embodiment may include one or more organic layers in addition to the first emitting layer and the second emitting layer. Examples of the organic layer include at least one layer selected from the group consisting of a hole injecting layer, a hole transporting layer, an electron blocking layer, a hole blocking layer, an electron injecting layer, and an electron transporting layer.

In the organic EL device according to the exemplary embodiment, the organic layer may consist of the first emitting layer and the second emitting layer. Additionally, the organic layer may further include, for instance, at least one layer selected from the group consisting of the hole injecting layer, the hole transporting layer, the electron blocking layer, the hole blocking layer, the electron injecting layer, and the electron transporting layer.

In the organic EL device according to the exemplary embodiment, the first emitting layer is also preferably disposed between the anode and the second emitting layer.

In the organic EL device according to the exemplary embodiment, the second emitting layer is also preferably disposed between the anode and the first emitting layer.

In the organic EL device according to the exemplary embodiment, one of the first emitting layer and the second emitting layer is preferably a layer disposed closest to the cathode among a plurality of layers of the emitting region.

The organic EL device according to the exemplary embodiment may include the anode, the first emitting layer, the second emitting layer, and the cathode in this order. Alternatively, the order of the first emitting layer and the second emitting layer may be reversed. Specifically, the organic EL device according to the exemplary embodiment may include the anode, the second emitting layer, the first emitting layer, and the cathode in this order. Regardless of the order of the first emitting layer and the second emitting layer, the effect obtained by layering the first and second emitting layers can be expected by selecting a combination of materials satisfying the relationship of the numerical formula (Numerical Formula 1).

FIG. 1 schematically illustrates an exemplary arrangement of the organic EL device according to the exemplary embodiment.

An organic EL device 1 includes a light-transmissive substrate 2, an anode 3, a cathode 4, and organic layers 10 provided between the anode 3 and the cathode 4. The organic layers 10 include a hole injecting layer 61, a hole transporting layer 62, a first emitting layer 51, a second emitting layer 52, an electron transporting layer 71, and an electron injecting layer 72 that are layered on the anode 3 in this order. An emitting region 5 of the organic EL device 1 includes the first emitting layer 51 on a side close to the anode 3 and the second emitting layer 52 on a side close to the cathode 4.

FIG. 2 schematically illustrates another exemplary arrangement of the organic EL device according to the exemplary embodiment.

An organic EL device 1A includes the light-transmissive substrate 2, the anode 3, the cathode 4, and organic layers 10A provided between the anode 3 and the cathode 4. The organic layers 10A include the hole injecting layer 61, the hole transporting layer 62, the second emitting layer 52, the first emitting layer 51, the electron transporting layer 71, and the electron injecting layer 72 that are layered on the anode 3 in this order. An emitting region 5A of the organic EL device 1A includes the second emitting layer 52 on a side close to the anode 3 and the first emitting layer 51 on a side close to the cathode 4.

The invention is not limited to the exemplary arrangements of the organic EL devices illustrated in FIGS. 1 to 2.

The arrangements of the organic EL devices will be further described below. It should be noted that the reference numerals are occasionally omitted below.

Substrate

The substrate is used as a support for the organic EL device. For instance, glass, quartz, plastics and the like are usable for the substrate. A flexible substrate is also usable. The flexible substrate is a bendable substrate, which is exemplified by a plastic substrate. Examples of the material for the plastic substrate include polycarbonate, polyarylate, polyethersulfone, polypropylene, polyester, polyvinyl fluoride, polyvinyl chloride, polyimide, and polyethylene naphthalate. Further, an inorganic vapor deposition film is also usable.

Anode

Metal, an alloy, an electrically conductive compound, a mixture thereof, or the like having a large work function (specifically, 4.0 eV or more) is preferably used as the anode formed on the substrate. Specific examples of the material include ITO (Indium Tin Oxide), indium oxide-tin oxide containing silicon or silicon oxide, indium oxide-zinc oxide, indium oxide containing tungsten oxide and zinc oxide, and graphene. In addition, gold (Au), platinum (Pt), nickel (Ni), tungsten (W), chrome (Cr), molybdenum (Mo), iron (Fe), cobalt (Co), copper (Cu), palladium (Pd), titanium (Ti), and nitrides of a metal material (e.g., titanium nitride) are usable.

The material is typically formed into a film by a sputtering method. For instance, the indium oxide-zinc oxide can be formed into a film by the sputtering method using a target in which zinc oxide in a range from 1 mass % to 10 mass % is added to indium oxide. Moreover, for instance, the indium oxide containing tungsten oxide and zinc oxide can be formed by the sputtering method using a target in which tungsten oxide in a range from 0.5 mass % to 5 mass % and zinc oxide in a range from 0.1 mass % to 1 mass % are added to indium oxide. In addition, the anode may be formed by a vacuum deposition method, a coating method, an inkjet method, a spin coating method or the like.

Among the organic layers formed on the anode, since the hole injecting layer adjacent to the anode is formed of a composite material into which holes are easily injectable irrespective of the work function of the anode, a material usable as an electrode material (e.g., metal, an alloy, an electroconductive compound, a mixture thereof, and the elements belonging to the group 1 or 2 of the periodic table) is also usable for the anode.

A material having a small work function such as elements belonging to Groups 1 and 2 in the periodic table of the elements, specifically, an alkali metal such as lithium (Li) and cesium (Cs), an alkaline earth metal such as magnesium (Mg), calcium (Ca) and strontium (Sr), alloys (e.g., MgAg and AlLi) including the alkali metal or the alkaline earth metal, a rare earth metal such as europium (Eu) and ytterbium (Yb), alloys including the rare earth metal are also usable for the anode. It should be noted that the vacuum deposition method and the sputtering method are usable for forming the anode using the alkali metal, alkaline earth metal and the alloy thereof. Further, when a silver paste is used for the anode, the coating method and the inkjet method are usable.

Cathode

It is preferable to use metal, an alloy, an electroconductive compound, a mixture thereof, or the like having a small work function (specifically, 3.8 eV or less) for the cathode. Examples of the material for the cathode include elements belonging to Groups 1 and 2 in the periodic table of the elements, specifically, an alkali metal such as lithium (Li) and cesium (Cs), an alkaline earth metal such as magnesium (Mg), calcium (Ca) and strontium (Sr), alloys (e.g., MgAg and AlLi) including the alkali metal or the alkaline earth metal, a rare earth metal such as europium (Eu) and ytterbium (Yb), and alloys including the rare earth metal.

It should be noted that the vacuum deposition method and the sputtering method are usable for forming the cathode using the alkali metal, alkaline earth metal and the alloy thereof. Further, when a silver paste is used for the cathode, the coating method and the inkjet method are usable.

By providing the electron injecting layer, various conductive materials such as Al, Ag, ITO, graphene, and indium oxide-tin oxide containing silicon or silicon oxide may be used for forming the cathode regardless of the work function. The conductive materials can be formed into a film using the sputtering method, inkjet method, spin coating method and the like.

Hole Injecting Layer

The hole injecting layer is a layer containing a substance exhibiting a high hole injectability. Examples of the substance exhibiting a high hole injectability include molybdenum oxide, titanium oxide, vanadium oxide, rhenium oxide, ruthenium oxide, chrome oxide, zirconium oxide, hafnium oxide, tantalum oxide, silver oxide, tungsten oxide, and manganese oxide.

In addition, the examples of the highly hole-injectable substance include: an aromatic amine compound, which is a low-molecule organic compound, such that 4,4',4"-tris(N,N-diphenylamino)triphenylamine (abbreviation: TDATA), 4,4',4"-tris[N-(3-methylphenyl)-N-phenylamino]triphenylamine (abbreviation: MTDATA), 4,4'-bis[N-(4-diphenylaminophenyl)-N-phenylamino]biphenyl(abbreviation: DPAB), 4,4'-bis(N-{4-[N'-(3-methylphenyl)-N'-phenylamino]phenyl}-N-phenylamino)biphenyl (abbreviation: DNTPD), 1,3,5-tris[N-(4-diphenylaminophenyl)-N-phenylamino]benzene (abbreviation: DPA3B), 3-[N-(9-phenylcarbazole-3-yl)-N-phenylamino]-9-phenylcarbazole (abbreviation: PCzPCA1), 3,6-bis[N-(9-phenylcarbazole-3-yl)-N-phenylamino]-9-phenylcarbazole (abbreviation: PCzPCA2), and 3-[N-(1-naphthyl)-N-(9-phenylcarbazole-3-yl)amino]-9-phenylcarbazole (abbreviation: PCzPCN1); and dipyrazino[2,3-f:20,30-h]quinoxaline-2,3,6,7,10,11-hexacarbonitrile (HAT-CN).

In addition, a high polymer compound (e.g., oligomer, dendrimer and polymer) is usable as the substance exhibiting a high hole injectability. Examples of the high-molecule compound include poly(N-vinylcarbazole) (abbreviation: PVK), poly(4-vinyltriphenylamine) (abbreviation: PVTPA), poly[N-(4-{N'-[4-(4-diphenylamino)phenyl]phenyl-N'-phenylamino}phenyl)methacrylamide](abbreviation: PTPDMA), and poly[N,N'-bis(4-butylphenyl)-N,N'-bis(phenyl)benzidine] (abbreviation: Poly-TPD). Moreover, an acid-added high polymer compound such as poly(3,4-ethylenedioxythiophene)/poly(styrene sulfonic acid) (PEDOT/PSS) and polyaniline/poly(styrene sulfonic acid) (PAni/PSS) are also usable.

Hole Transporting Layer

The hole transporting layer is a layer containing a highly hole-transporting substance. An aromatic amine compound, carbazole derivative, anthracene derivative and the like are usable for the hole transporting layer. Specific examples of a material for the hole transporting layer include 4,4'-bis[N-(1-naphthyl)-N-phenylamino]biphenyl (abbreviation: NPB), N,N'-bis(3-methylphenyl)-N,N'-diphenyl-[1,1'-biphenyl]-4,4'-diamine (abbreviation: TPD), 4-phenyl-4'-(9-phenylfluorene-9-yl)triphenylamine (abbreviation: BAFLP), 4,4'-bis[N-(9,9-dimethylfluorene-2-yl)-N-phenylamino]biphenyl (abbreviation: DFLDPBi), 4,4',4"-tris(N,N-diphenylamino)triphenylamine (abbreviation: TDATA), 4,4',4"-tris[N-(3-methylphenyl)-N-phenylamino]triphenylamine (abbreviation: MTDATA), and 4,4'-bis[N-(spiro-9,9'-bifluorene-2-yl)-N-phenylamino]biphenyl (abbreviation: BSPB). The above-described substances mostly have a hole mobility of $10^{-6}$ $cm^2/(V \cdot s)$ or more.

For the hole transporting layer, a carbazole derivative such as CBP, 9-[4-(N-carbazolyl)]phenyl-10-phenylanthracene (CzPA), and 9-phenyl-3-[4-(10-phenyl-9-anthryl)phenyl]-9H-carbazole (PCzPA) and an anthracene derivative such as t-BuDNA, DNA, and DPAnth may be used. A high polymer compound such as poly(N-vinylcarbazole) (abbreviation: PVK) and poly(4-vinyltriphenylamine) (abbreviation: PVTPA) is also usable.

However, in addition to the above substances, any substance exhibiting a higher hole transportability than an electron transportability may be used. It should be noted that the layer containing the substance exhibiting a high hole transportability may be not only a single layer but also a laminate of two or more layers formed of the above substance(s).

Electron Transporting Layer

The electron transporting layer is a layer containing a highly electron-transporting substance. For the electron transporting layer, 1) a metal complex such as an aluminum complex, beryllium complex, and zinc complex, 2) a hetero aromatic compound such as imidazole derivative, benzimidazole derivative, azine derivative, carbazole derivative, and phenanthroline derivative, and 3) a high polymer compound are usable. Specifically, as a low-molecule organic compound, a metal complex such as Alq, tris(4-methyl-8-quinolinato)aluminum (abbreviation: $Almq_3$), bis(10-hydroxybenzo[h]quinolinato)beryllium (abbreviation: $BeBq_2$), BAlq, Znq, ZnPBO and ZnBTZ is usable. In addition to the metal complex, a heteroaromatic compound such as 2-(4-biphenylyl)-5-(4-tert-butylphenyl)-1,3,4-oxadiazole (abbreviation: PBD), 1,3-bis[5-(ptert-butylphenyl)-1,3,4-oxadiazole-2-yl]benzene (abbreviation: OXD-7), 3-(4-tert-butylphenyl)-4-phenyl-5-(4-biphenylyl)-1,2,4-triazole (abbreviation: TAZ), 3-(4-tert-butylphenyl)-4-(4-ethylphenyl)-5-(4-biphenylyl)-1,2,4-triazole (abbreviation: p-EtTAZ), bathophenanthroline (abbreviation: BPhen), bathocuproine (abbreviation: BCP), and 4,4'-bis(5-methylbenzoxazole-2-yl)stilbene (abbreviation: BzOs) is usable. In the exemplary embodiment, a benzimidazole compound is preferably usable. The above-described substances mostly have an electron mobility of $10^{-6}$ $cm^2/(V \cdot s)$ or more. It should be noted that any other substance than the above substance may be used for the electron transporting layer as long as the substance exhibits a higher electron transportability than the hole transportability. The electron transporting layer may be provided in the form of a single layer or a laminate of two or more layers of the above substance(s).

Further, a high polymer compound is usable for the electron transporting layer. For instance, poly[(9,9-dihexylfluorene-2,7-diyl)-co-(pyridine-3,5-diyl)](abbreviation: PF-Py), poly[(9,9-dioctylfluorene-2,7-diyl)-co-(2,2'-bipyridine-6,6'-diyl)](abbreviation: PF-BPy) and the like are usable.

Electron Injecting Layer

The electron injecting layer is a layer containing a highly electron-injectable substance. Examples of a material for the electron injecting layer include an alkali metal, alkaline earth metal and a compound thereof, examples of which include lithium (Li), cesium (Cs), calcium (Ca), lithium fluoride (LiF), cesium fluoride (CsF), calcium fluoride ($CaF_2$), and lithium oxide (LiOx). In addition, the alkali metal, alkaline earth metal or the compound thereof may be added to the substance exhibiting the electron transportability in use. Specifically, for instance, magnesium (Mg) added to Alq may be used. In this case, the electrons can be more efficiently injected from the cathode.

Alternatively, the electron injecting layer may be provided by a composite material in a form of a mixture of the organic compound and the electron donor. Such a composite material exhibits excellent electron injectability and electron transportability since electrons are generated in the organic compound by the electron donor. In this case, the organic compound is preferably a material excellent in transporting the generated electrons. Specifically, the above examples (e.g., the metal complex and the hetero aromatic compound) of the substance forming the electron transporting layer are usable. As the electron donor, any substance exhibiting electron donating property to the organic compound is usable. Specifically, the electron donor is preferably alkali metal, alkaline earth metal and rare earth metal such as lithium, cesium, magnesium, calcium, erbium and ytterbium. The electron donor is also preferably alkali metal oxide and alkaline earth metal oxide such as lithium oxide, calcium oxide, and barium oxide. Moreover, a Lewis base such as magnesium oxide is usable. Further, the organic compound such as tetrathiafulvalene (abbreviation: TTF) is usable.

Layer Formation Method

A method for forming each layer of the organic EL device in the exemplary embodiment is subject to no limitation except for the above particular description. However, known methods of dry film-forming such as vacuum deposition, sputtering, plasma or ion plating and wet film-forming such as spin coating, dipping, flow coating or ink-jet are applicable.

Film Thickness

The film thickness of each of the organic layers of the organic EL device according to the exemplary embodiment is not limited unless otherwise specified in the above. In general, the thickness preferably ranges from several nanometers to 1 μm because an excessively small film thickness is likely to cause defects (e.g. pin holes) and an excessively large thickness leads to the necessity of applying high voltage and consequent reduction in efficiency.

Second Host Material and Third Host Material

In the organic EL device of the exemplary embodiment, the second host material and the third host material are exemplified by a second compound represented by a formula (2) below, which is not exhaustive.

Second Compound

In the organic EL device according to the exemplary embodiment, the second compound is preferably a compound represented by the formula (2) below. The second host material is preferably a second compound represented by the formula (2) below.

[Formula 77]

(2)

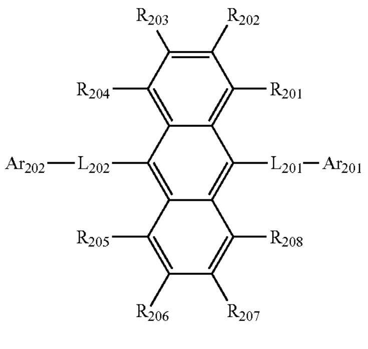

In the formula (2):

$R_{201}$ to $R_{208}$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by $—Si(R_{901})(R_{902})(R_{903})$, a group represented by $—O—(R_{904})$, a group represented by $—S—(R_{905})$, a group represented by $—N(R_{906})(R_{907})$, a substituted or unsubstituted aralkyl group having 7 to 50 carbon atoms, a group represented by $—C(=O)R_{801}$, a group represented by $—COOR_{802}$, a halogen atom, a cyano group, a nitro group, a substituted or unsubstituted aryl group having 6 to 50 ring carbon atoms, or a substituted or unsubstituted heterocyclic group having 5 to 50 ring atoms;

$L_{201}$ and $L_{202}$ are each independently a single bond, a substituted or unsubstituted arylene group having 6 to 50 ring carbon atoms, or a substituted or unsubstituted divalent heterocyclic group having 5 to 50 ring atoms; and $Ar_{201}$ and $Ar_{202}$ are each independently a substituted or unsubstituted aryl group having 6 to 50 ring carbon atoms, or a substituted or unsubstituted heterocyclic group having 5 to 50 ring atoms.

In the second compound according to the exemplary embodiment, $R_{901}$, $R_{902}$, $R_{903}$, $R_{904}$, $R_{905}$, $R_{906}$, $R_{907}$, $R_{801}$ and $R_{802}$ are each independently a hydrogen atom, a substituted or unsubstituted alkyl group having 1 to 50 carbon atoms, a substituted or unsubstituted cycloalkyl group having 3 to 50 ring carbon atoms, a substituted or unsubstituted aryl group having 6 to 50 ring carbon atoms, or a substituted or unsubstituted heterocyclic group having 5 to 50 ring atoms;

when a plurality of $R_{901}$ are present, the plurality of $R_{901}$ are mutually the same or different;

when a plurality of $R_{902}$ are present, the plurality of $R_{902}$ are mutually the same or different;

when a plurality of $R_{903}$ are present, the plurality of $R_{903}$ are mutually the same or different;

when a plurality of $R_{904}$ are present, the plurality of $R_{904}$ are mutually the same or different;

when a plurality of $R_{905}$ are present, the plurality of $R_{905}$ are mutually the same or different;

when a plurality of $R_{906}$ are present, the plurality of $R_{906}$ are mutually the same or different;

when a plurality of $R_{907}$ are present, the plurality of $R_{907}$ are mutually the same or different;

when a plurality of $R_{801}$ are present, the plurality of $R_{801}$ are mutually the same or different; and when a plurality of $R_{802}$ are present, the plurality of $R_{802}$ are mutually the same or different.

In the organic EL device according to the exemplary embodiment, it is preferable that $R_{201}$ to $R_{208}$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by $—Si(R_{901})(R_{902})(R_{903})$, a group represented by $—O—(R_{904})$, a group represented by $—S—(R_{905})$, a group represented by $—N(R_{906})(R_{907})$, a substituted or unsubstituted aralkyl group having 7 to 50 carbon atoms, a group represented by $—C(=O)R_{801}$, a group represented by $—COOR_{802}$, a halogen atom, a cyano group, or a nitro group; $L_{201}$ and $L_{202}$ are each independently a single bond, a substituted or unsubstituted arylene group having 6 to 50 ring carbon atoms, or a substituted or unsubstituted divalent heterocyclic group having 5 to 50 ring atoms; and $Ar_{201}$ and $Ar_{202}$ are each independently a substituted or unsubstituted aryl group having 6 to 50 ring carbon atoms, or a substituted or unsubstituted heterocyclic group having 5 to 50 ring atoms.

In the organic EL device according to the exemplary embodiment, it is preferable that $L_{201}$ and $L_{202}$ are each independently a single bond, or a substituted or unsubstituted arylene group having 6 to 50 ring carbon atoms; and $Ar_{201}$ and $Ar_{202}$ are each independently a substituted or unsubstituted aryl group having 6 to 50 ring carbon atoms.

In the organic EL device according to the exemplary embodiment, it is preferable that $Ar_{201}$ and $Ar_{202}$ are each independently a phenyl group, naphthyl group, phenanthryl group, biphenyl group, terphenyl group, diphenylfluorenyl group, dimethylfluorenyl group, benzodiphenylfluorenyl group, benzodimethylfluorenyl group, dibenzofuranyl group, dibenzothienyl group, naphthobenzofuranyl group, or naphthobenzothienyl group.

In the organic EL device according to the exemplary embodiment, the second compound represented by the formula (2) is preferably a compound represented by a formula (201), a formula (202), a formula (203), a formula (204), a formula (205), a formula (206), a formula (207), a formula (208), or a formula (209) below.

[Formula 78]

(201)

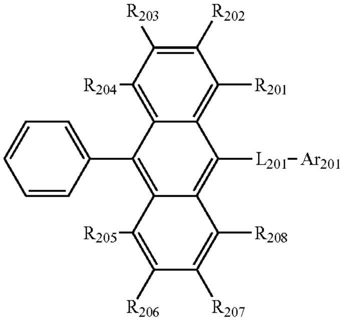

[Formula 79]

(202)

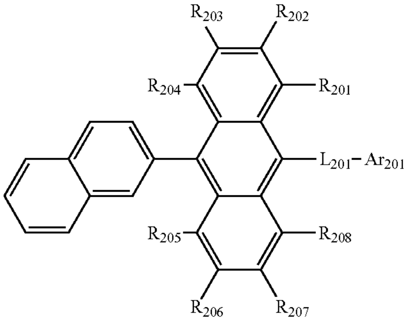

[Formula 80]

(203)

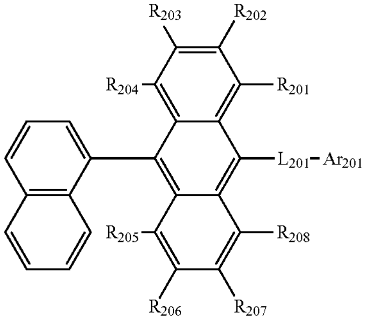

-continued

[Formula 81]

(204)

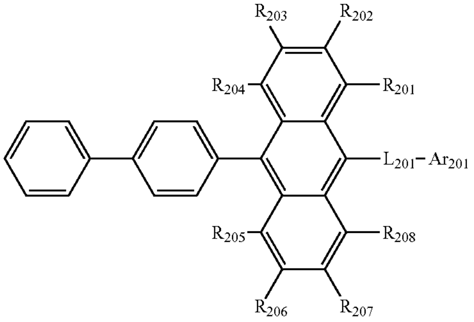

[Formula 82]

(205)

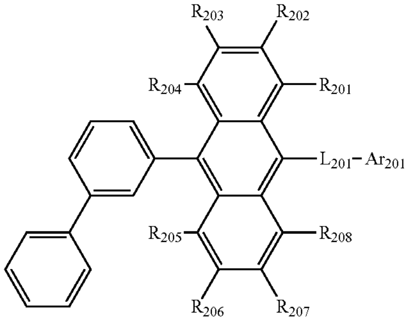

[Formula 83]

(206)

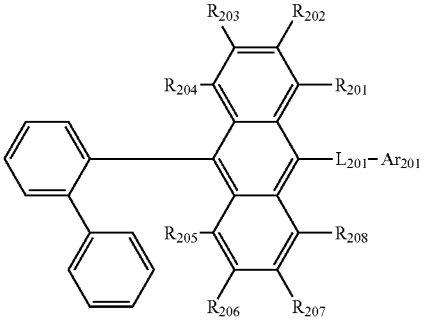

[Formula 84]

(207)

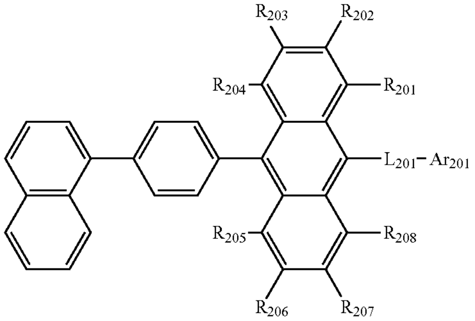

-continued

[Formula 85]

(208)

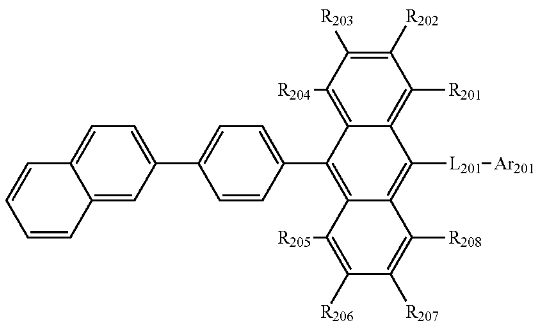

[Formula 86]

(209)

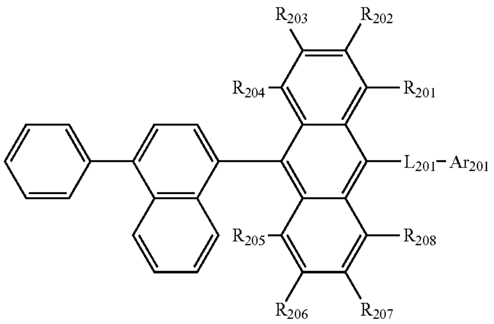

In the formulae (201) to (209): $L_{201}$ and $Ar_{201}$ respectively represent the same as $L_{201}$ and $Ar_{201}$ in the formula (2); and $R_{201}$ to $R_{208}$ each independently represent the same as $R_{201}$ to $R_{208}$ in the formula (2).

The second compound represented by the formula (2) is also preferably a compound represented by a formula (221), a formula (222), a formula (223), a formula (224), a formula (225), a formula (226), a formula (227), a formula (228), or a formula (229) below.

[Formula 87]

(221)

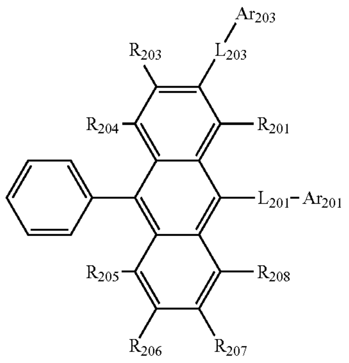

-continued

[Formula 88]

(222)

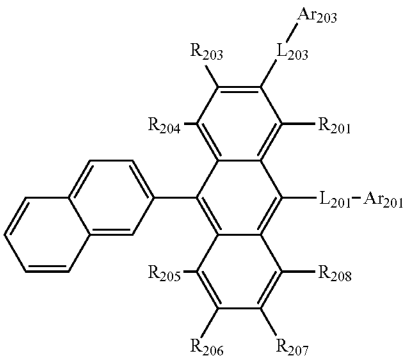

[Formula 89]

(223)

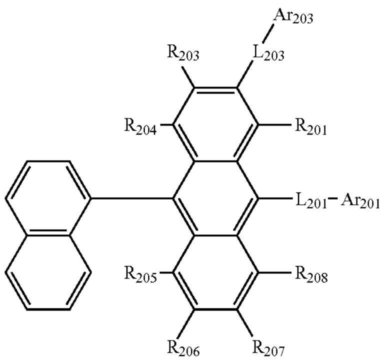

[Formula 90]

(224)

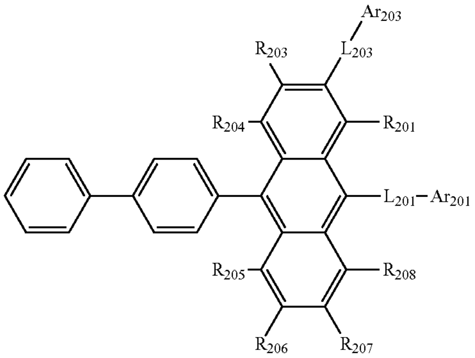

[Formula 91]

(225)

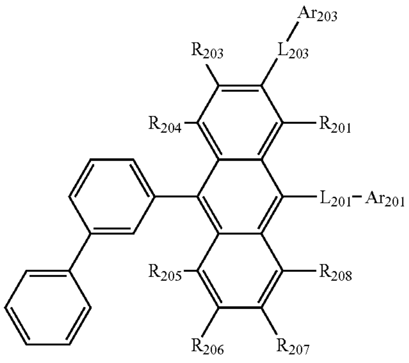

[Formula 92]

(226)

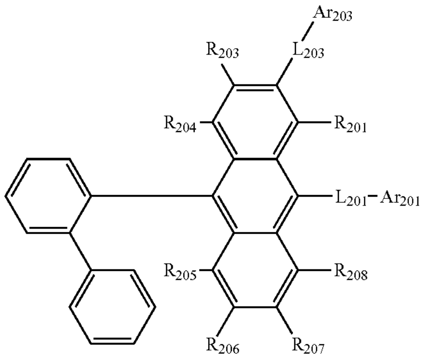

[Formula 93]

(227)

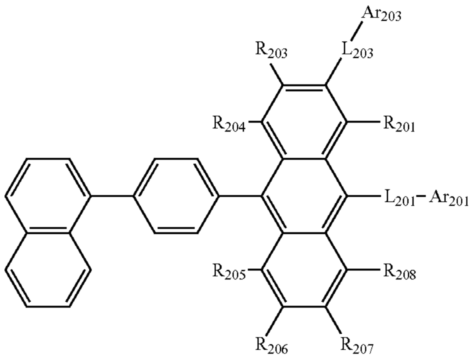

[Formula 94]

(228)

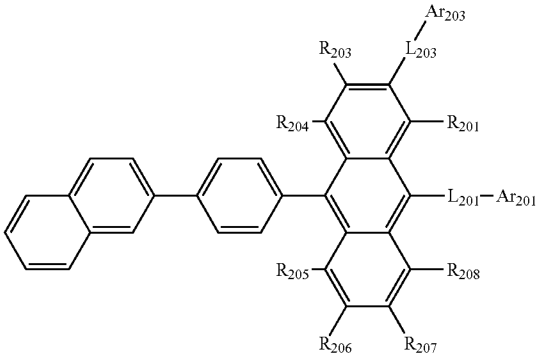

[Formula 95]

(229)

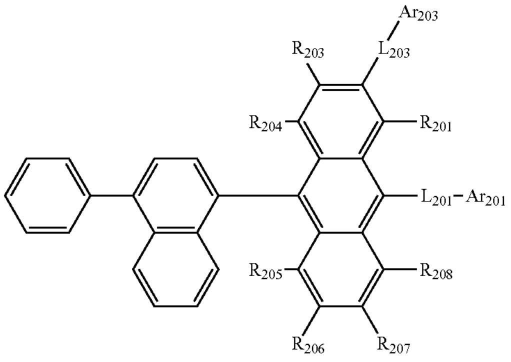

In the formulae (221), (222), (223), (224), (225), (226), (227), (228) and (229):

$R_{201}$ and $R_{203}$ to $R_{208}$ each independently represent the same as $R_{201}$ and $R_{203}$ to $R_{208}$ in the formula (2);

$L_{201}$ and $Ar_{201}$ respectively represent the same as $L_{201}$ and $Ar_{201}$ in the formula (2);

$L_{203}$ represents the same as $L_{201}$ in the formula (2);

$L_{203}$ and $L_{201}$ are mutually the same or different;

$Ar_{203}$ represents the same as $Ar_{201}$ in the formula (2); and $Ar_{203}$ and $Ar_{201}$ are mutually the same or different.

The second compound represented by the formula (2) is also preferably a compound represented by a formula (241), a formula (242), a formula (243), a formula (244), a formula (245), a formula (246), a formula (247), a formula (248), or a formula (249) below.

[Formula 96]

(241)

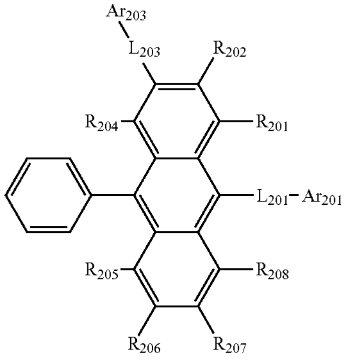

[Formula 97]

(242)

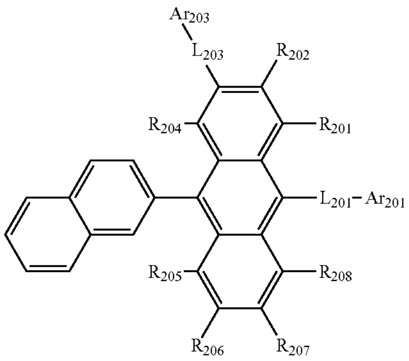

-continued

[Formula 98]

(243)

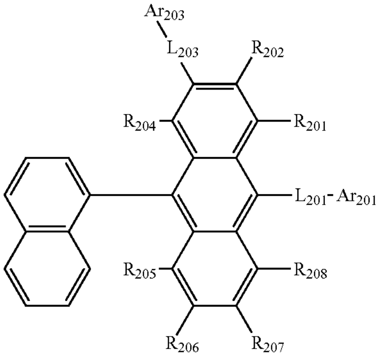

[Formula 99]

(244)

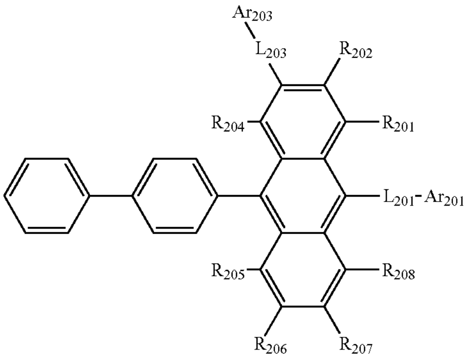

[Formula 100]

(245)

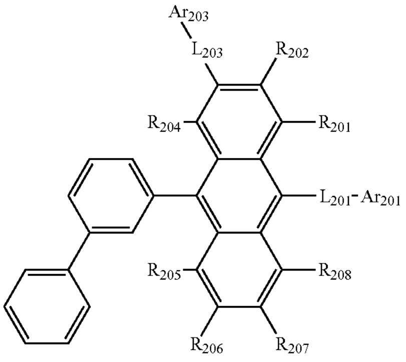

[Formula 101]

(246)

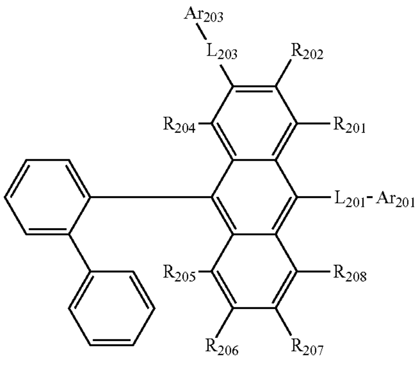

-continued

[Formula 102]

(247)

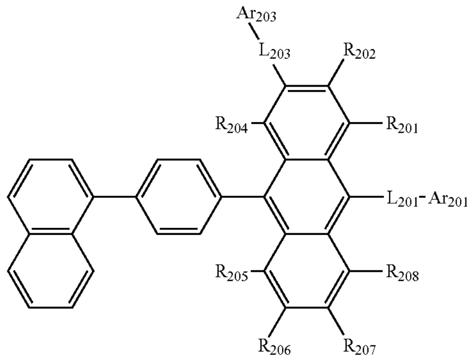

[Formula 103]

(248)

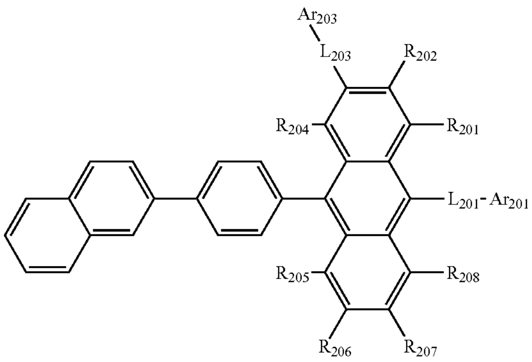

[Formula 104]

(249)

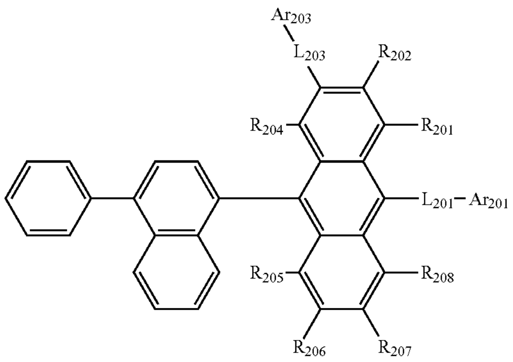

In the formulae (241), (242), (243), (244), (245), (246), (247), (248) and (249):

$R_{201}$, $R_{202}$ and $R_{204}$ to $R_{208}$ each independently represent the same as $R_{201}$, $R_{202}$ and $R_{204}$ to $R_{208}$ in the formula (2);

$L_{201}$ and $Ar_{201}$ respectively represent the same as $L_{201}$ and $Ar_{201}$ in the formula (2);

$L_{203}$ represents the same as $L_{201}$ in the formula (2);

$L_{203}$ and $L_{201}$ are mutually the same or different;

$Ar_{203}$ represents the same as $Ar_{201}$ in the formula (2); and $Ar_{203}$ and $Ar_{201}$ are mutually the same or different.

$R_{201}$ to $R_{208}$ in the second compound represented by the formula (2) are preferably each independently a hydrogen atom, a substituted or unsubstituted alkyl group having 1 to 50 carbon atoms, a substituted or unsubstituted cycloalkyl group having 3 to 50 ring carbon atoms, or a group represented by —Si($R_{901}$)($R_{902}$)($R_{903}$).

It is preferable that $L_{201}$ is a single bond or an unsubstituted arylene group having 6 to 22 ring carbon atoms and $Ar_{201}$ is a substituted or unsubstituted aryl group having 6 to 22 ring carbon atoms.

In the organic EL device according to the exemplary embodiment, $R_{201}$ to $R_{208}$ that are substituents of an anthracene skeleton in the second compound represented by the formula (2) are preferably hydrogen atoms in terms of preventing inhibition of intermolecular interaction and inhibiting decrease in electron mobility. However, $R_{201}$ to $R_{208}$ may be a substituted or unsubstituted aryl group having 6 to 50 ring carbon atoms or a substituted or unsubstituted heterocyclic group having 5 to 50 ring atoms.

Assuming that $R_{201}$ to $R_{208}$ are each a bulky substituent such as an alkyl group and a cycloalkyl group, intermolecular interaction may be inhibited to decrease the electron mobility of the second compound relative to that of the first host material, so that the relationship of $\mu e(H2)>\mu e(H1)$ shown by the numerical formula (Numerical Formula 30) may not be satisfied. When the second compound is used in the second emitting layer, it can be expected that satisfying the relationship of $\mu e(H2)>\mu e(H1)$ inhibits a decrease in a recombination ability between holes and electrons in the first emitting layer and a decrease in luminous efficiency. It should be noted that substituents, namely, a haloalkyl group, alkenyl group, alkynyl group, group represented by —Si($R_{901}$)($R_{902}$)($R_{903}$), group represented by —O—($R_{904}$), group represented by —S—($R_{905}$), group represented by —N($R_{906}$)($R_{907}$), aralkyl group, group represented by —C(═O)$R_{801}$, group represented by —COO$R_{802}$, halogen atom, cyano group, and nitro group are likely to be bulky, and an alkyl group and cycloalkyl group are likely to be further bulky.

In the second compound represented by the formula (2), $R_{201}$ to $R_{208}$, which are the substituents on the anthracene skeleton, are each preferably not a bulky substituent and preferably neither an alkyl group nor cycloalkyl group. More preferably, $R_{201}$ to $R_{208}$ are each not an alkyl group, cycloalkyl group, haloalkyl group, alkenyl group, alkynyl group, group represented by —Si($R_{901}$)($R_{902}$)($R_{903}$), group represented by —O—($R_{904}$), group represented by —S—($R_{905}$), group represented by —N($R_{906}$)($R_{907}$), aralkyl group, group represented by —C(═O)$R_{801}$, group represented by —COO$R_{802}$, halogen atom, cyano group, and nitro group.

In the organic EL device according to the exemplary embodiment, it is also preferable that $R_{201}$ to $R_{208}$ in the second compound represented by the formula (2) are also preferably each independently a hydrogen atom, a substituted or unsubstituted alkyl group having 1 to 50 carbon atoms, a substituted or unsubstituted cycloalkyl group having 3 to 50 ring carbon atoms, or a group represented by —Si($R_{901}$)($R_{902}$)($R_{903}$).

In the organic EL device according to the exemplary embodiment, $R_{201}$ to $R_{208}$ in the second compound represented by the formula (2) are preferably each a hydrogen atom.

In the second compound, examples of the substituent for the "substituted or unsubstituted" group on $R_{201}$ to $R_{208}$ also preferably do not include the above-described substituent that is likely to be bulky, especially a substituted or unsubstituted alkyl group and a substituted or unsubstituted cycloalkyl group. When examples of the substituent for the "substituted or unsubstituted" group on $R_{201}$ to $R_{208}$ do not include a substituted or unsubstituted alkyl group and a substituted or unsubstituted cycloalkyl group, inhibition of intermolecular interaction to be caused by presence of a bulky substituent such as an alkyl group and a cycloalkyl group can be prevented, thereby preventing a decrease in the electron mobility. Moreover, when the second compound described above is used in the second emitting layer, a decrease in a recombination ability between holes and electrons in the first emitting layer and a decrease in the luminous efficiency can be inhibited.

Further preferably, $R_{201}$ to $R_{208}$ that are the substituents on the anthracene skeleton are not bulky substituents and $R_{201}$ to $R_{208}$ as substituents are unsubstituted. Assuming that $R_{201}$ to $R_{208}$ that are the substituents on the anthracene skeleton are not bulky substituents and substituents are bonded to $R_{201}$ to $R_{208}$ that are not bulky substituents, the substituents bonded to $R_{201}$ to $R_{208}$ are preferably not bulky substituents; and the substituents bonded to $R_{201}$ to $R_{208}$ serving as substituents are preferably not an alkyl group and cycloalkyl group, more preferably not an alkyl group, cycloalkyl group, haloalkyl group, alkenyl group, alkynyl group, group represented by —Si($R_{901}$)($R_{902}$)($R_{903}$), group represented by —O—($R_{904}$), group represented by —S—($R_{905}$), group represented by —N($R_{906}$)($R_{907}$), aralkyl group, group represented by —C(═O)$R_{801}$, group represented by —COO$R_{802}$, halogen atom, cyano group, and nitro group.

In the second compound, the groups specified to be "substituted or unsubstituted" are each preferably an "unsubstituted" group.

Method of Producing Second Compound

The second compound can be produced by a known method. The second compound can also be produced based on a known method through a known alternative reaction using a known material(s) tailored for the target compound.

Specific Examples of Second Compound

Specific examples of the second compound include the following compounds. It should however be noted that the invention is not limited to the specific examples of the second compound.

[Formula 105]

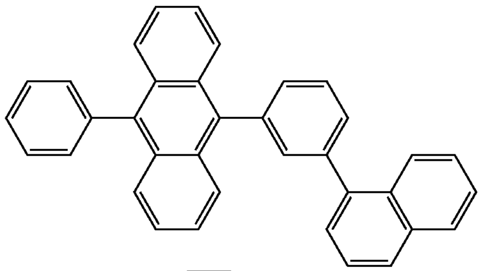

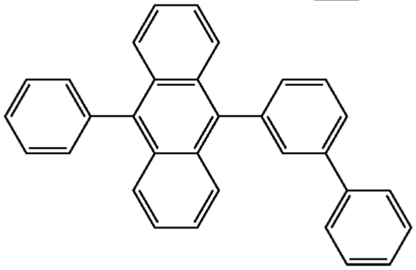

-continued
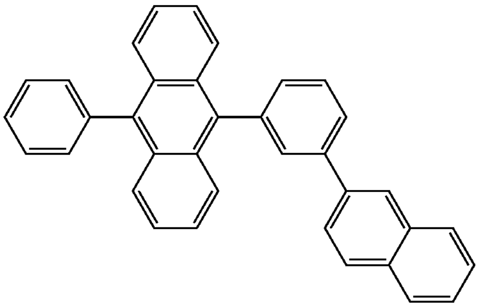
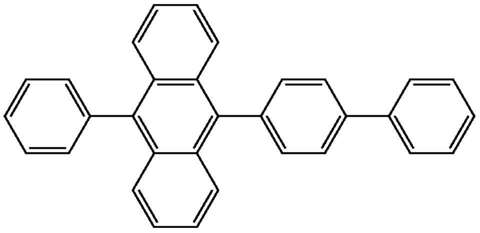
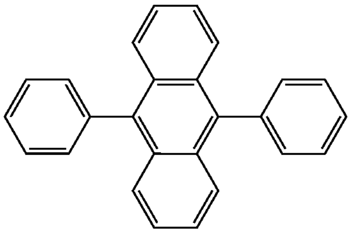
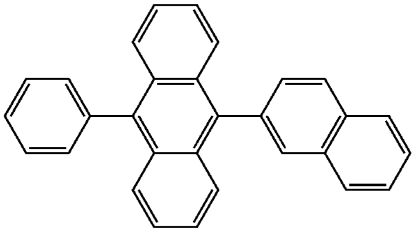
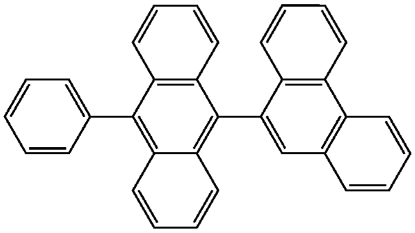
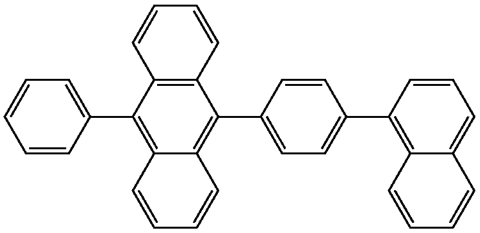
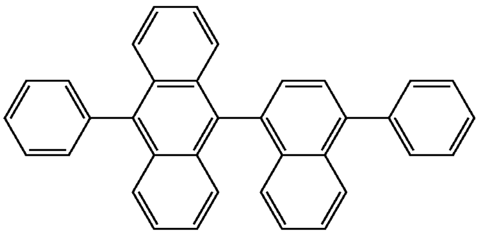
-continued
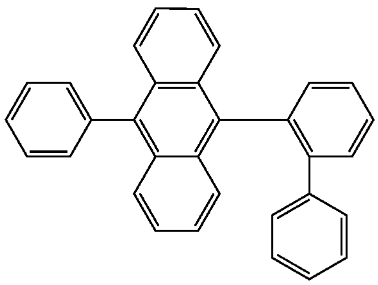
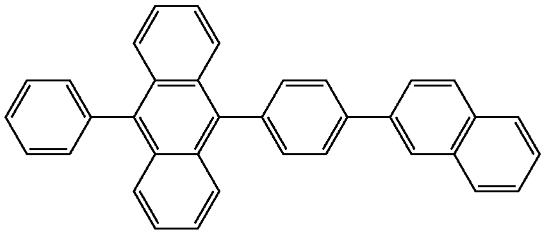
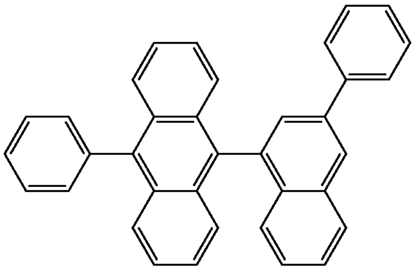
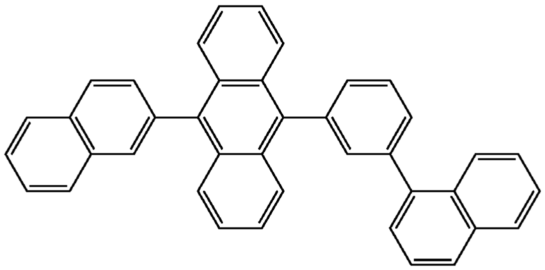
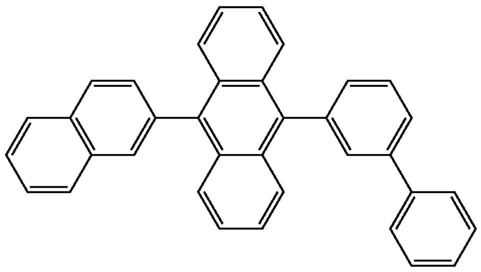
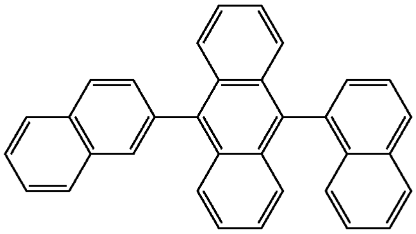

-continued
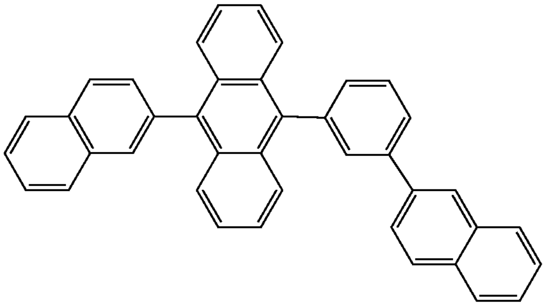
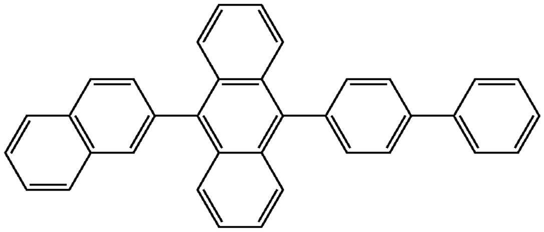
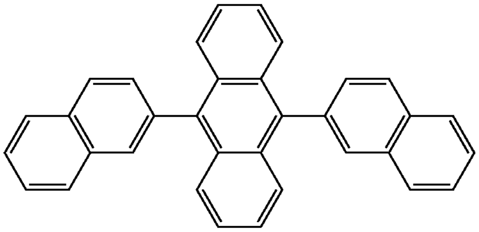
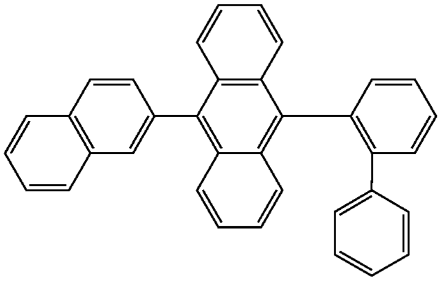
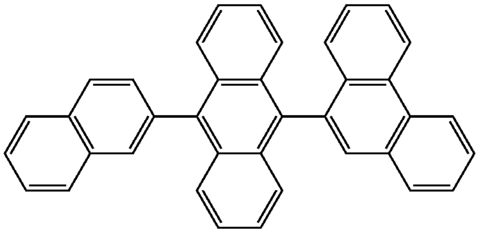
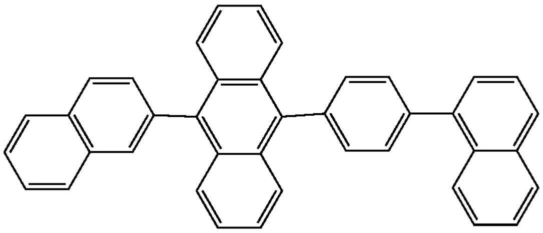
-continued
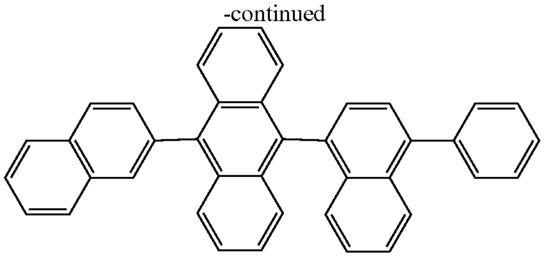
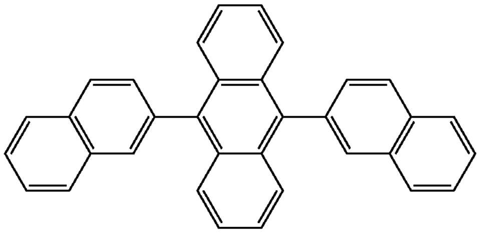
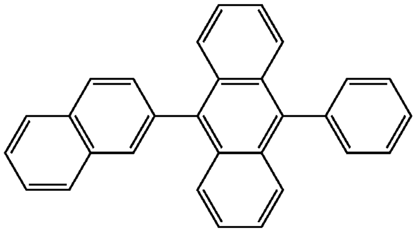
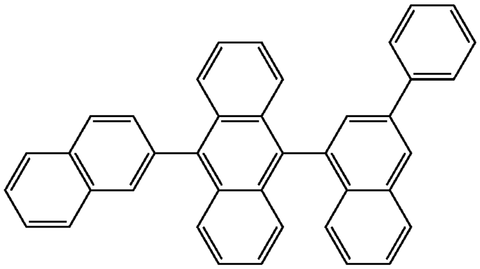
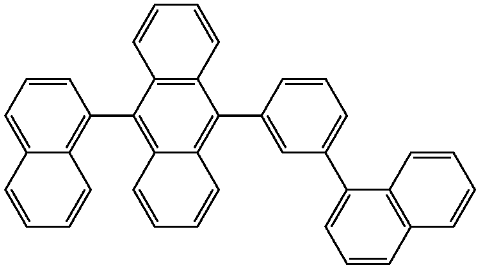
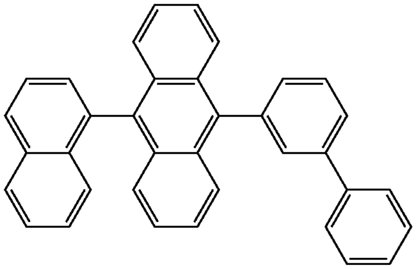
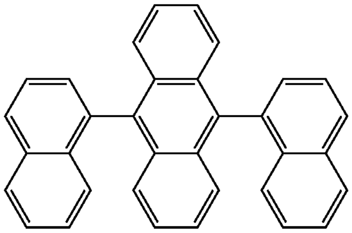

-continued
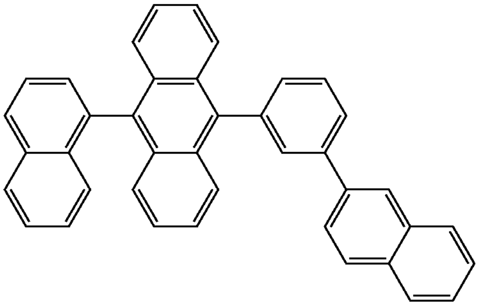
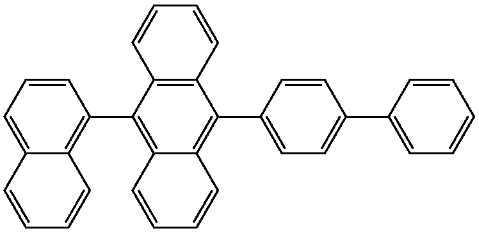
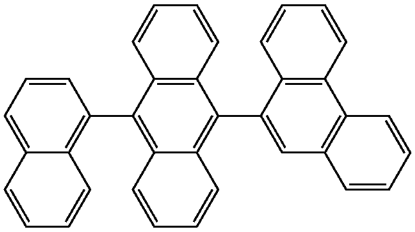
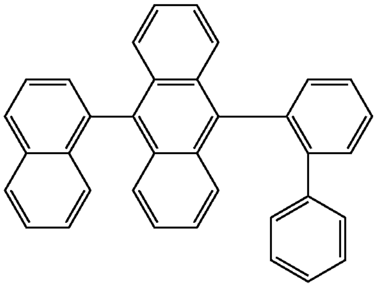
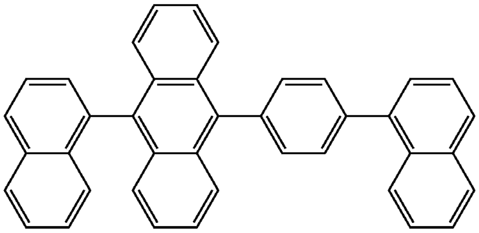
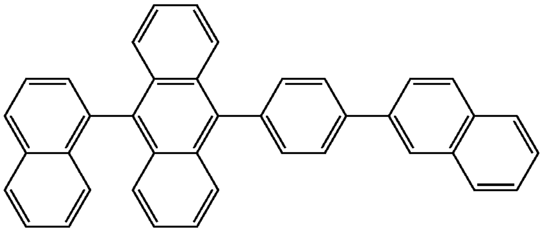
-continued
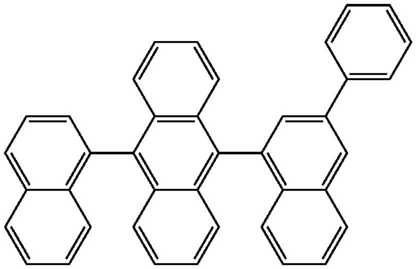
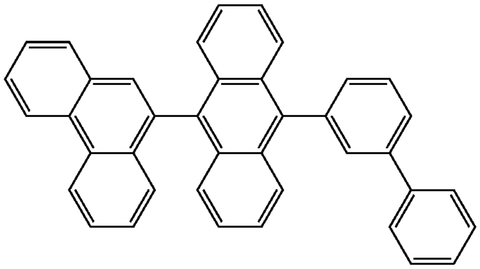
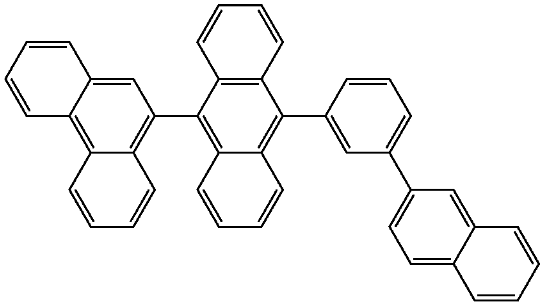
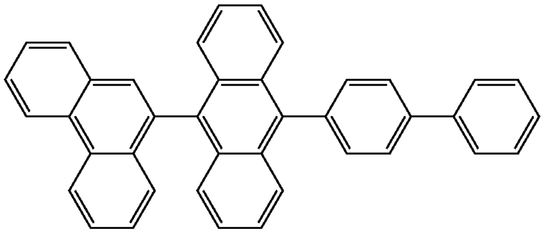
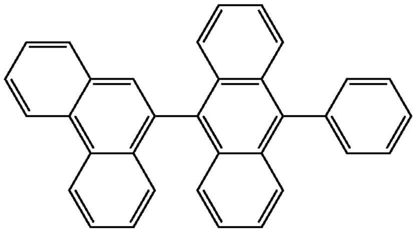
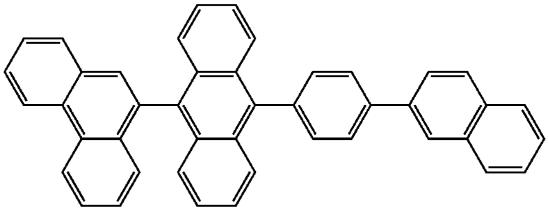

-continued
[Formula 106]
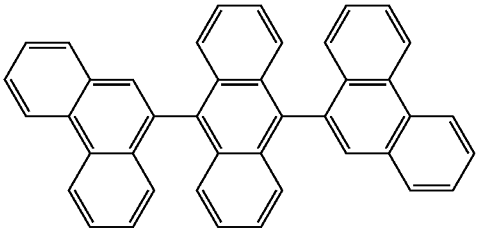
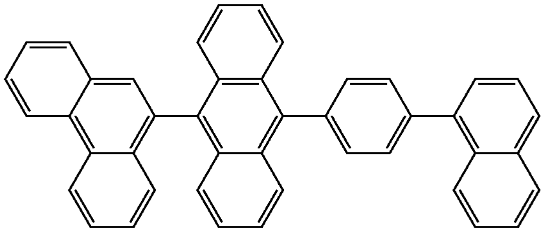
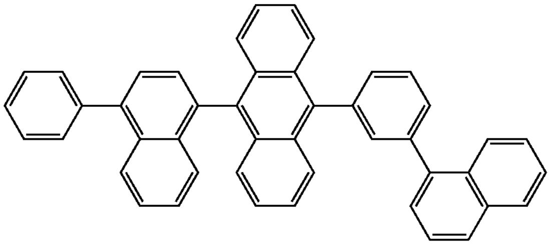
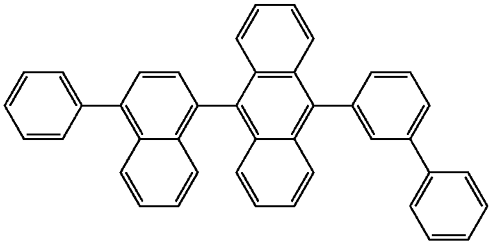
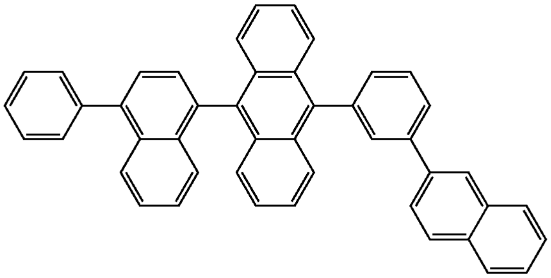
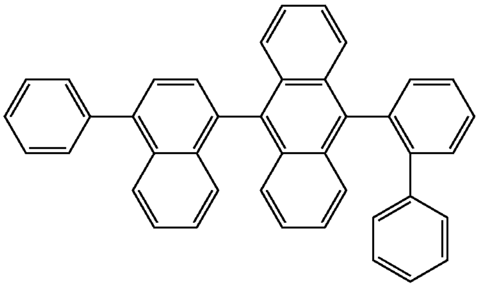
-continued
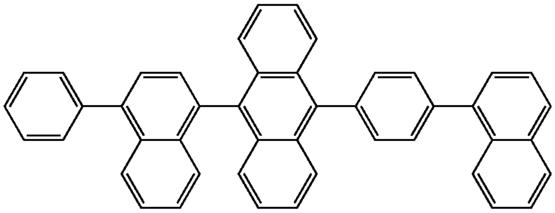
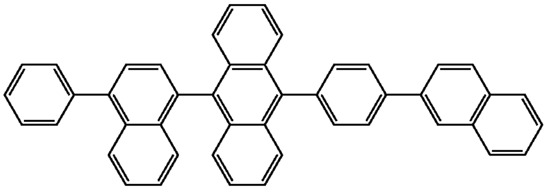
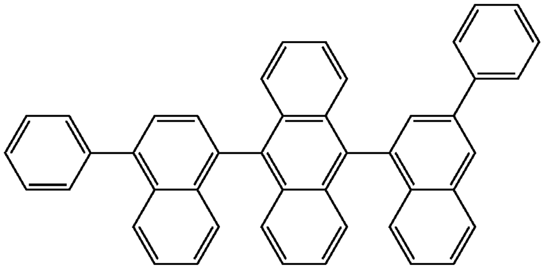
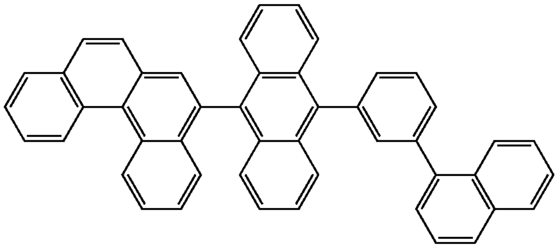
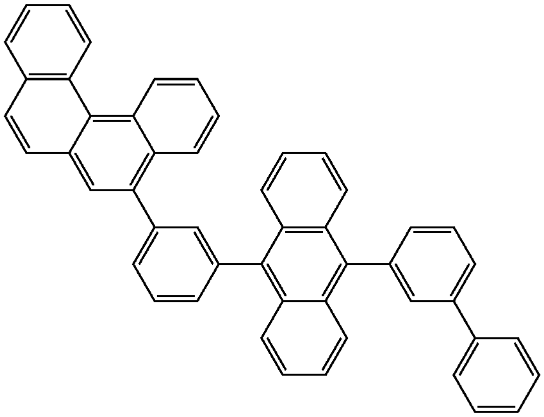
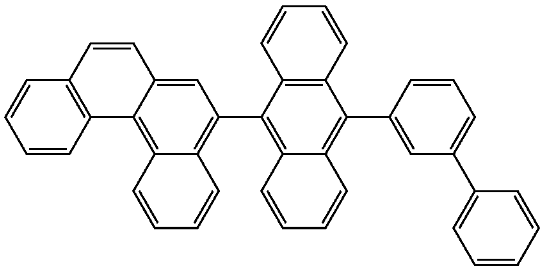

-continued
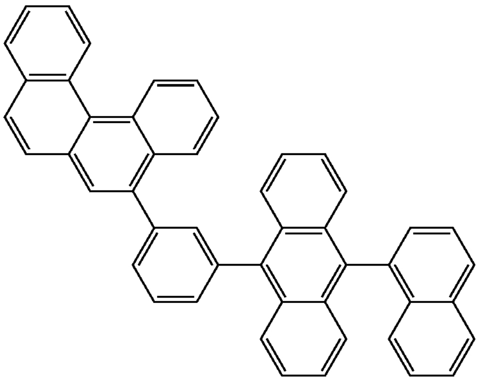
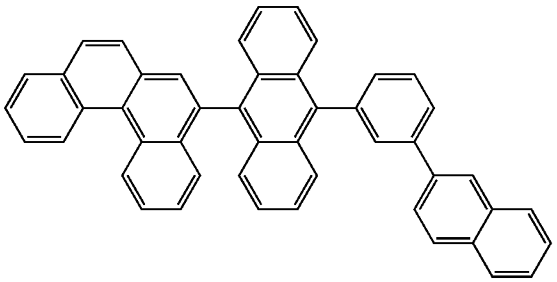
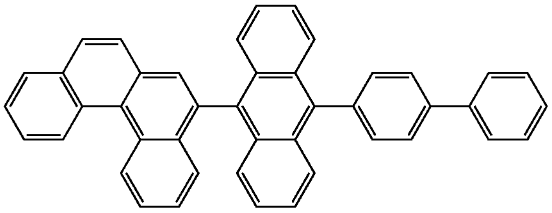
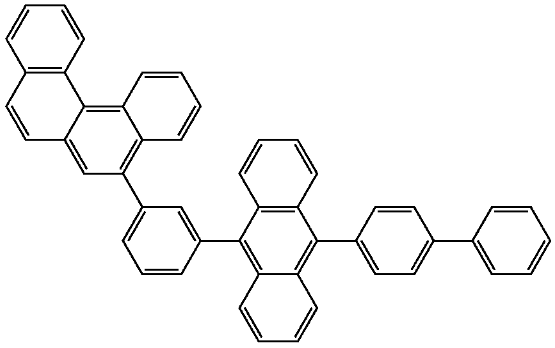
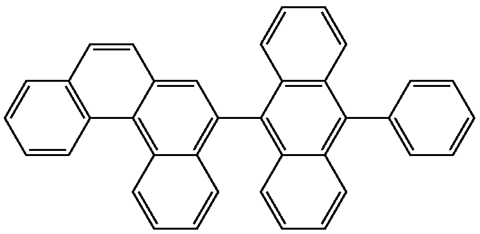
-continued
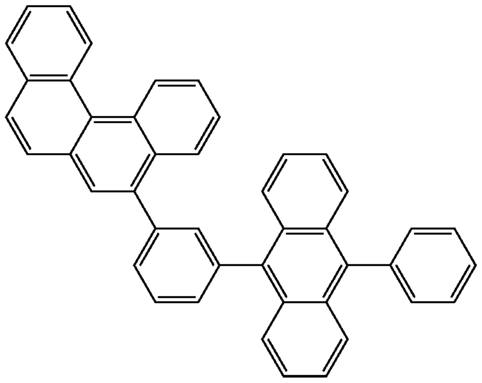
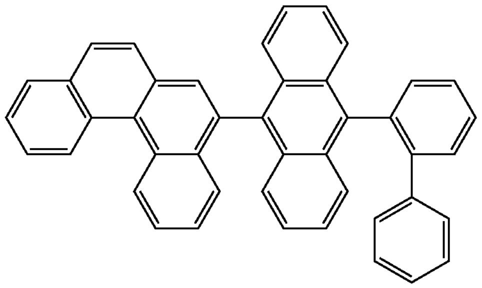
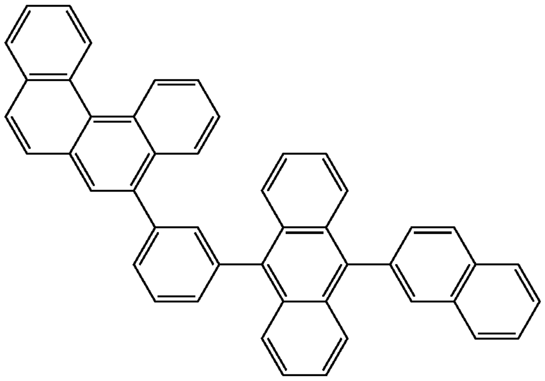
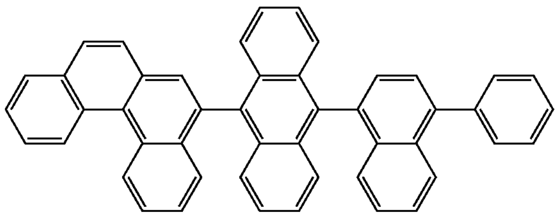
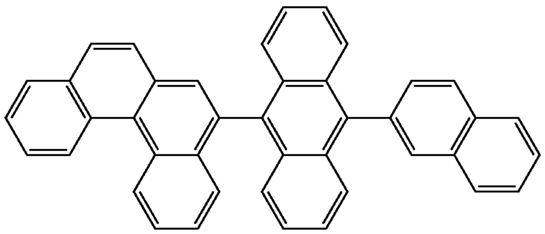

-continued
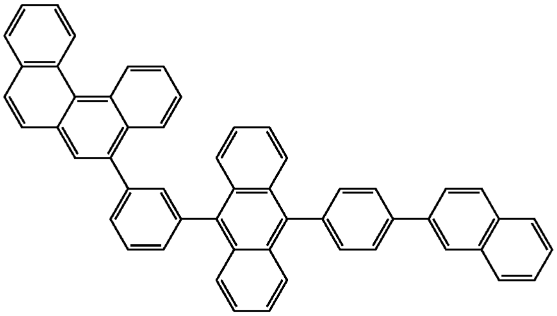
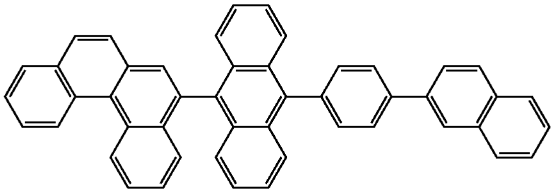
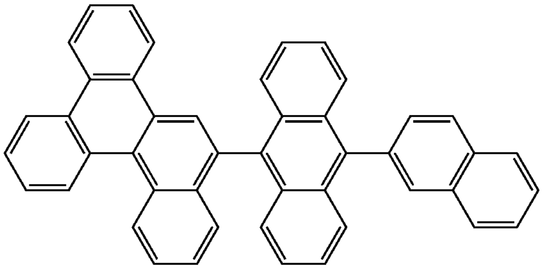
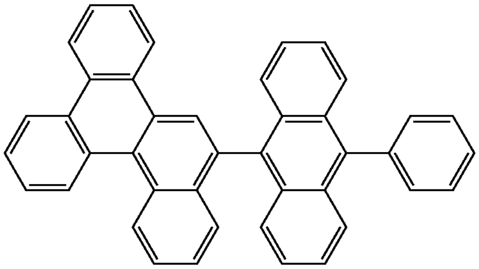
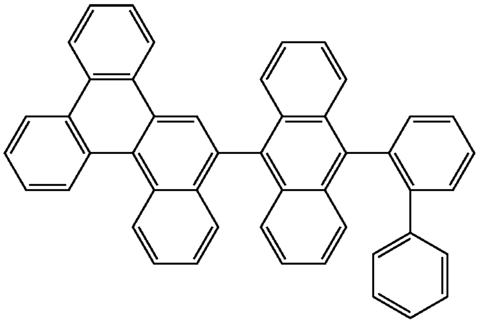
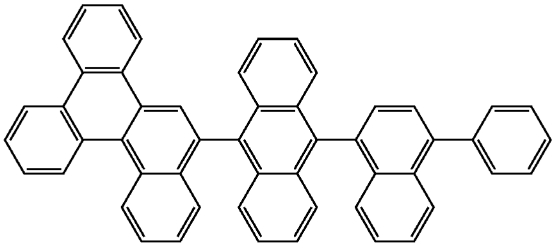
-continued
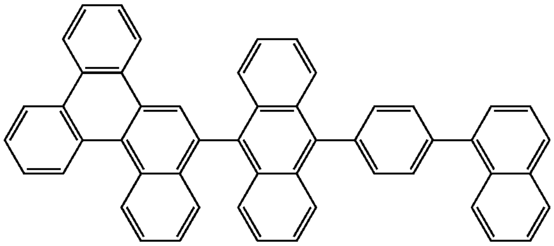
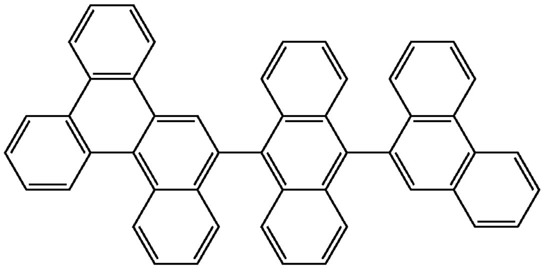
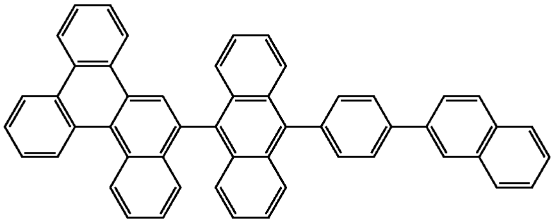
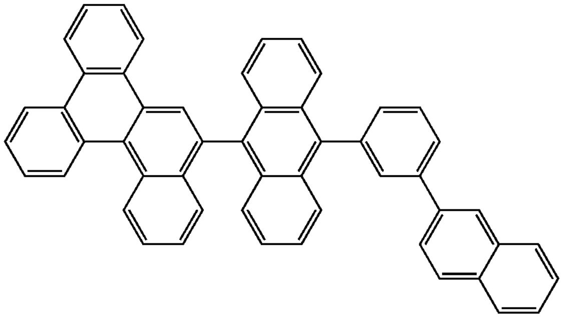
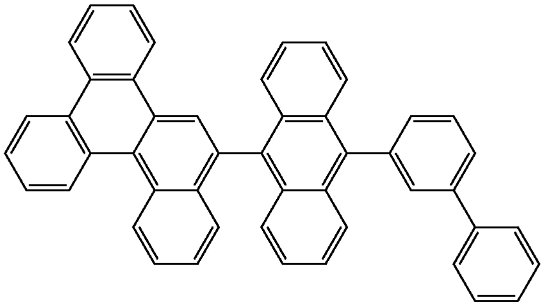
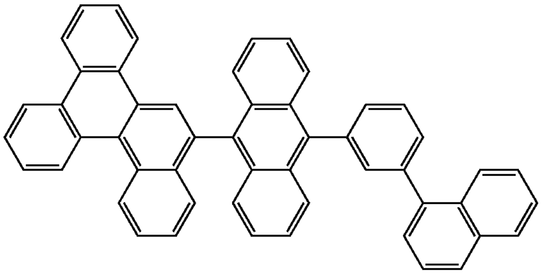

-continued
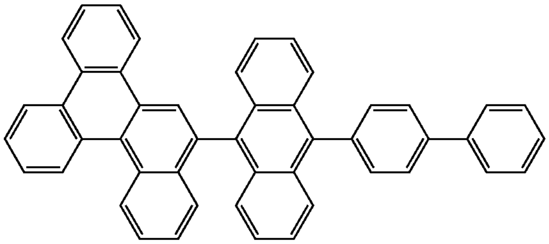
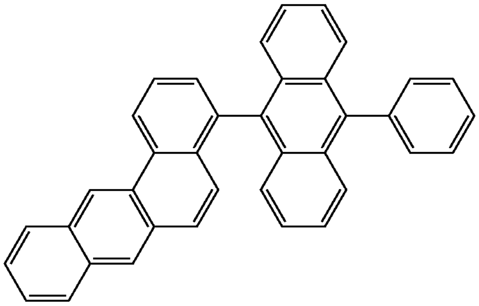
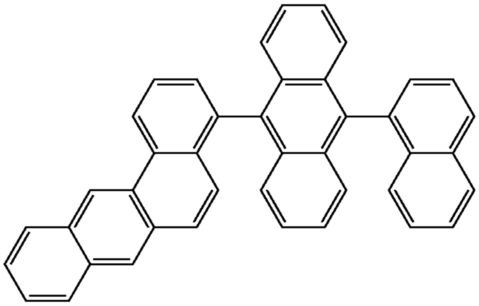
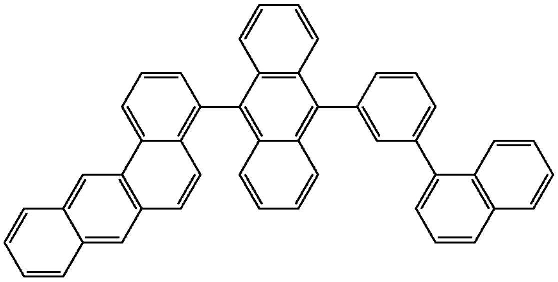
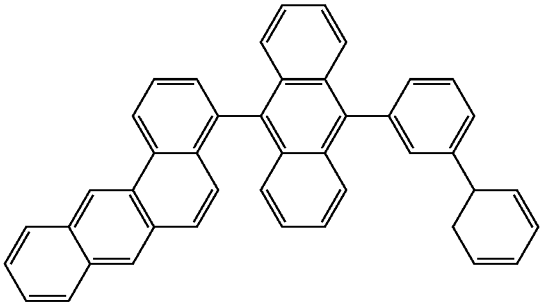
-continued
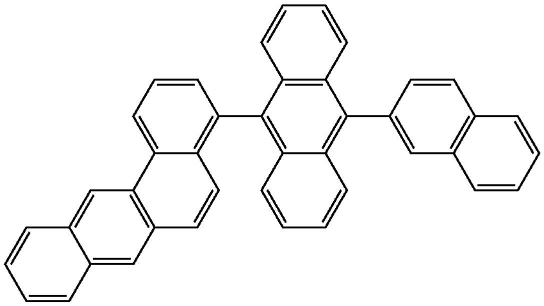
[Formula 107]
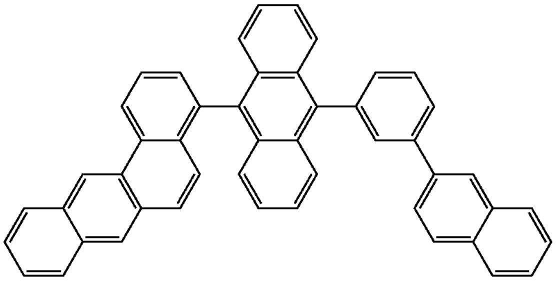
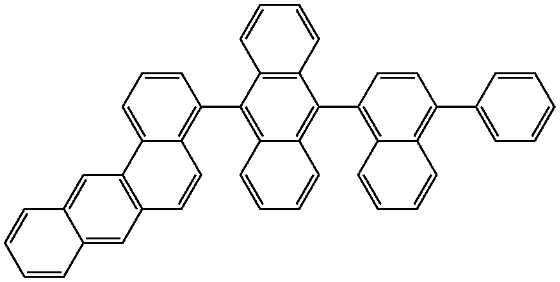
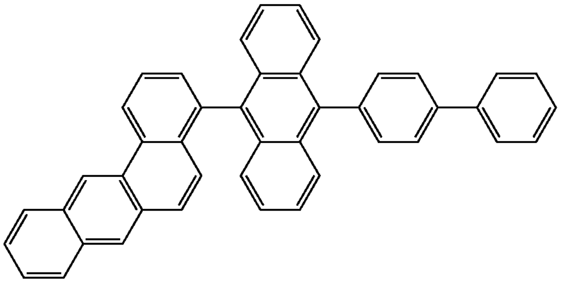
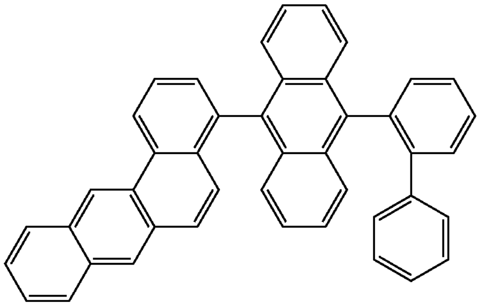

-continued
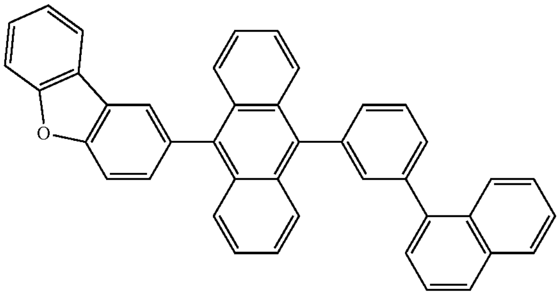
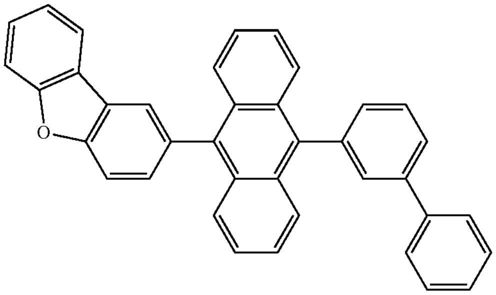
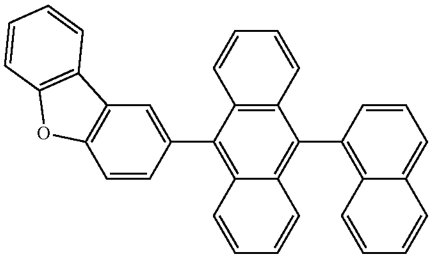
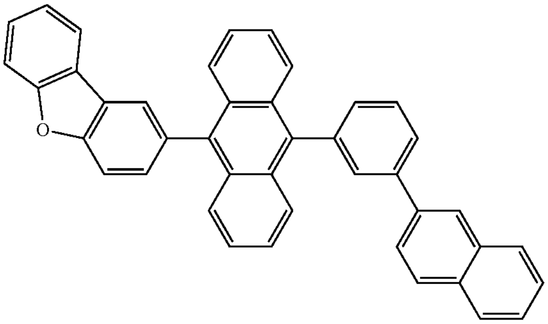
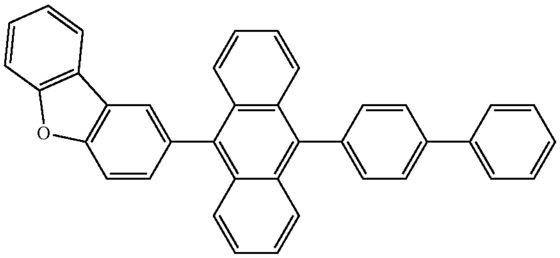
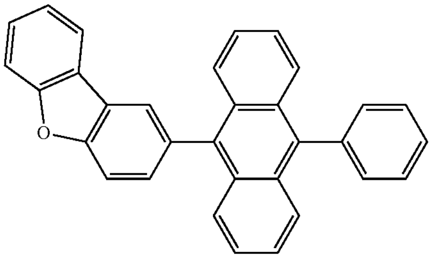
-continued
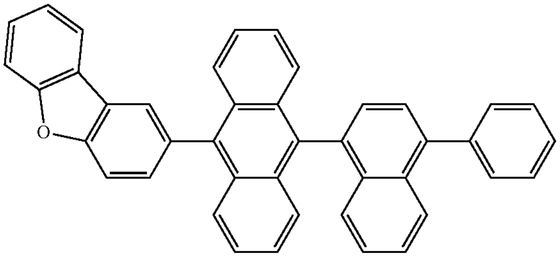
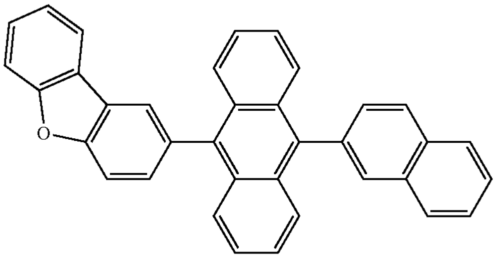
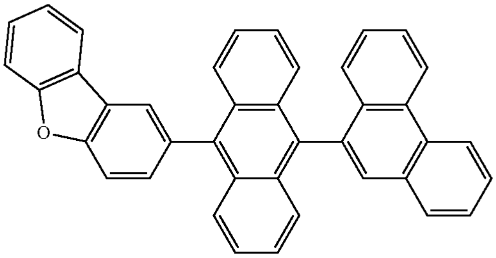
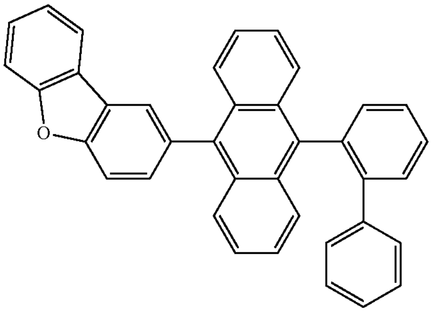
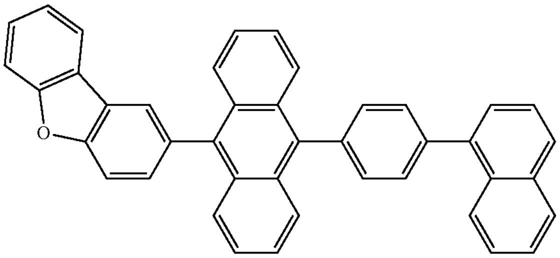
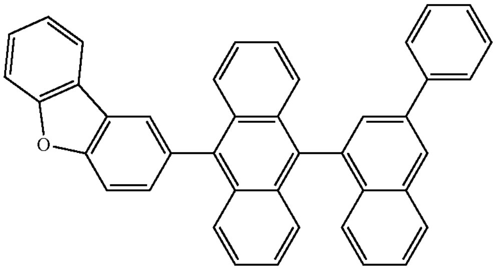

-continued
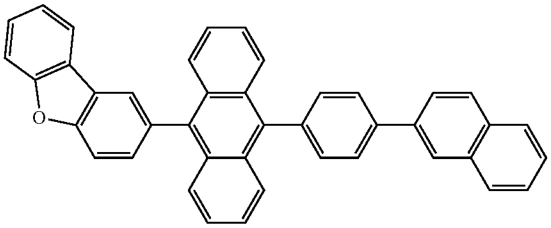
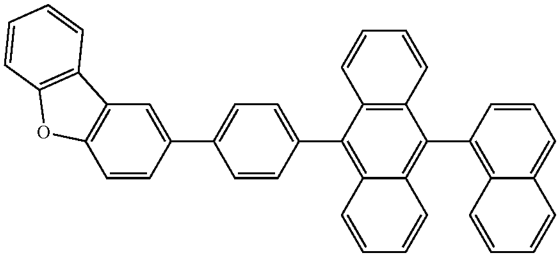
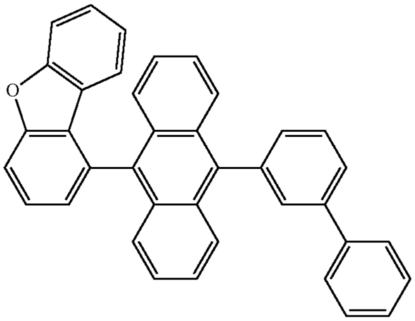
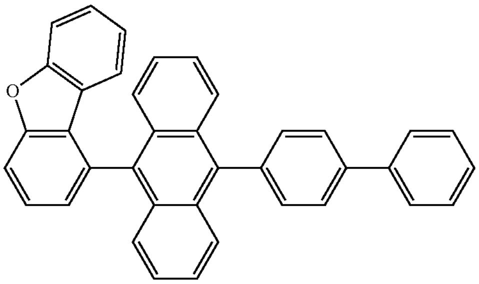
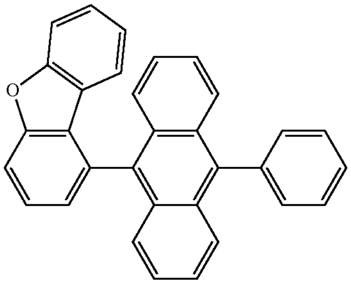
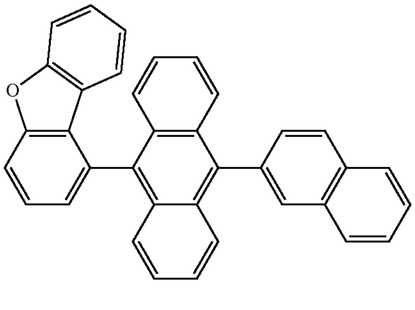
-continued
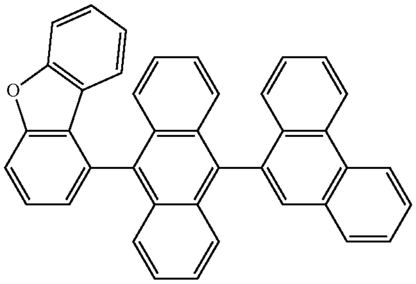
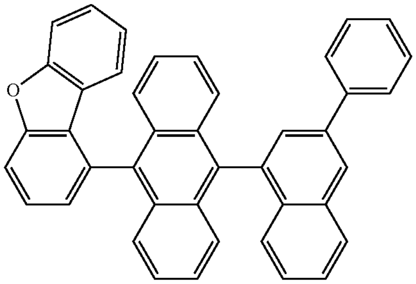
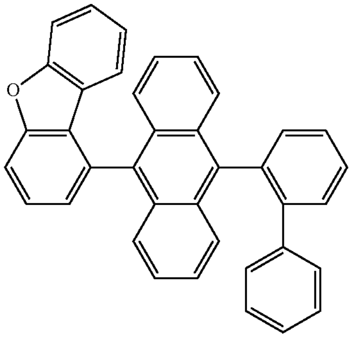
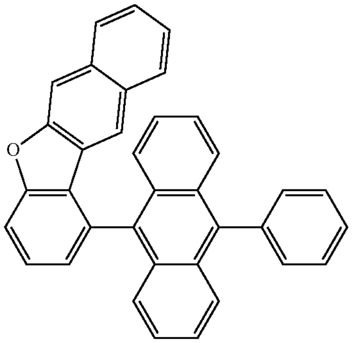
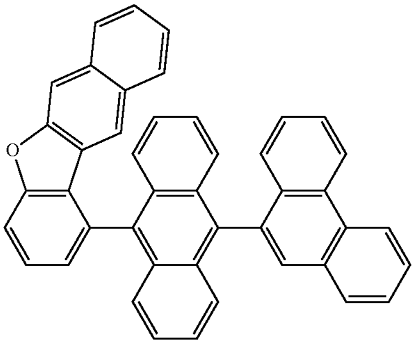

-continued
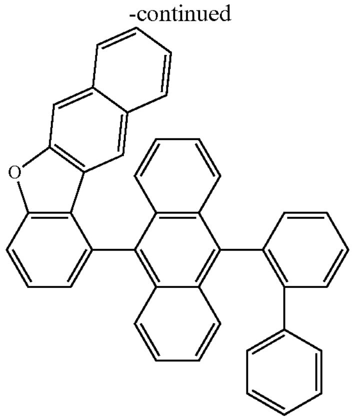
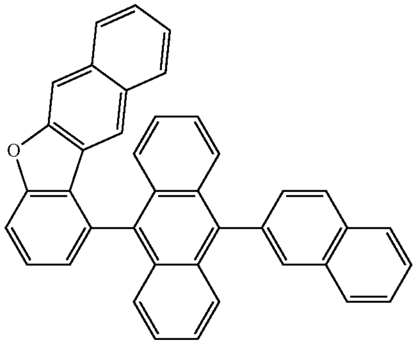
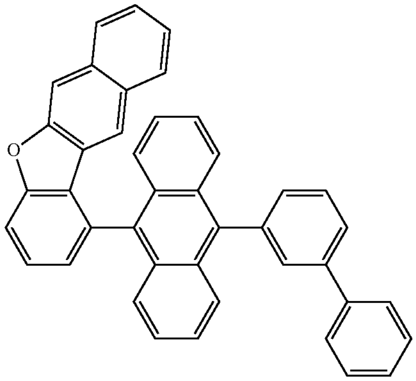
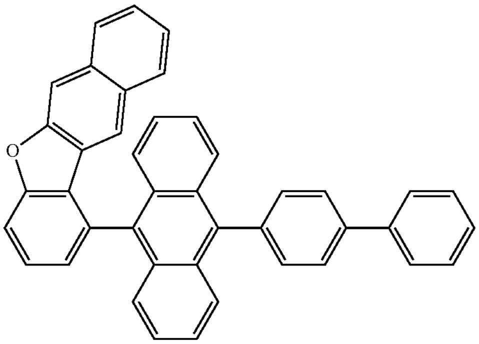
-continued
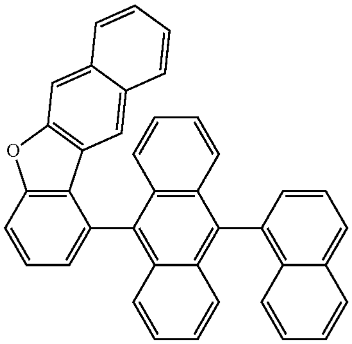
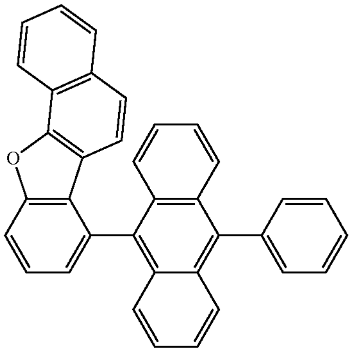
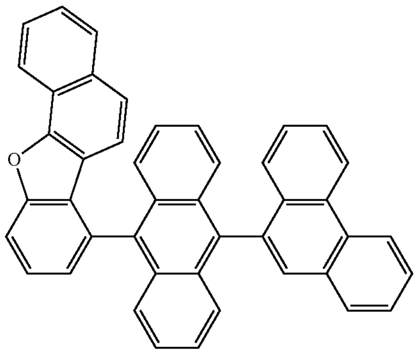
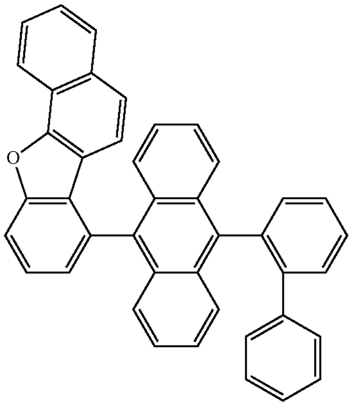

-continued
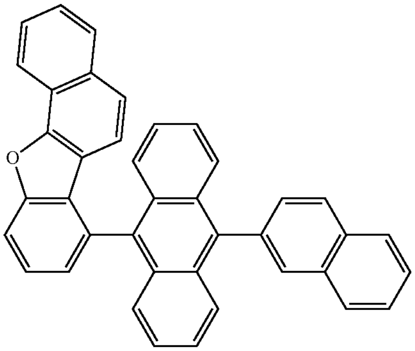
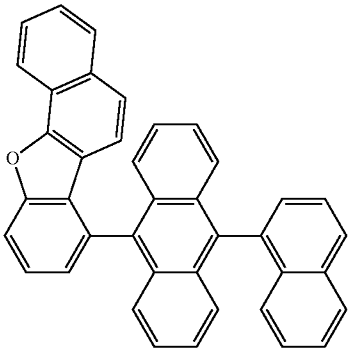
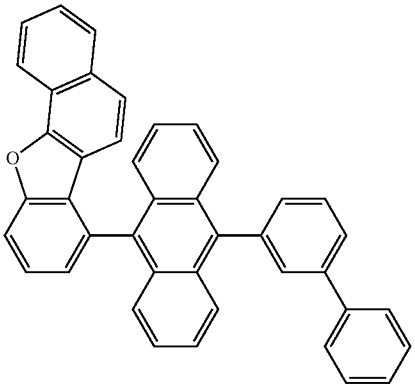
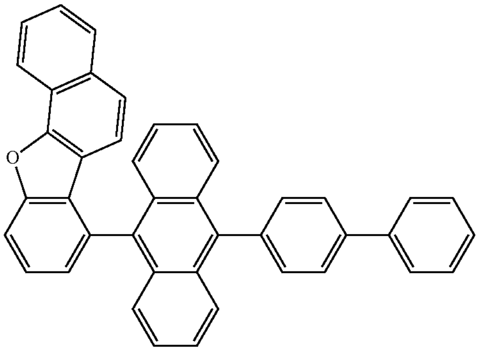
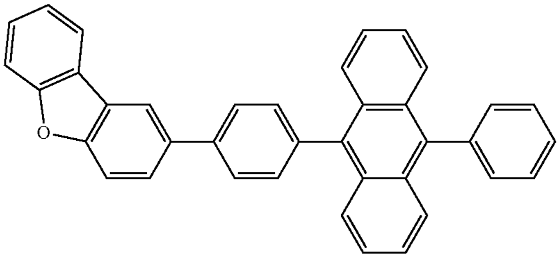
-continued
[Formula 108]
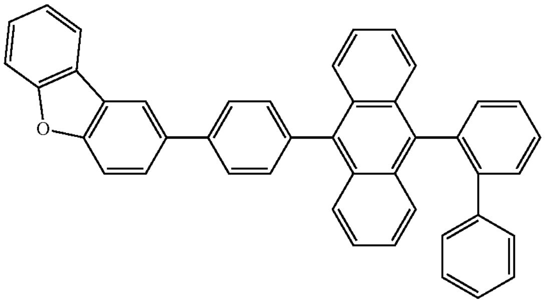
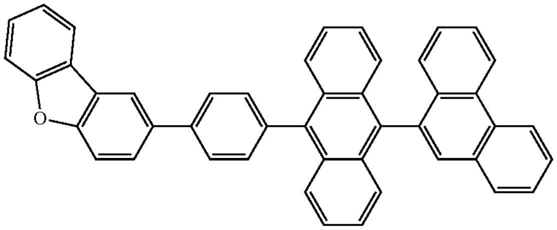
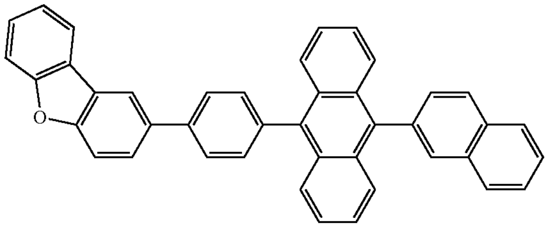
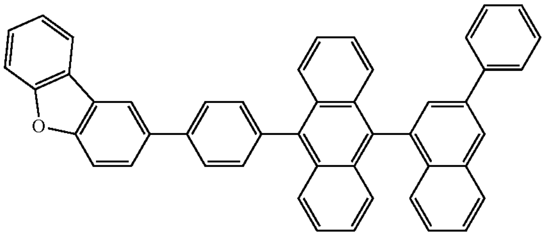
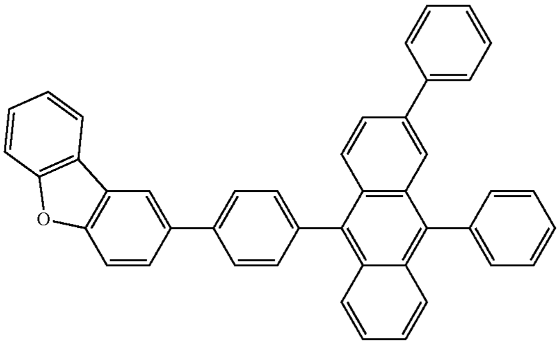
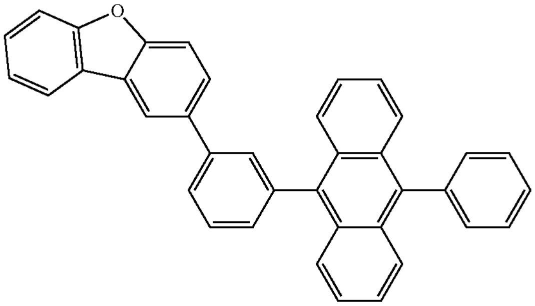

-continued
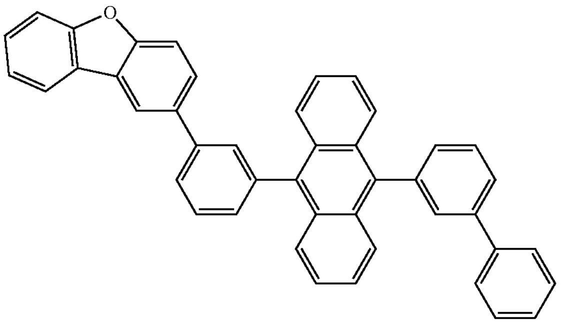
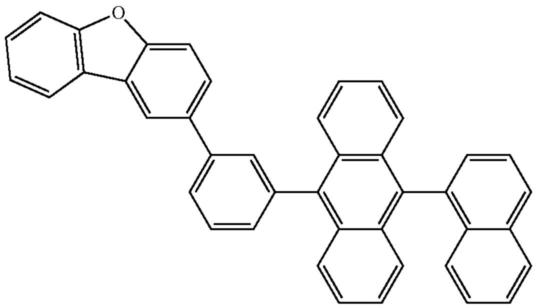
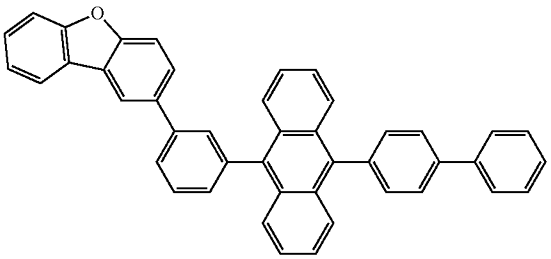
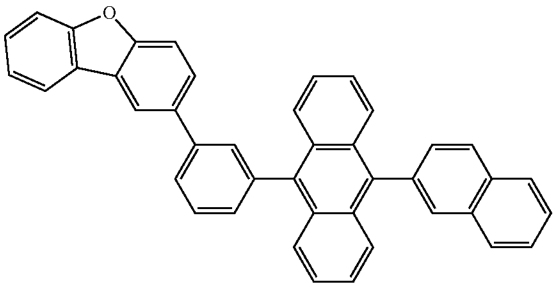
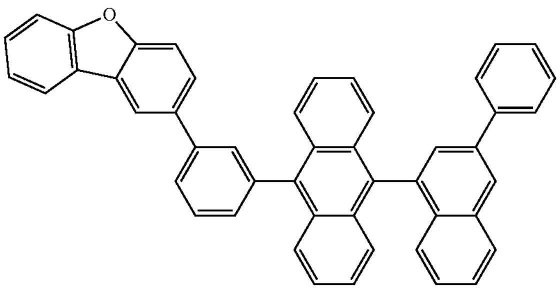
-continued
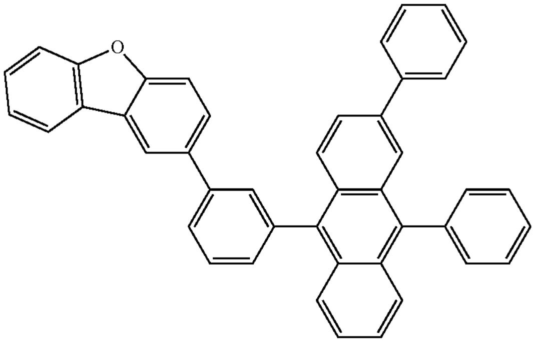
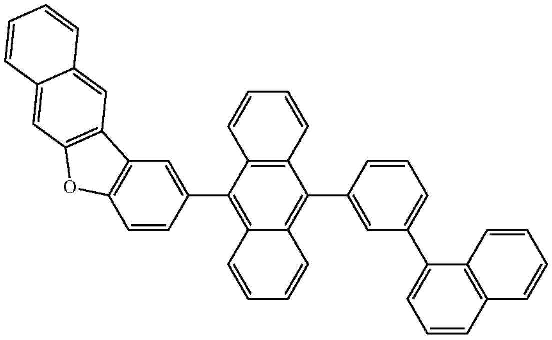
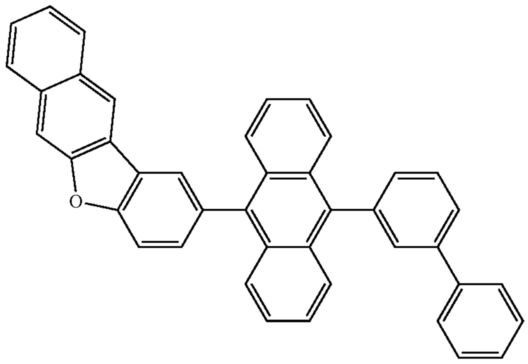
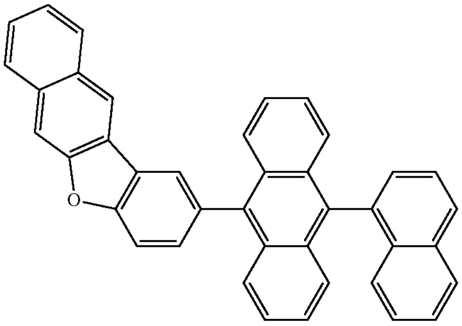

-continued
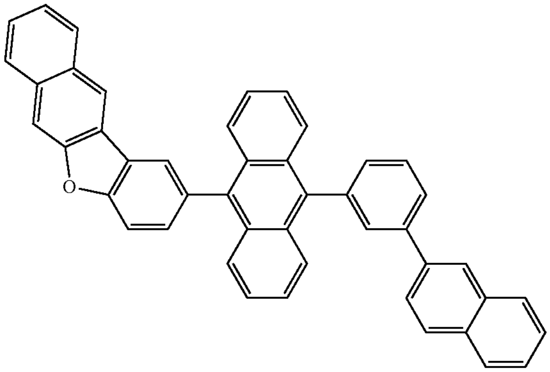
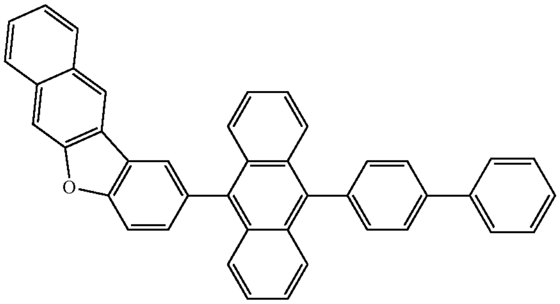
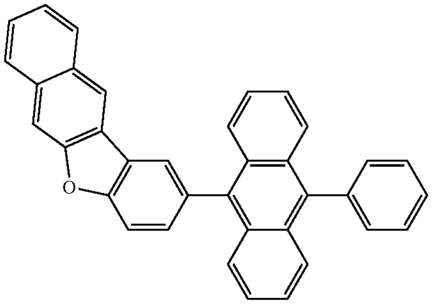
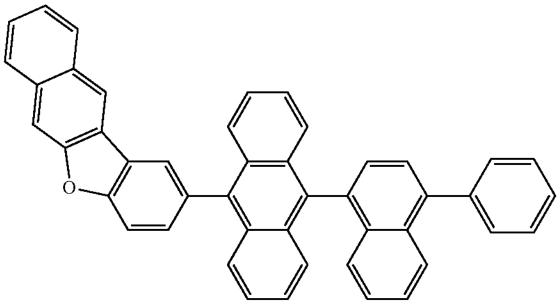
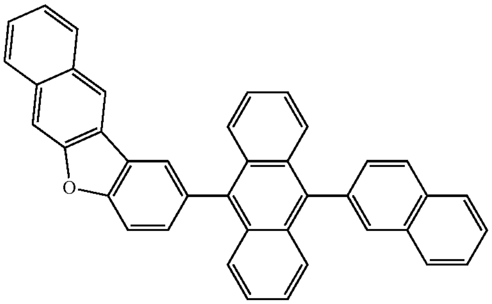
-continued
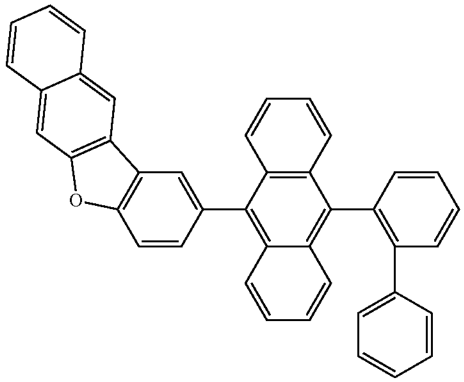
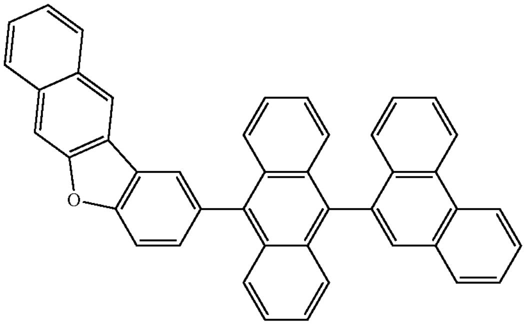
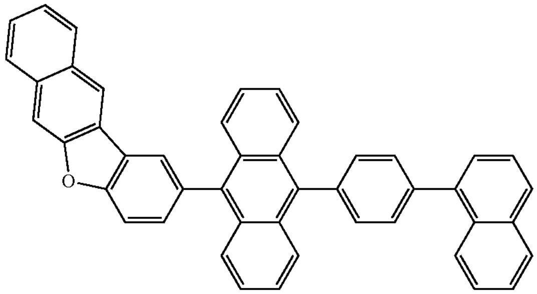
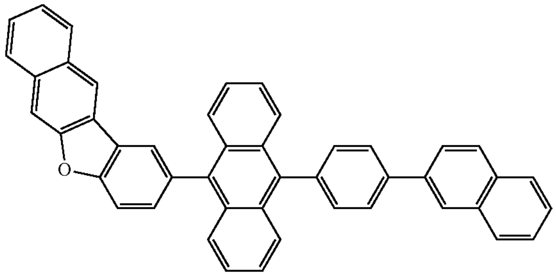
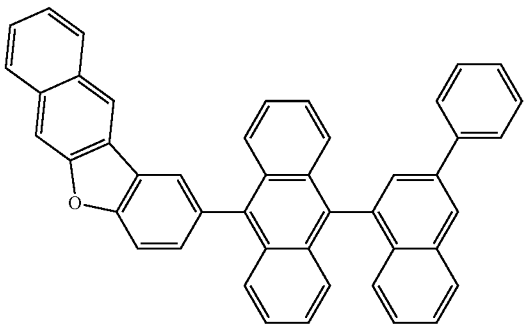

-continued
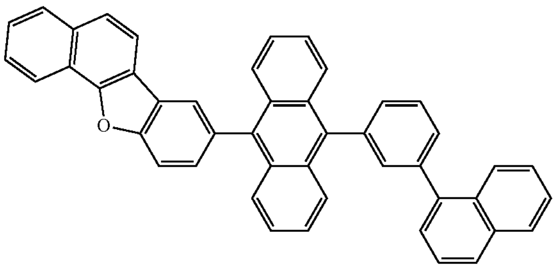
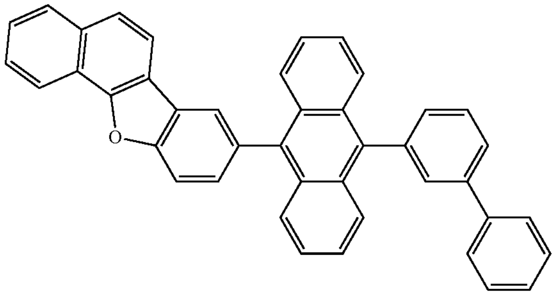
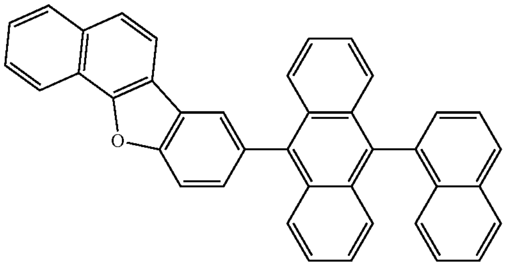
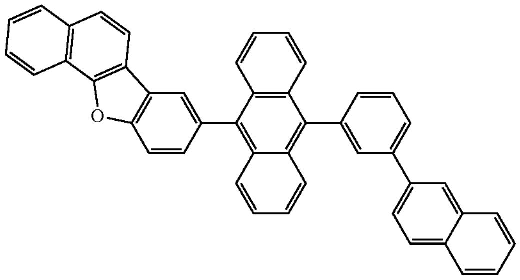
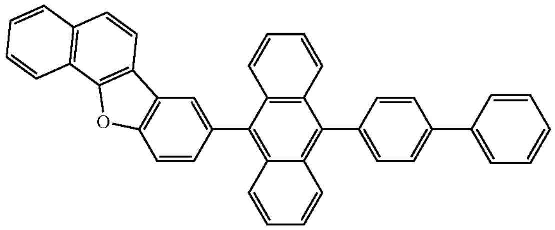
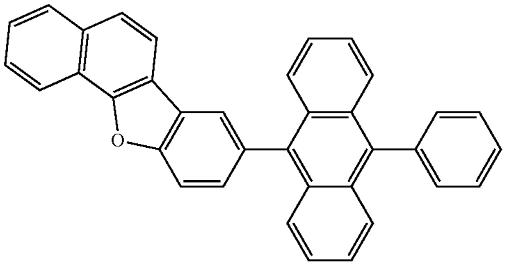
-continued
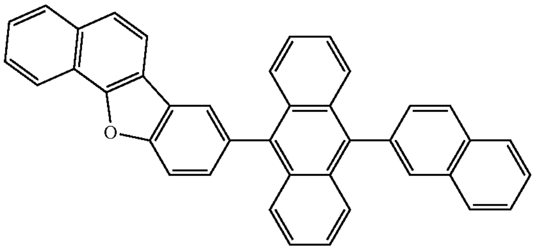
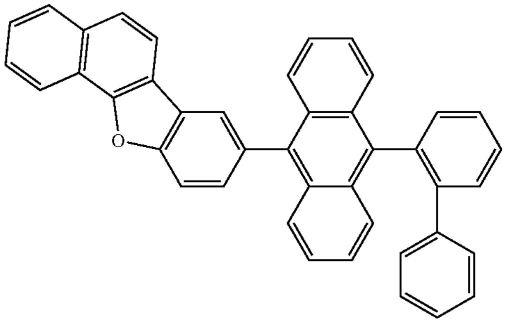
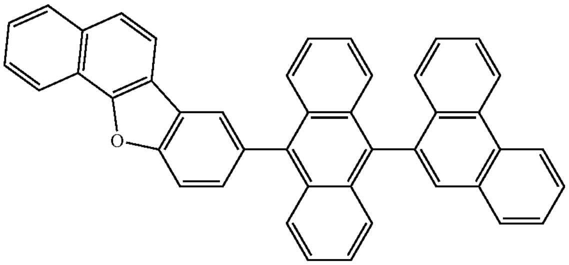
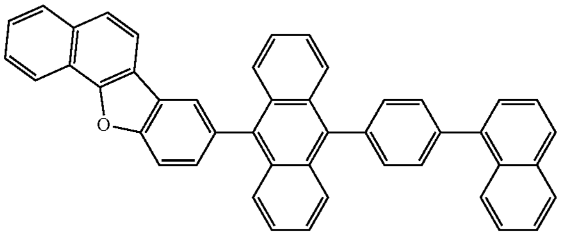
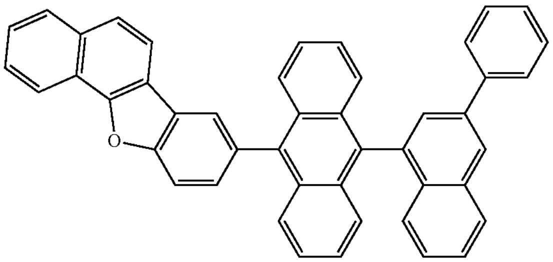
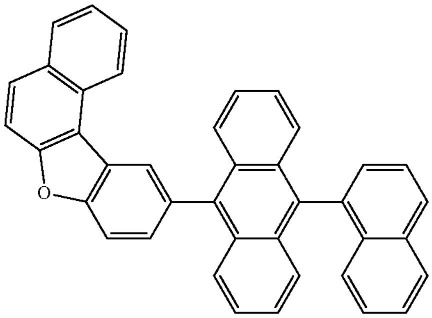

-continued
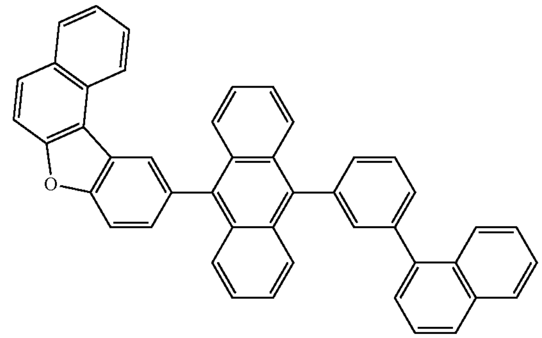
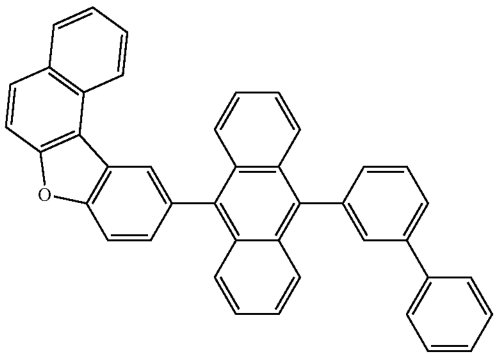
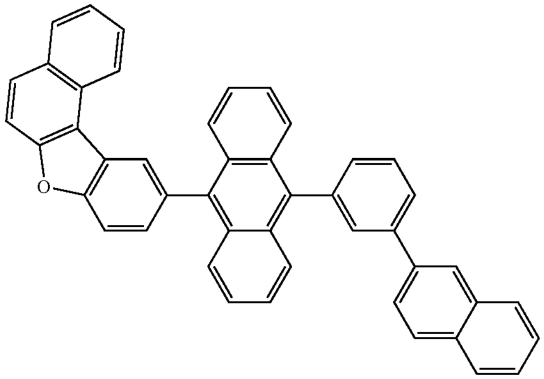
[Formula 109]
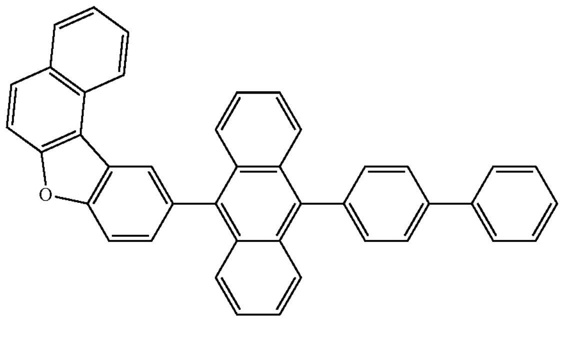
-continued
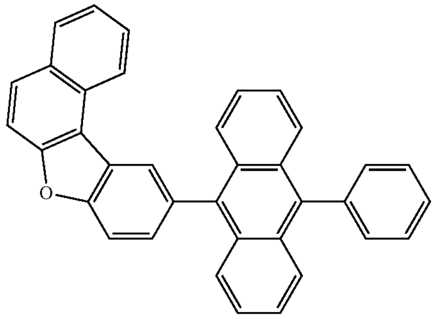
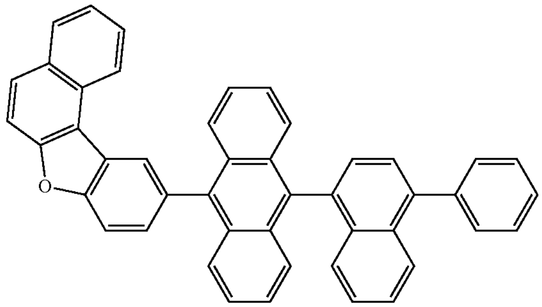
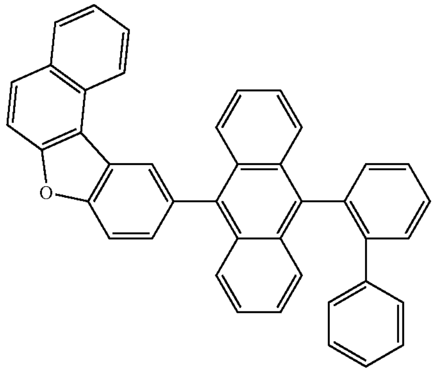
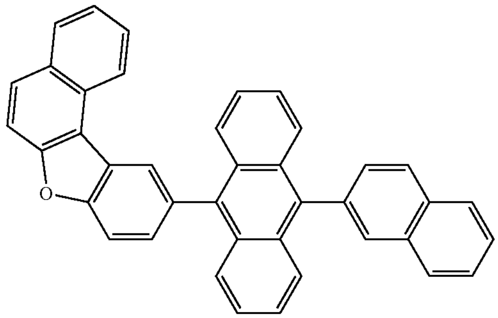
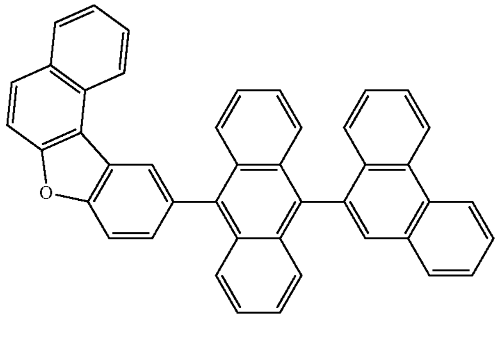

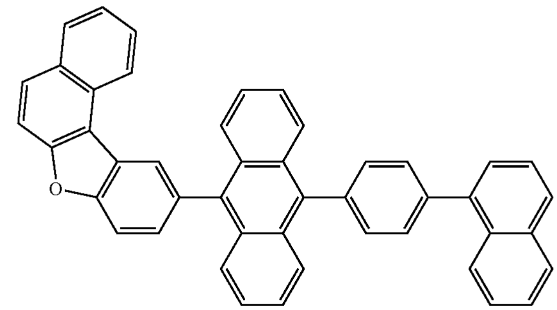
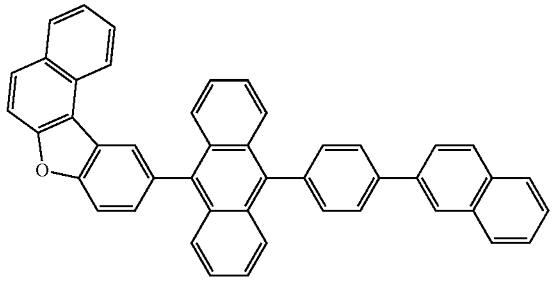
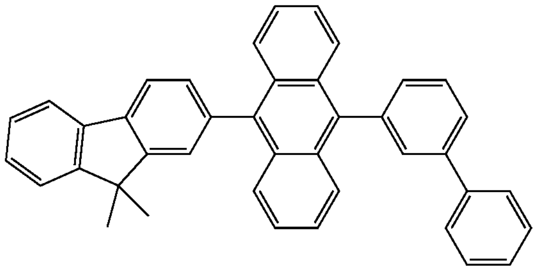
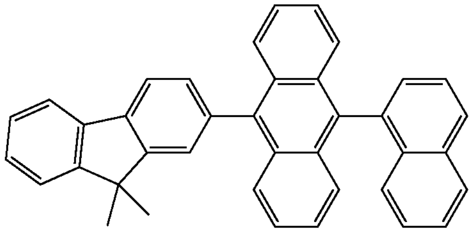
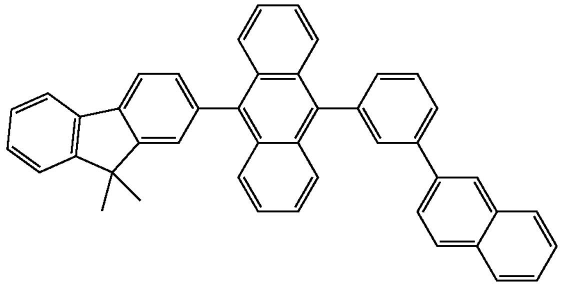
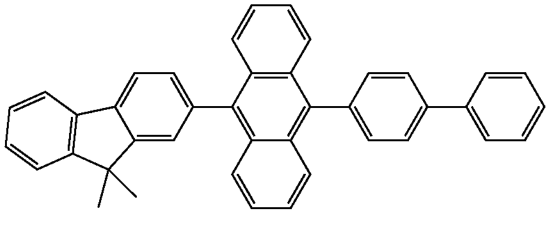
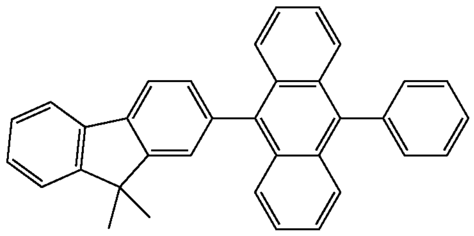
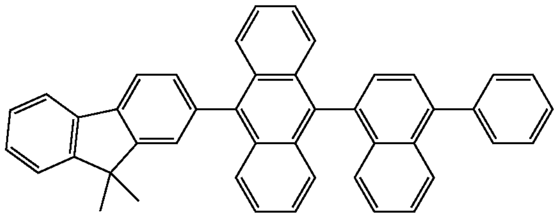
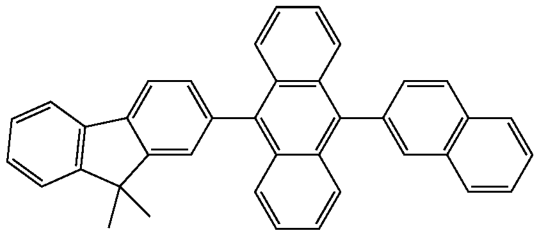
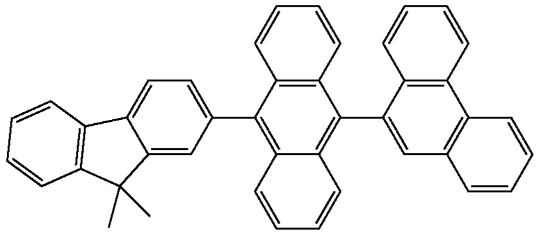
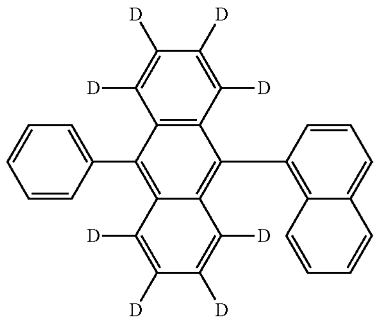
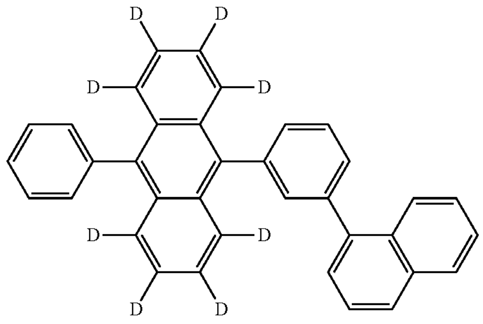

-continued
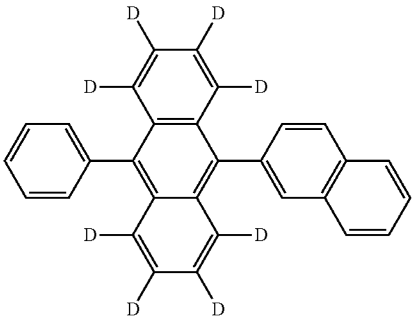
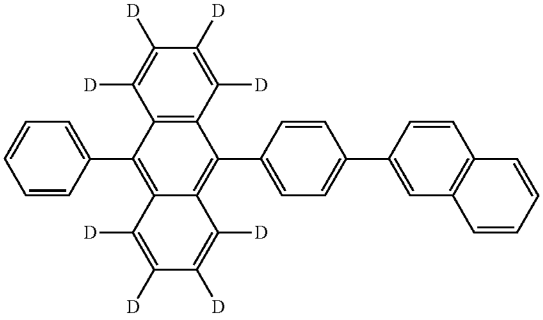
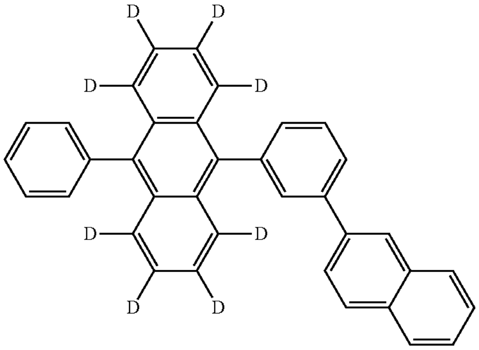
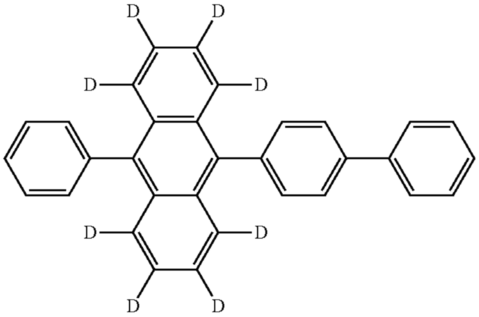
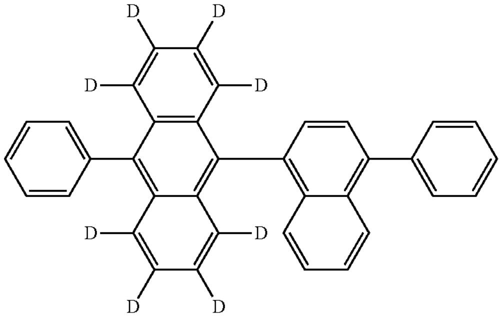
-continued
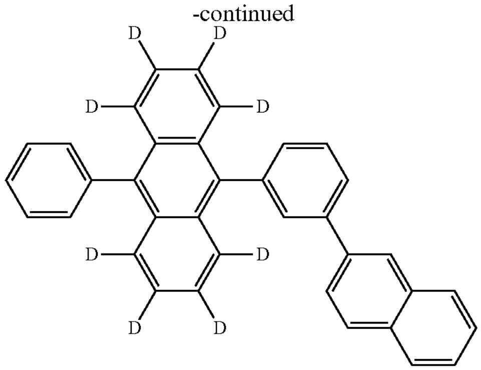
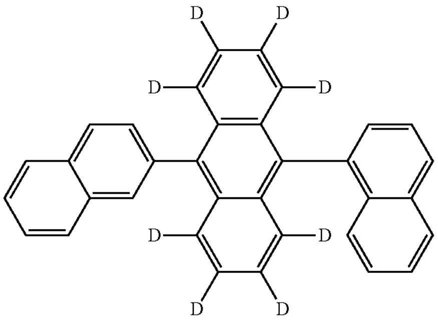
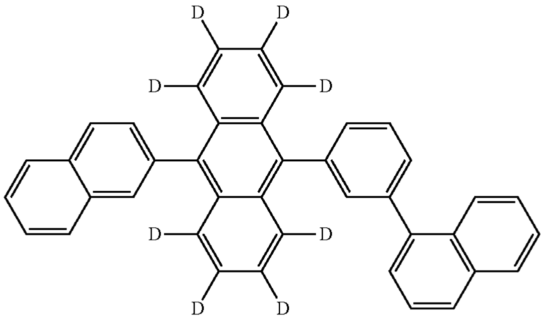
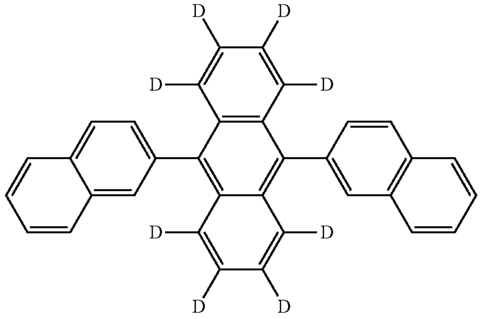
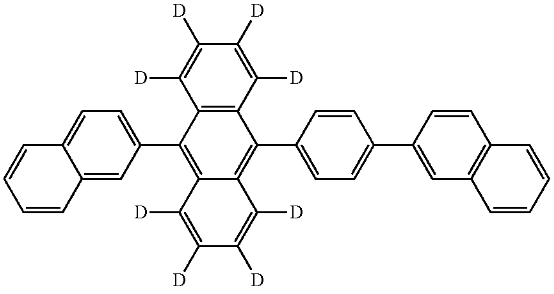

-continued
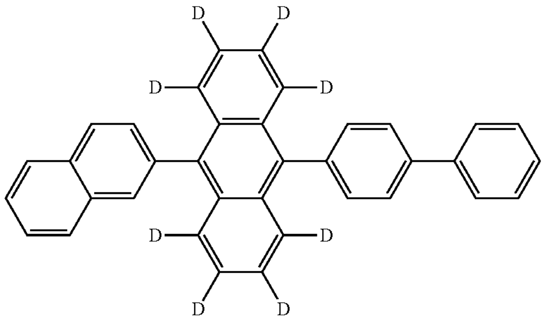
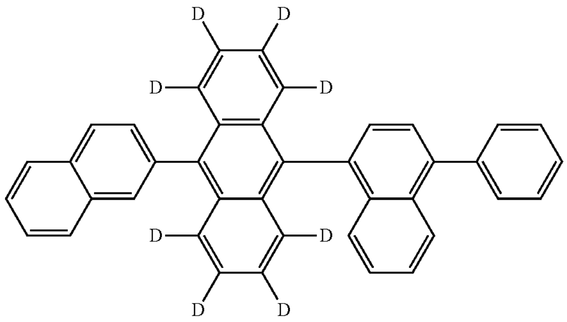
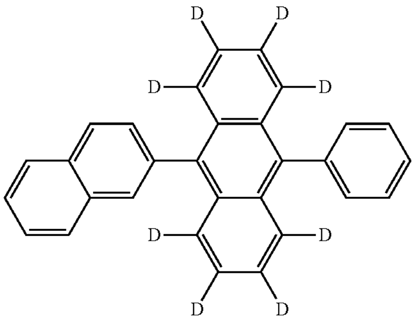
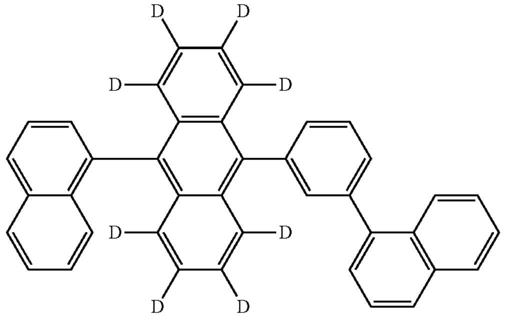
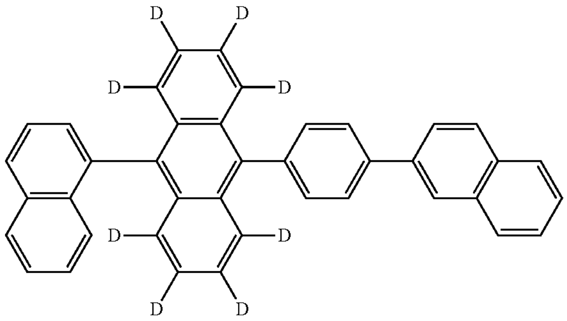
-continued
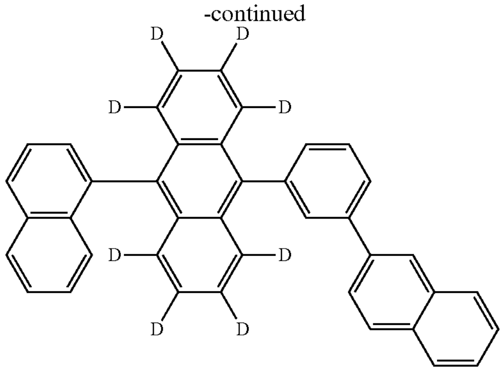
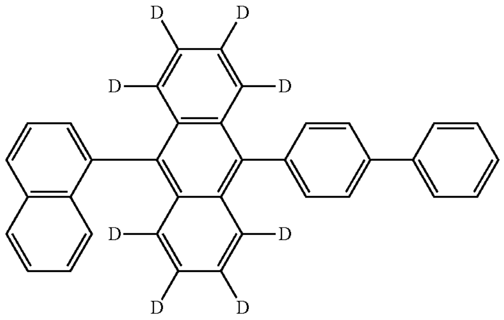
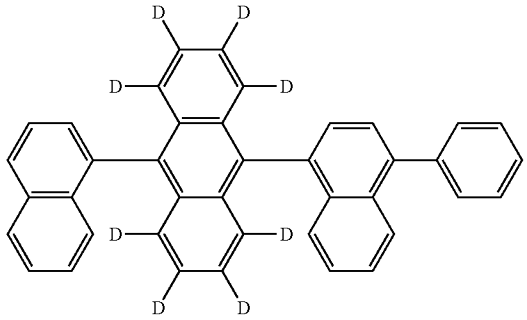
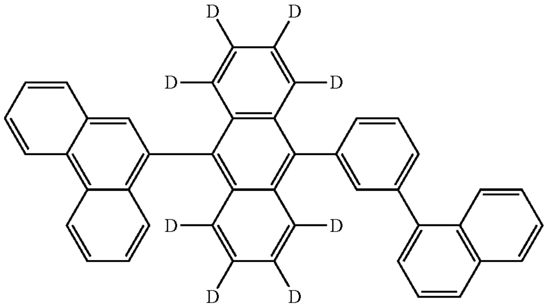
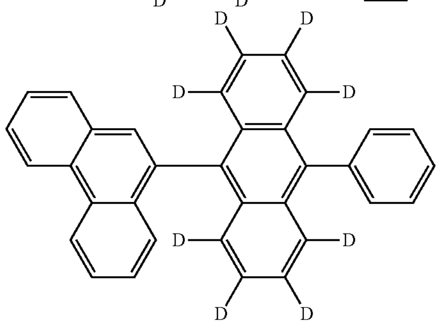

-continued
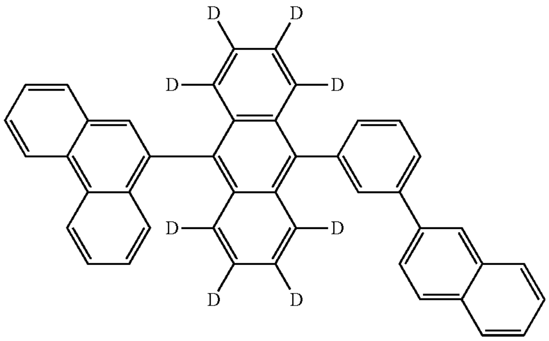
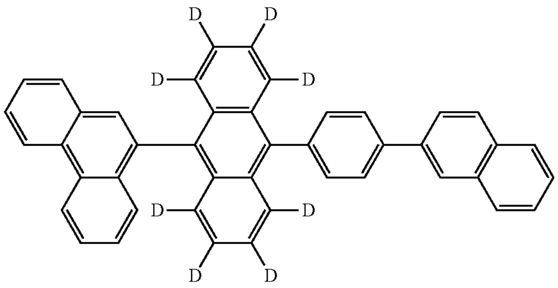
[Formula 110]
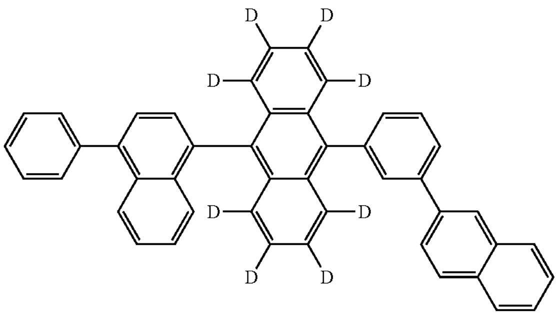
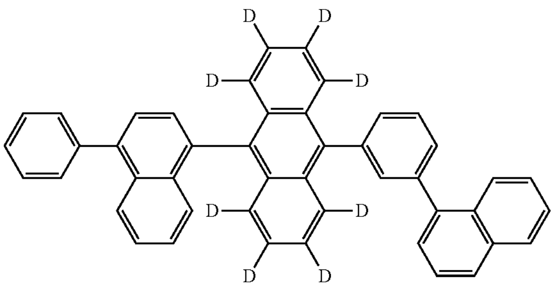
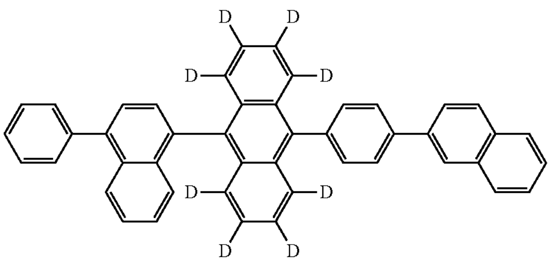
-continued
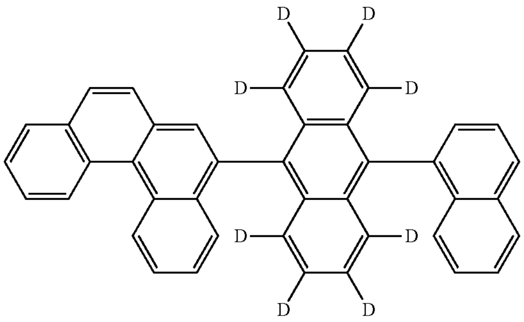
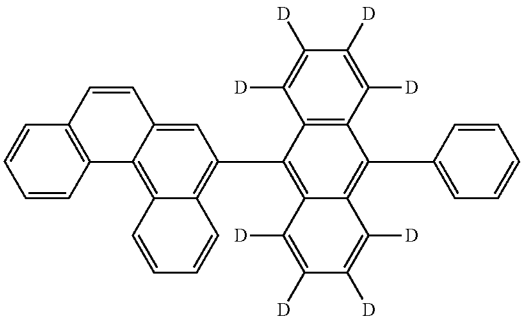
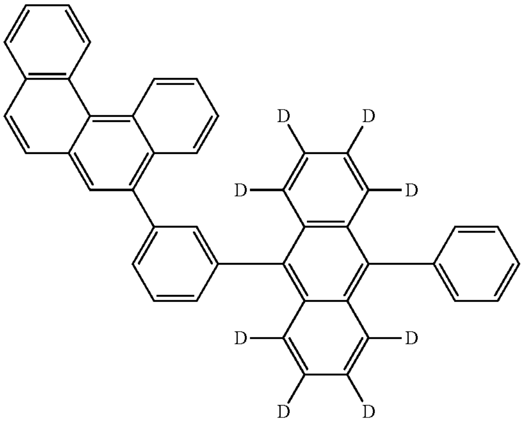
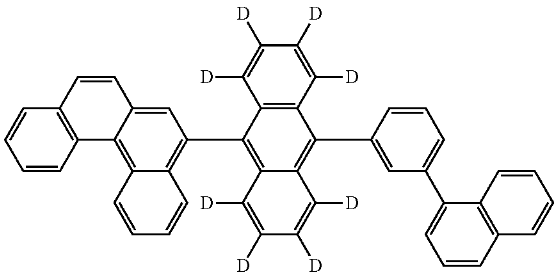
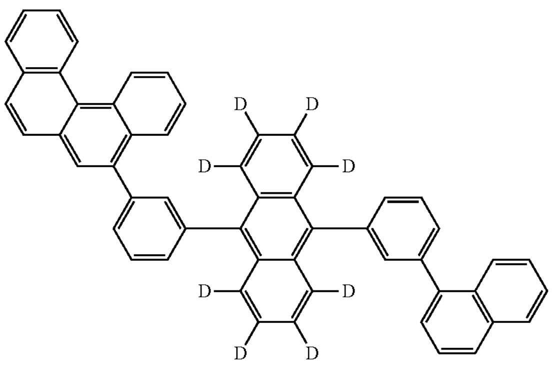

-continued
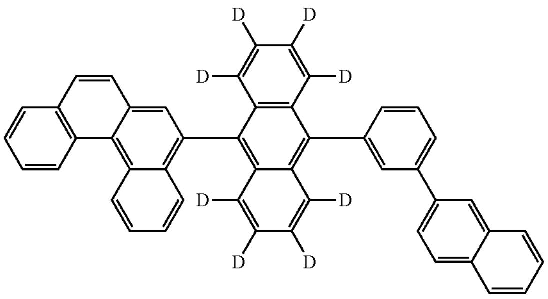
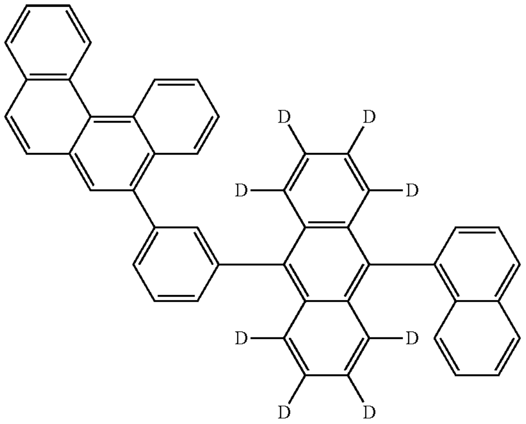
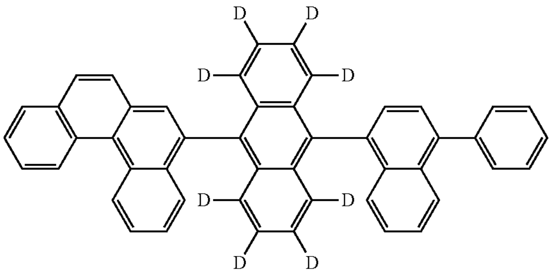
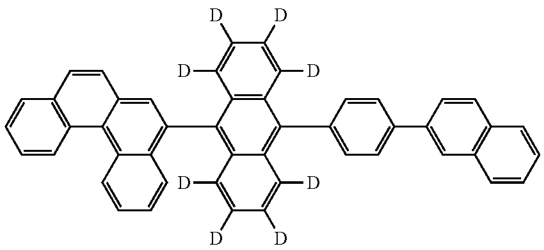
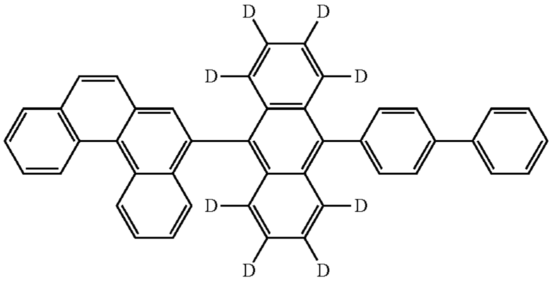
-continued
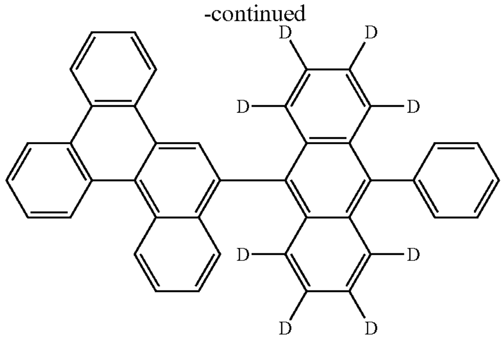
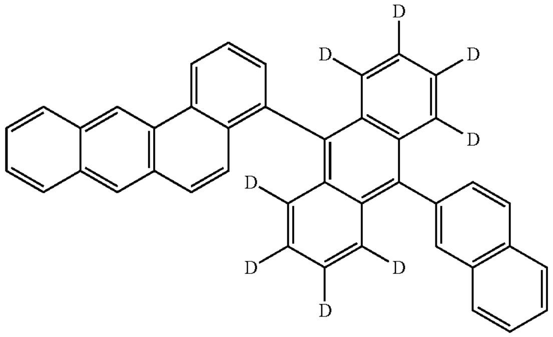
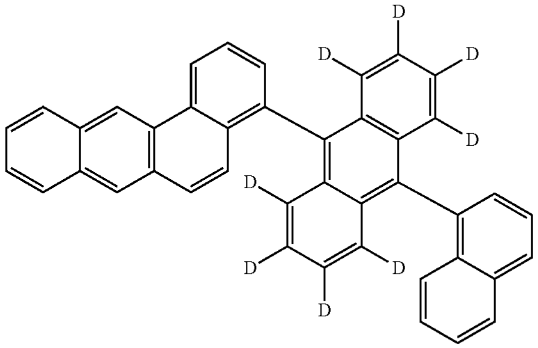
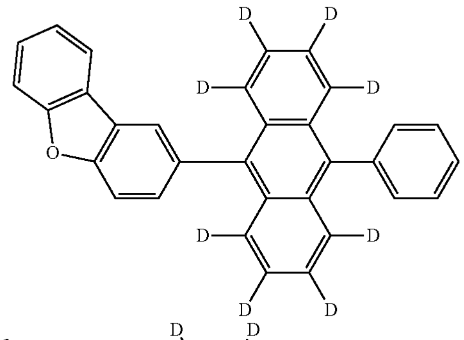
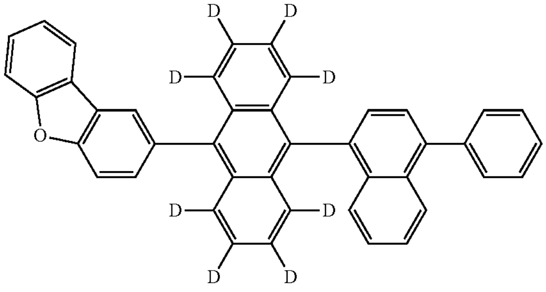

-continued
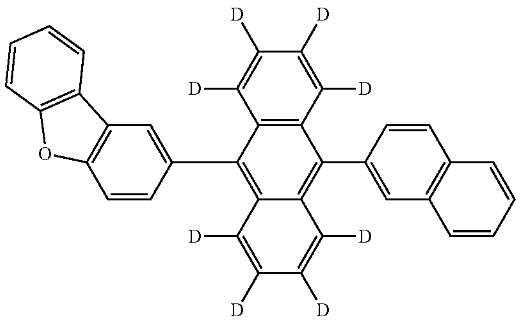
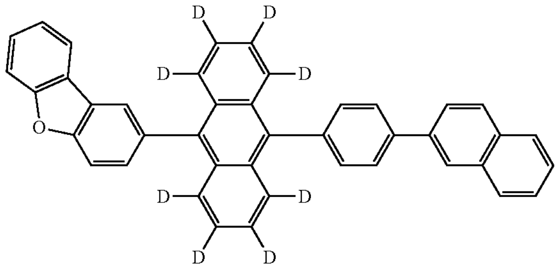
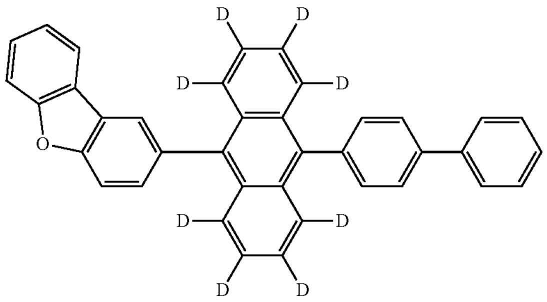
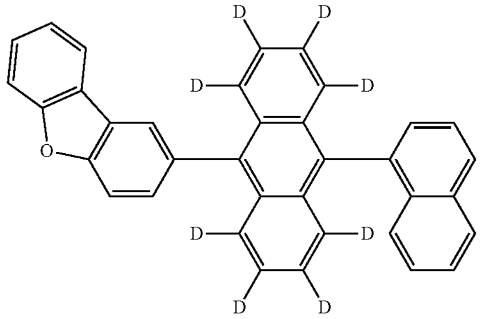
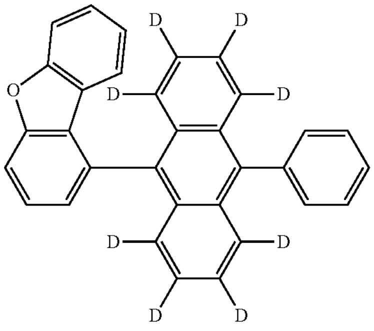
-continued
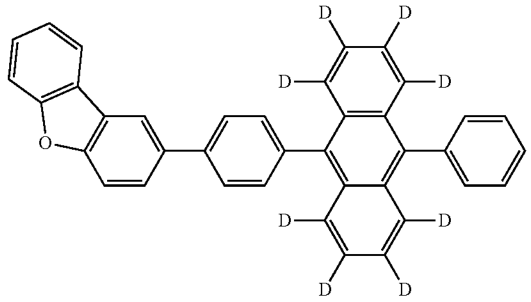
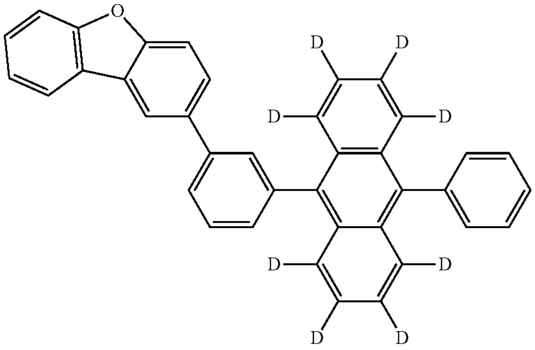
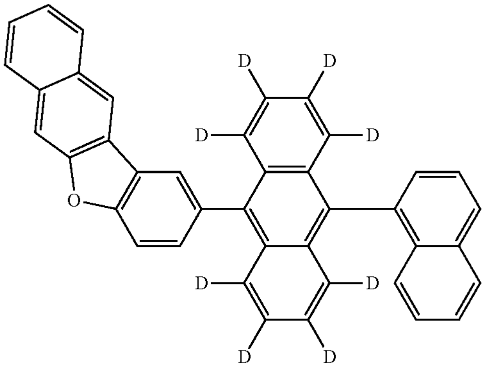
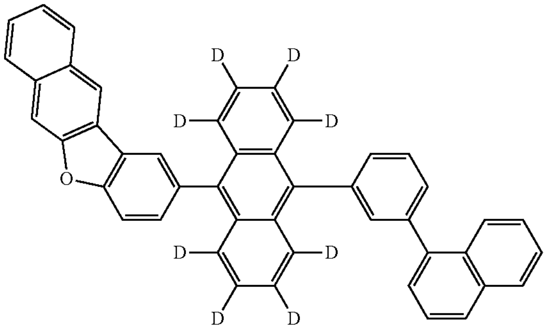
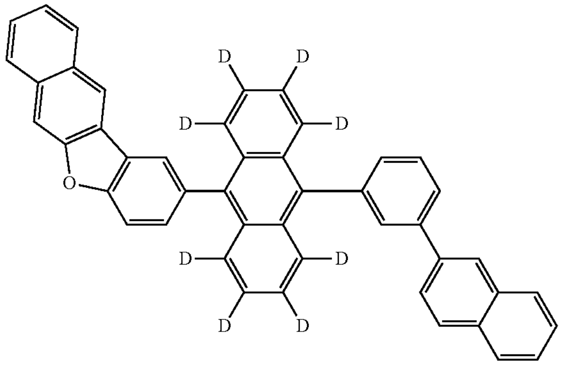

-continued
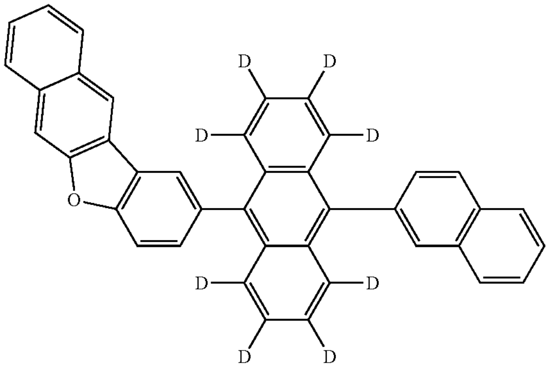
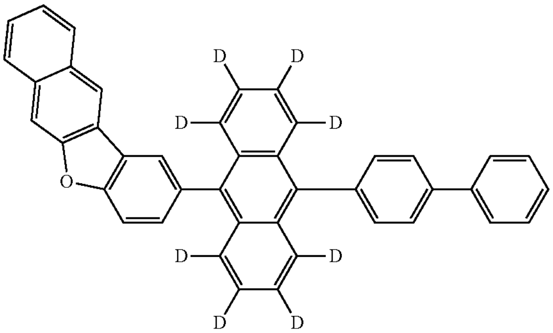
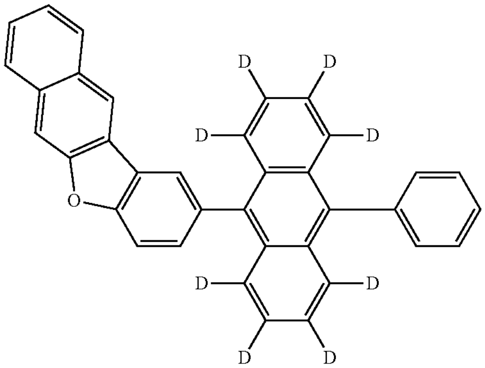
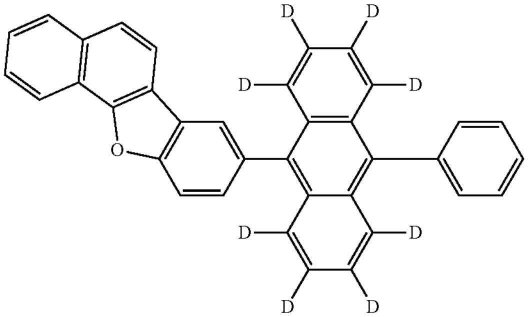
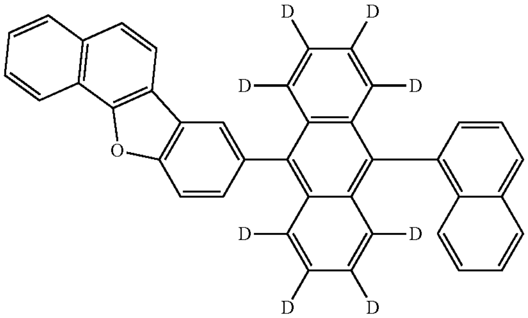
-continued
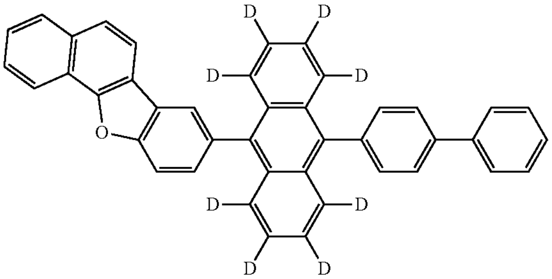
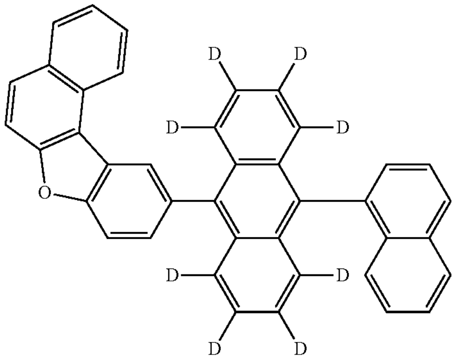
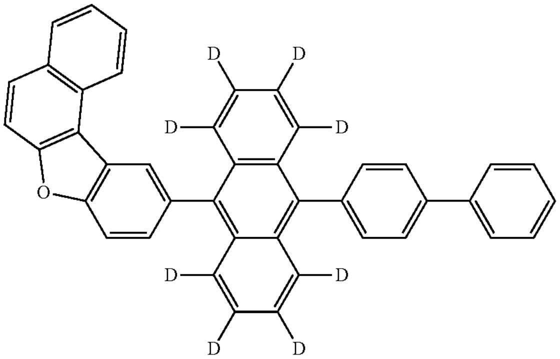
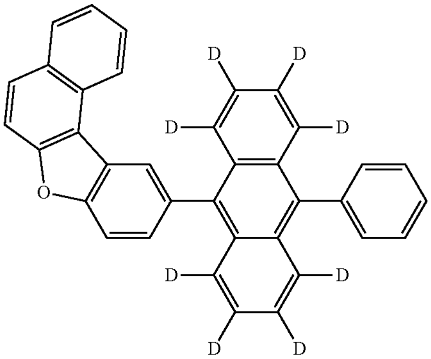
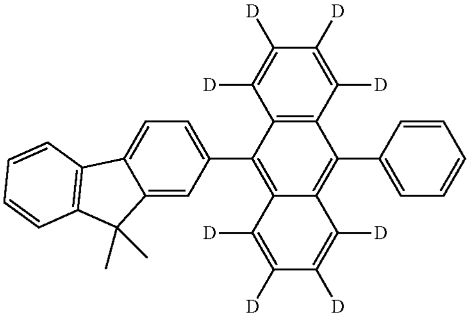

-continued
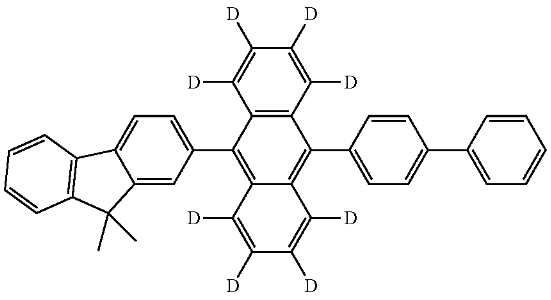
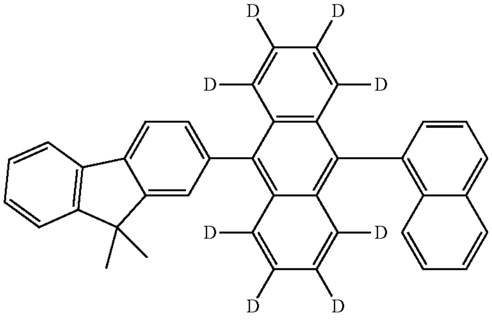
[Formula 111]
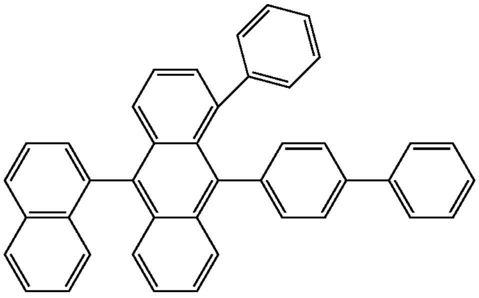
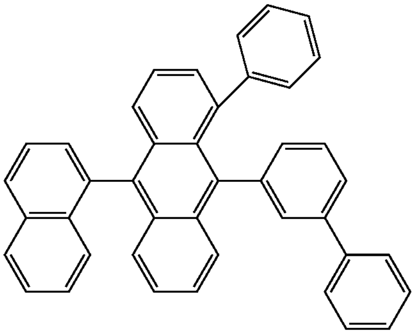
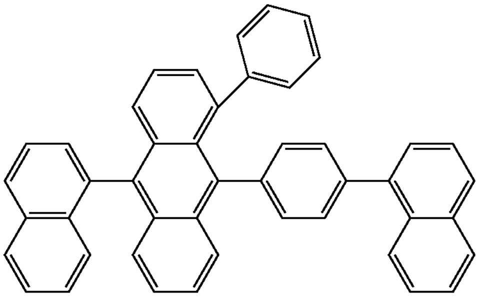
-continued
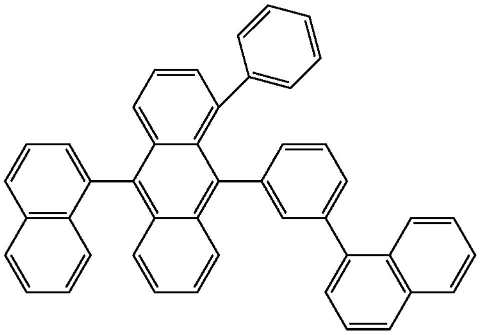
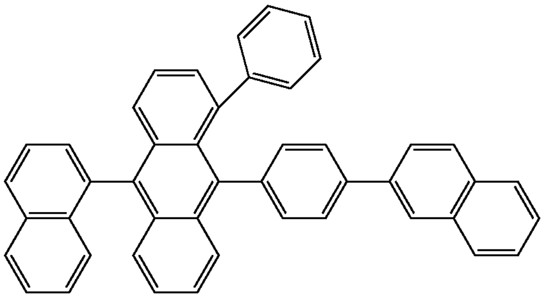
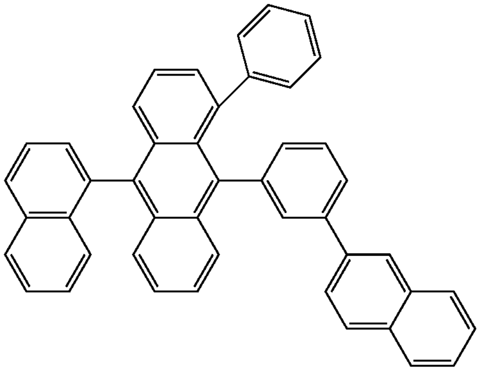
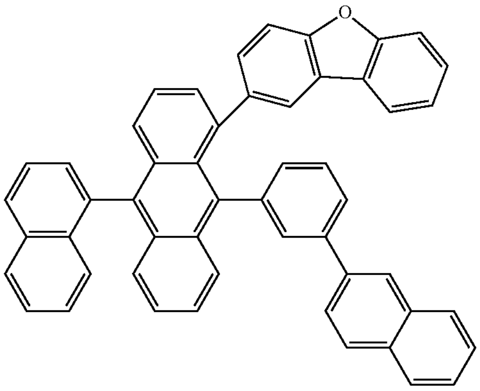

-continued
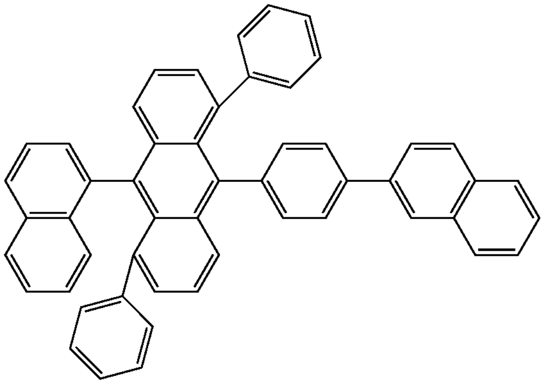
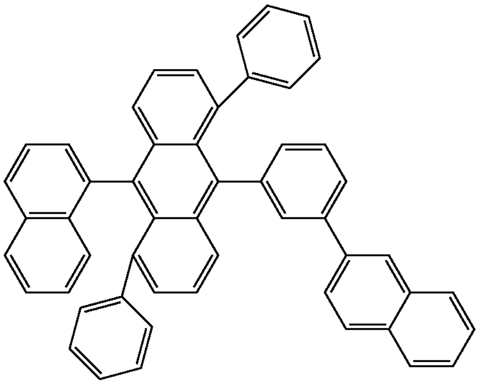
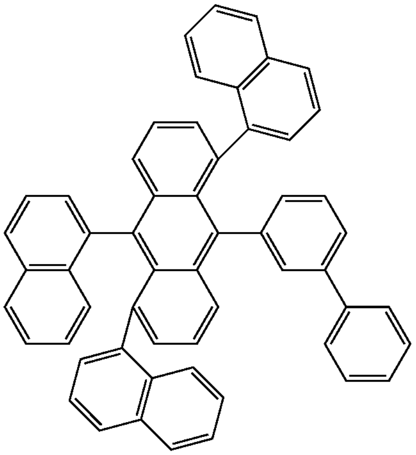
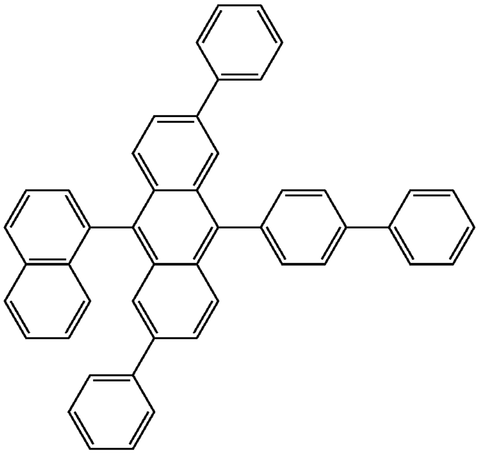
-continued
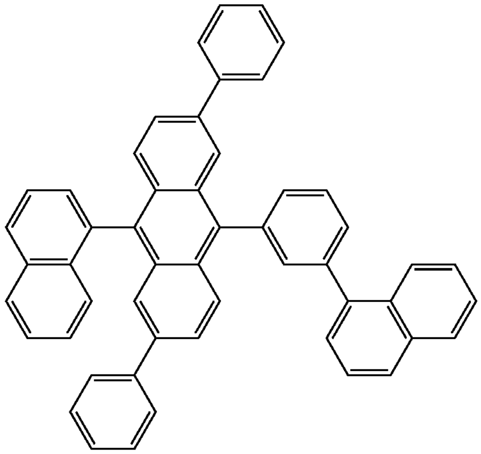
[Formula 112]
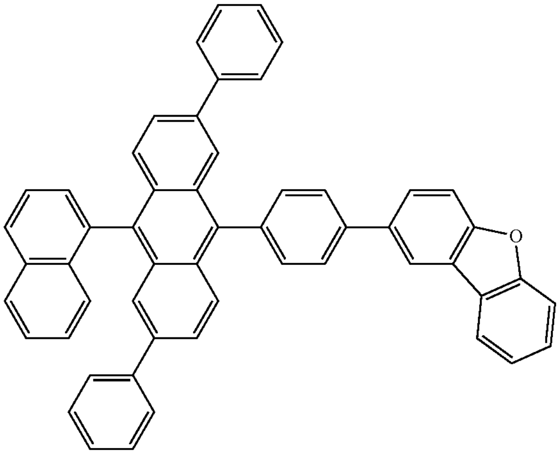
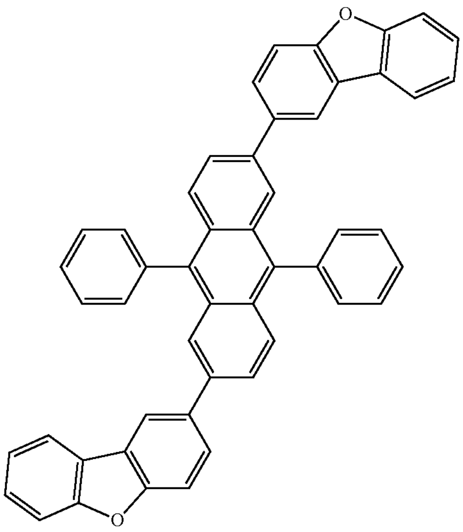

-continued
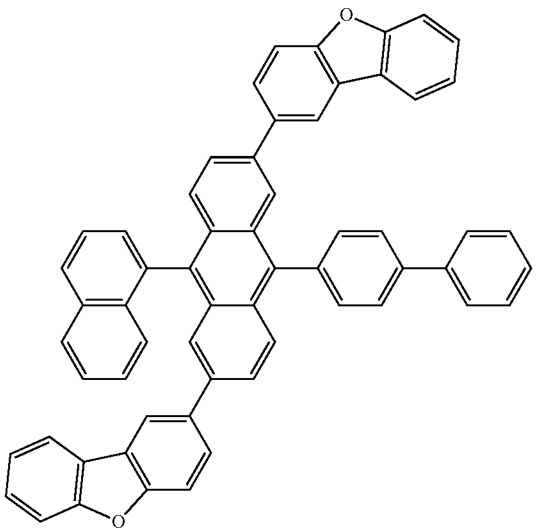
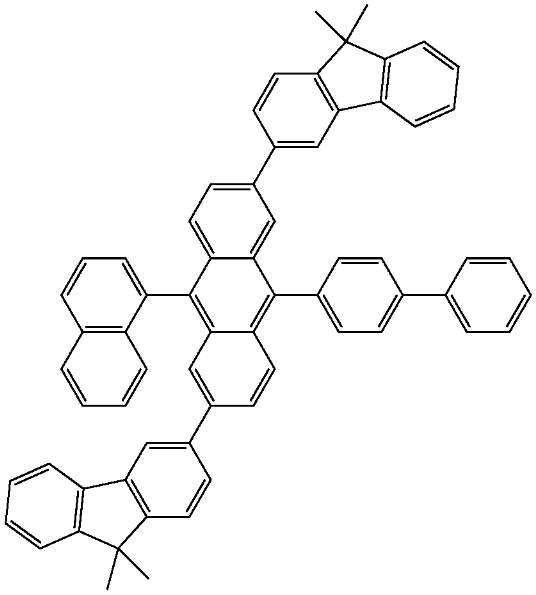
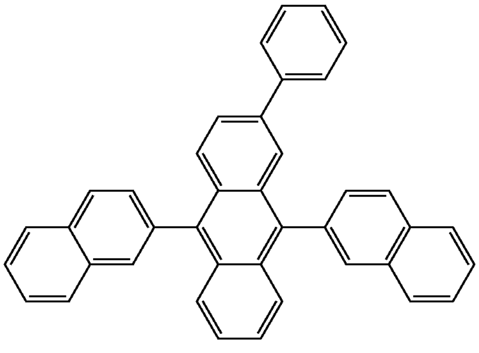
-continued
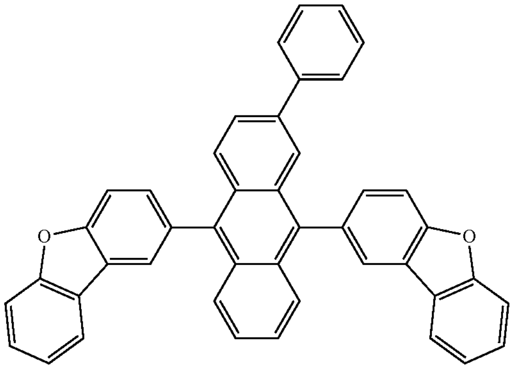
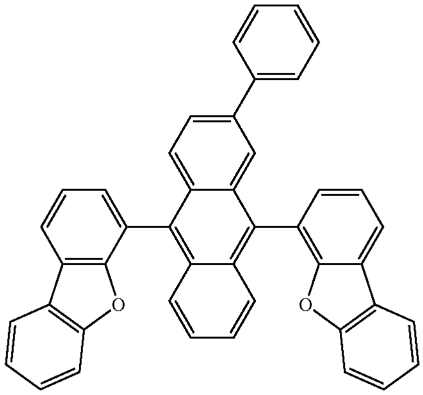
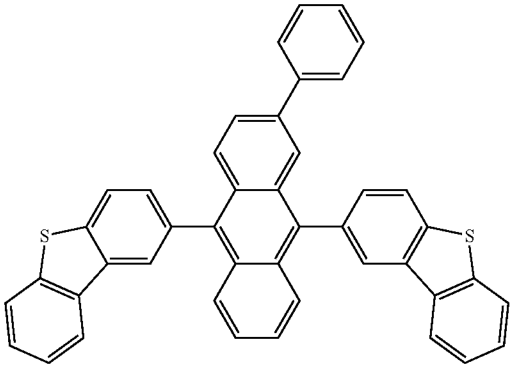
[Formula 113]
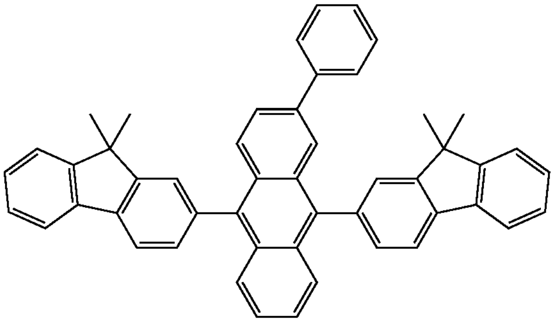

-continued
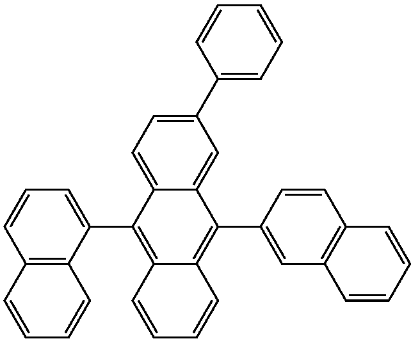
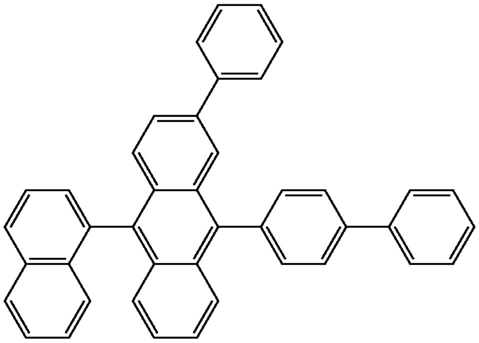
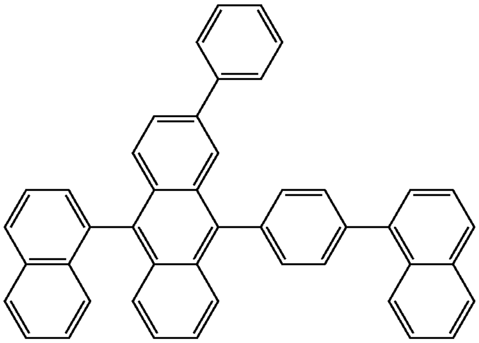
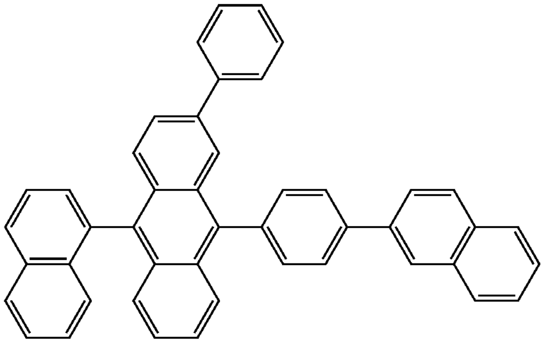
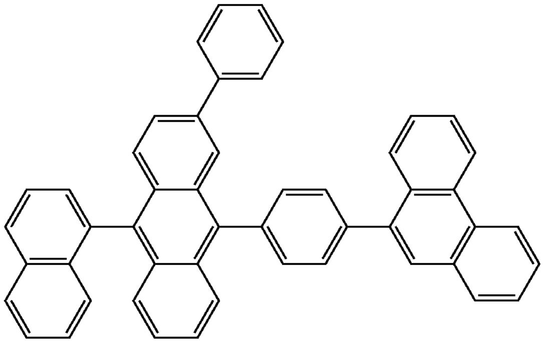
-continued
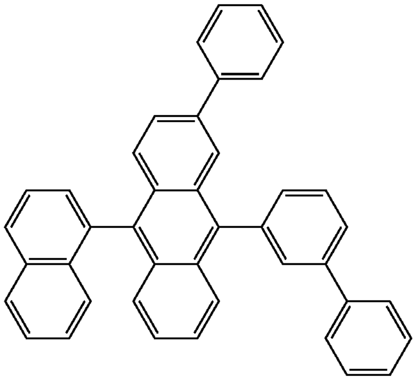
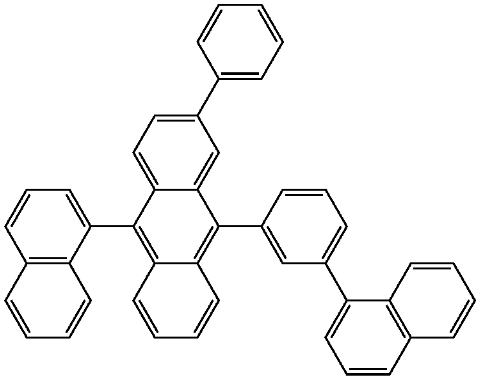
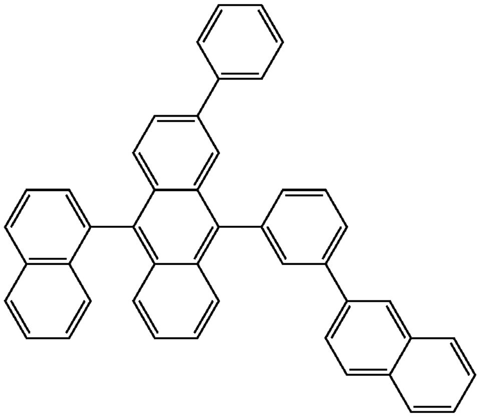
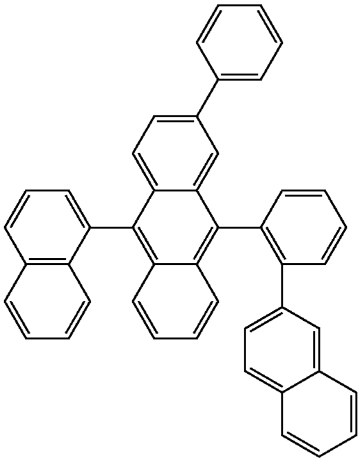

-continued
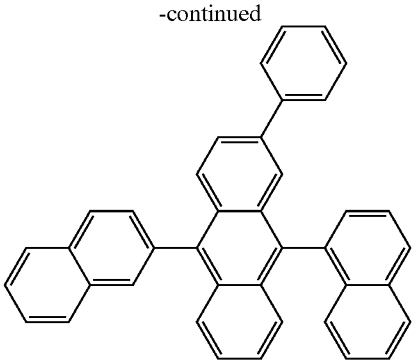
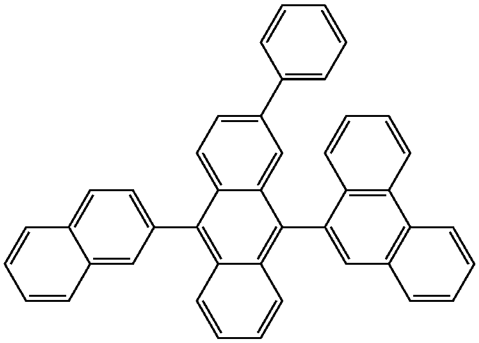
[Formula 114]
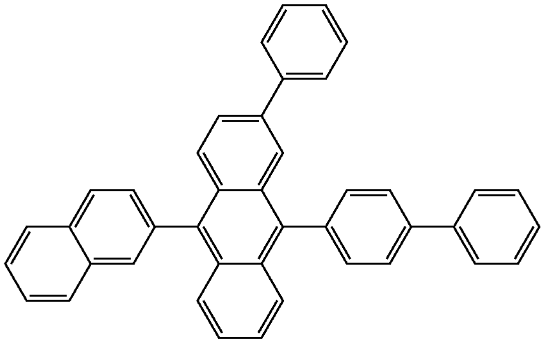
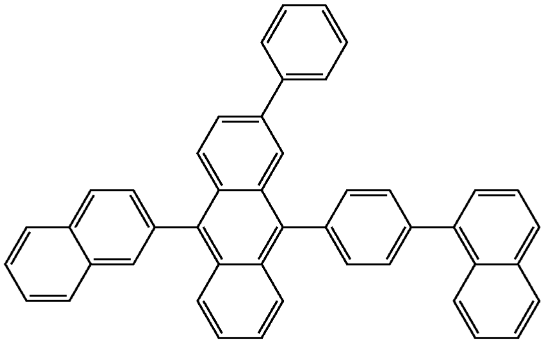
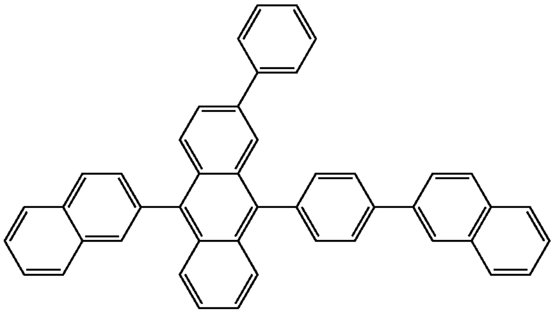
-continued
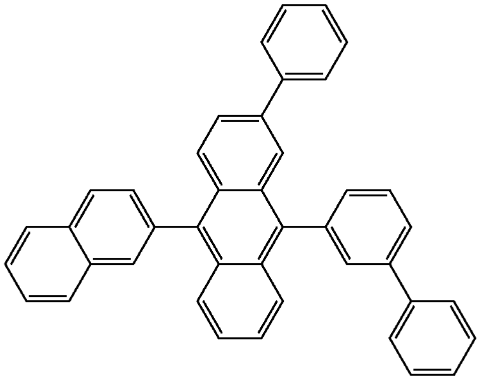
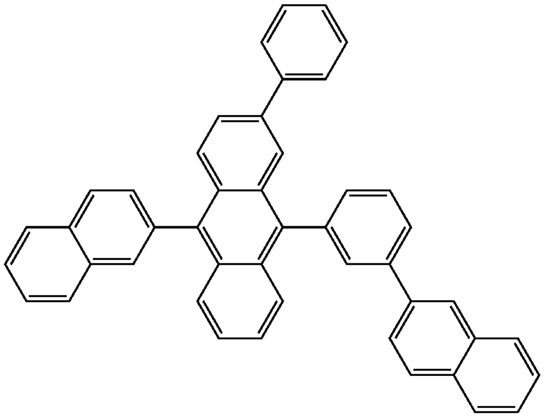
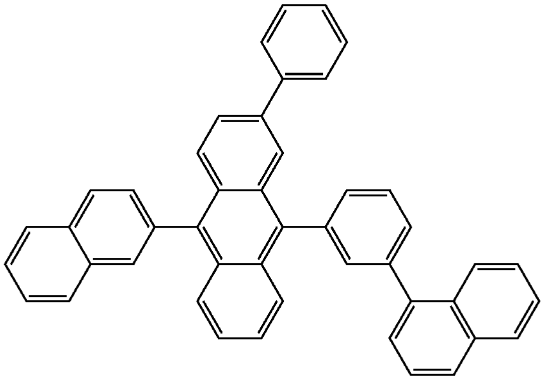
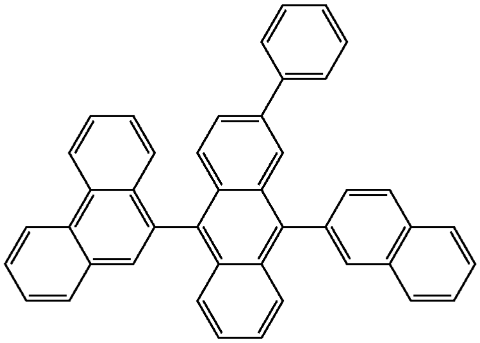

-continued
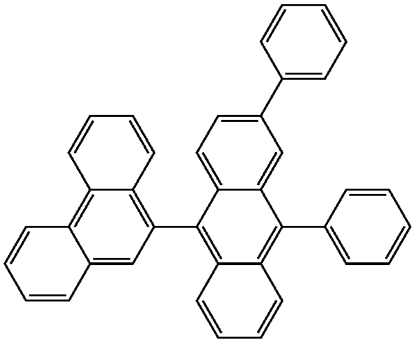
[Formula 115]
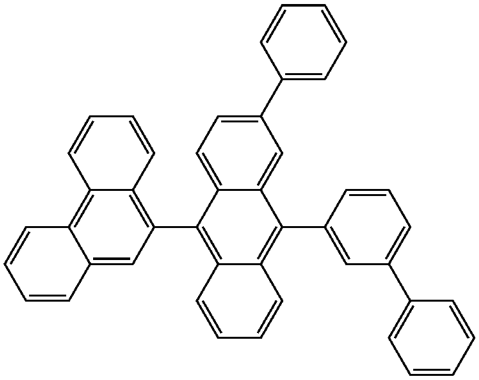
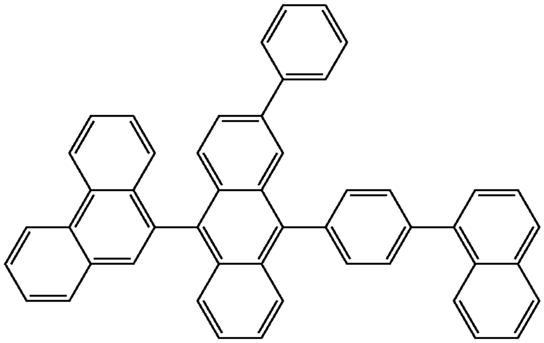
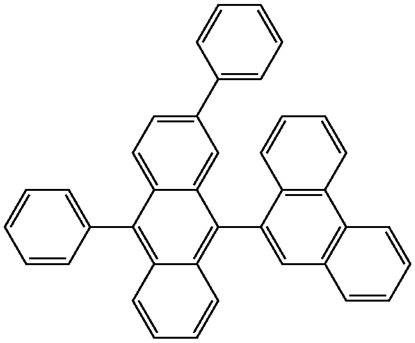
-continued
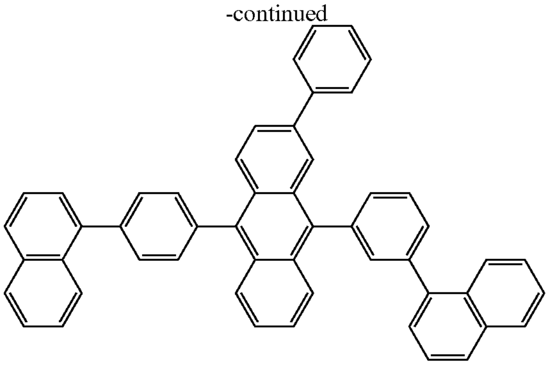
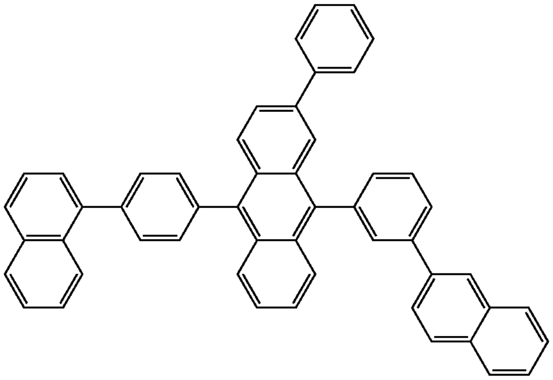
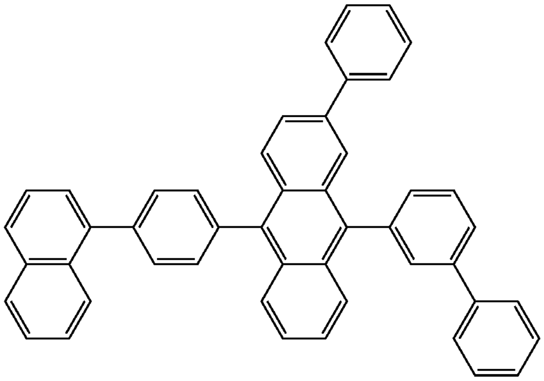
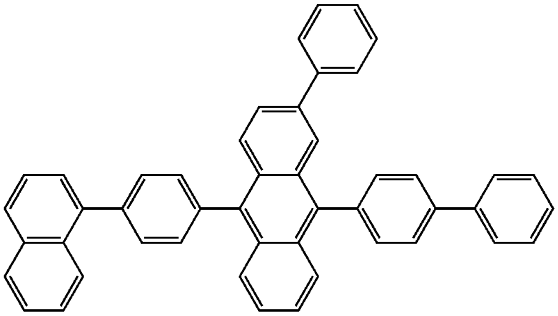
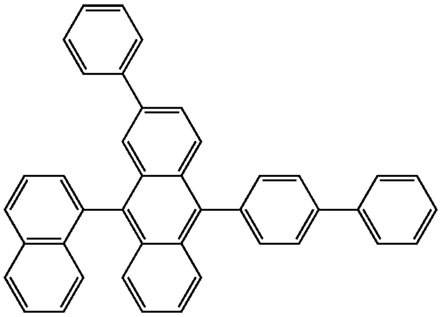

-continued
[Formula 116]
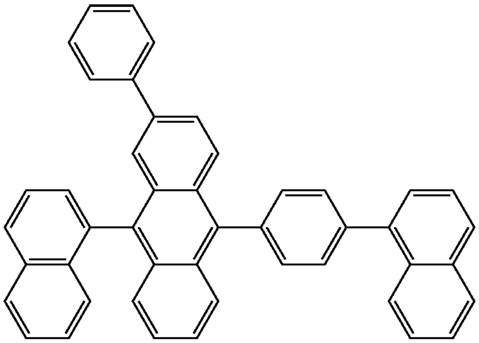
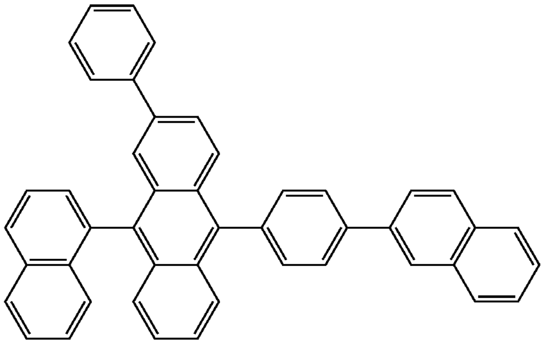
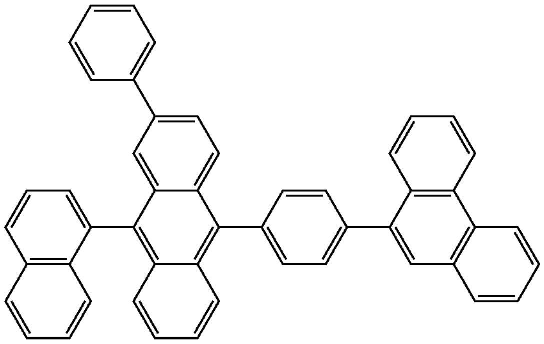
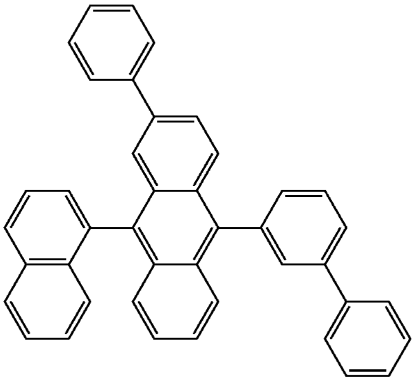
-continued
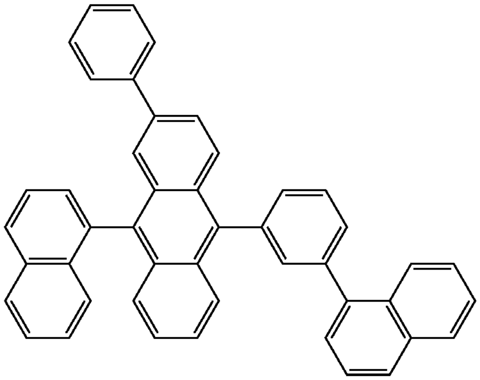
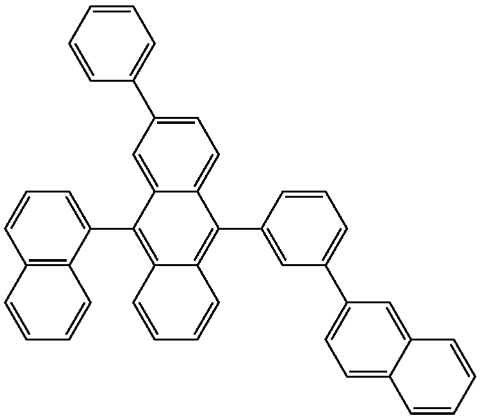
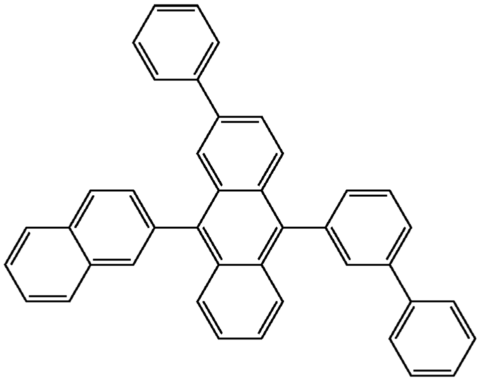
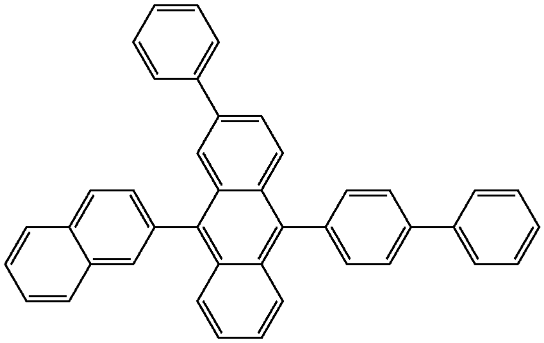

-continued
[Formula 117]
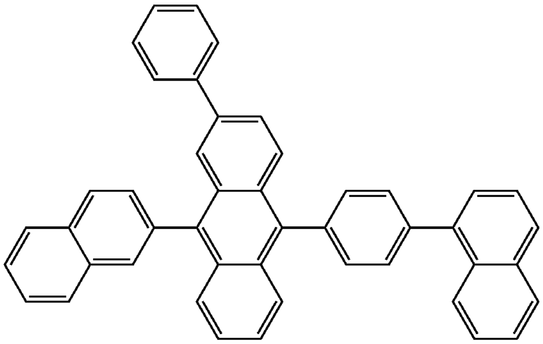
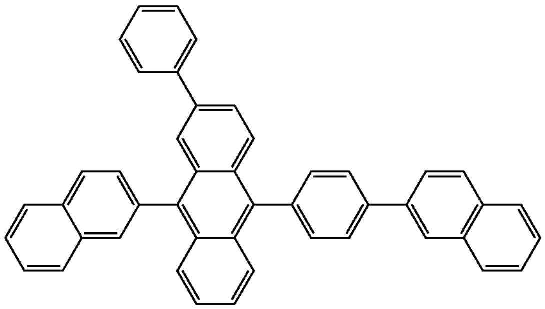
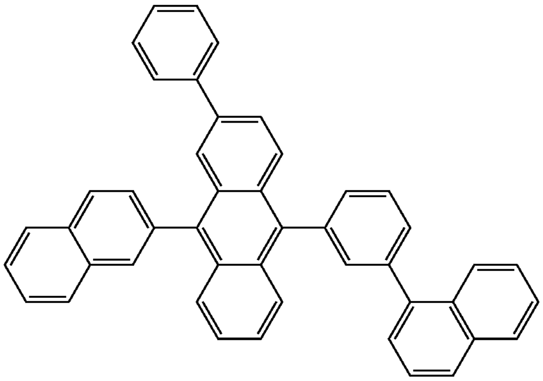
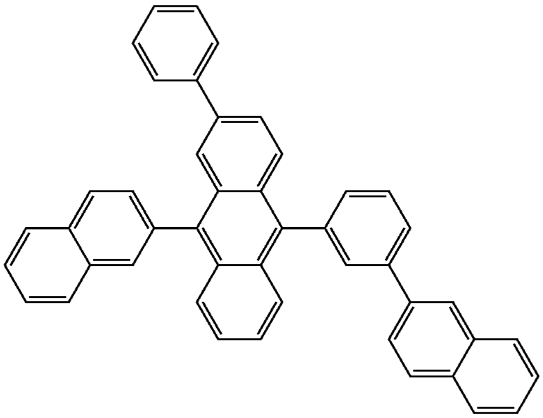
-continued
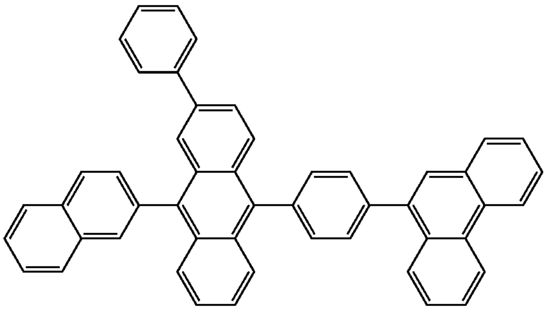
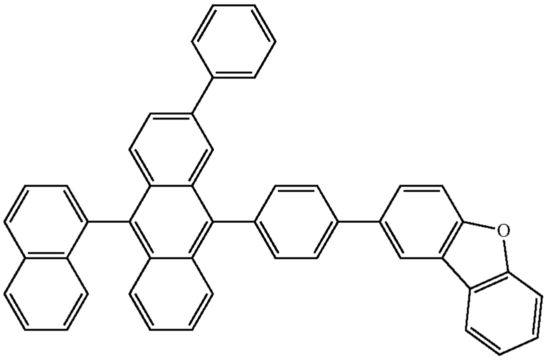
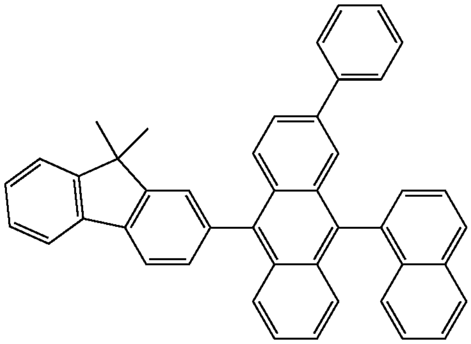
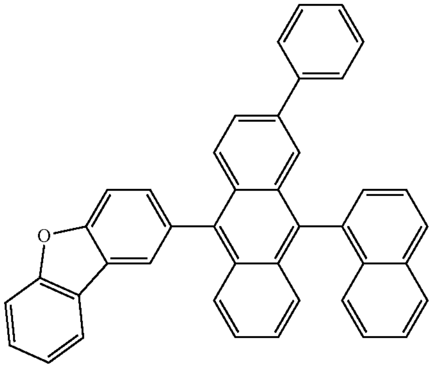

-continued
[Formula 118]
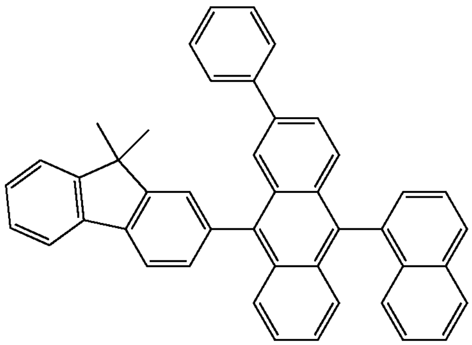
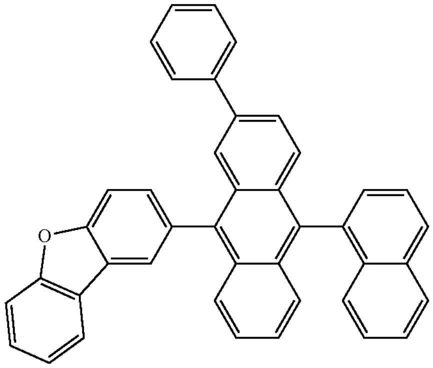
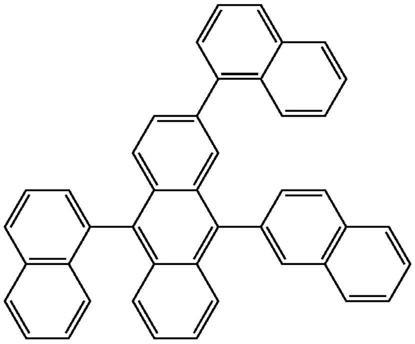
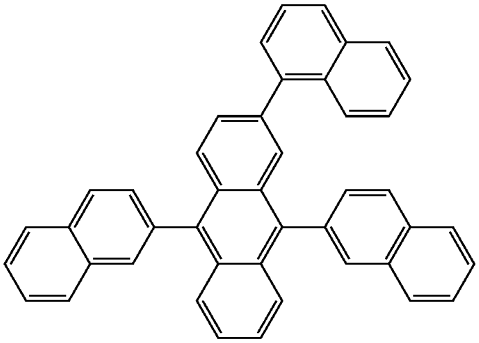
-continued
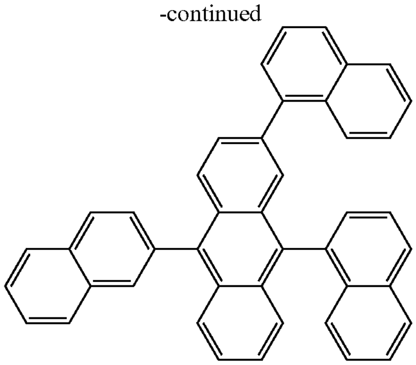
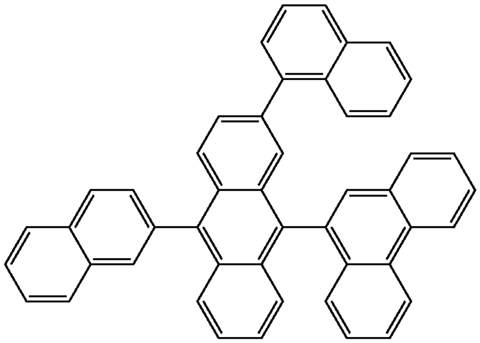
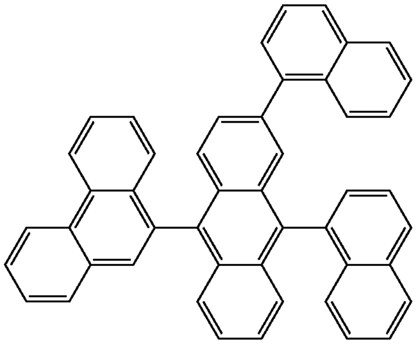
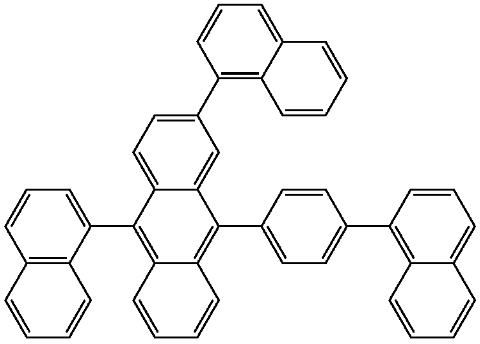

-continued
[Formula 119]
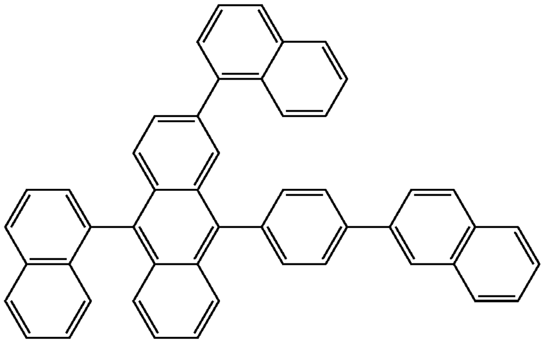
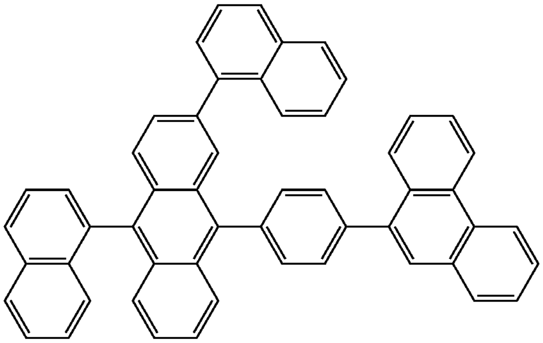
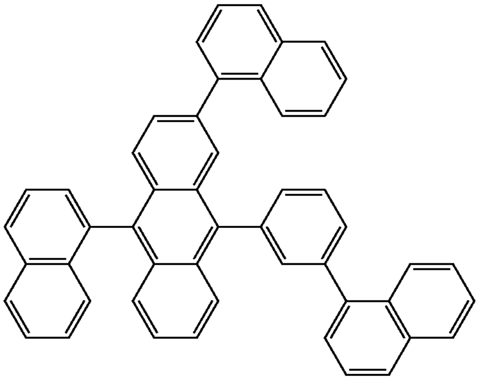
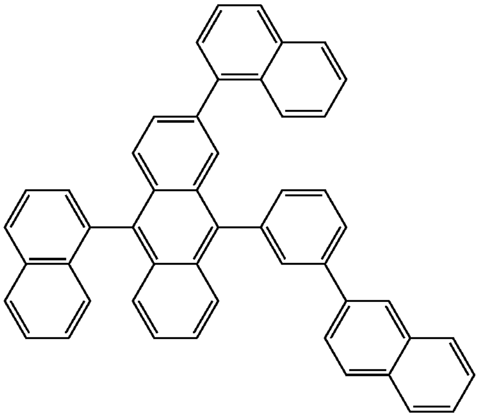
-continued
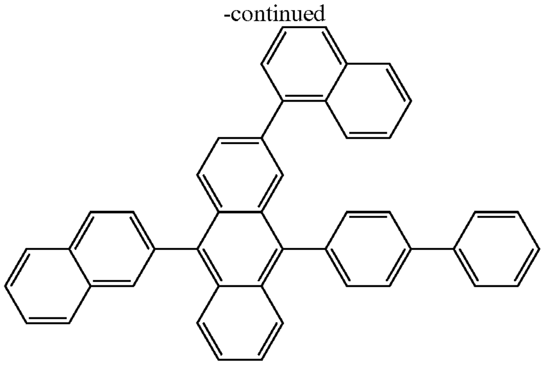
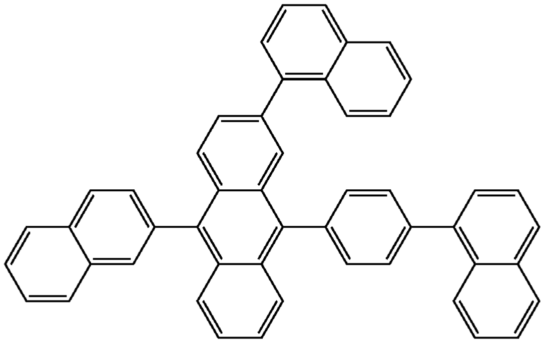
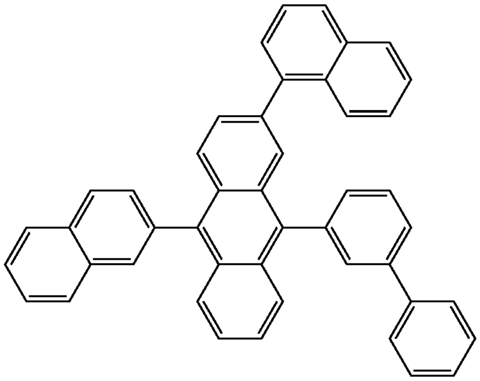
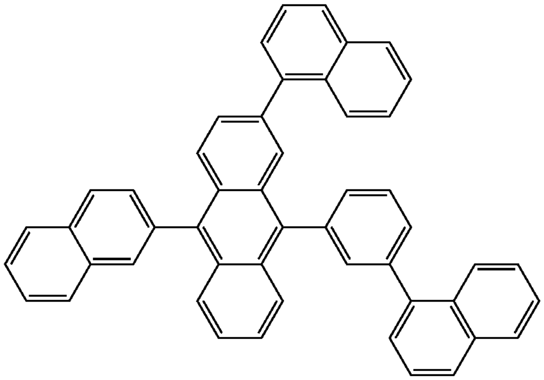

-continued
[Formula 120]
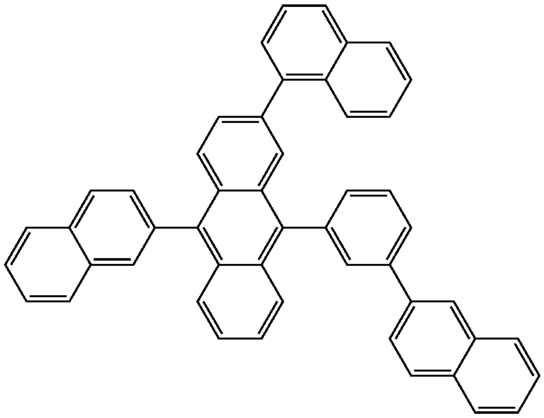
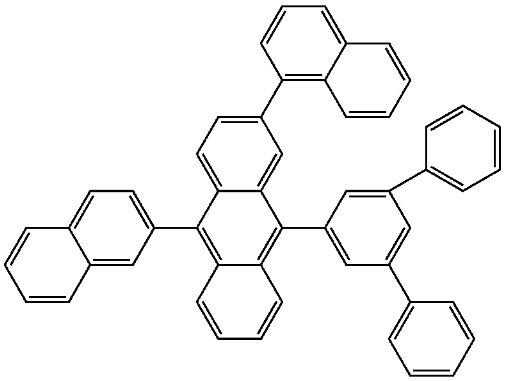
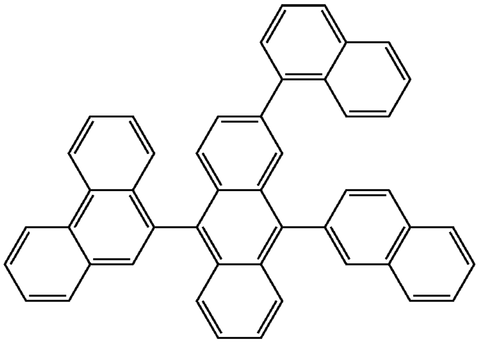
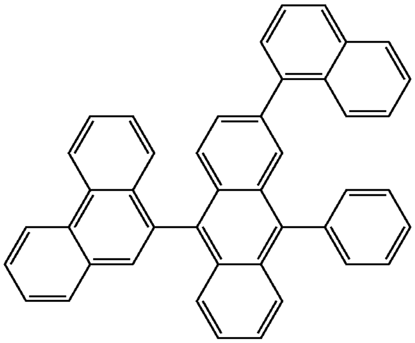
-continued
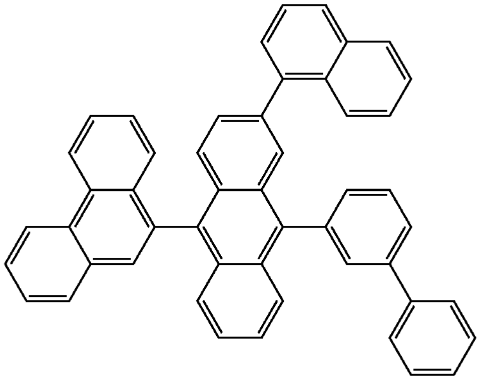
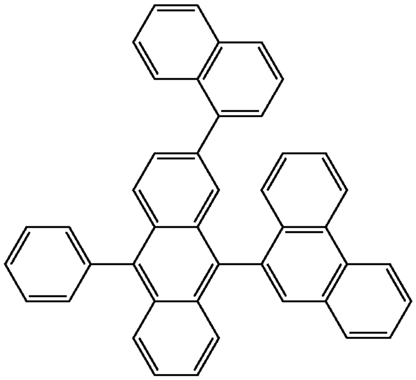
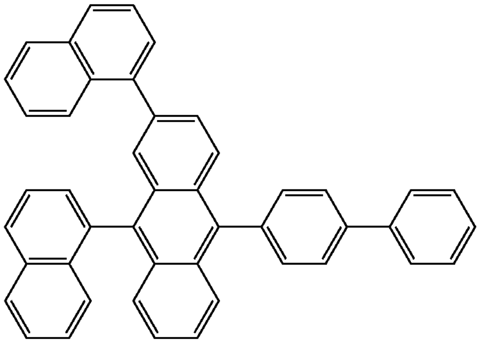
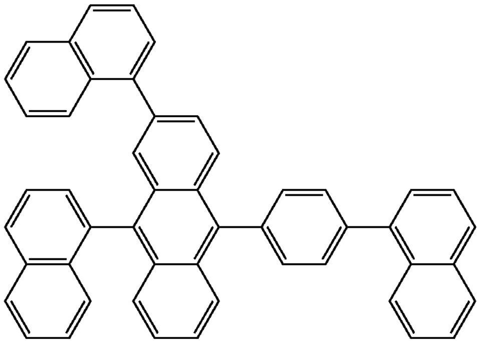

-continued
[Formula 121]
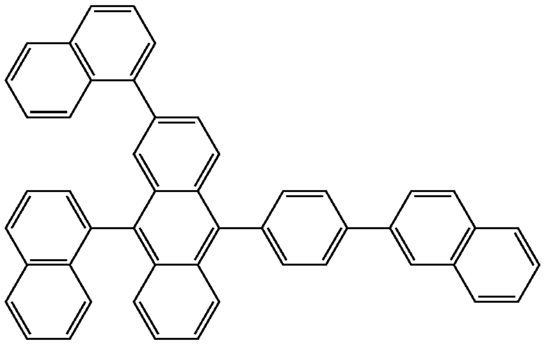
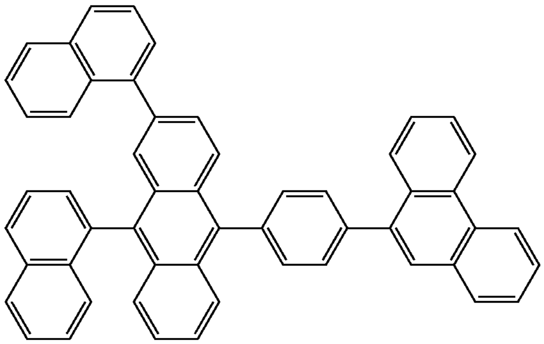
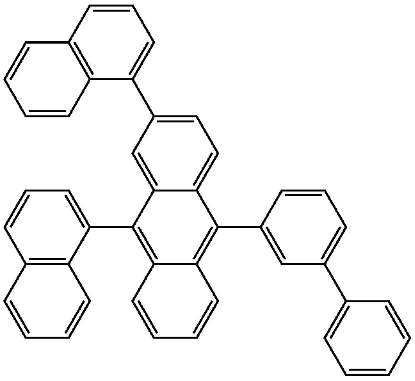
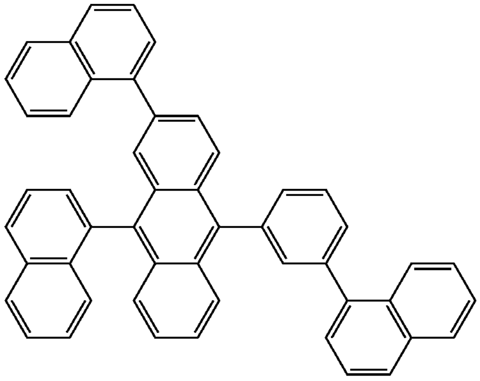
-continued
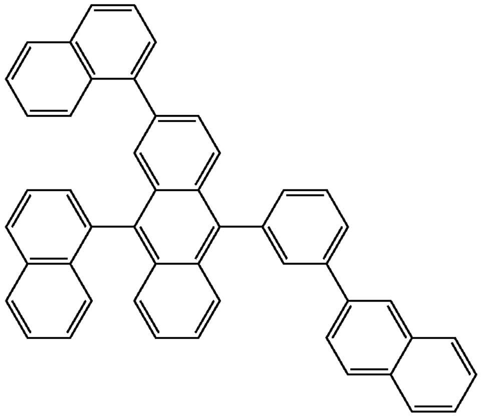
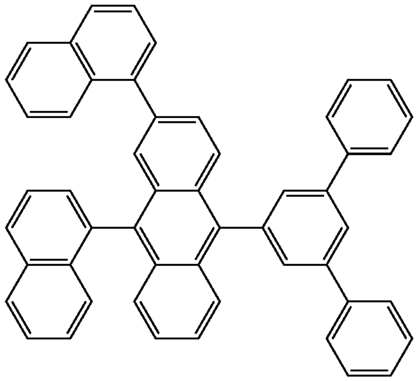
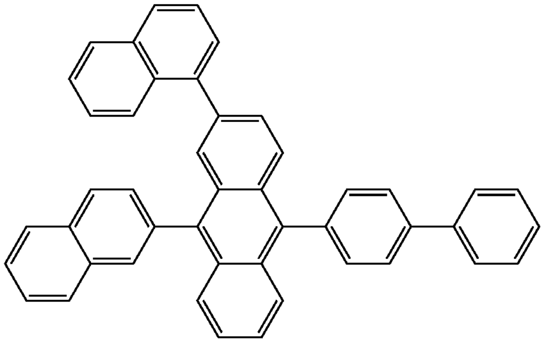
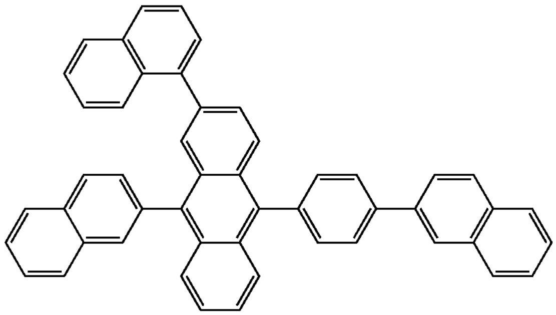

-continued
[Formula 122]
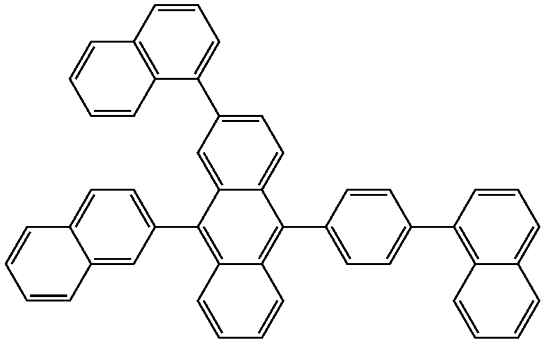
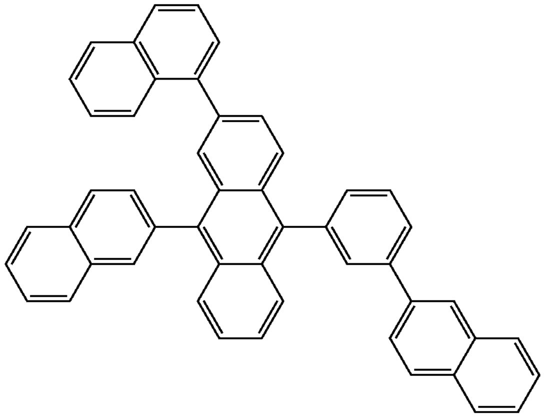
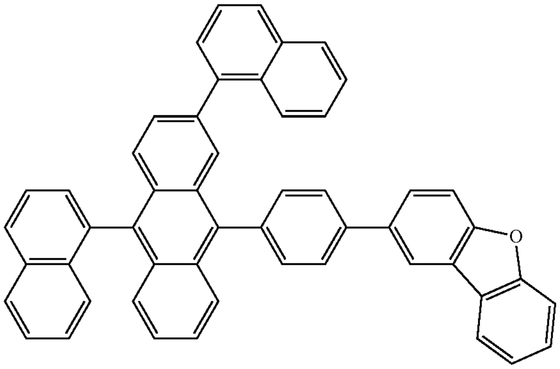
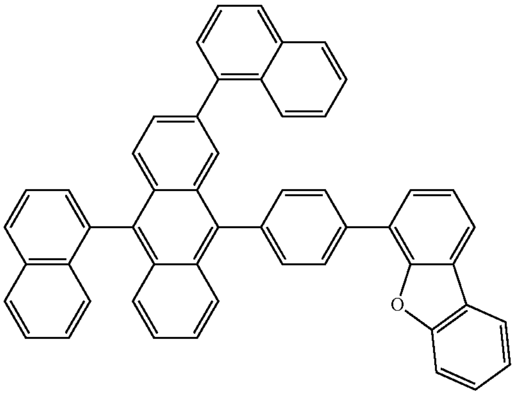
-continued
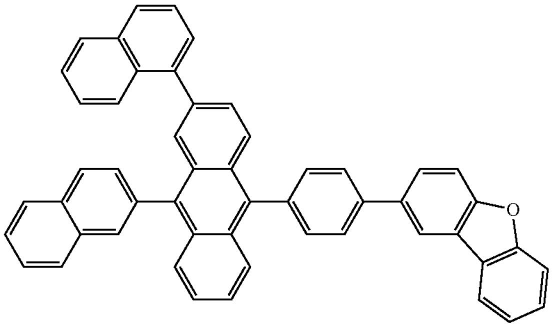
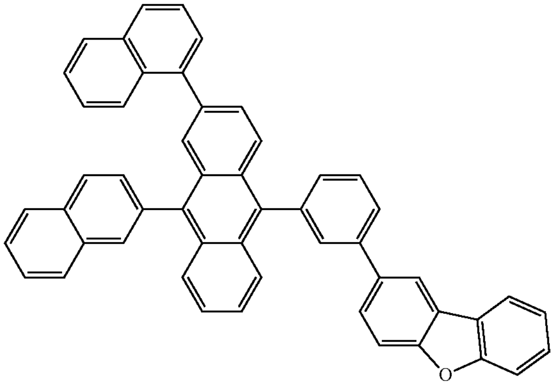
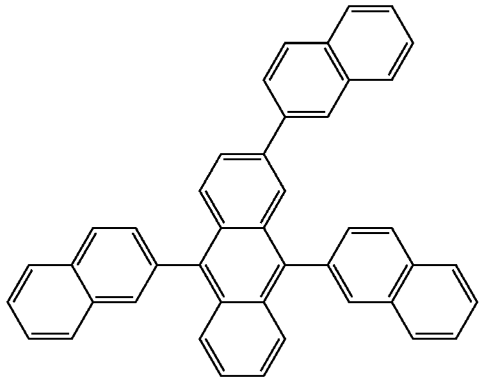
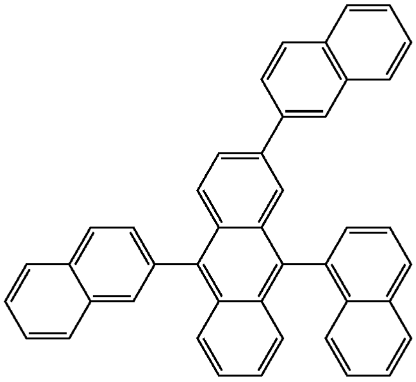

[Formula 123]
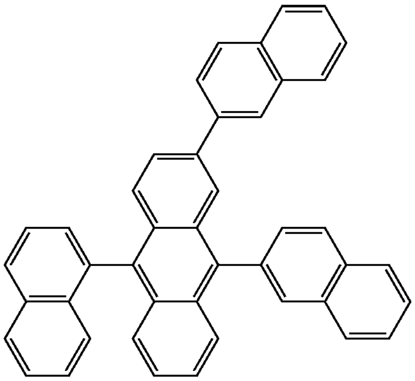
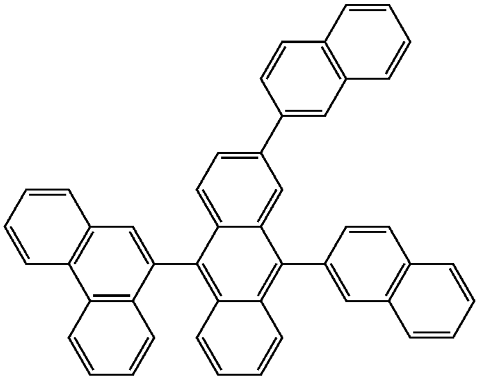
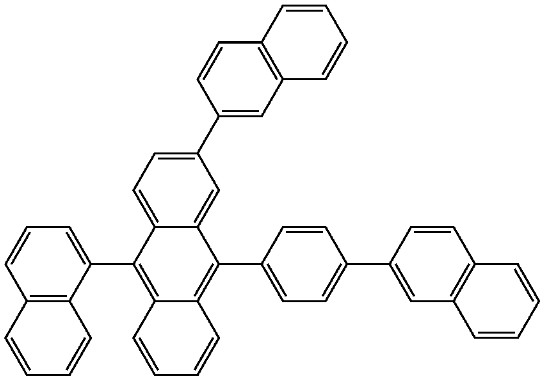
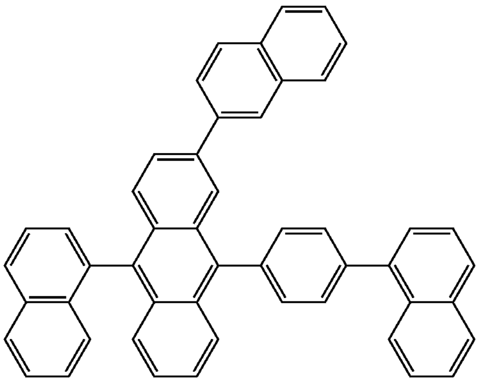
-continued
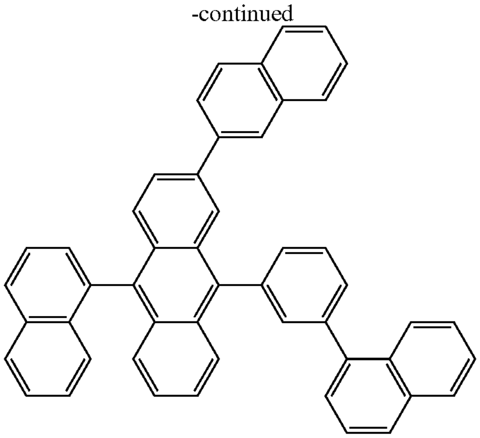
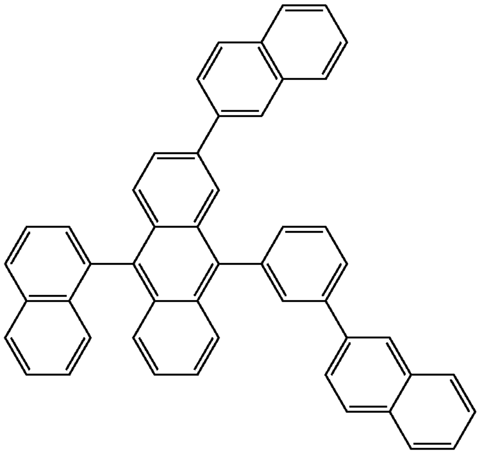
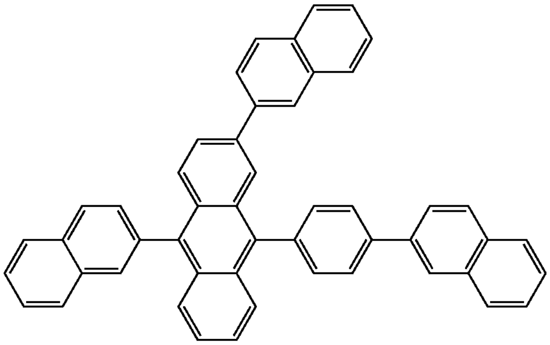
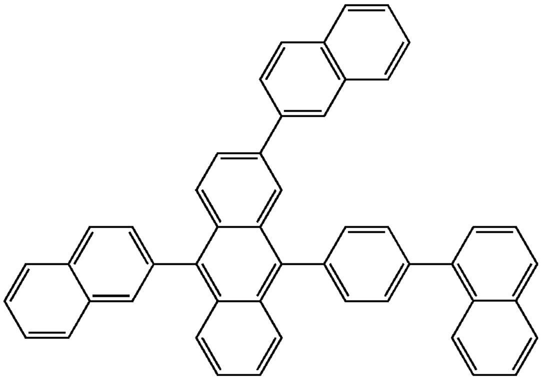

-continued
[Formula 124]
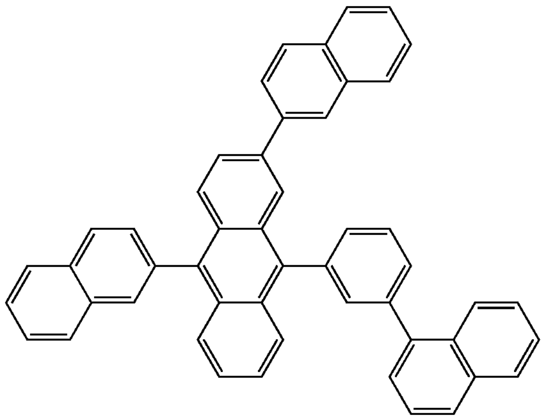
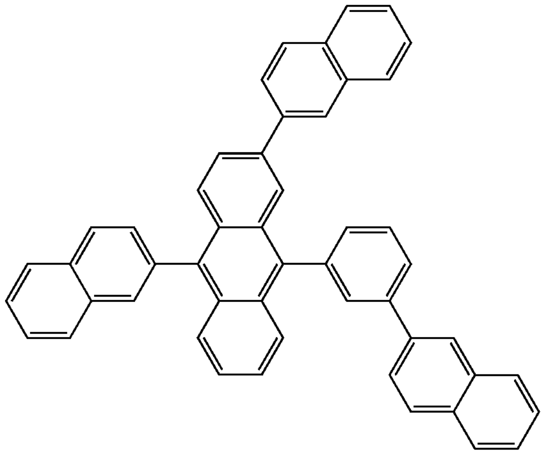
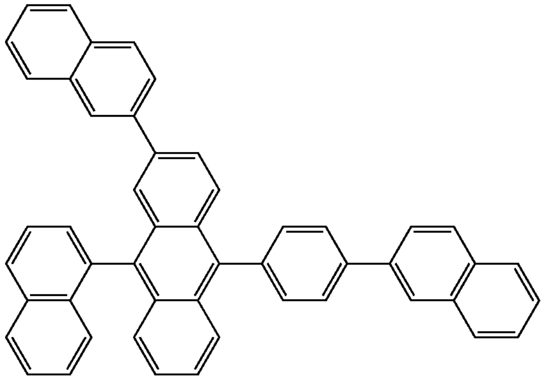
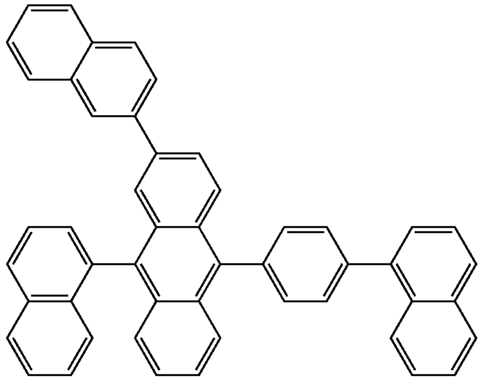
-continued
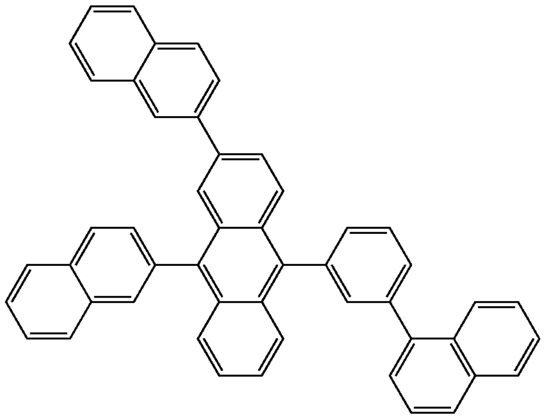
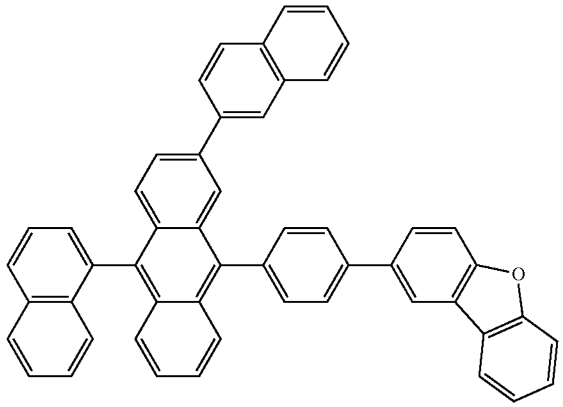
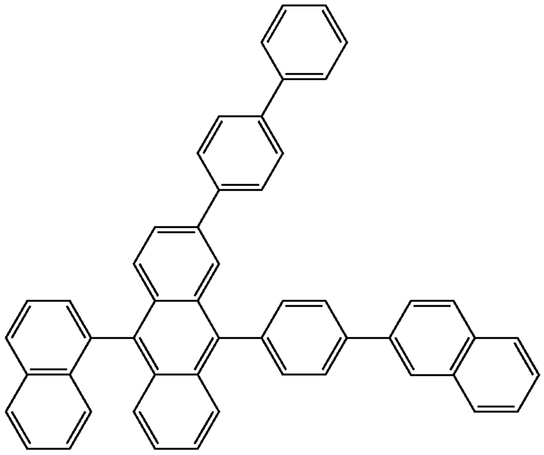

-continued
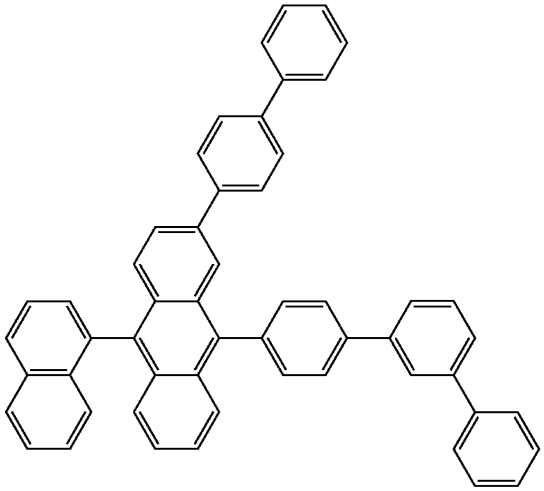
[Formula 125]
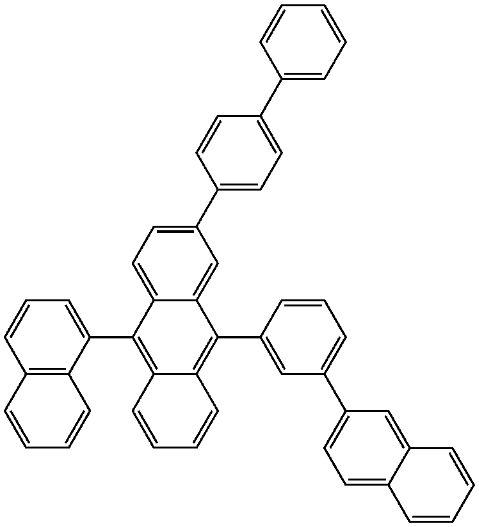
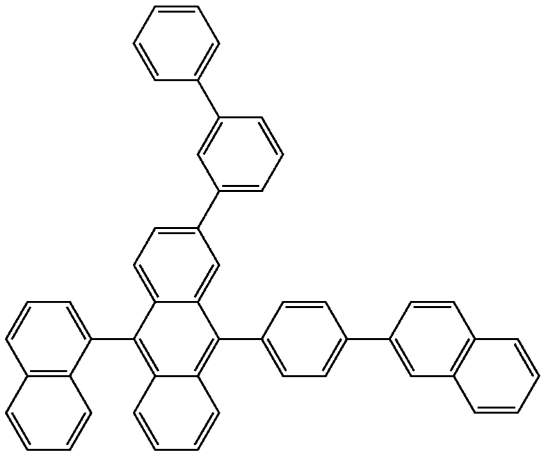
-continued
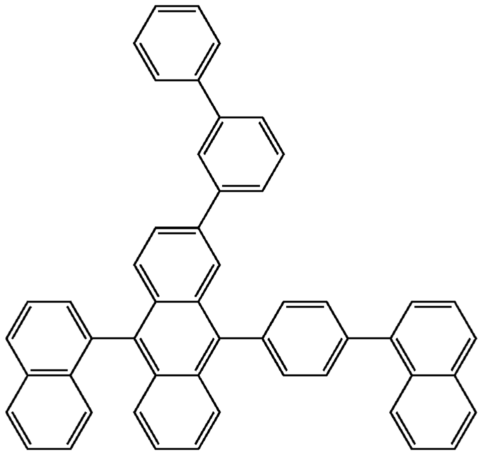
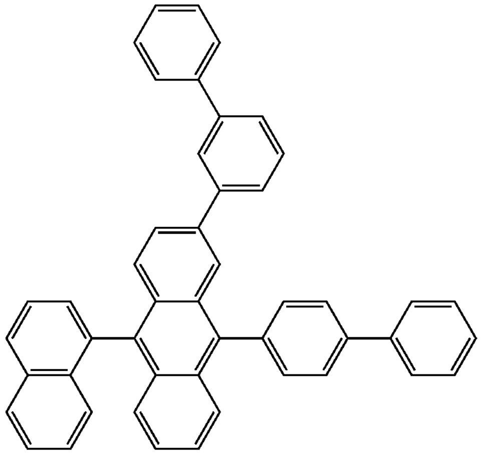 [SMILES: c1ccc(-c2ccc(-c3c4ccccc4c(-c4cccc5ccccc45)c4ccc(-c5cccc(-c6ccccc6)c5)cc34)cc2)cc1]
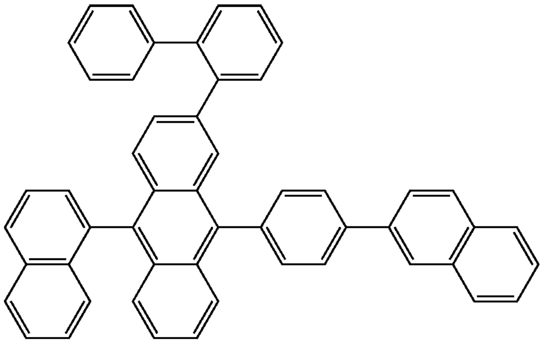
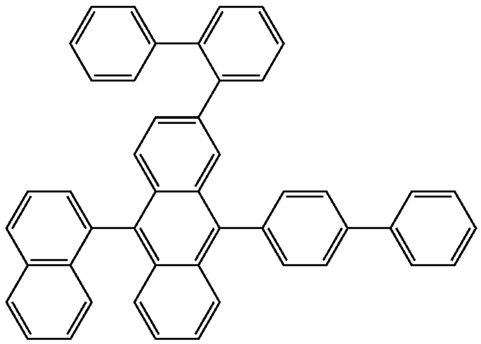

-continued
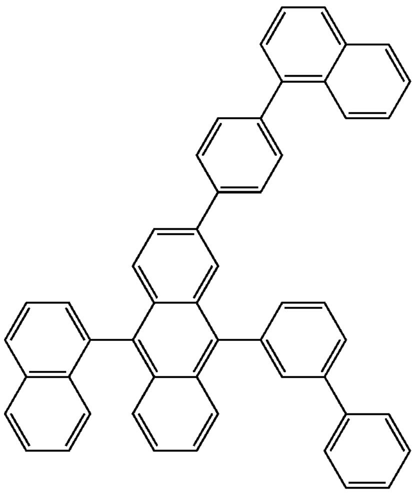
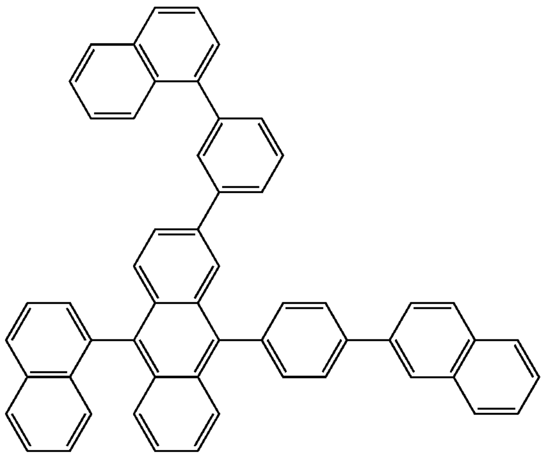
[Formula 126]
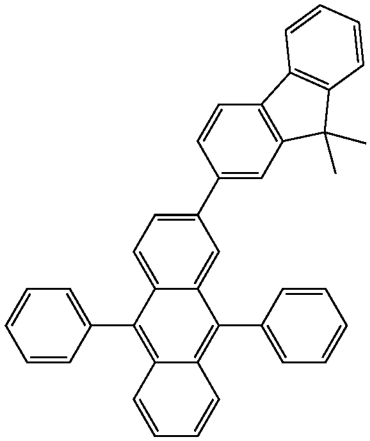
-continued
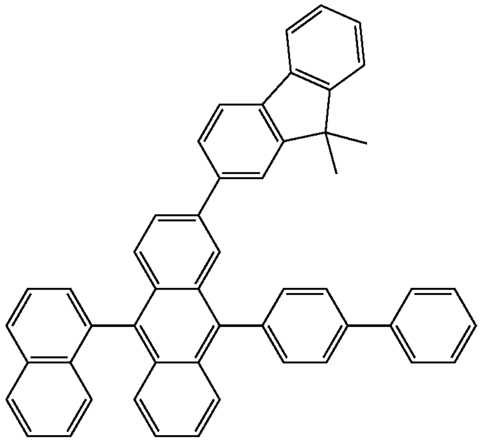
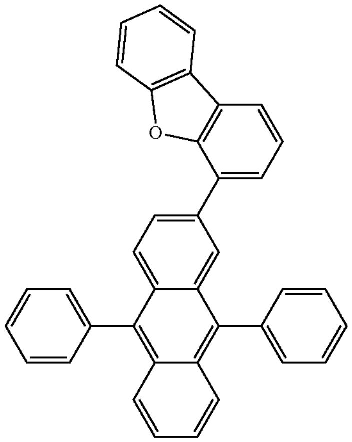
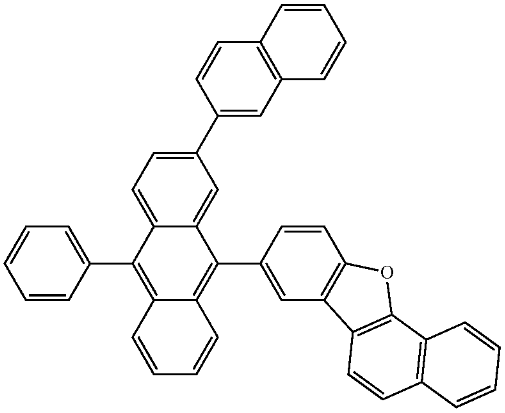
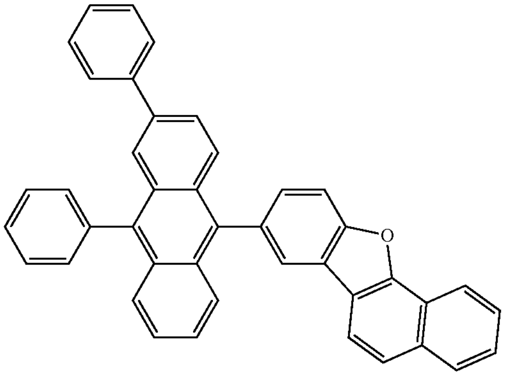

-continued
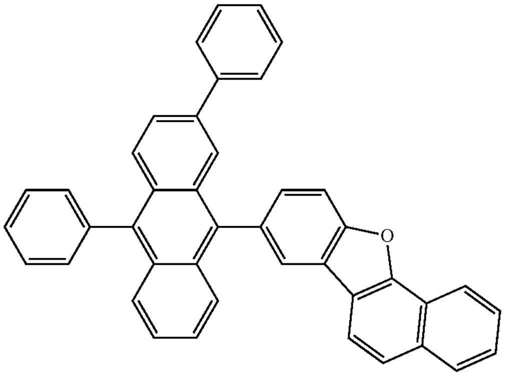
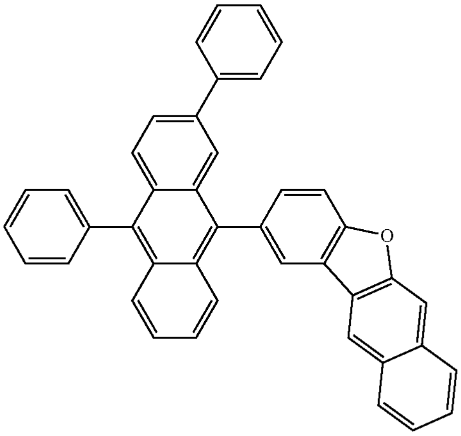
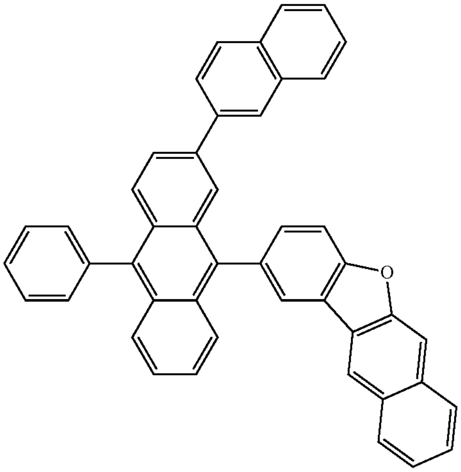
-continued
[Formula 127]
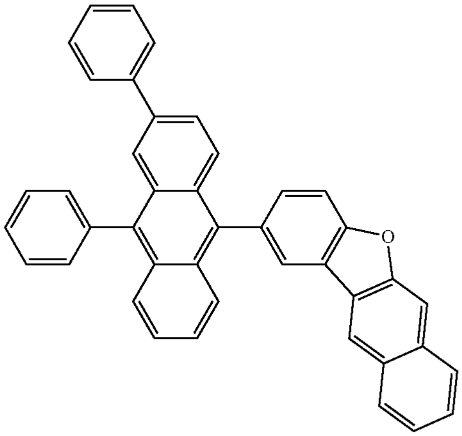
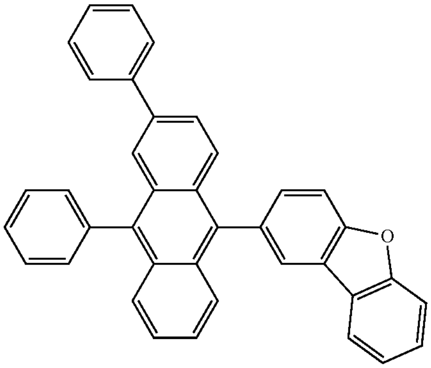
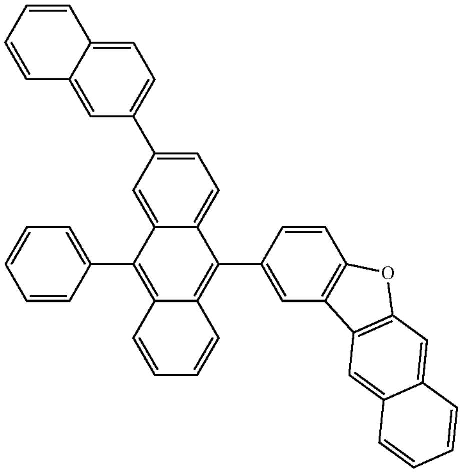
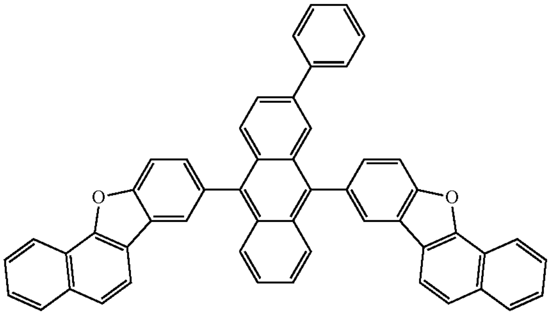

-continued
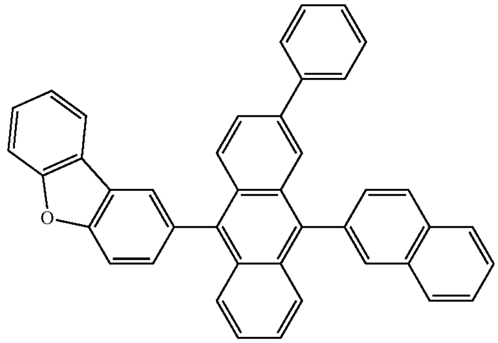
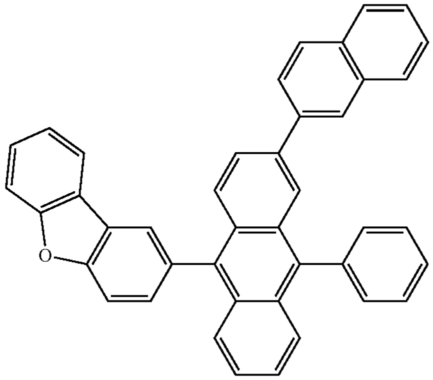
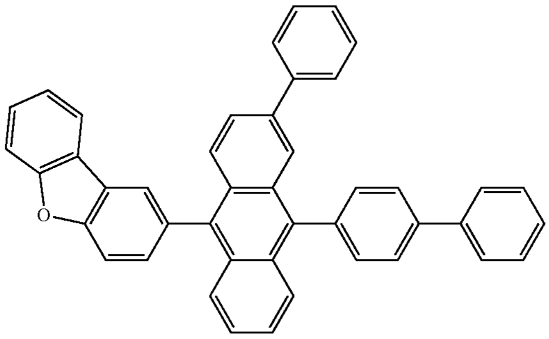
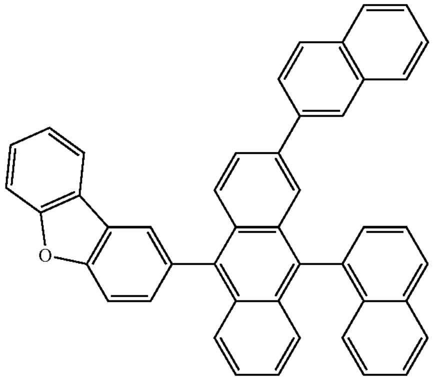
-continued
[Formula 128]
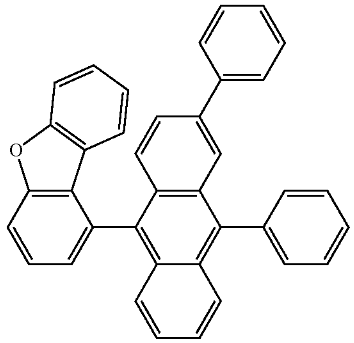
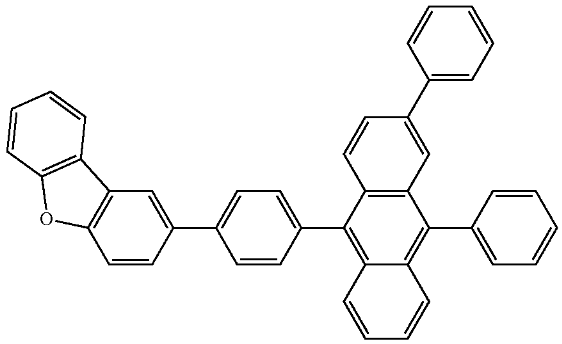
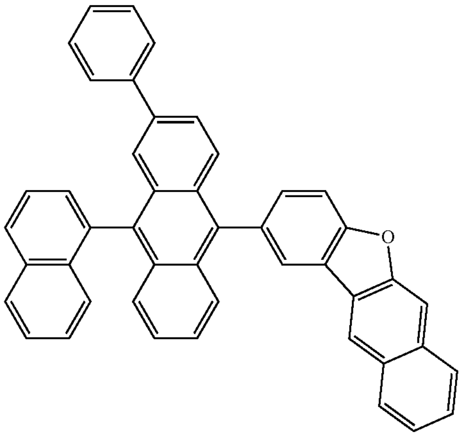
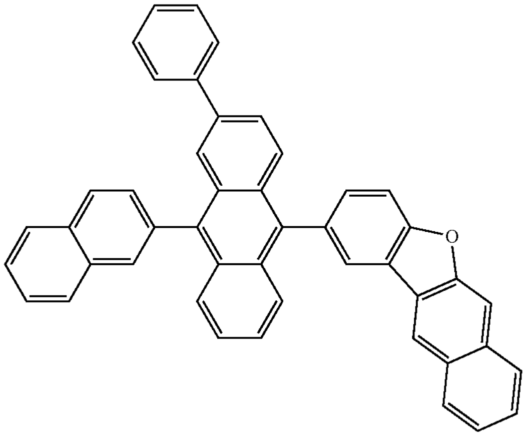

-continued
[Formula 129]
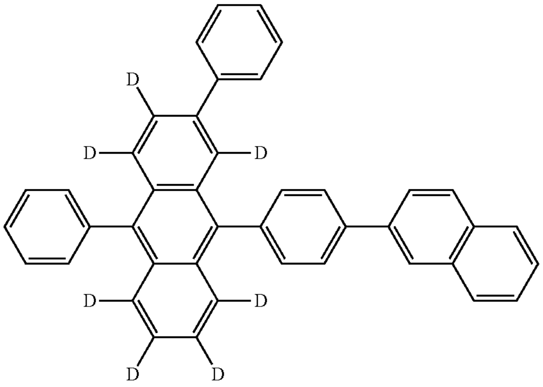
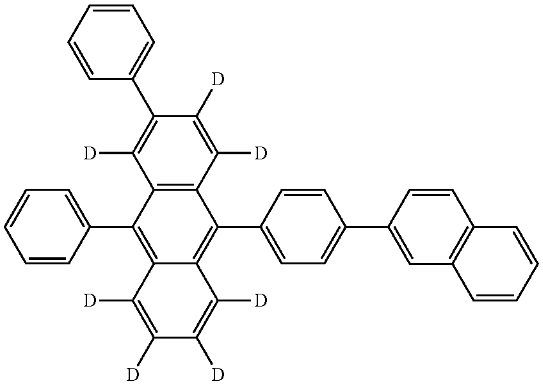
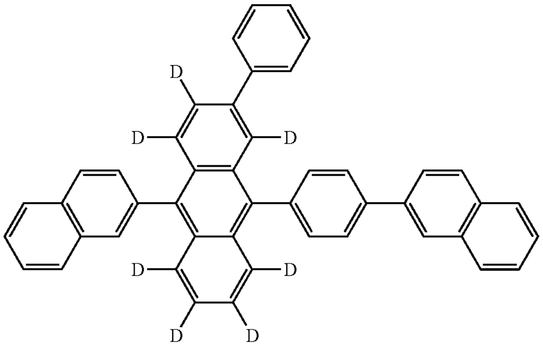
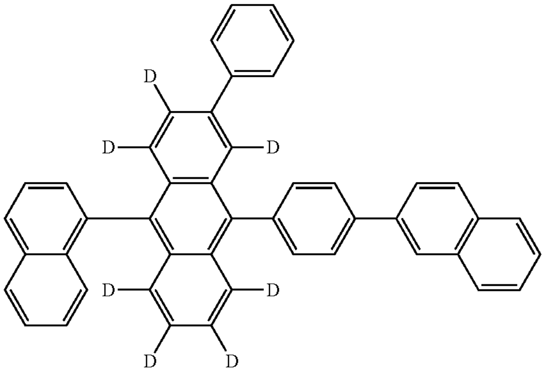
-continued
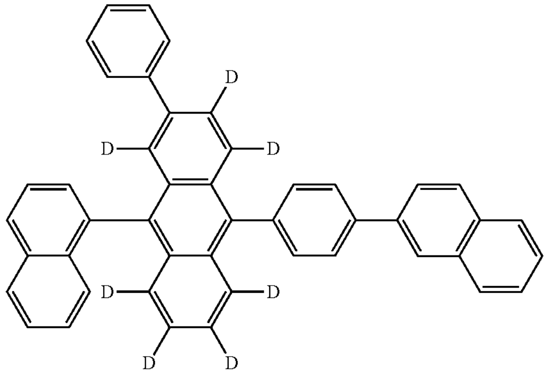
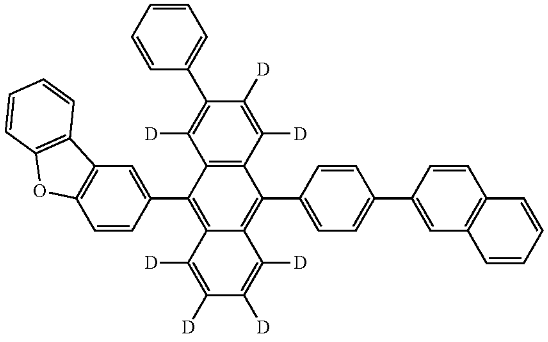
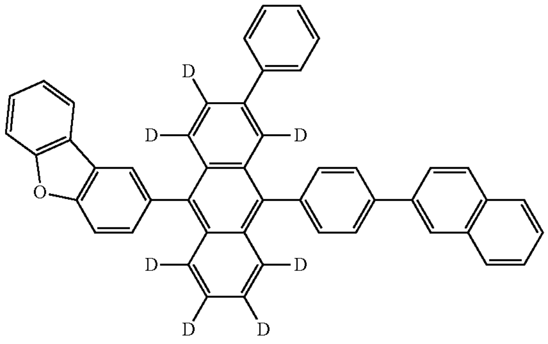
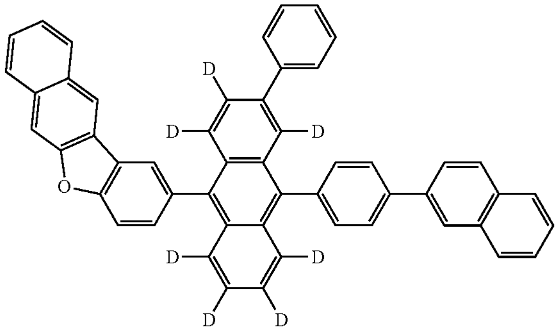

-continued
[Formula 130]
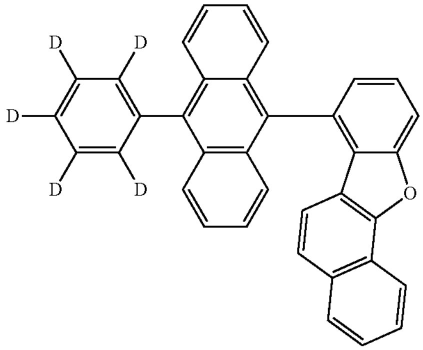
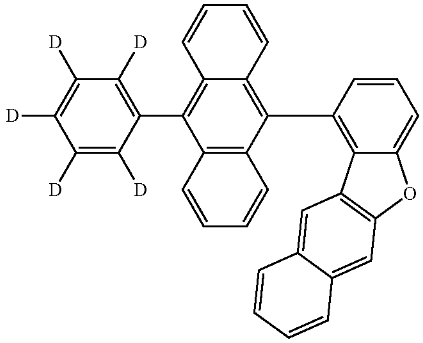
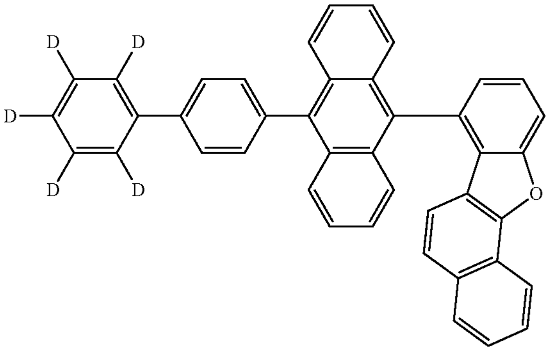
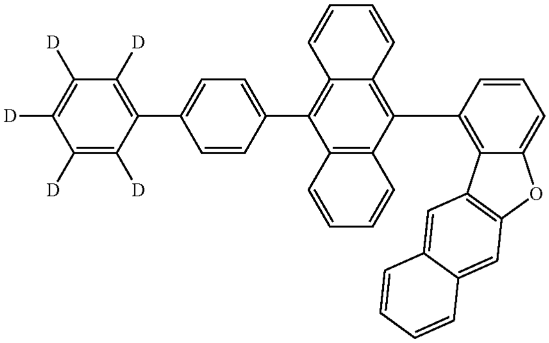
-continued
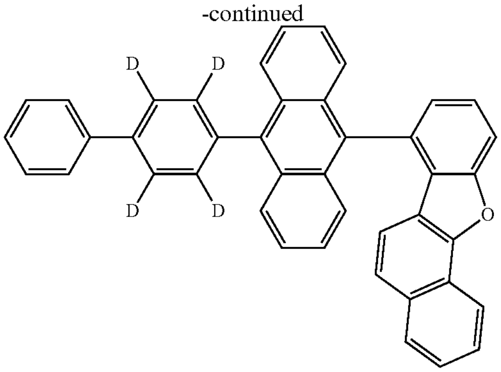
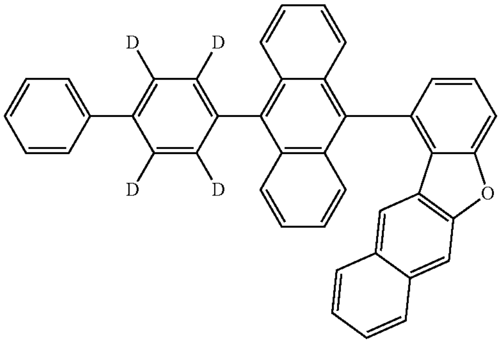
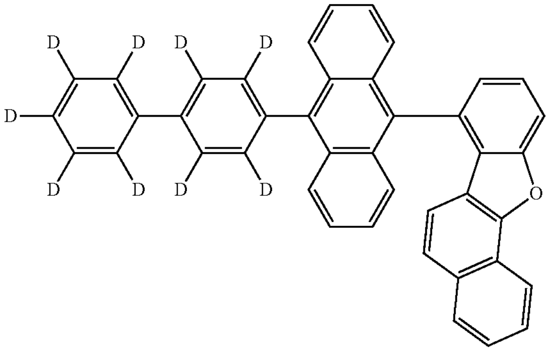
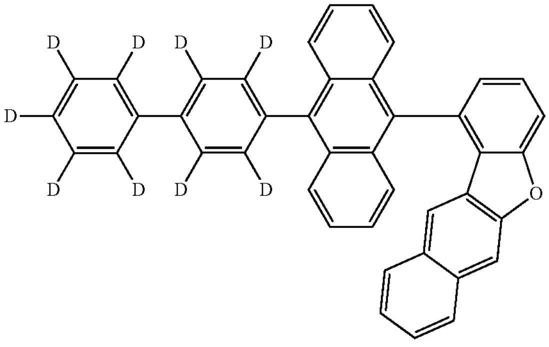
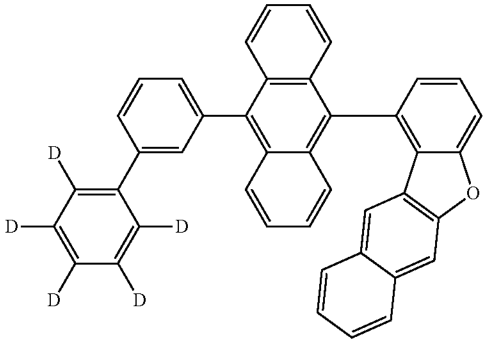

-continued
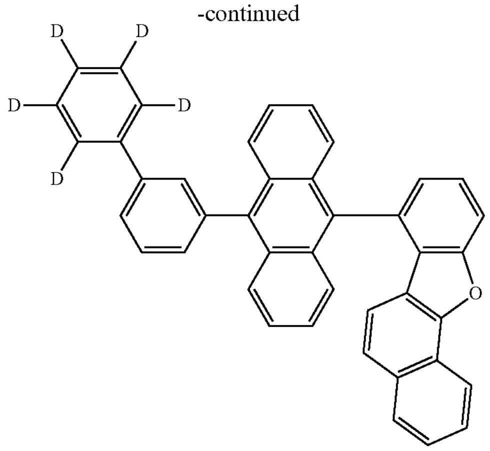
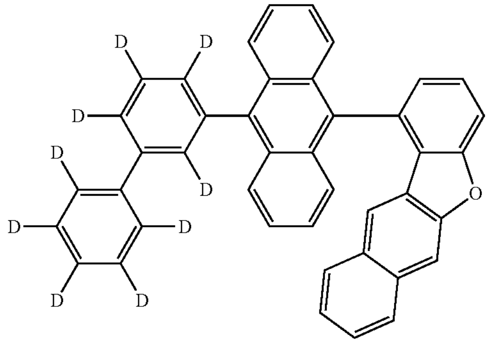
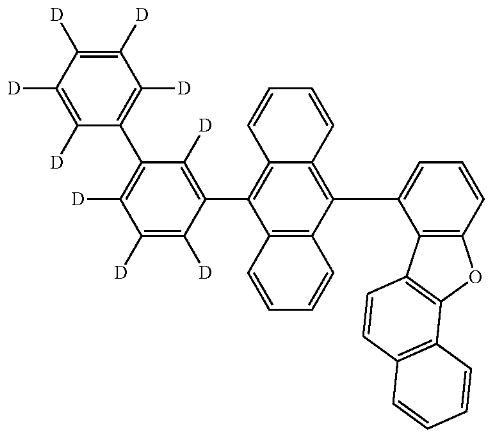
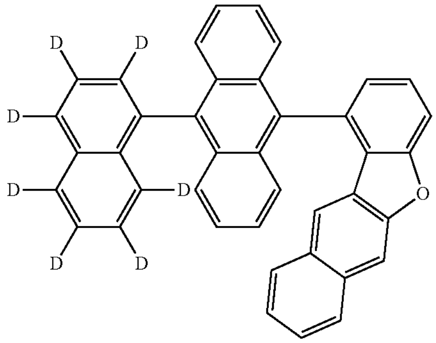
-continued
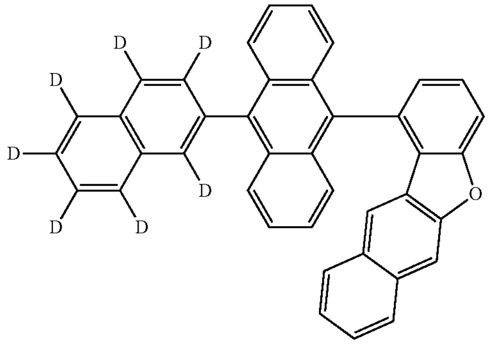
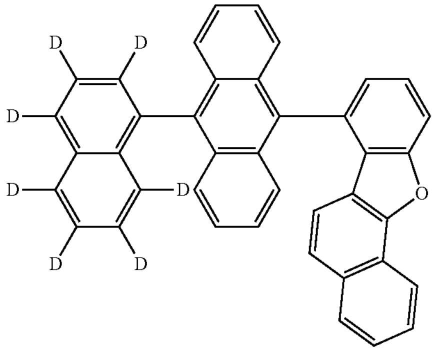
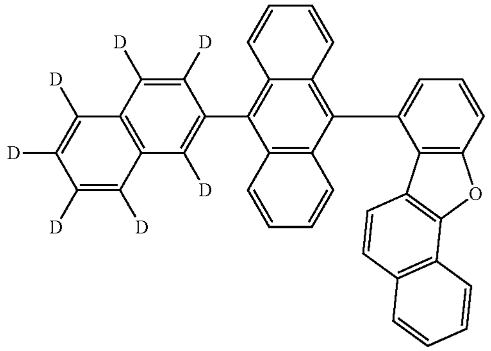
[Formula 131]
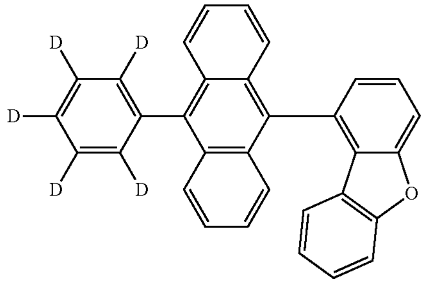

-continued
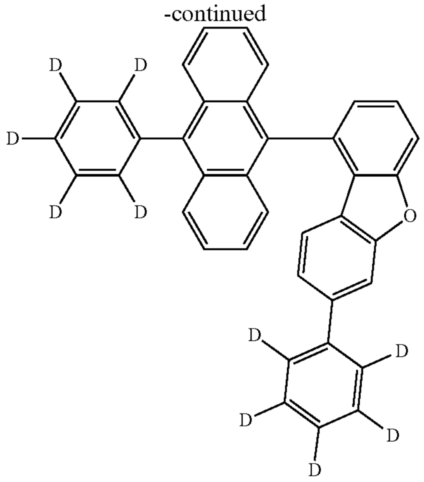
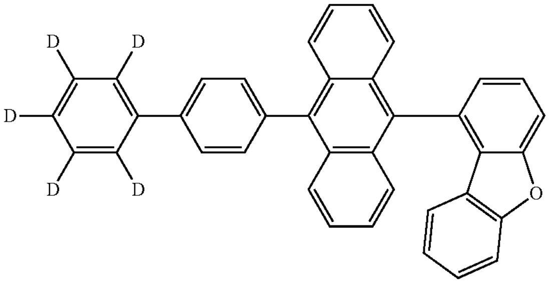
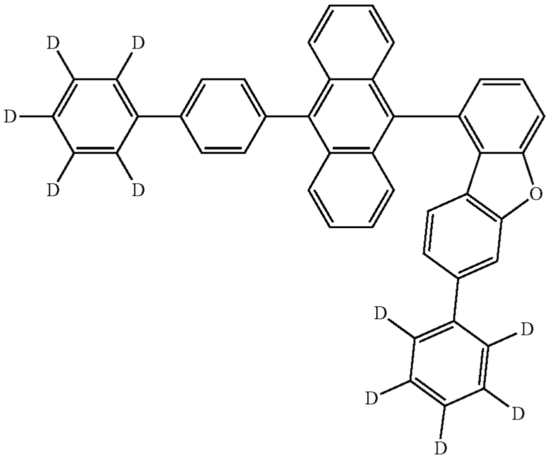
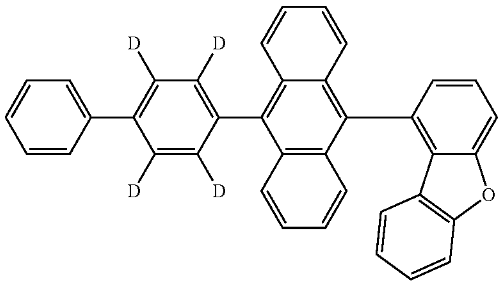
-continued
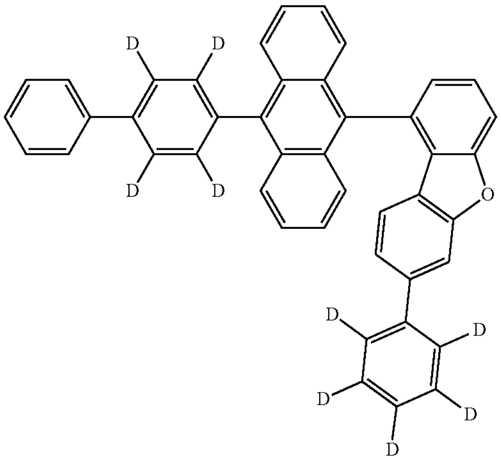
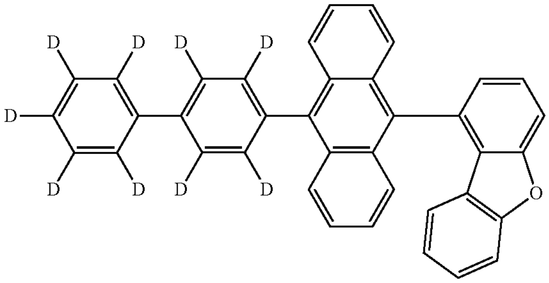
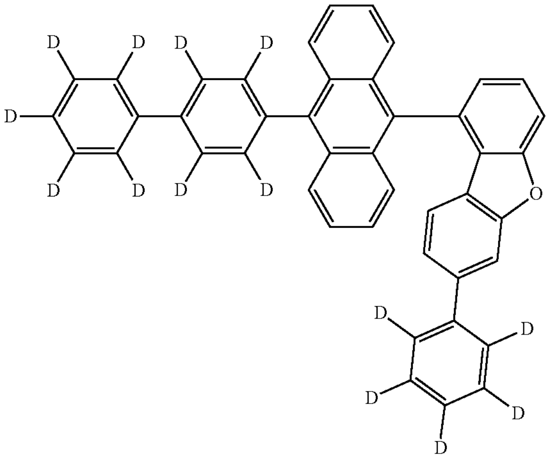
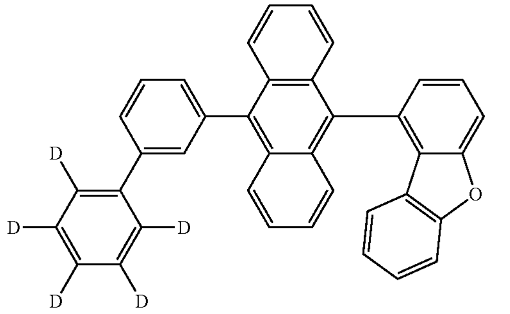

-continued
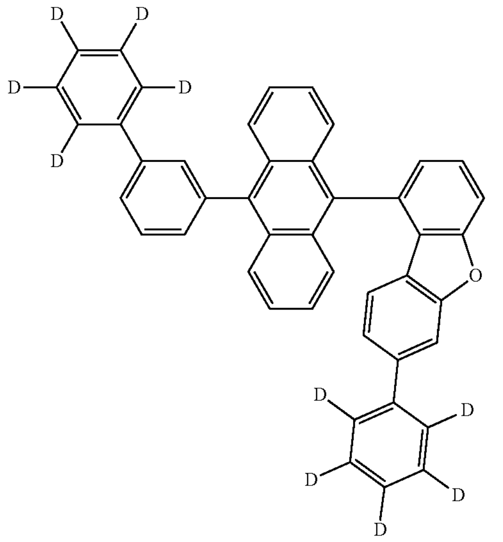
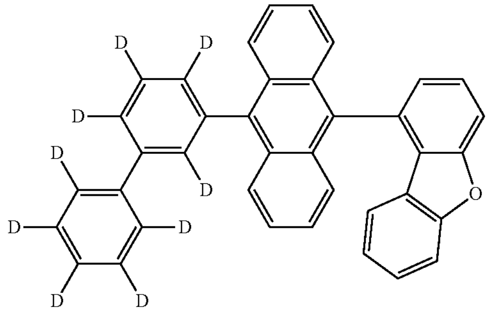
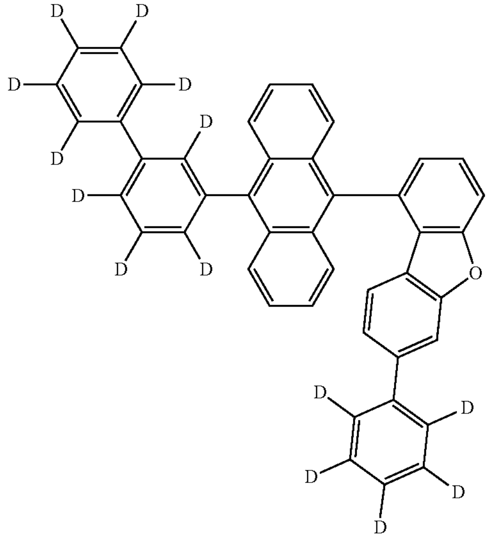
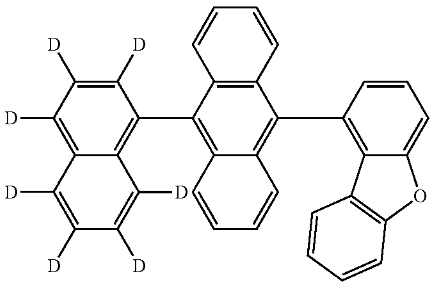
-continued
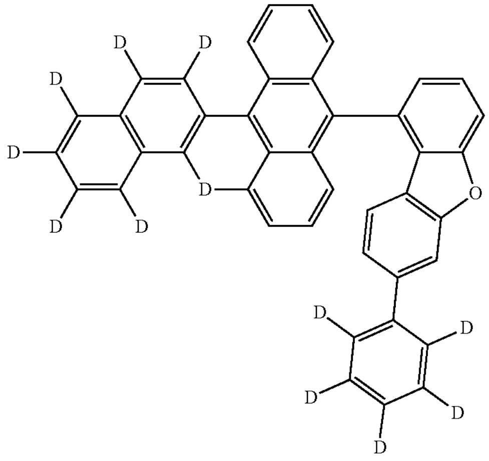
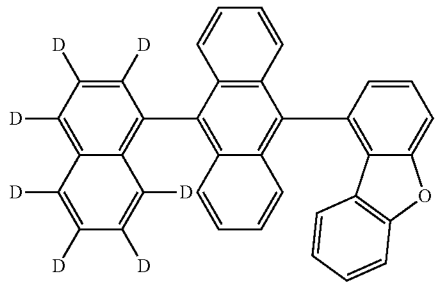
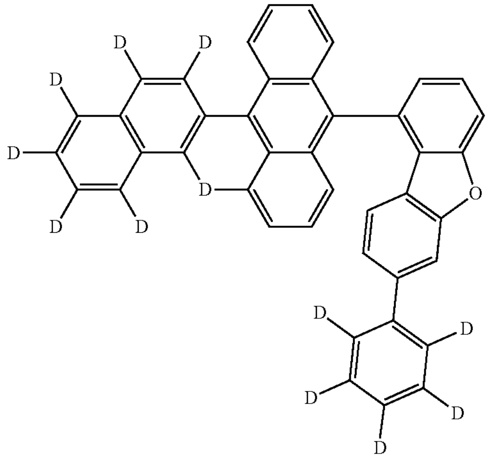
[Formula 132]
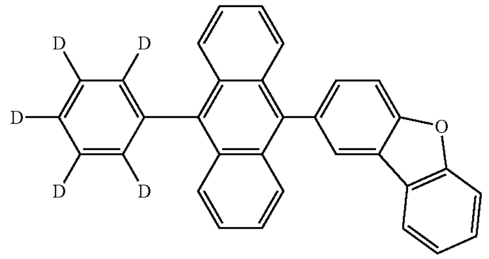

-continued
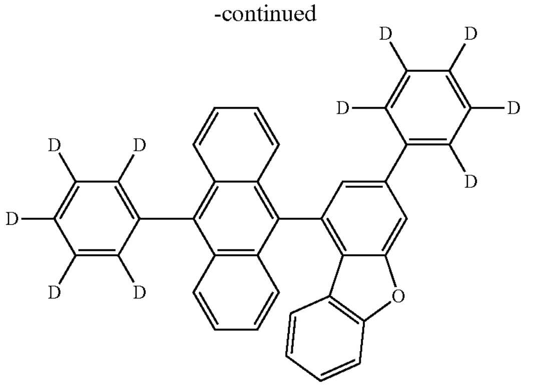
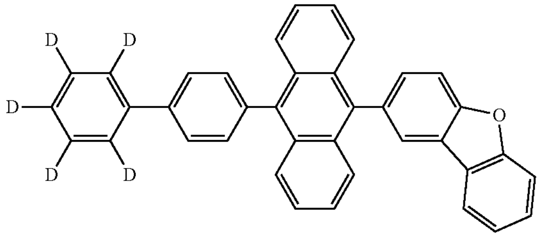
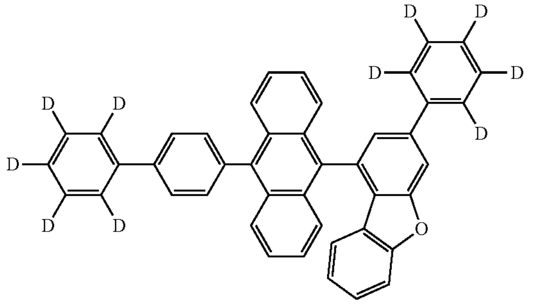
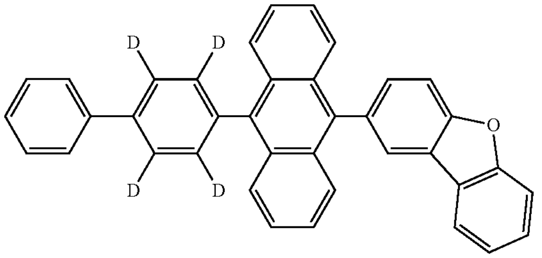
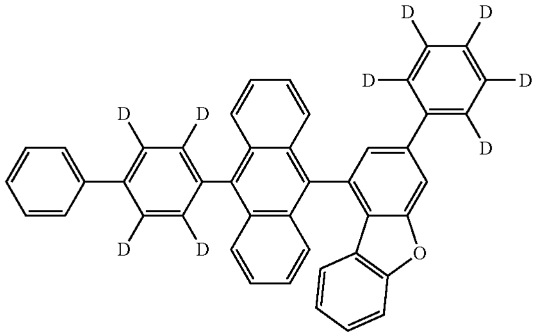
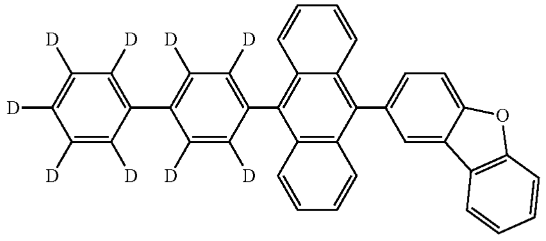
-continued
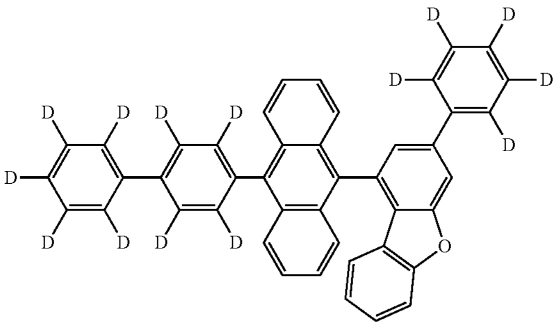
[Formula 133]
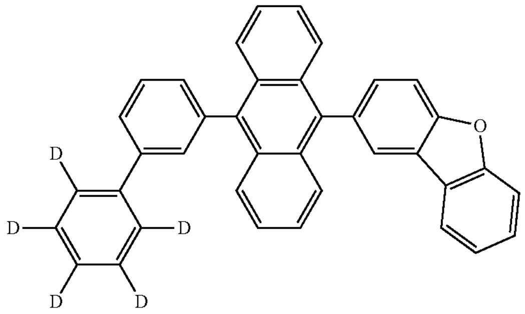
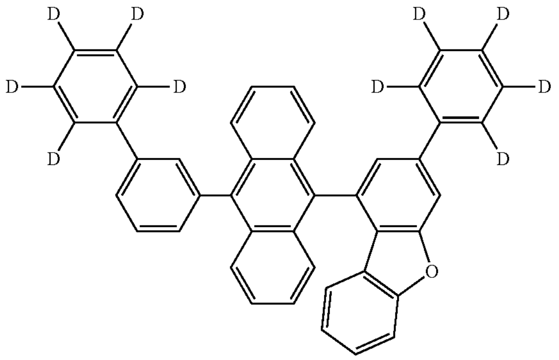
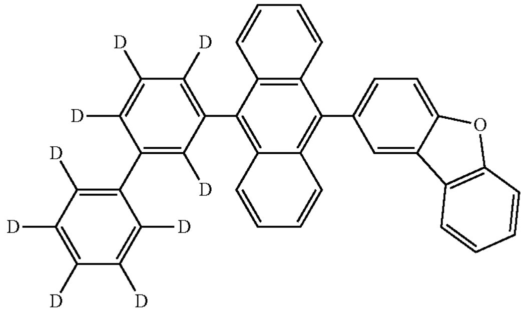
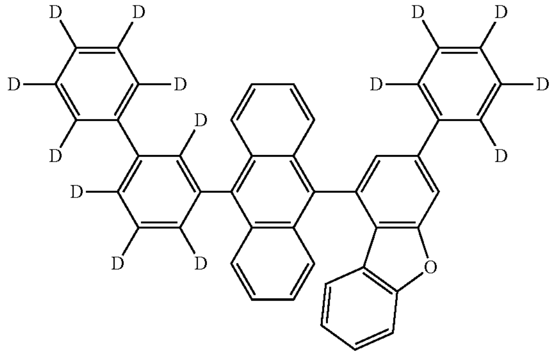

-continued
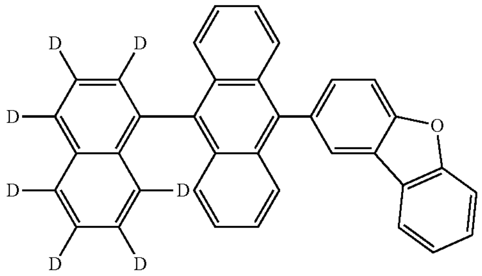
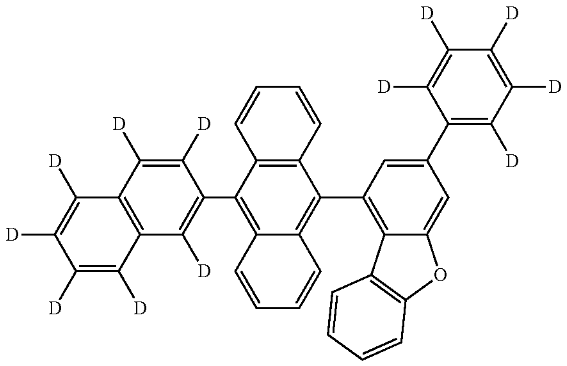
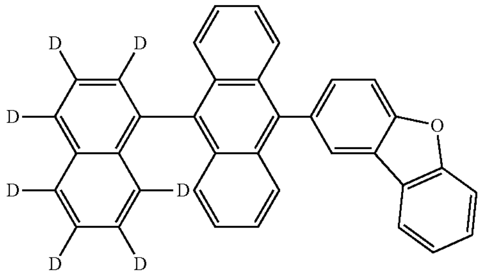
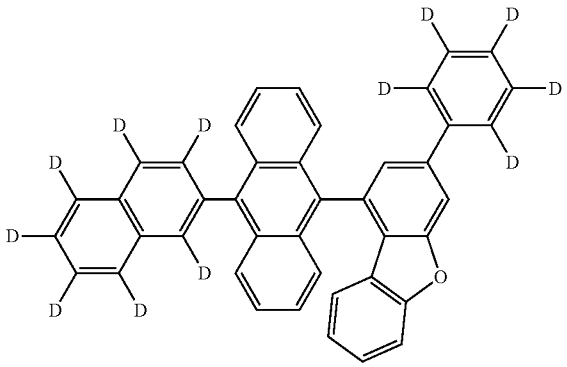
-continued
[Formula 134]
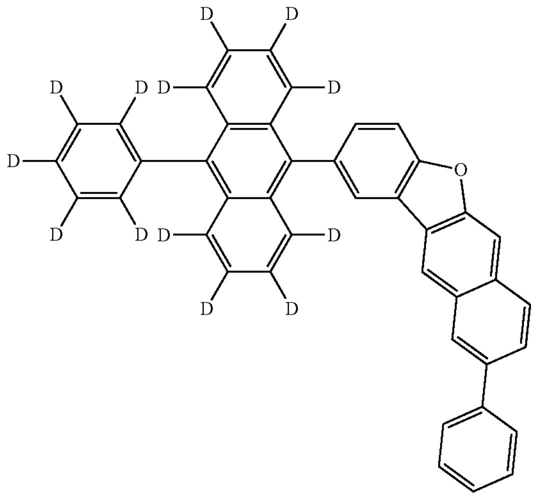
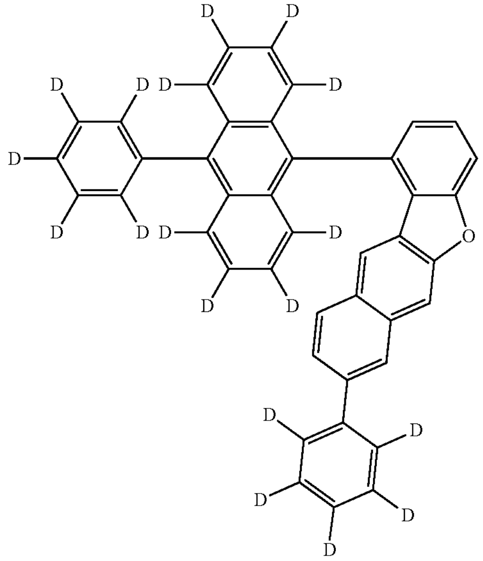
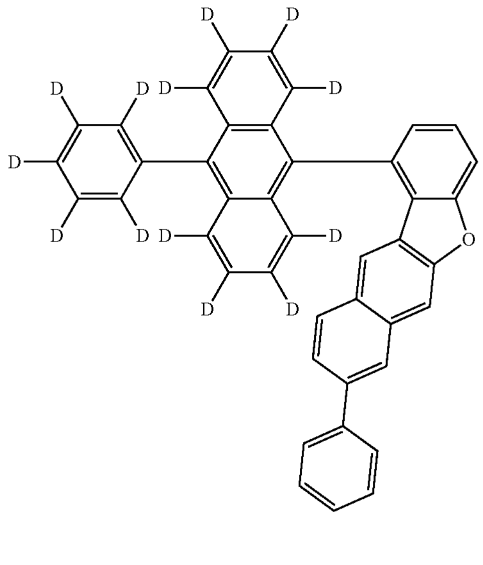

-continued
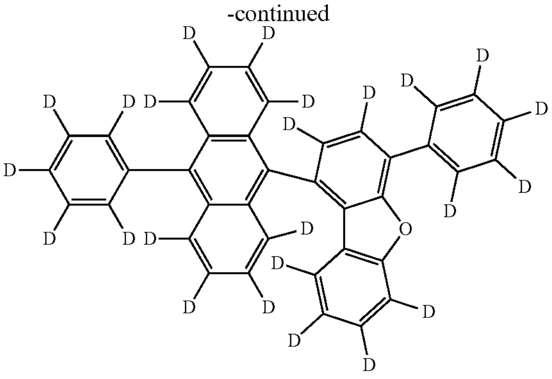
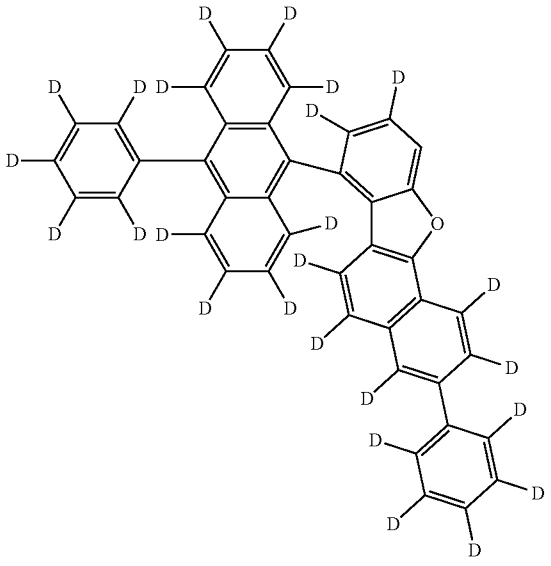
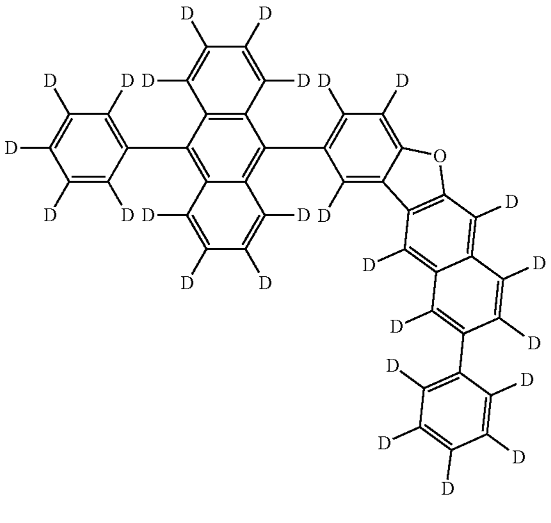
-continued
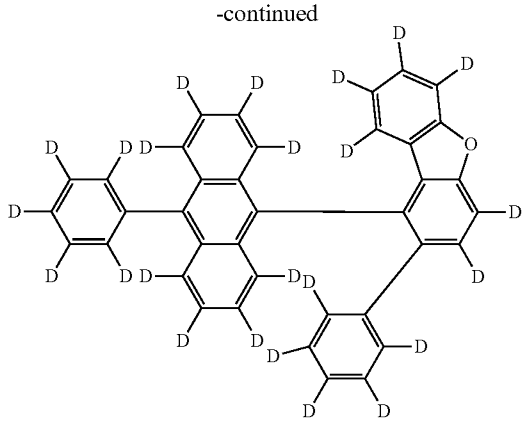
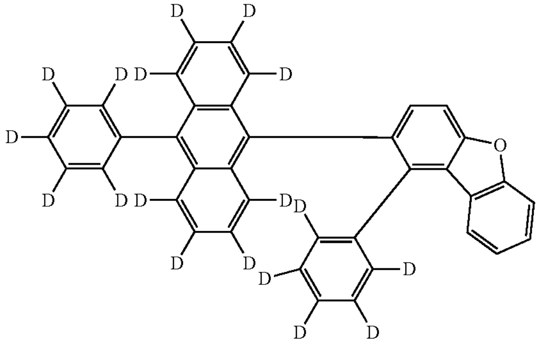
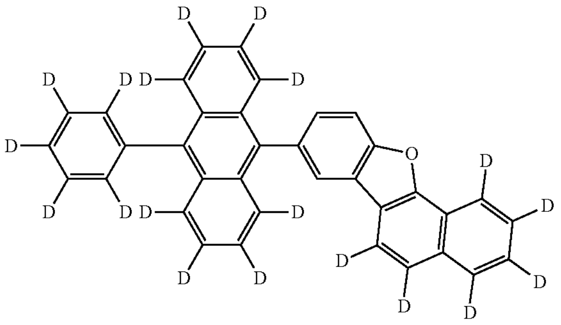
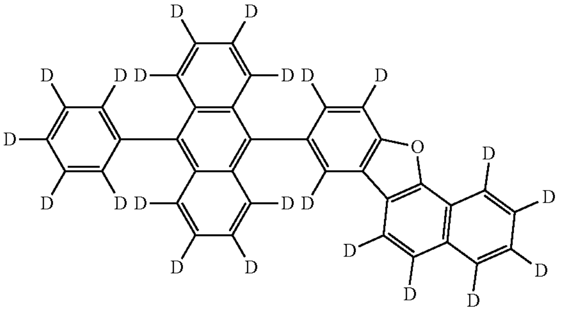
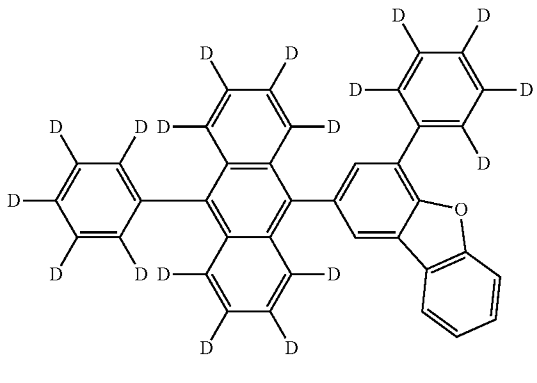

-continued
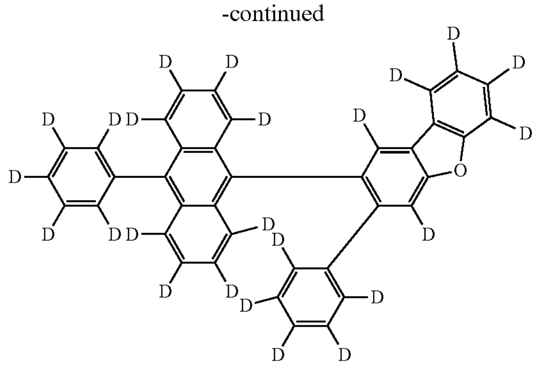
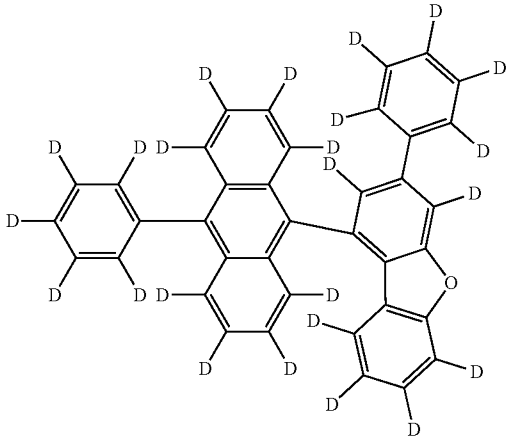
[Formula 135]
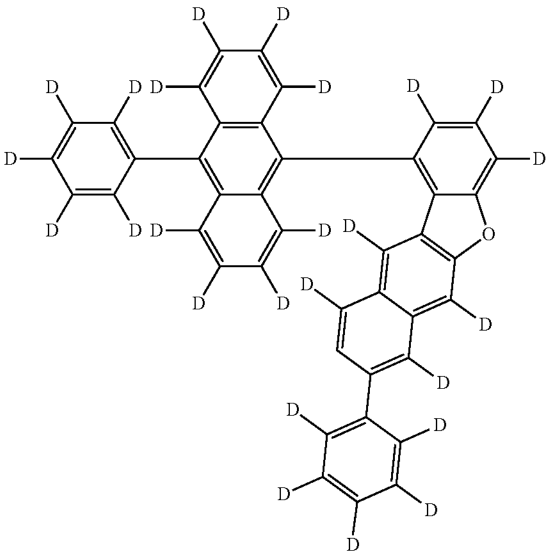
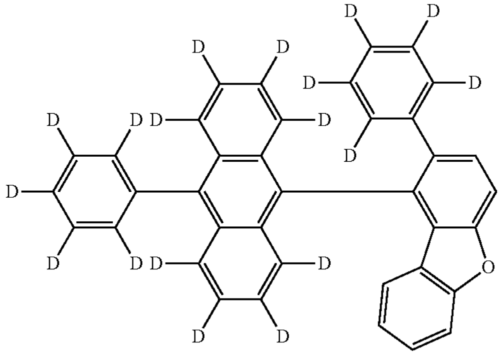
-continued
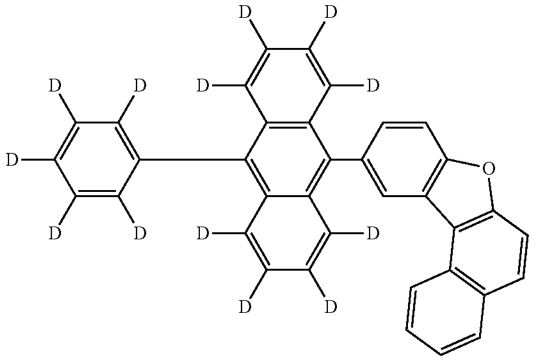
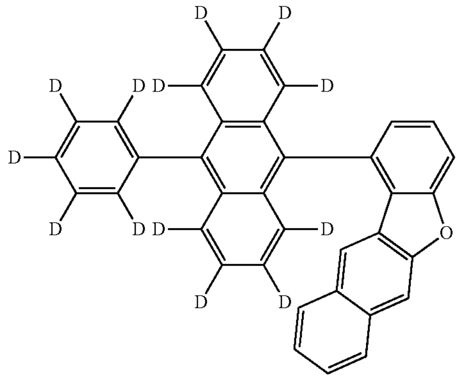
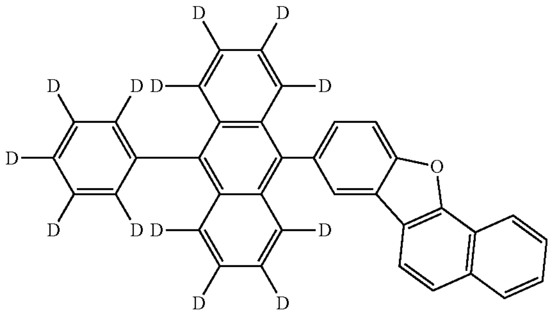
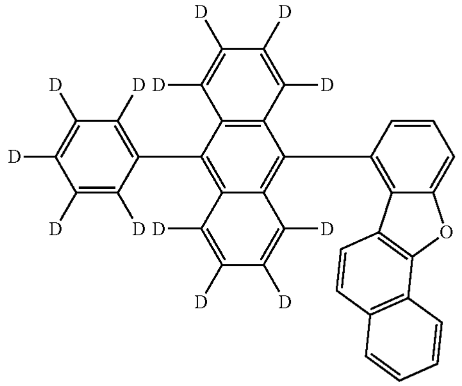
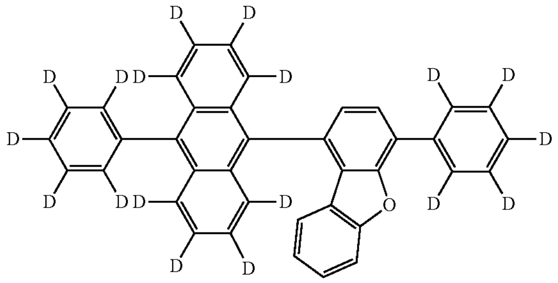

-continued

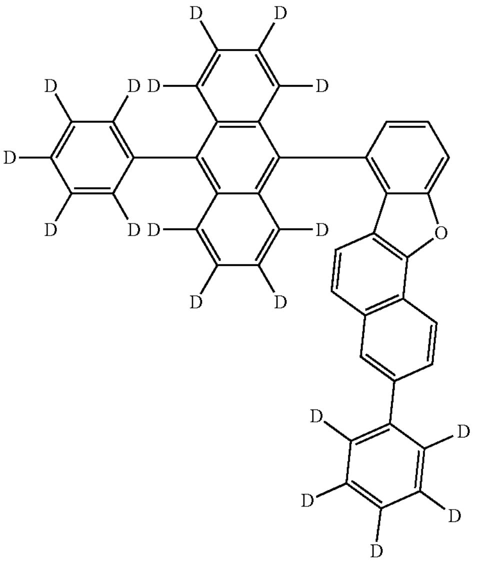

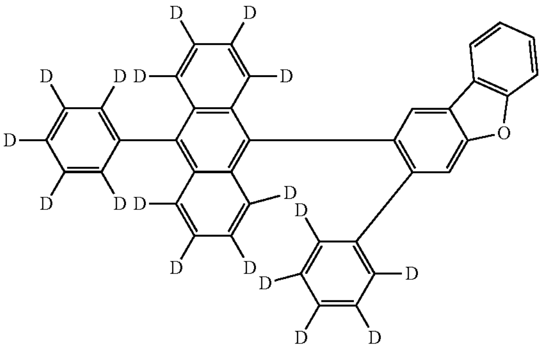

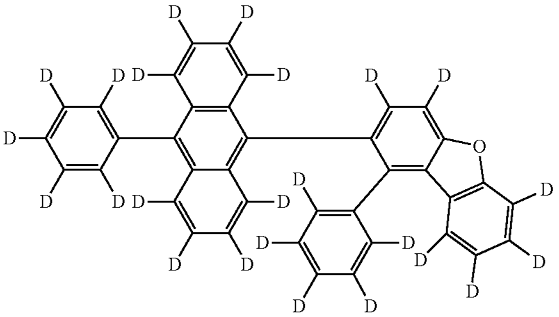

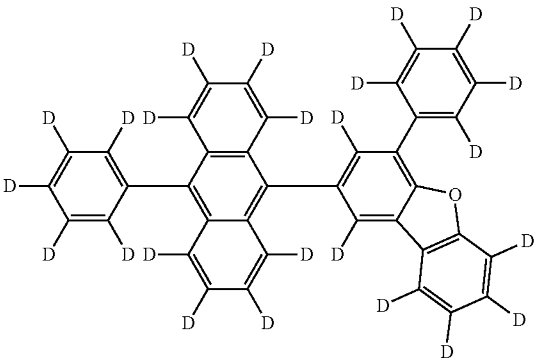

-continued

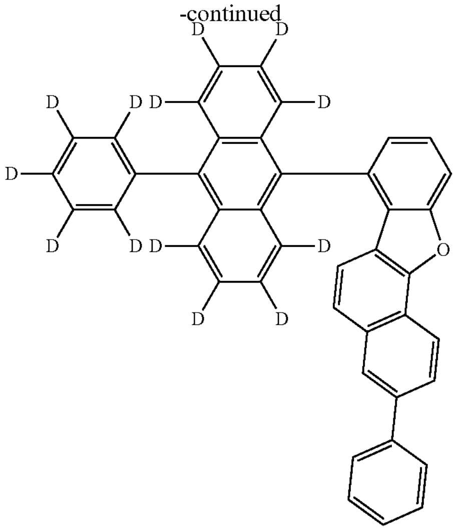

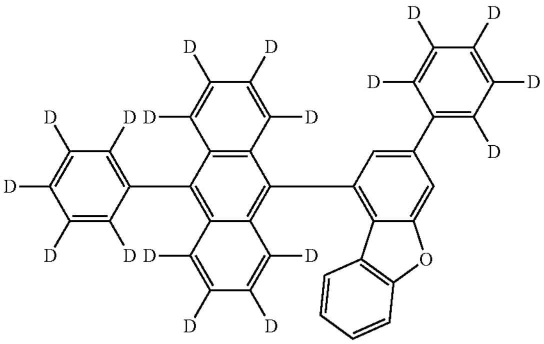

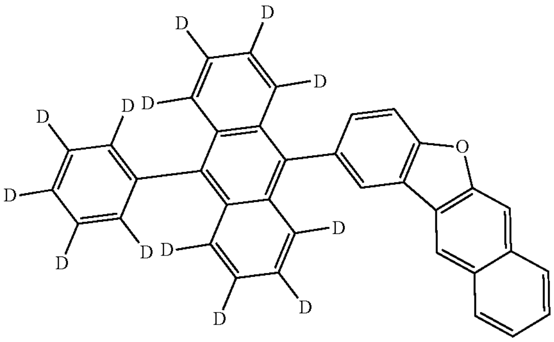

Luminescent Compound

In the organic EL device according to the exemplary embodiment, the luminescent compounds such as the first luminescent compound, the second luminescent compound, and the third luminescent compound, which are not particularly limited, are also preferably each independently at least one compound selected from the group consisting of a compound represented by a formula (4) below, a compound represented by a formula (5) below, and a compound represented by a formula (6) below.

Compound Represented by Formula (4)

The compound represented by the formula (4) will be described below.

[Formula 136]

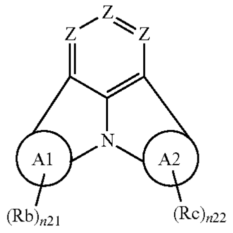

(4)

In the formula (4):

Z are each independently CRa or a nitrogen atom;

A1 ring and A2 ring are each independently a substituted or unsubstituted aromatic hydrocarbon ring having 6 to 50 ring carbon atoms, or a substituted or unsubstituted heterocyclic ring having 5 to 50 ring atoms;

when a plurality of Ra are present, at least one combination of adjacent two or more of the plurality of Ra are mutually bonded to form a substituted or unsubstituted monocyclic ring, mutually bonded to form a substituted or unsubstituted fused ring, or not mutually bonded;

n21 and n22 are each independently 0, 1, 2, 3 or 4;

when a plurality of Rb are present, at least one combination of adjacent two or more of the plurality of Rb are mutually bonded to form a substituted or unsubstituted monocyclic ring, mutually bonded to form a substituted or unsubstituted fused ring, or not mutually bonded;

when a plurality of Rc are present, at least one combination of adjacent two or more of the plurality of Rc are mutually bonded to form a substituted or unsubstituted monocyclic ring, mutually bonded to form a substituted or unsubstituted fused ring, or not mutually bonded; and Ra, Rb, and Rc forming neither the substituted or unsubstituted monocyclic ring nor the substituted or unsubstituted fused ring are each independently a substituted or unsubstituted alkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a group represented by —N($R_{906}$)($R_{907}$), a halogen atom, a cyano group, a nitro group, a substituted or unsubstituted aryl group having 6 to 50 ring carbon atoms, or a substituted or unsubstituted heterocyclic group having 5 to 50 ring atoms.

Specific Examples of Compound Represented by Formula (4)

Specific examples of the compound represented by the formula (4) include compounds shown below. In the specific examples below, Ph represents a phenyl group, and D represents a deuterium atom.

[Formula 137]

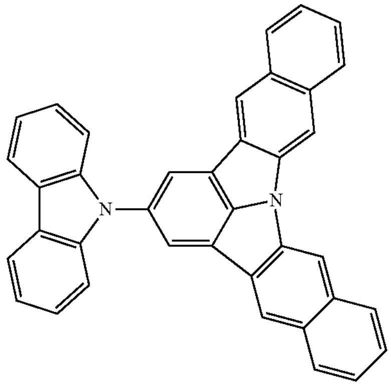

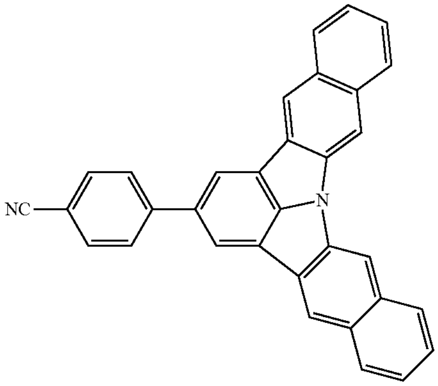

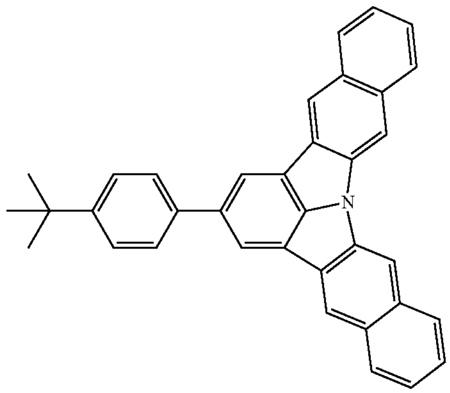

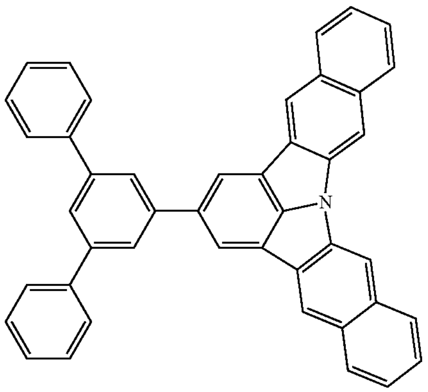

-continued
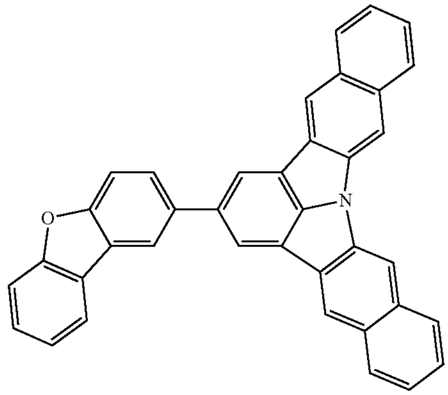
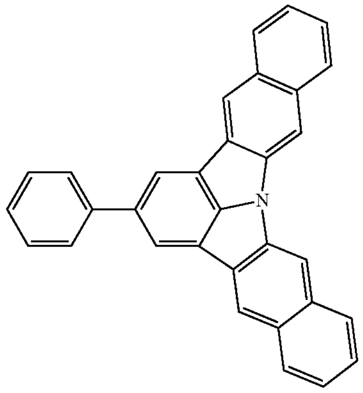
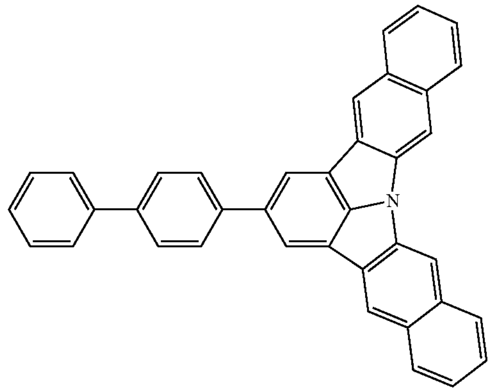
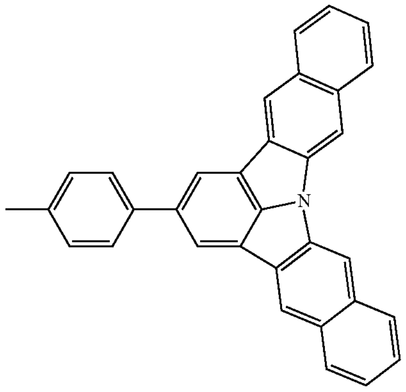
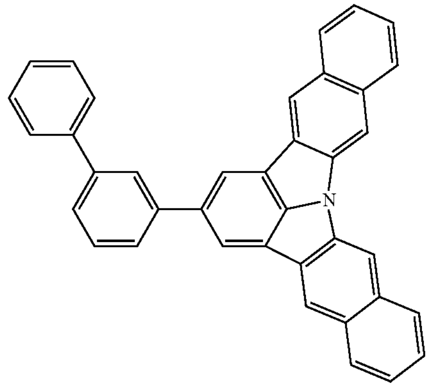
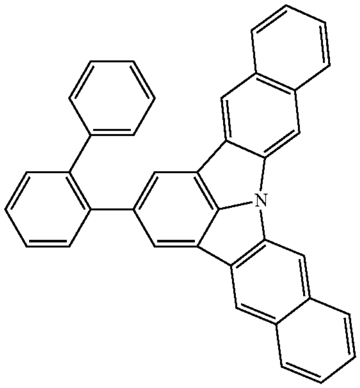
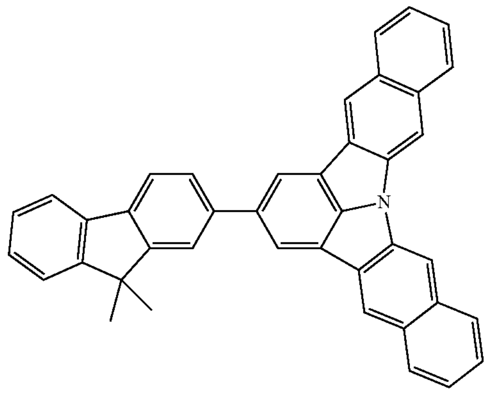
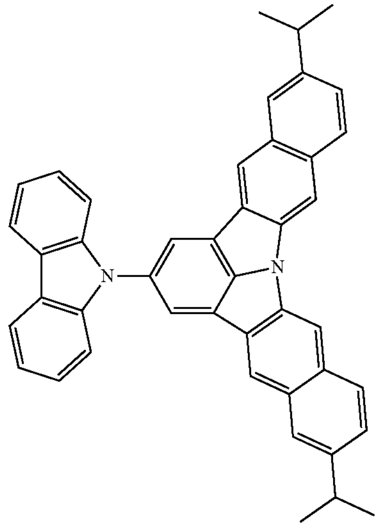

-continued
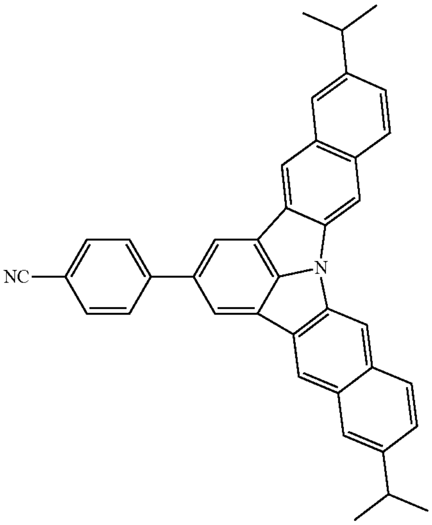
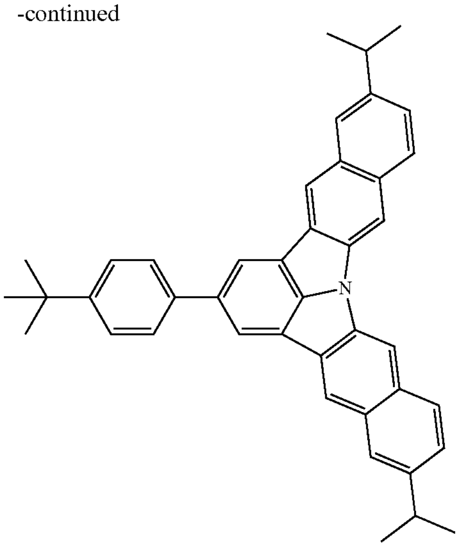
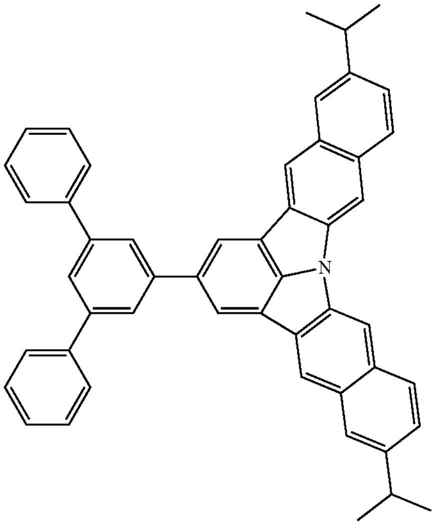
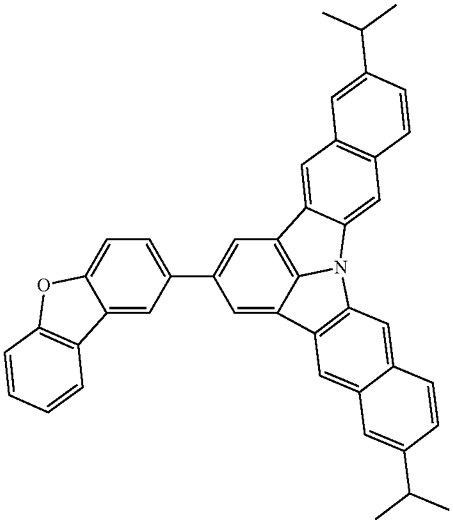
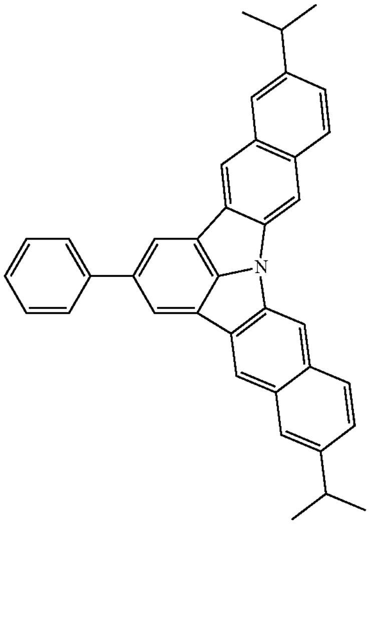
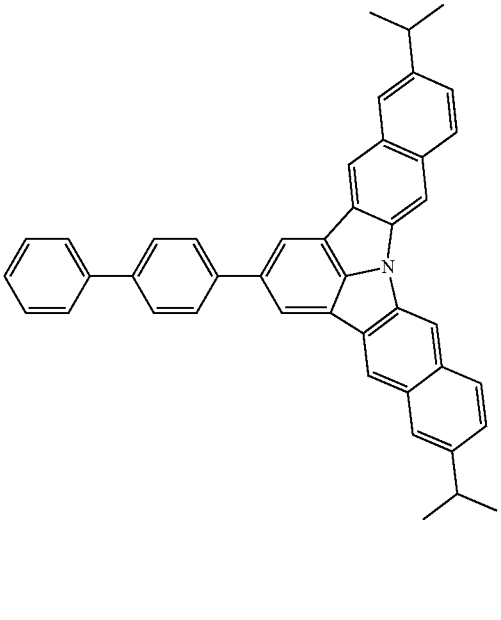

-continued
[Formula 138]
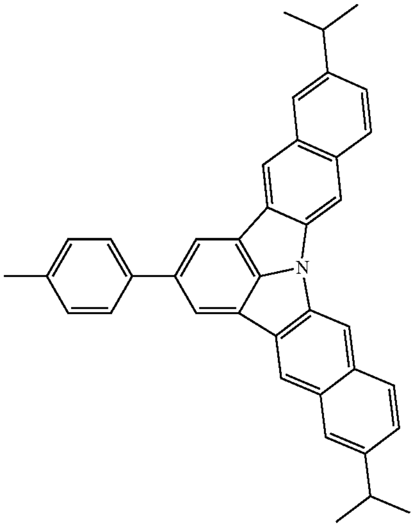
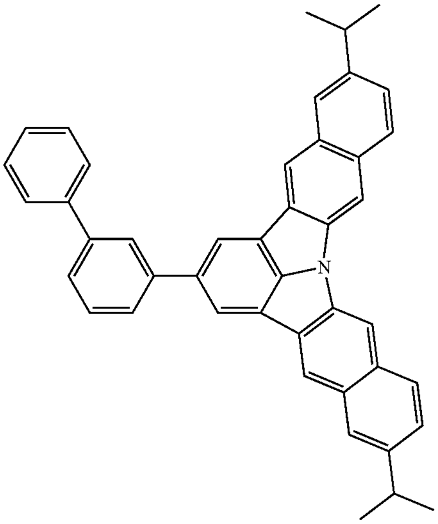
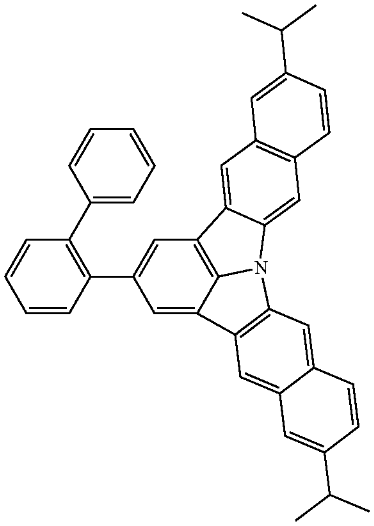
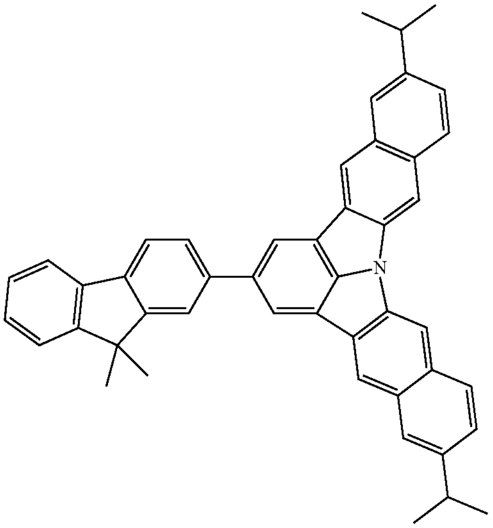
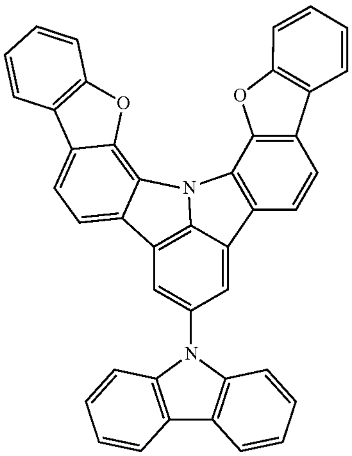
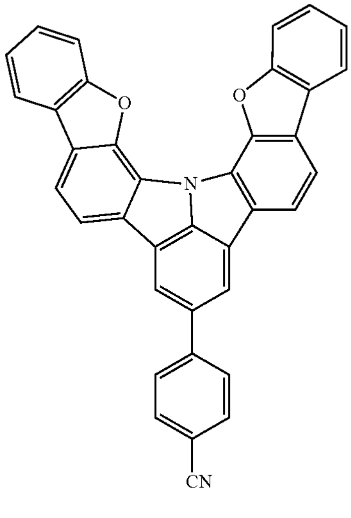
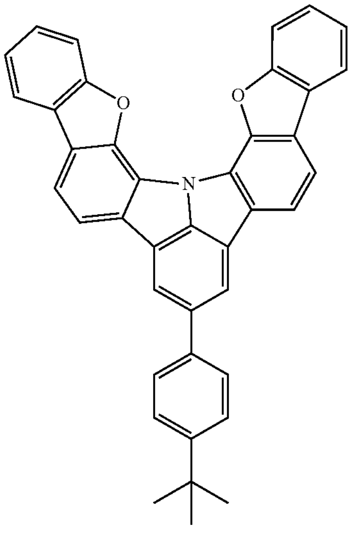

-continued
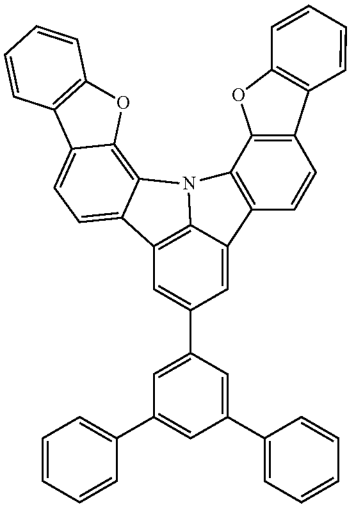
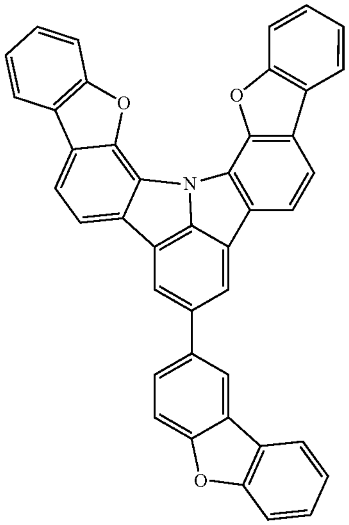
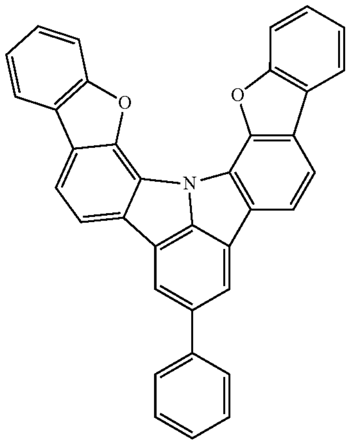
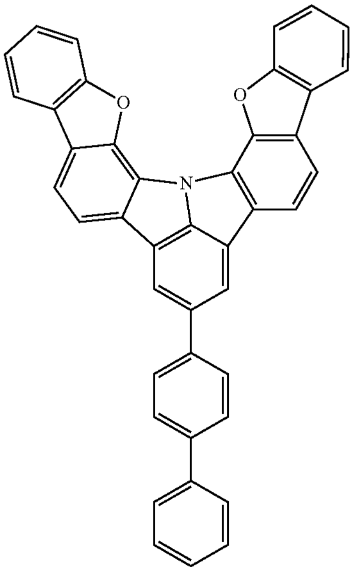
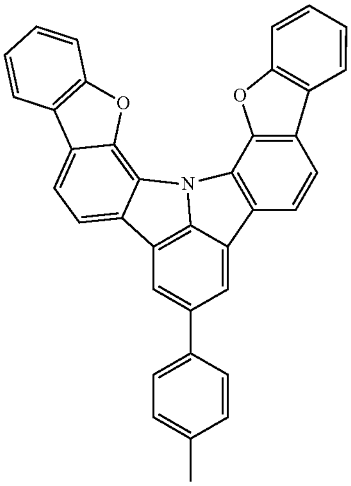
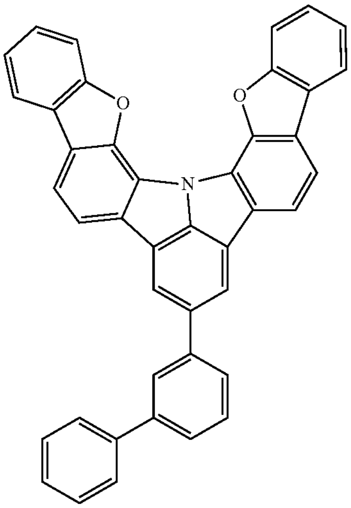
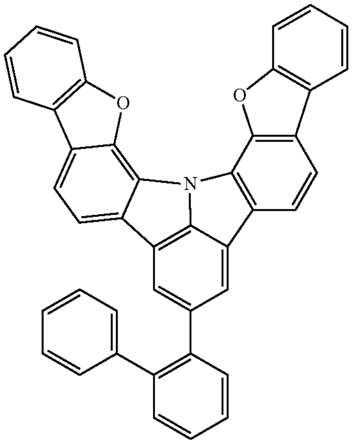
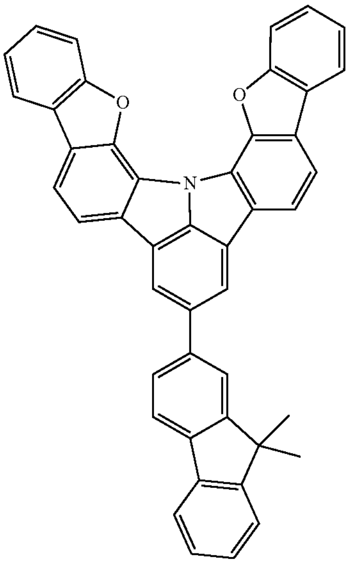

-continued
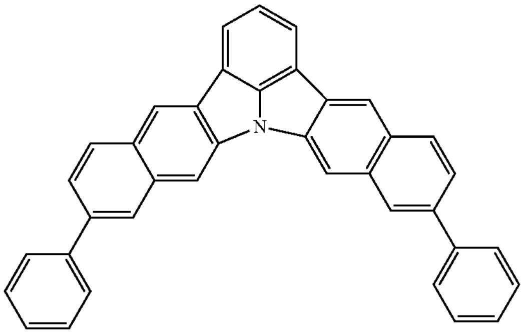
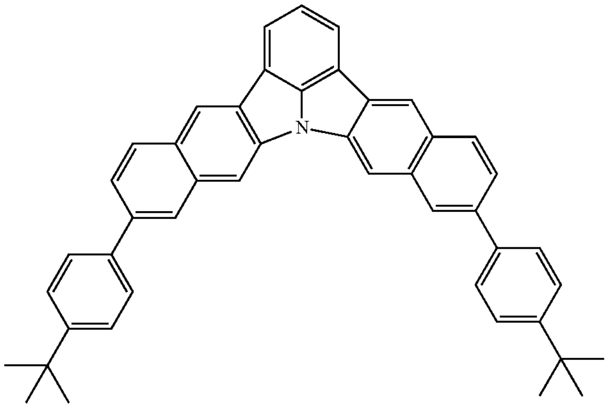
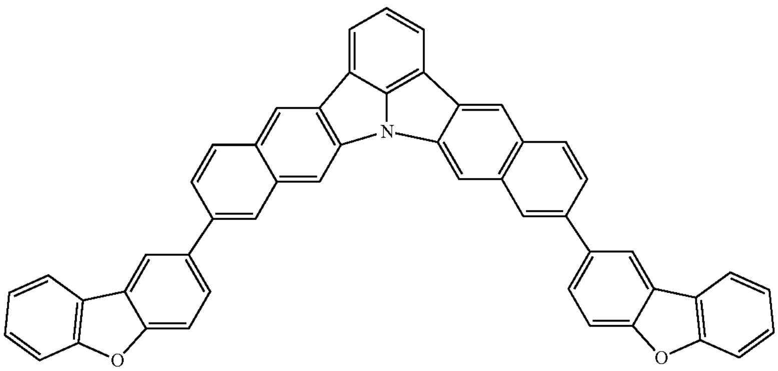
[Formula 139]
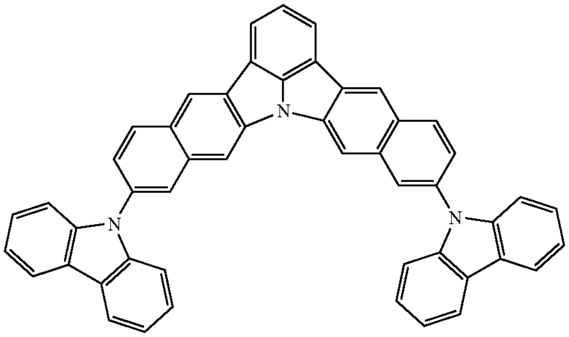
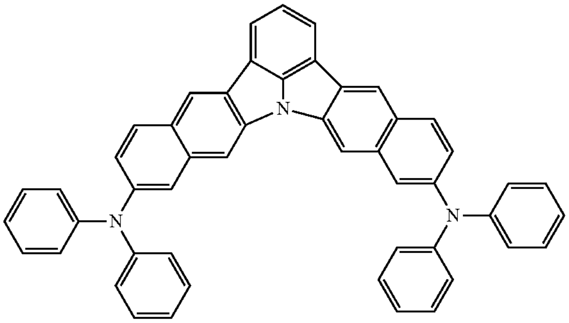
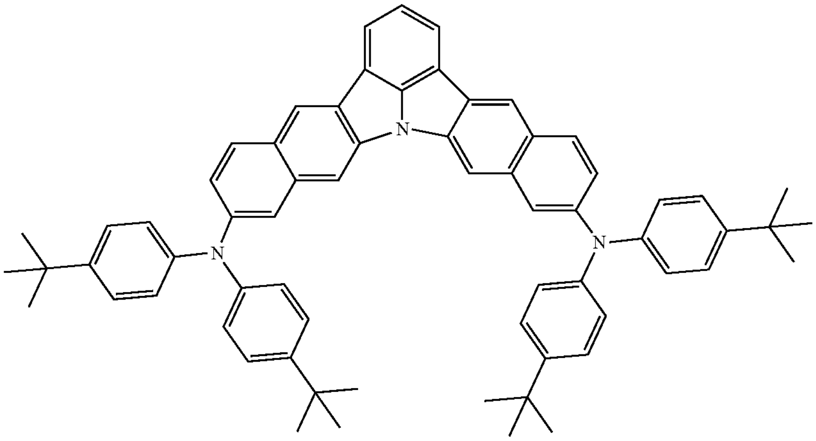

-continued
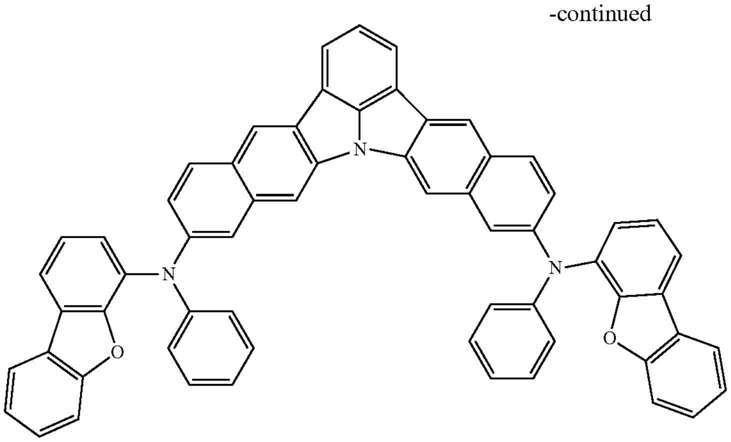
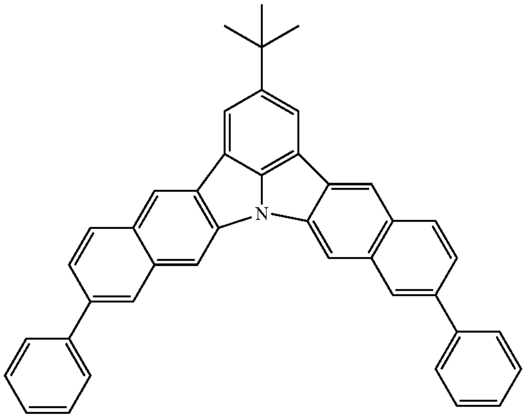
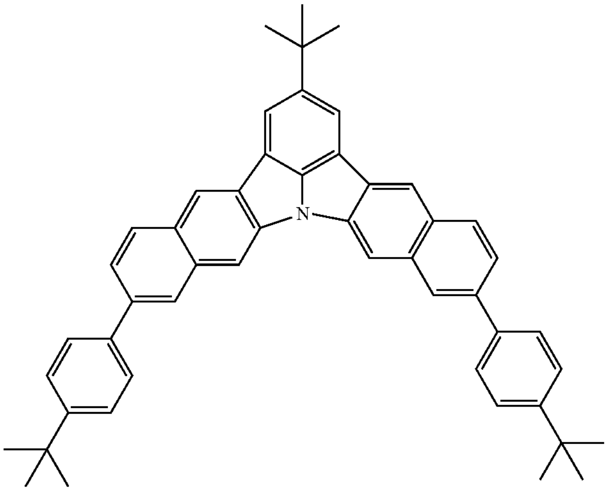
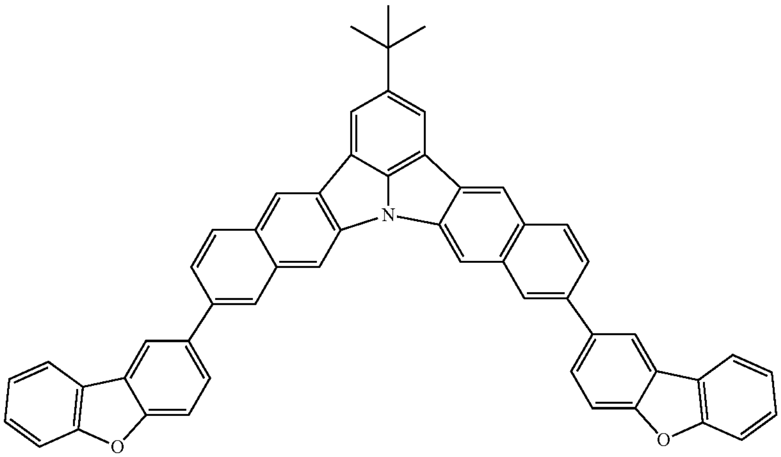

-continued
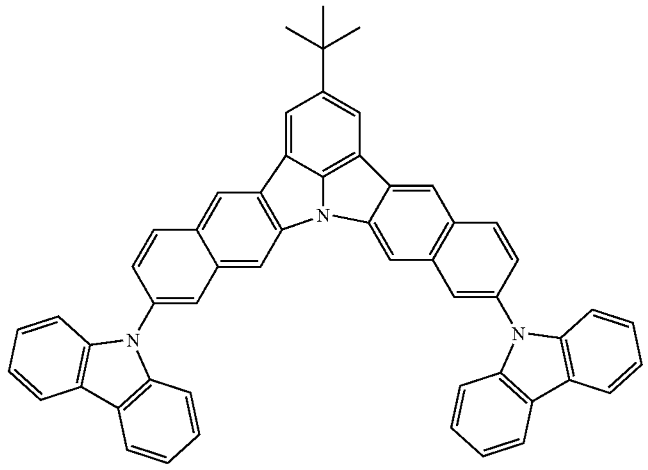
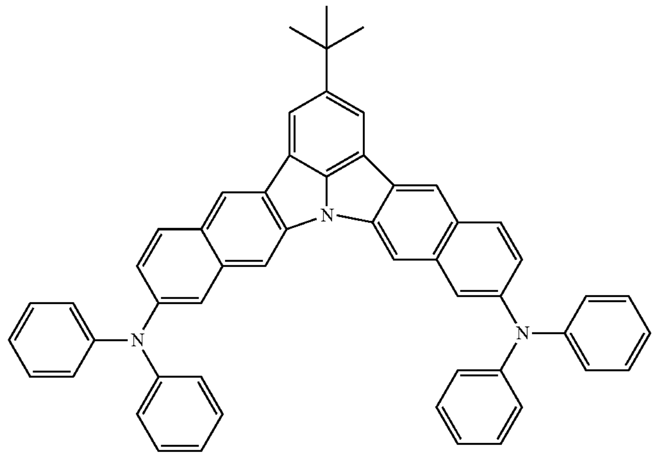
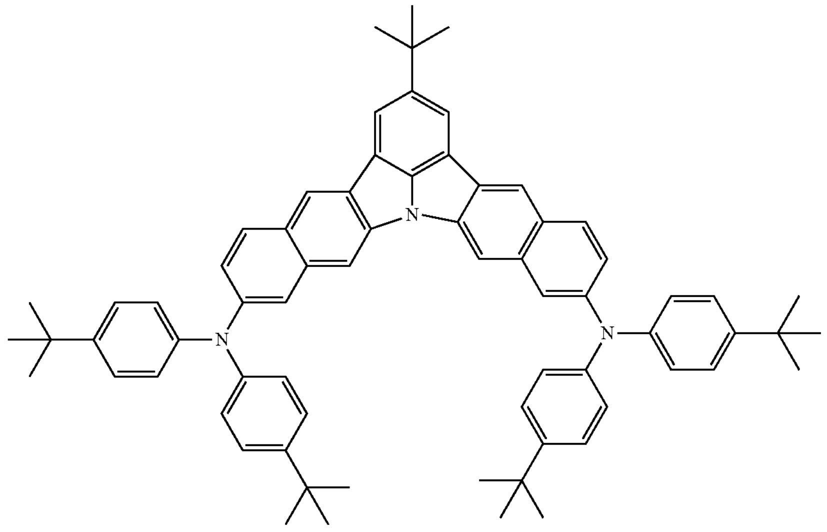

-continued
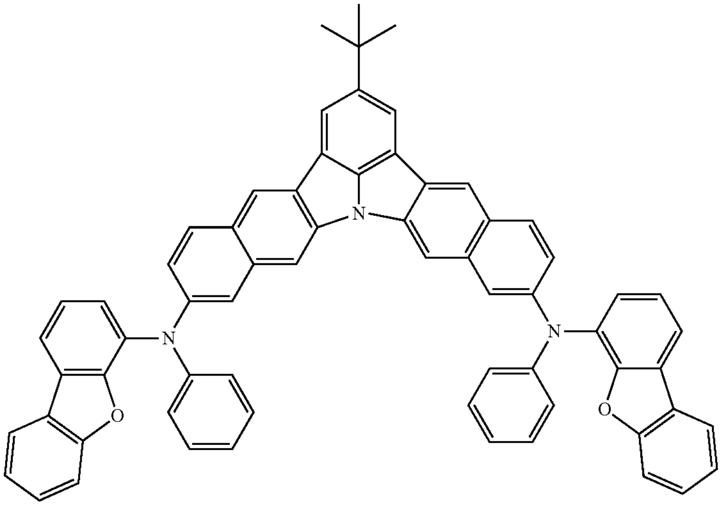
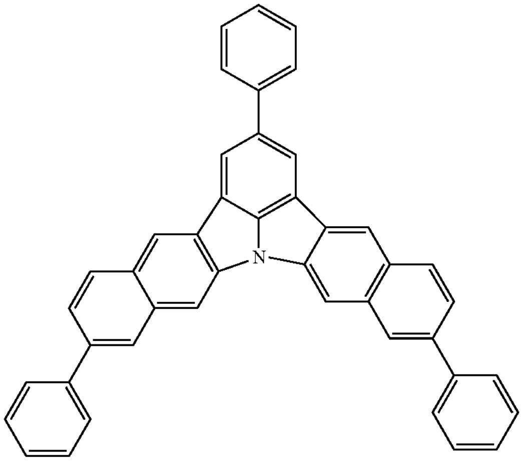
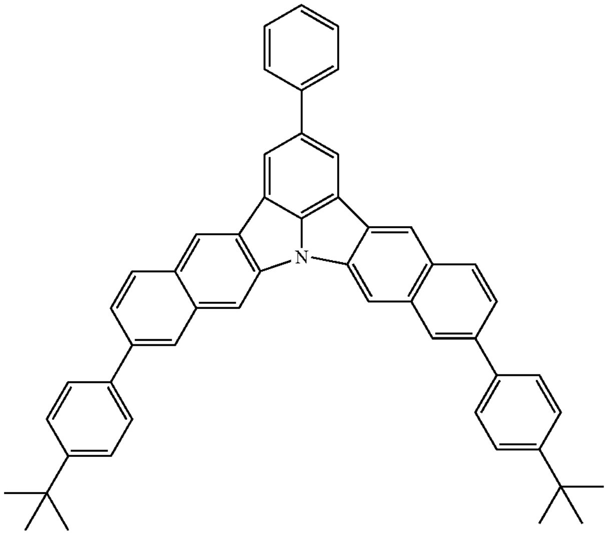
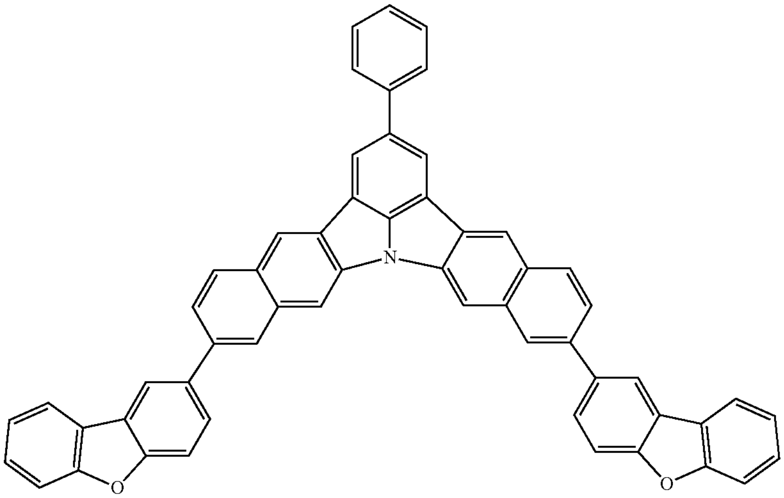

-continued
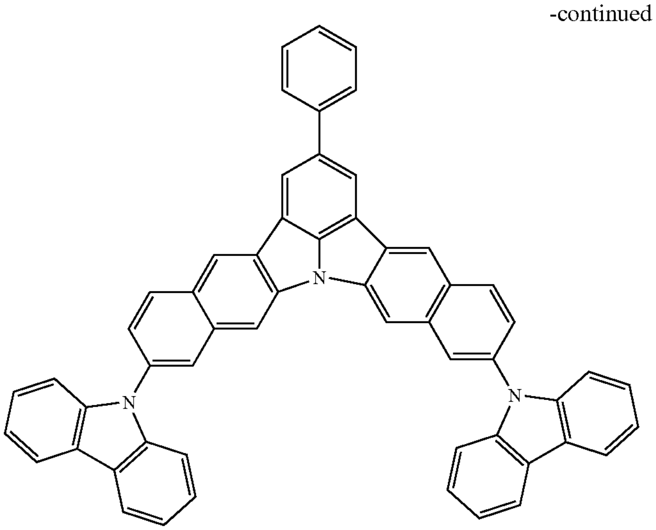
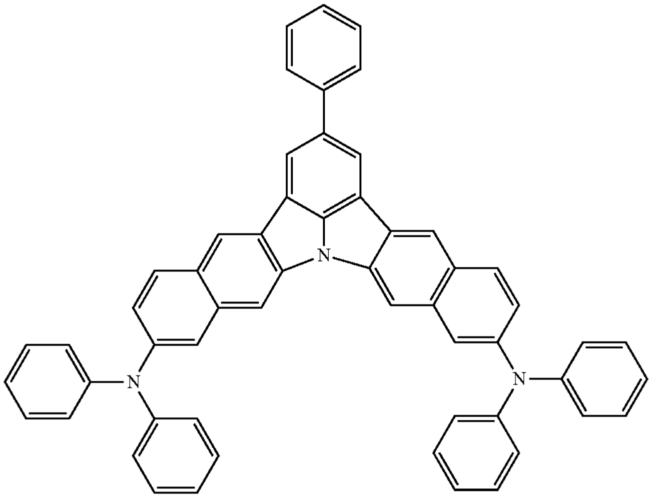
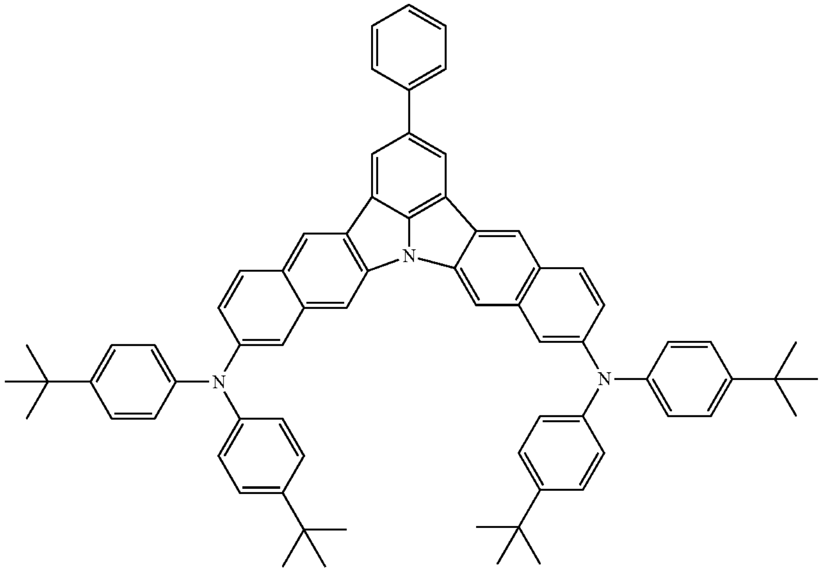

-continued
[Formula 140]
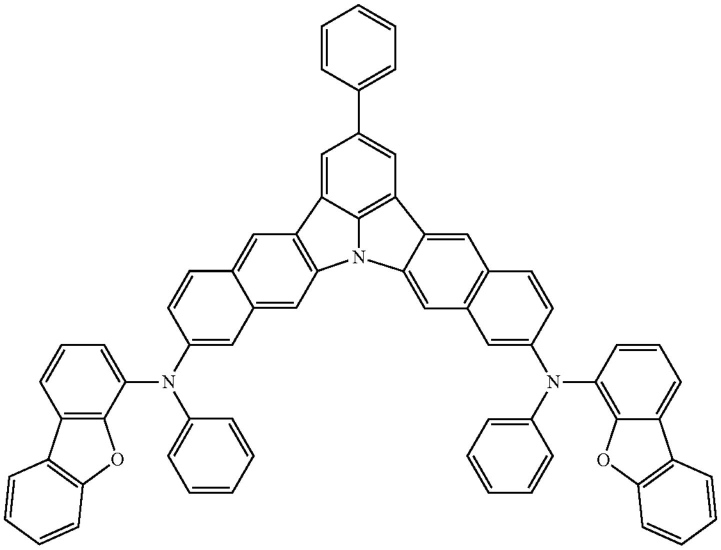
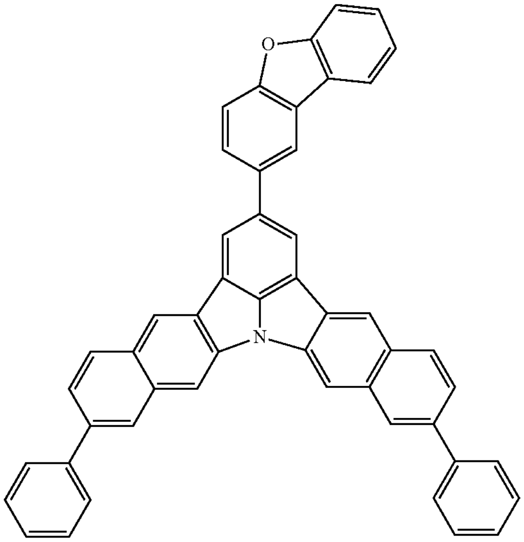
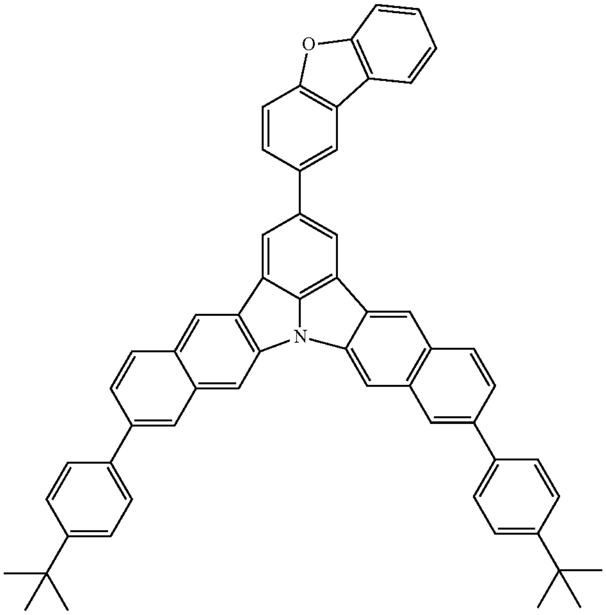

-continued
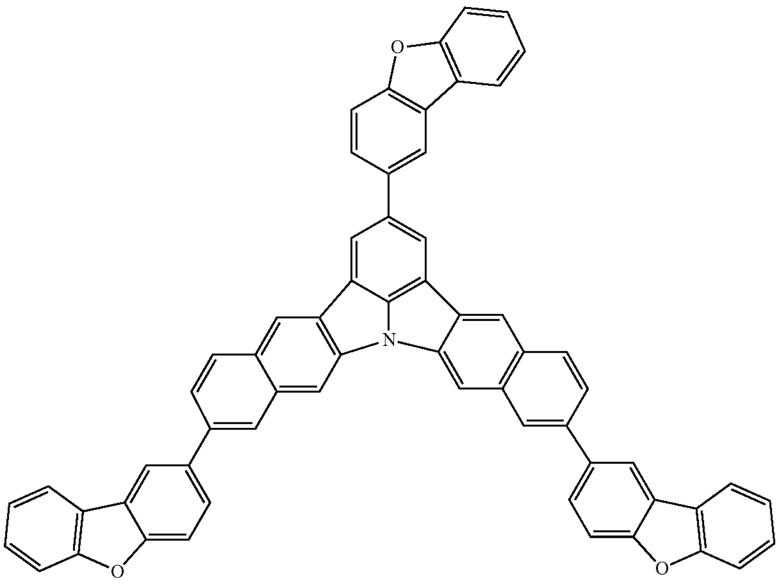
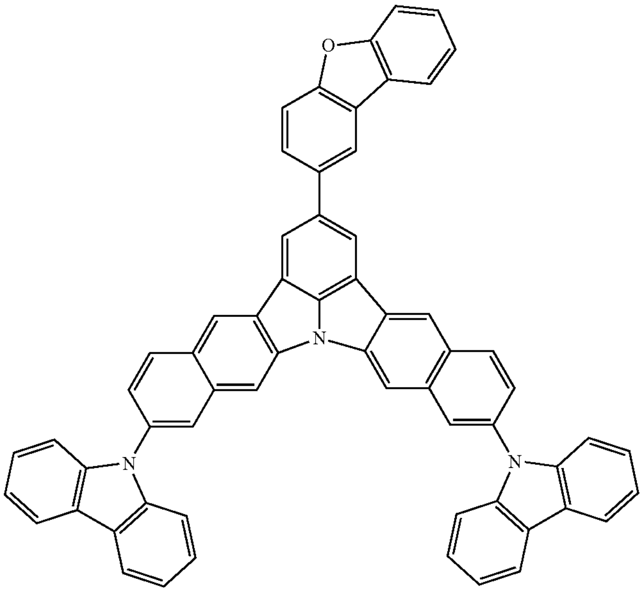

-continued
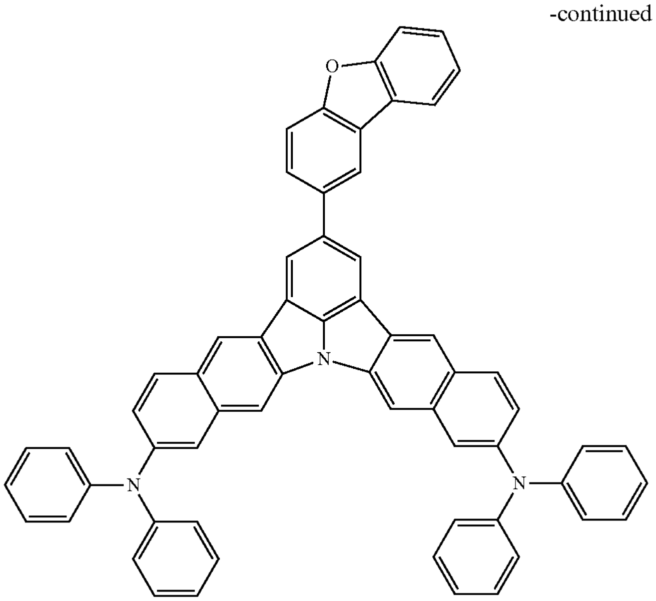
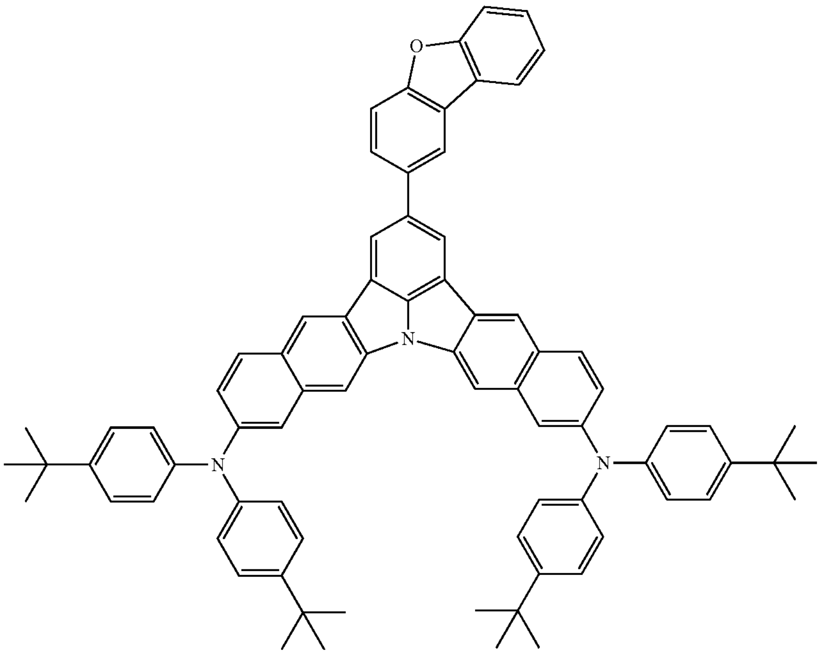

-continued
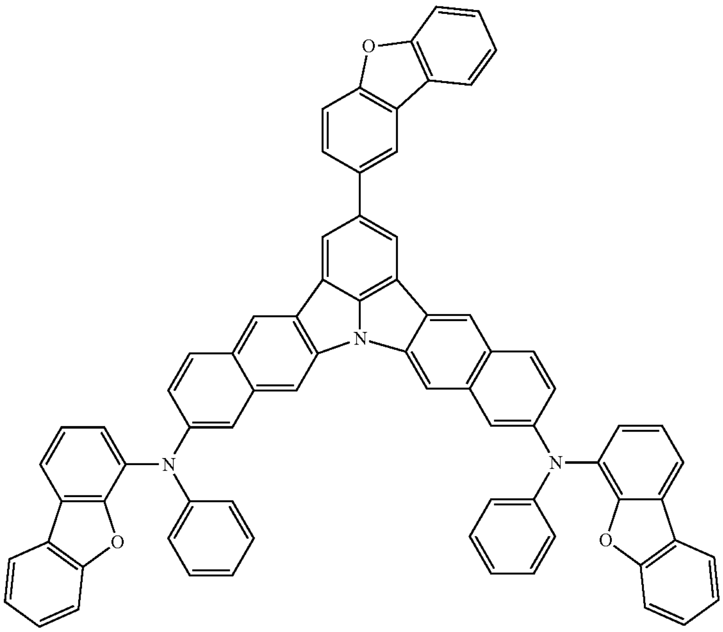
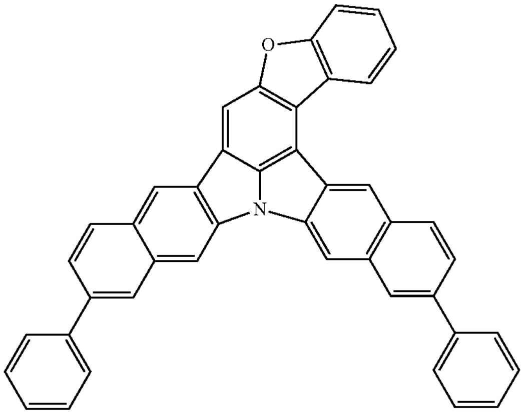
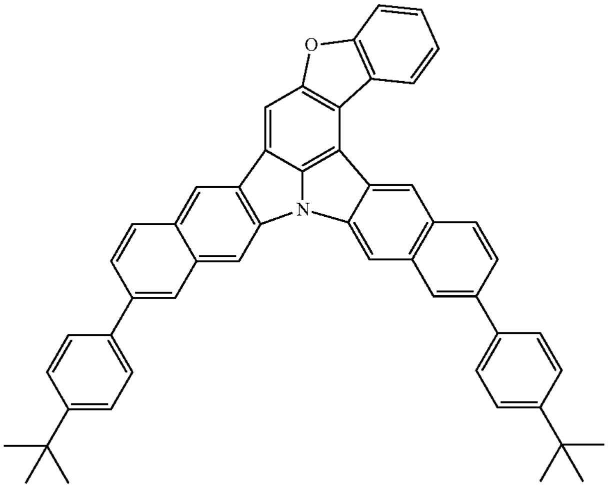
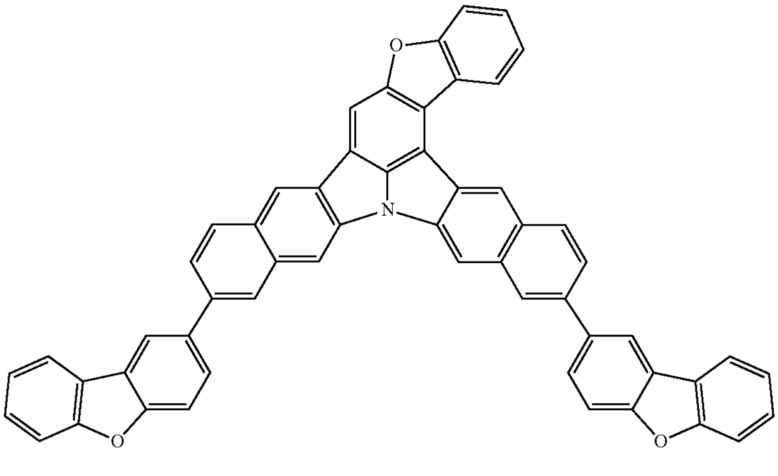

-continued
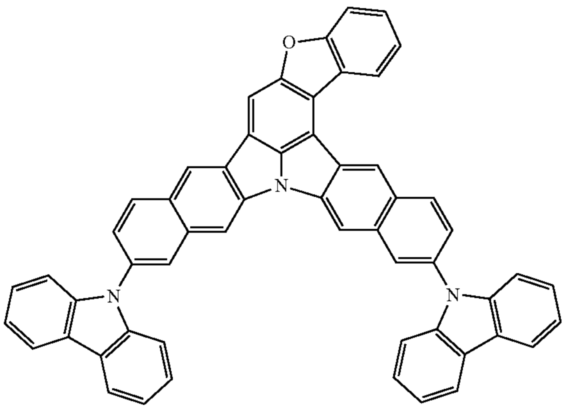
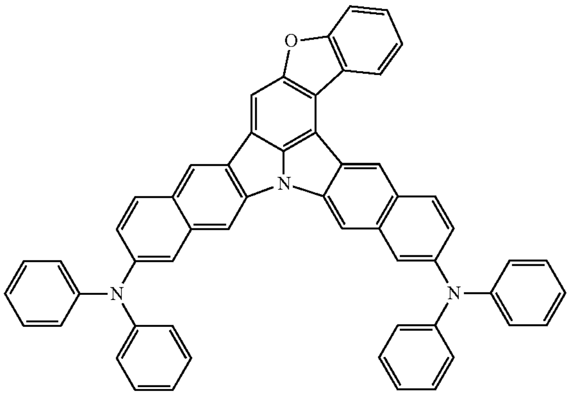
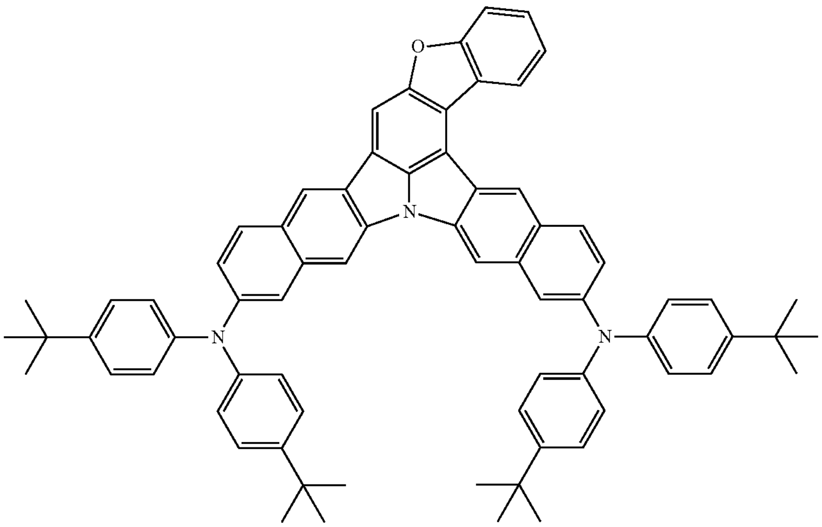
[Formula 141]
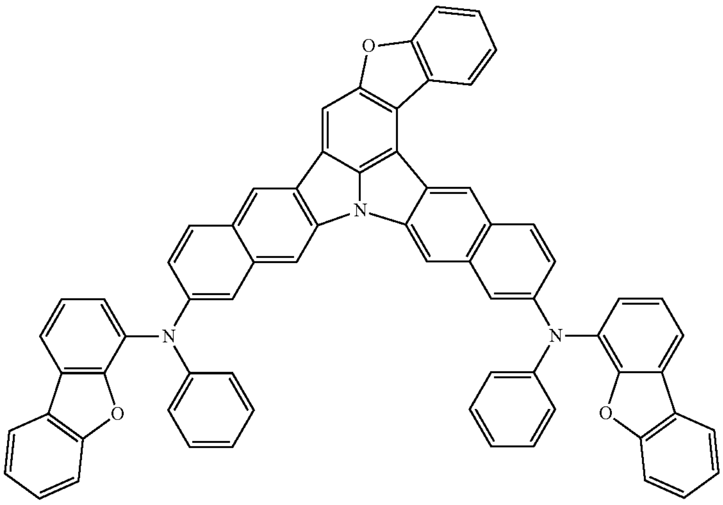

-continued
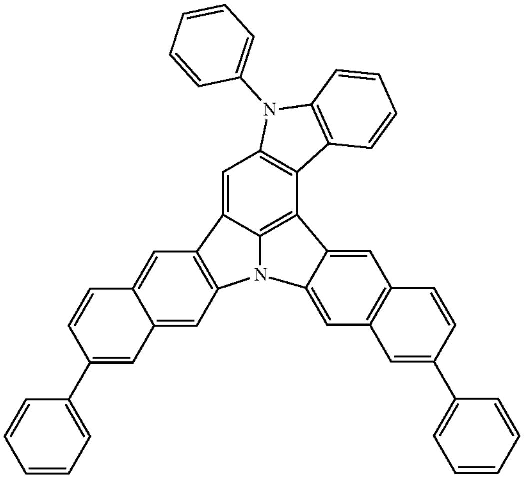
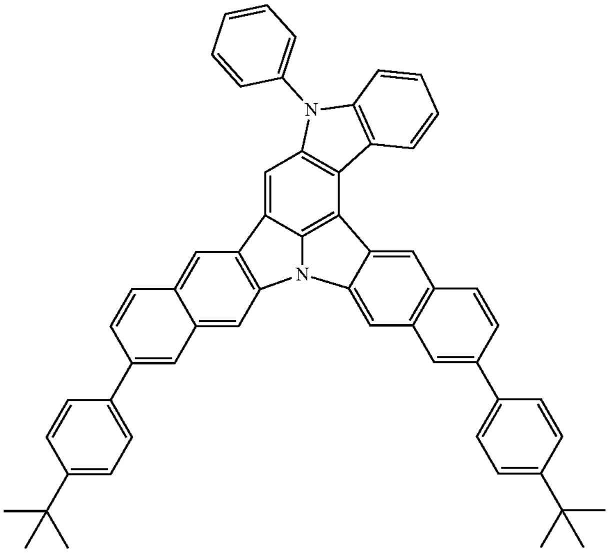
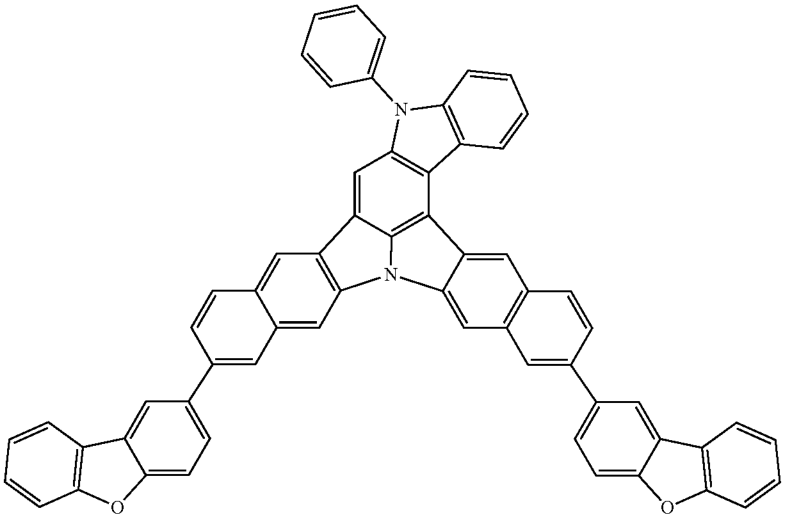
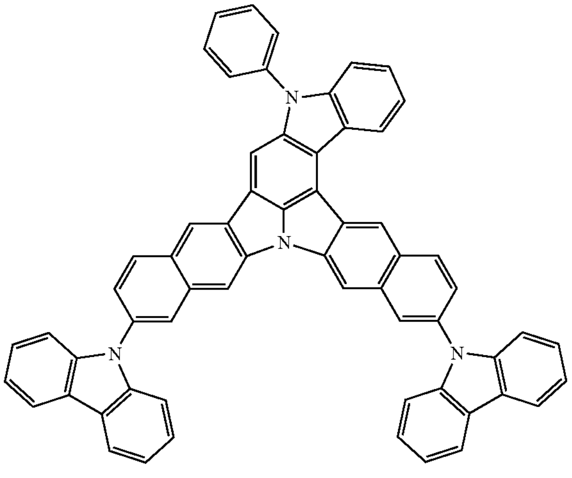
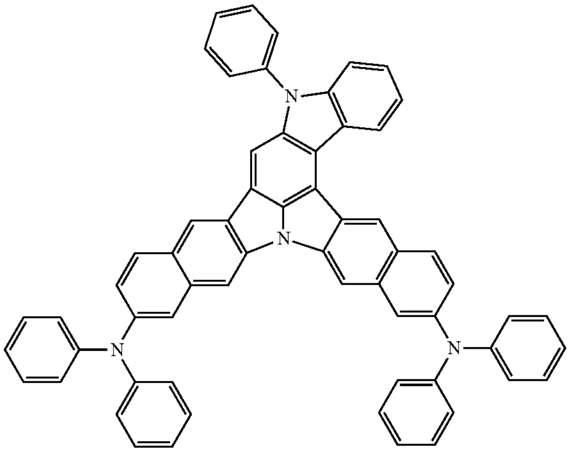

-continued
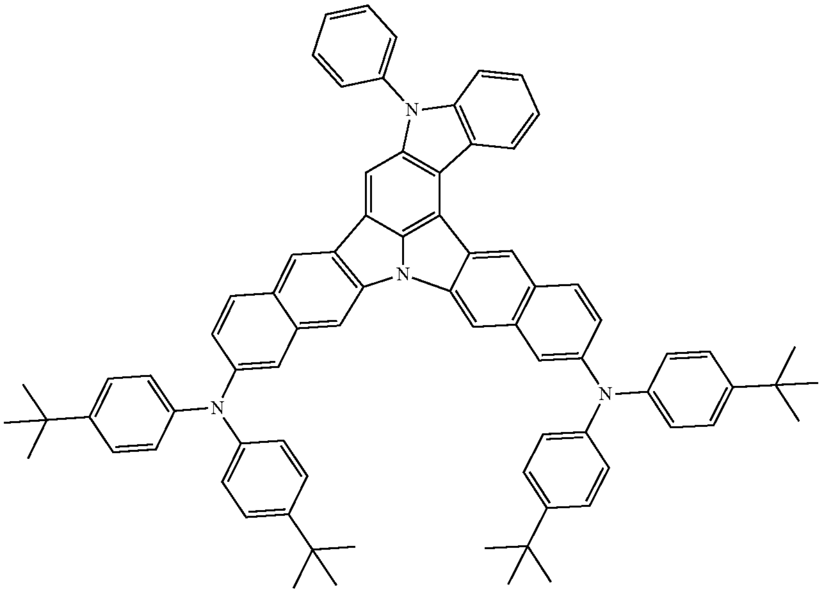
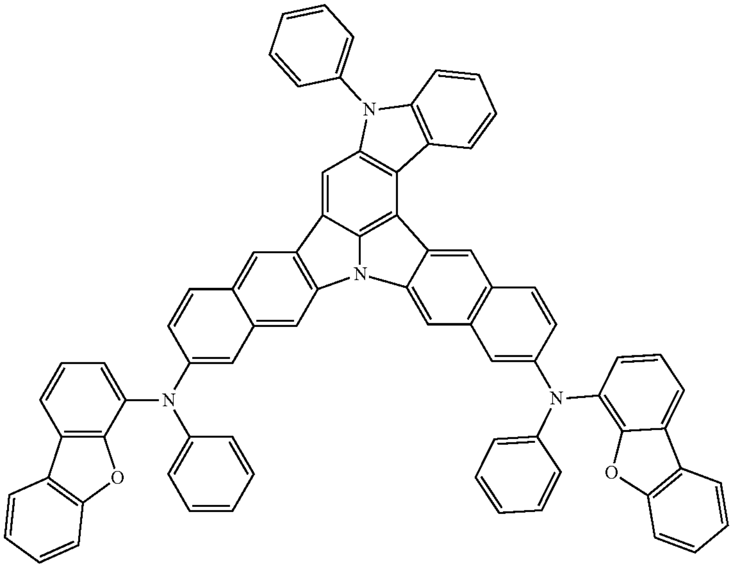
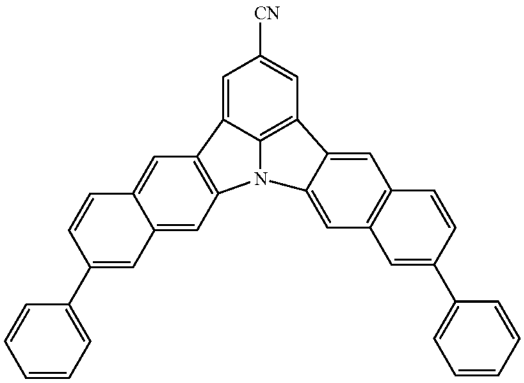
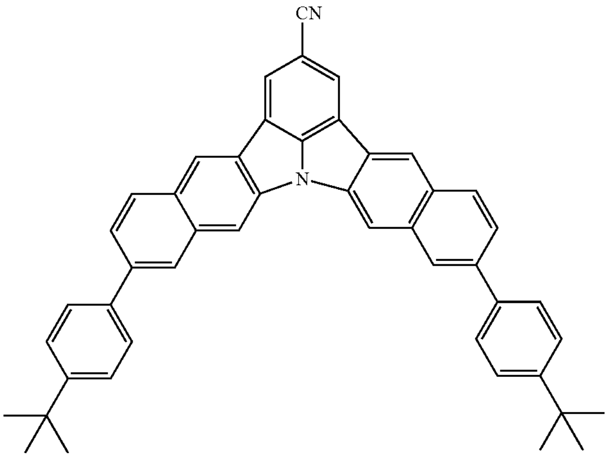

-continued
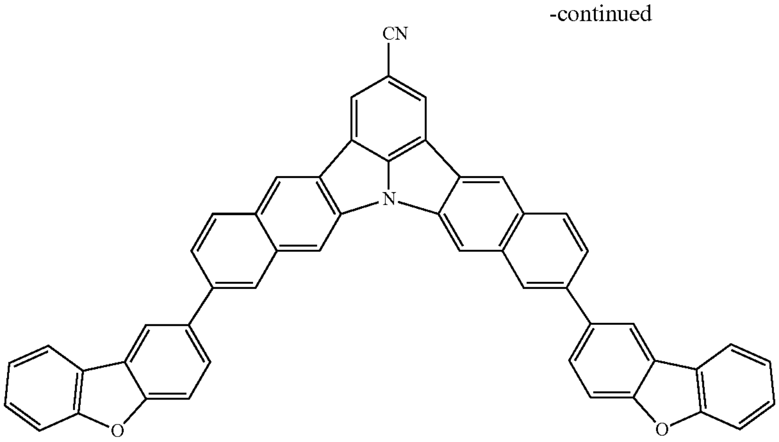
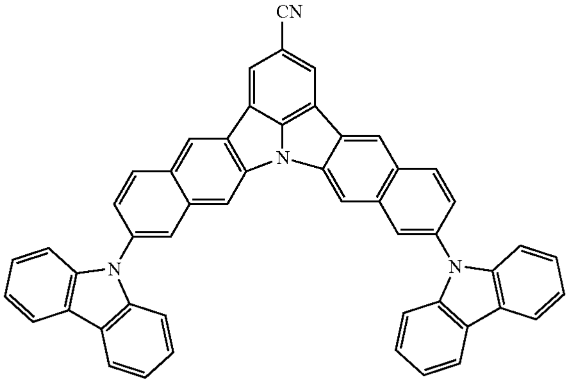
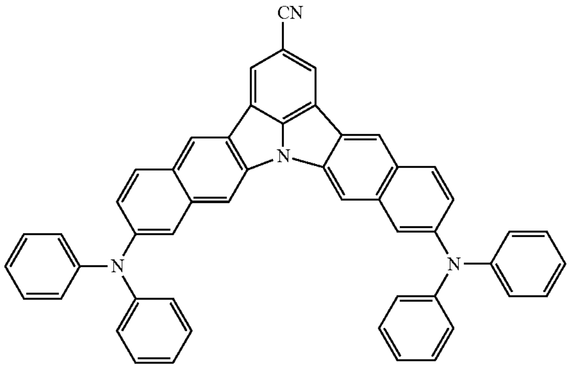
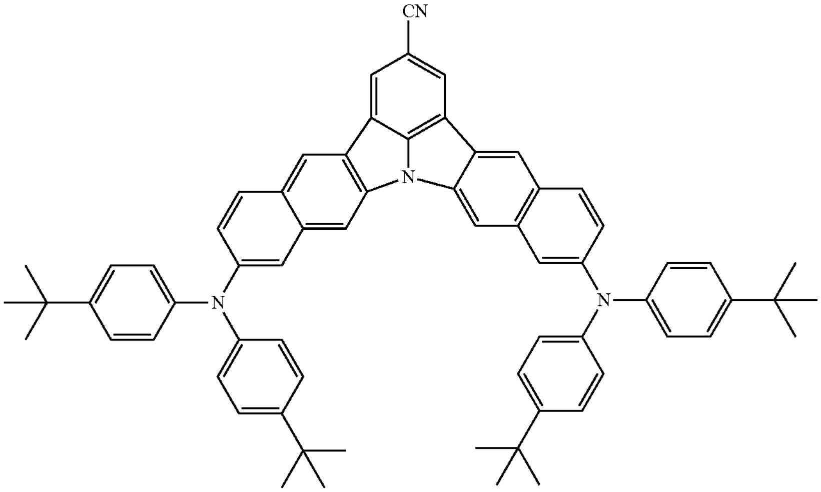

-continued
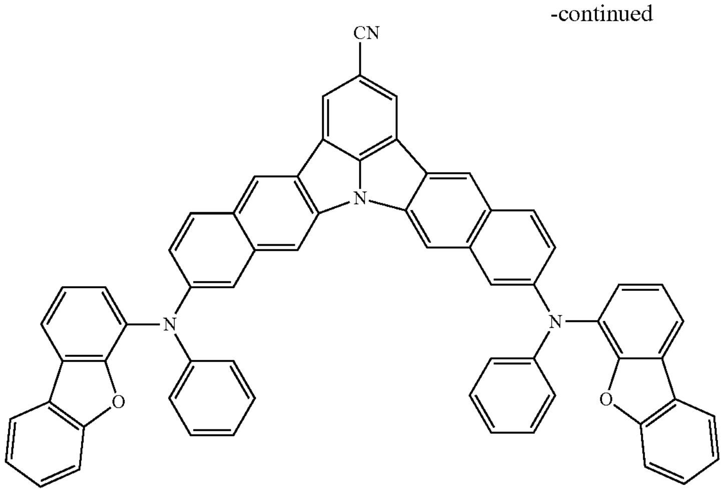
[Formula 142]
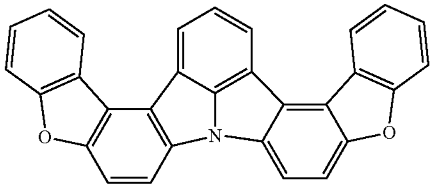
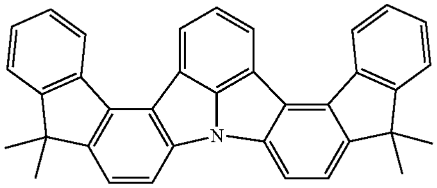
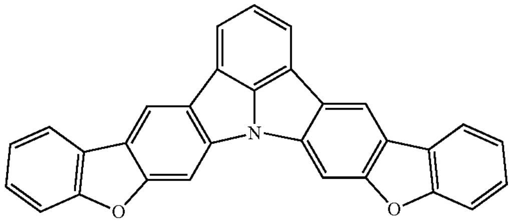
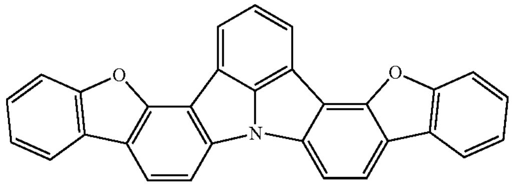
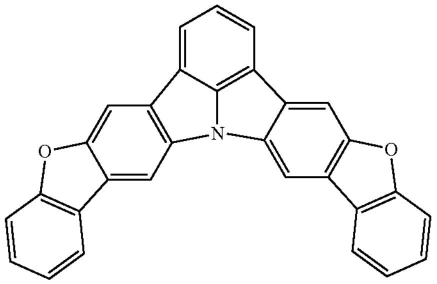
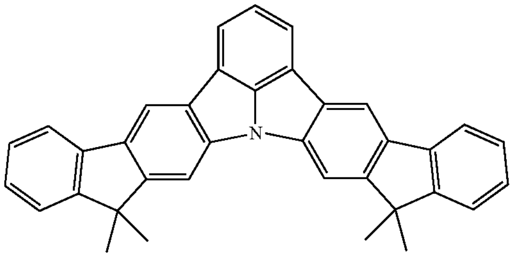
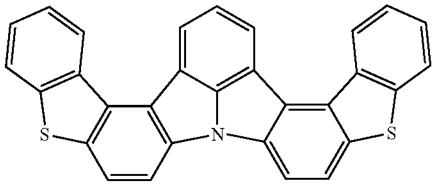
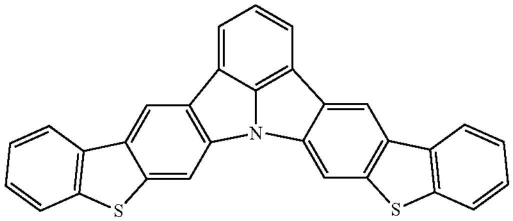
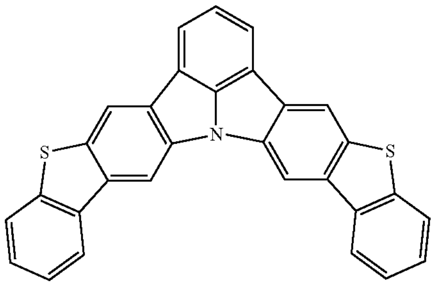
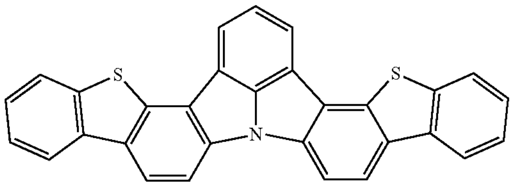

-continued
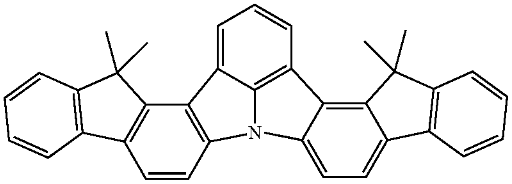
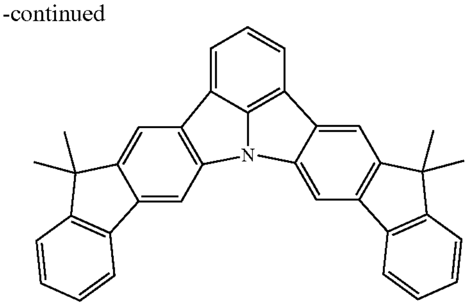
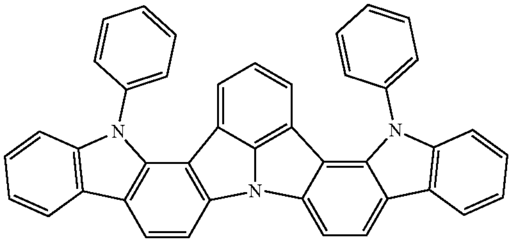
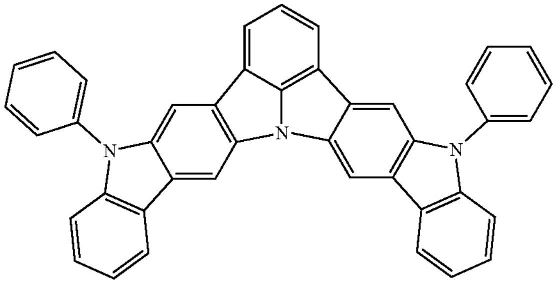
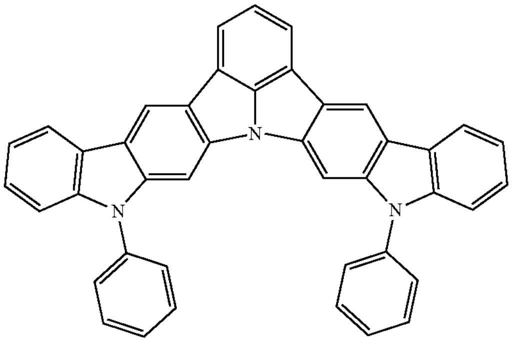
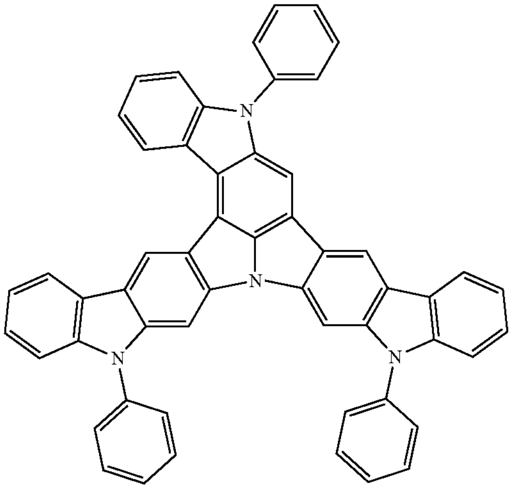
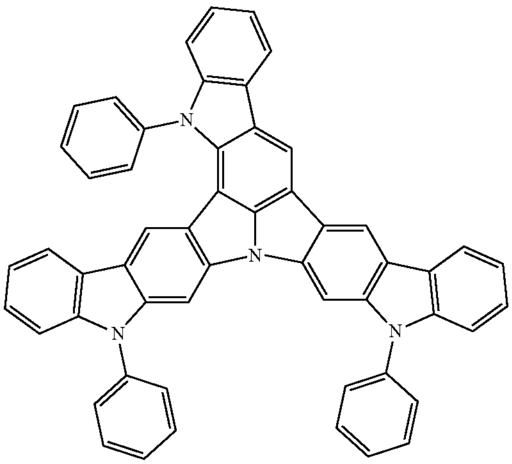
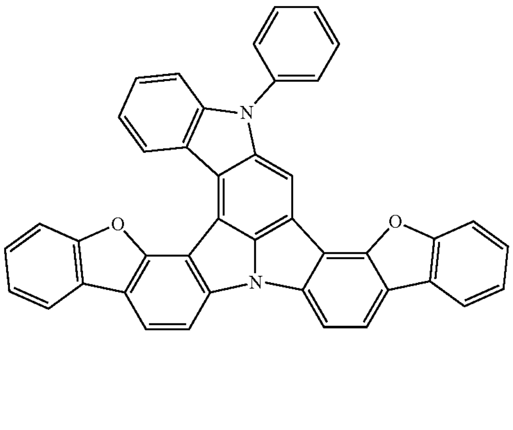

-continued
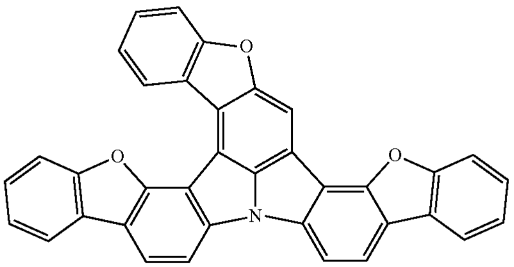
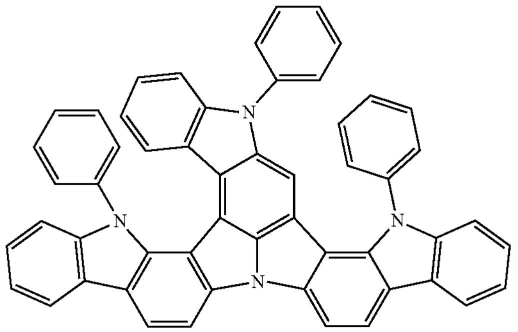
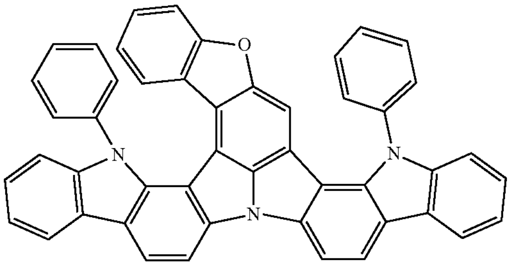
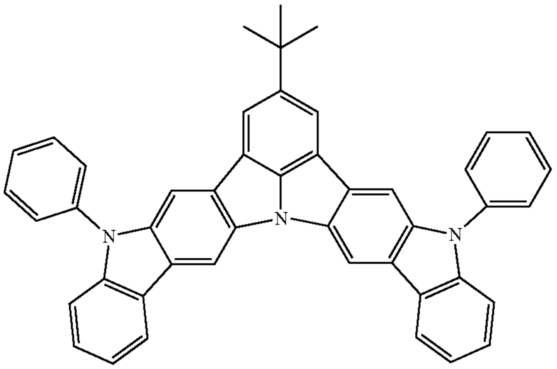
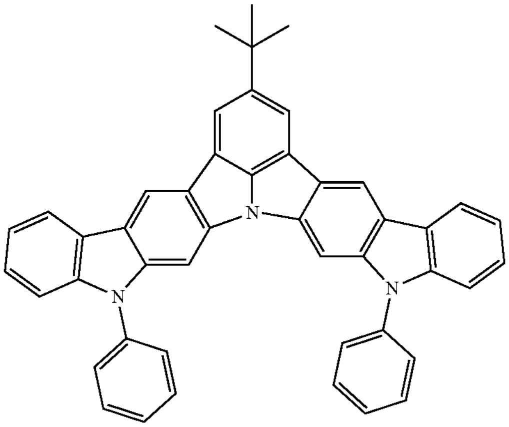
[Formula 143]
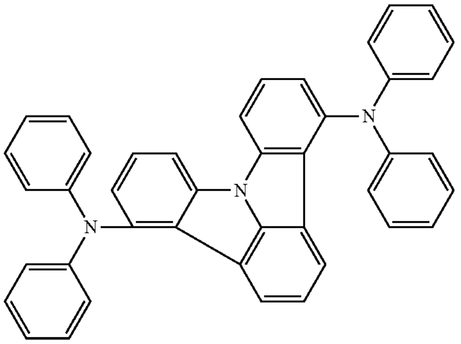
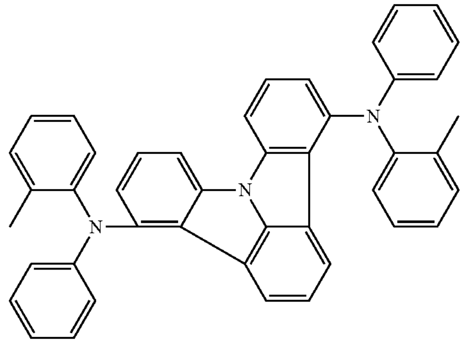

-continued
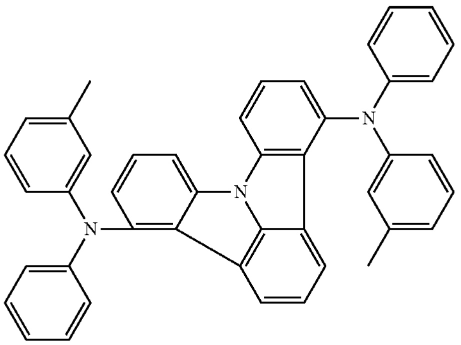
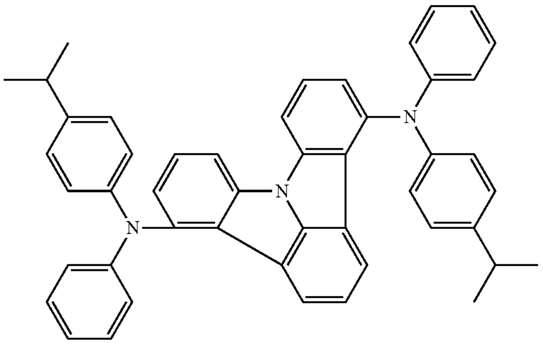
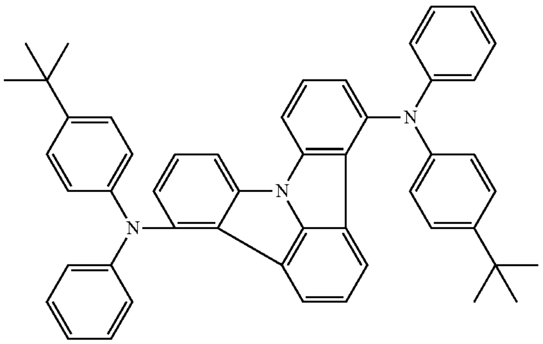
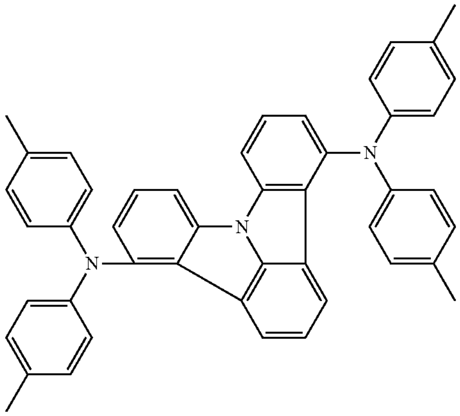
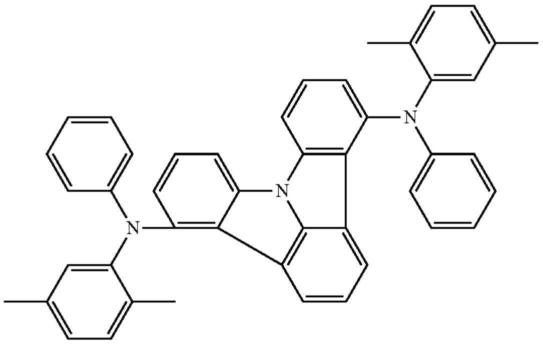
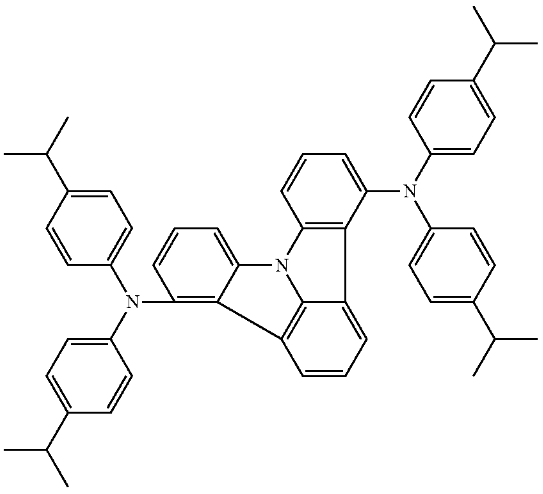

-continued
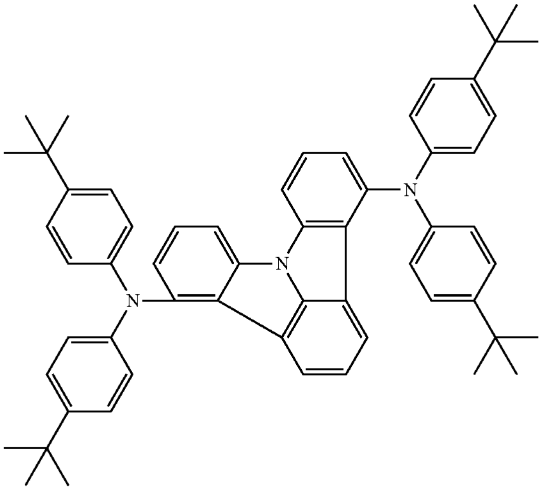
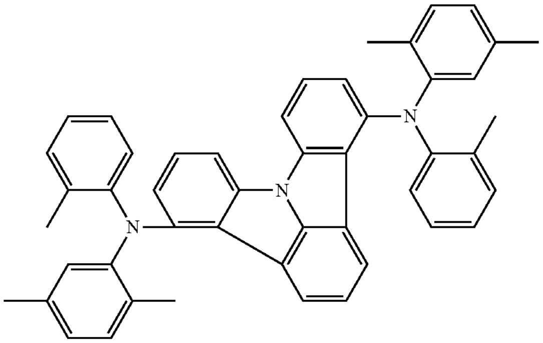
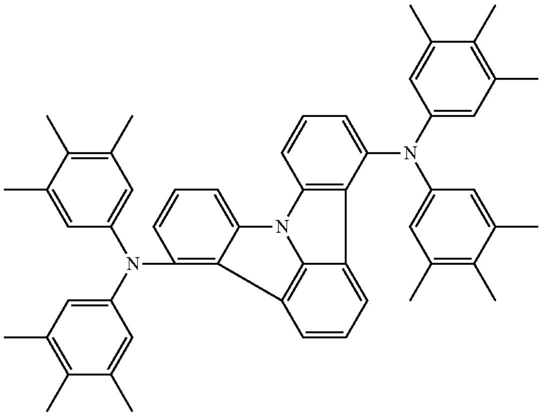
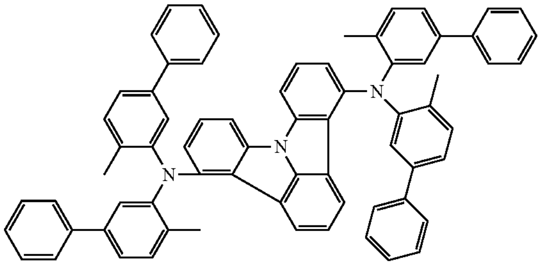
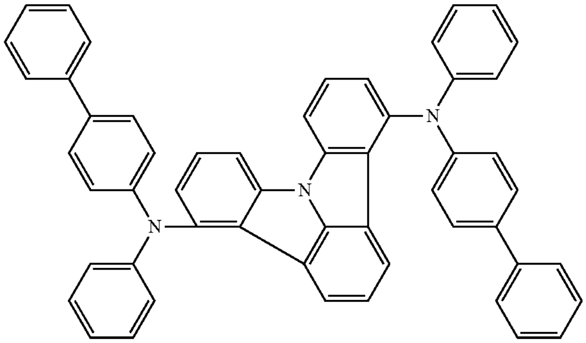
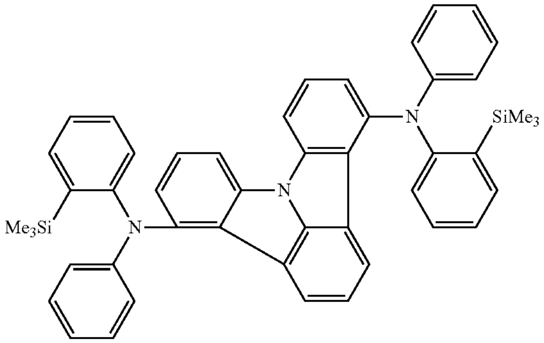
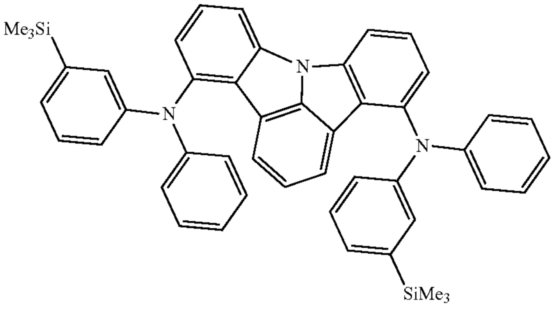
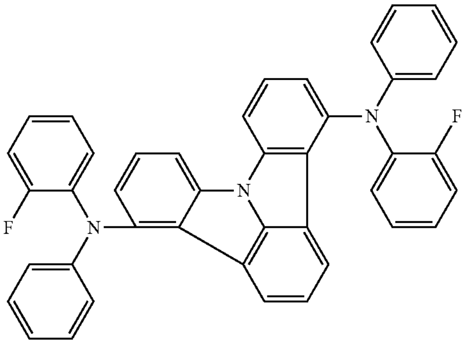

-continued
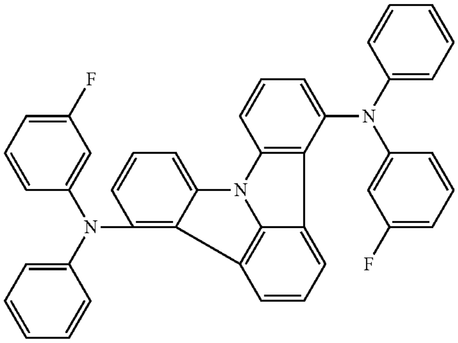
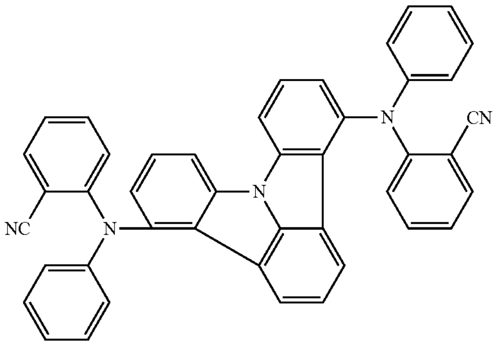
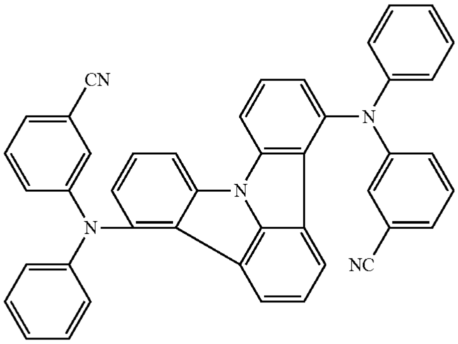
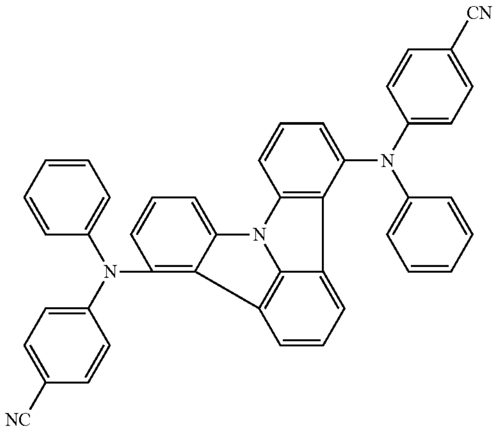
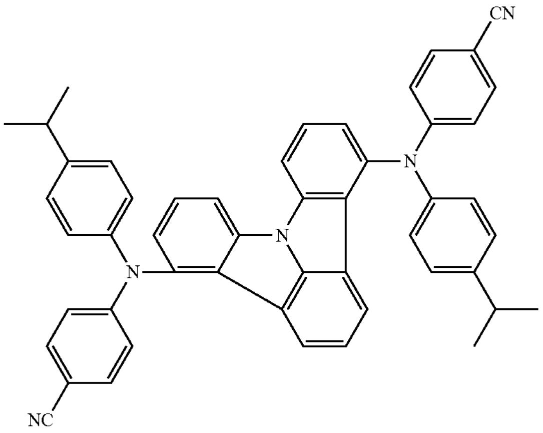
[Formula 144]
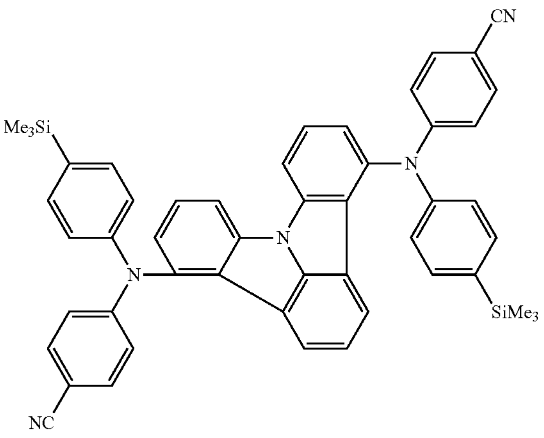
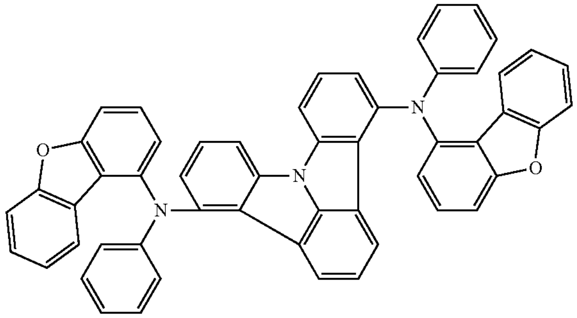

-continued
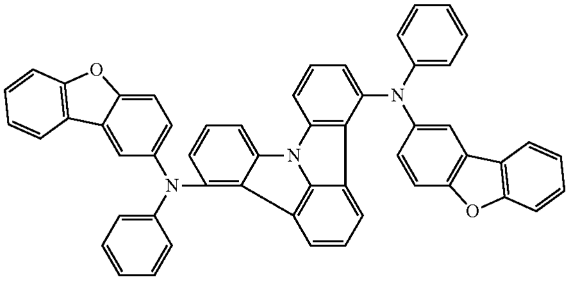
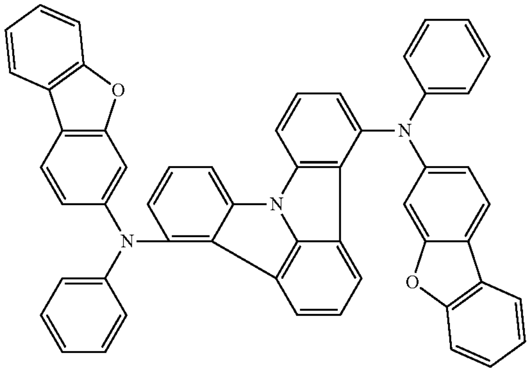
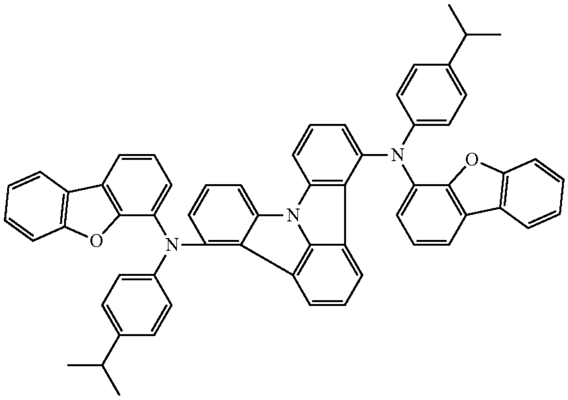
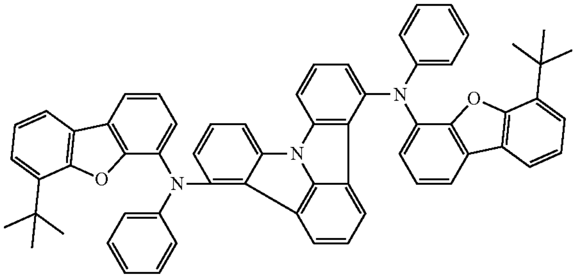
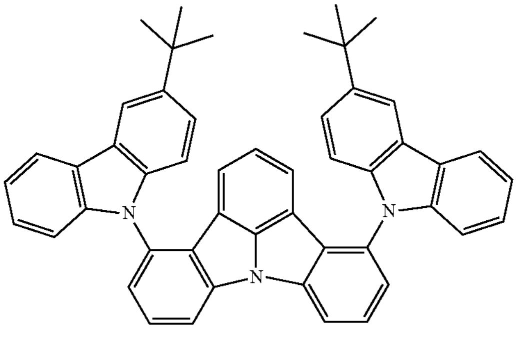
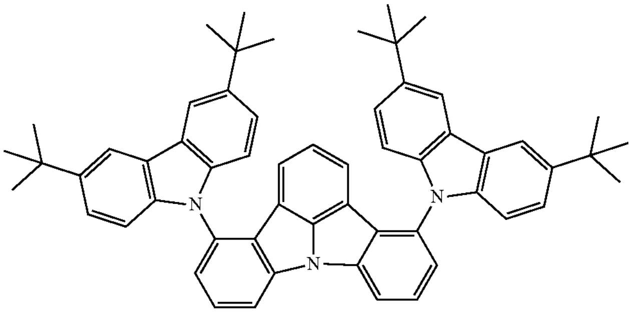
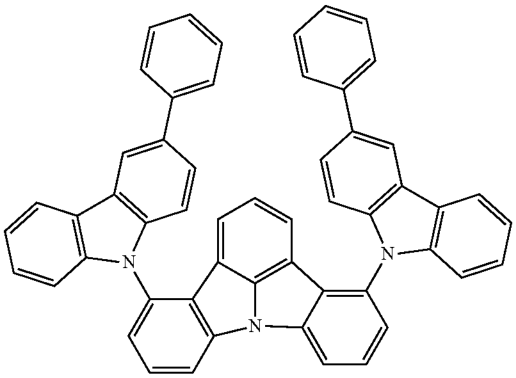
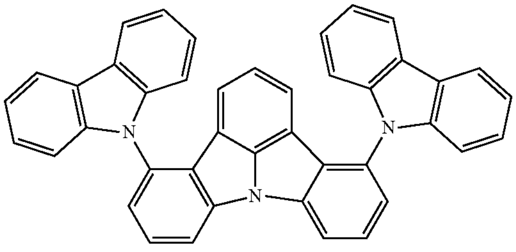

-continued
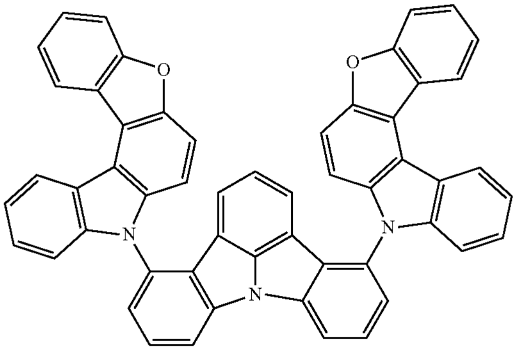
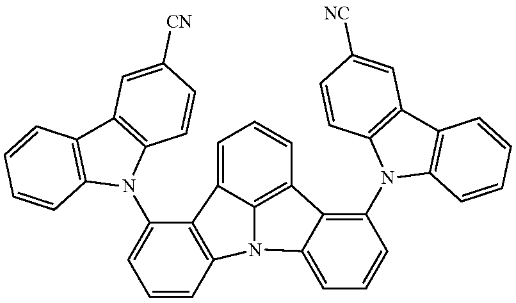
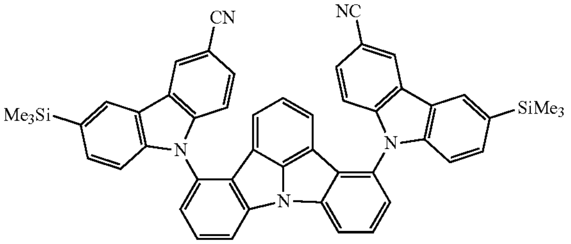
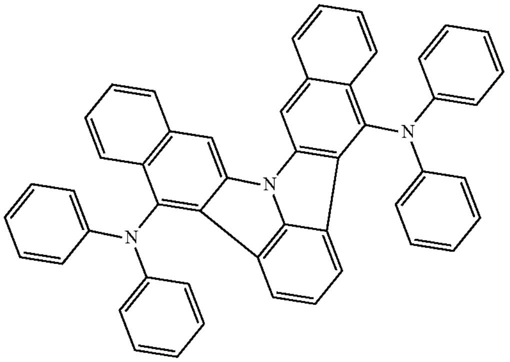
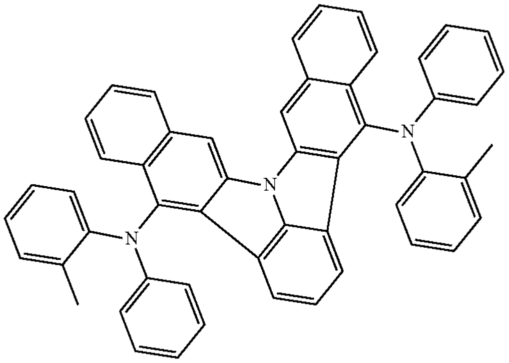
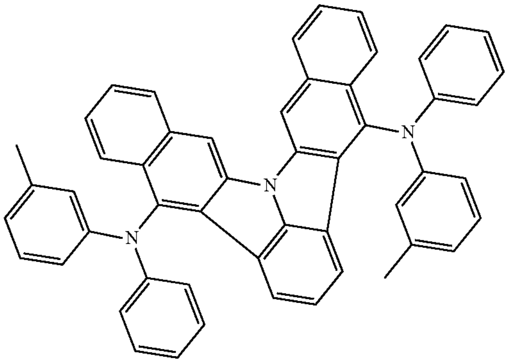
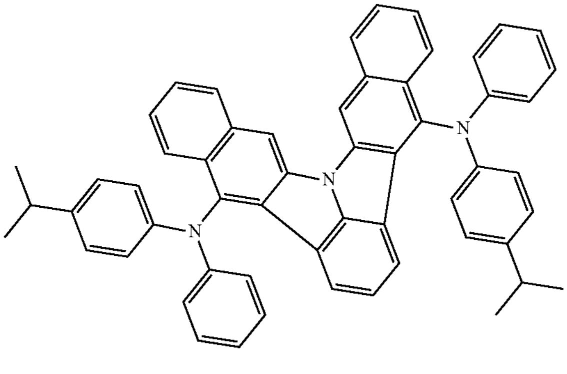
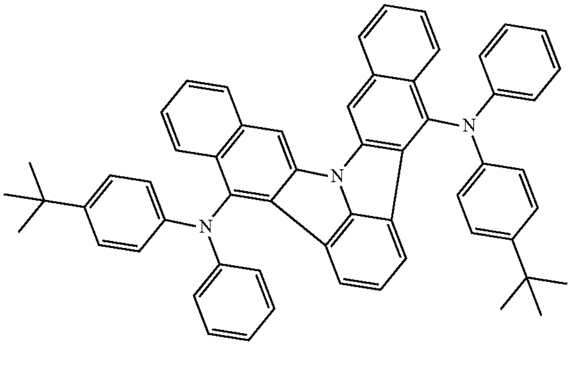

-continued
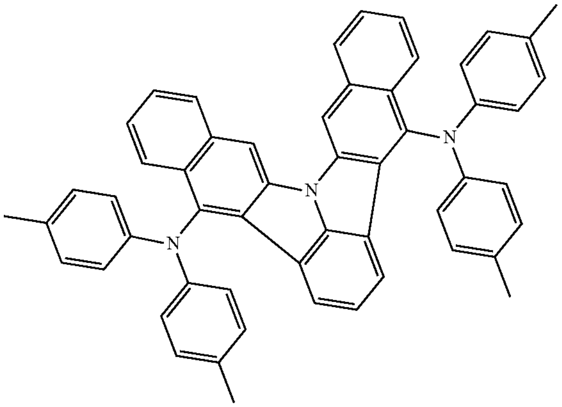
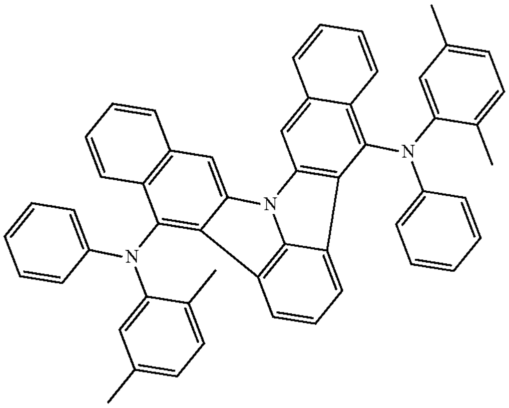
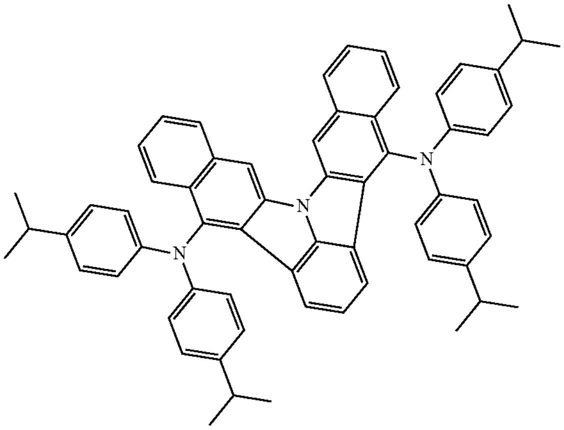
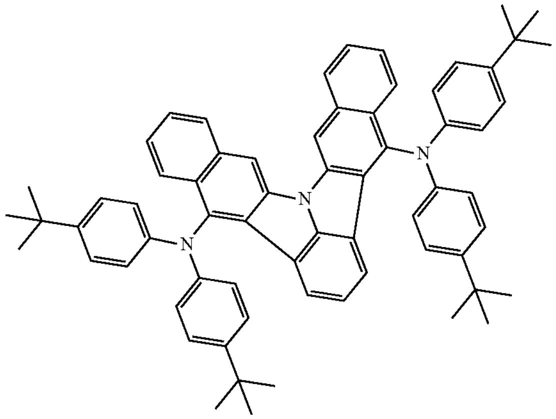
[Formula 145]
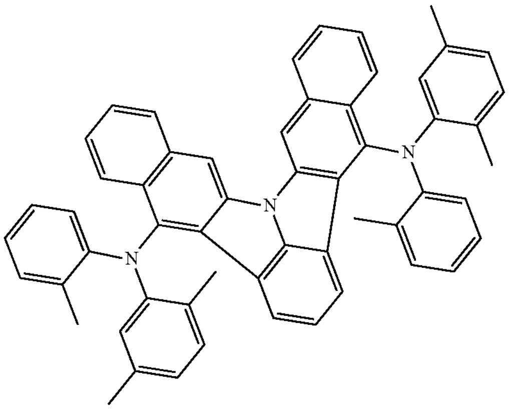
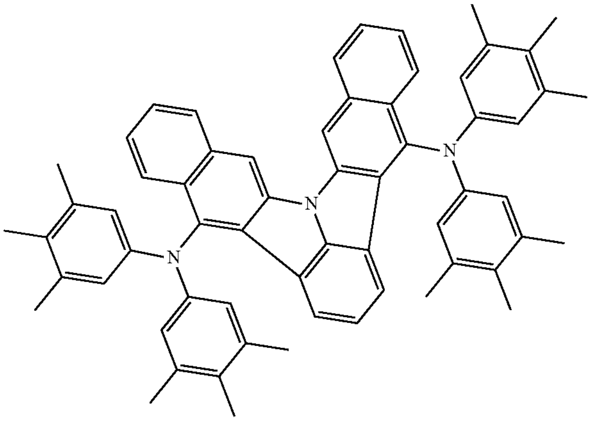

-continued
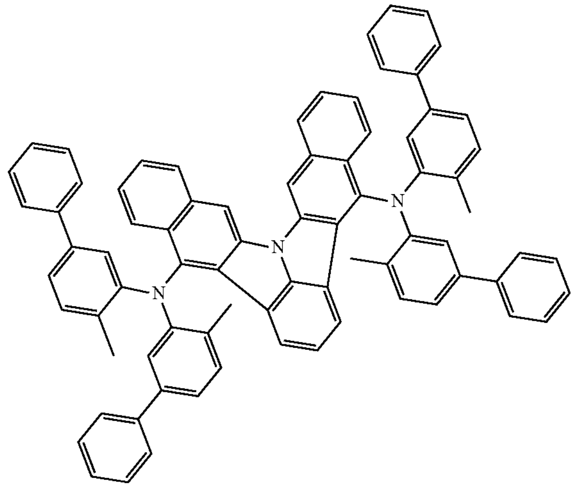
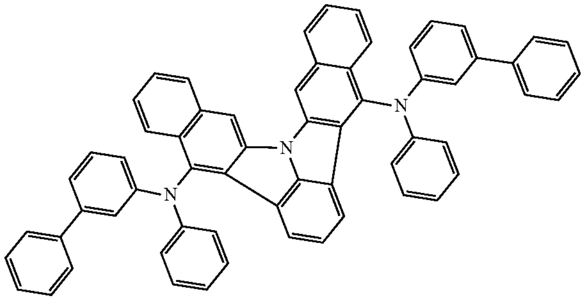
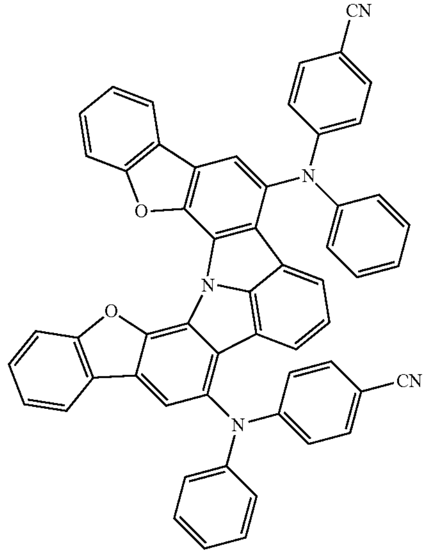
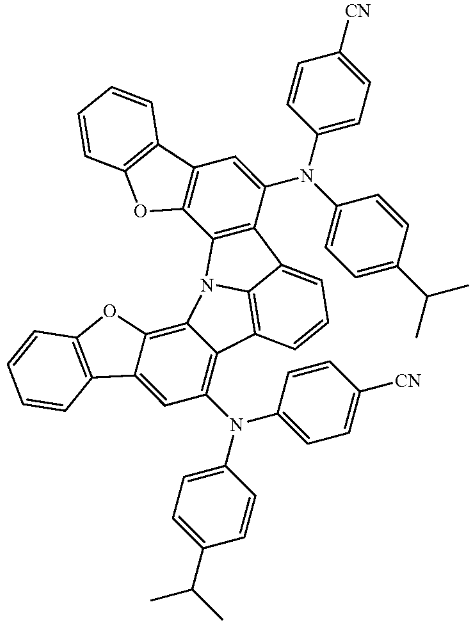

-continued
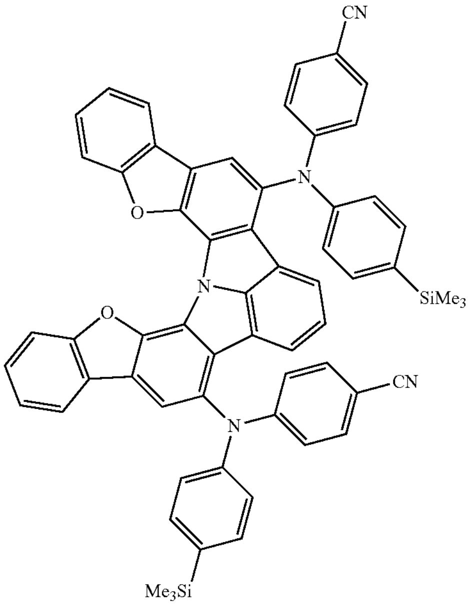
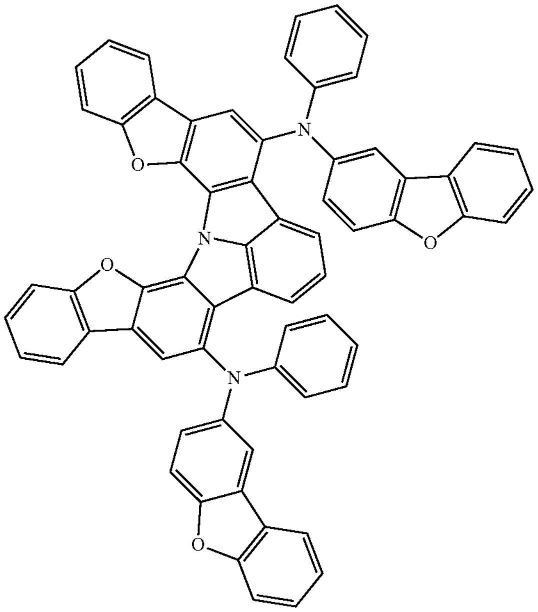
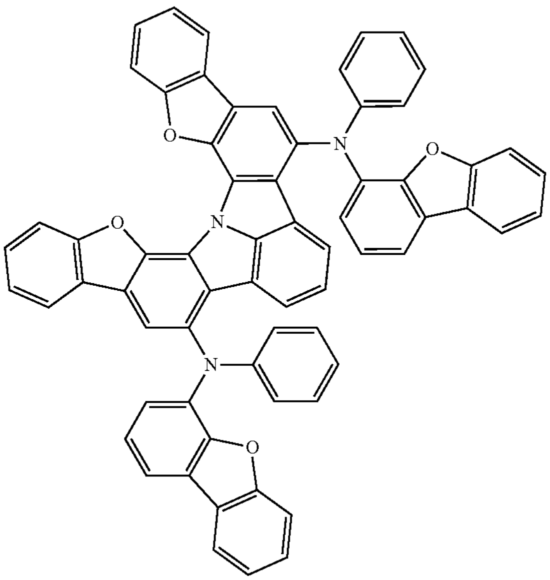
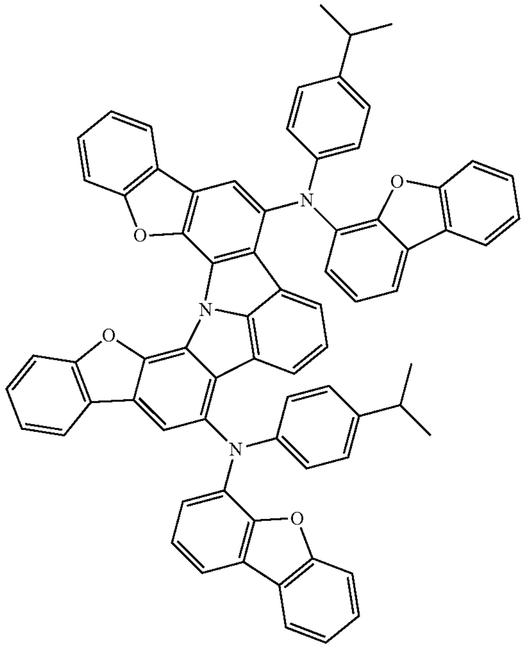

-continued
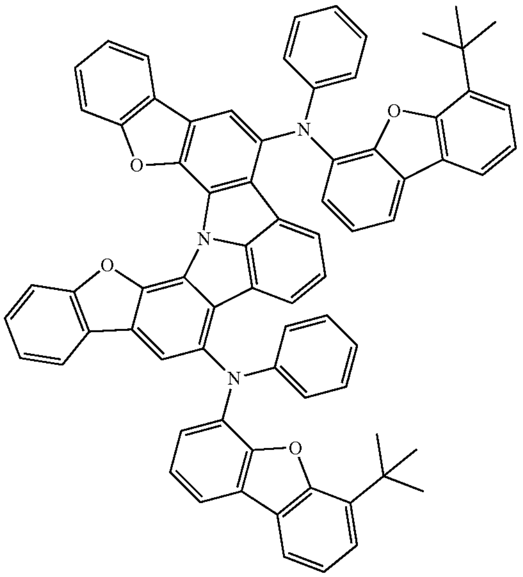
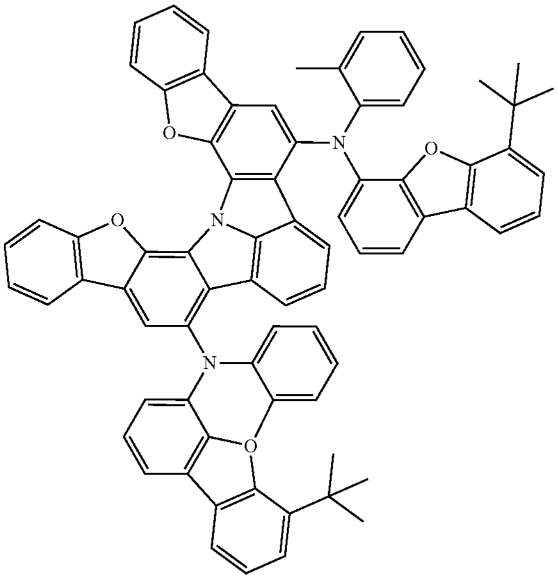
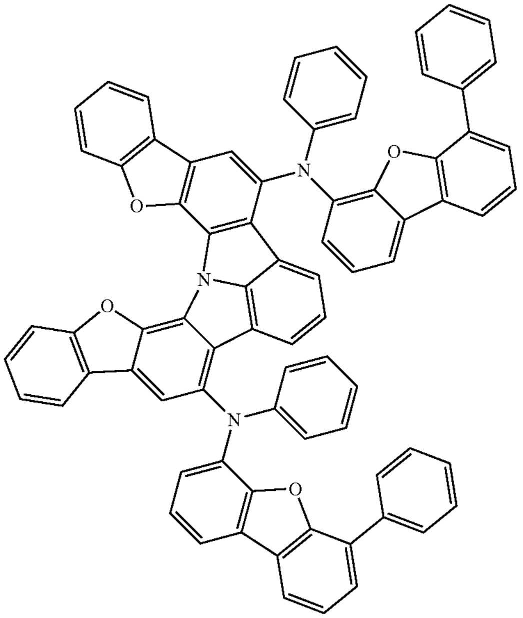
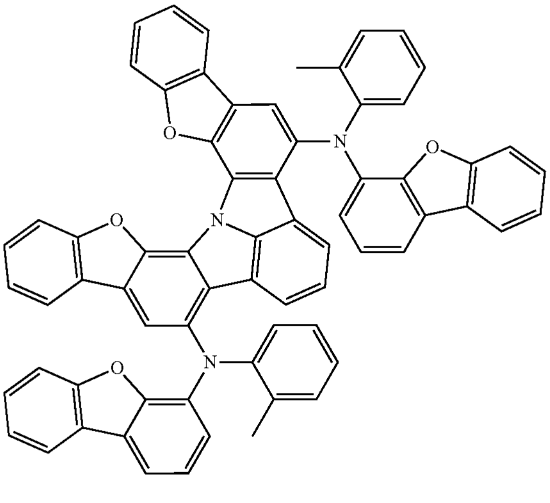
[Formula 146]
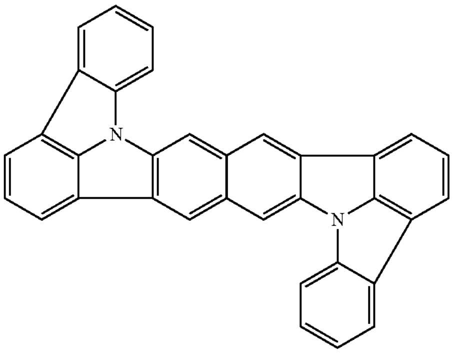
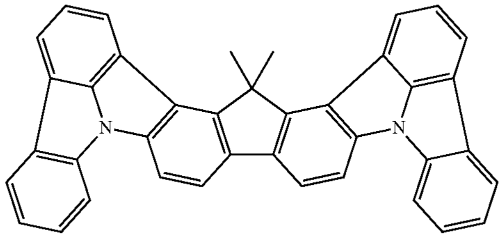

-continued
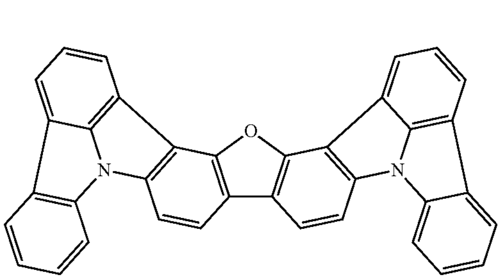
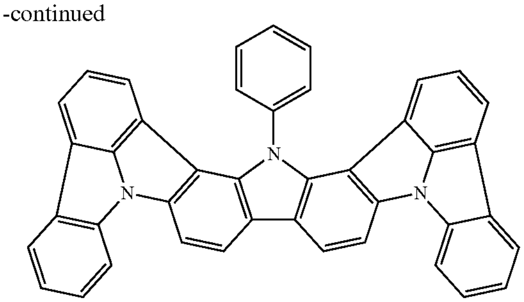
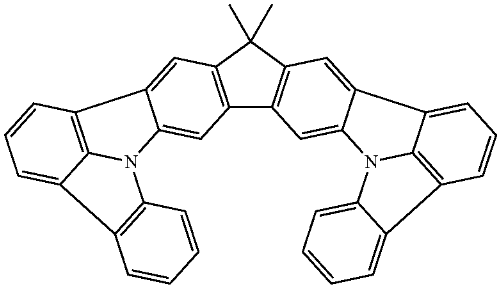
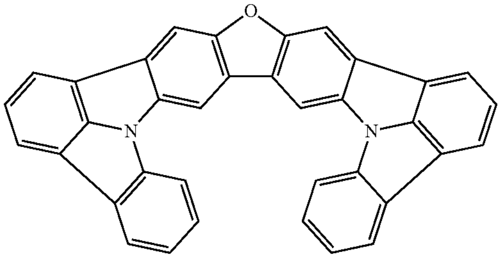
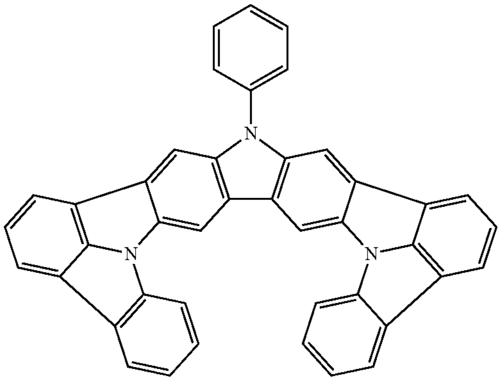
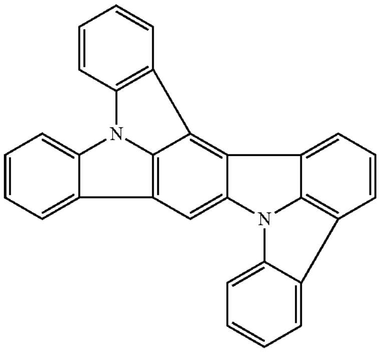
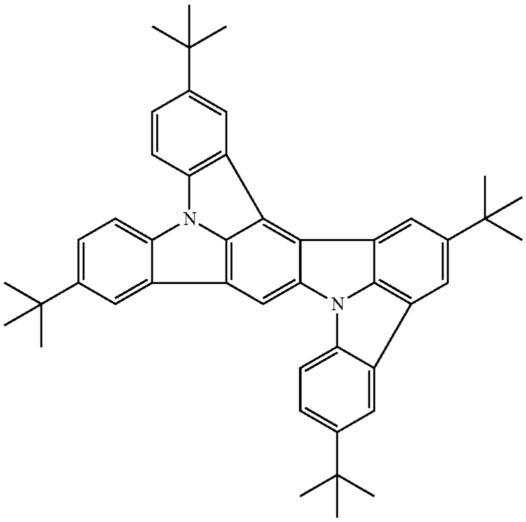
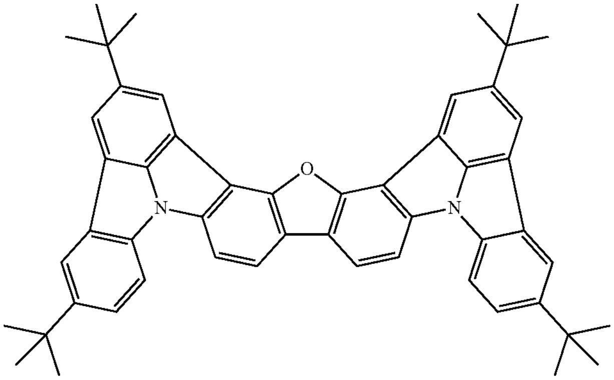

Compound Represented by Formula (5)

The compound represented by the formula (5) will be described below.

[Formula 147]

(5)

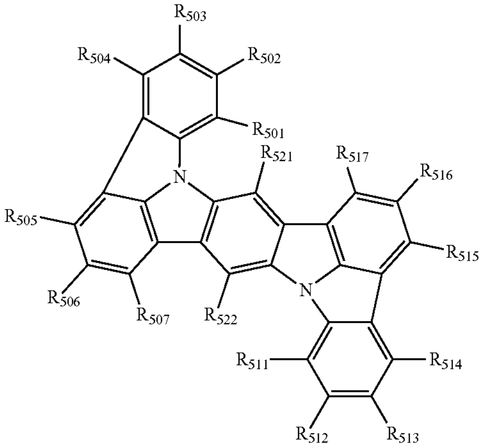

In the formula (5):

at least one combination of adjacent two or more of $R_{501}$ to $R_{507}$ and $R_{511}$ to $R_{517}$ are mutually bonded to form a substituted or unsubstituted monocyclic ring, mutually bonded to form a substituted or unsubstituted fused ring, or not mutually bonded; and $R_{501}$ to $R_{507}$ and $R_{511}$ to $R_{517}$ forming neither the substituted or unsubstituted monocyclic ring nor the substituted or unsubstituted fused ring, and $R_{521}$ and $R_{522}$ are each independently a hydrogen atom, a substituted or unsubstituted alkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a group represented by —N($R_{906}$)($R_{907}$), a halogen atom, a cyano group, a nitro group, a substituted or unsubstituted aryl group having 6 to 50 ring carbon atoms, or a substituted or unsubstituted heterocyclic group having 5 to 50 ring atoms.

Specific Examples of Compound Represented by Formula (5)

Specific examples of the compound represented by the formula (5) include compounds shown below.

[Formula 148]

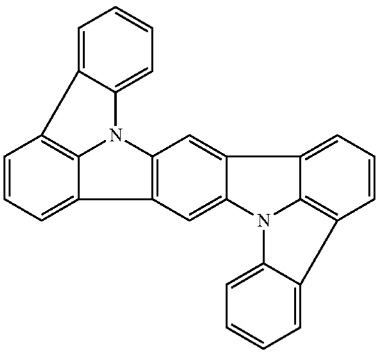

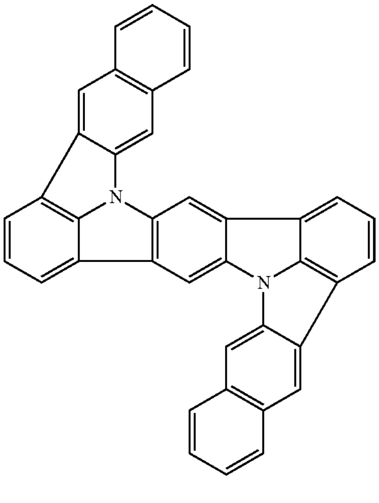

-continued
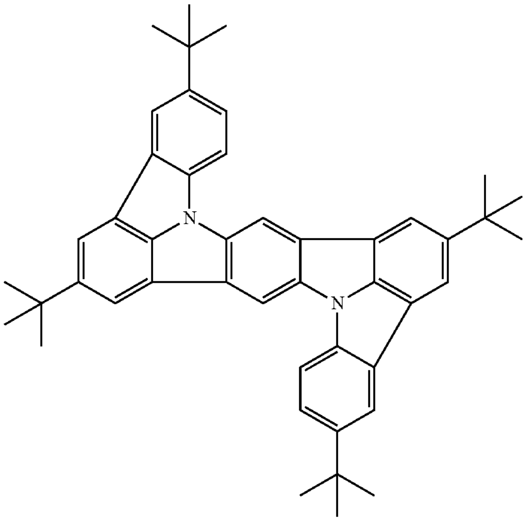
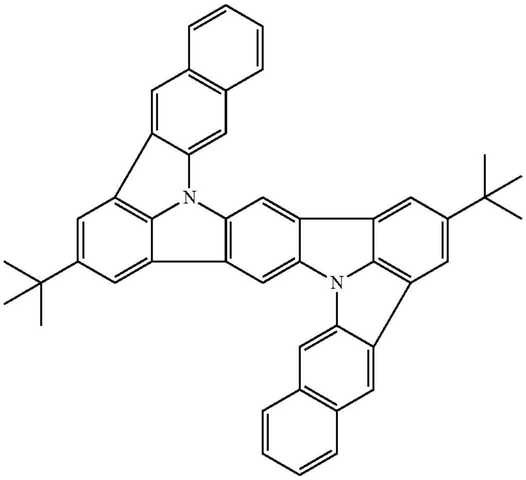
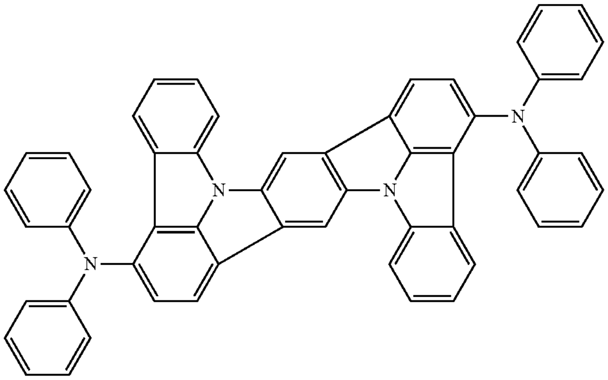
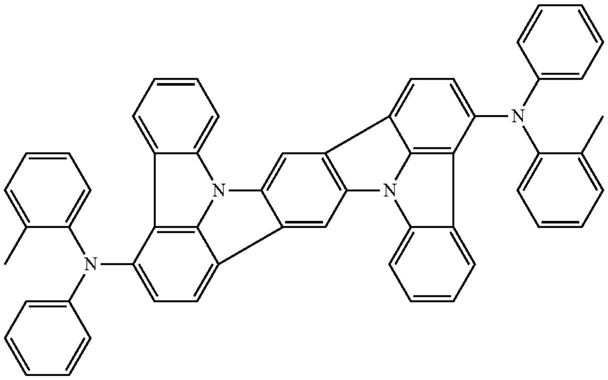
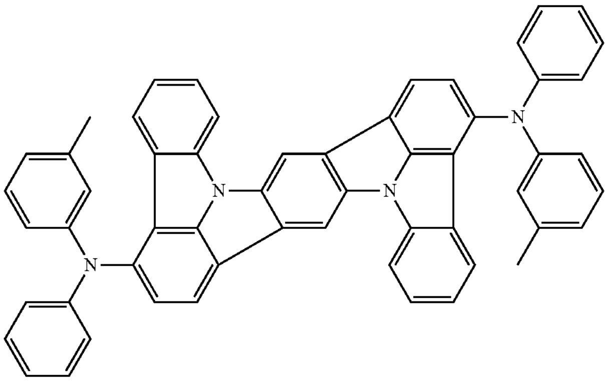

-continued
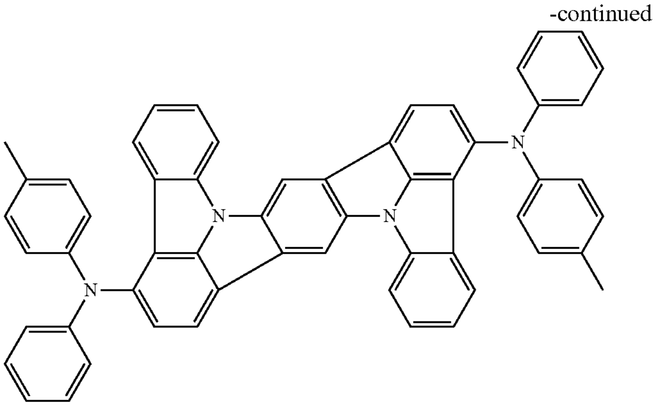
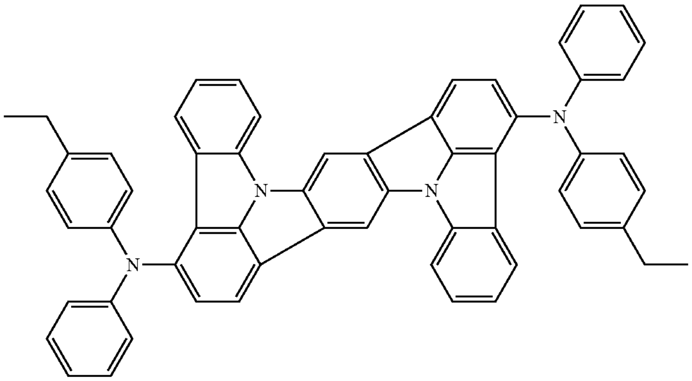
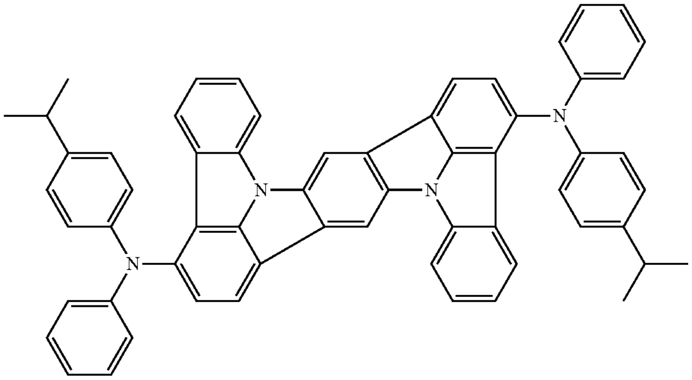
[Formula 149]
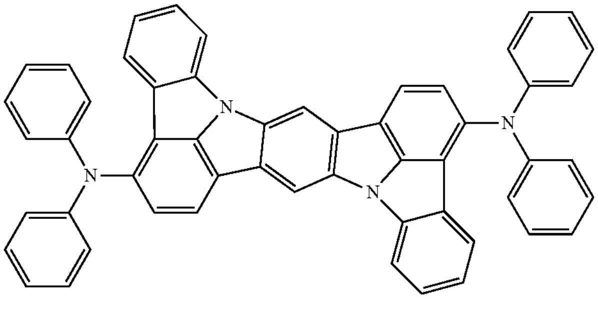

-continued
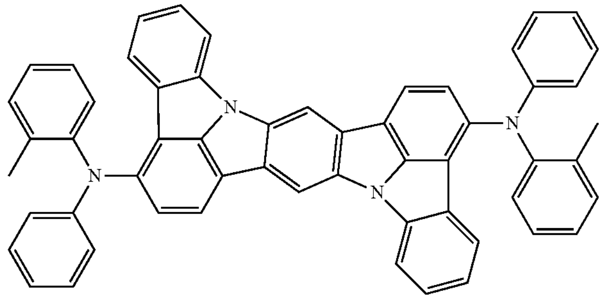
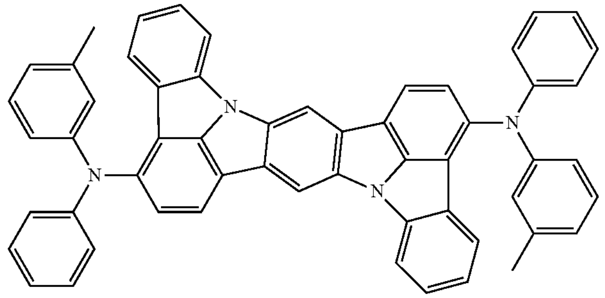
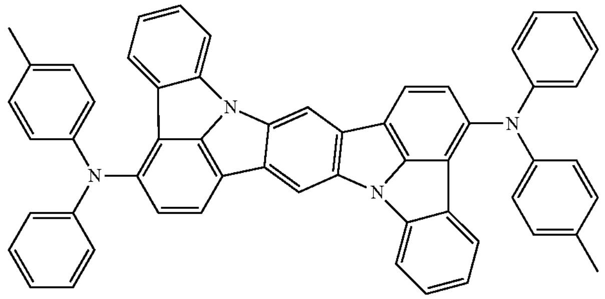
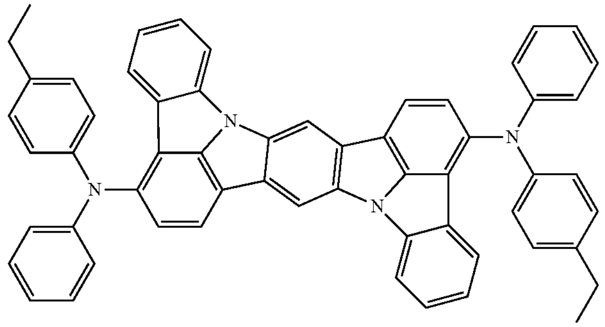
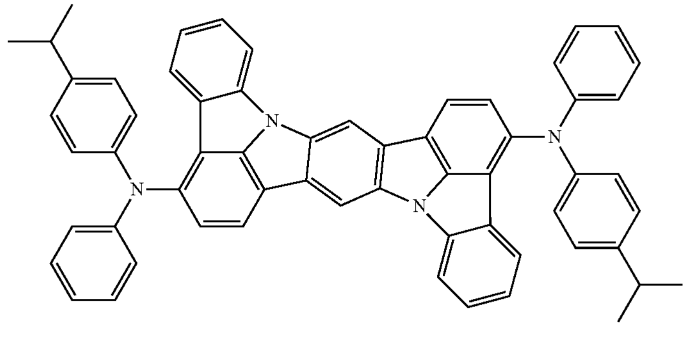

-continued
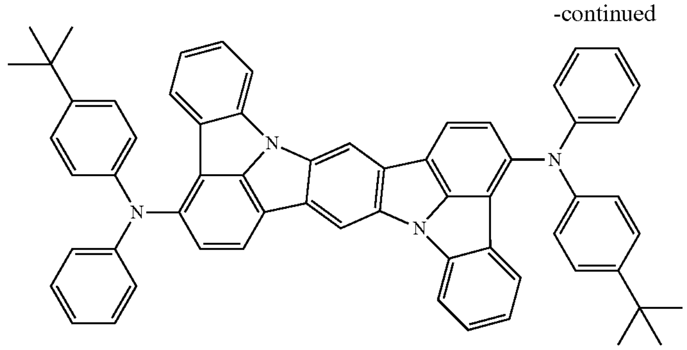
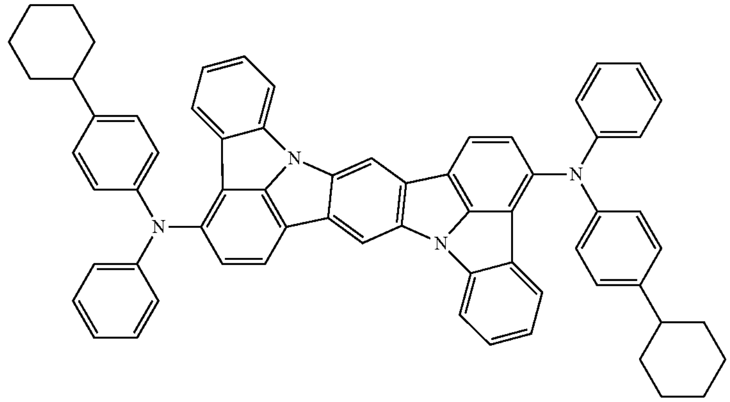
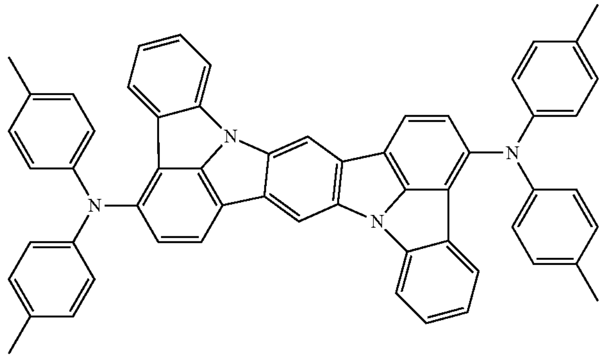
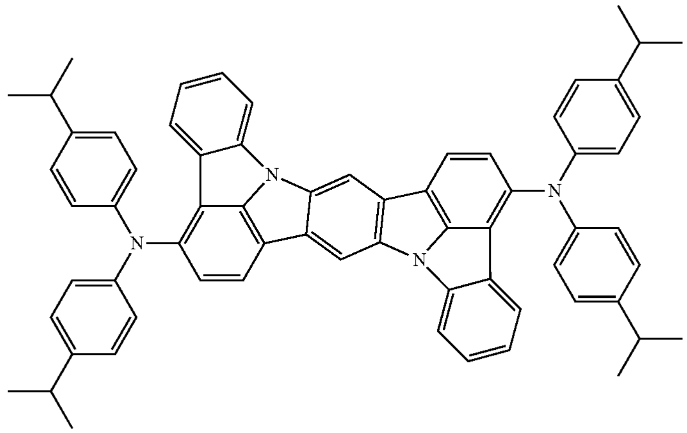

-continued
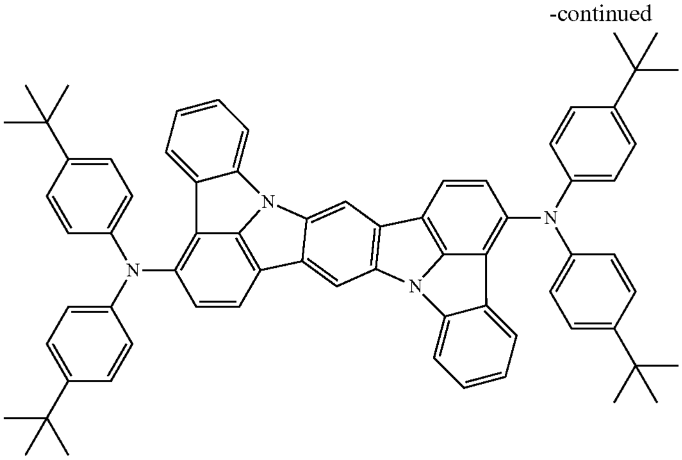
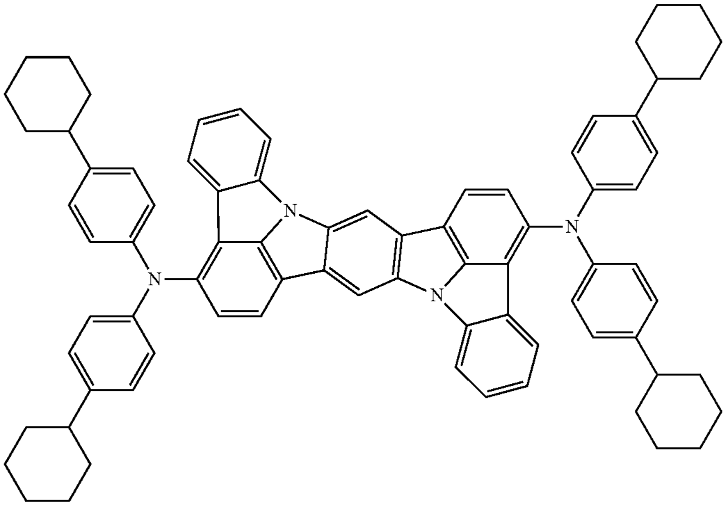
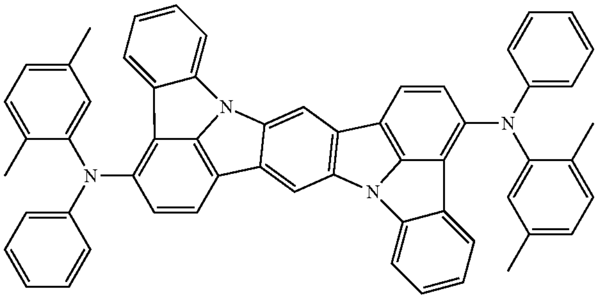
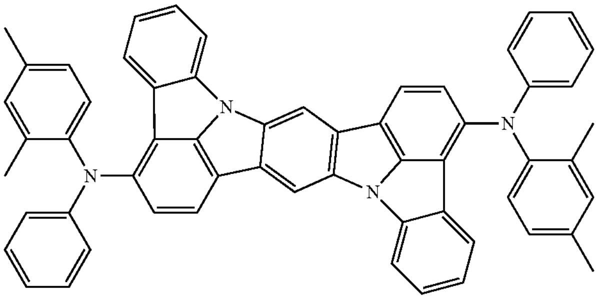

-continued
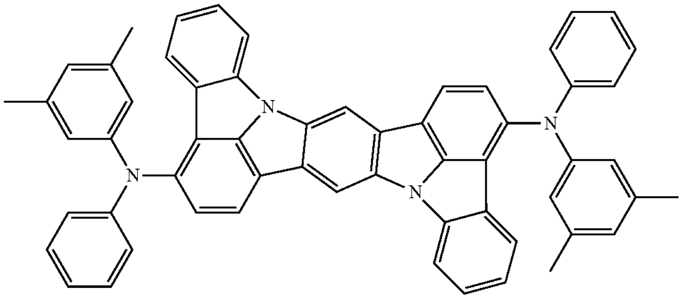
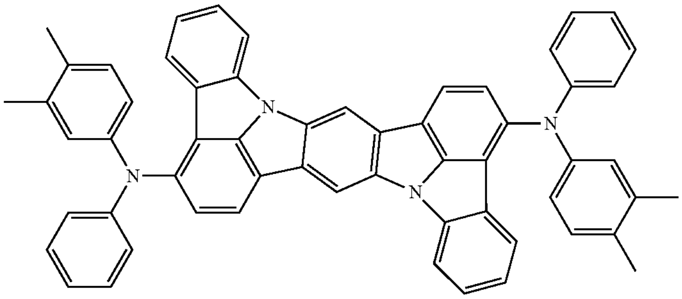
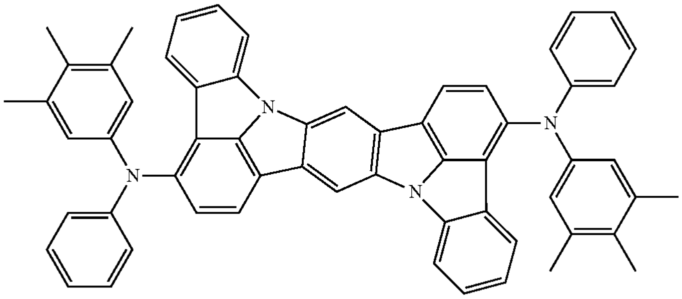
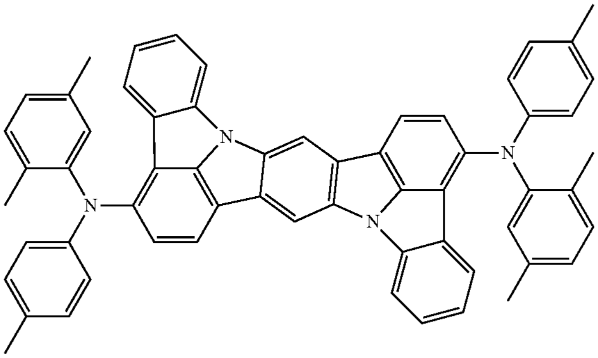
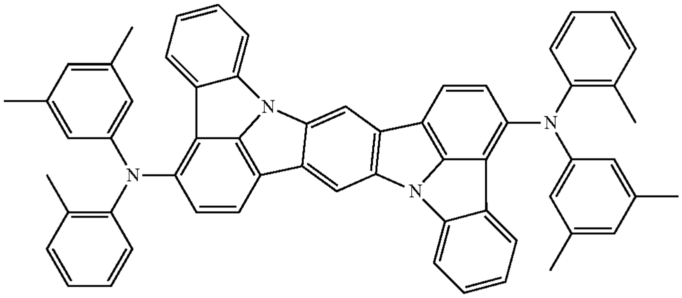

-continued
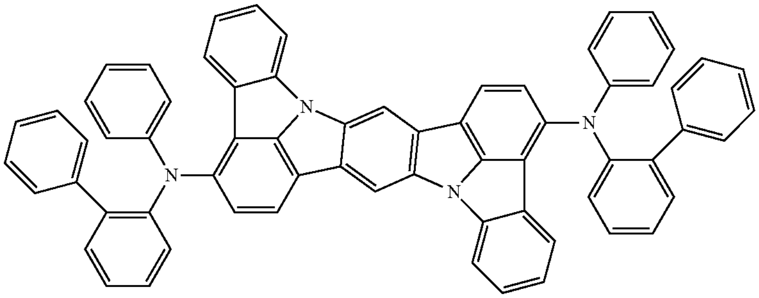
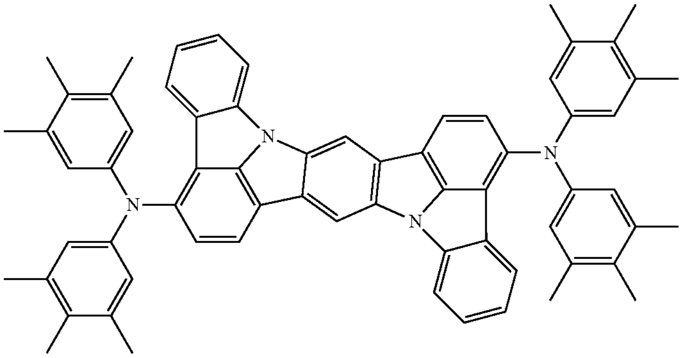
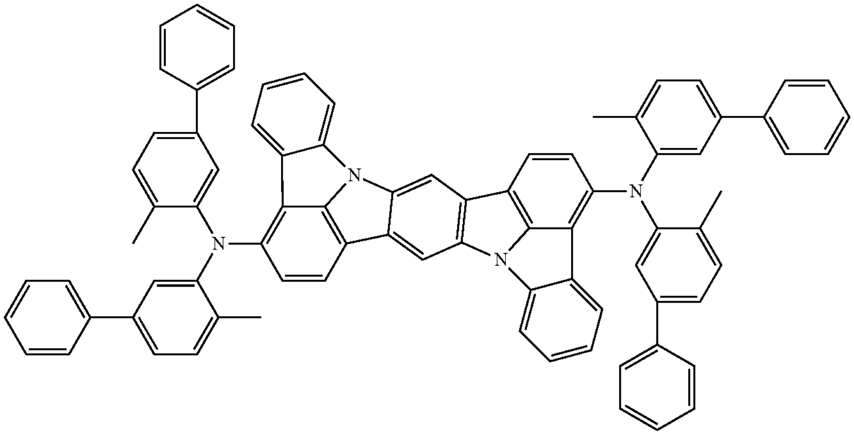
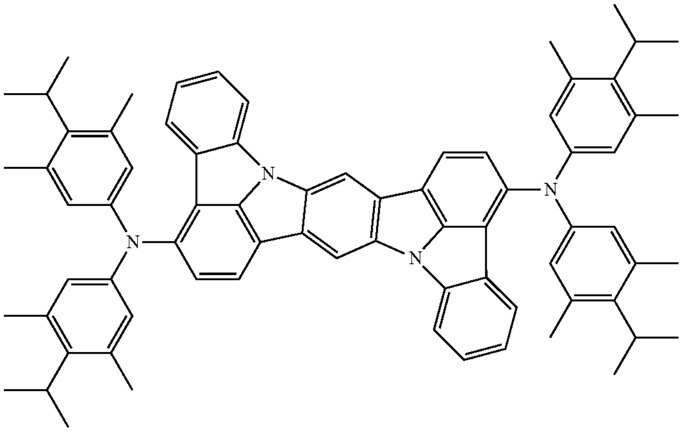

-continued
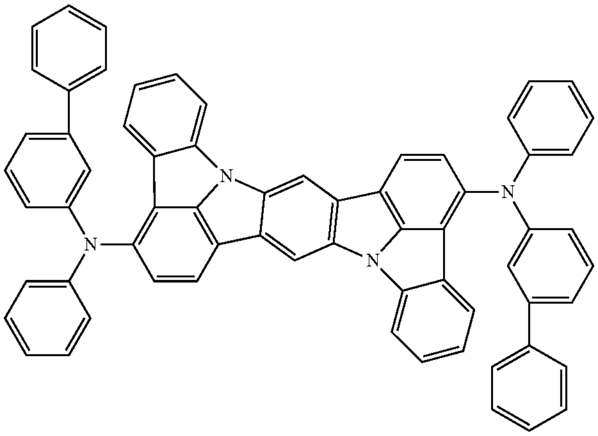
[Formula 150]
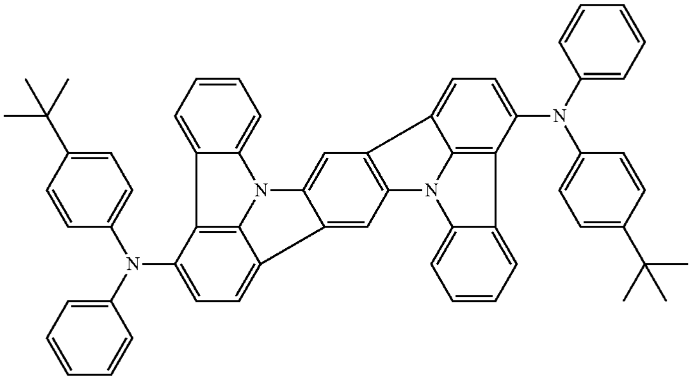
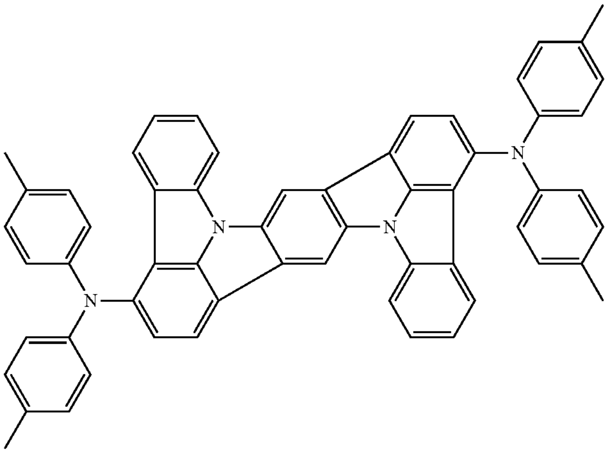
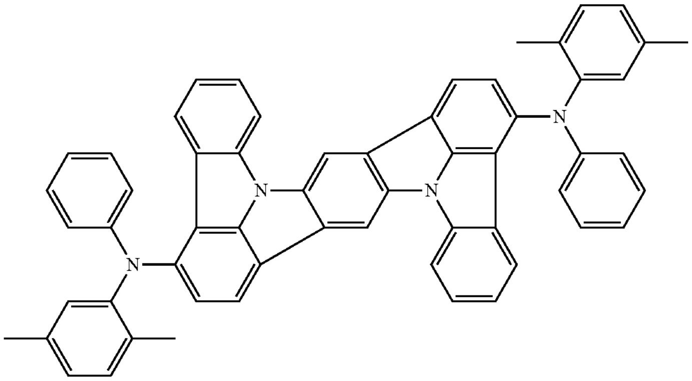

-continued
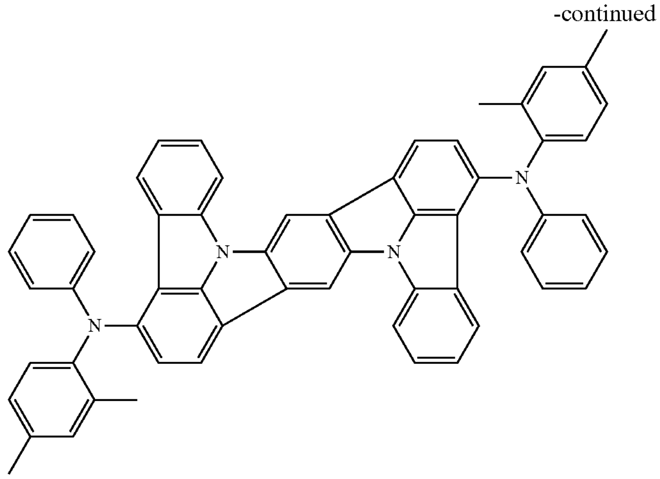
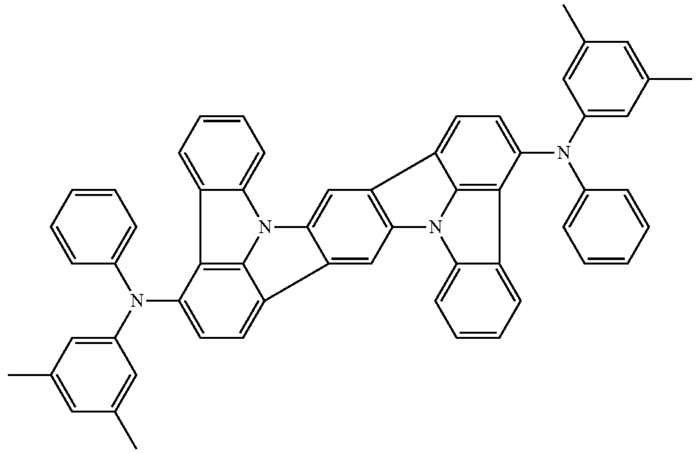
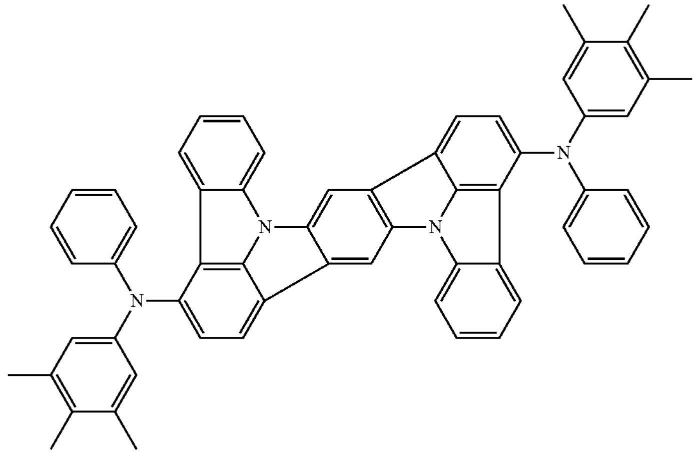

-continued
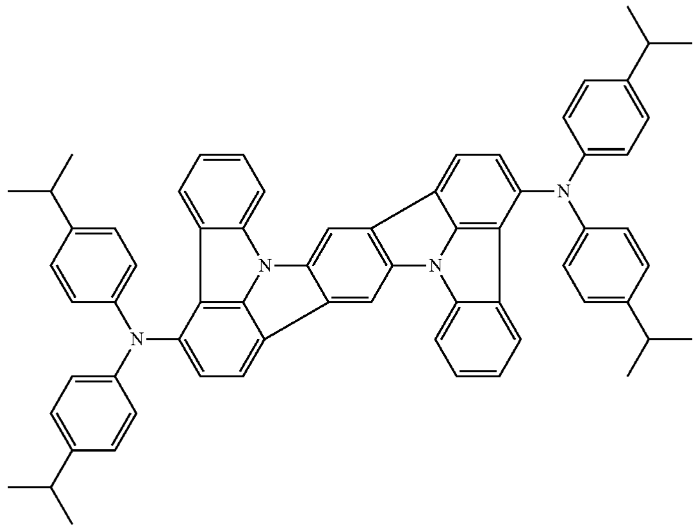
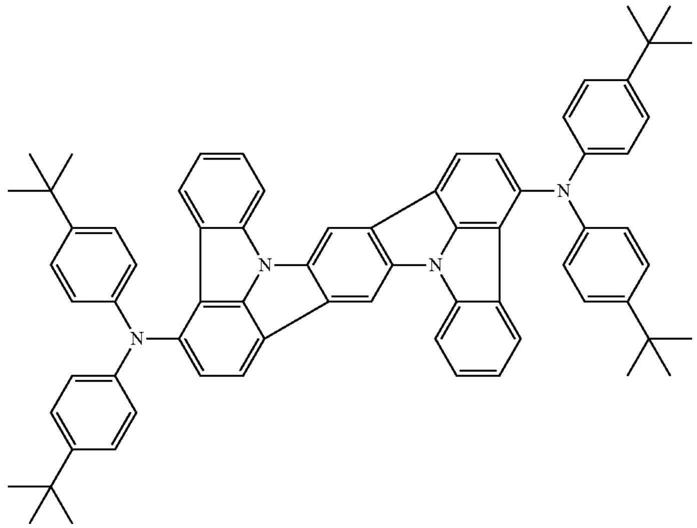
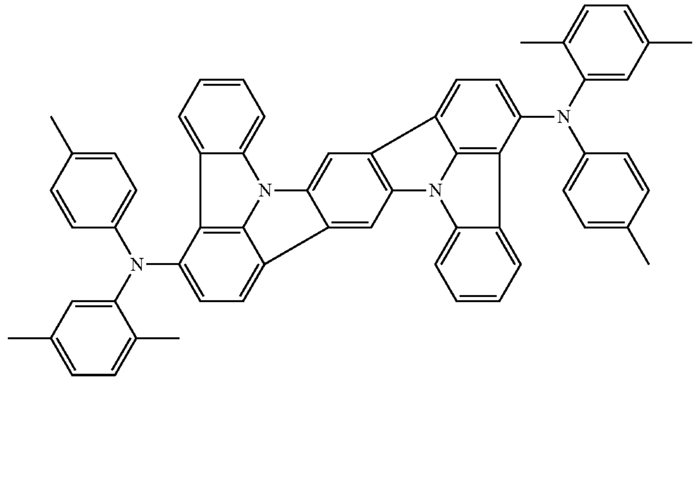

-continued
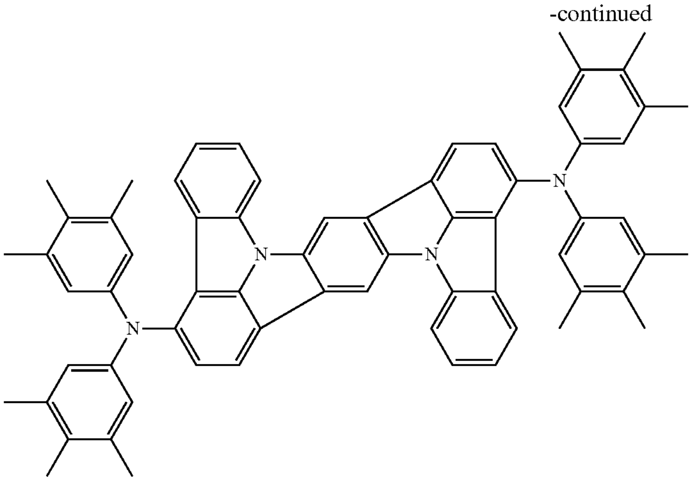
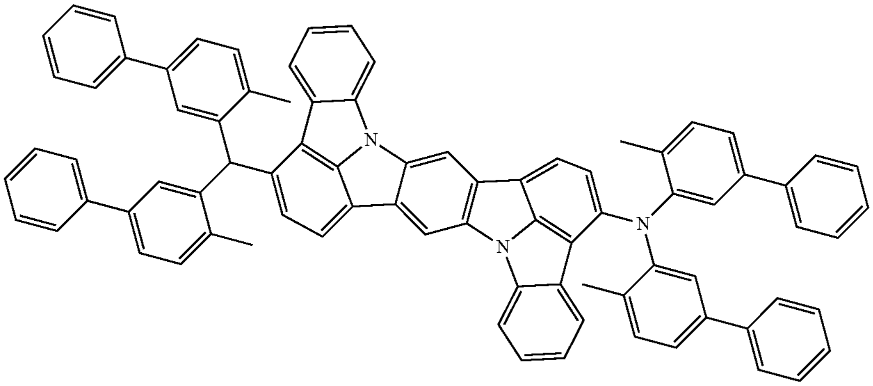
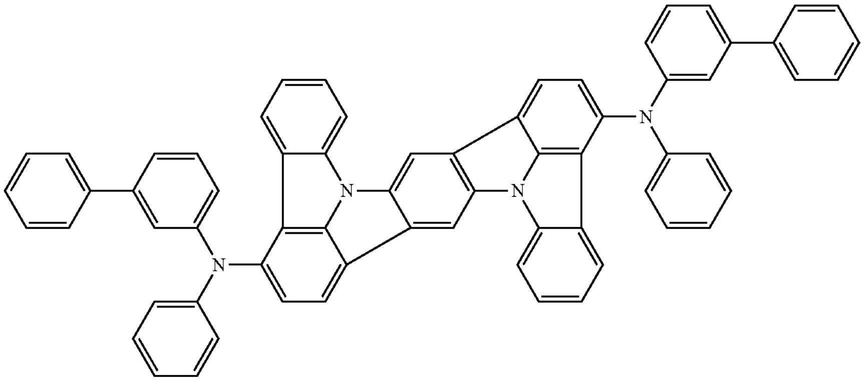
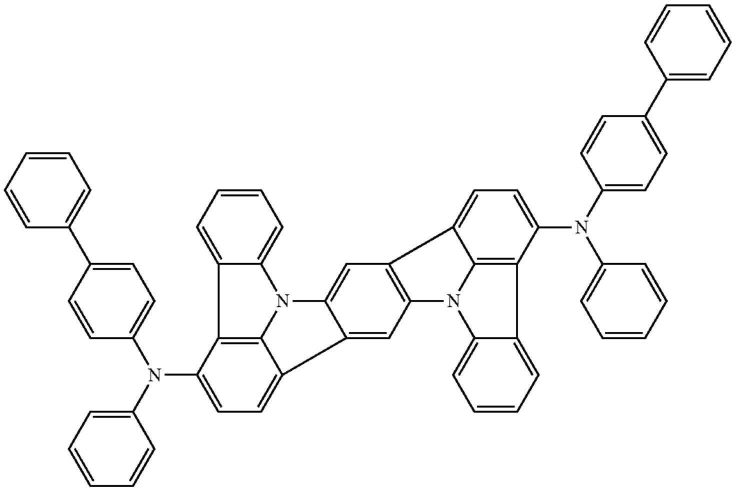

-continued
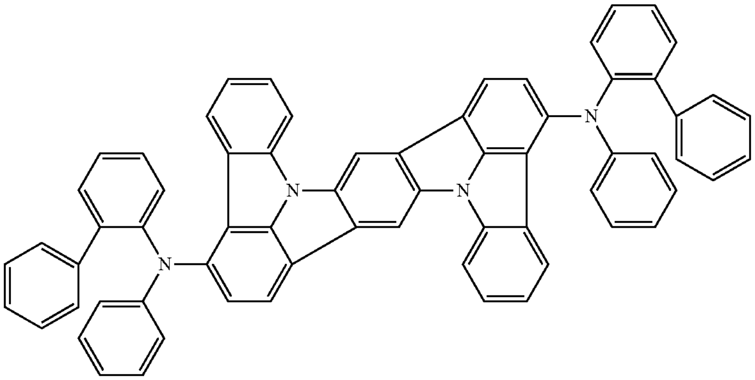
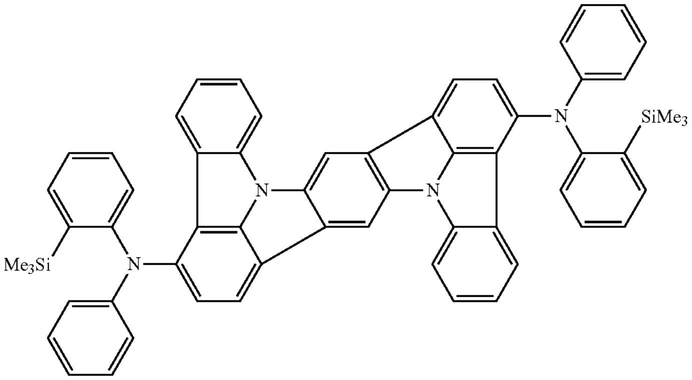
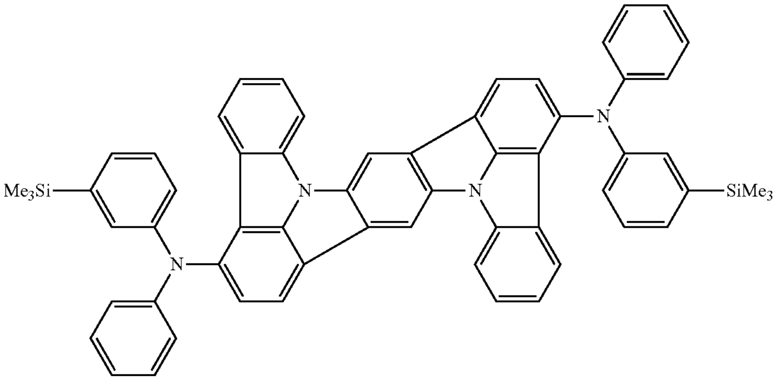
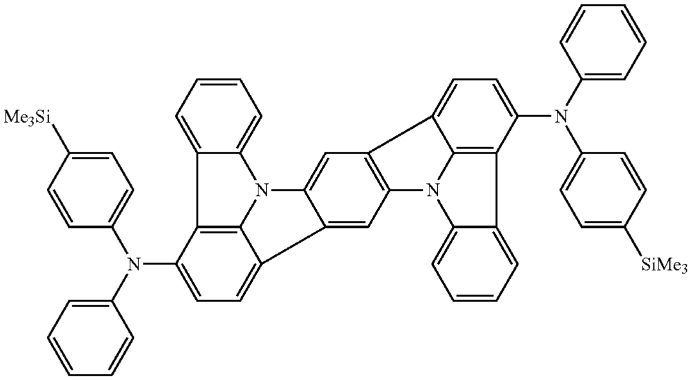

-continued
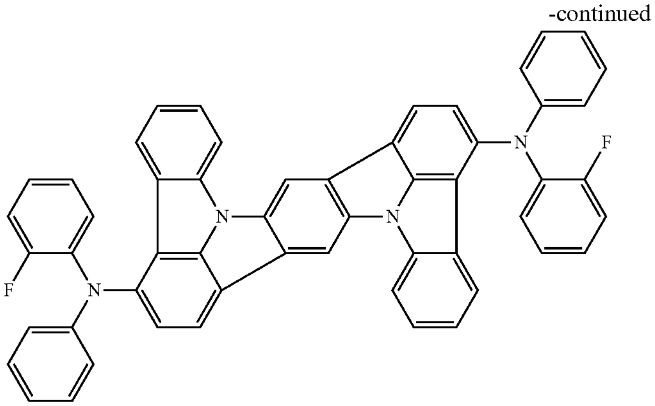
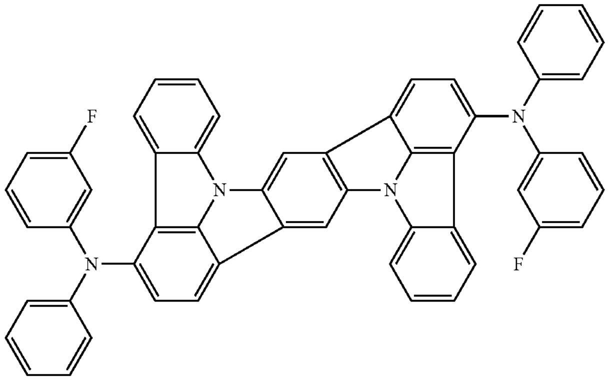
[Formula 151]
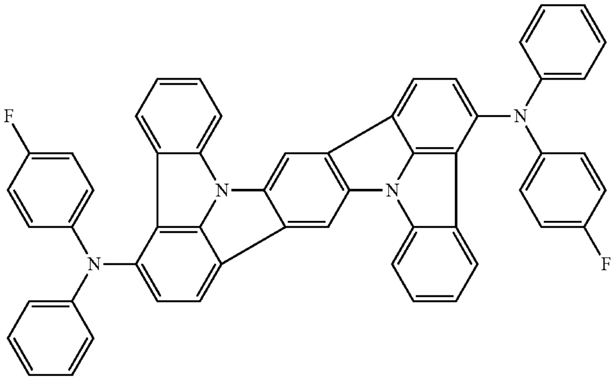
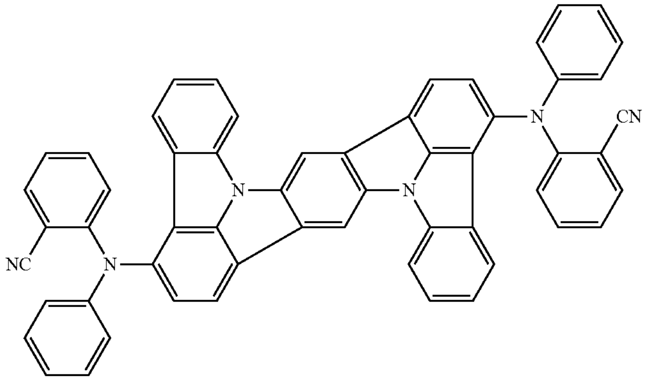

-continued
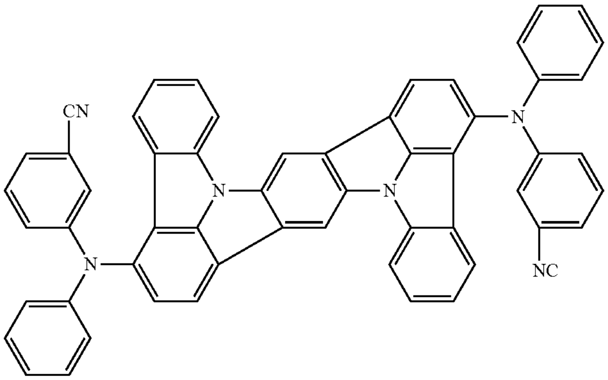
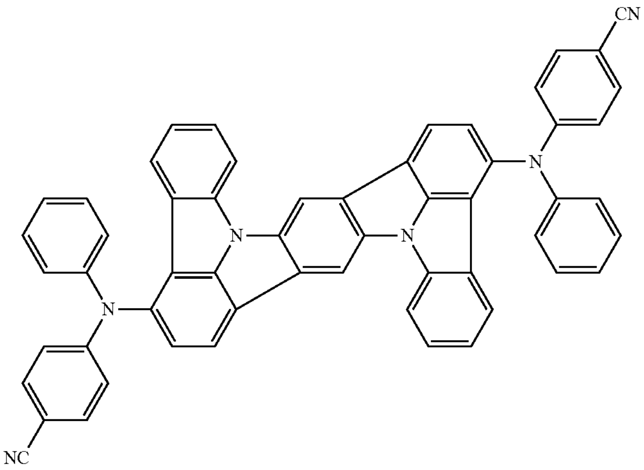
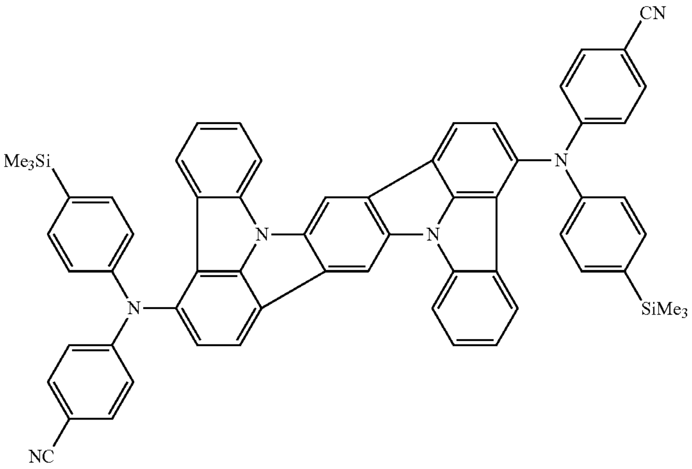

-continued
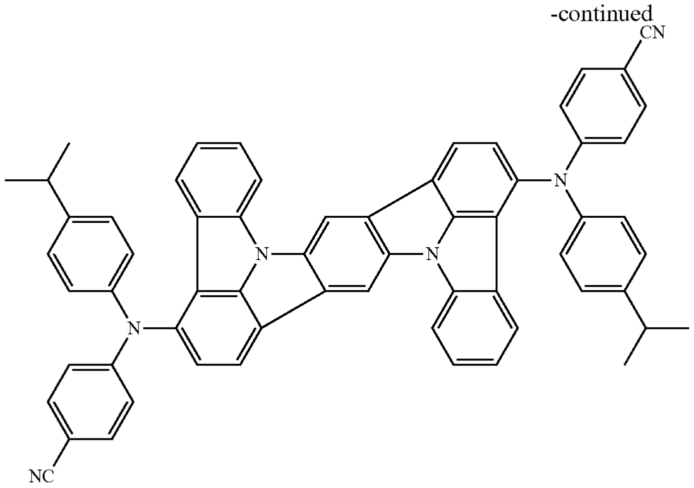
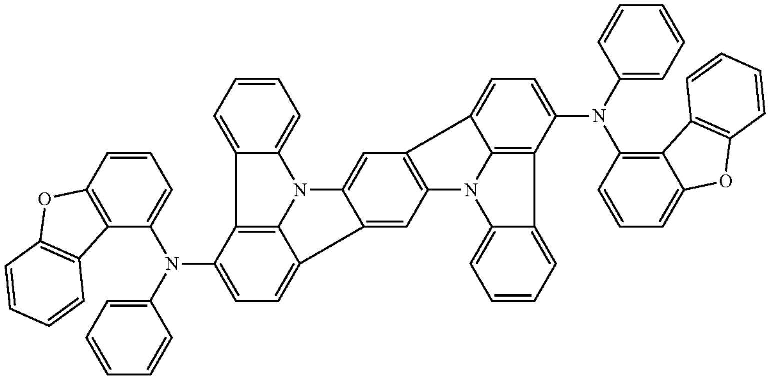
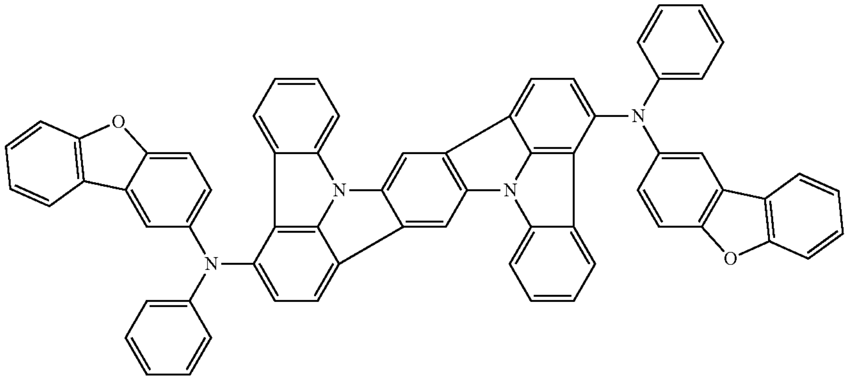
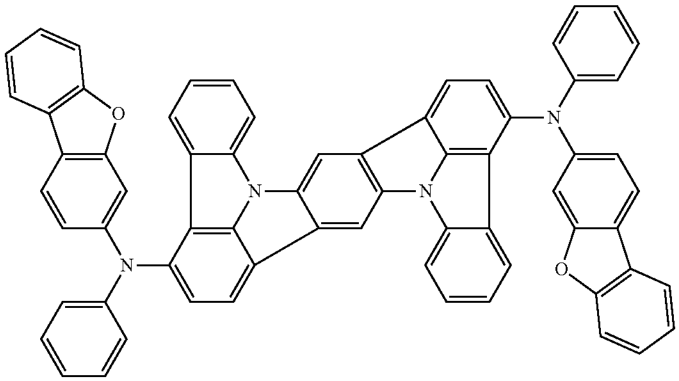

-continued
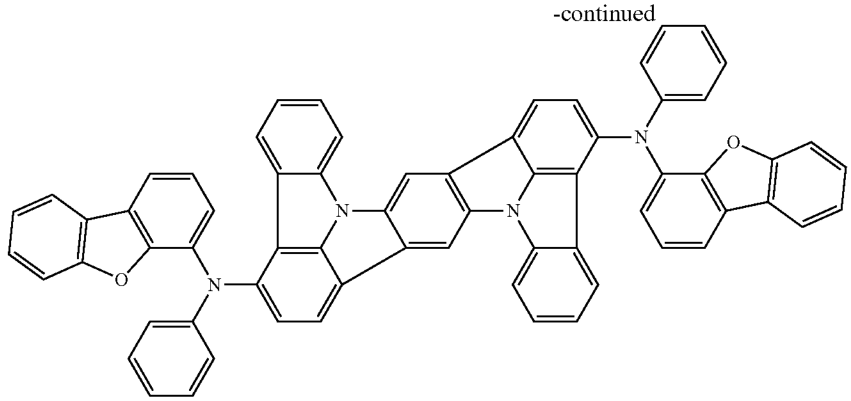
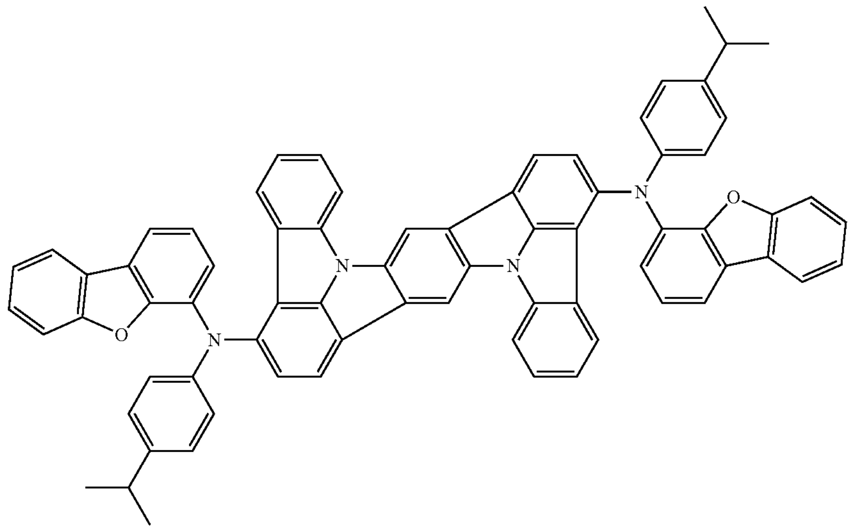
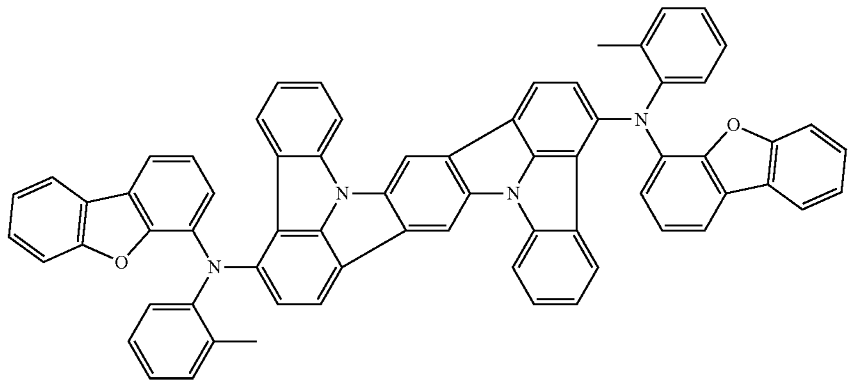

-continued
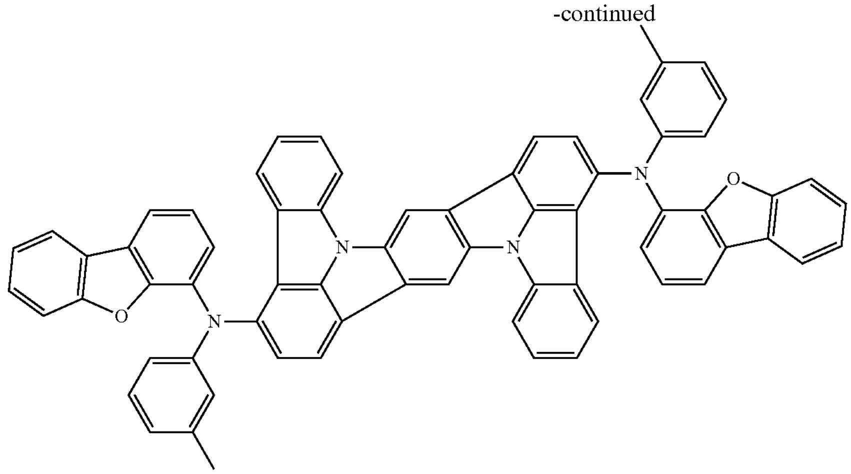
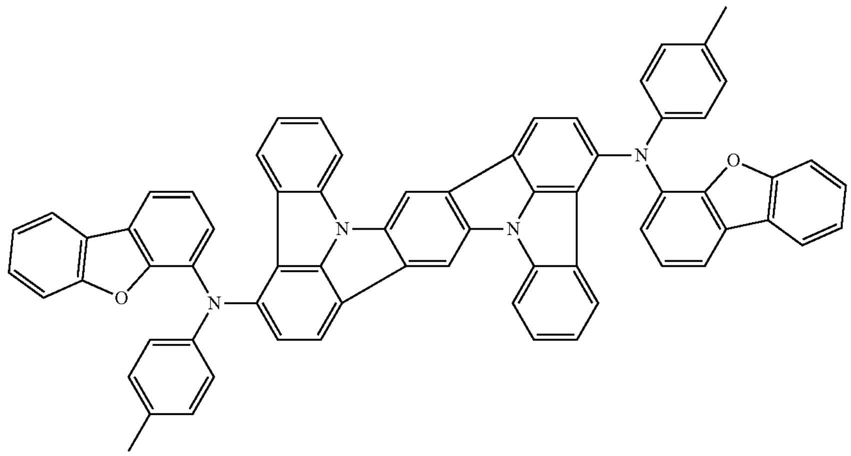
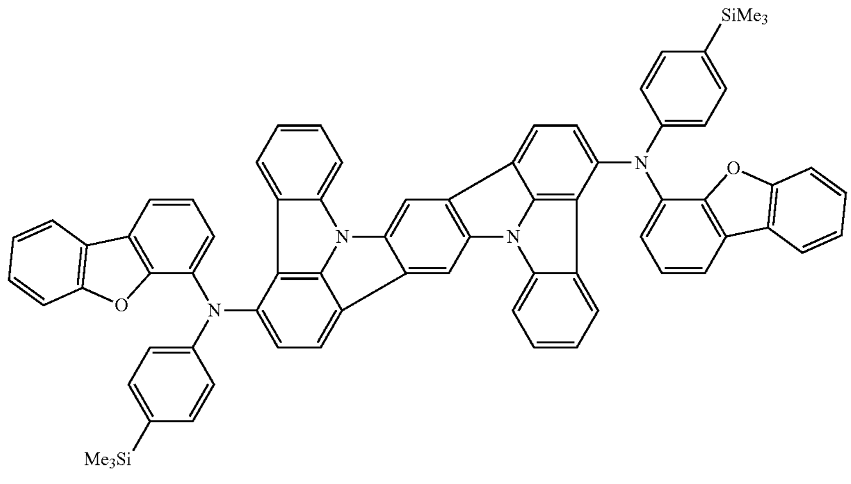

-continued
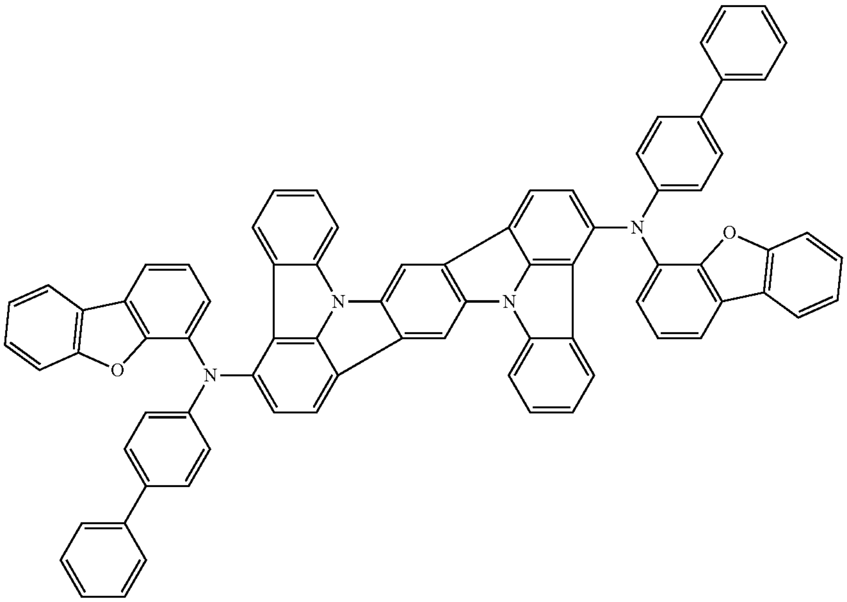
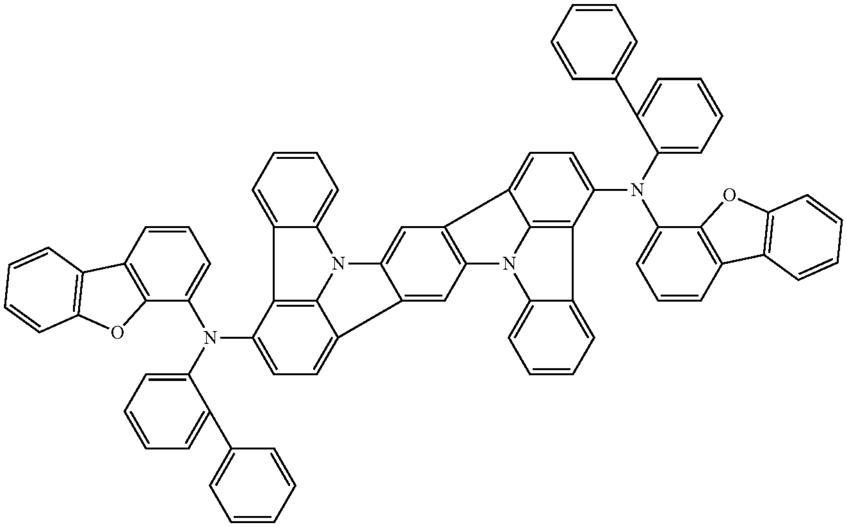
[Formula 152]
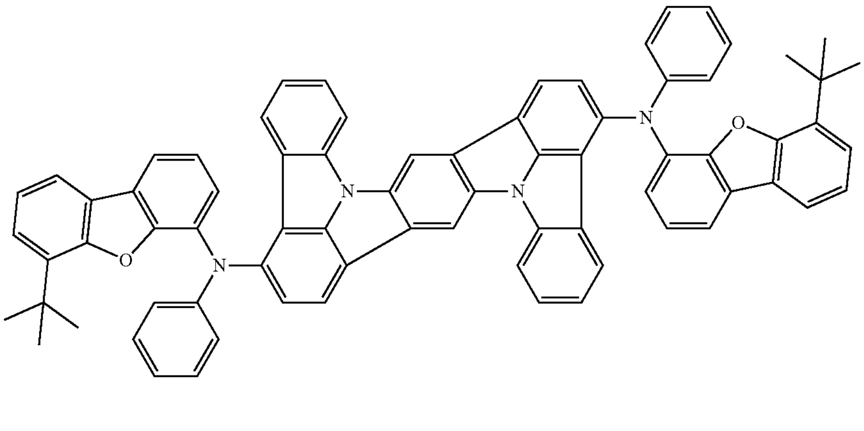

-continued
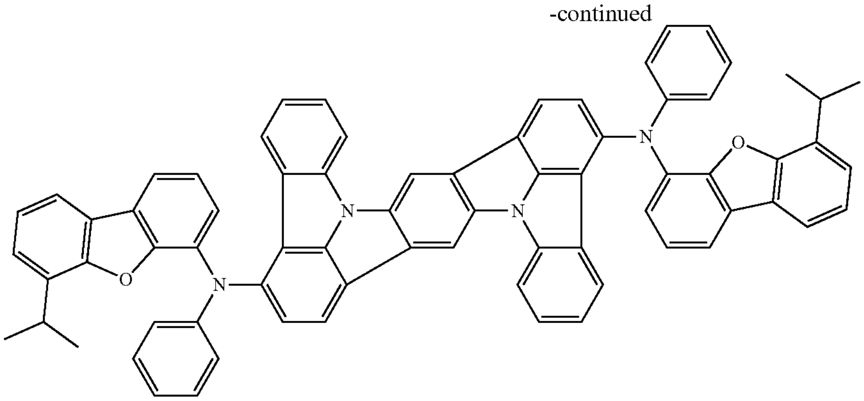
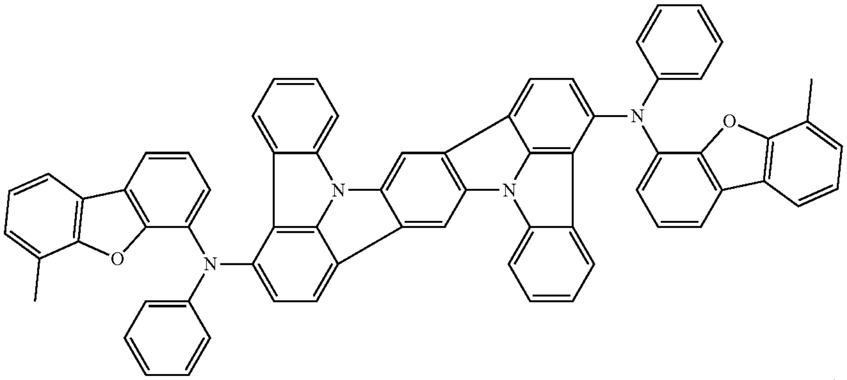
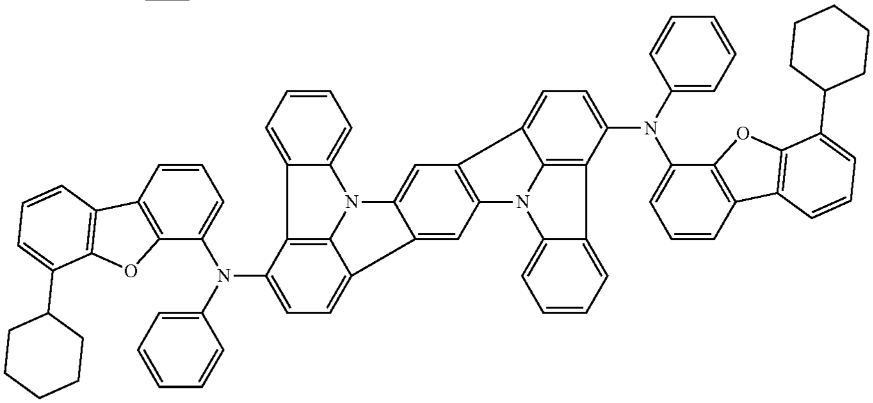
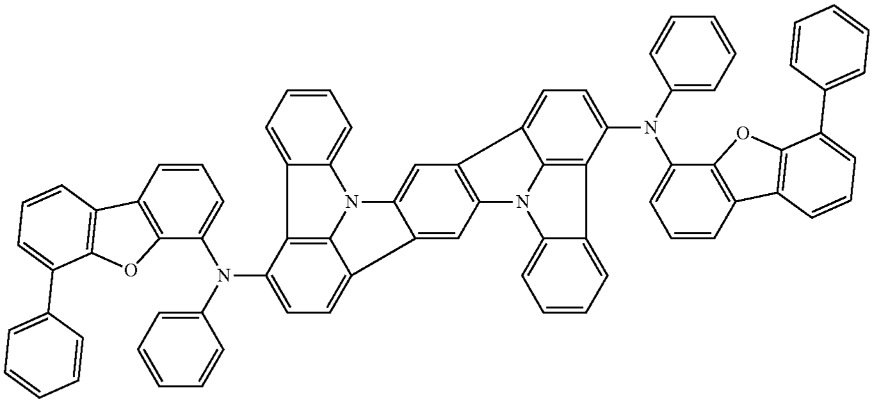

-continued
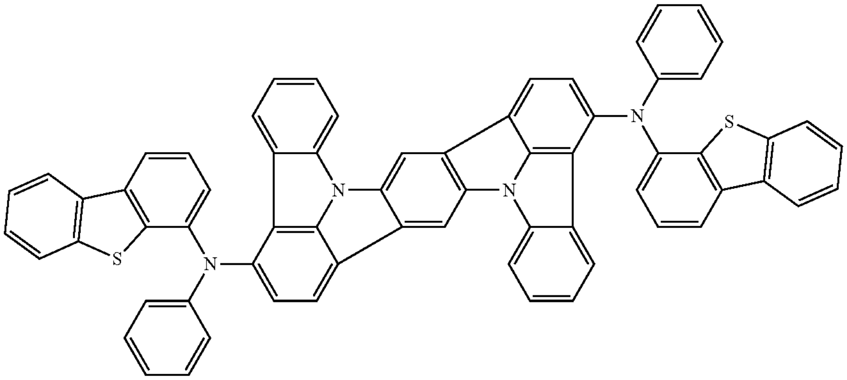
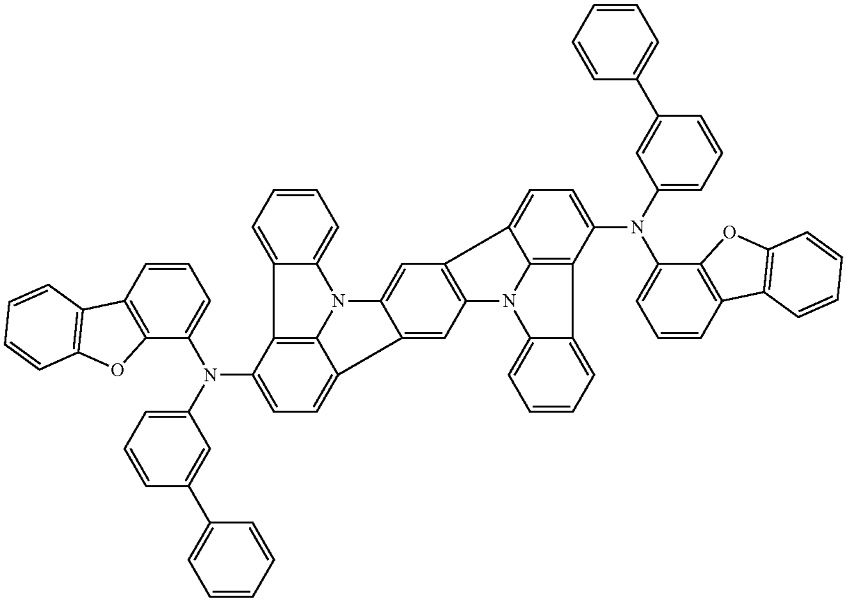
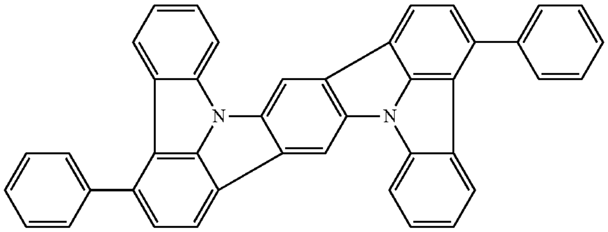
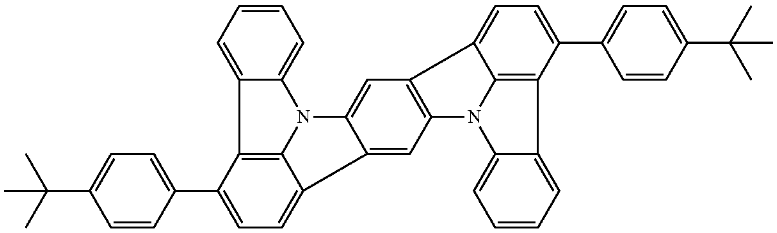
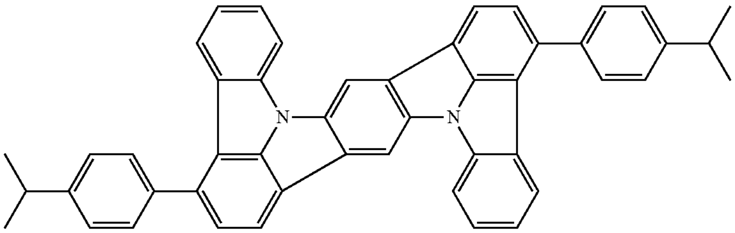

-continued
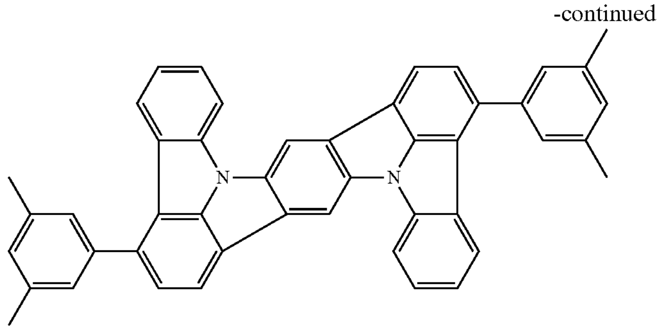
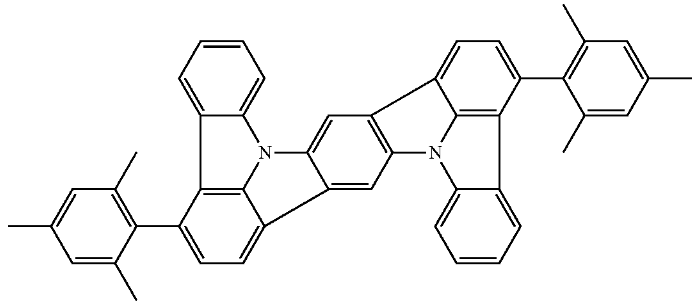
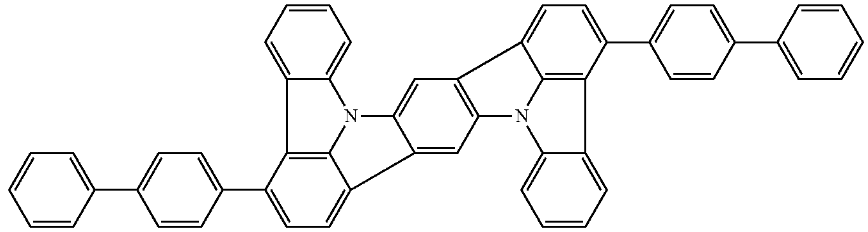
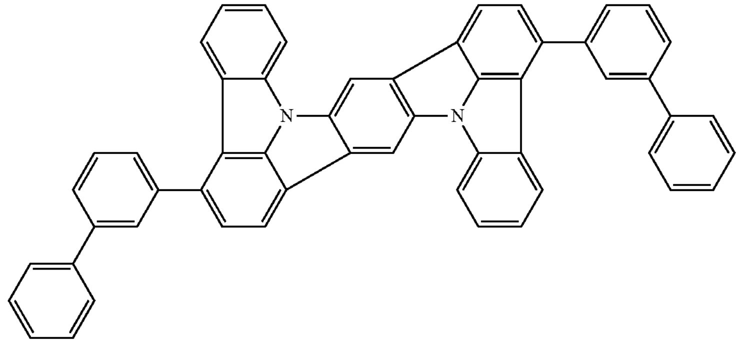
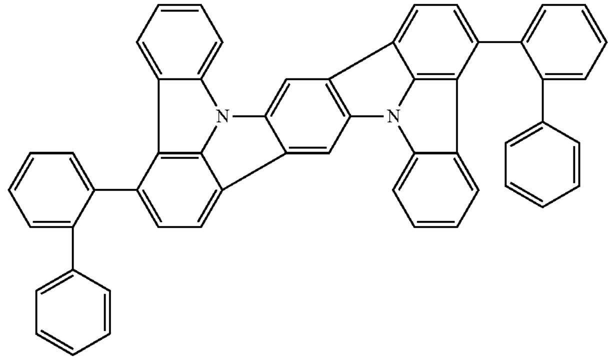

-continued
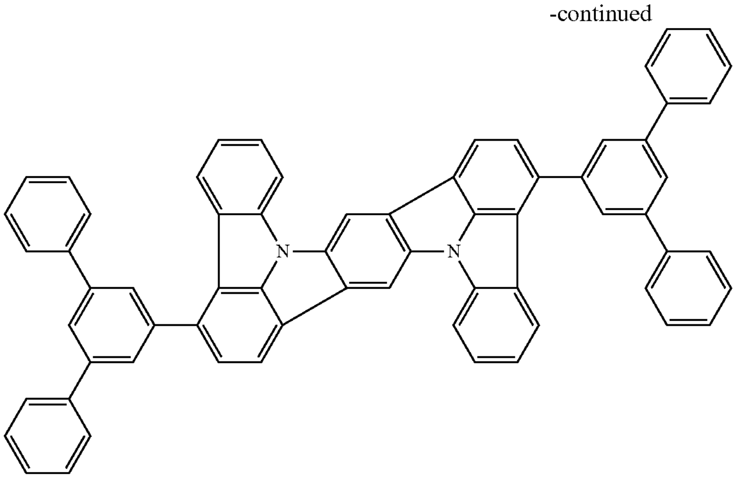
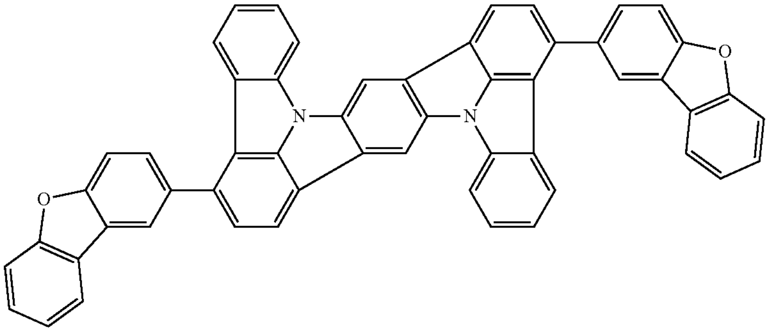
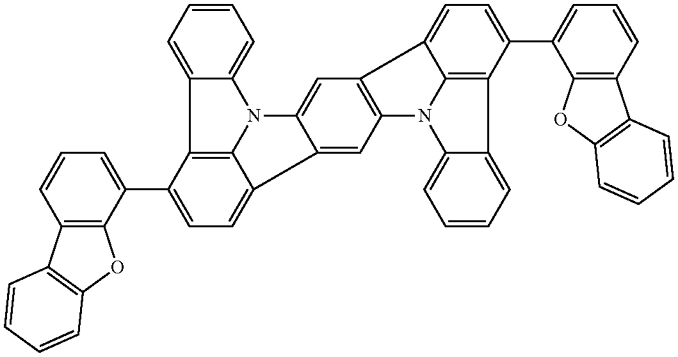
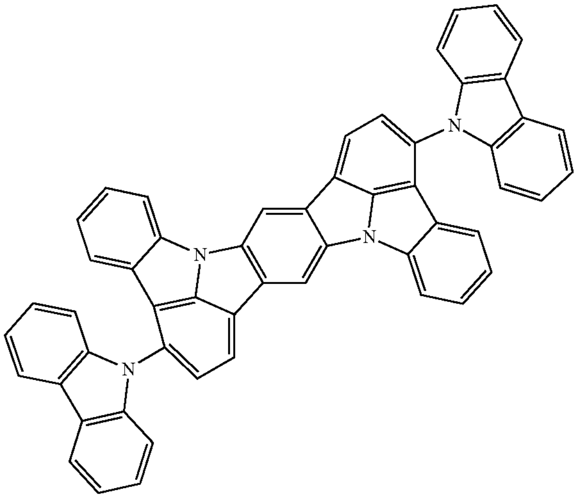

-continued
[Formula 153]
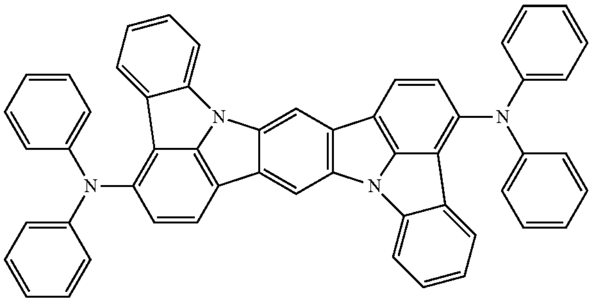
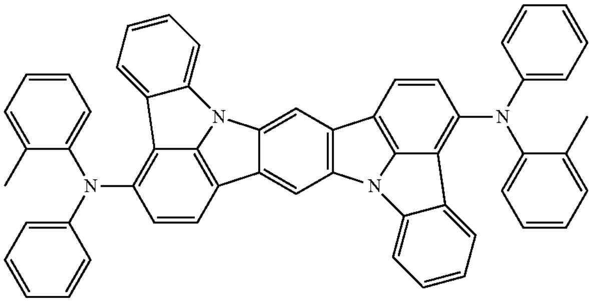
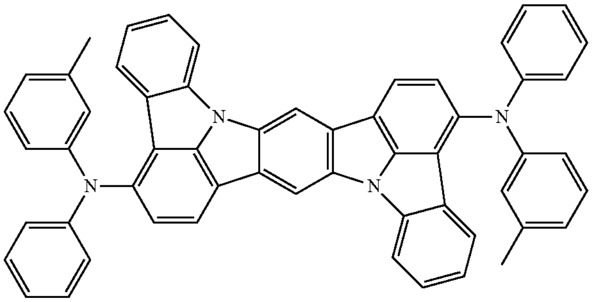
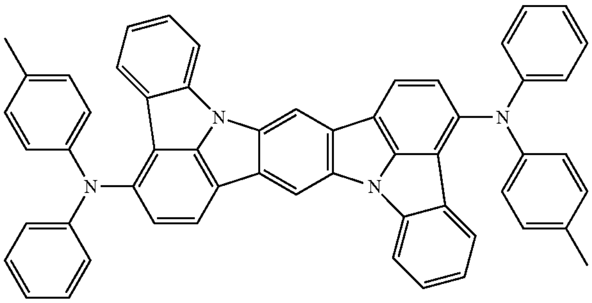
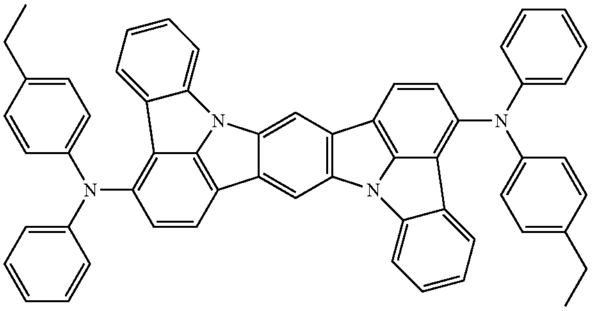
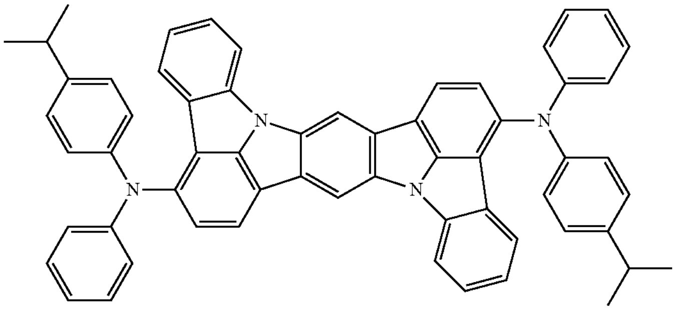
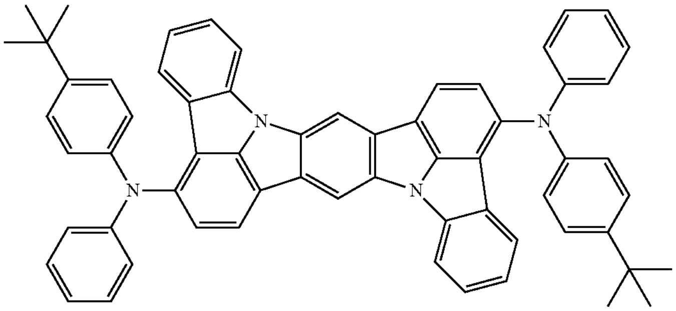

-continued
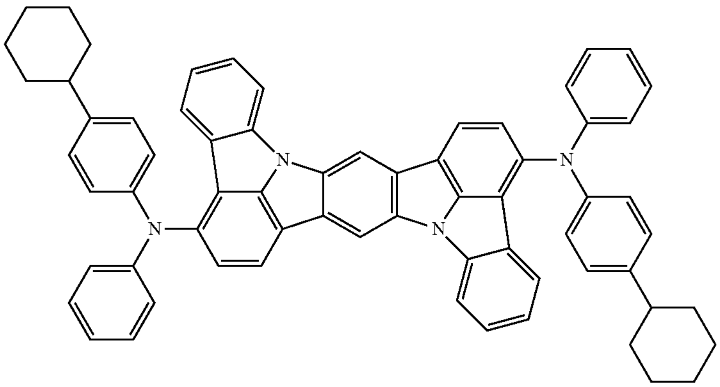
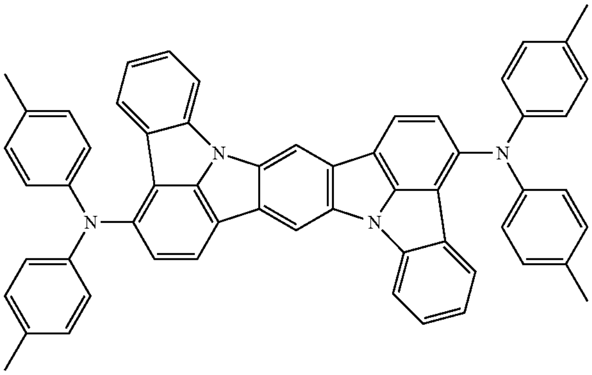
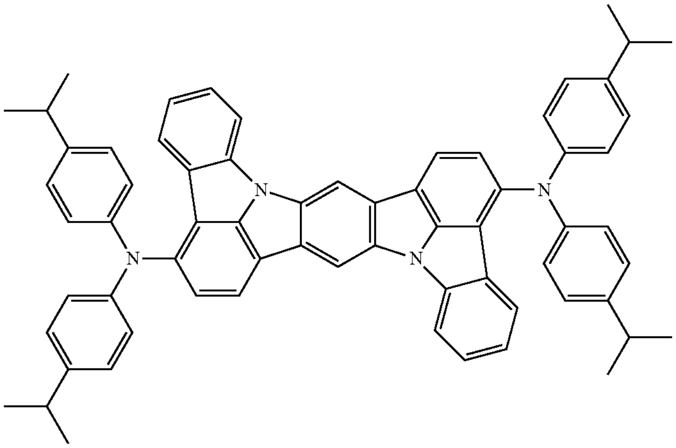
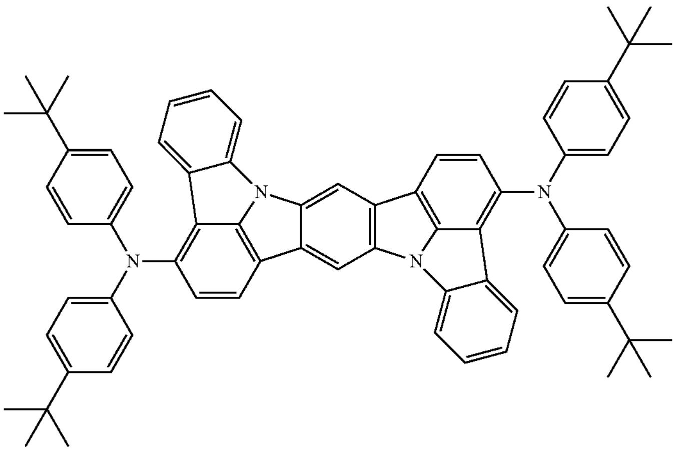

-continued
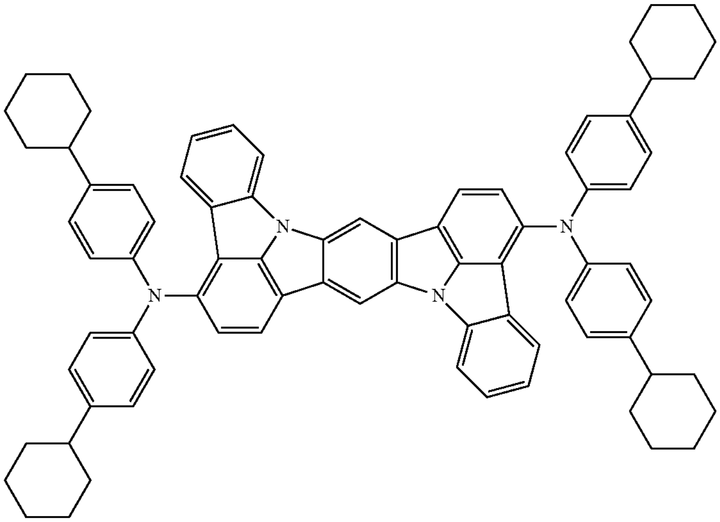
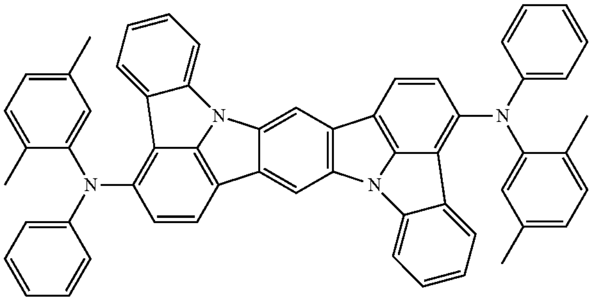
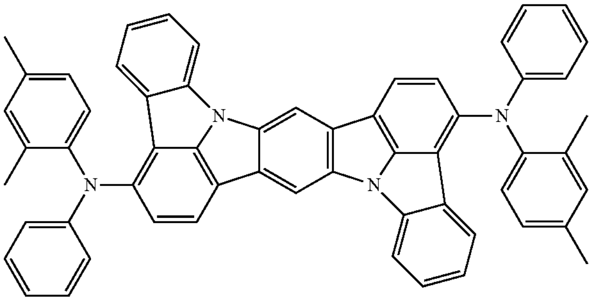
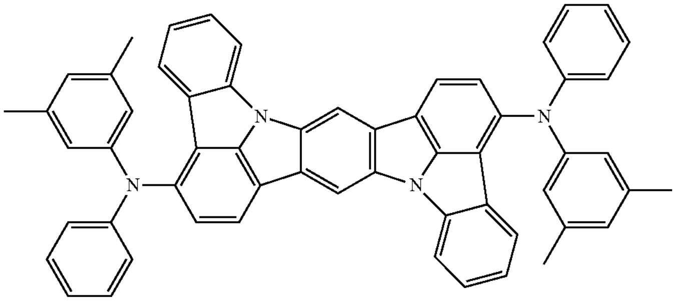
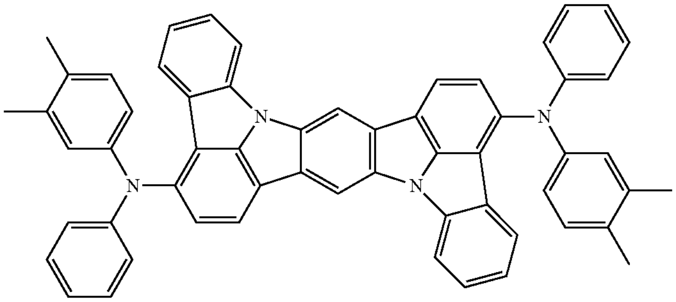
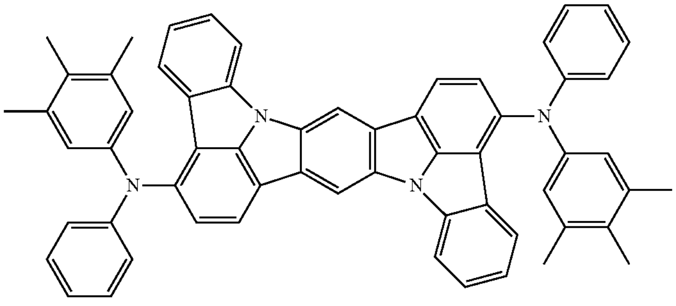

-continued
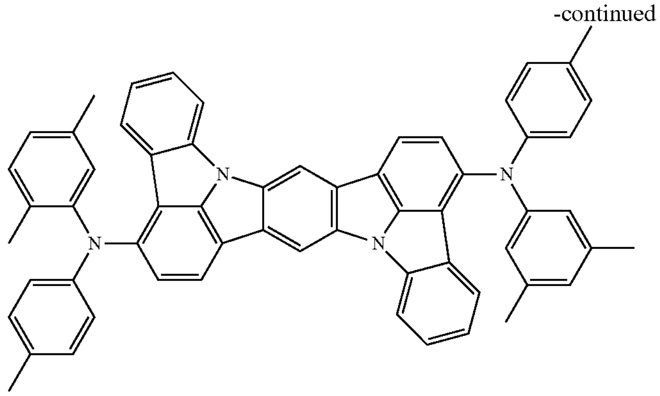
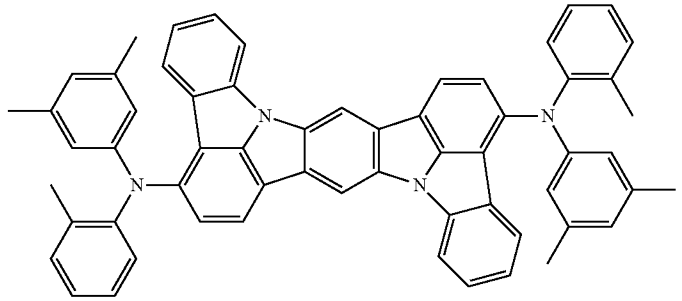
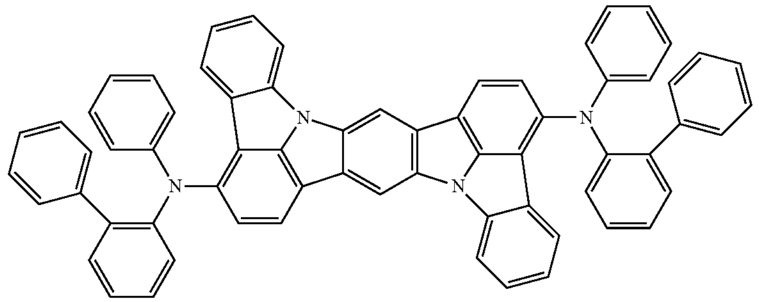
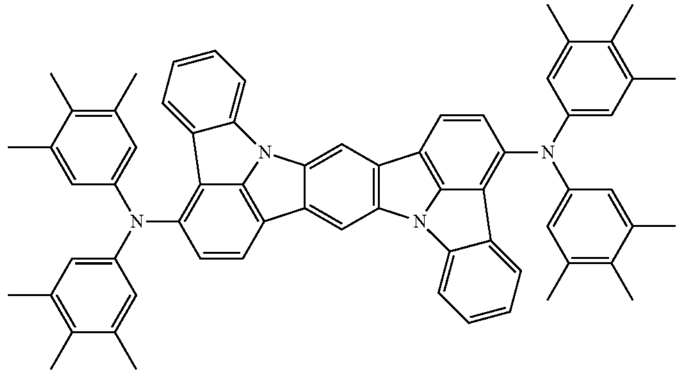

-continued
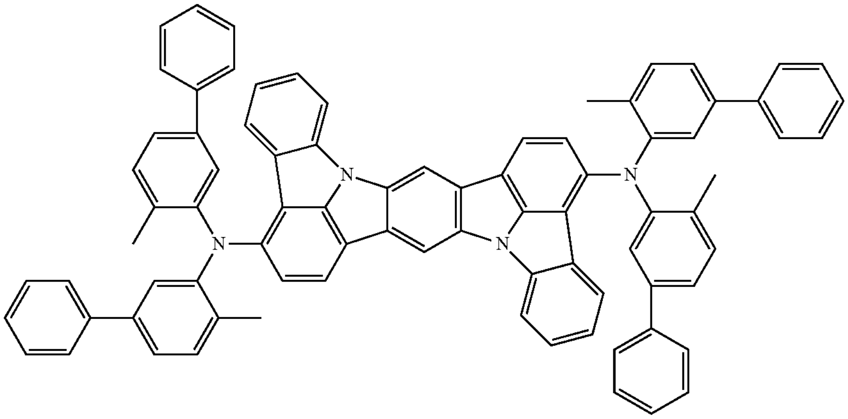
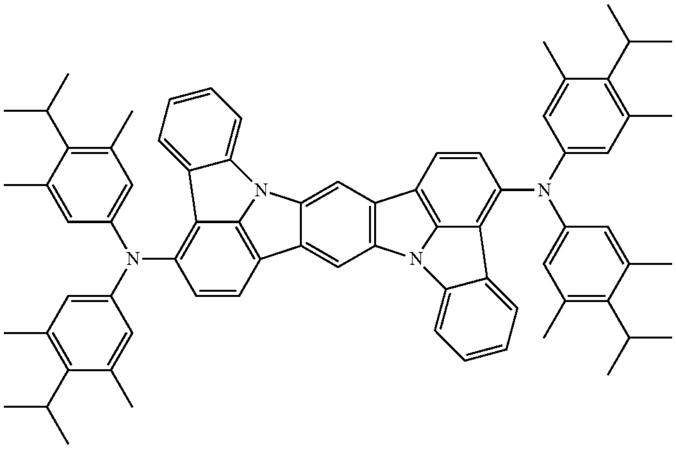
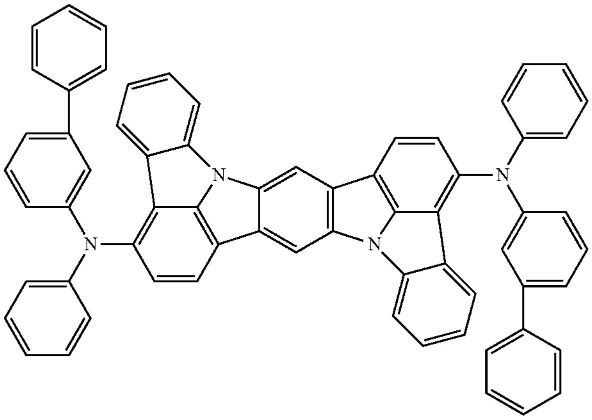
[Formula 154]
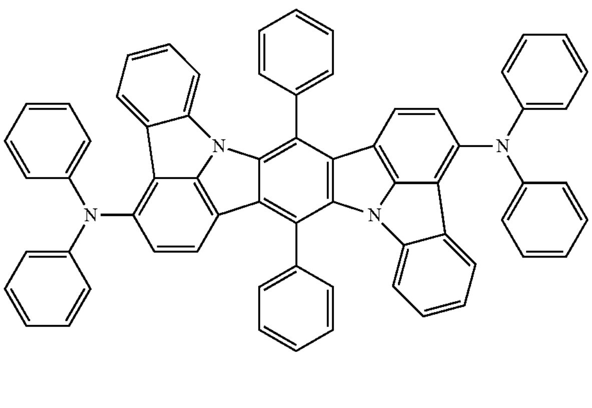
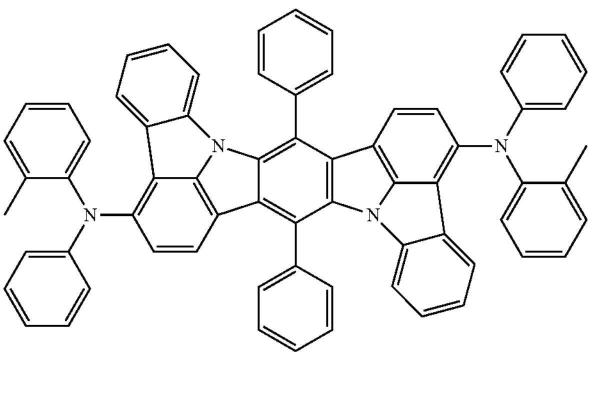

-continued
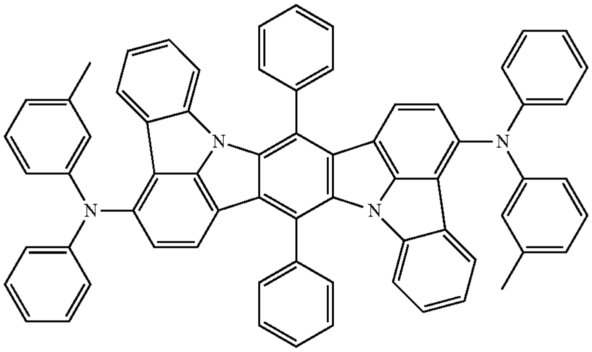
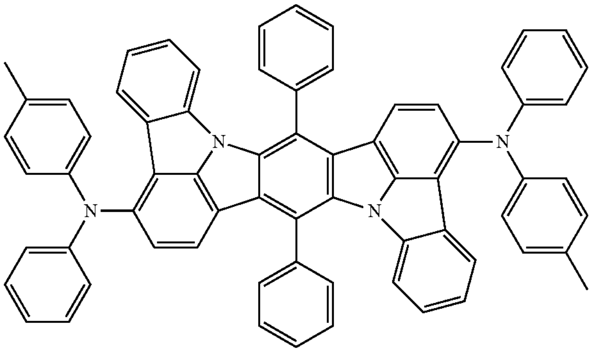
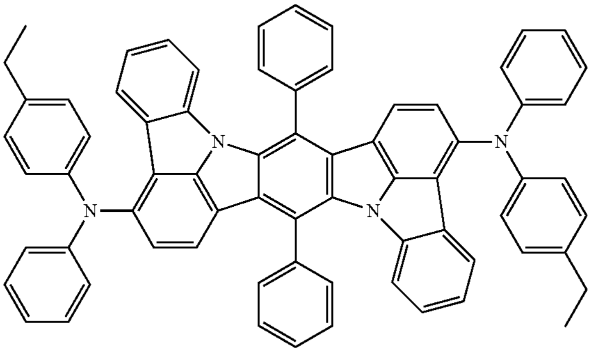
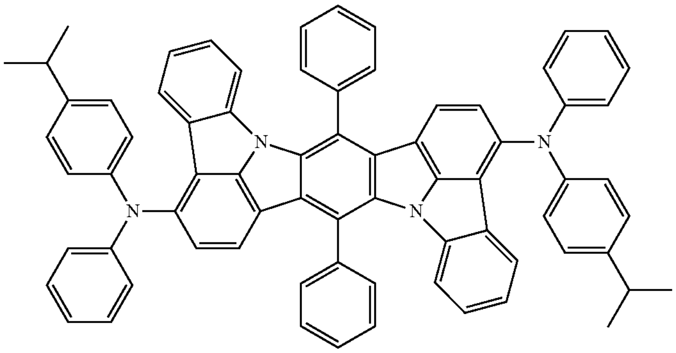
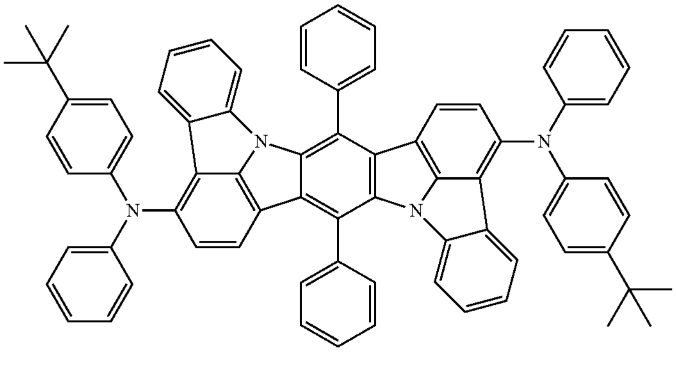

-continued
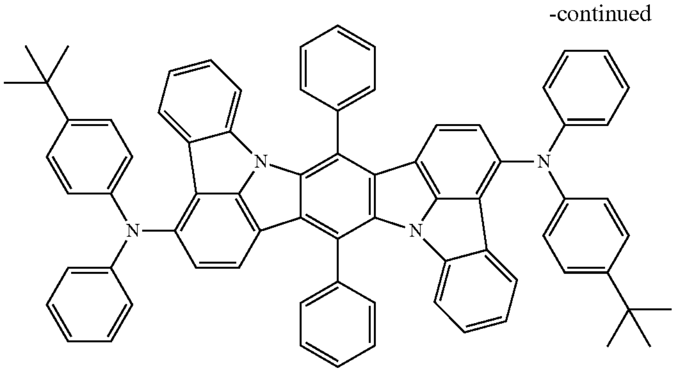
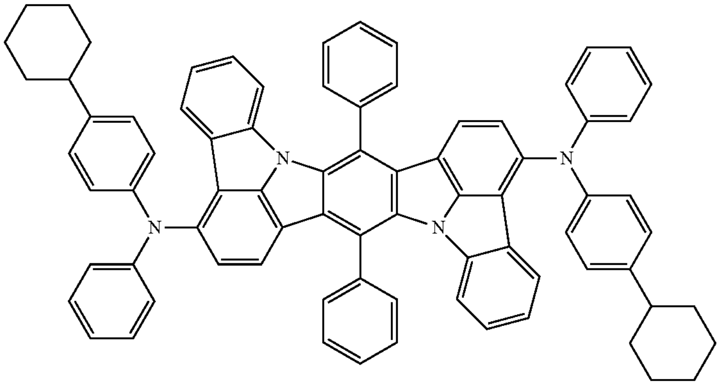
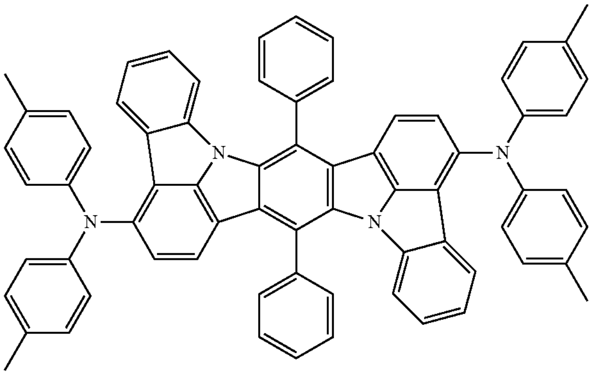
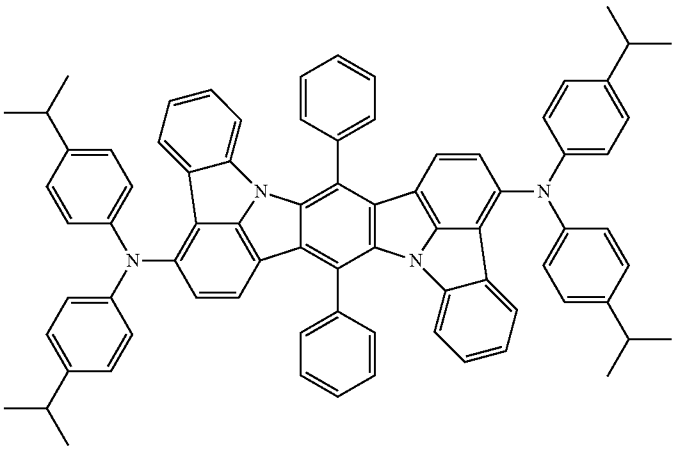

-continued
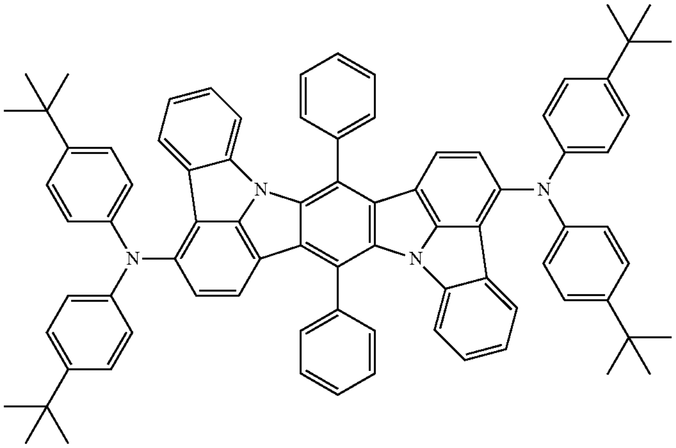
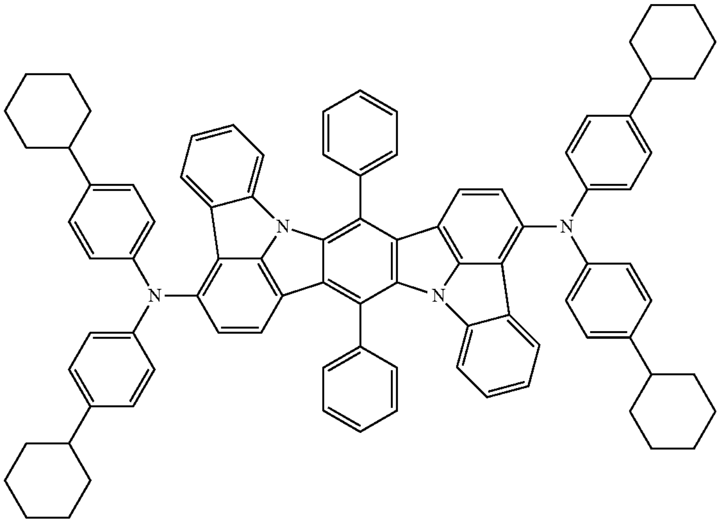
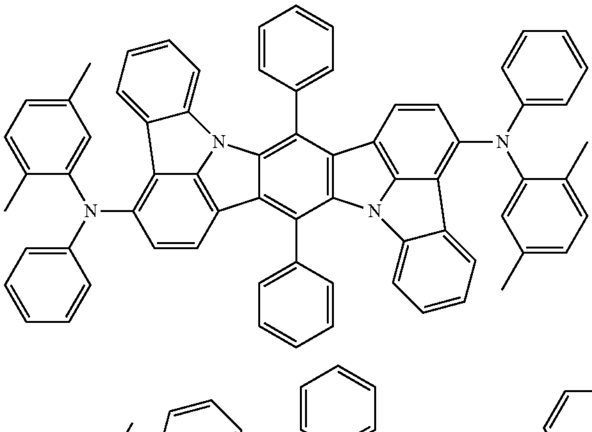
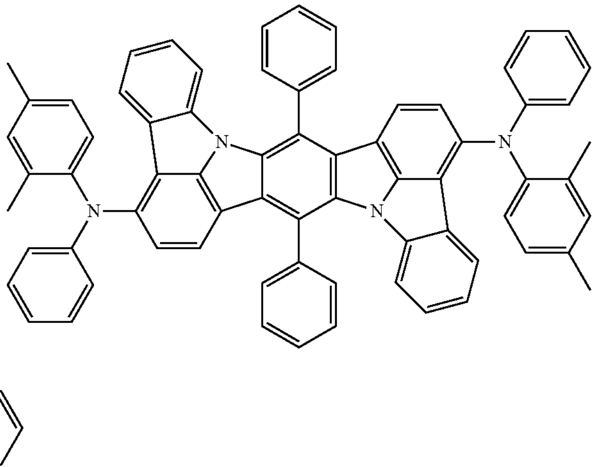
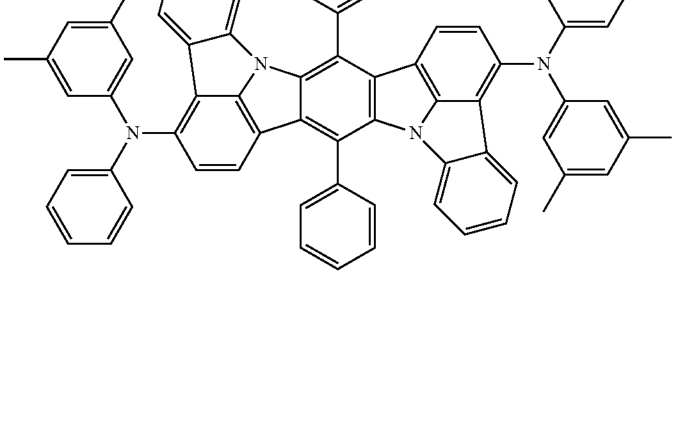

-continued
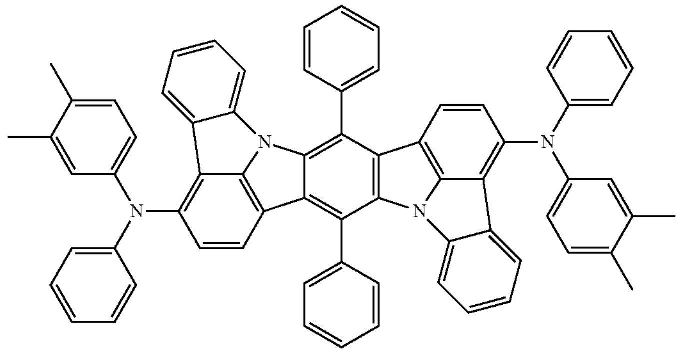
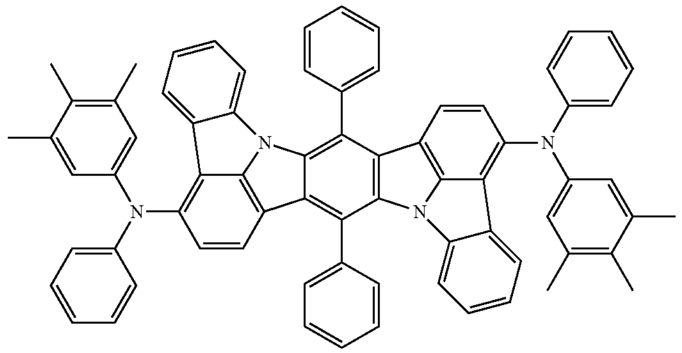
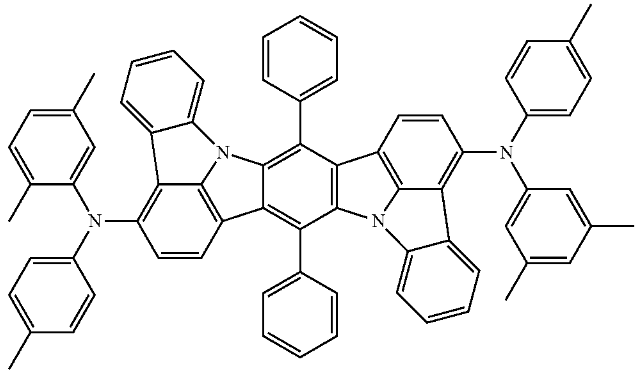
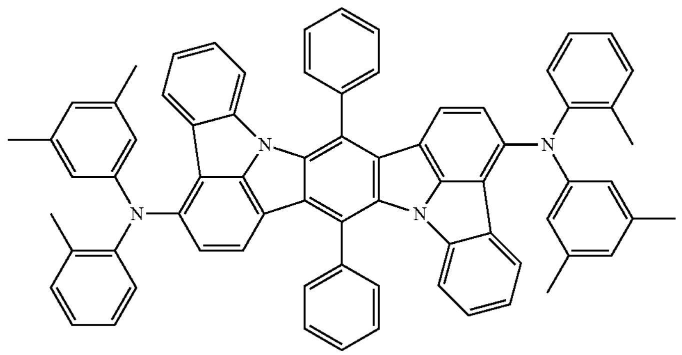

-continued
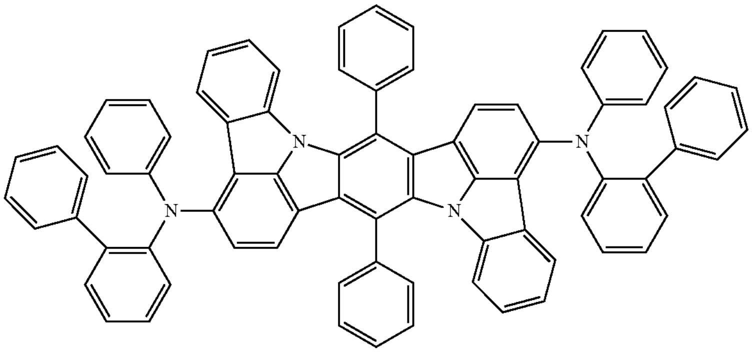
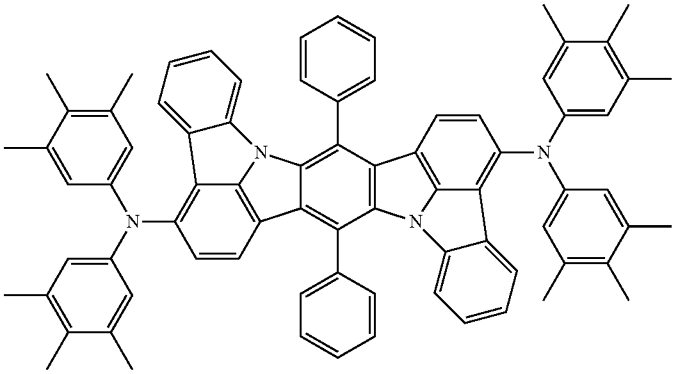
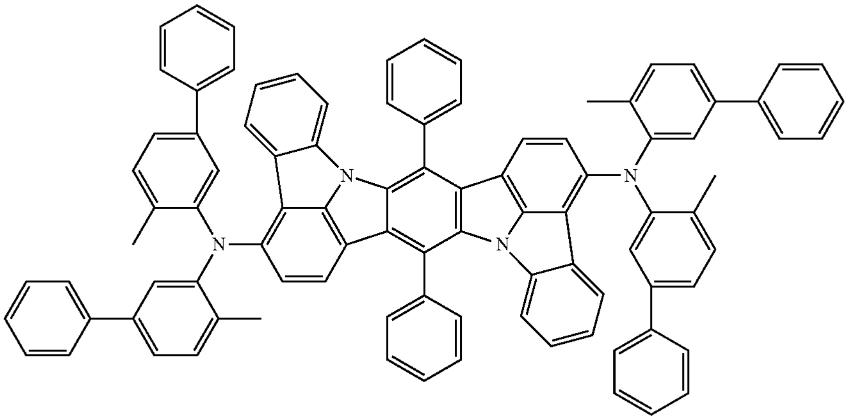
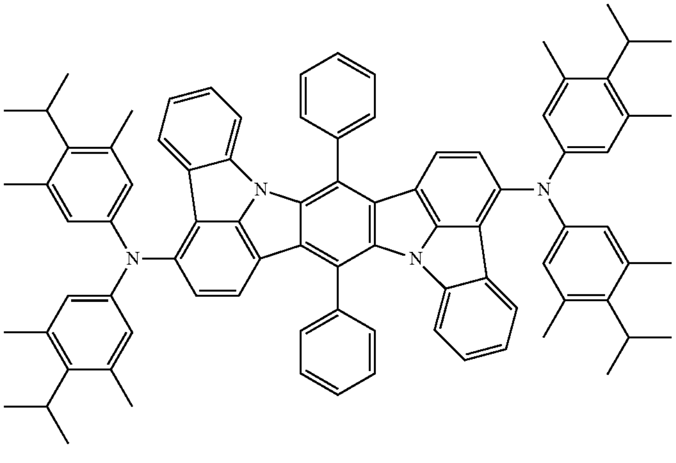

-continued
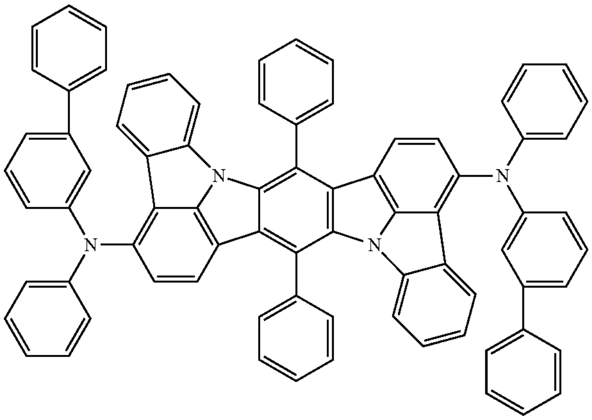
[Formula 155]
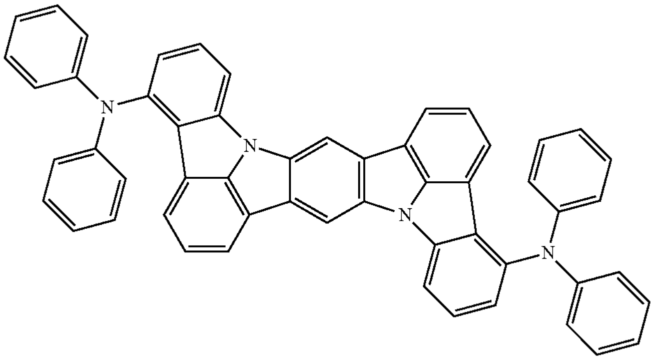
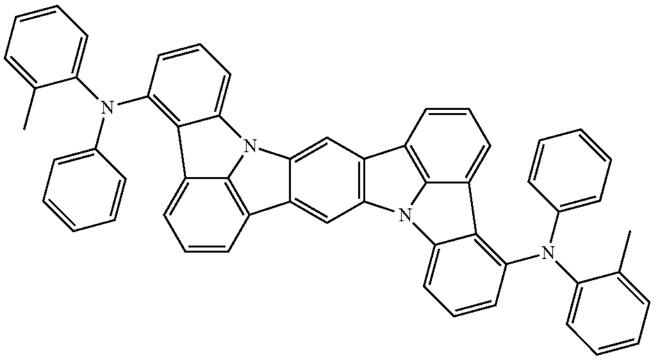
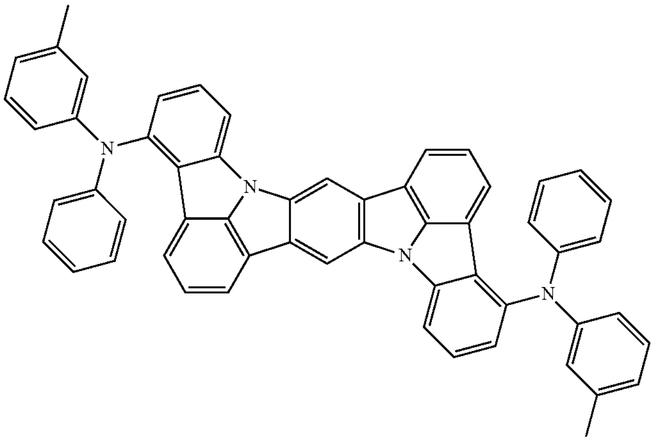

-continued
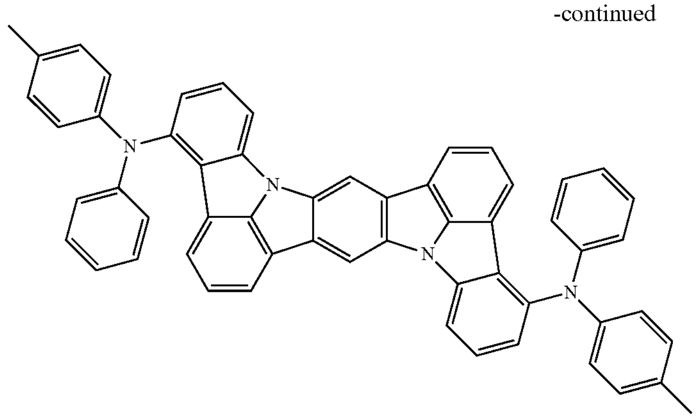
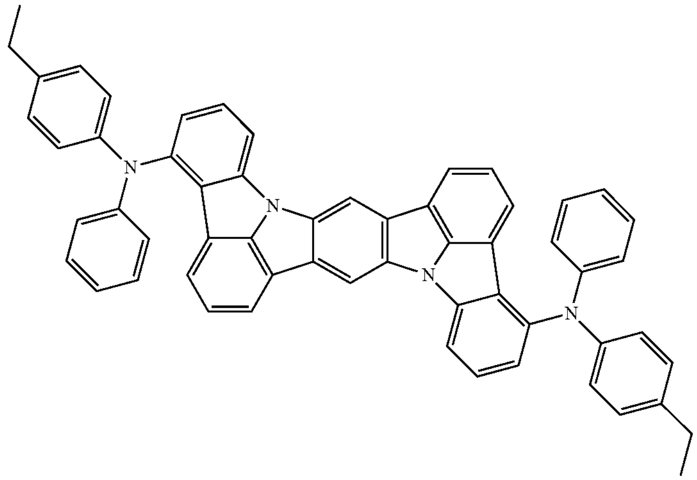
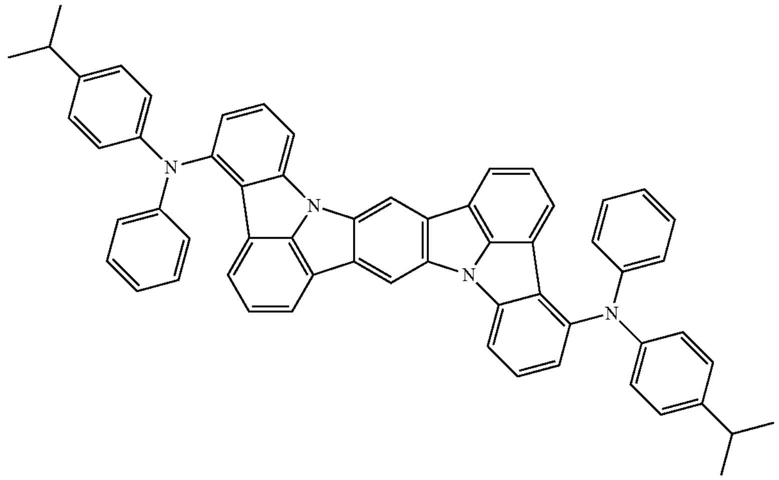

-continued
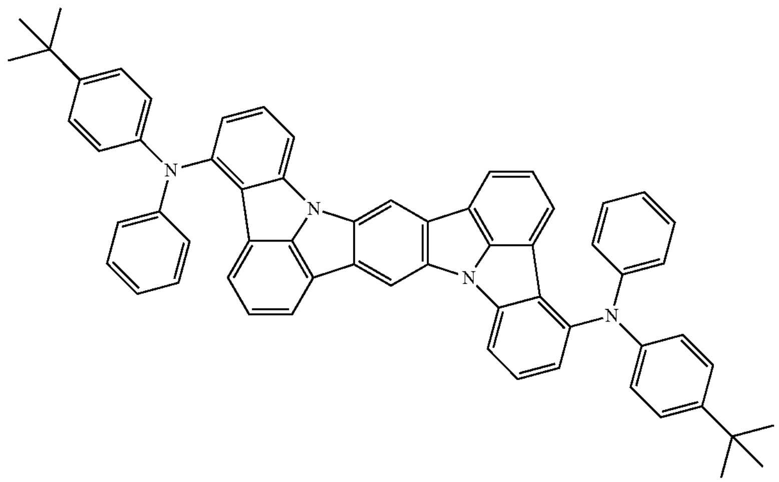
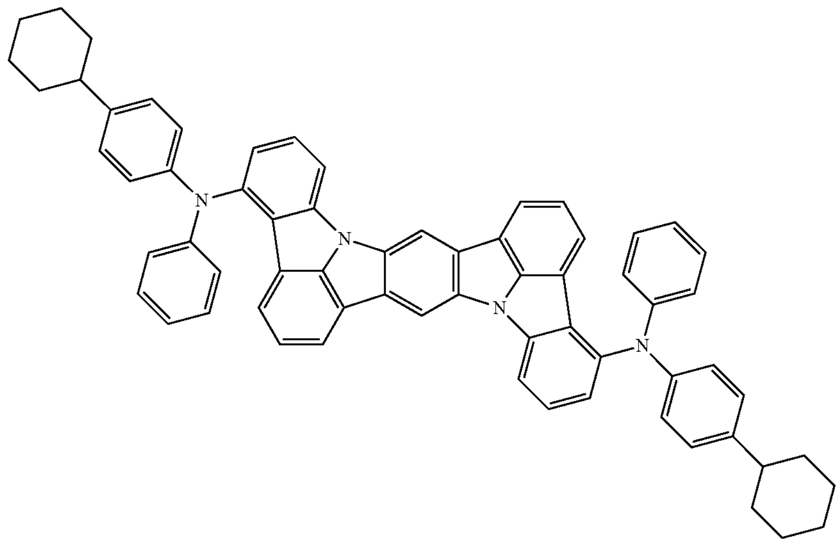
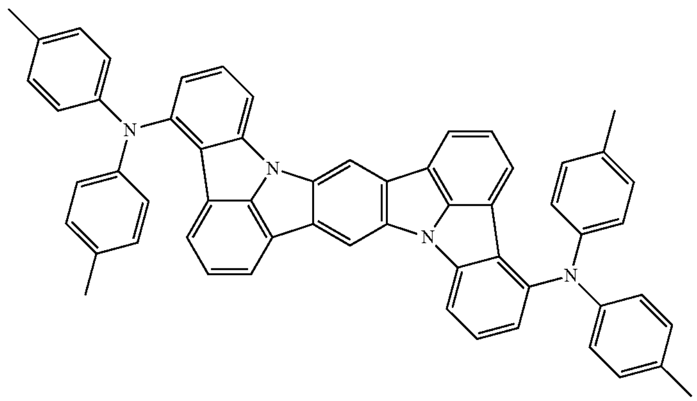

-continued
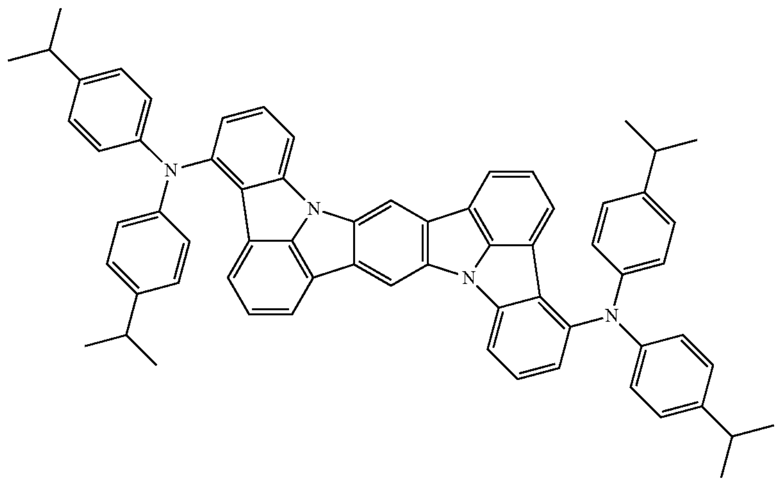
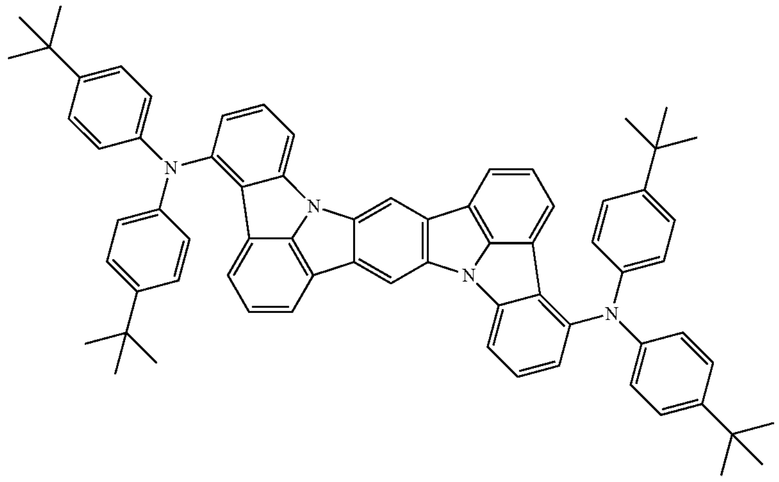
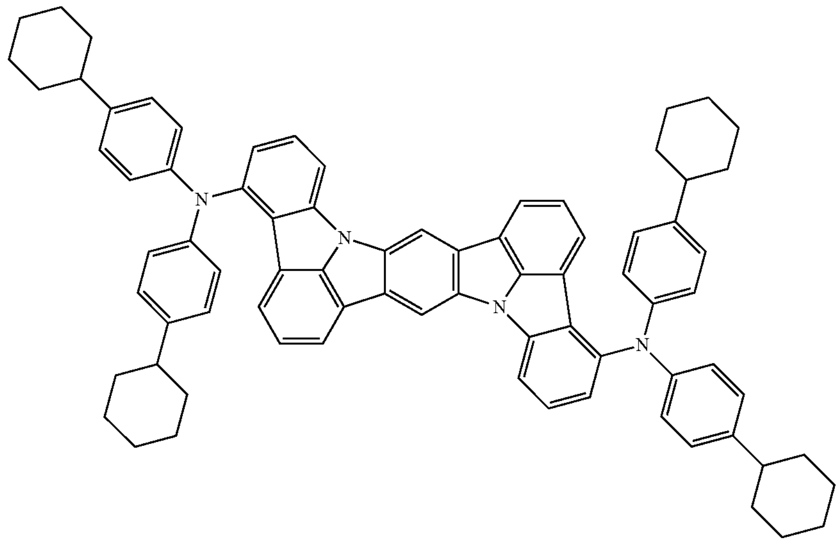

-continued
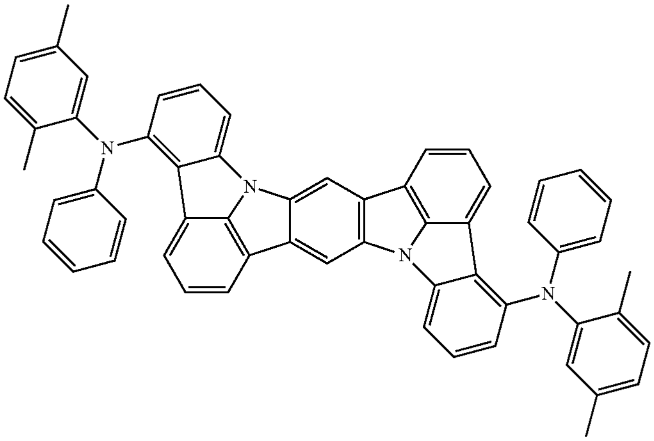
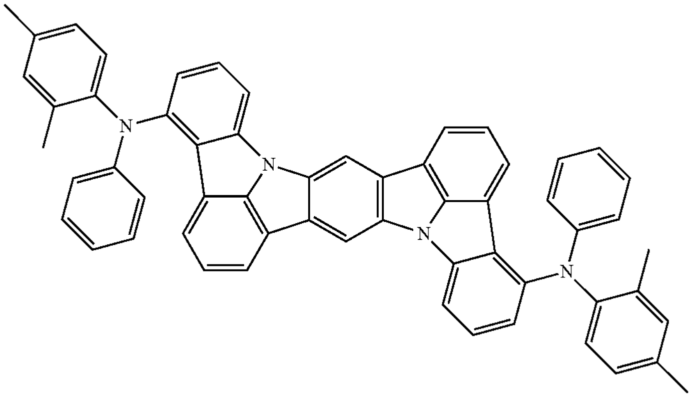
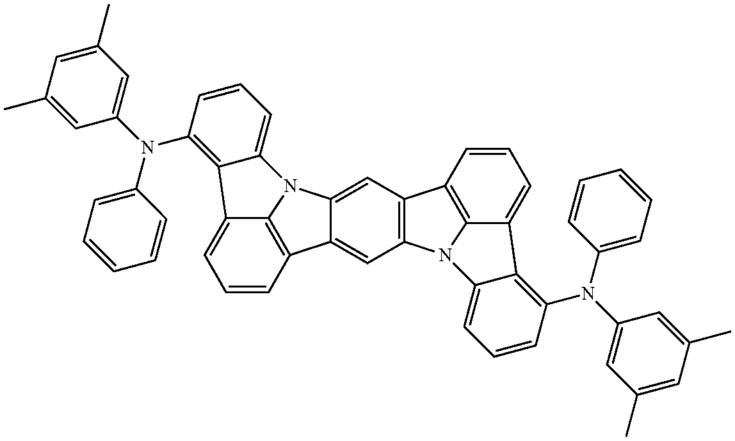
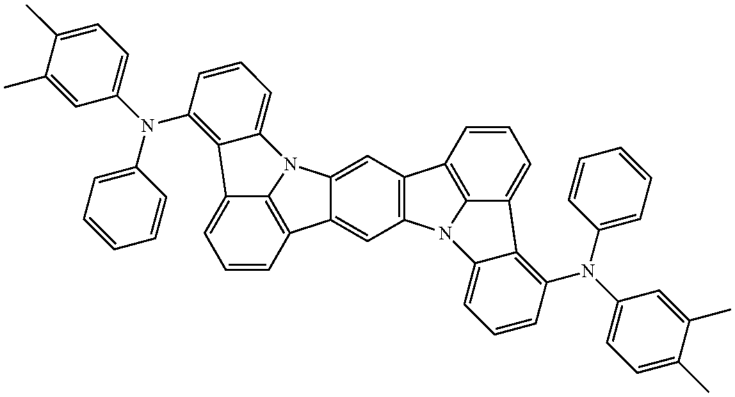

-continued
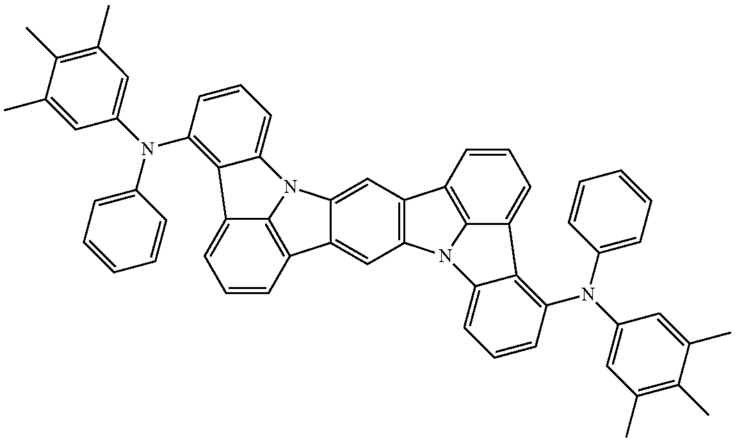
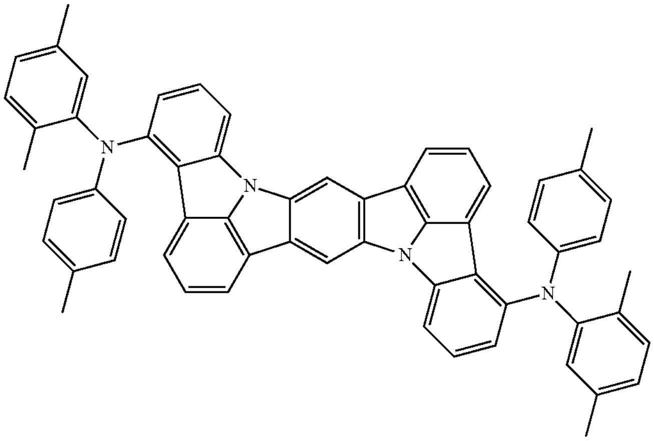
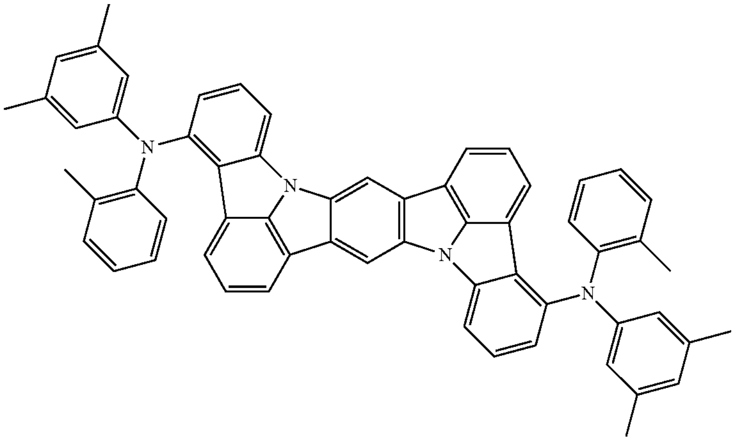
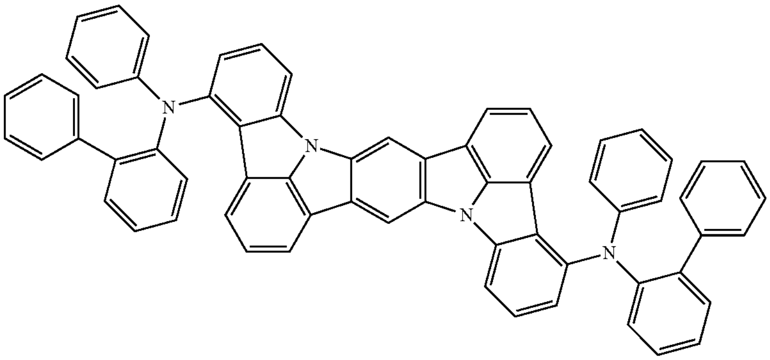

-continued
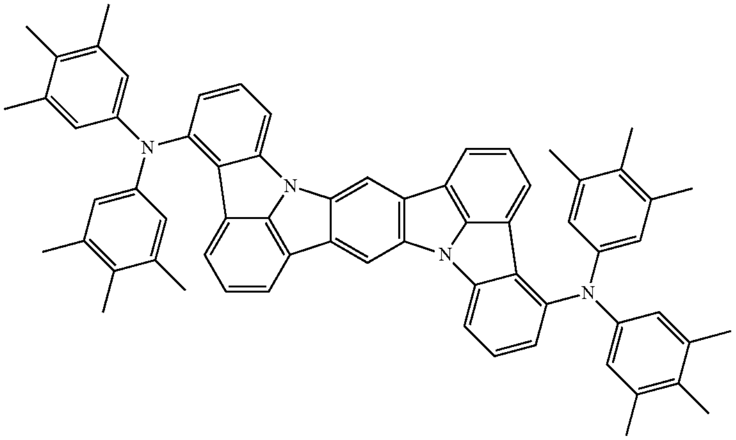
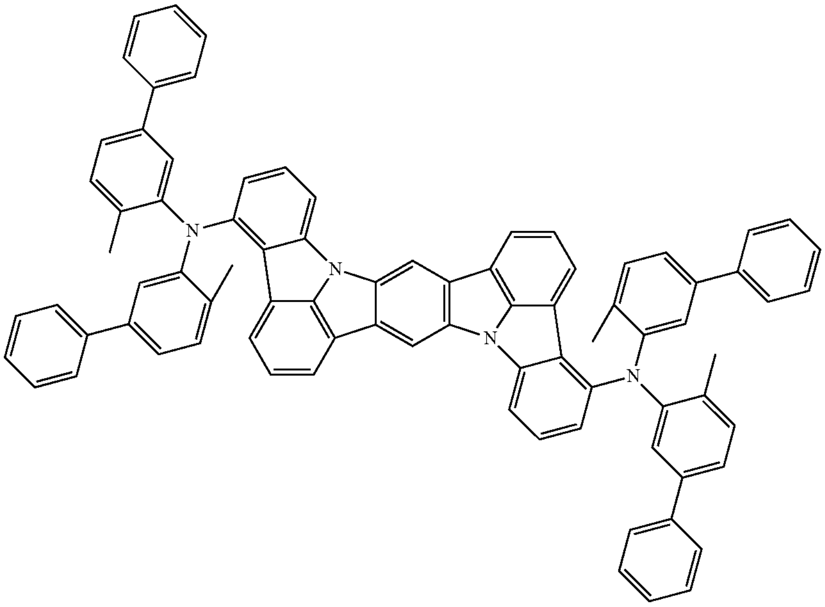
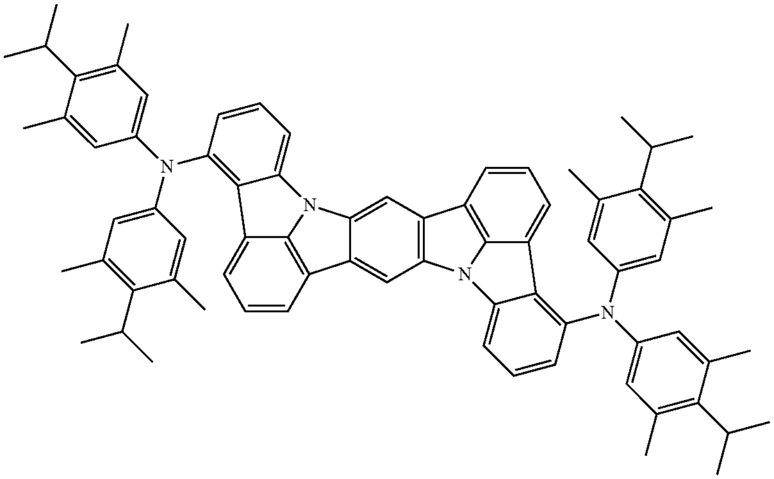

-continued
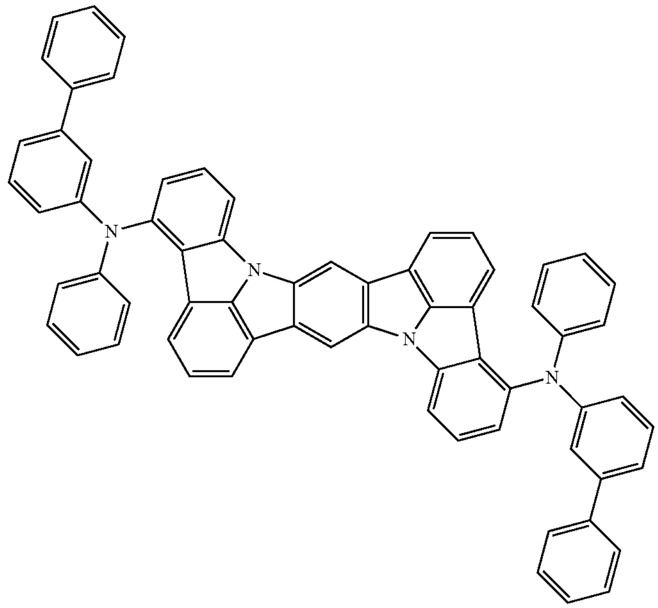
[Formula 156]
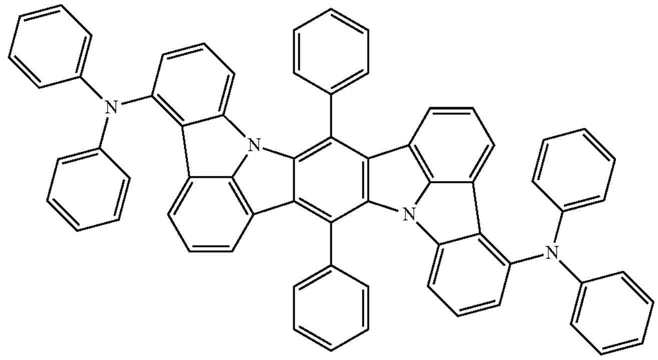
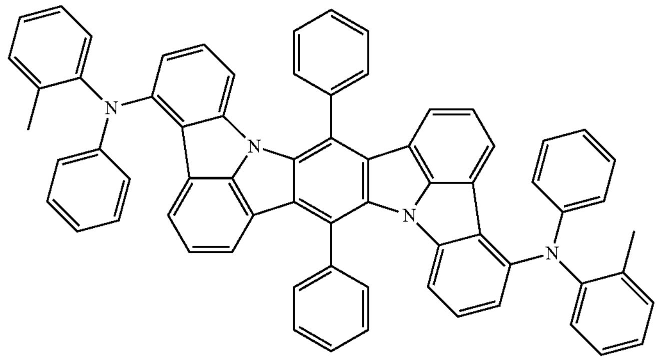

-continued
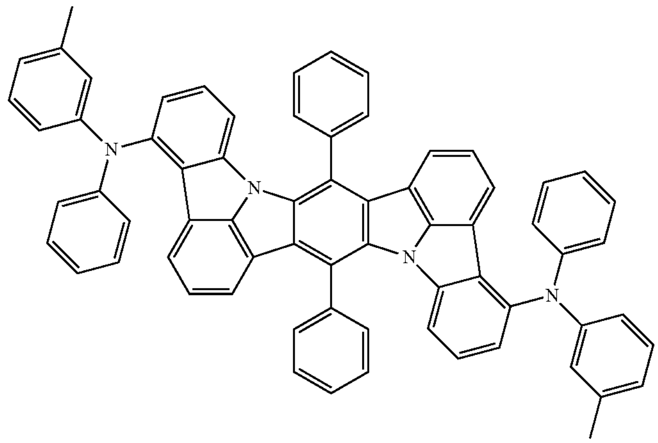
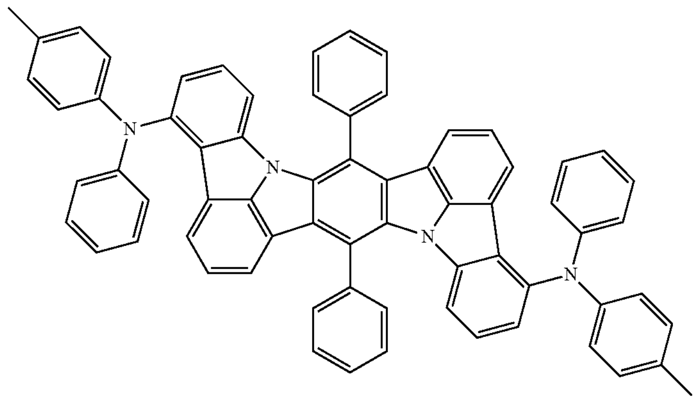
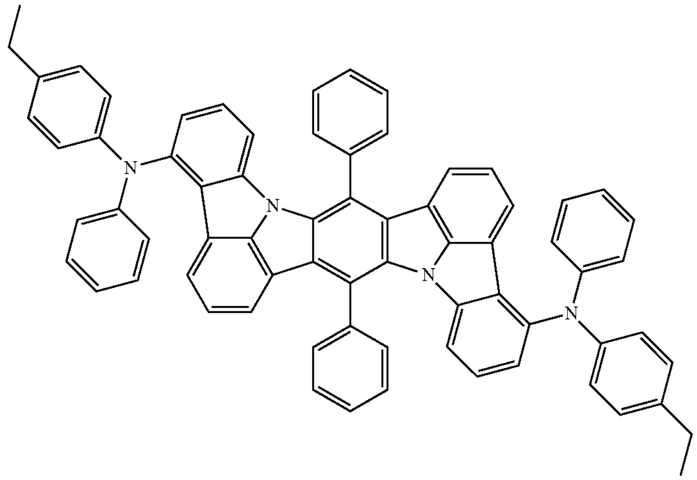

-continued
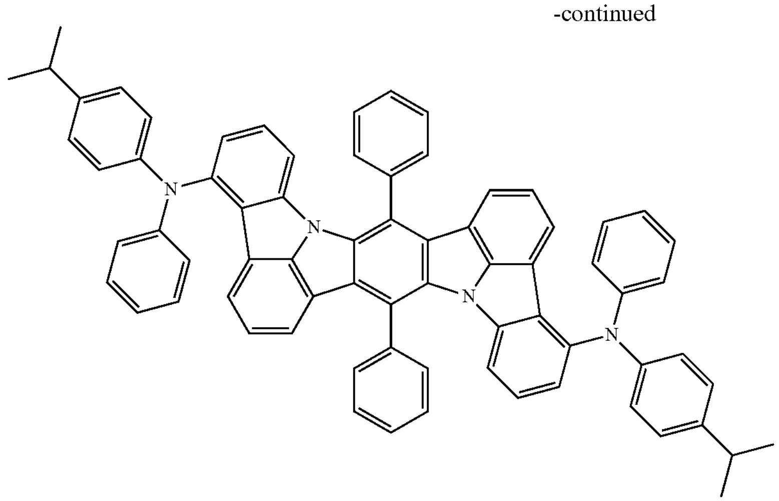
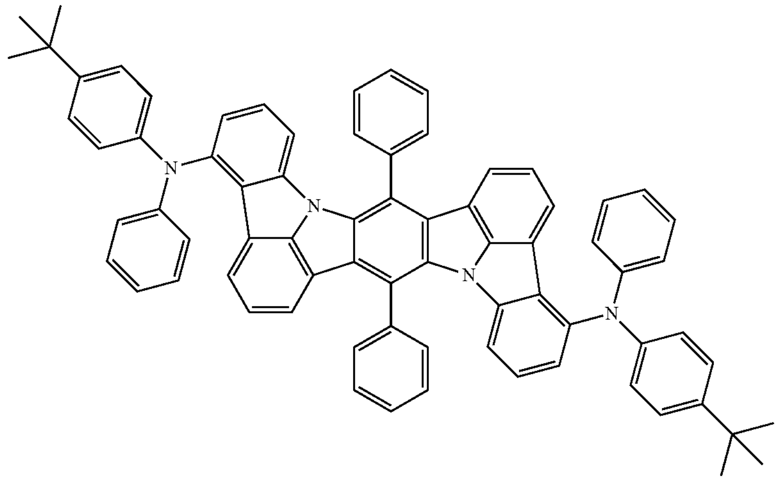
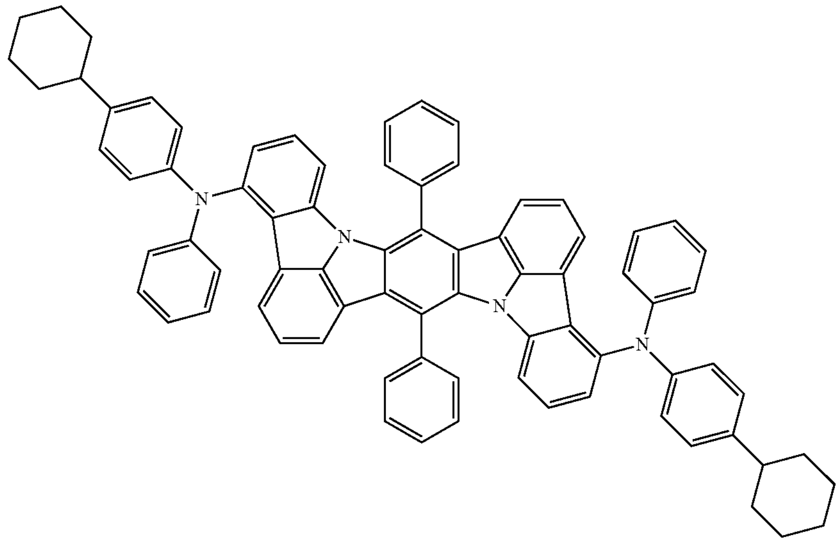

-continued
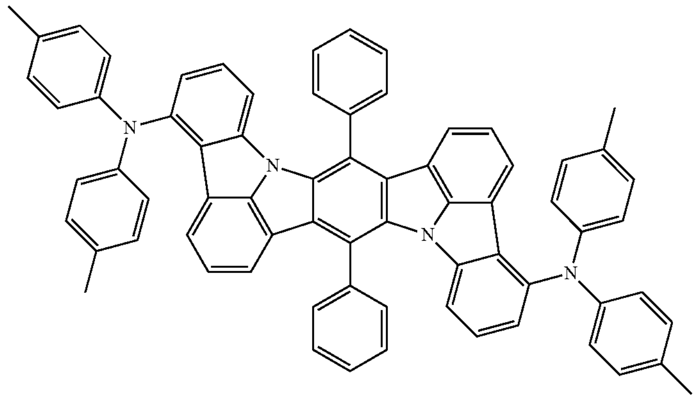
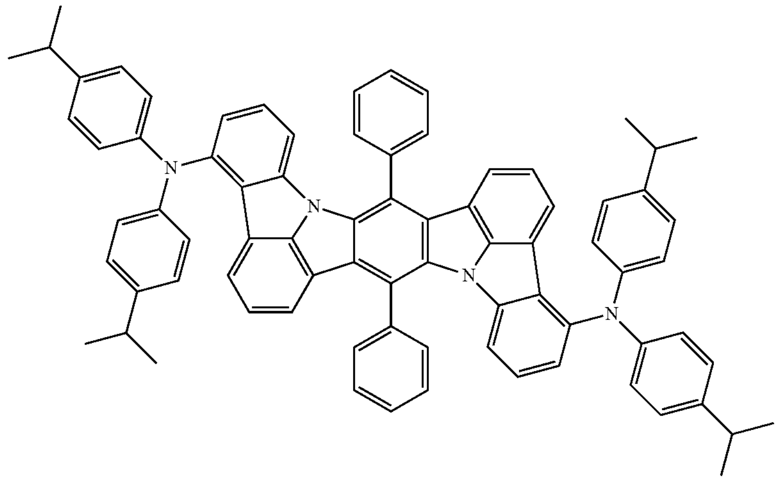
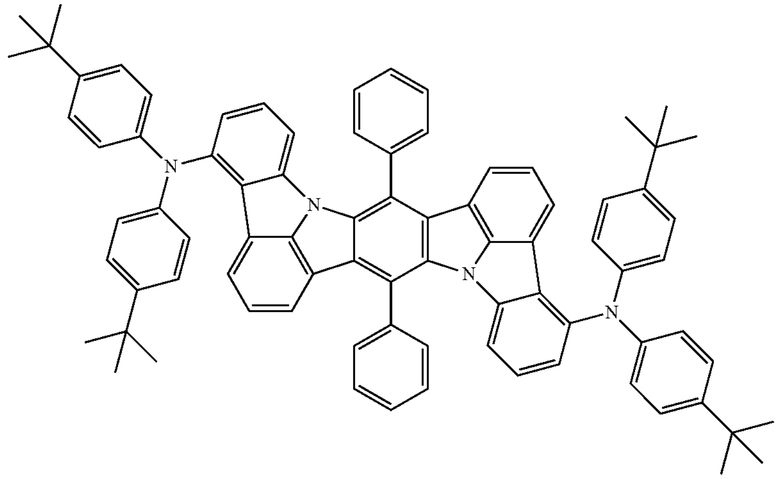

-continued
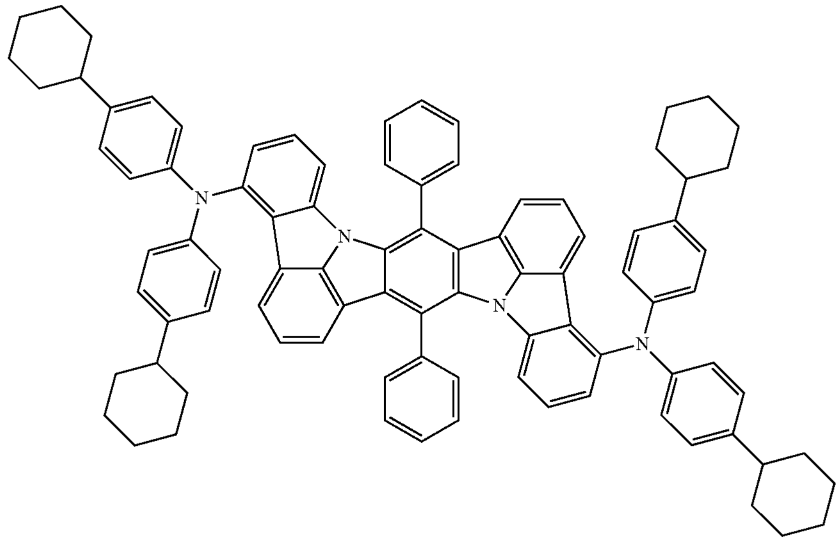
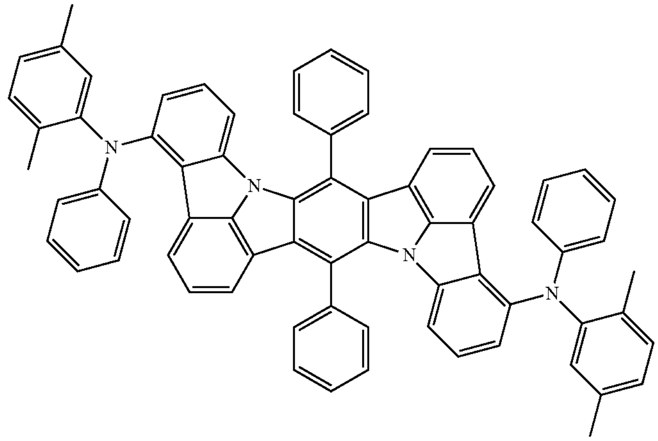
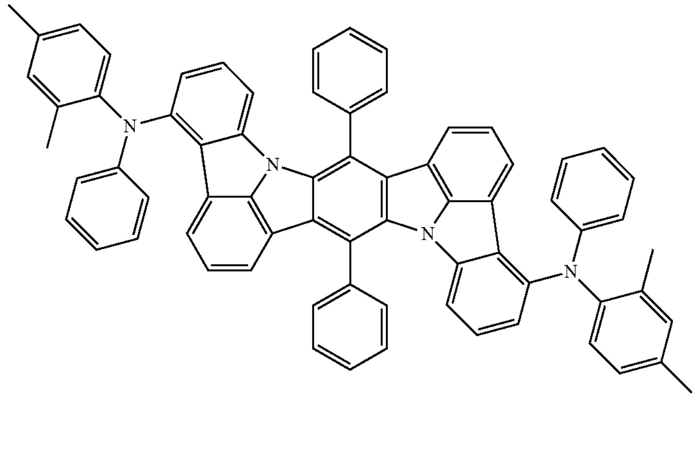

-continued
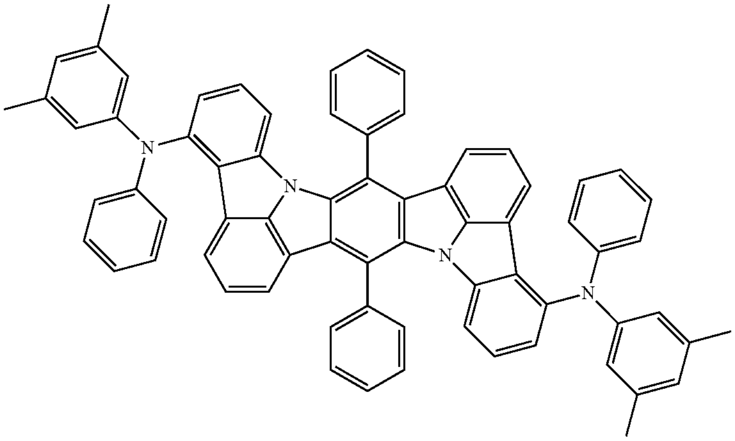
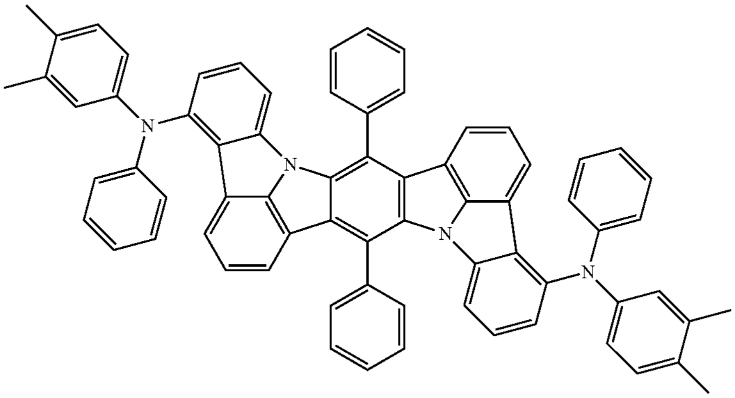
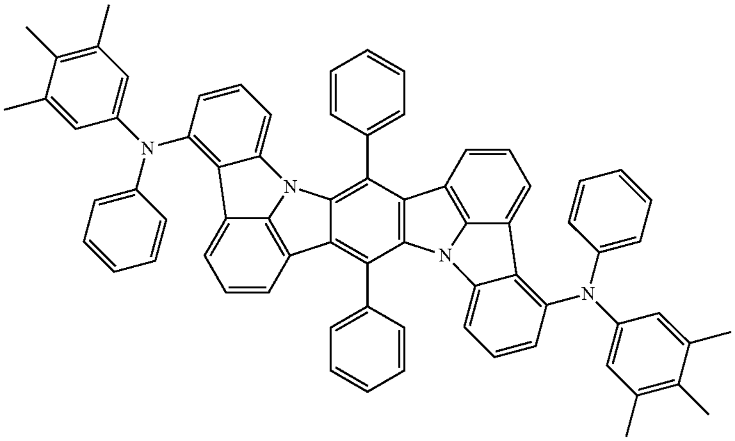
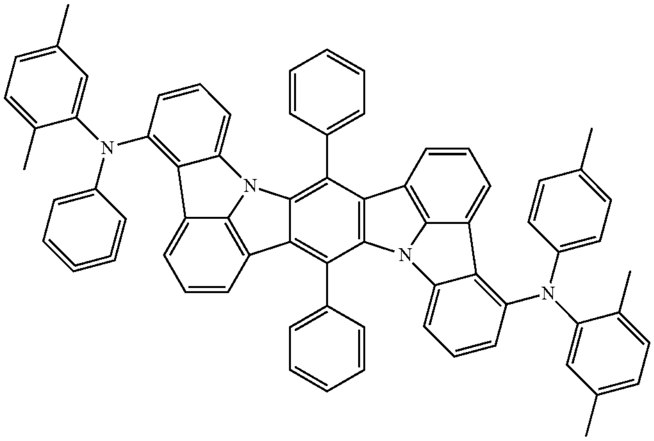

-continued
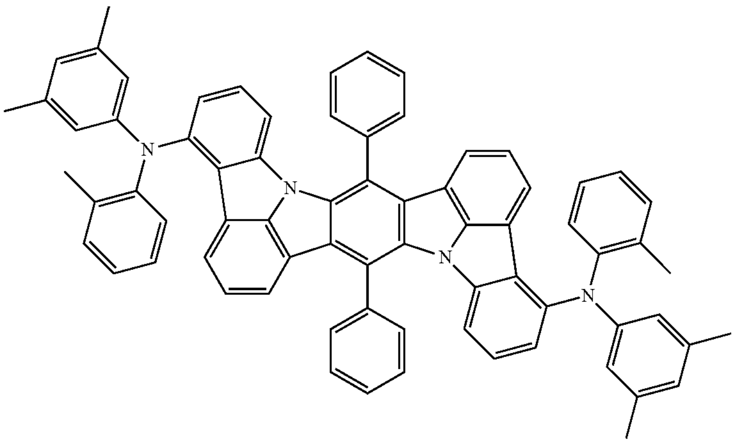
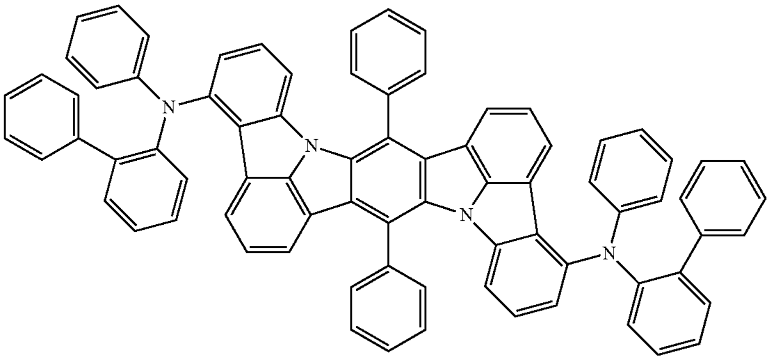
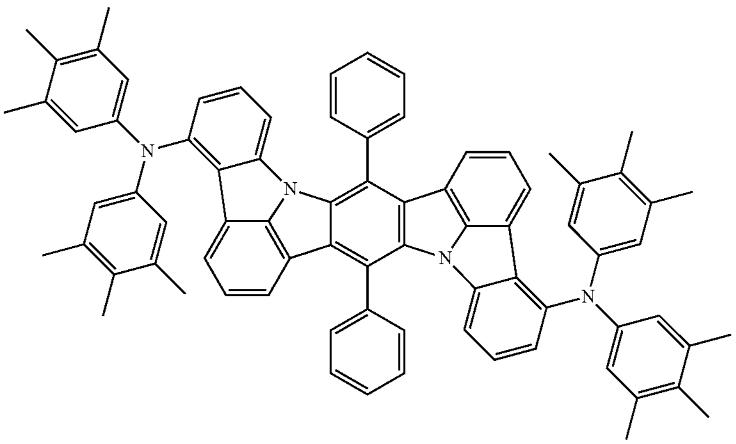

-continued
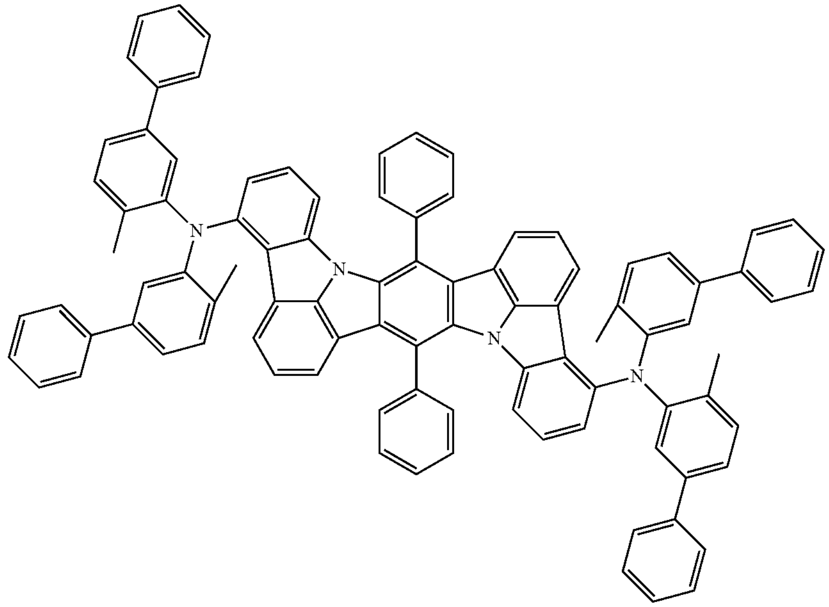
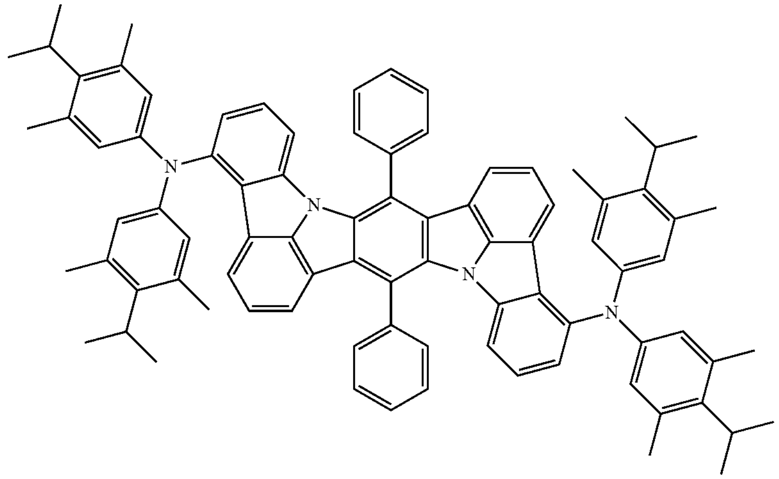
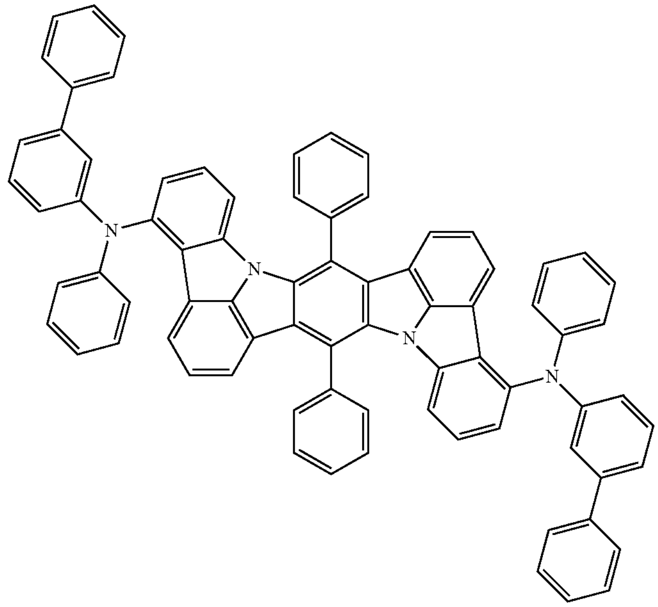

-continued
[Formula 157]
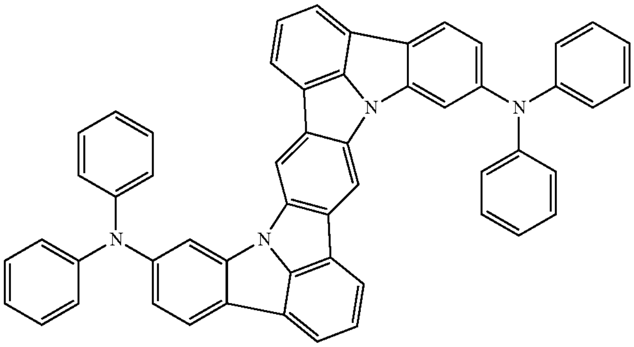
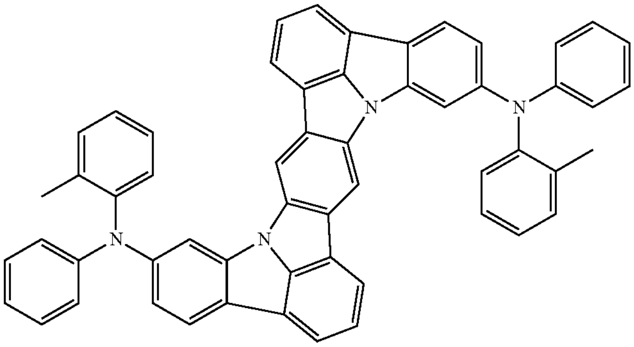
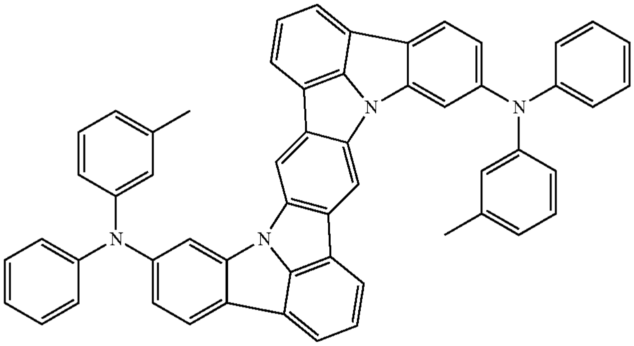
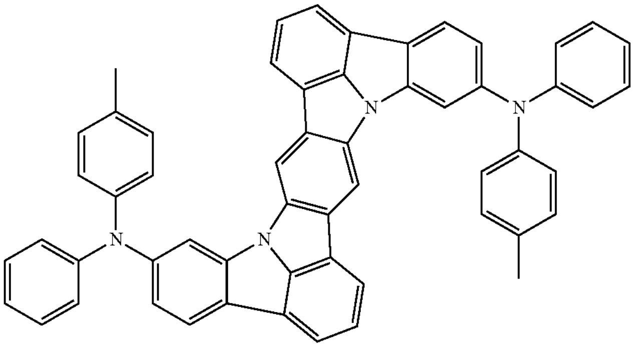

-continued
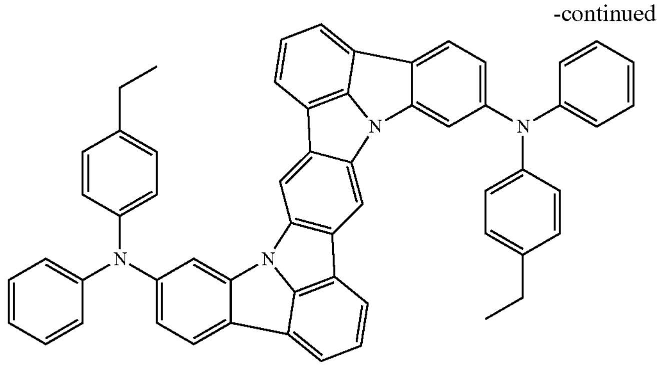
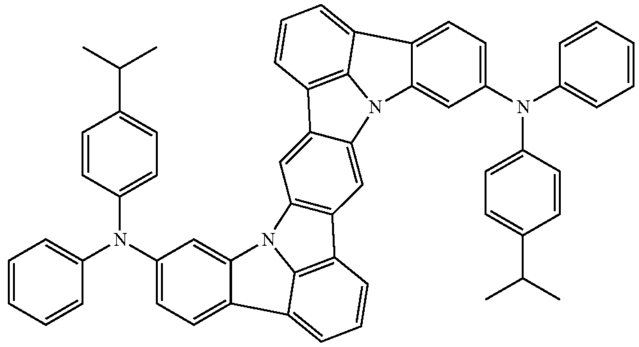
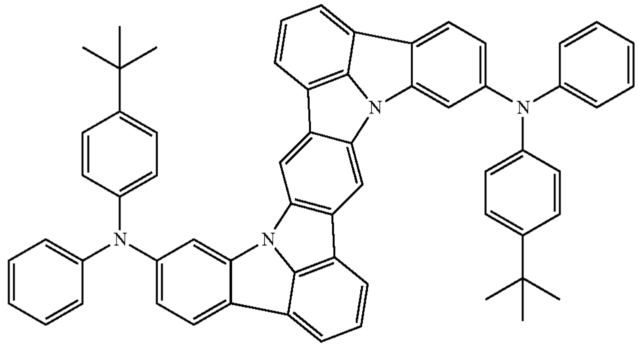
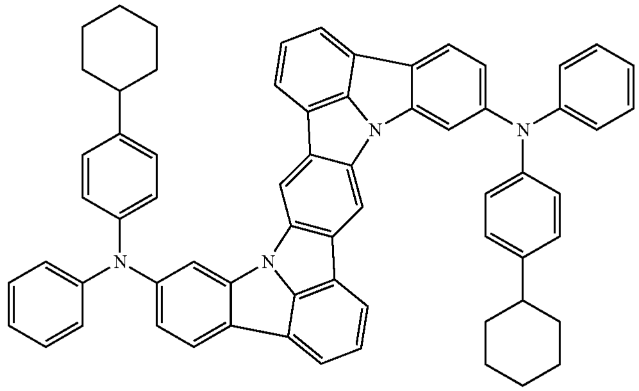

-continued
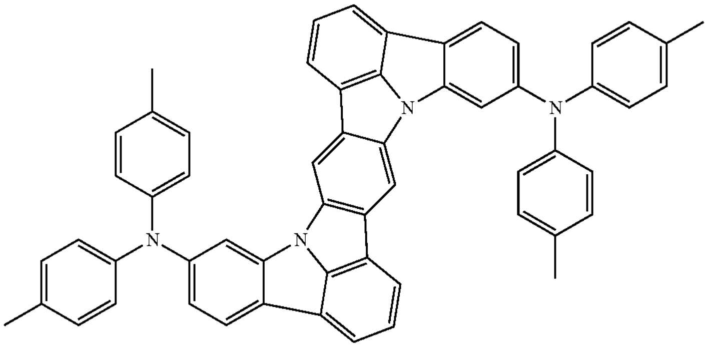
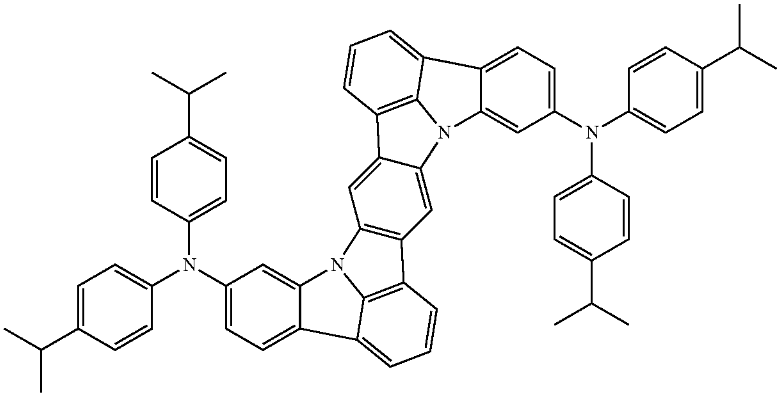
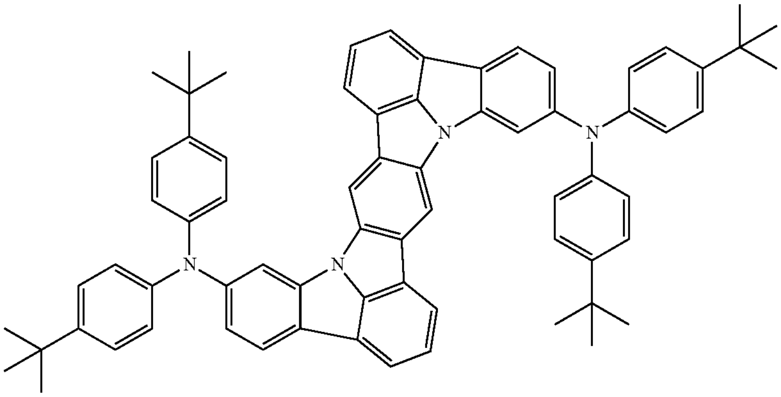
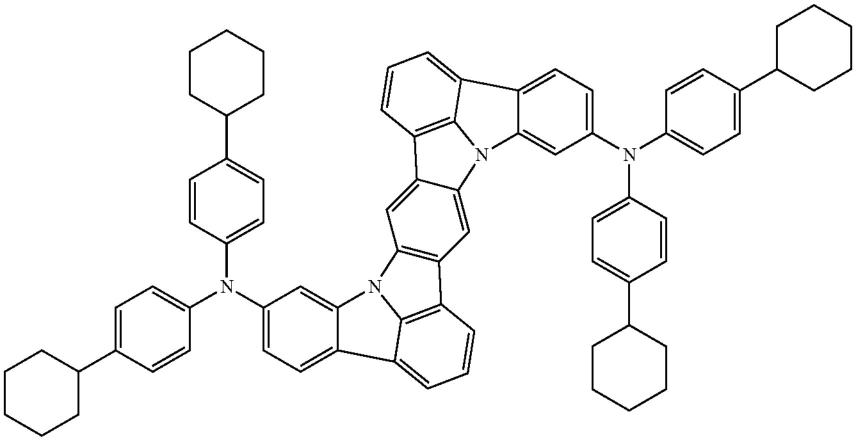

-continued
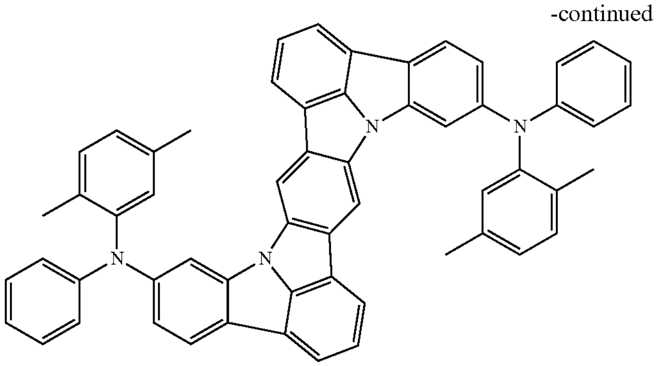
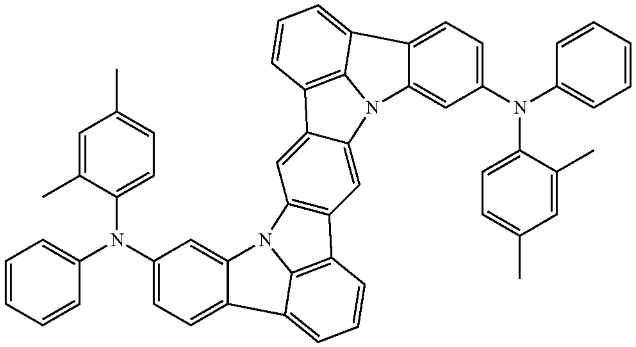
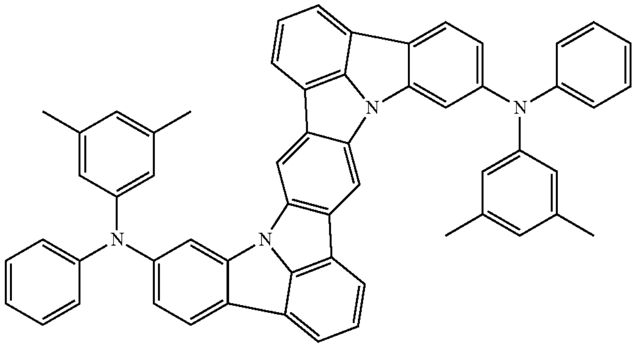
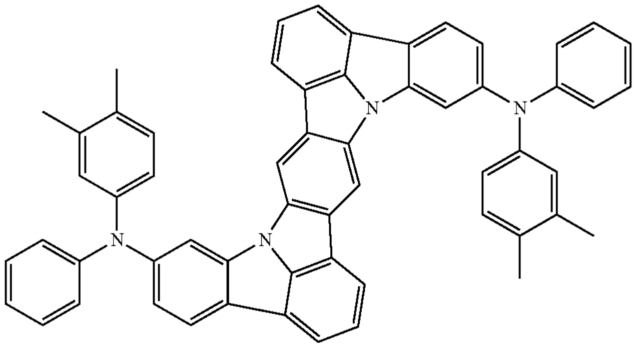
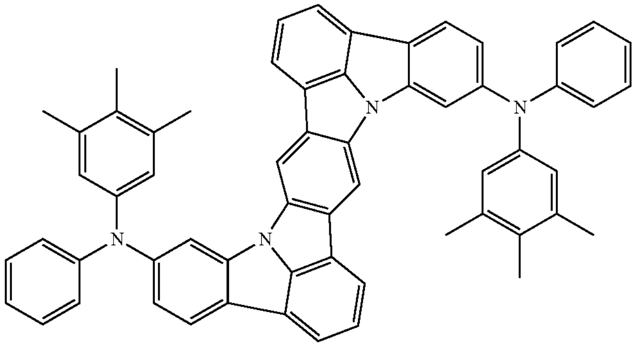

-continued
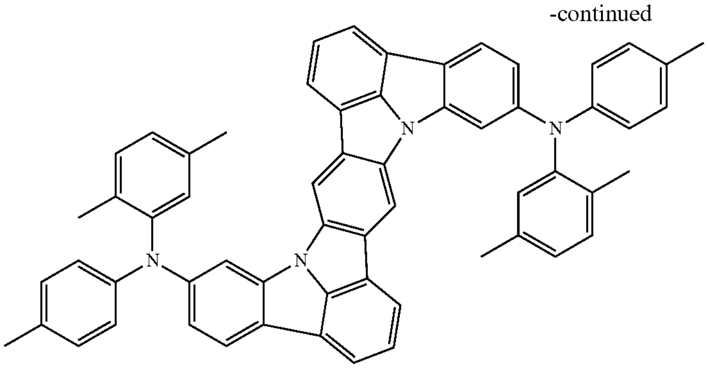
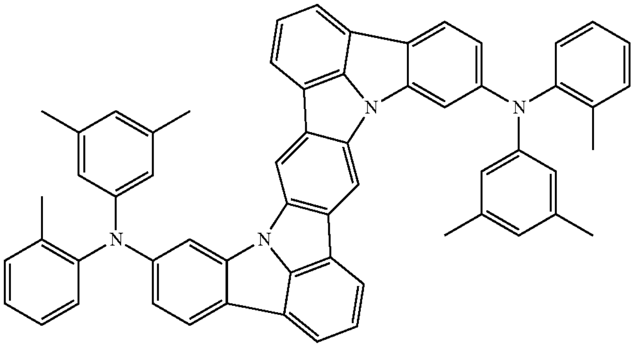
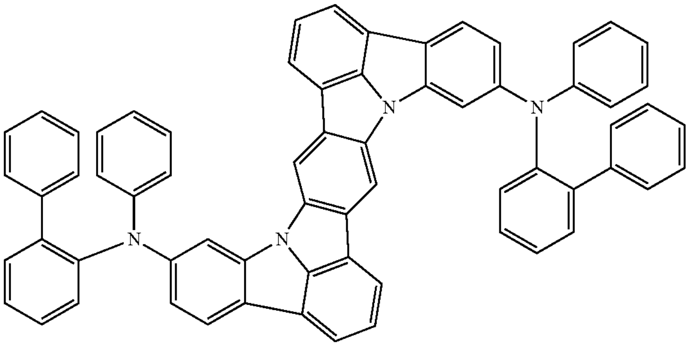
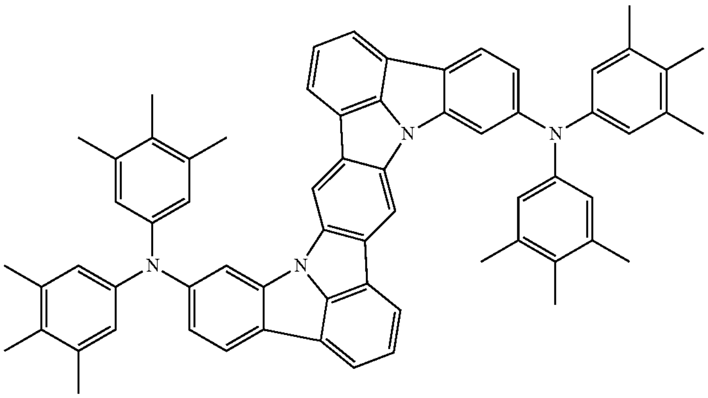

-continued
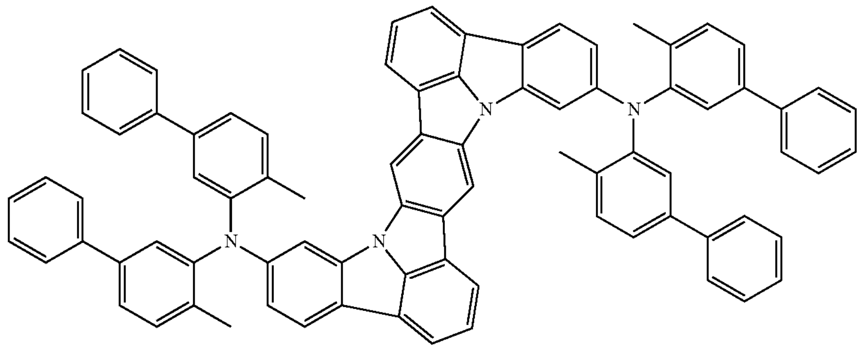
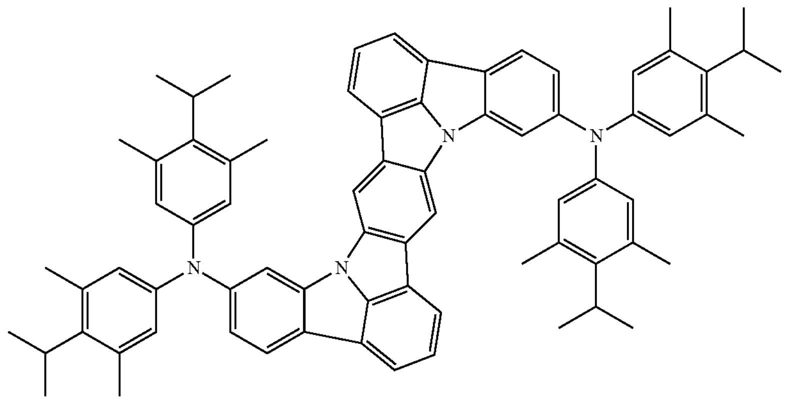
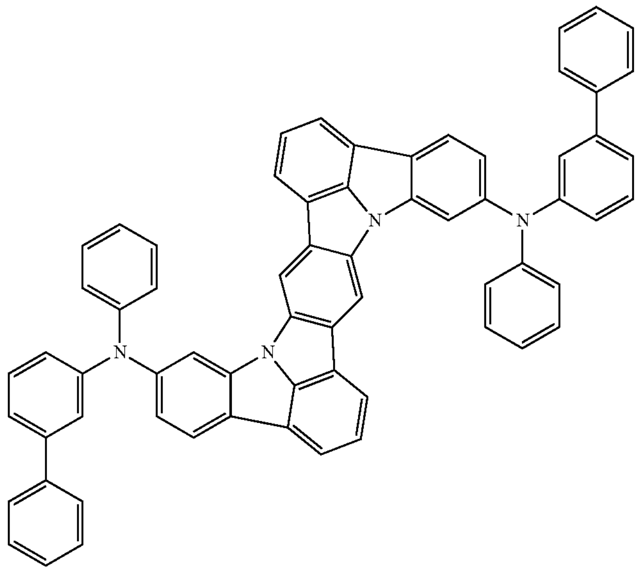

-continued
[Formula 158]
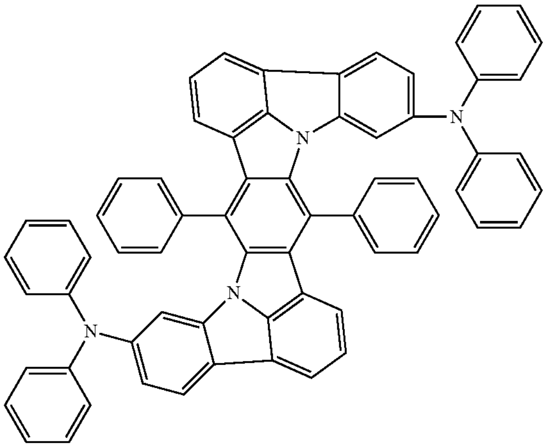
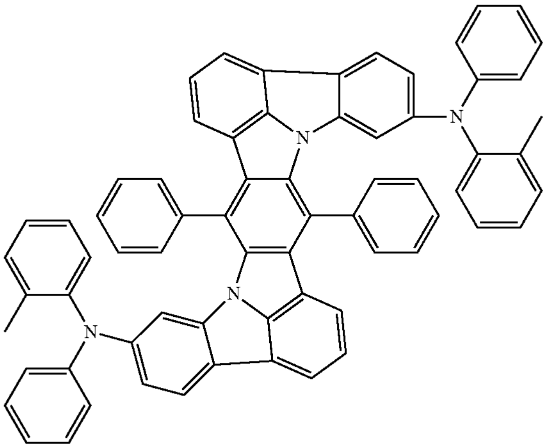
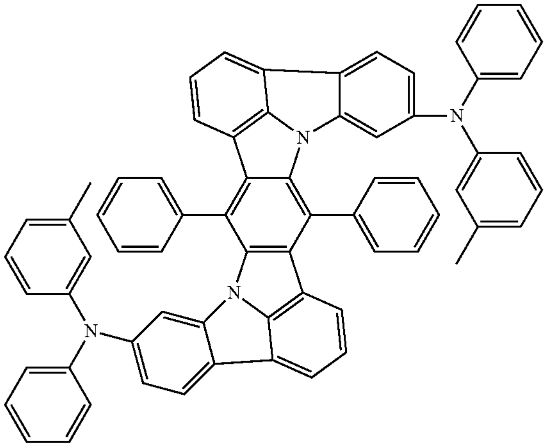
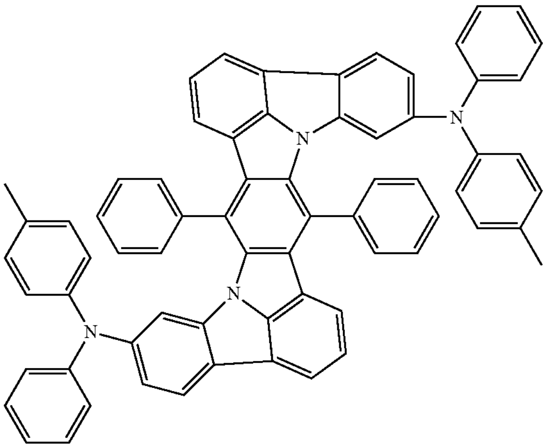
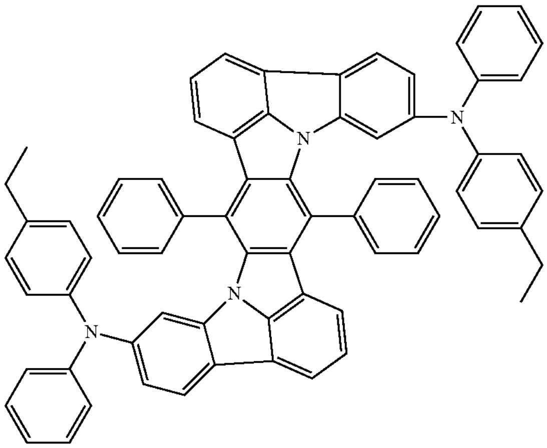

-continued
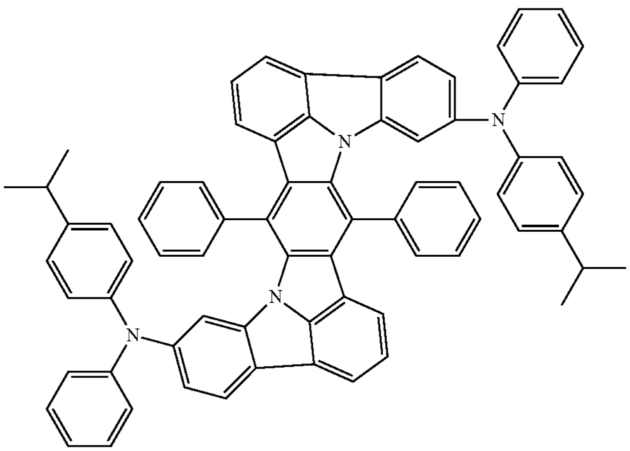
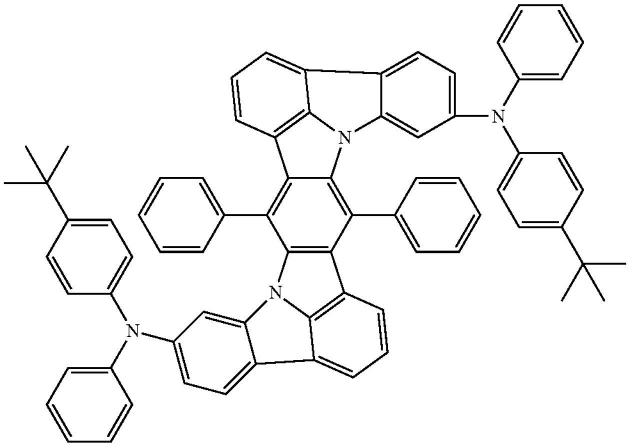
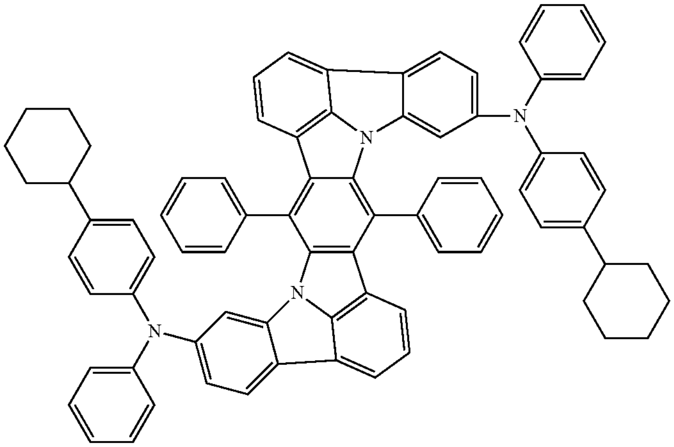

-continued
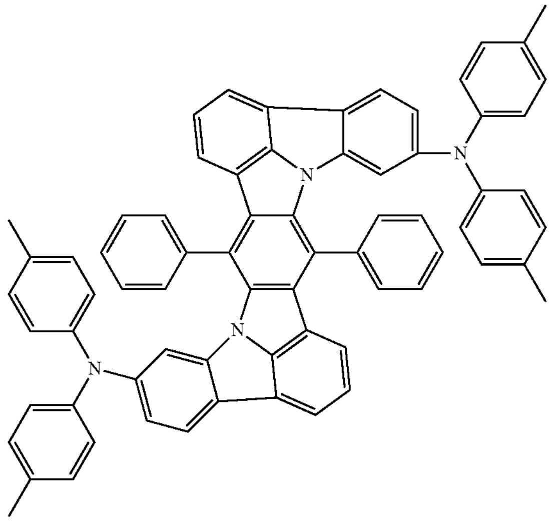
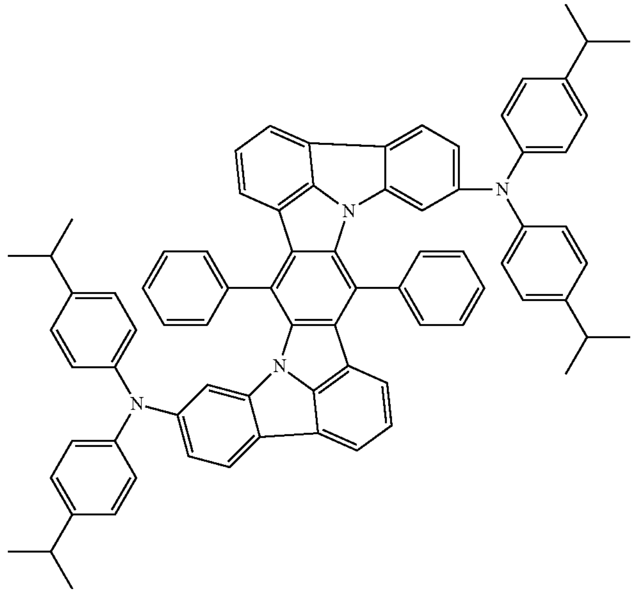
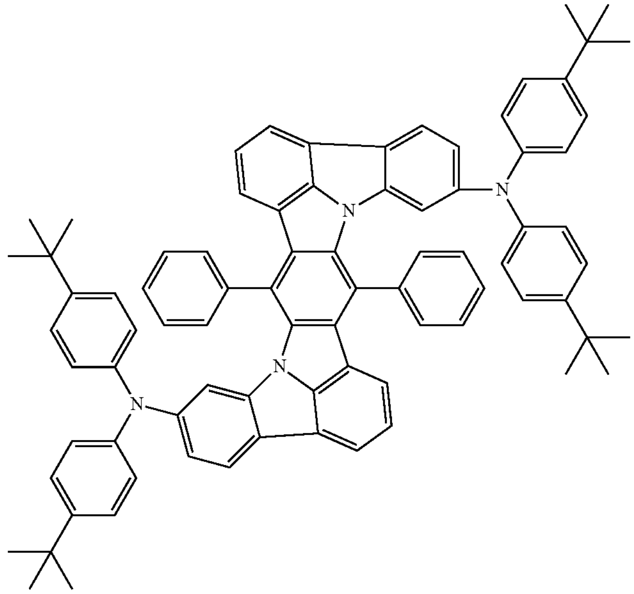

-continued
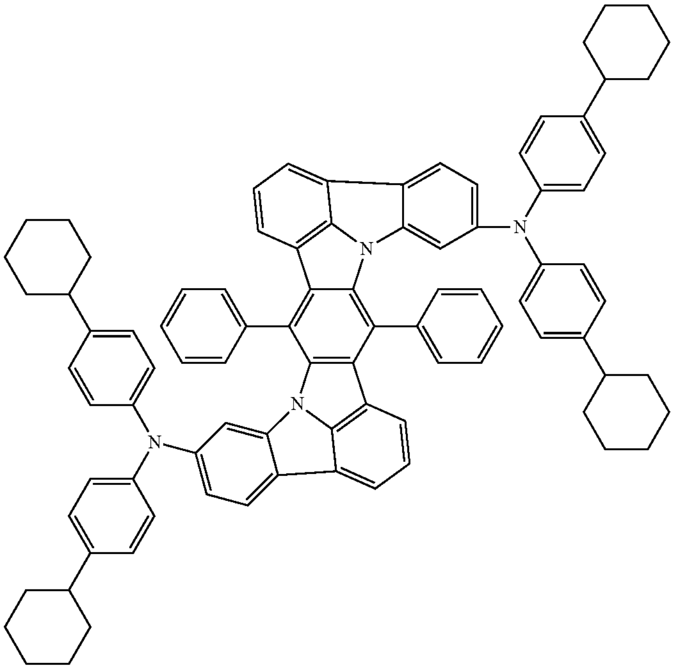
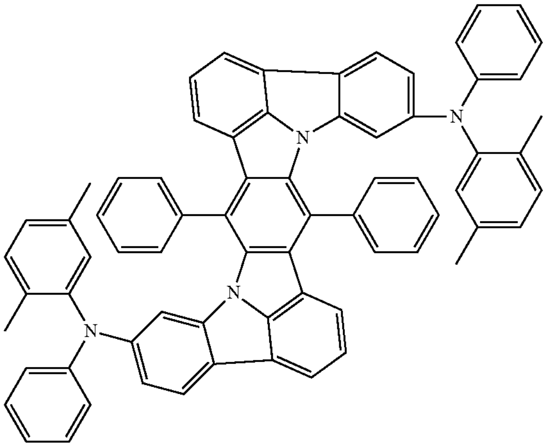
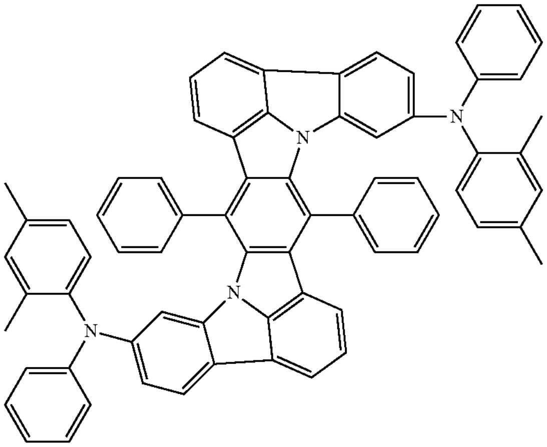
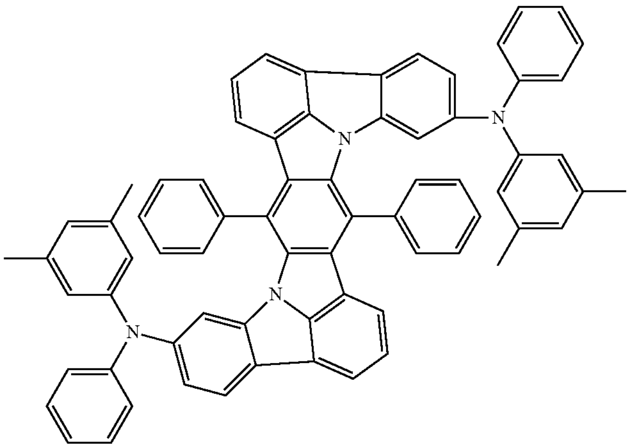

-continued
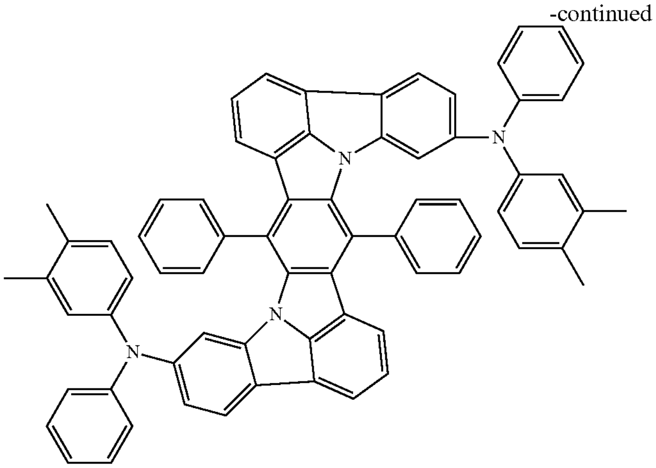
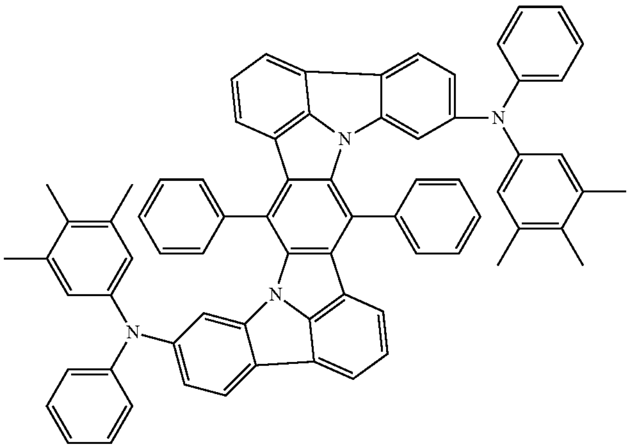
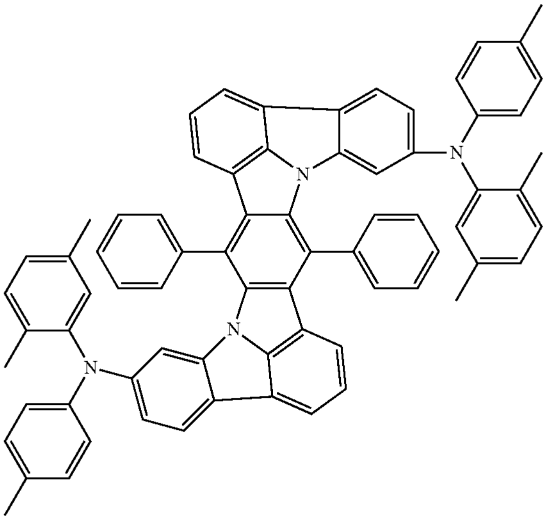

-continued
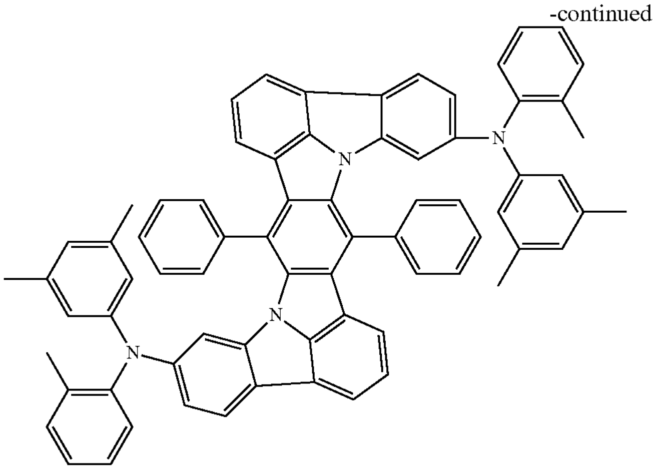
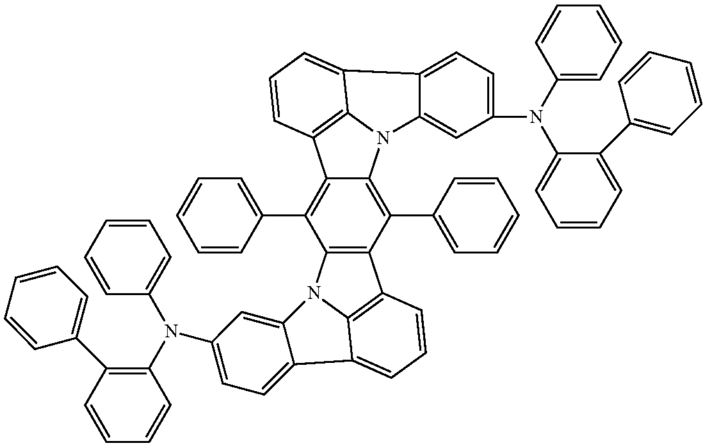
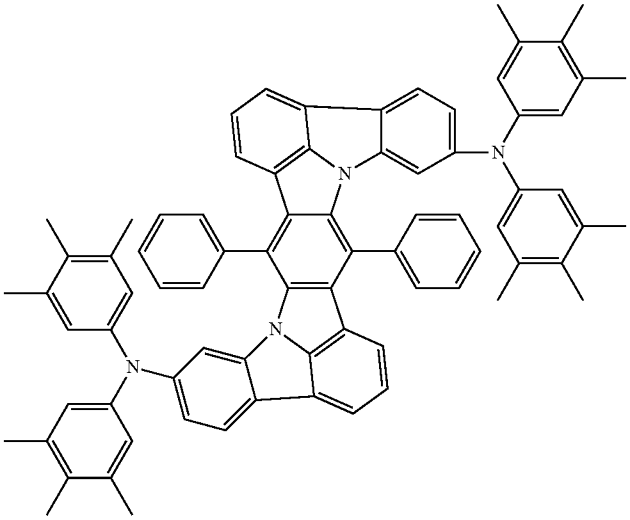

-continued
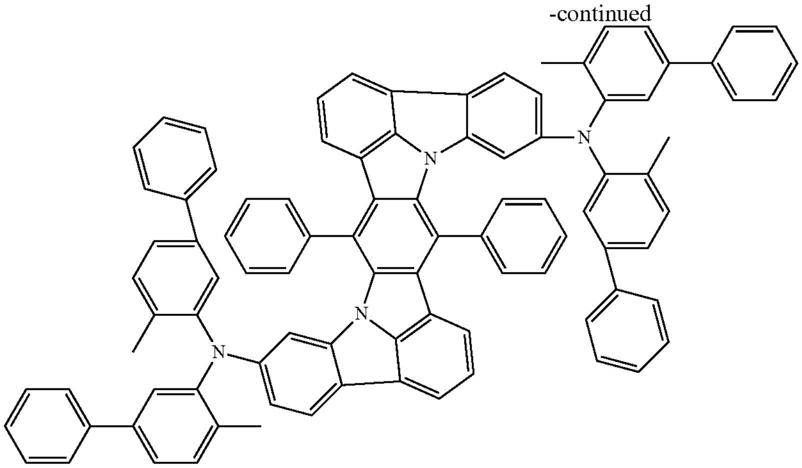
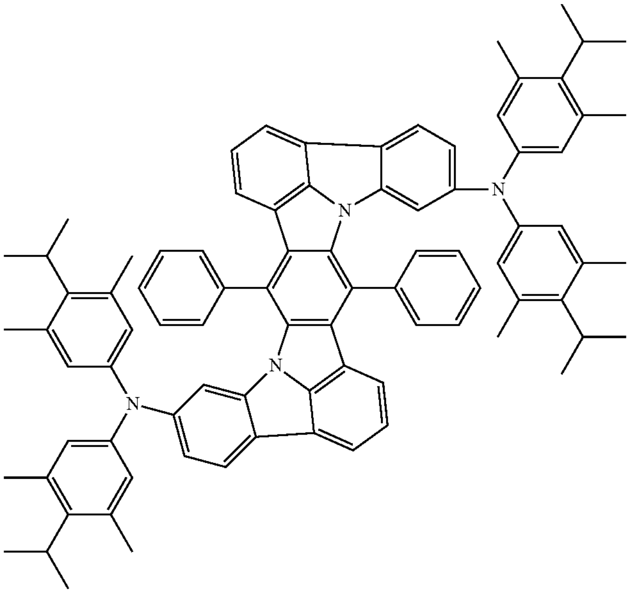
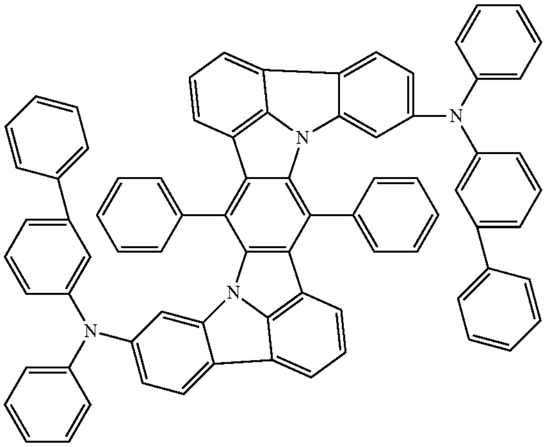

-continued
[Formula 159]
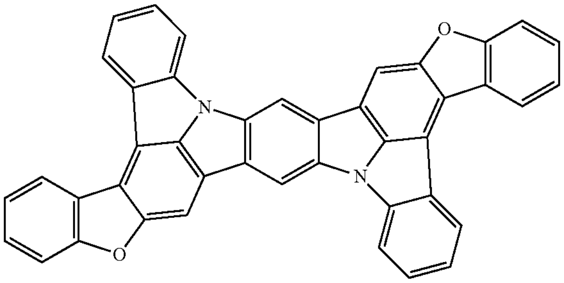
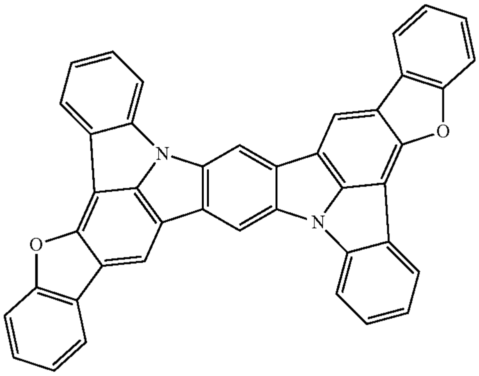
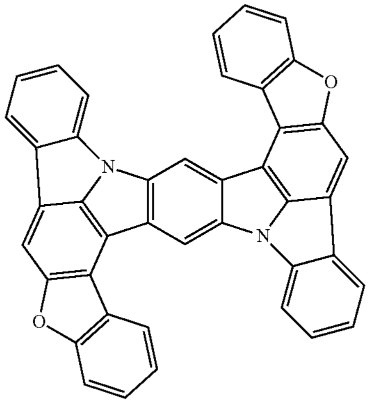
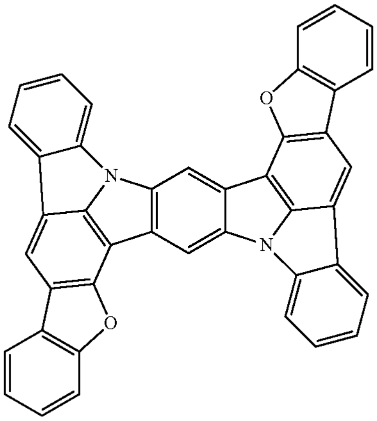
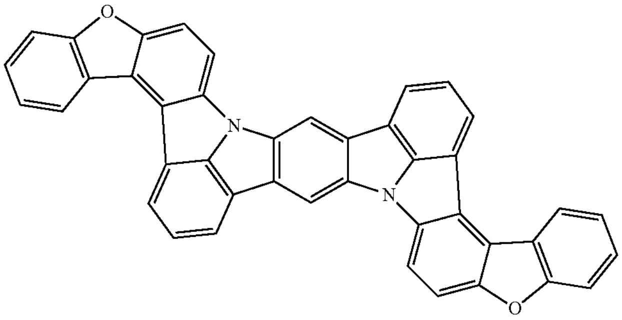
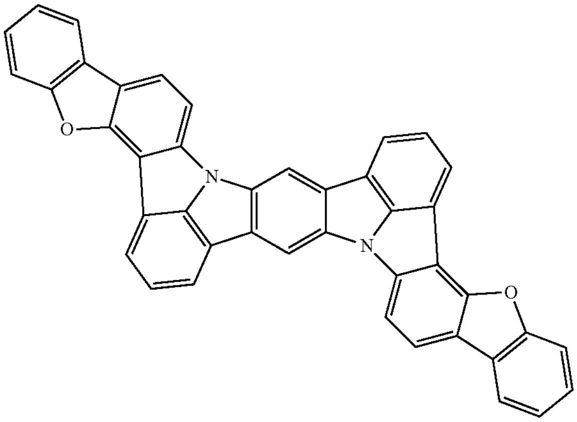

-continued
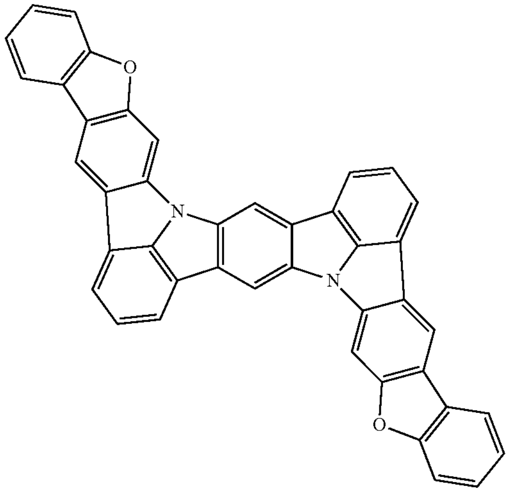
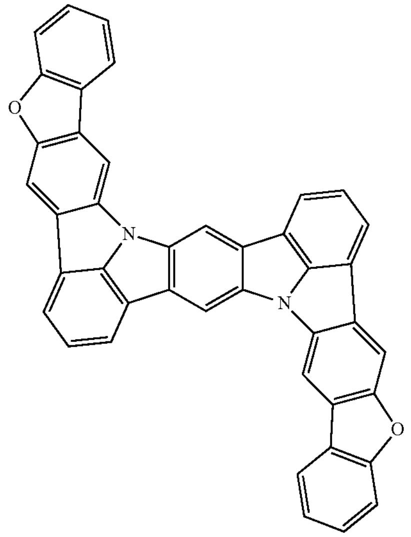
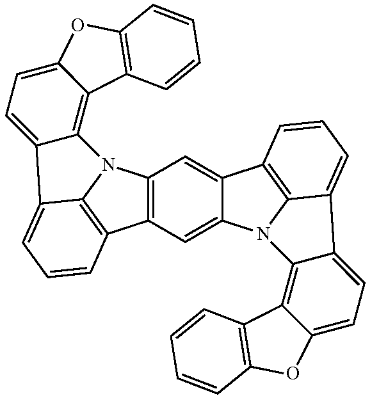
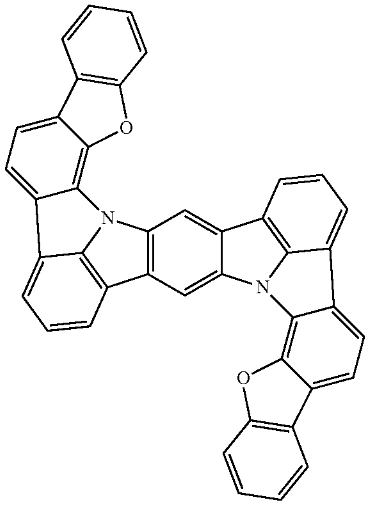
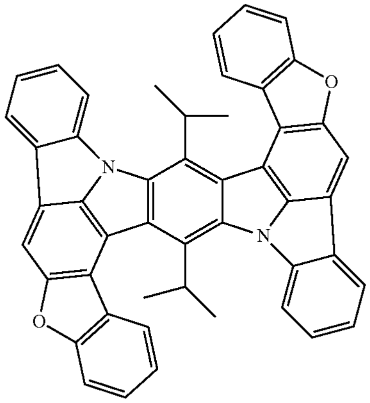
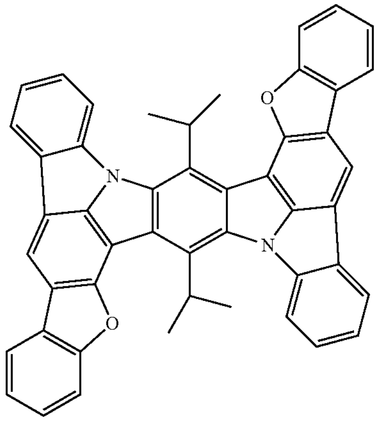

-continued
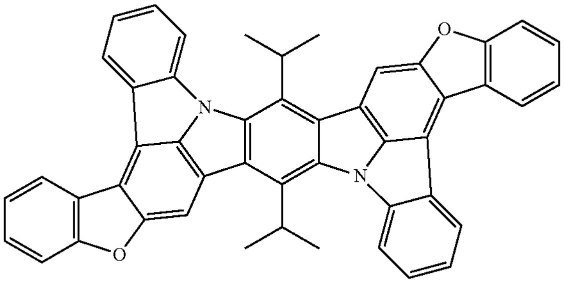
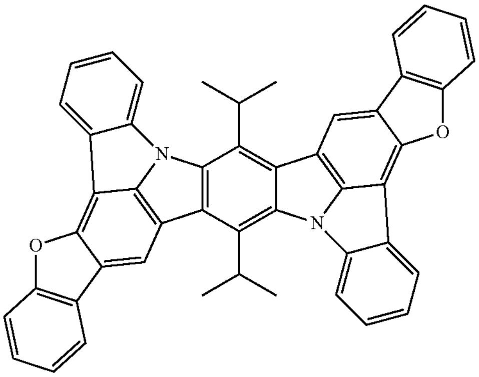
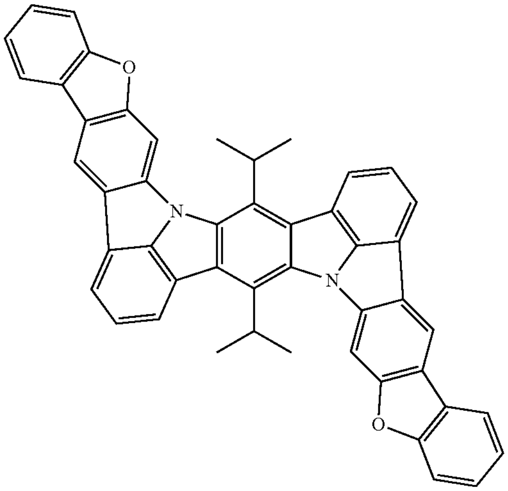
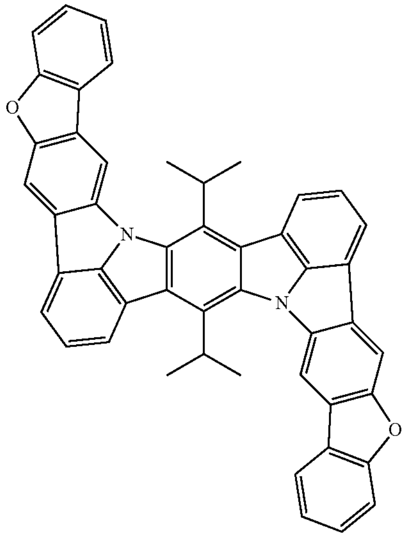
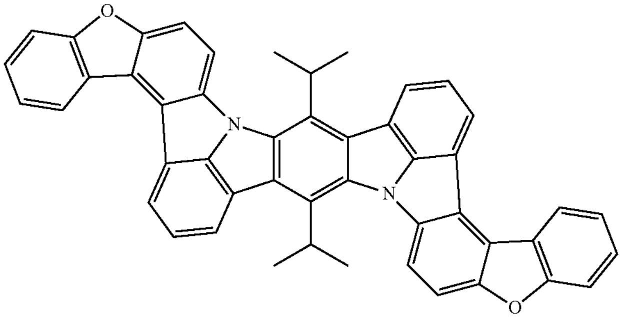
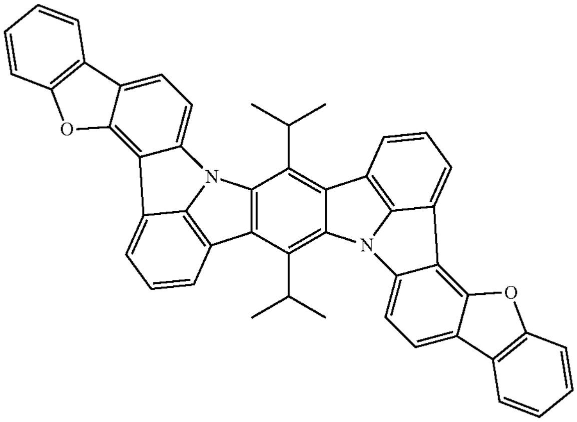

-continued
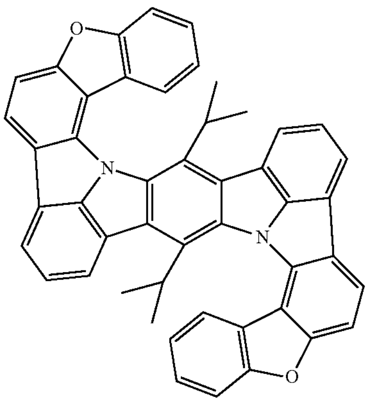
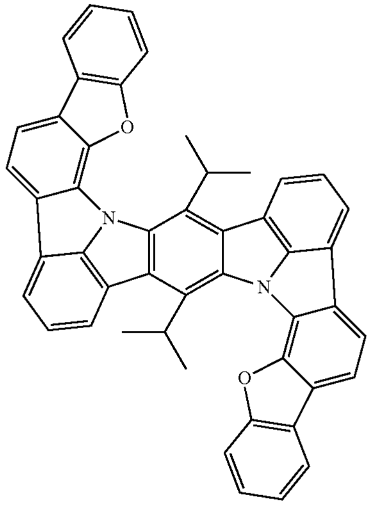
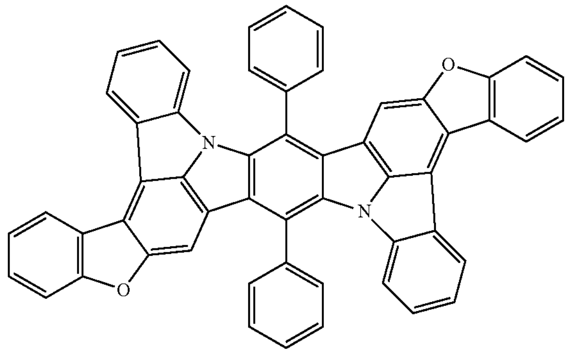
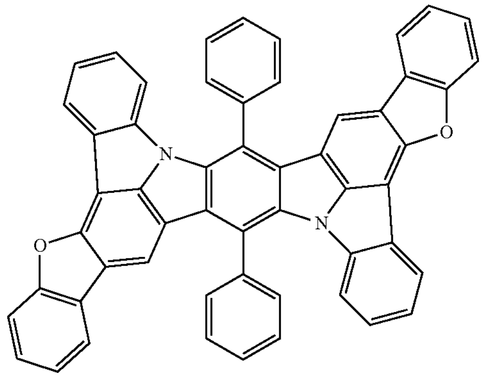
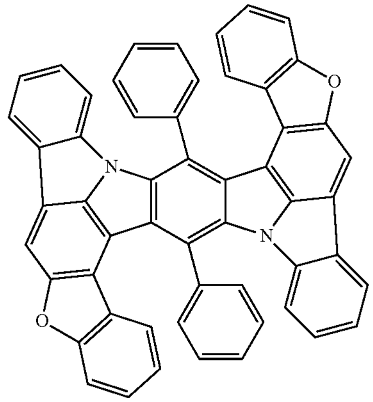
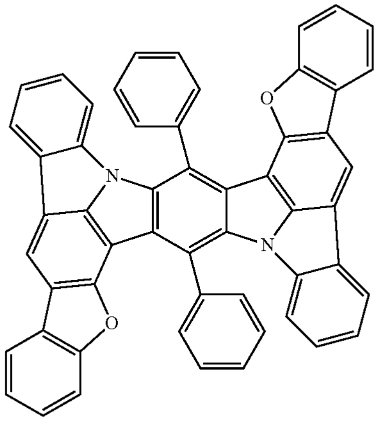
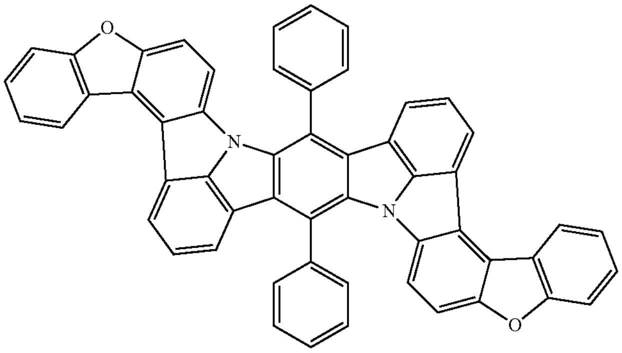

-continued
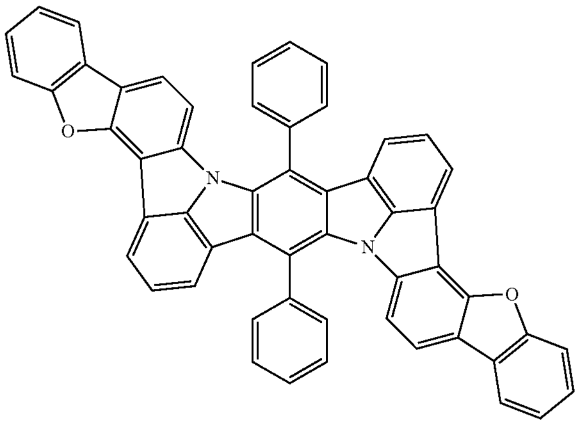
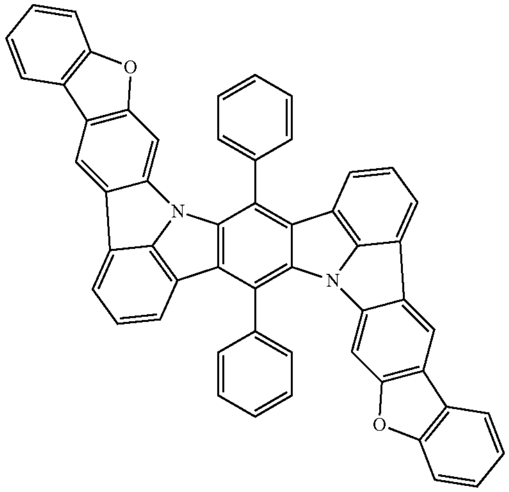
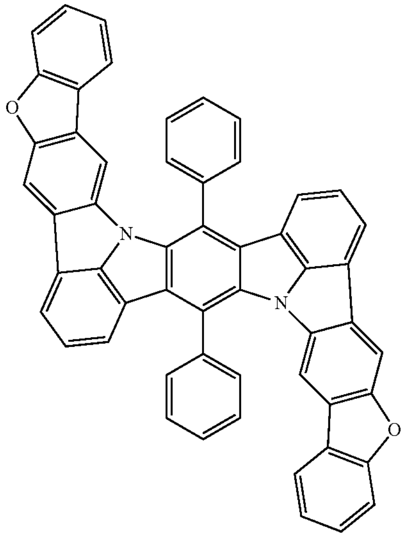
[Formula 160]
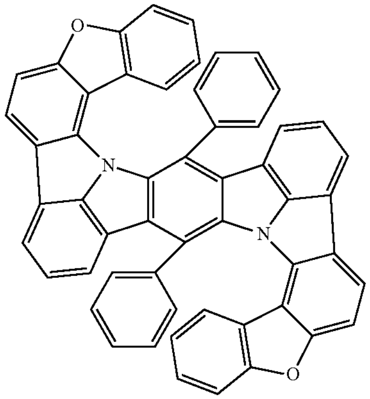

-continued
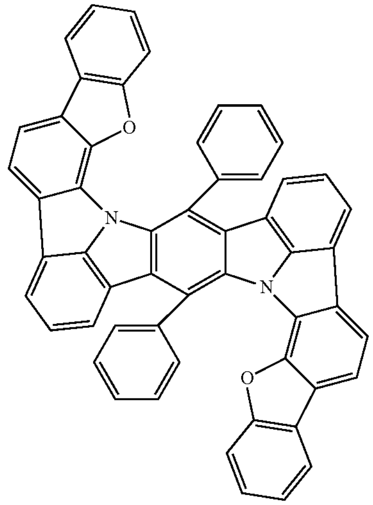
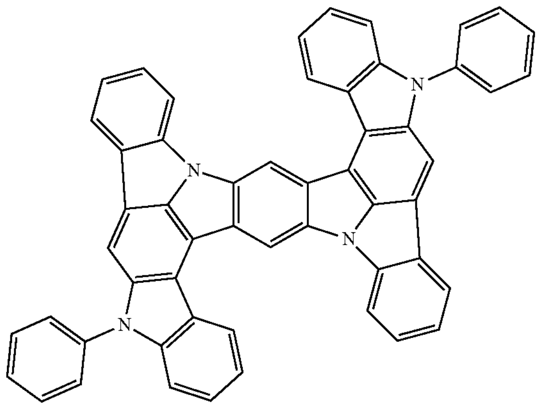
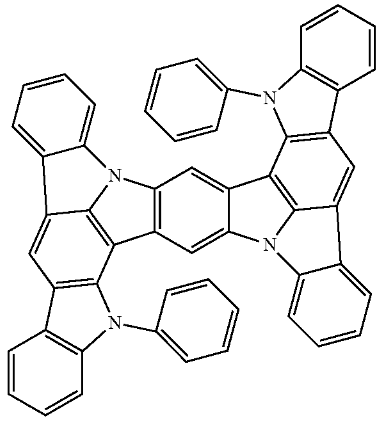
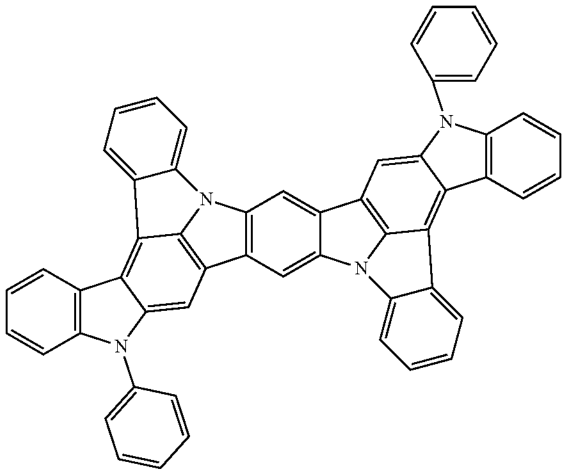
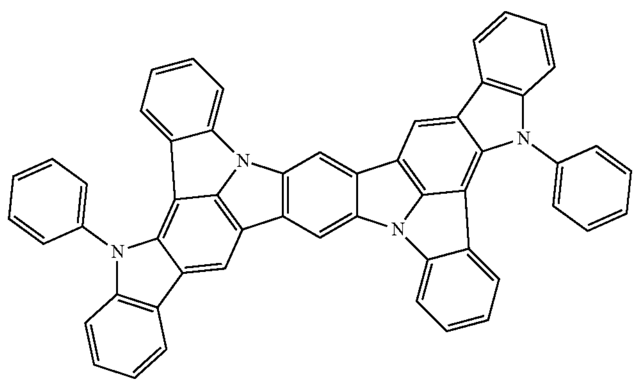
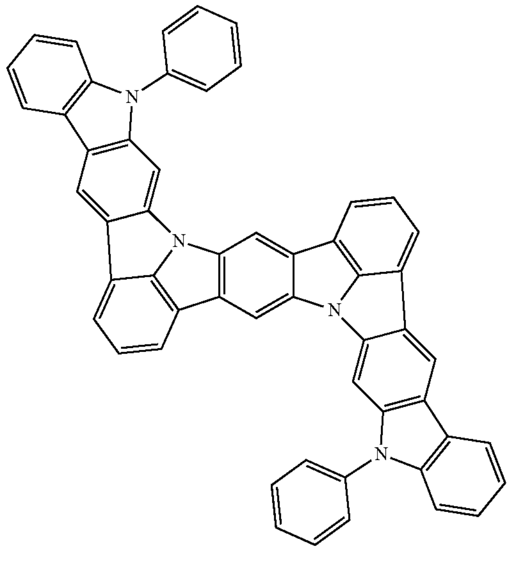

-continued
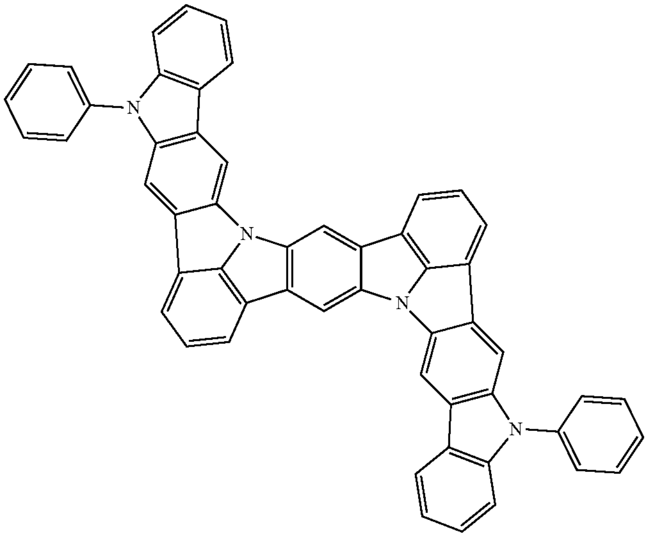
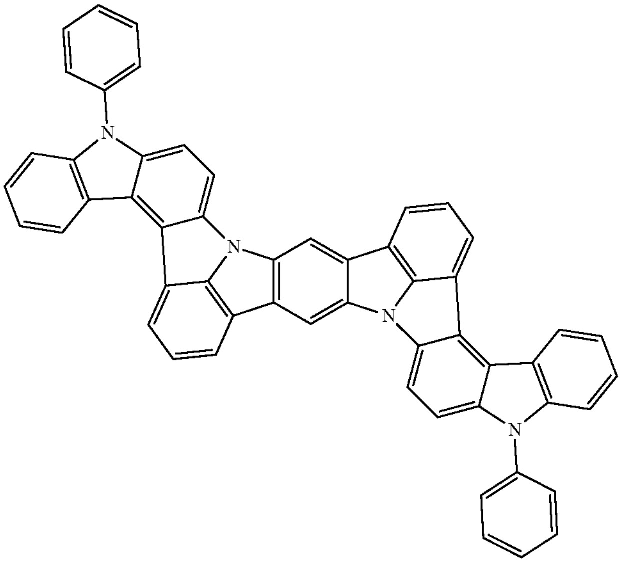
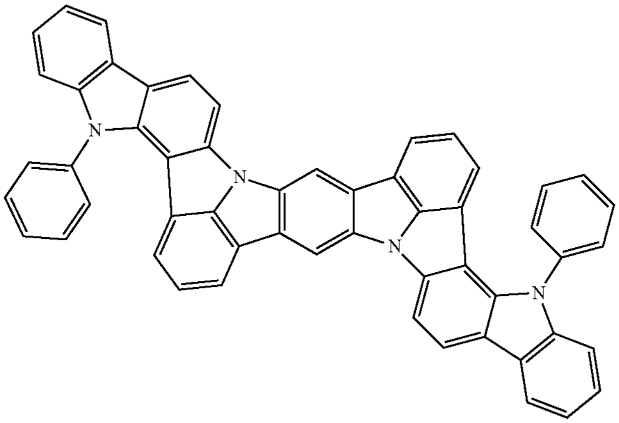
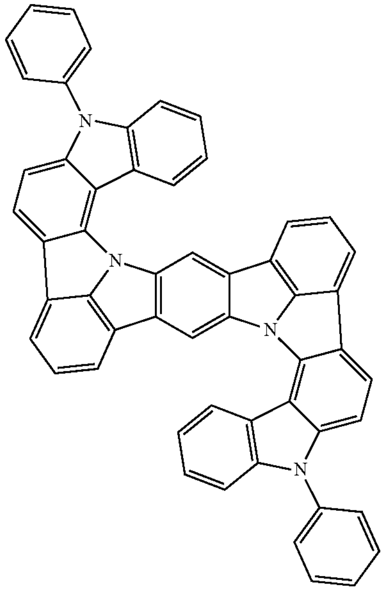

-continued
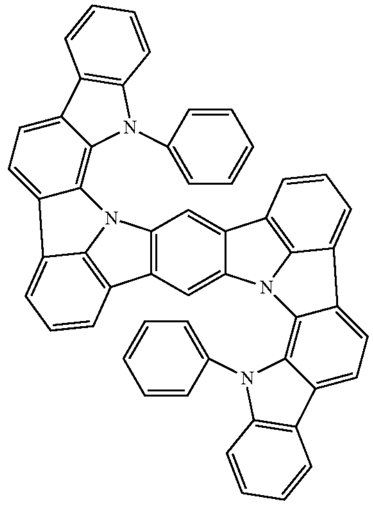
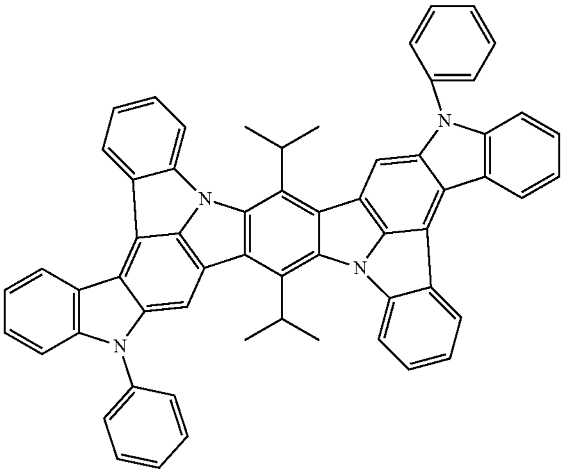
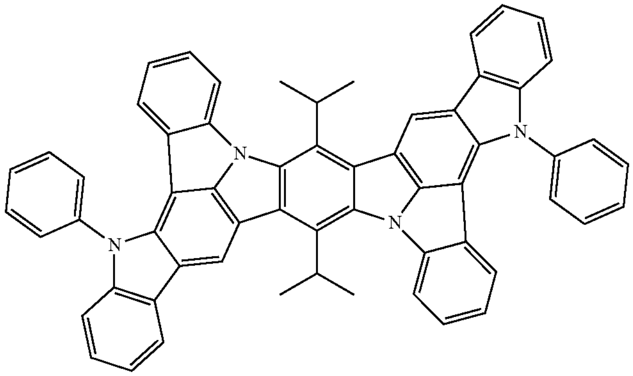
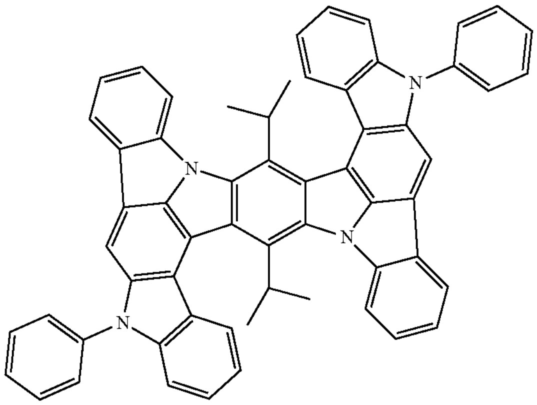
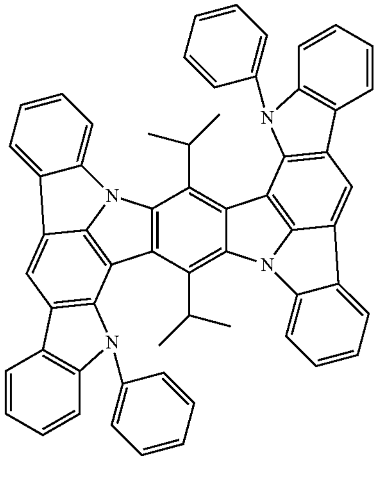
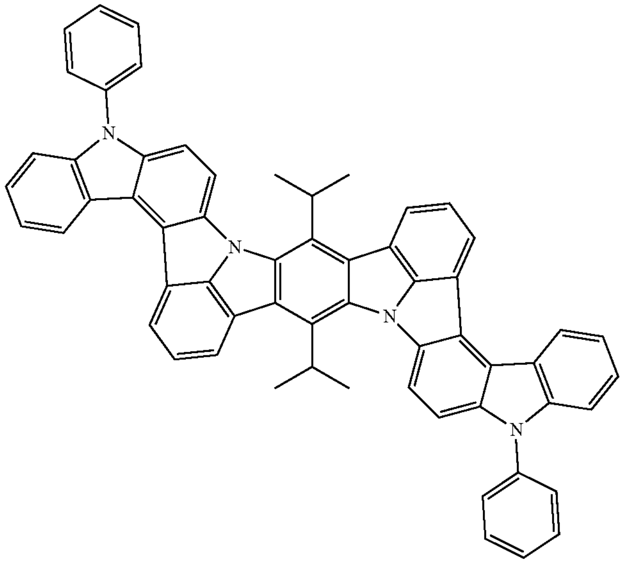

-continued
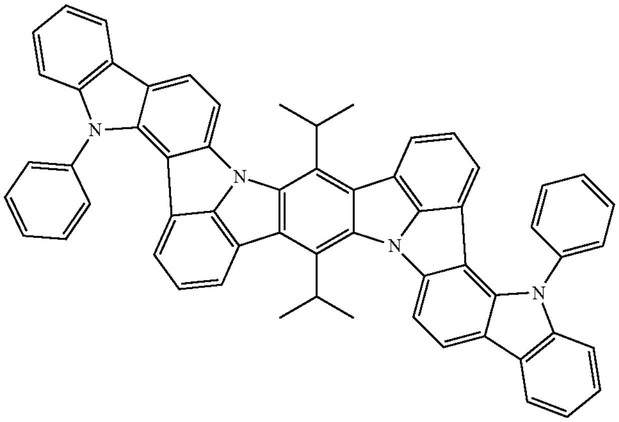
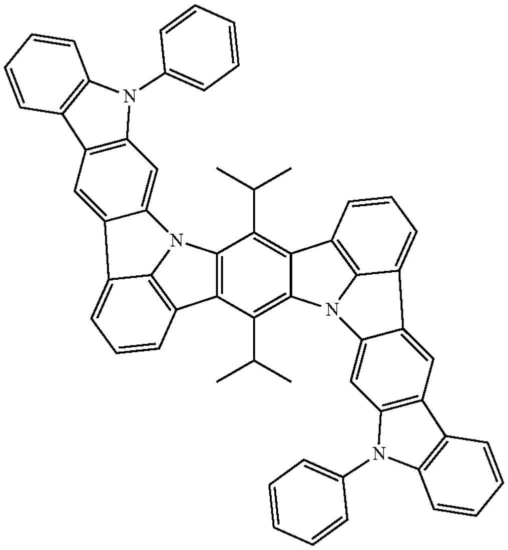
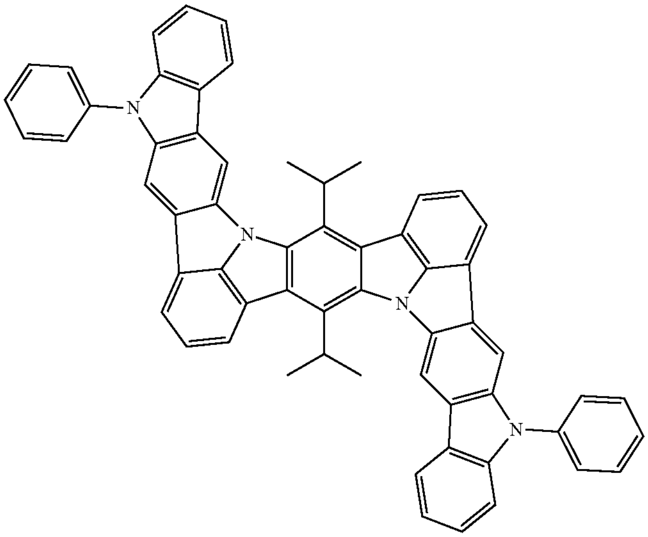
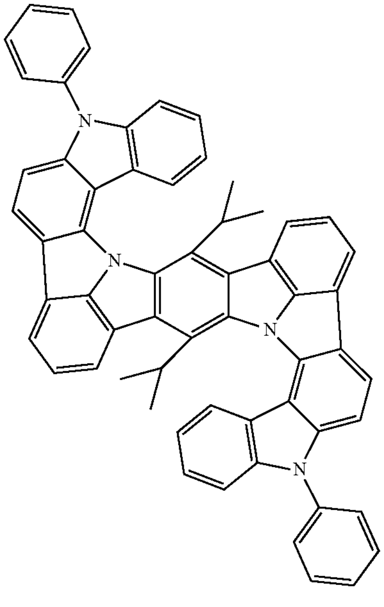
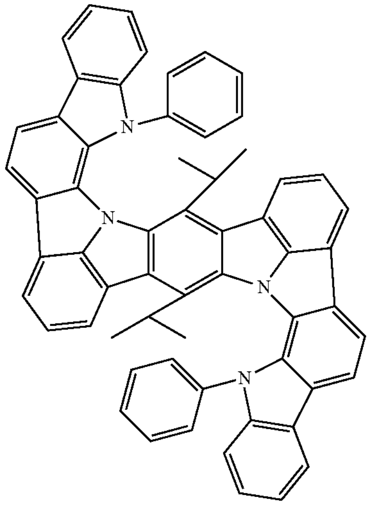

-continued
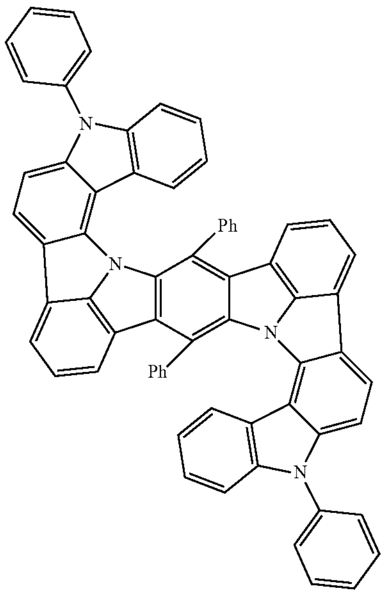
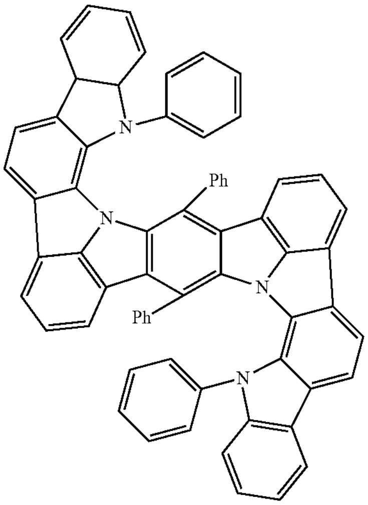
In the formulae, Ph represents a phenyl group
[Formula 161]
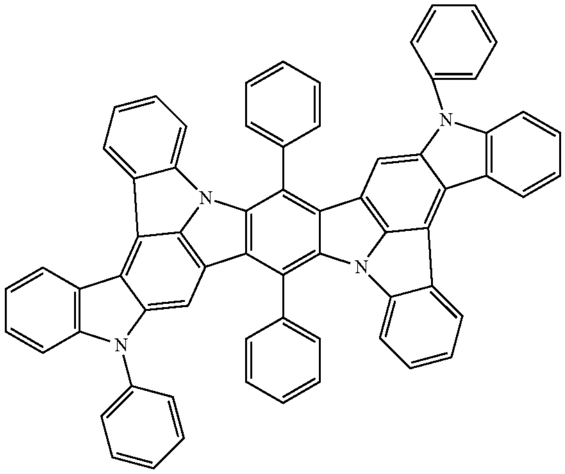
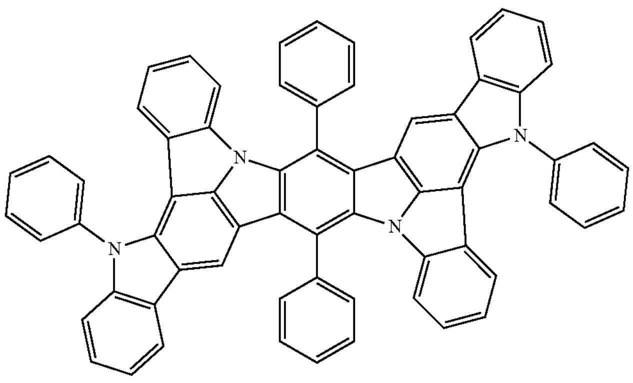
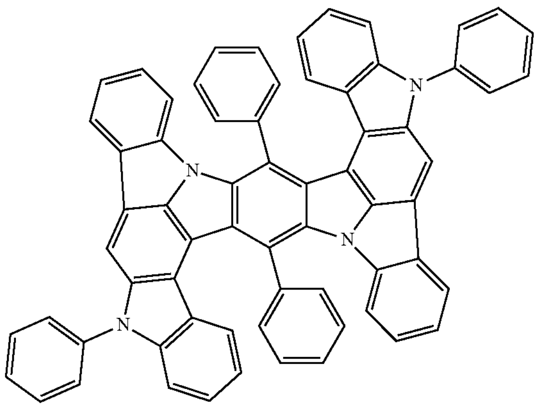

-continued
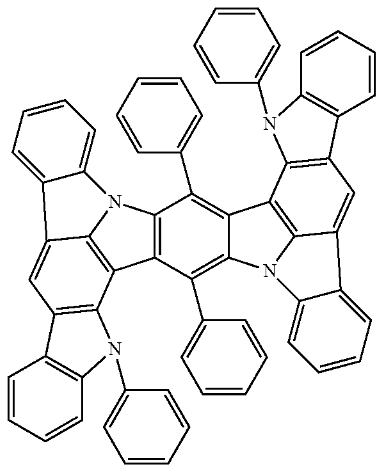
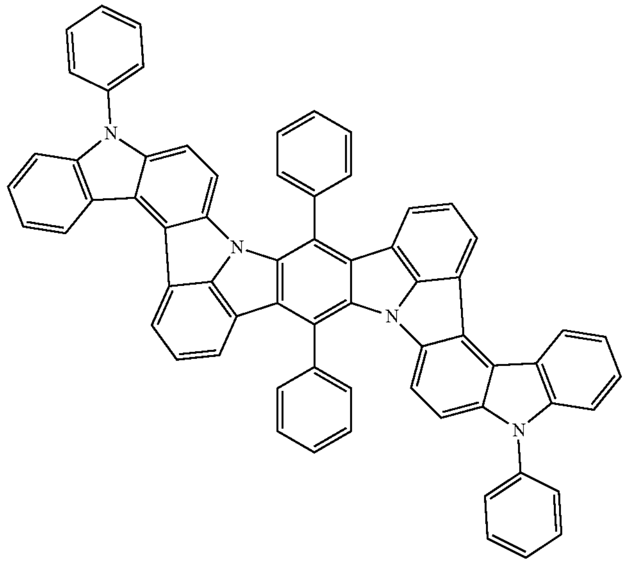
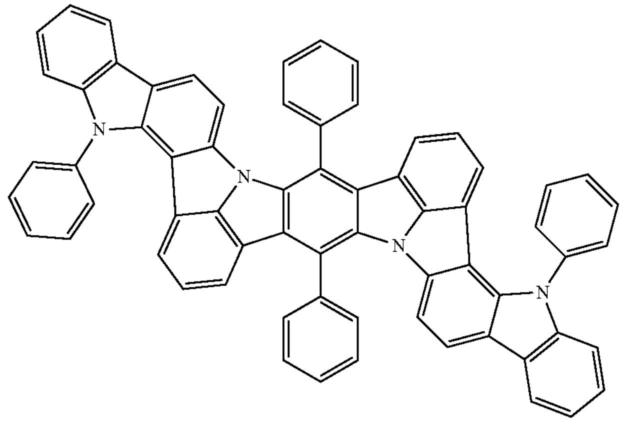
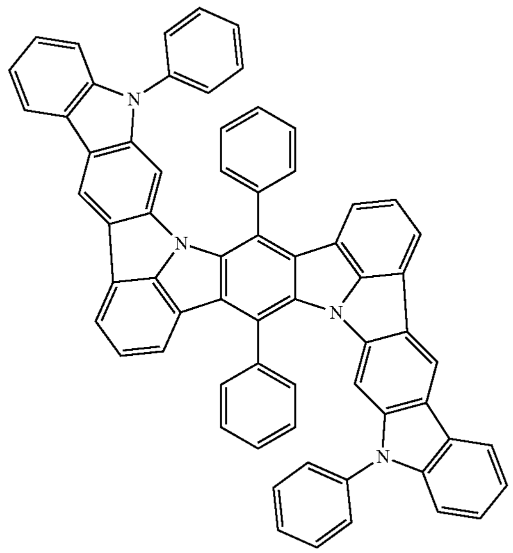
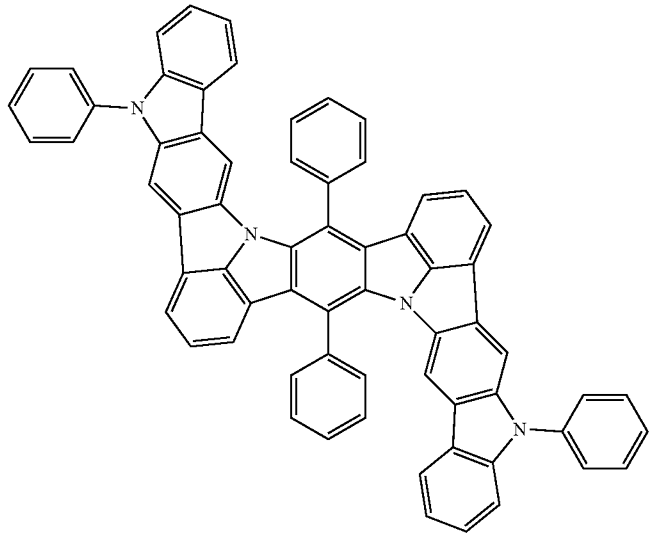

-continued
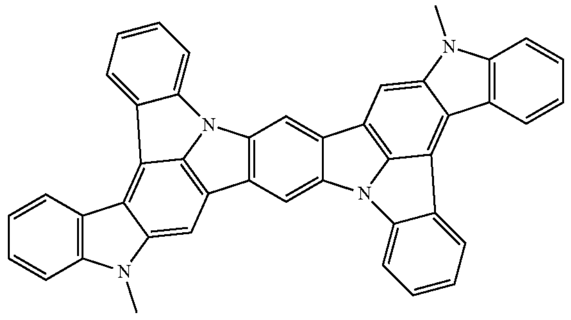
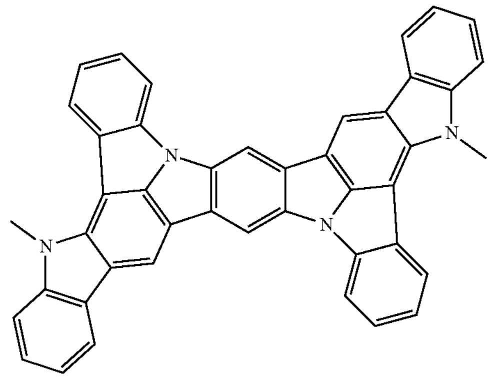
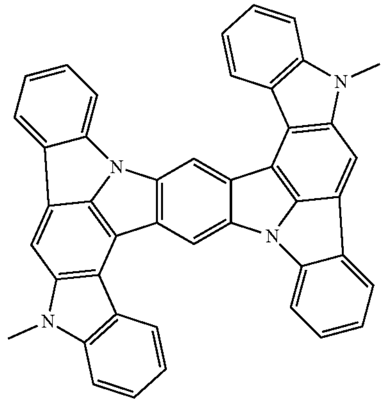
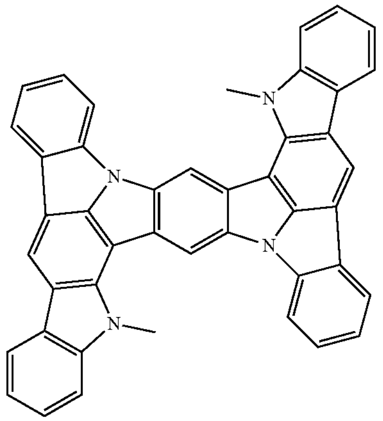
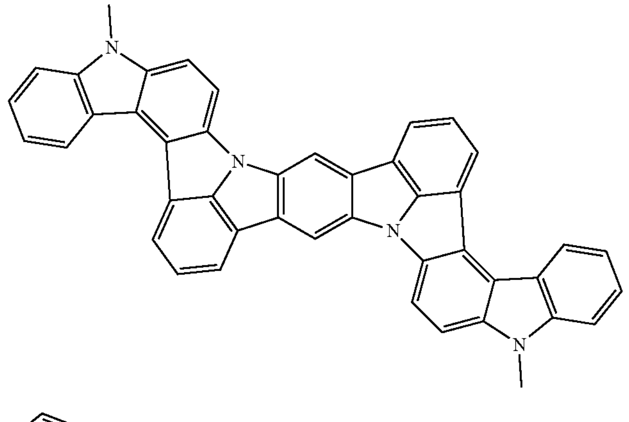
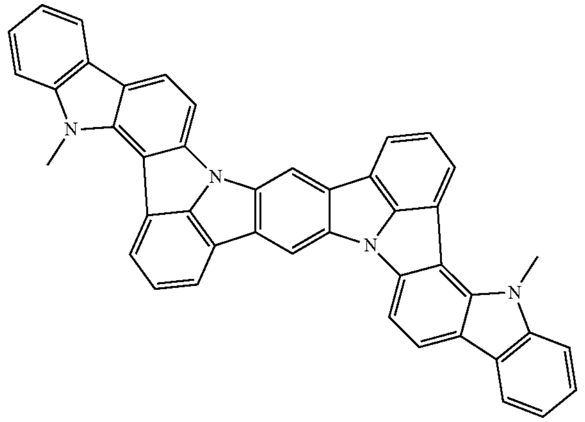
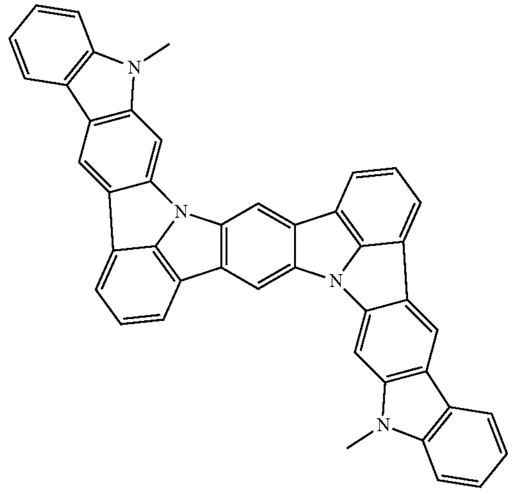

-continued
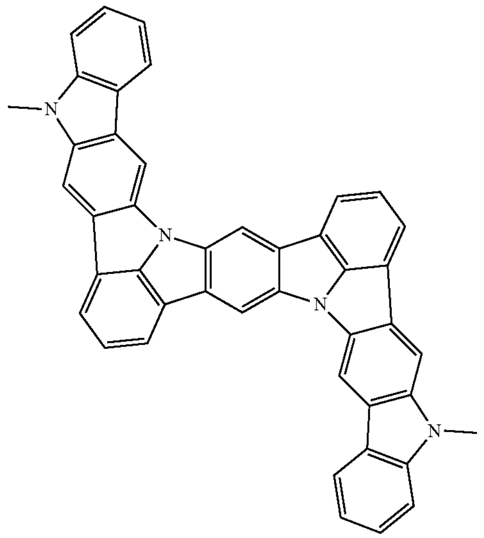
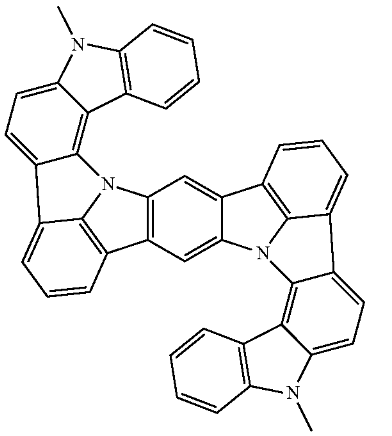
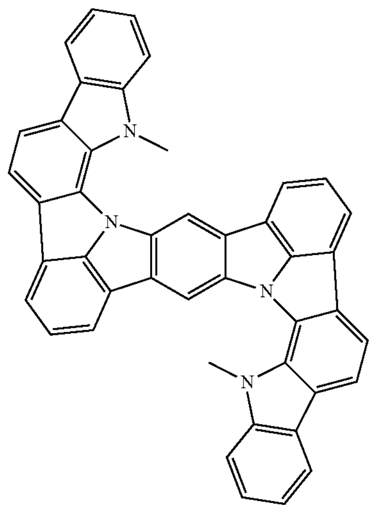
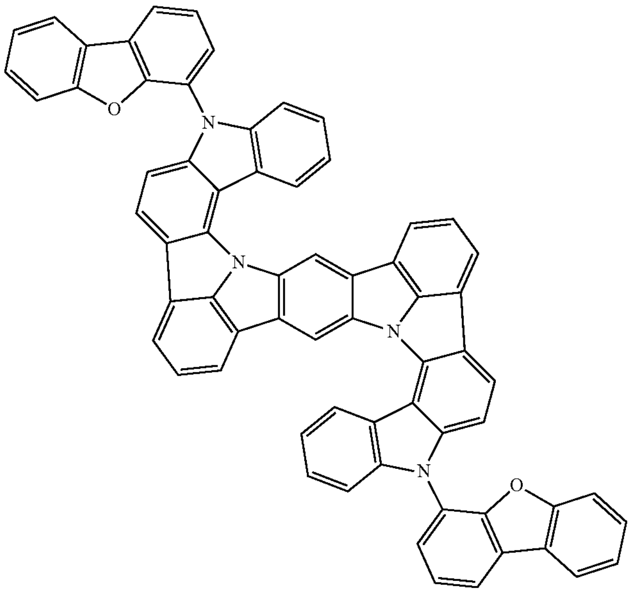
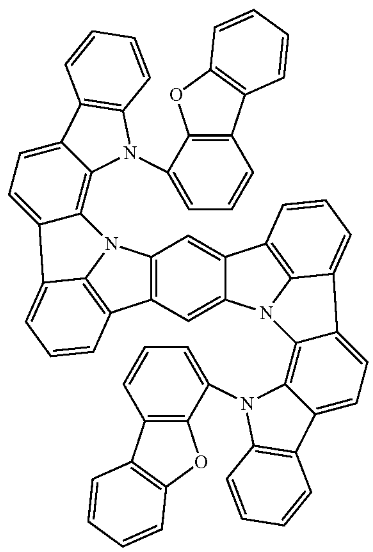
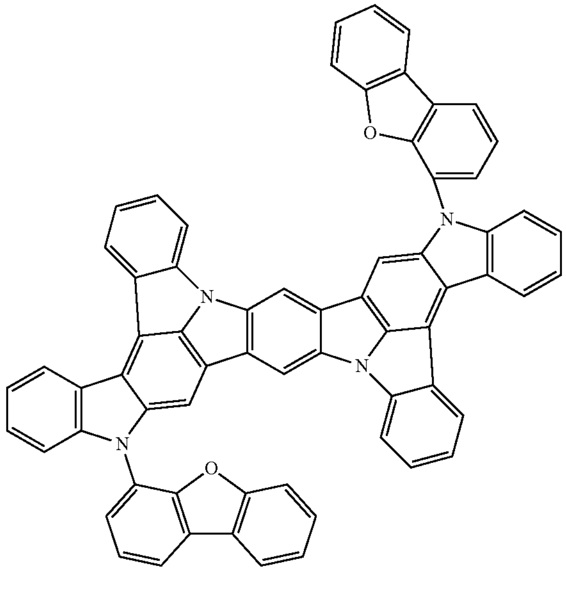

-continued
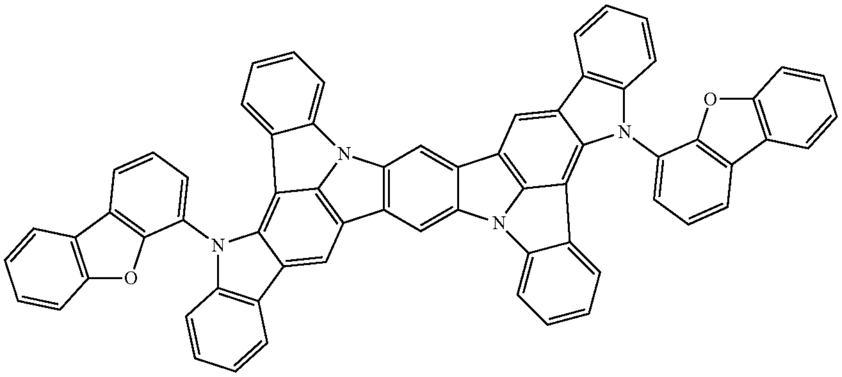
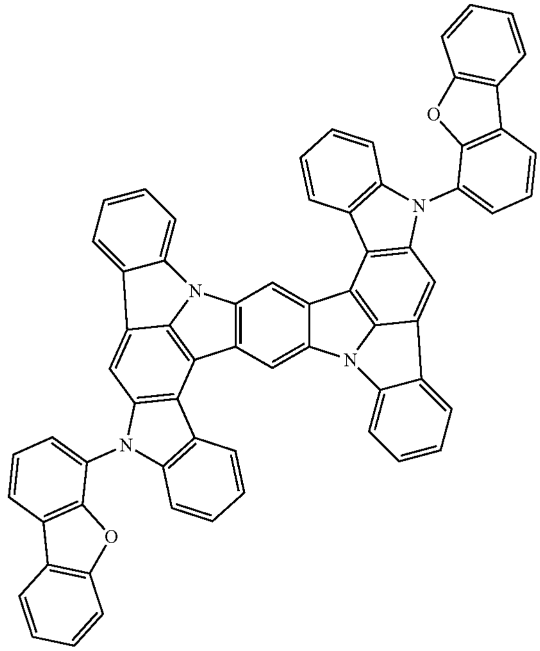
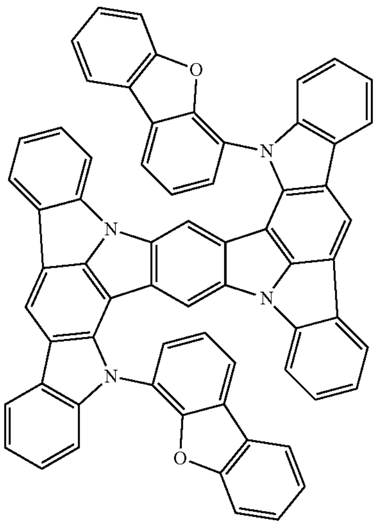
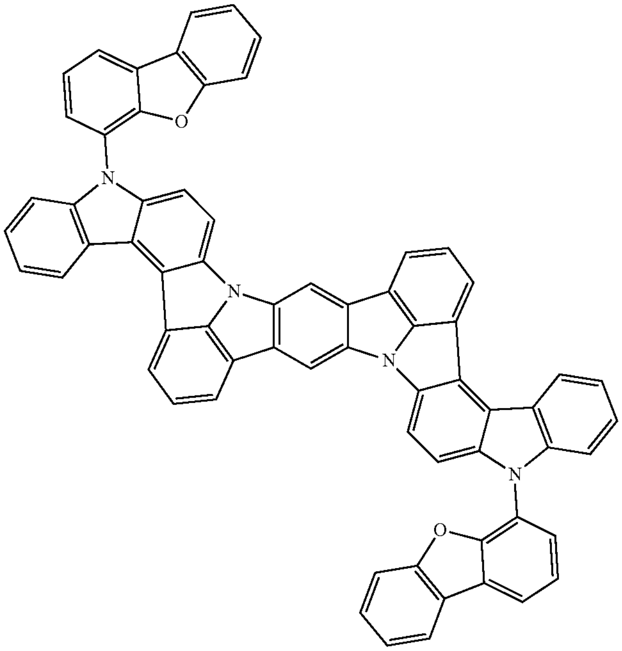

-continued
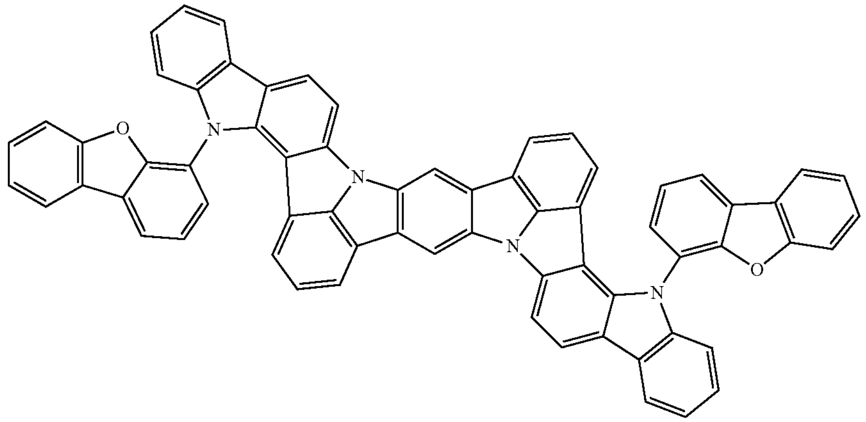
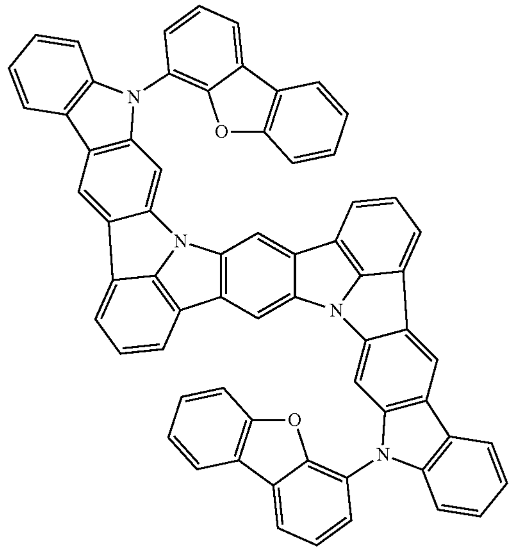
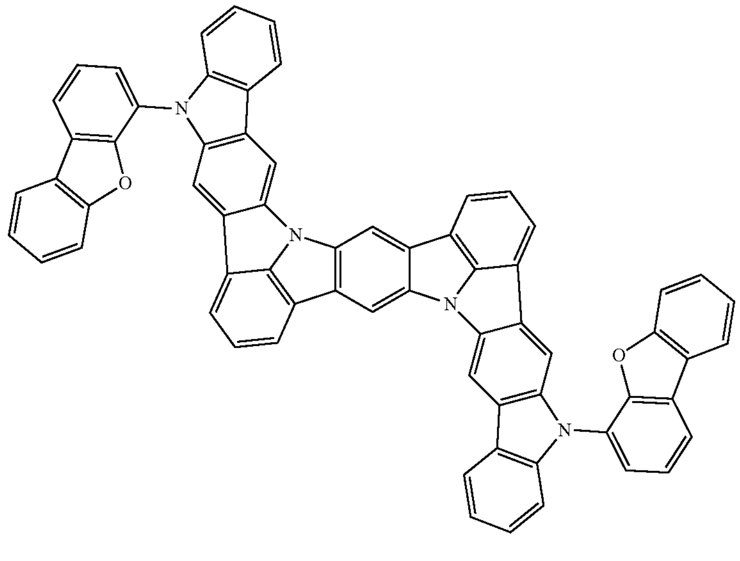

-continued
[Formula 162]
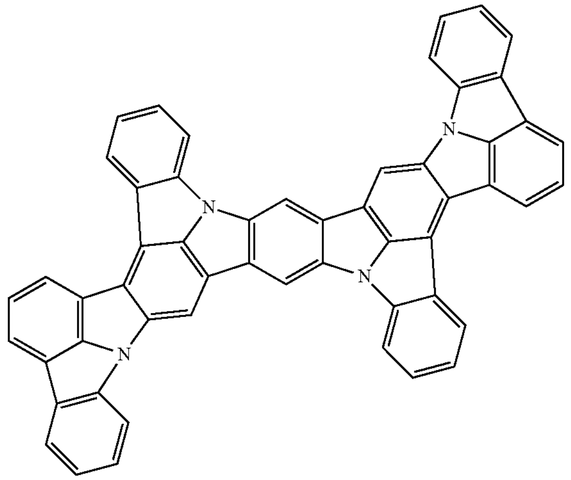
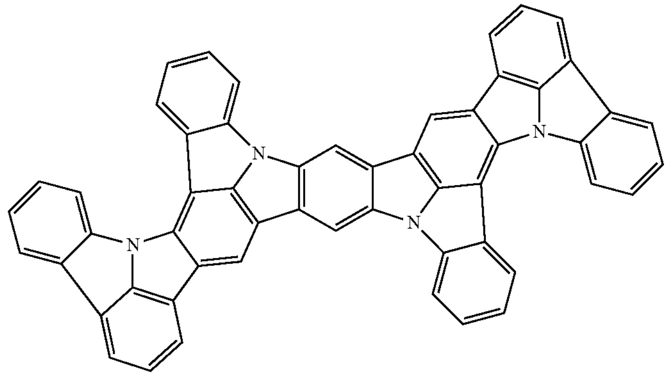
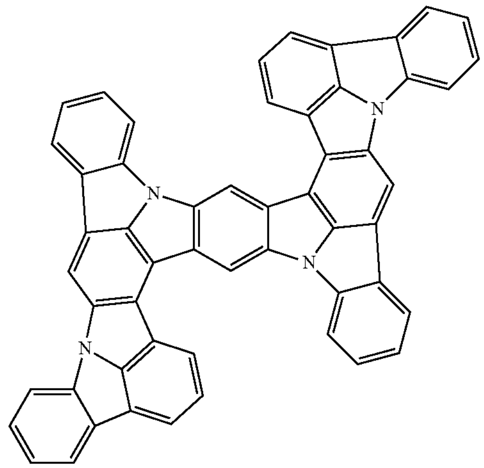
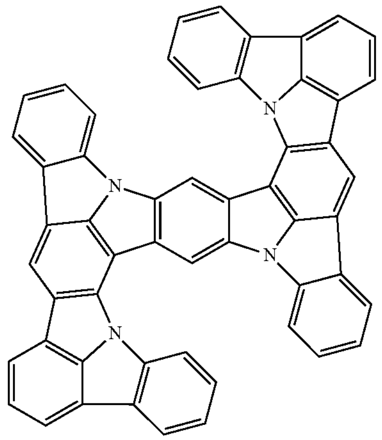
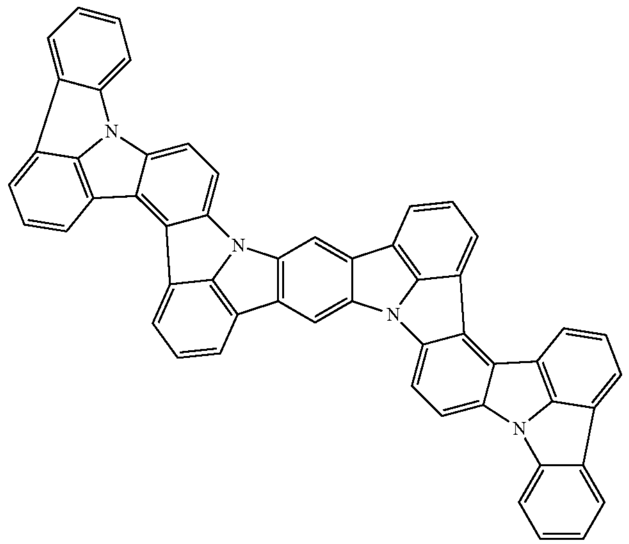

-continued
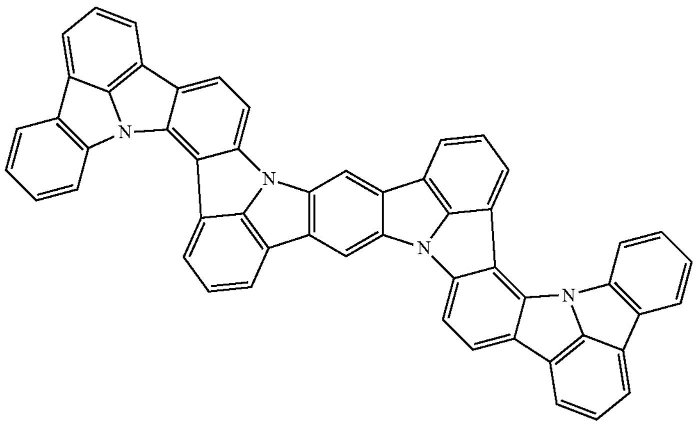
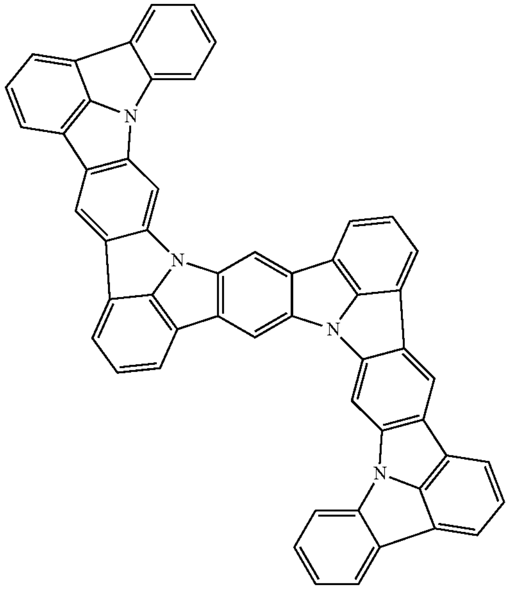
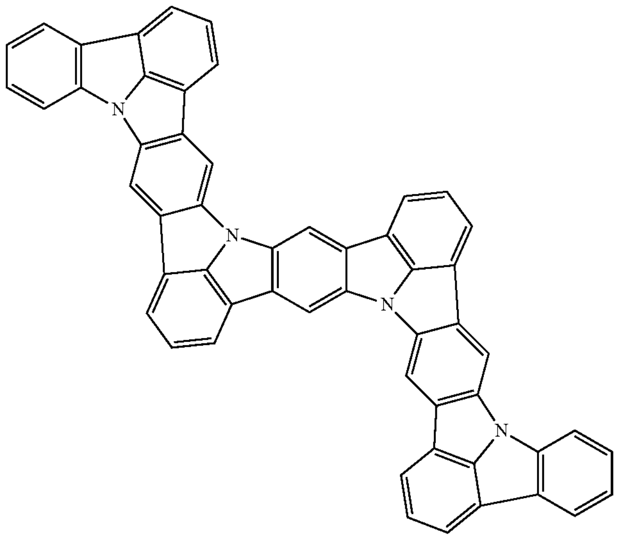
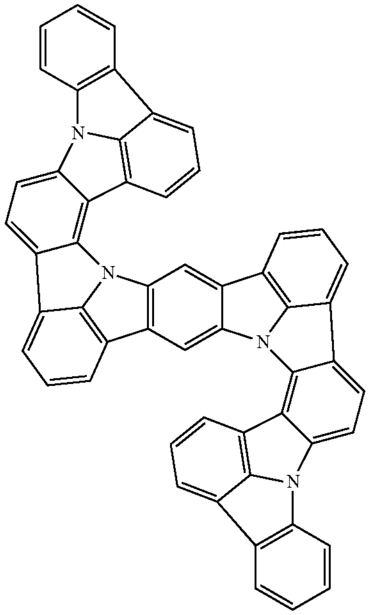
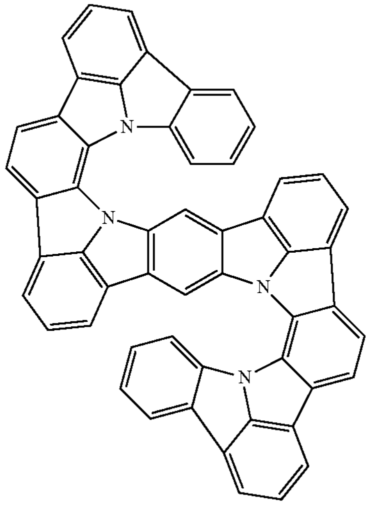

-continued
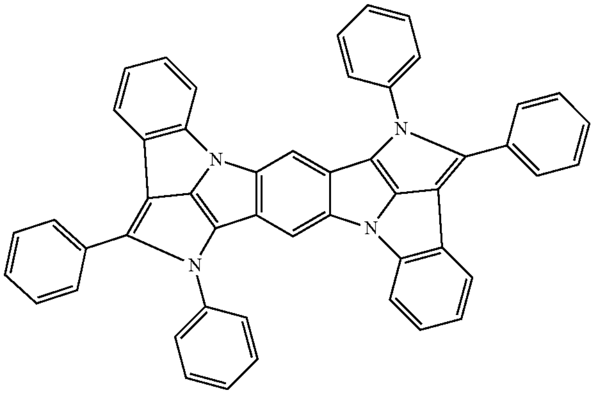
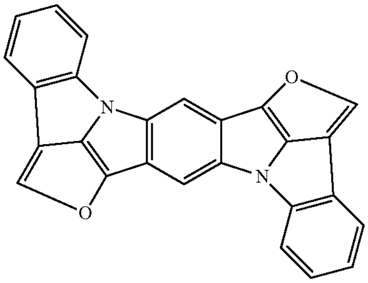
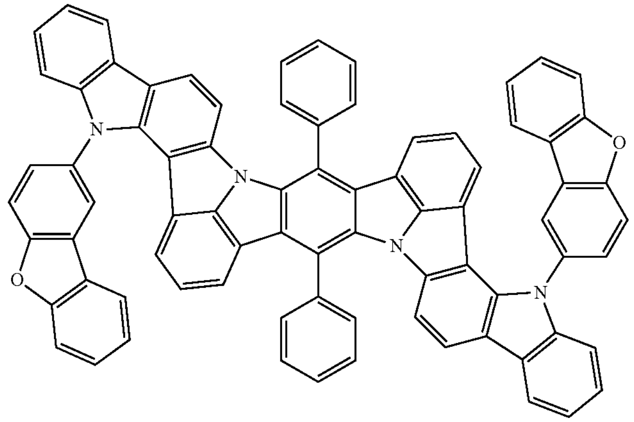
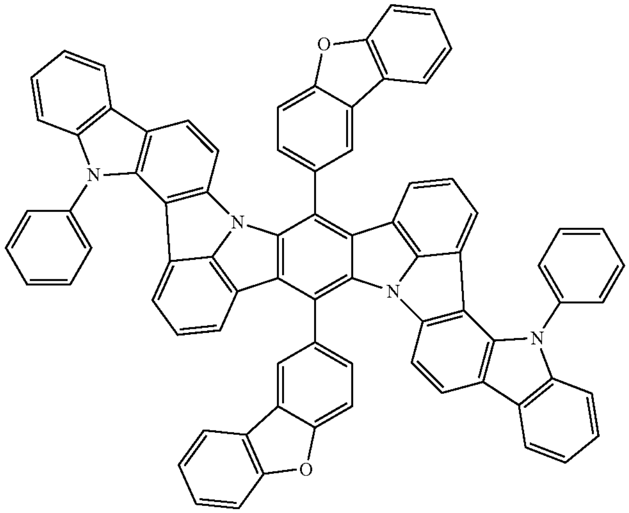
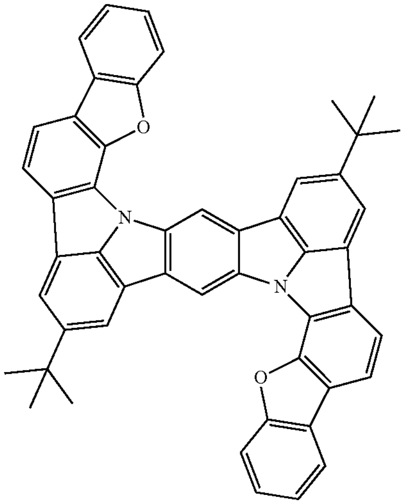

-continued

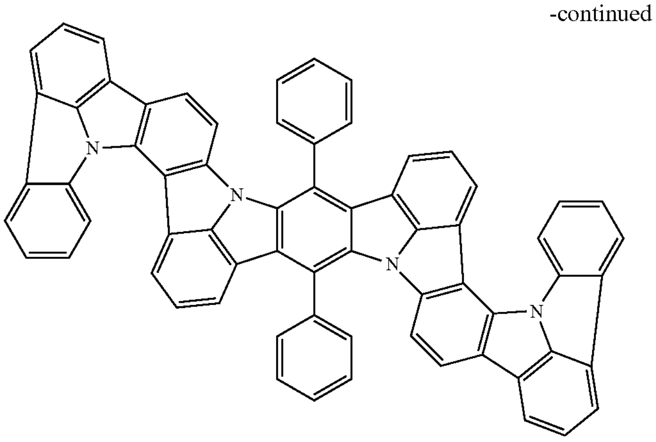

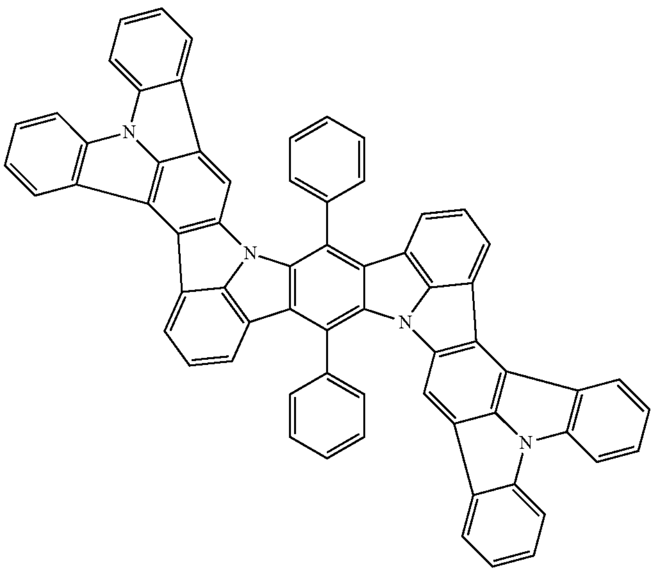 [SMILES: c1ccc(-c2c3c4cccc5c6c7c8ccccc8n8c9ccccc9c(cc6n(c3c(-c3ccccc3)c3c6cccc9c%10c%11c%12ccccc%12n%12c%13ccccc%13c(cc%10n(c23)c69)c%11%12)c45)c78)cc1]

Compound Represented by Formula (6)

The compound represented by the formula (6) will be described below.

[Formula 164]

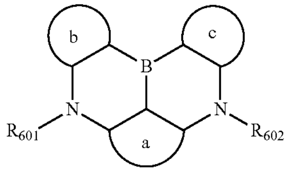

(6)

In the formula (6):

a ring a, a ring b and a ring c are each independently a substituted or unsubstituted aromatic hydrocarbon ring having 6 to 50 ring carbon atoms, or a substituted or unsubstituted heterocyclic ring having 5 to 50 ring atoms;

$R_{601}$ and $R_{602}$ are each independently bonded to the ring a, ring b or ring c to form a substituted or unsubstituted heterocycle, or not bonded thereto to form no substituted or unsubstituted heterocycle; and $R_{601}$ and $R_{602}$ not forming the substituted or unsubstituted heterocycle are each independently a substituted or unsubstituted alkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a substituted or unsubstituted aryl group having 6 to 50 ring carbon atoms, or a substituted or unsubstituted heterocyclic group having 5 to 50 ring atoms.

Specific Examples of Compound Represented by Formula (6)

Specific examples of the compound represented by the formula (6) are shown below. It should however be noted that these specific examples are merely exemplary and do not limit the compound represented by the formula (6). In the specific examples of the compound herein, Ph represents a phenyl group, tBu represents a tert-butyl group, and tAm represents a tert-amyl group.

[Formula 165]
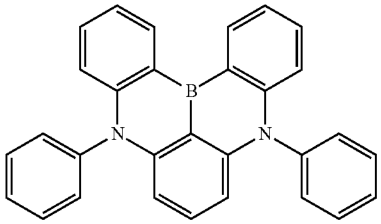
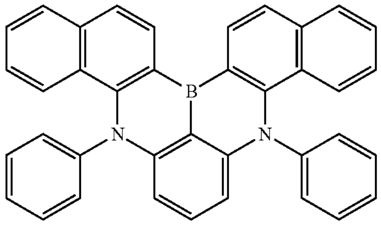
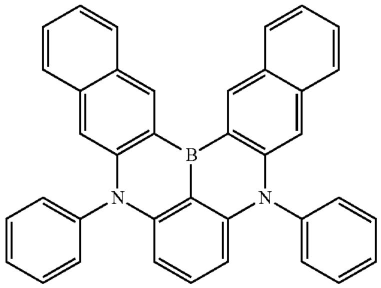
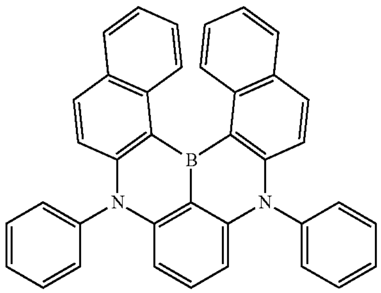
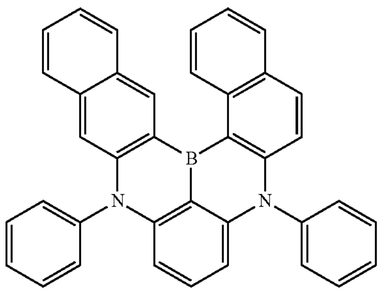
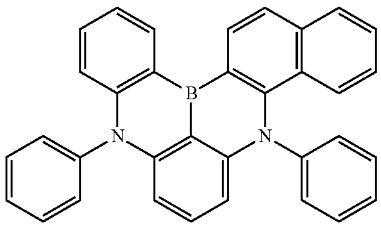
-continued
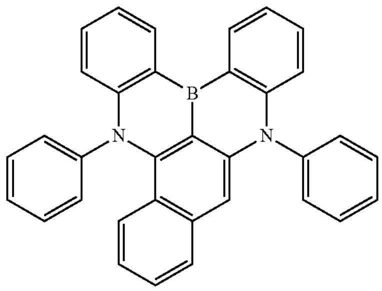
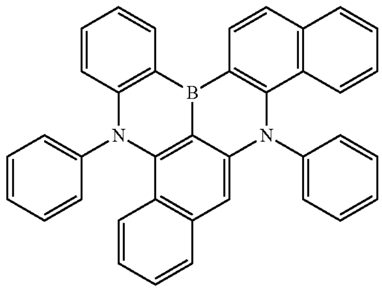
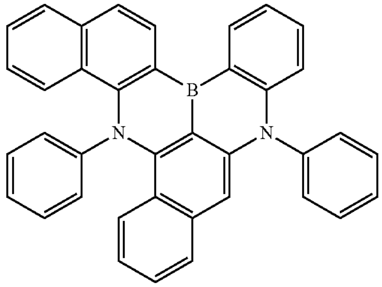
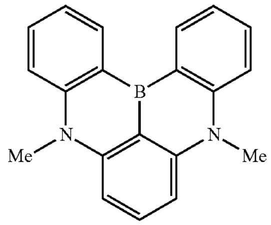
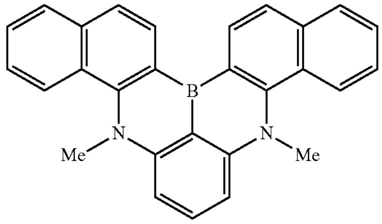
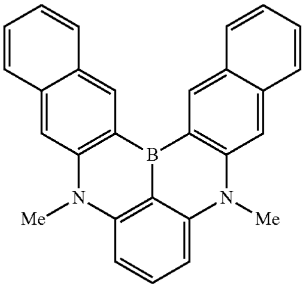

-continued
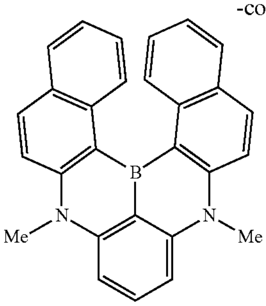
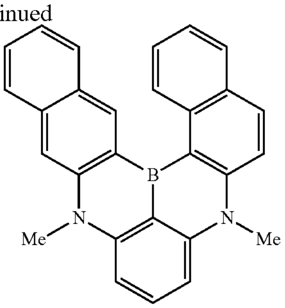
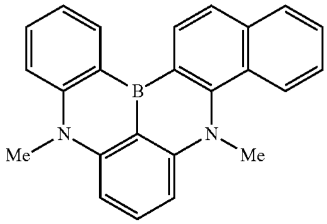
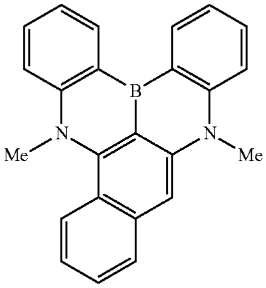
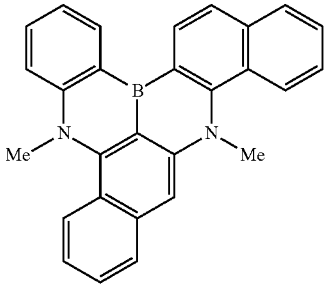
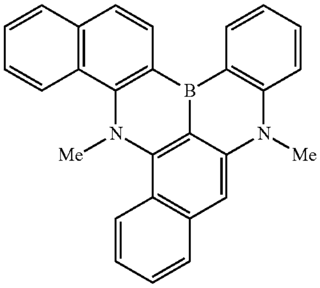
-continued
[Formula 166]
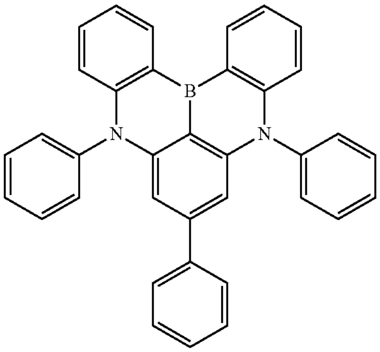
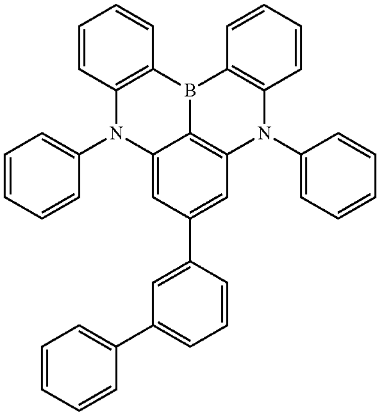
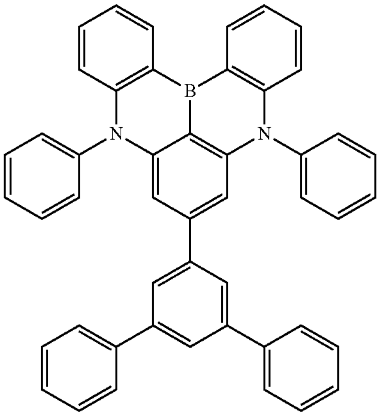
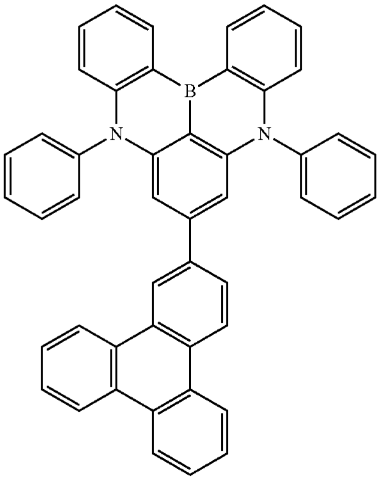

-continued
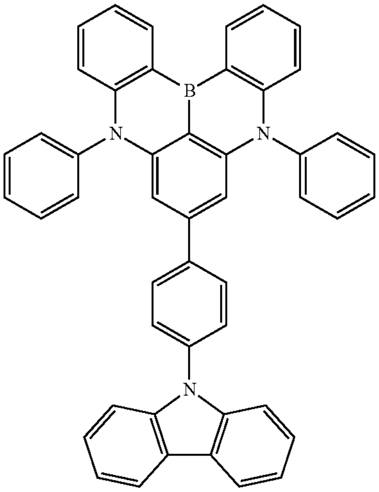
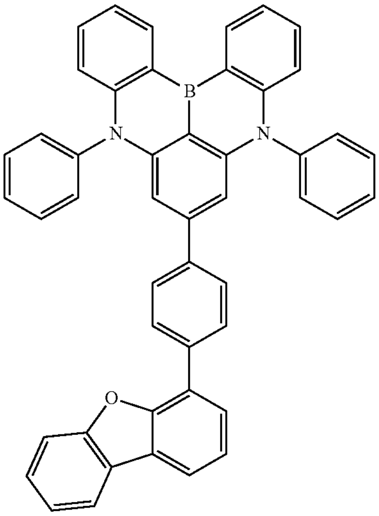
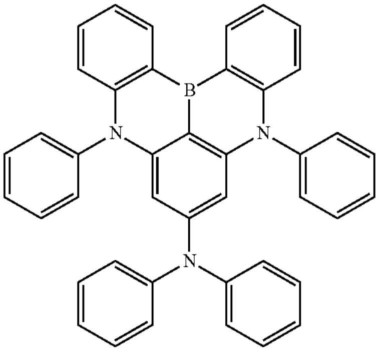
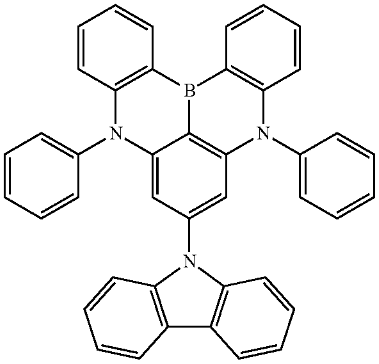
-continued
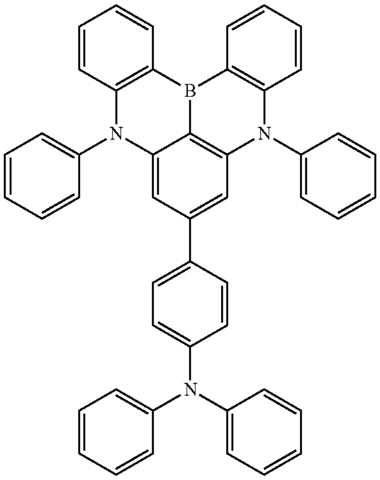
[Formula 167]
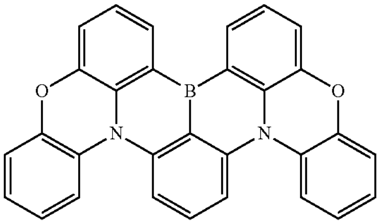
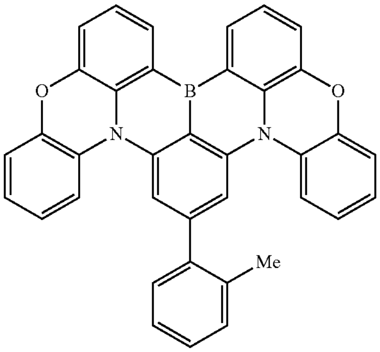
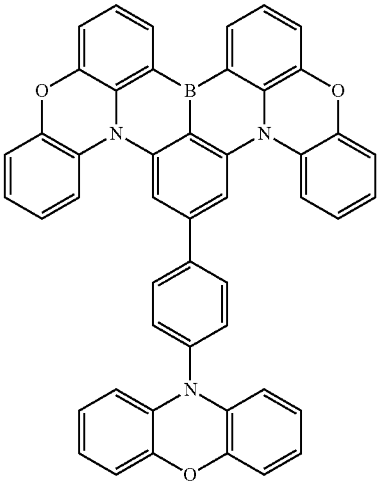

-continued
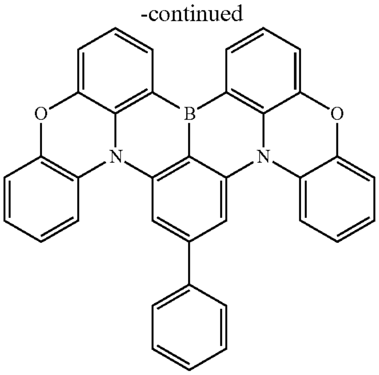
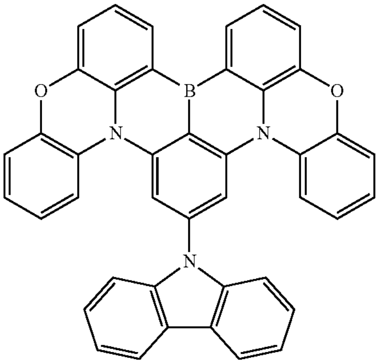
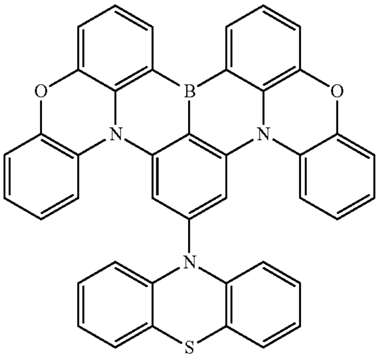
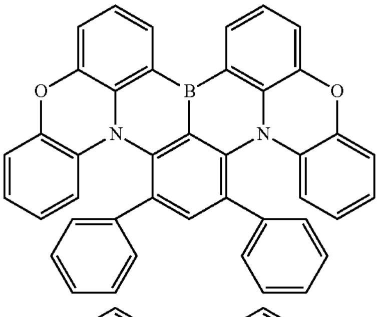
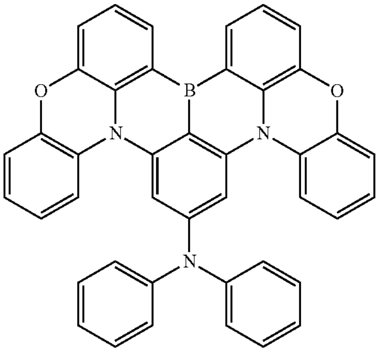
-continued
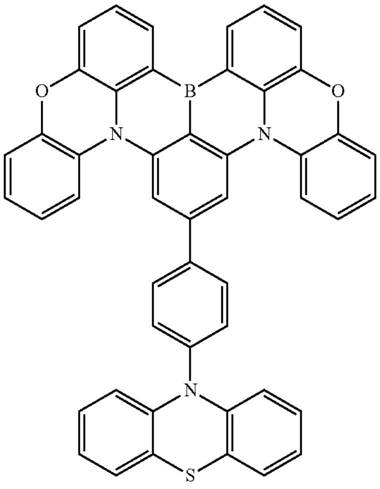
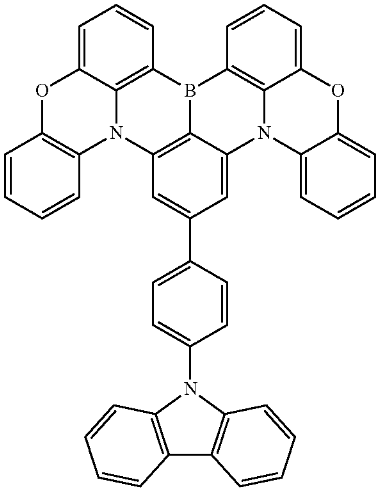
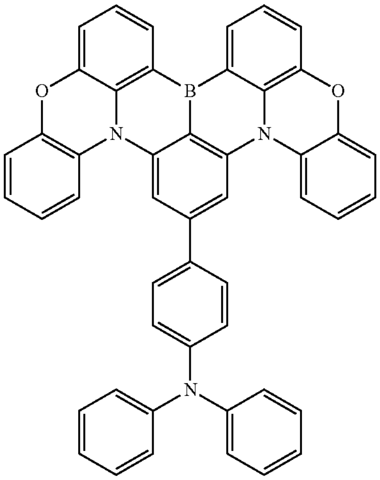

-continued
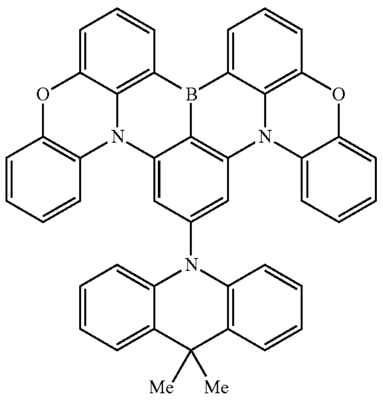
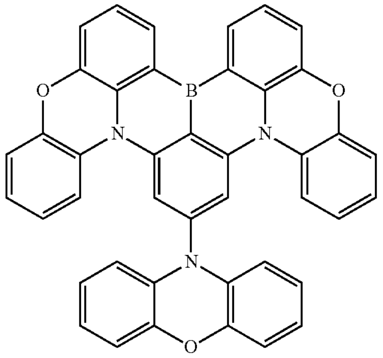
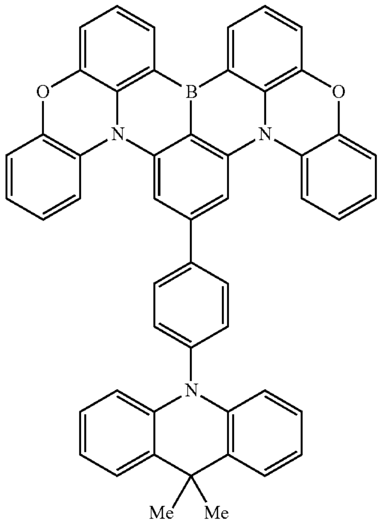
[Formula 168]
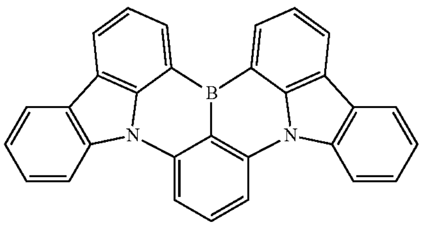
-continued
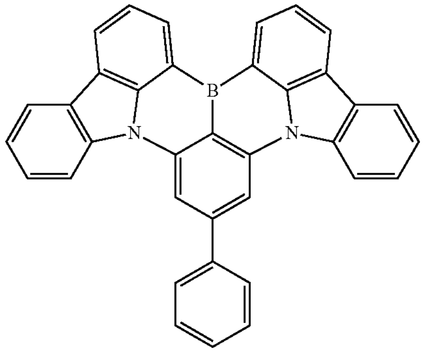
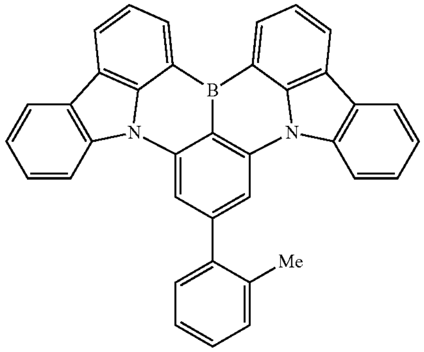
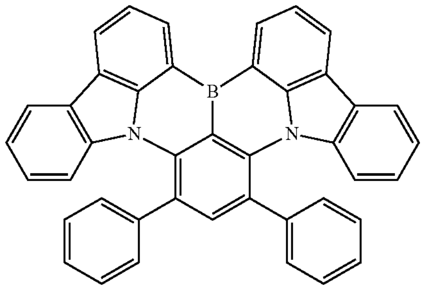
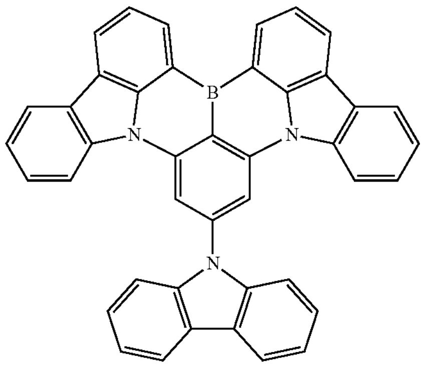
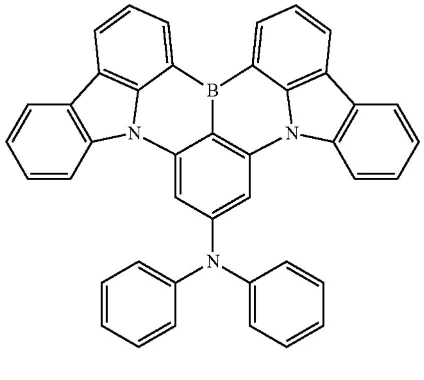

-continued
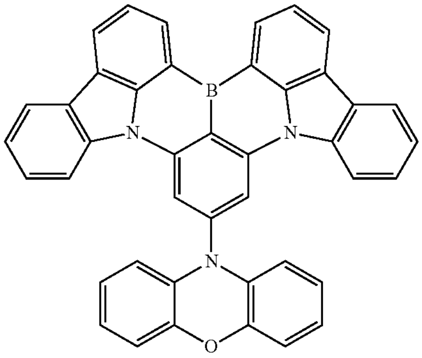
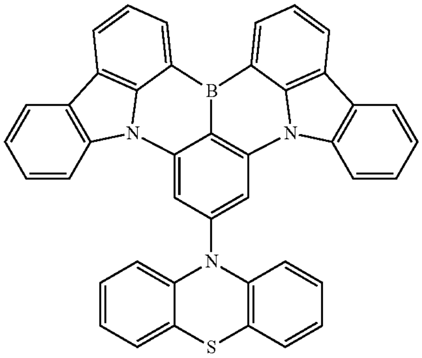
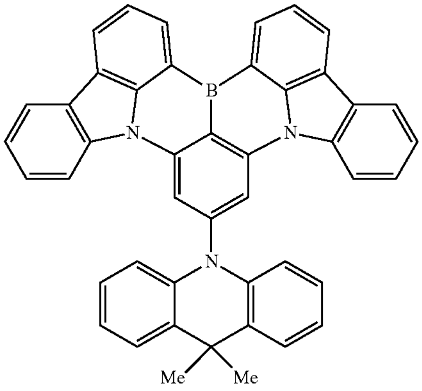
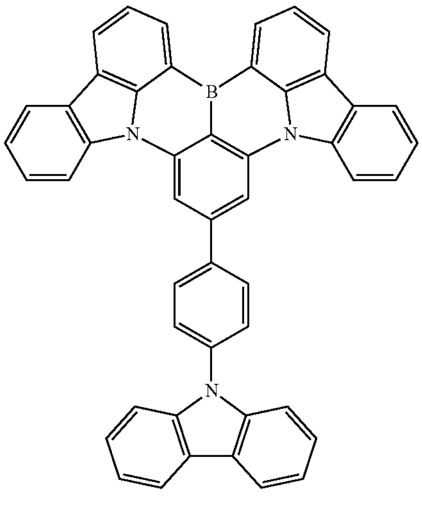
-continued
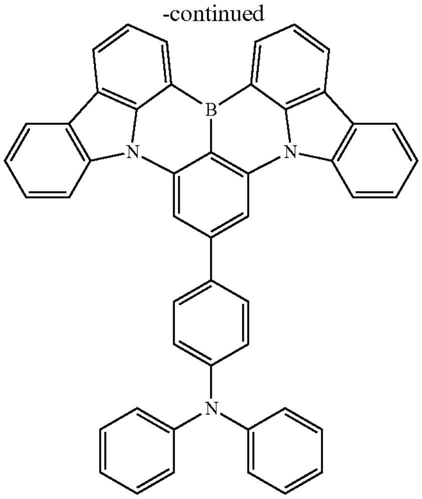
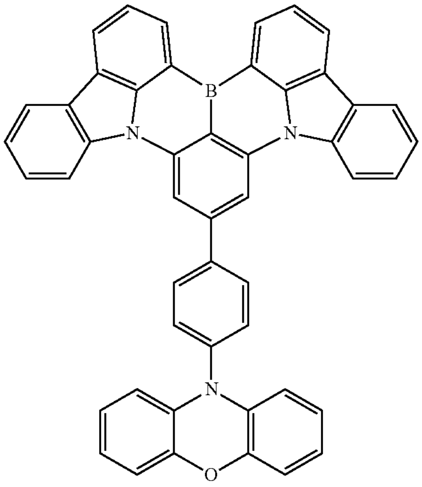
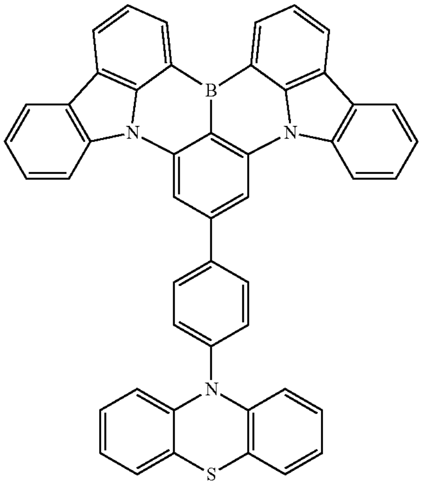

-continued
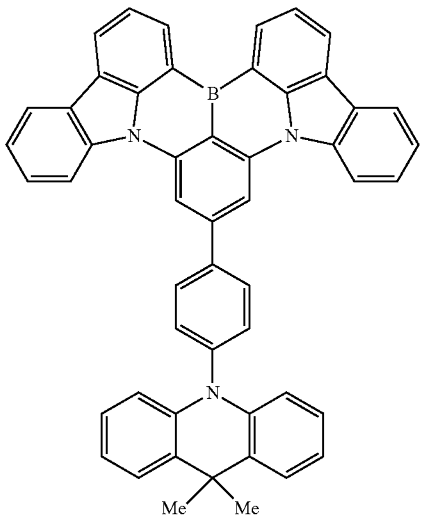
[Formula 169]
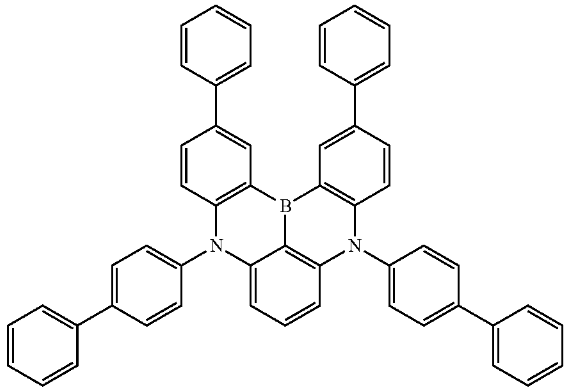
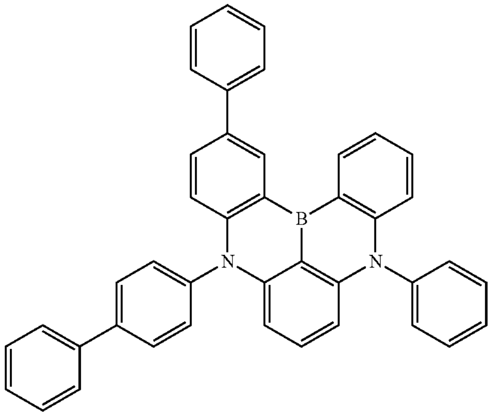
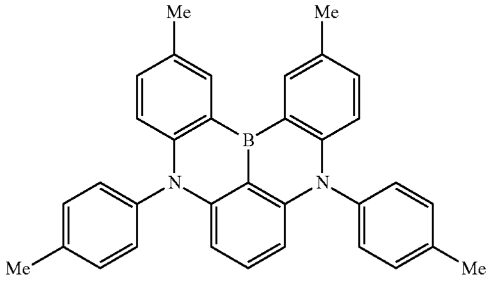
-continued
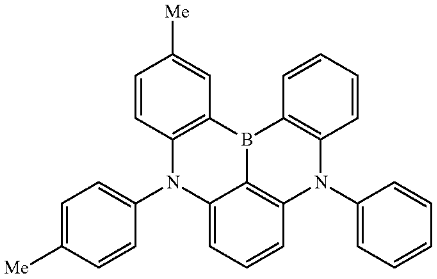
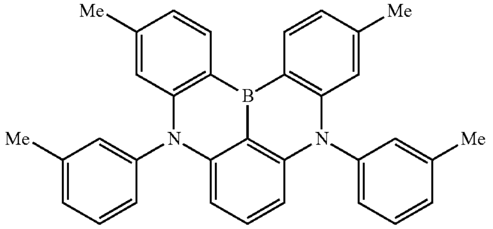
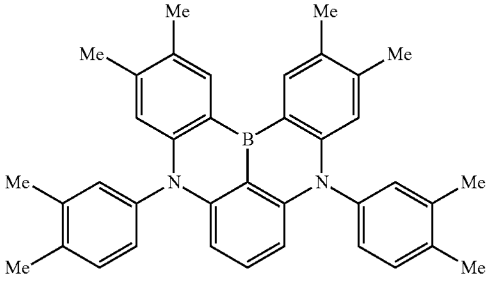
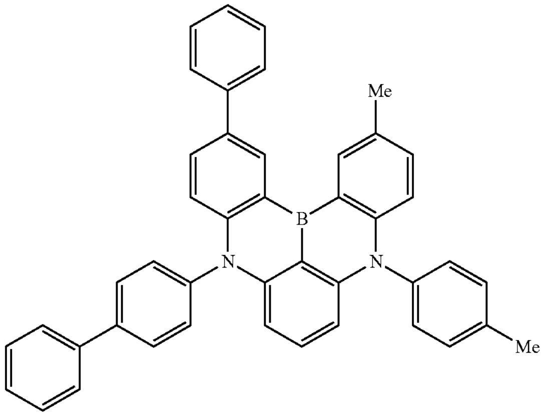
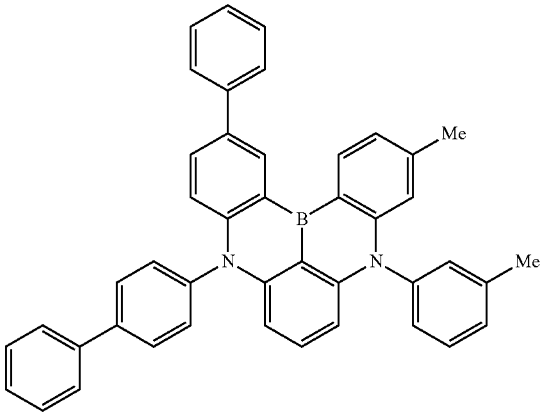

-continued
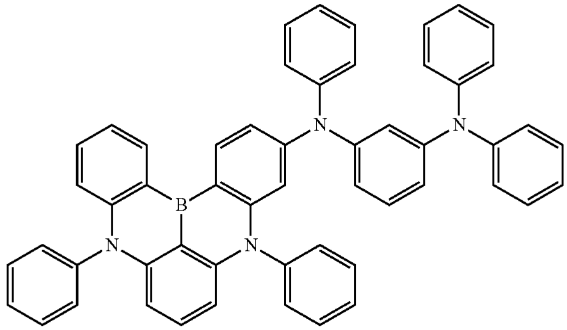
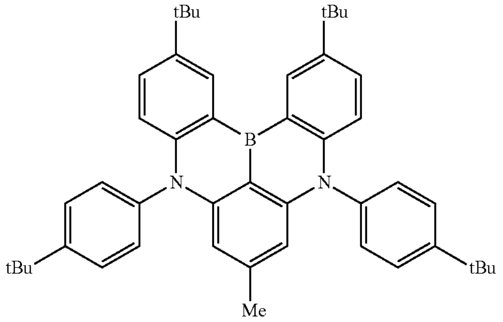
[Formula 170]
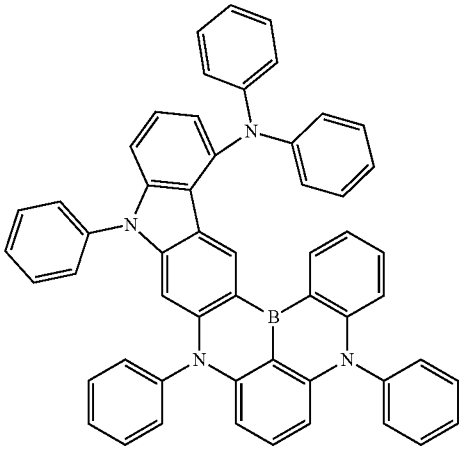
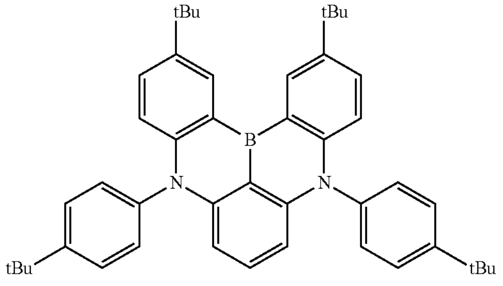
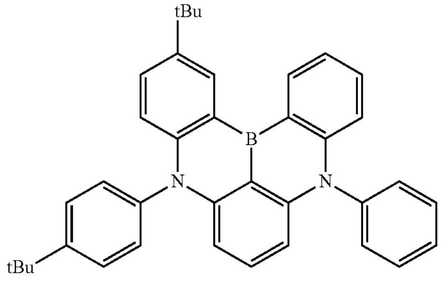
-continued
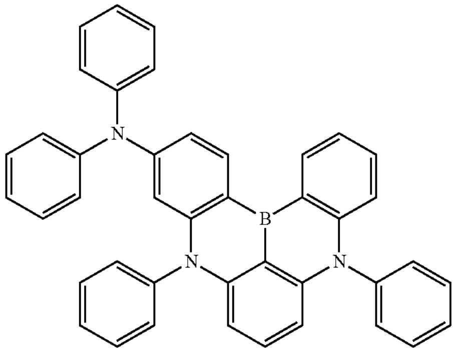
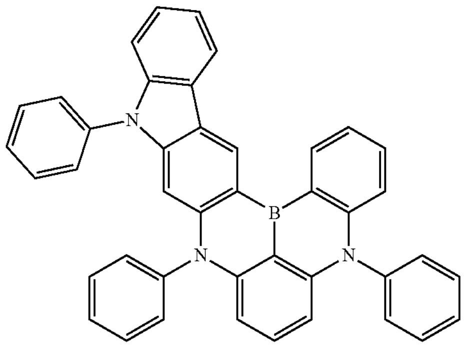
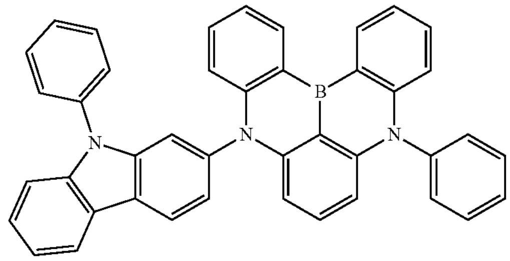
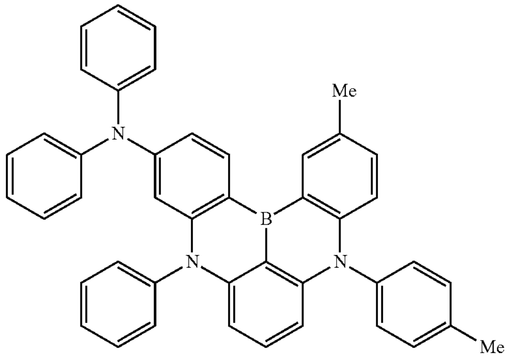
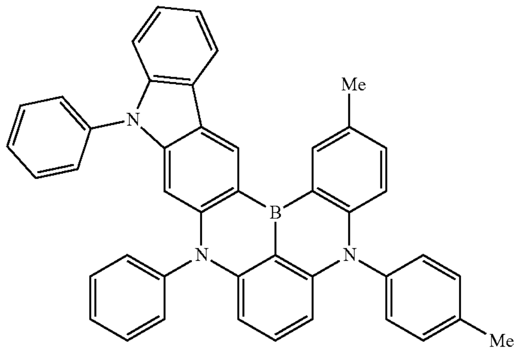

-continued
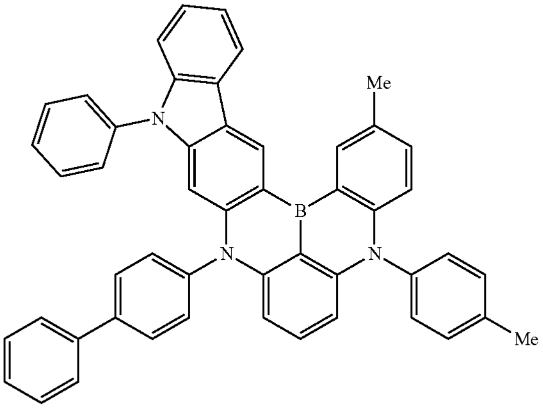
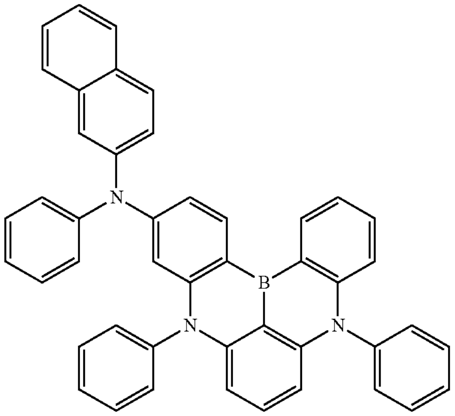
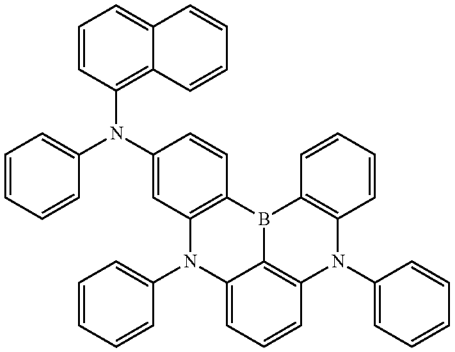
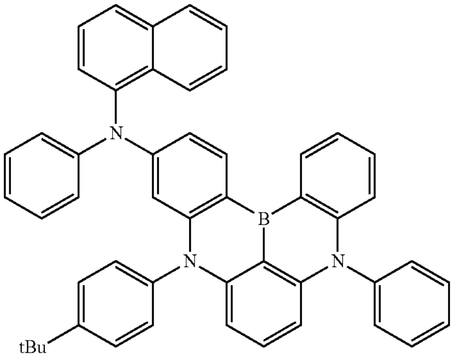
-continued
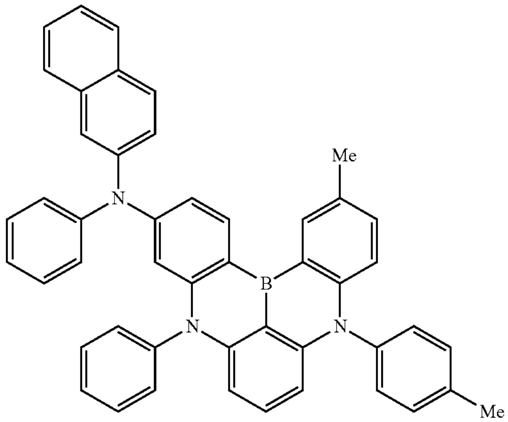
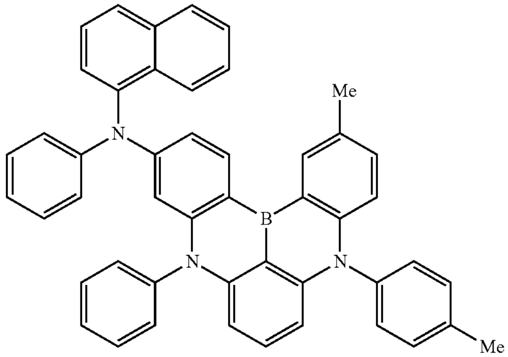
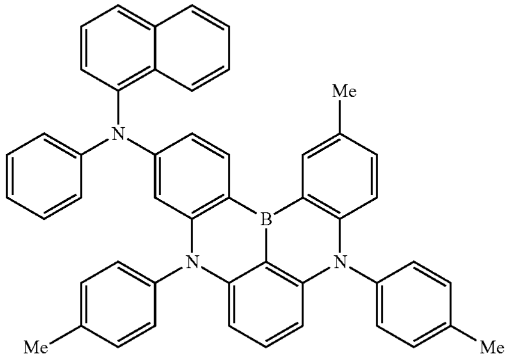
[Formula 171]
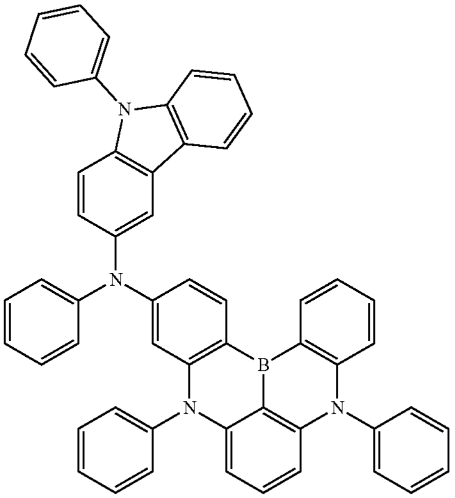

-continued
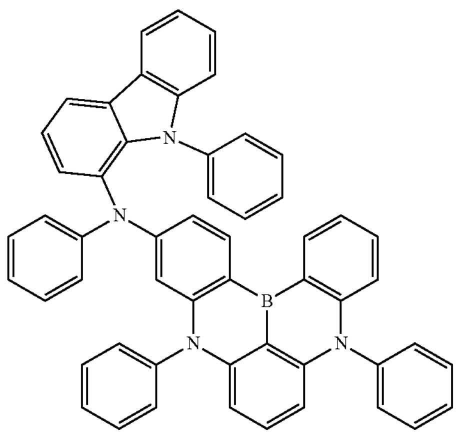
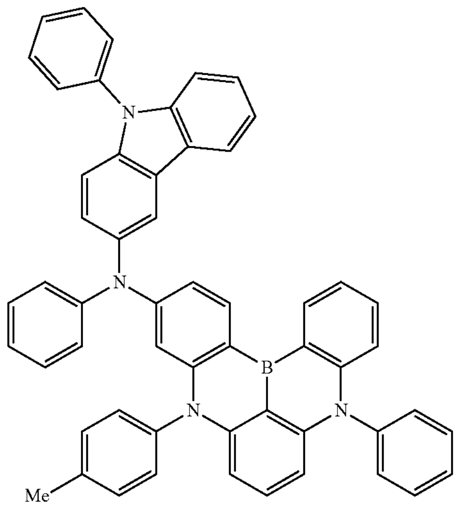
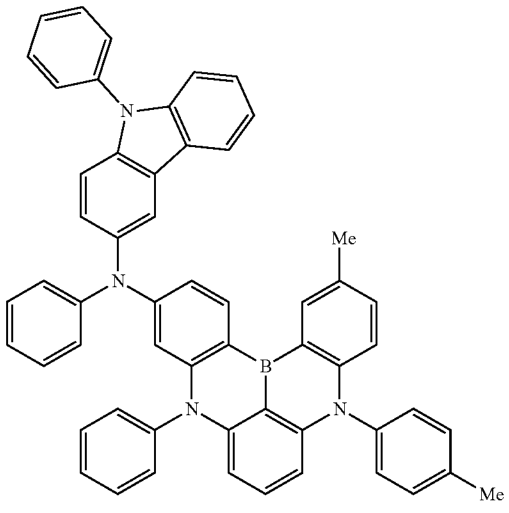 [SMILES: Cc1ccc(N2c3ccc(C)cc3B3c4ccc(N(c5ccccc5)c5ccc6c(c5)c5ccccc5n6-c5ccccc5)cc4N(c4ccccc4)c4cccc2c43)cc1]
-continued
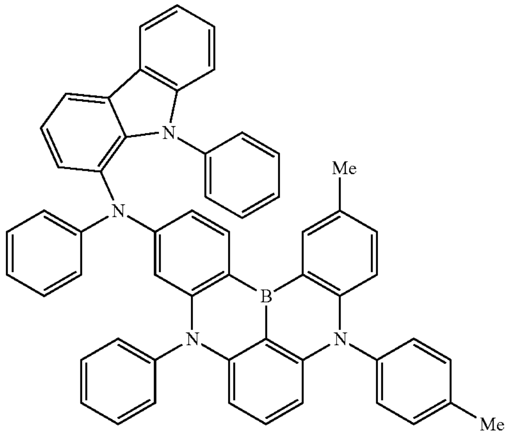
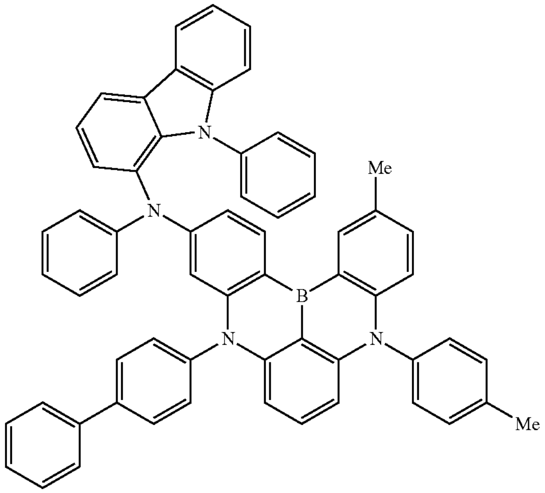
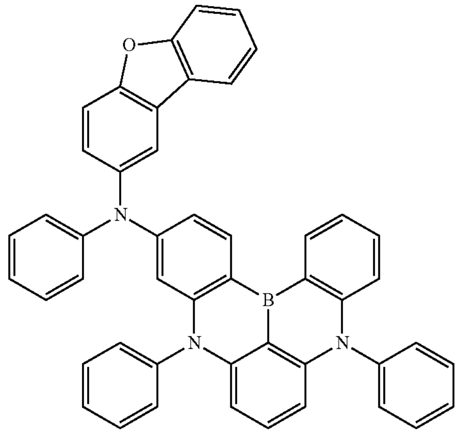

-continued
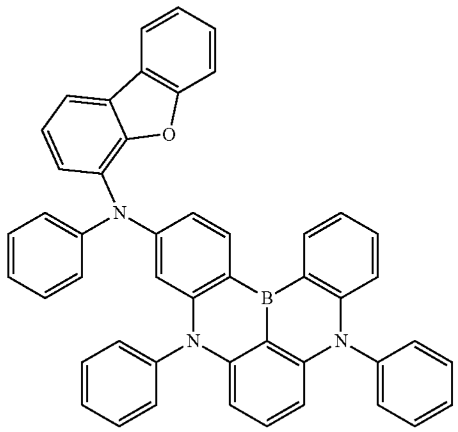
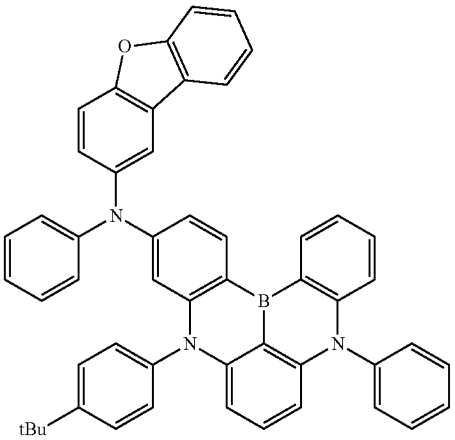
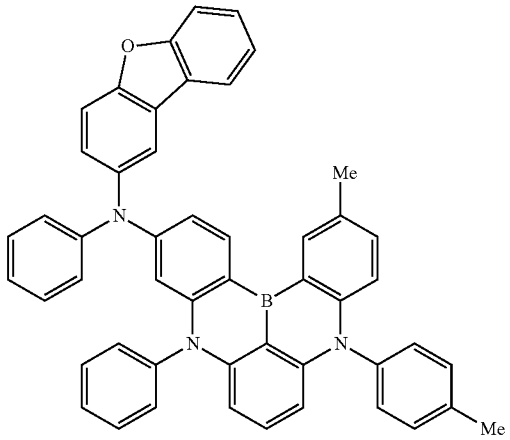
-continued
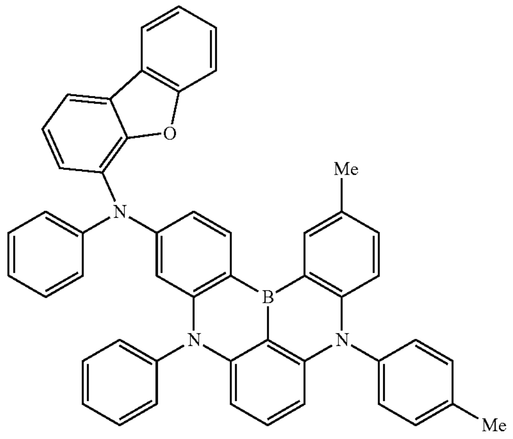
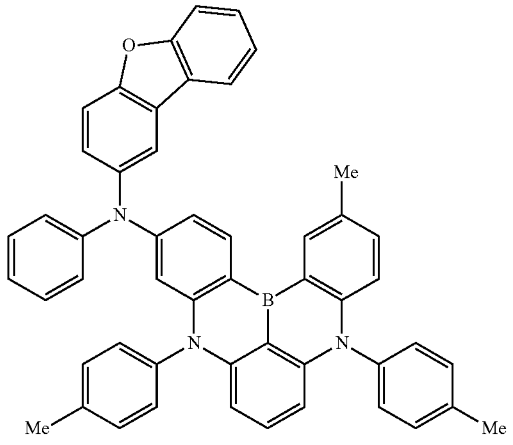
[Formula 172]
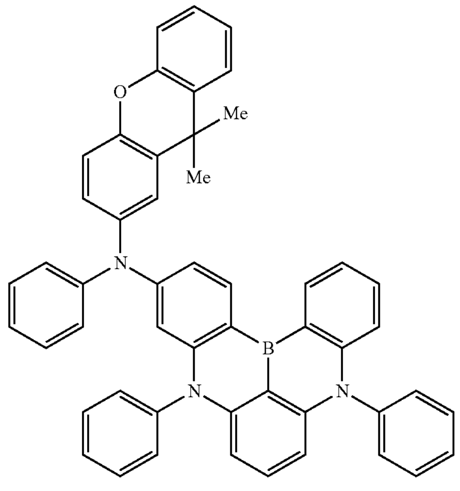

-continued
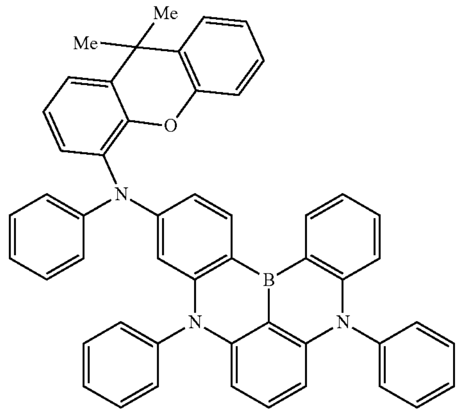
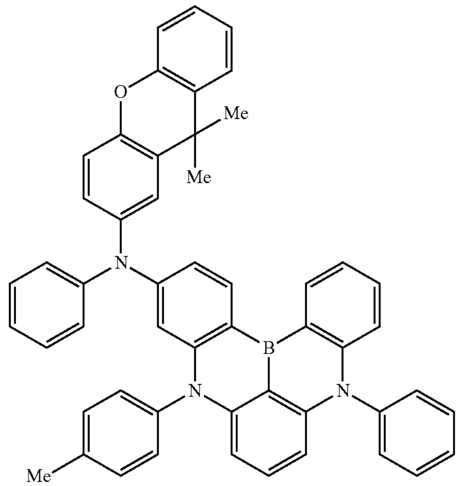
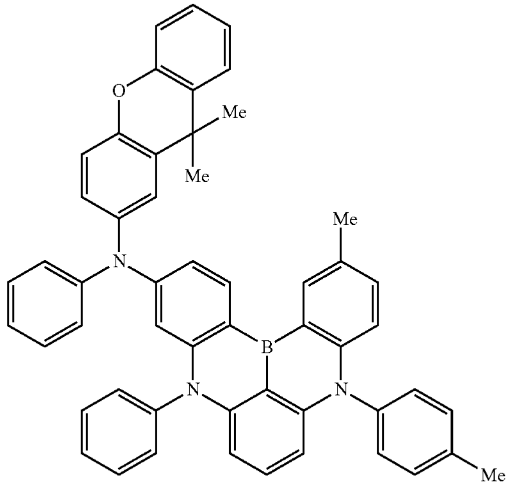
-continued
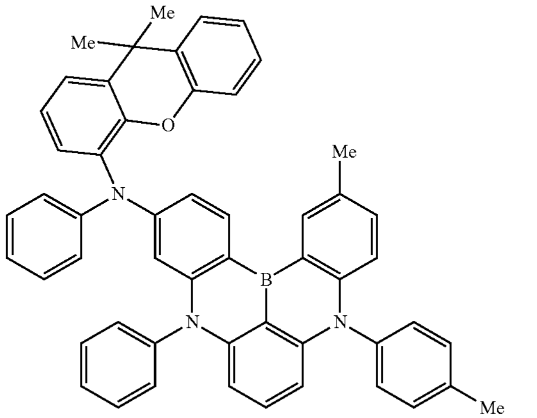
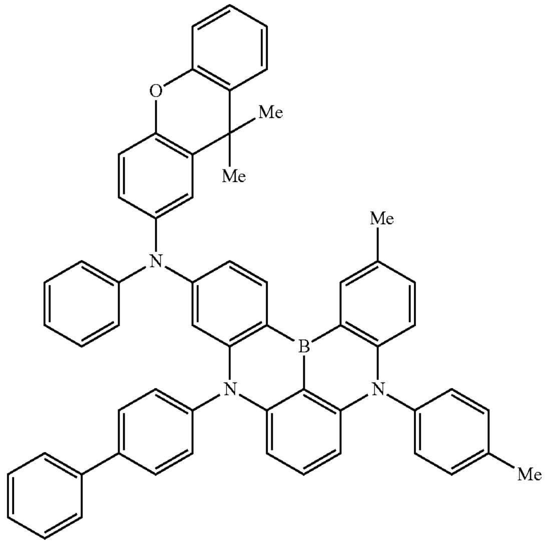
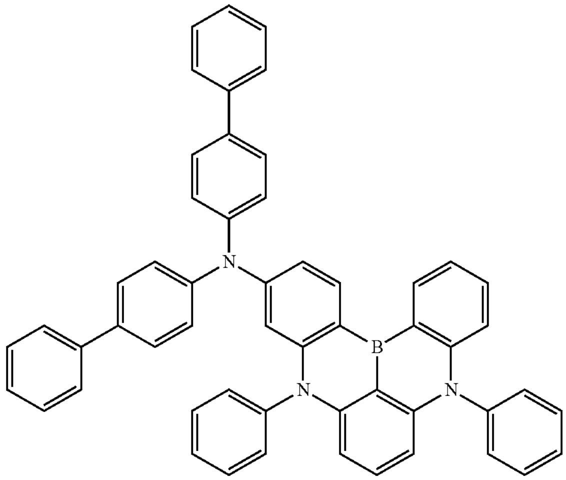

-continued
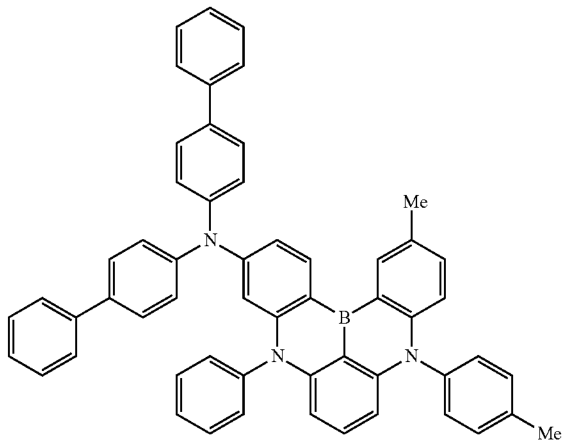
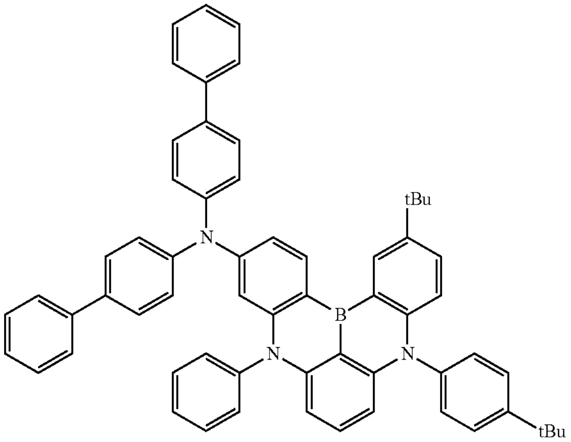
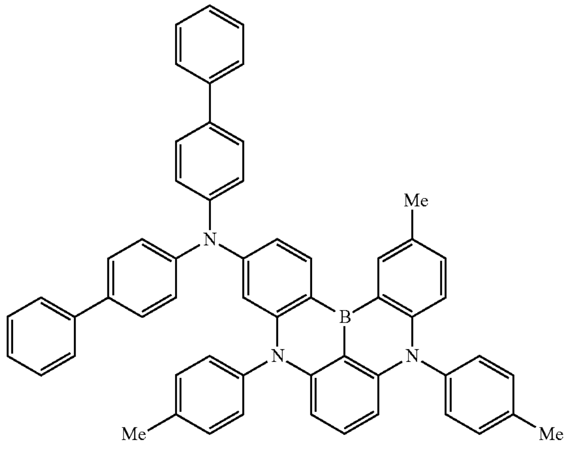
[Formula 173]
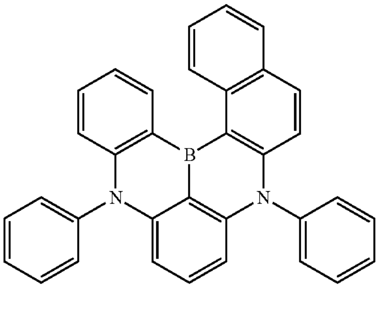
-continued
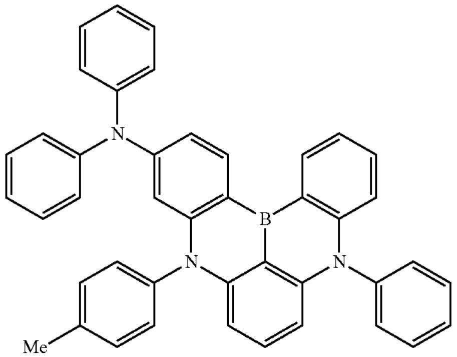
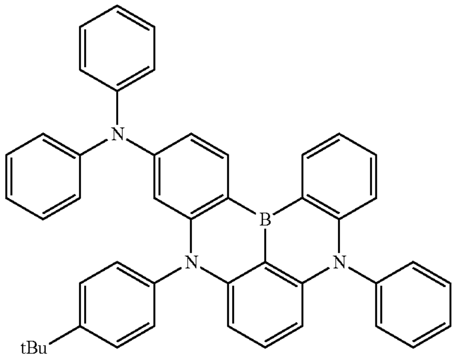
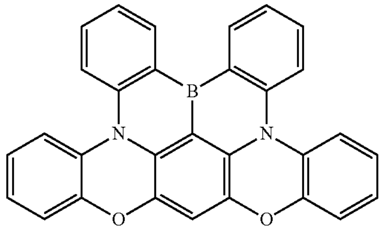
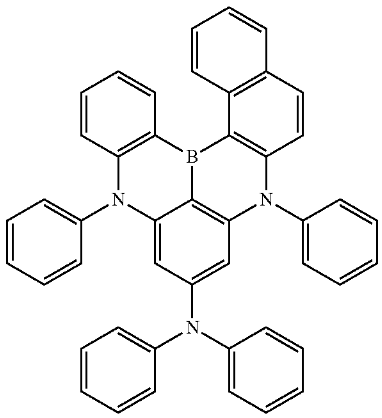

-continued
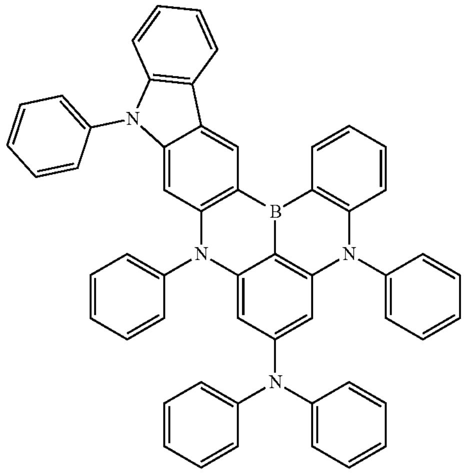
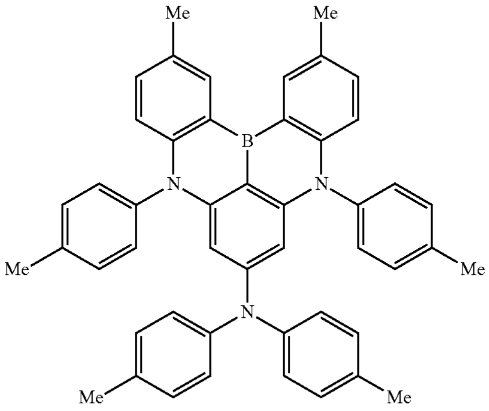
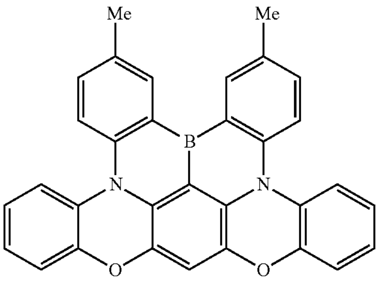
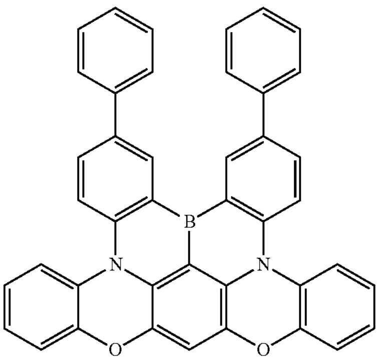
-continued
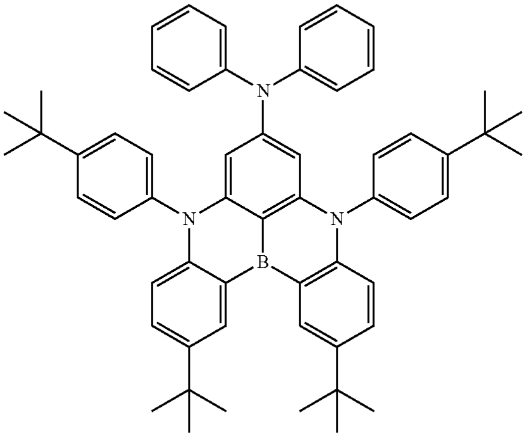
[Formula 174]
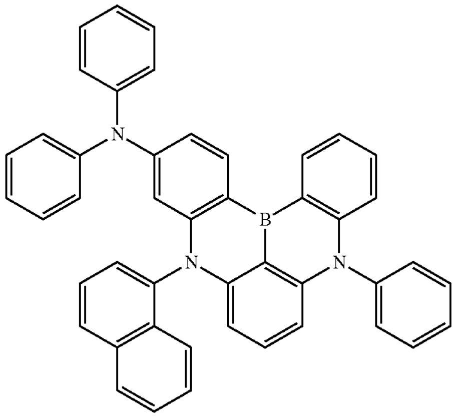
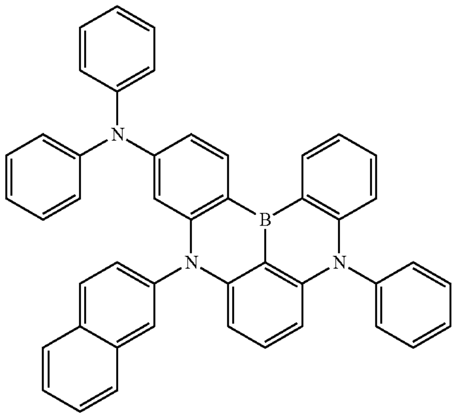

-continued
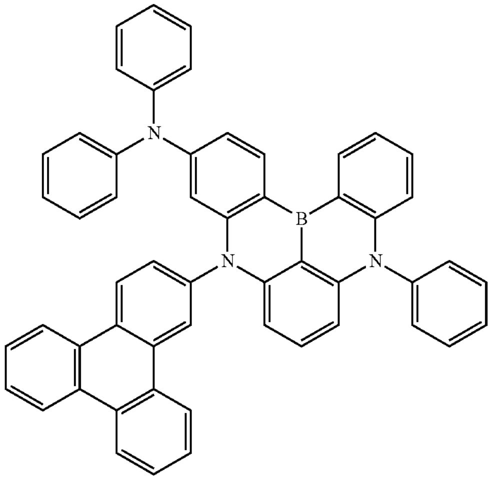
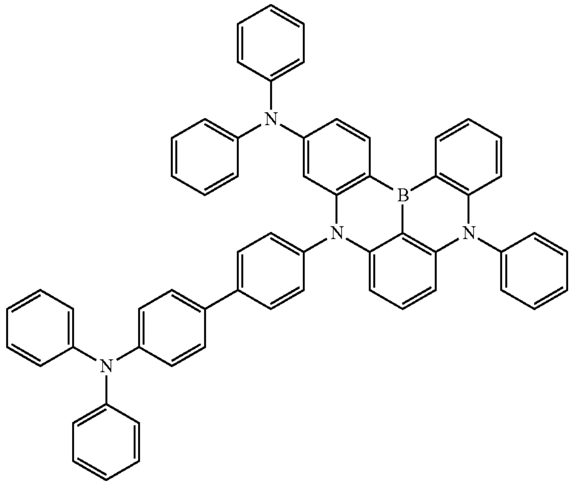
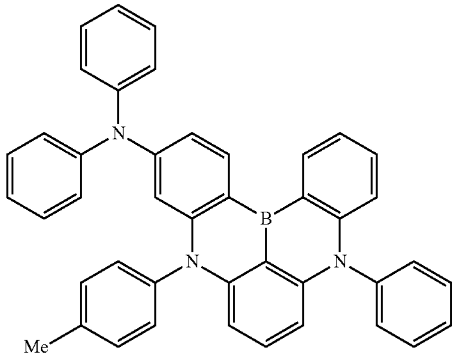 [SMILES: CC(C)(C)c1ccc(N2c3cc(N(c4ccccc4)c4ccccc4)ccc3B3c4ccccc4N(c4ccccc4)c4cccc2c43)cc1]
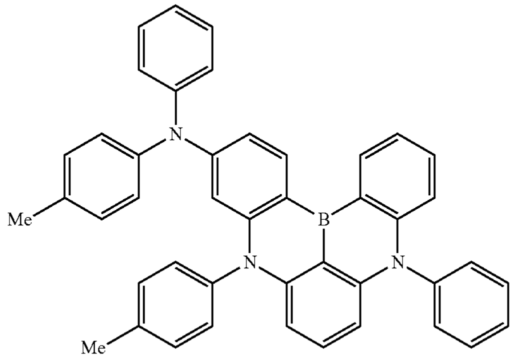
-continued
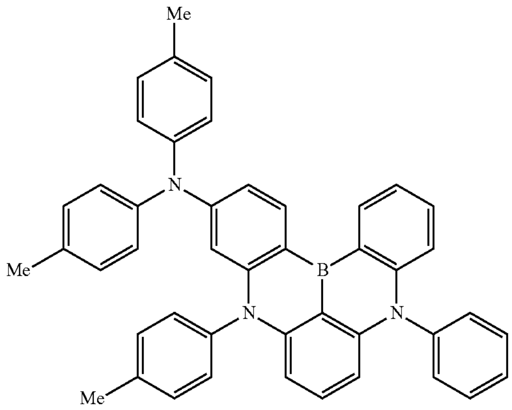
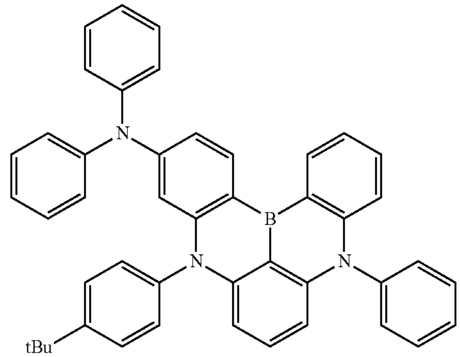
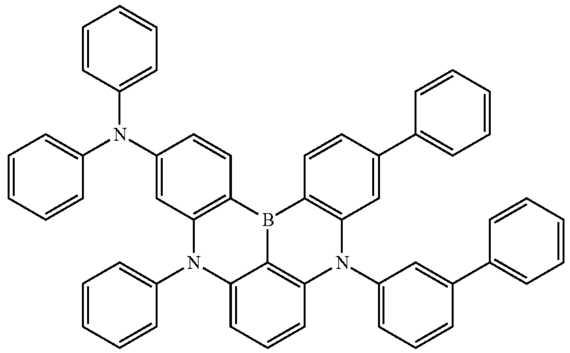
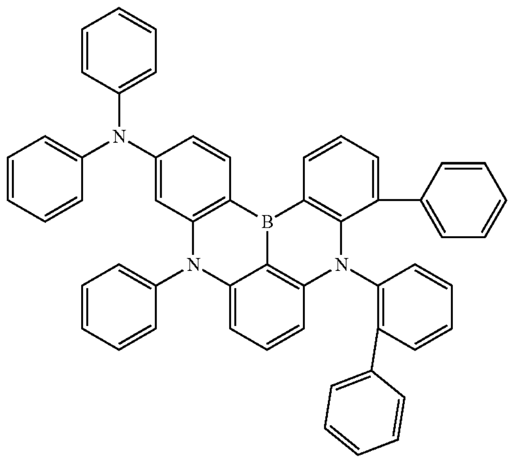

-continued
[Formula 175]
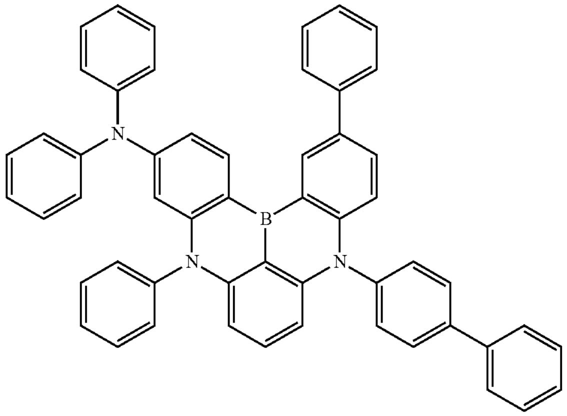
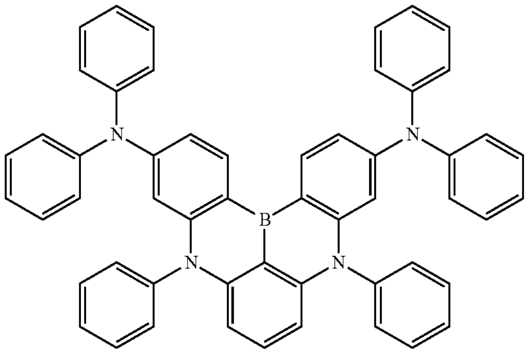
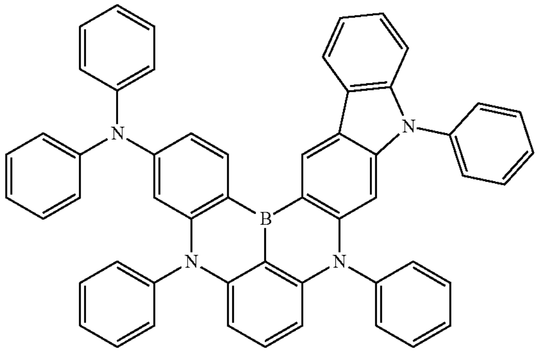
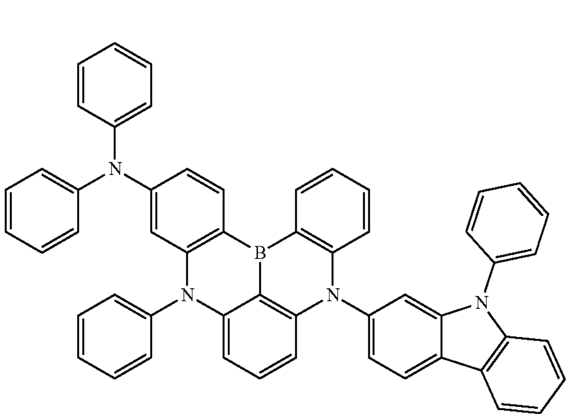
-continued
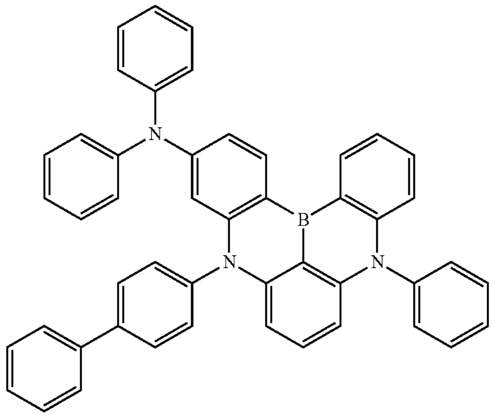 [SMILES: c1ccc(-c2ccc(N3c4cc(N(c5ccccc5)c5ccccc5)ccc4B4c5ccccc5N(c5ccccc5)c5cccc3c54)cc2)cc1]
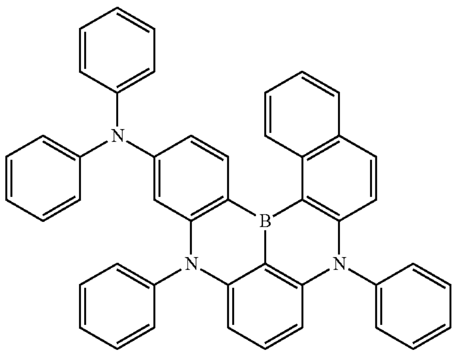
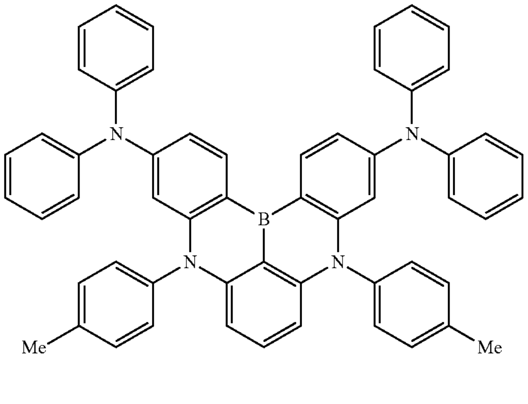
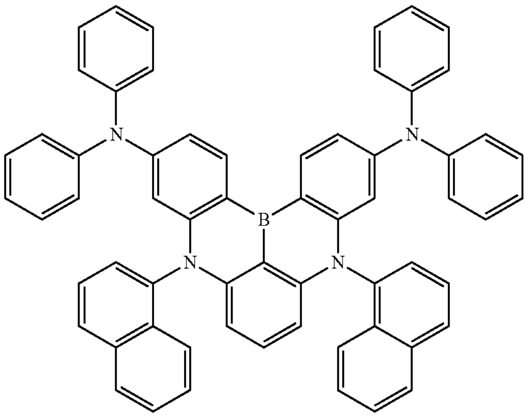

-continued
[Formula 176]
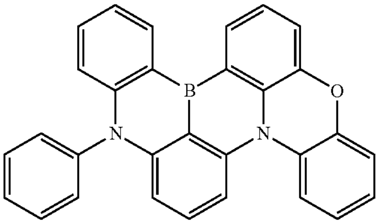
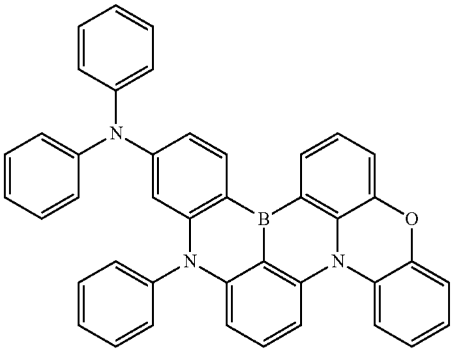
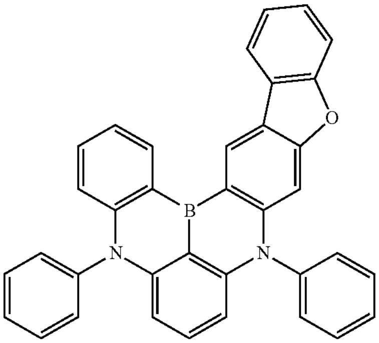
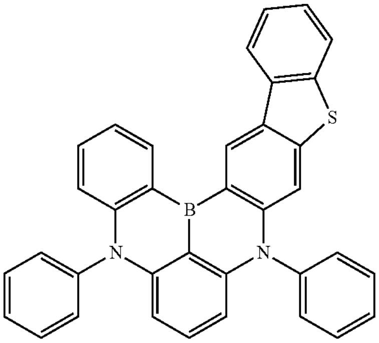
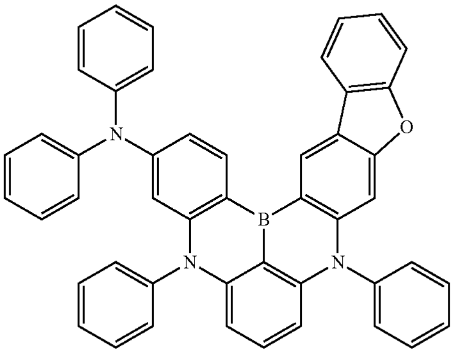
-continued
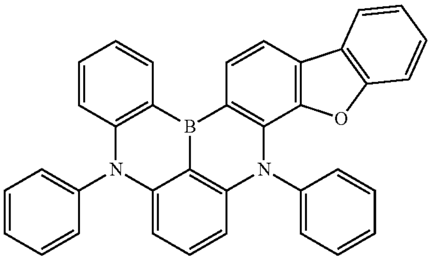
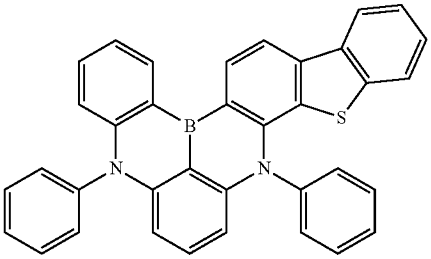
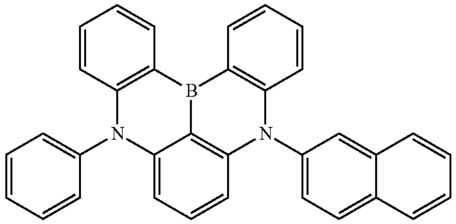
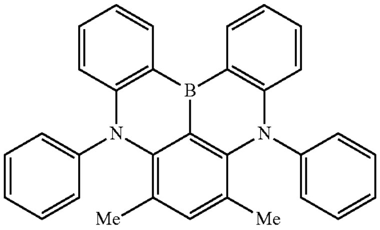
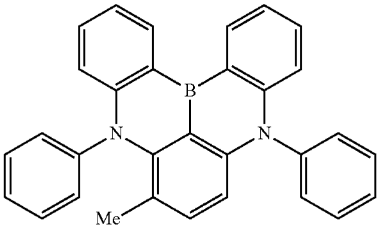
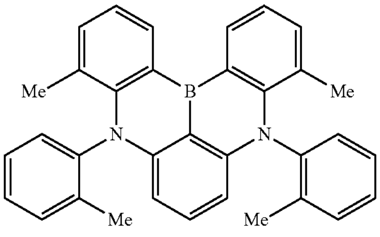
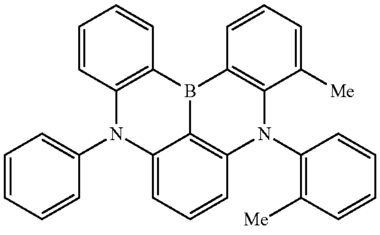

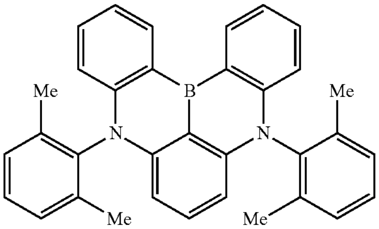
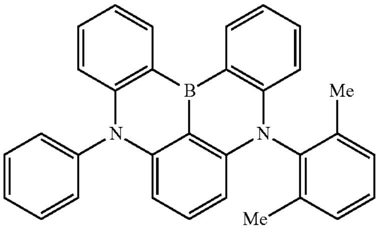
[Formula 177]
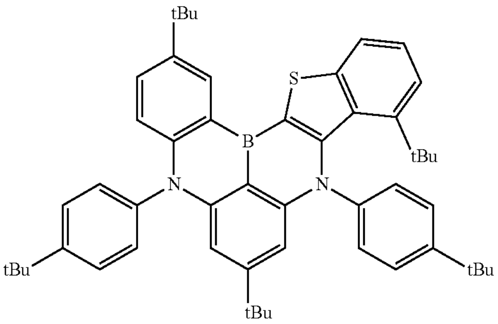
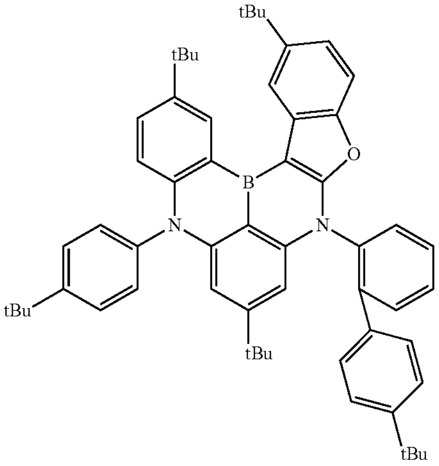
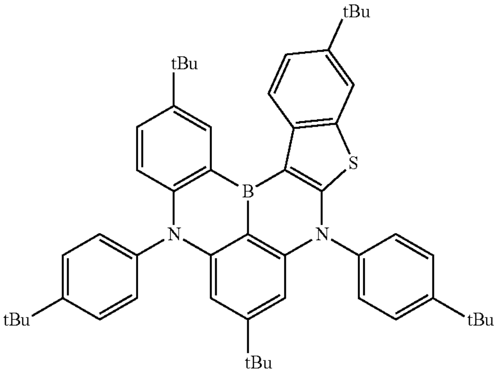
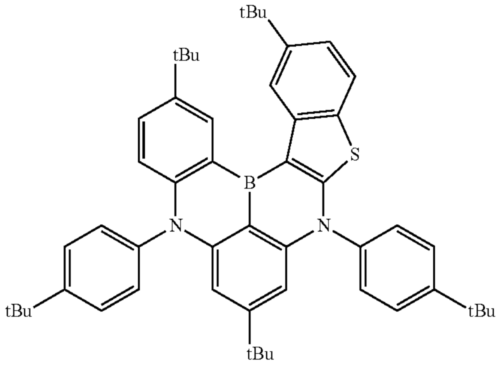
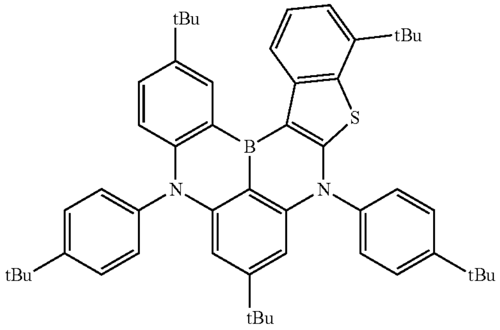
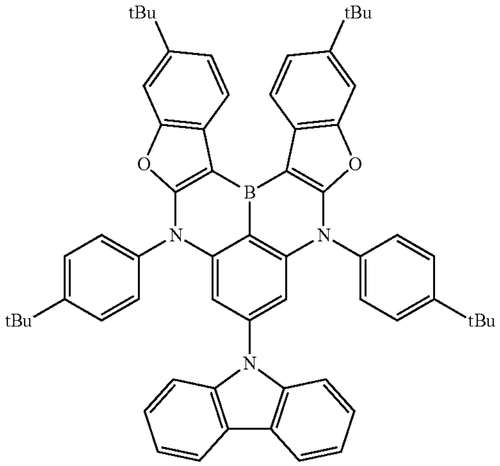
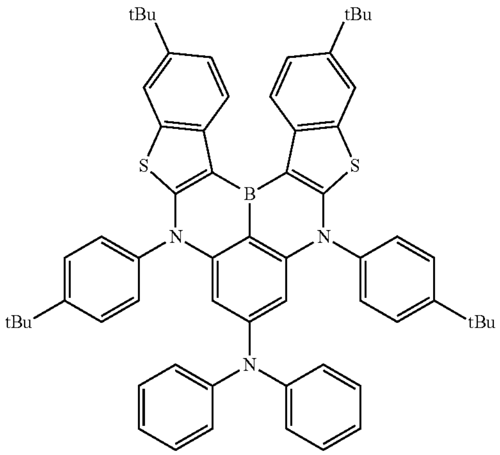

-continued
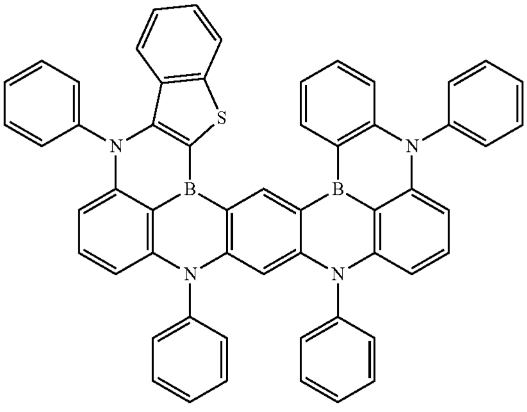
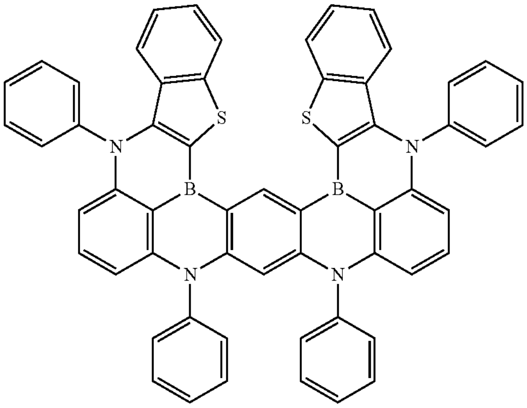
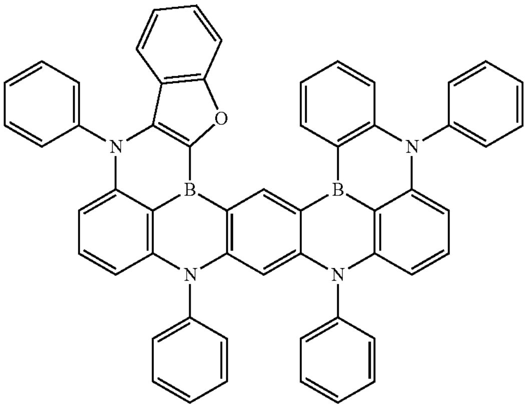
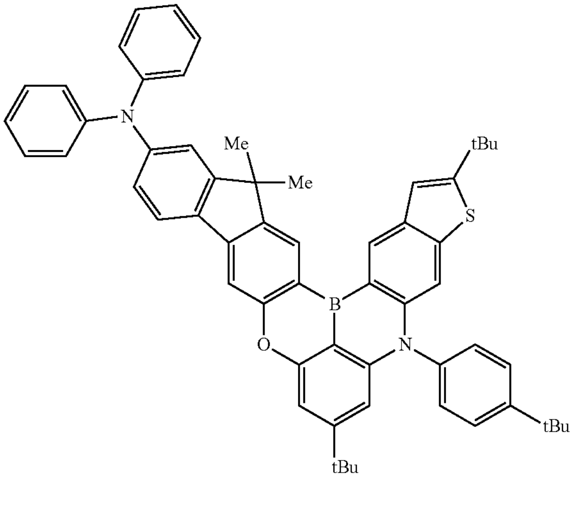
-continued
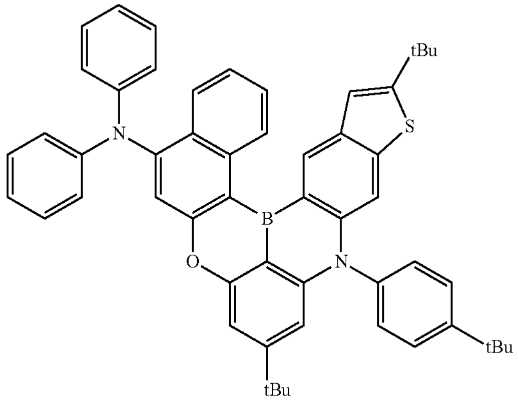
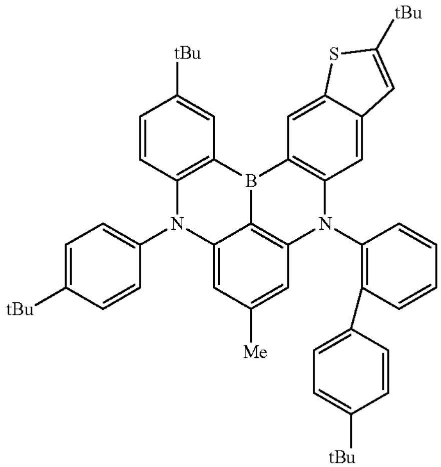
[Formula 178]
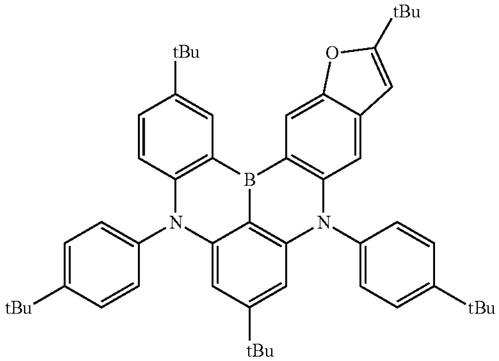
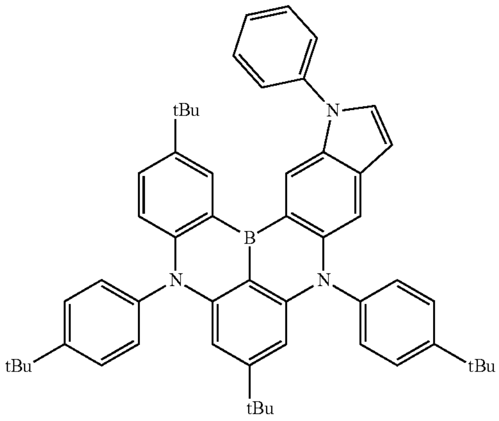

-continued
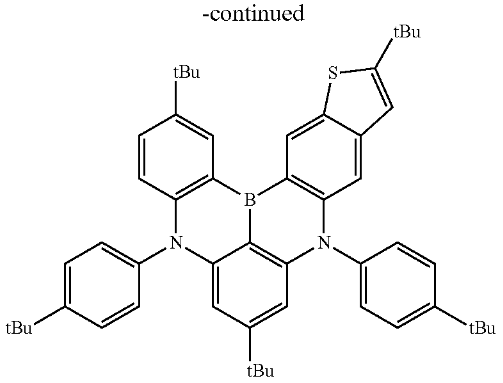
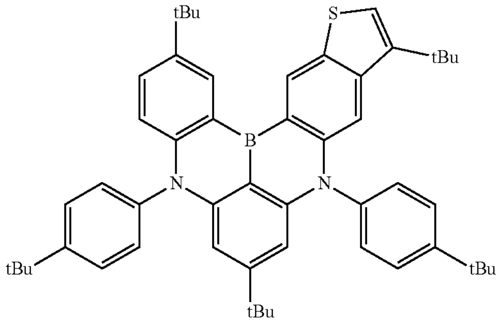
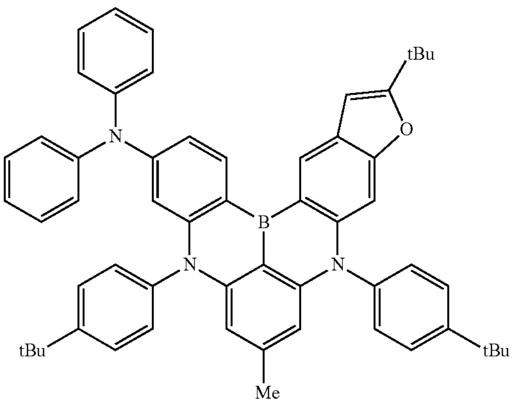
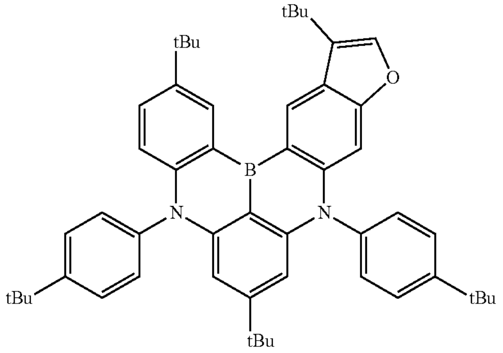
-continued
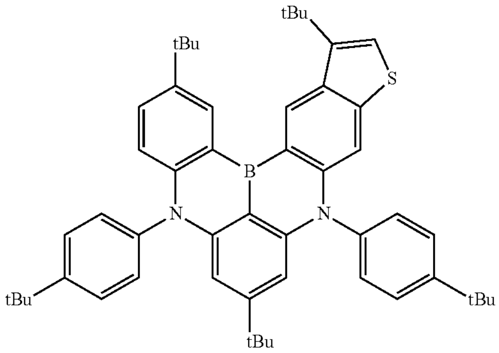
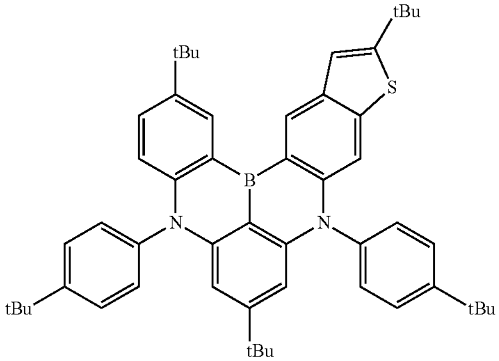
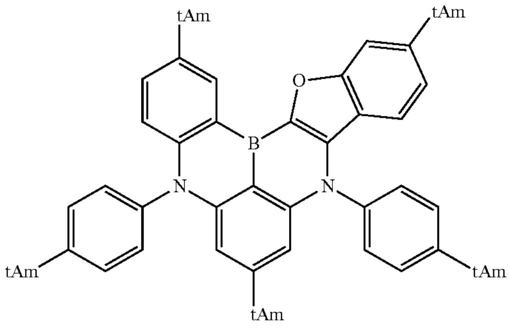
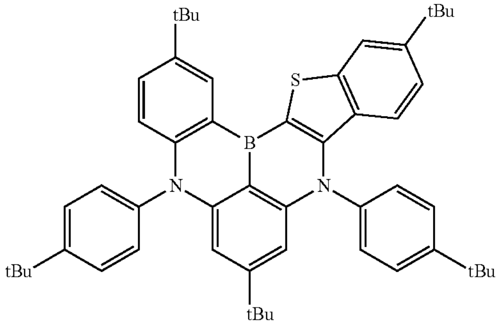
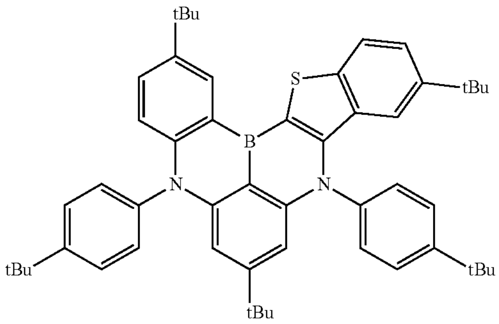

-continued

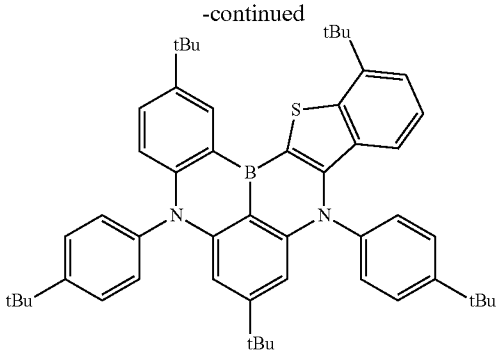

In the luminescent compounds such as the first, second, and third luminescent compounds, $R_{901}$, $R_{902}$, $R_{903}$, $R_{904}$, $R_{905}$, $R_{906}$, and $R_{907}$ are each independently a hydrogen atom, a substituted or unsubstituted alkyl group having 1 to 50 carbon atoms, a substituted or unsubstituted cycloalkyl group having 3 to 50 ring carbon atoms, a substituted or unsubstituted aryl group having 6 to 50 ring carbon atoms, a substituted or unsubstituted heterocyclic group having 5 to 50 ring atoms, preferably, a substituted or unsubstituted alkyl group having 1 to 50 carbon atoms, or a substituted or unsubstituted aryl group having 6 to 50 ring carbon atoms, when a plurality of $R_{901}$ are present, the plurality of $R_{901}$ are mutually the same or different;

when a plurality of $R_{902}$ are present, the plurality of $R_{902}$ are mutually the same or different;

when a plurality of $R_{903}$ are present, the plurality of $R_{903}$ are mutually the same or different;

when a plurality of $R_{904}$ are present, the plurality of $R_{904}$ are mutually the same or different;

when a plurality of $R_{905}$ are present, the plurality of $R_{905}$ are mutually the same or different;

when a plurality of $R_{906}$ are present, the plurality of $R_{906}$ are mutually the same or different; and when a plurality of $R_{907}$ are present, the plurality of $R_{907}$ are mutually the same or different.

In the organic EL device according to the exemplary embodiment, the first luminescent compound is preferably a compound represented by the formula (5) or a compound represented by the formula (6).

In the organic EL device according to the exemplary embodiment, the second luminescent compound is preferably a compound represented by the formula (5) or a compound represented by the formula (6).

Emission Wavelength of Organic EL Device

The organic electroluminescence device according to the exemplary embodiment preferably emits, when being driven, light whose maximum peak wavelength is 500 nm or less, and more preferably emits light whose maximum peak wavelength is 480 nm or less.

The organic electroluminescence device according to the exemplary embodiment, when being driven, more preferably emits light whose maximum peak wavelength is in a range from 430 nm to 480 nm.

The maximum peak wavelength of the light emitted from the organic EL device when being driven is measured as follows. Voltage is applied on the organic EL device so that a current density becomes 10 $mA/cm^2$, where spectral radiance spectrum is measured by a spectroradiometer CS-2000 (manufactured by Konica Minolta, Inc.). A peak wavelength of an emission spectrum, at which the luminous intensity of the resultant spectral radiance spectrum is at the maximum, is measured and defined as the maximum peak wavelength (unit: nm).

Second Exemplary Embodiment

Compounds

The compound according to the exemplary embodiment is a compound represented by a formula (1A) below. The compound according to the exemplary embodiment is a compound that may correspond to an example of the first compound as the first host material in the first exemplary embodiment. The compound according to the exemplary embodiment is also usable as the first host material.

[Formula 179]

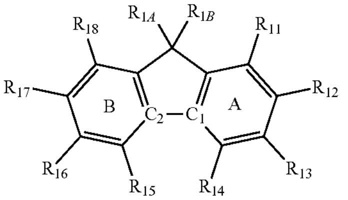

(1A)

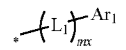

(10A)

In the formula (1A):

$R_{1A}$ and $R_{1B}$ are each independently a substituted or unsubstituted alkyl group having 1 to 15 carbon atoms, a substituted or unsubstituted aryl group having 6 to 17 ring carbon atoms, or a substituted or unsubstituted heterocyclic group having 5 to 17 ring atoms;

at least one of $R_{1A}$ or $R_{1B}$ is a substituted or unsubstituted alkyl group having 1 to 15 carbon atoms;

at least one combination of a combination of $R_{11}$ and $R_{12}$, a combination of $R_{12}$ and $R_{13}$, a combination of $R_{16}$ and $R_{17}$, or a combination of $R_{17}$ and $R_{18}$ are mutually bonded to form a substituted or unsubstituted monocyclic ring, or mutually bonded to form a substituted or unsubstituted fused ring;

when a combination of $R_{11}$ and $R_{12}$ or a combination of $R_{12}$ and $R_{13}$ are mutually bonded to form a substituted or unsubstituted monocyclic ring or a substituted or unsubstituted fused ring with a ring A, a group represented by the formula (10A) is bonded to, of carbon atoms forming the monocyclic ring with the ring A and the fused ring with the ring A, a carbon atom located at the farthest position from a carbon atom $C_1$ of the ring A, the carbon atom $C_1$ being bonded with a single bond to a carbon atom $C_2$ of a ring B;

$R_{12}$ forming neither the substituted or unsubstituted monocyclic ring nor the substituted or unsubstituted fused ring is a group represented by the formula (10A); and $R_{11}$, $R_{13}$, $R_{14}$ and $R_{15}$ to $R_{18}$ forming neither the substituted or unsubstituted monocyclic ring nor the substituted or unsubstituted fused ring are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a group represented by —N($R_{906}$)($R_{907}$), a substituted or unsubstituted aralkyl group having 7 to 50 carbon atoms, a group represented by —C(=O)$R_{801}$, a group represented by —COO$R_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

In the formula (10A):

$Ar_1$ is a substituted or unsubstituted aryl group having four or more fused rings or a substituted or unsubstituted heterocyclic group having four or more fused rings;

$L_1$ is a single bond, a substituted or unsubstituted arylene group having 6 to 17 ring carbon atoms, or a substituted or unsubstituted divalent heterocyclic group having 5 to 17 ring atoms;

mx is 0, 1, or 2;

* represents a bonding position to an atom forming a ring of the formula (1A); and a compound represented by the formula (1A) does not have, in a molecule, three or more groups of a substituted or unsubstituted aryl group having four or more fused rings and a substituted or unsubstituted heterocyclic group having four or more fused rings.

In a compound represented by the formula (1A), $R_{901}$, $R_{902}$, $R_{903}$, $R_{904}$, $R_{905}$, $R_{906}$, $R_{907}$, $R_{801}$, and $R_{802}$ are each independently a hydrogen atom, a substituted or unsubstituted alkyl group having 1 to 50 carbon atoms, a substituted or unsubstituted cycloalkyl group having 3 to 50 ring carbon atoms, a substituted or unsubstituted aryl group having 6 to 17 ring carbon atoms, or a substituted or unsubstituted heterocyclic group having 5 to 17 ring atoms, when a plurality of $R_{901}$ are present, the plurality of $R_{901}$ are mutually the same or different;

when a plurality of $R_{902}$ are present, the plurality of $R_{902}$ are mutually the same or different;

when a plurality of $R_{903}$ are present, the plurality of $R_{903}$ are mutually the same or different;

when a plurality of $R_{904}$ are present, the plurality of $R_{904}$ are mutually the same or different;

when a plurality of $R_{905}$ are present, the plurality of $R_{905}$ are mutually the same or different;

when a plurality of $R_{906}$ are present, the plurality of $R_{906}$ are mutually the same or different;

when a plurality of $R_{907}$ are present, the plurality of $R_{907}$ are mutually the same or different;

when a plurality of $R_{801}$ are present, the plurality of $R_{801}$ are mutually the same or different; and when a plurality of $R_{802}$ are present, the plurality of $R_{802}$ are mutually the same or different.

In the compound according to the exemplary embodiment, the substituted or unsubstituted aryl group having 6 to 17 ring carbon atoms is preferably a substituted or unsubstituted aryl group having 6 to 14 ring carbon atoms.

In the compound according to the exemplary embodiment, the substituted or unsubstituted heterocyclic group having 5 to 17 ring atoms is preferably a substituted or unsubstituted heterocyclic group having 5 to 14 ring atoms.

In the compound according to the exemplary embodiment, the substituted or unsubstituted arylene group having 6 to 17 ring carbon atoms is preferably a substituted or unsubstituted arylene group having 6 to 14 ring carbon atoms.

In the compound according to the exemplary embodiment, the substituted or unsubstituted divalent heterocyclic group having 5 to 17 ring atoms is preferably a substituted or unsubstituted divalent heterocyclic group having 5 to 14 ring atoms.

In the compound according to the exemplary embodiment, $R_{1A}$ and $R_{1B}$ are preferably each independently a substituted or unsubstituted alkyl group having 1 to 15 carbon atoms or a substituted or unsubstituted aryl group having 6 to 17 ring carbon atoms.

In the compound according to the exemplary embodiment, $R_{1A}$ and $R_{1B}$ are preferably each independently a substituted or unsubstituted alkyl group having 1 to 15 carbon atoms. It makes a drive voltage likely to decrease that $R_{1A}$ and $R_{1B}$ are each a substituted or unsubstituted alkyl group having 1 to 15 carbon atoms.

In the compound according to the exemplary embodiment, $R_{1A}$ and $R_{1B}$ are preferably each independently a substituted or unsubstituted alkyl group having 1 to 10 carbon atoms.

In the exemplary embodiment, the compound represented by the formula (1A) is preferably a compound represented by a formula (101) below.

[Formula 180]

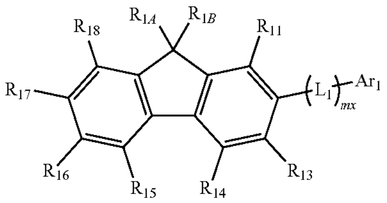

(101)

In the formula (101):

a combination of $R_{16}$ and $R_{17}$ or a combination of $R_{17}$ and $R_{18}$ are mutually bonded to form a substituted or unsubstituted monocyclic ring, or mutually bonded to form a substituted or unsubstituted fused ring;

$R_{1A}$, $R_{1B}$, $R_{11}$, $R_{13}$, $R_{14}$, and $R_{15}$ respectively represent the same as $R_{1A}$, $R_{1B}$, $R_{11}$, $R_{13}$, $R_{14}$, and $R_{15}$ in the formula (1A);

$R_{16}$, $R_{17}$, and $R_{18}$ forming neither the substituted or unsubstituted monocyclic ring nor the substituted or unsubstituted fused ring each represent the same as $R_{16}$, $R_{17}$, and $R_{18}$ forming neither the substituted or unsubstituted monocyclic ring nor the substituted or unsubstituted fused ring in the formula (1A); and $Ar_1$, $L_1$, and mx respectively represent the same as $Ar_1$, $L_1$, and mx in the formula (10A).

In the compound according to the exemplary embodiment, when one combination of a combination of $R_{11}$ and $R_{12}$, a combination of $R_{12}$ and $R_{13}$, a combination of $R_{16}$ and $R_{17}$, and a combination of $R_{17}$ and $R_{18}$ are mutually bonded to form a substituted or unsubstituted monocyclic ring, or mutually bonded to form a substituted or unsubstituted fused ring, it is preferable that the substituted or unsubstituted monocyclic ring is a ring represented by the formula (11) and the substituted or unsubstituted fused ring is a ring represented by the formula (12).

In the compound according to the exemplary embodiment, it is preferable that at least one combination of a combination of $R_{11}$ and $R_{12}$, a combination of $R_{12}$ and $R_{13}$, a combination of $R_{16}$ and $R_{17}$, or a combination of $R_{17}$ and $R_{18}$ are mutually bonded to form a ring represented by a formula (11A) below as the substituted or unsubstituted monocyclic ring.

[Formula 181]

(11A)

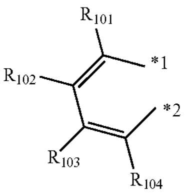

In the formula (11A): $R_{101}$ to $R_{104}$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —$Si(R_{901})(R_{902})(R_{903})$, a group represented by —O—$(R_{904})$, a group represented by —S—$(R_{905})$, a group represented by —$N(R_{906})(R_{907})$, a substituted or unsubstituted aralkyl group having 7 to 50 carbon atoms, a group represented by —C(=O)$R_{801}$, a group represented by —$COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms, and

*1 and *2 each represent a bonding position to an atom forming the ring of the formula (1A).

In the formula (11A), at least one combination of adjacent two or more of $R_{101}$ to $R_{104}$ are preferably not bonded to each other.

$R_{101}$ to $R_{104}$ in the formula (11A) preferably form neither a substituted or unsubstituted monocyclic ring nor a substituted or unsubstituted fused ring.

In an example of the compound according to the exemplary embodiment, all combinations of a combination of $R_{11}$ and $R_{12}$, a combination of $R_{12}$ and $R_{13}$, a combination of $R_{16}$ and $R_{17}$, and a combination of $R_{17}$ and $R_{18}$ do not form a ring represented by the formula (12).

In an example of the compound according to the exemplary embodiment, all combinations of a combination of $R_{11}$ and $R_{12}$, a combination of $R_{12}$ and $R_{13}$, a combination of $R_{16}$ and $R_{17}$, and a combination of $R_{17}$ and $R_{18}$ do not form a substituted or unsubstituted fused ring.

In a case where a ring represented by the formula (12) is formed and $X_1$ is $C(R_{115})(R_{116})$ in the compound according to the exemplary embodiment, $R_{115}$ and $R_{116}$ are preferably each independently a substituted or unsubstituted alkyl group having 1 to 15 carbon atoms or a substituted or unsubstituted aryl group having 6 to 17 ring carbon atoms, and more preferably a substituted or unsubstituted alkyl group having 1 to 15 carbon atoms.

In the compound according to the exemplary embodiment, it is preferable that a combination of $R_{16}$ and $R_{17}$ are mutually bonded to form a substituted or unsubstituted monocyclic ring or a combination of $R_{17}$ and $R_{18}$ are mutually bonded to form a substituted or unsubstituted monocyclic ring.

In the exemplary embodiment, the compound represented by the formula (1A) is preferably a compound represented by a formula (102) below or a formula (102A) below.

[Formula 182]

(102)

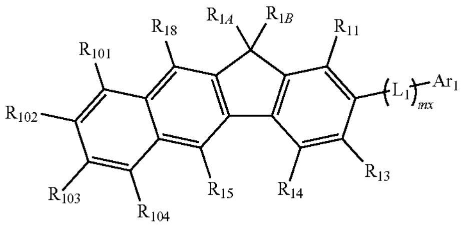

(102A)

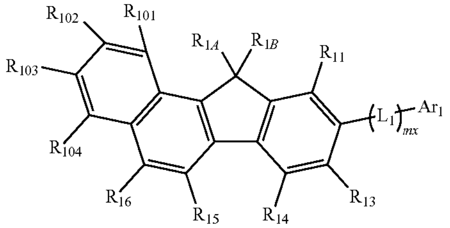

In the formulae (102) and (102A):

$R_{1A}$, $R_{1B}$, $R_{11}$, $R_{13}$, $R_{14}$, $R_{15}$, $R_{16}$ and $R_{18}$ respectively represent the same as $R_{1A}$, $R_{1B}$, $R_{11}$, $R_{13}$, $R_{14}$, $R_{15}$, $R_{16}$ and $R_{18}$ in the formula (1A);

$Ar_1$, $L_1$, and mx respectively represent the same as $Ar_1$, $L_1$, and mx in the formula (10A);

none of at least one combination of adjacent two or more of $R_{101}$ to $R_{104}$ are bonded to each other; and $R_{101}$ to $R_{104}$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —$Si(R_{901})(R_{902})(R_{903})$, a group represented by —O—$(R_{904})$, a group represented by —S—$(R_{905})$, a group represented by —$N(R_{906})(R_{907})$, a substituted or unsubstituted aralkyl group having 7 to 50 carbon atoms, a group represented by —C(=O)$R_{801}$, a group represented by —$COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

In the compound according to the exemplary embodiment, mx is preferably 0.

In the compound according to the exemplary embodiment, $L_1$ is preferably a single bond or a substituted or unsubstituted arylene group having 6 to 17 ring carbon atoms, and more preferably a single bond or a substituted or unsubstituted phenylene group.

In the exemplary embodiment, the compound represented by the formula (1A) is preferably a compound represented by a formula (103) below or a formula (103A) below.

[Formula 183]

(103)

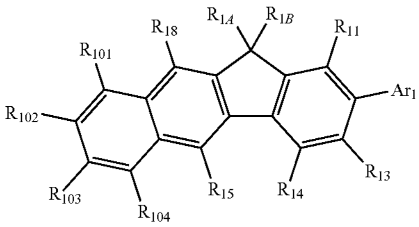

(103A)

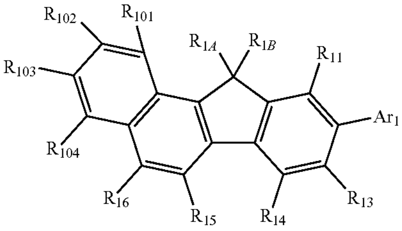

In the formulae (103) and (103A):

$R_{1A}$, $R_{1B}$, $R_{11}$, $R_{13}$, $R_{14}$, $R_{15}$, $R_{16}$ and $R_{18}$ respectively represent the same as $R_{1A}$, $R_{1B}$, $R_{11}$, $R_{13}$, $R_{14}$, $R_{15}$, $R_{16}$ and $R_{18}$ in the formula (1A);

$R_{101}$ to $R_{104}$ each represent the same as $R_{101}$ to $R_{104}$ in the formulae (102) and (102A); and $Ar_1$ represents the same as $Ar_1$ in the formula (10A).

In the compound according to the exemplary embodiment, $R_{12}$ not being bonded with a group represented by the formula (10A), $R_{11}$, $R_{13}$, $R_{14}$, and $R_{15}$ to $R_{18}$ forming neither the substituted or unsubstituted monocyclic ring nor the substituted or unsubstituted fused ring are preferably each independently a hydrogen atom or a substituted or unsubstituted alkyl group having 1 to 15 carbon atoms, more preferably a hydrogen atom or a substituted or unsubstituted alkyl group having 1 to 10 carbon atoms, and still more preferably a hydrogen atom.

In the compound according to the exemplary embodiment, $R_{101}$ to $R_{104}$ and $R_{111}$ to $R_{114}$ forming neither the substituted or unsubstituted monocyclic ring nor the substituted or unsubstituted fused ring are preferably each independently a hydrogen atom or a substituted or unsubstituted alkyl group having 1 to 15 carbon atoms, more preferably a hydrogen atom or a substituted or unsubstituted alkyl group having 1 to 10 carbon atoms, and still more preferably a hydrogen atom.

In the compound according to the exemplary embodiment, $Ar_1$ is preferably a substituted or unsubstituted aryl group having four to six fused rings or a substituted or unsubstituted heterocyclic group having four to six fused rings, and more preferably a substituted or unsubstituted aryl group having four to six fused rings.

In the compound according to the exemplary embodiment, $Ar_1$ is also preferably a group derived from a substituted or unsubstituted fluoranthene ring, a substituted or unsubstituted benzofluoranthene ring, a substituted or unsubstituted benzanthracene ring, or a substituted or unsubstituted benzoxanthene ring.

In the compound according to the exemplary embodiment, $Ar_1$ is also preferably a group represented by the formula (110), (114), (120), (130), (140), (150), (160), (170), (171), (180) or (190).

In the compound according to the exemplary embodiment, $Ar_1$ in the formula (10A) is preferably a group represented by the formula (110) or (120) described in the first exemplary embodiment.

In the compound according to the exemplary embodiment, $Ar_1$ is also preferably a group represented by the formula (111), (112) or (113) described in the first exemplary embodiment.

In the compound according to the exemplary embodiment, $Ar_1$ is also preferably a group represented by the formula (112) described in the first exemplary embodiment.

In the compound according to the exemplary embodiment, it is also preferable that $Ar_1$ is a group represented by the formula (112) and mx is 0. In this case, the compound according to the exemplary embodiment is a compound represented by a formula (103C) below.

In the exemplary embodiment, the compound represented by the formula (1A) is also preferably a compound represented by the formula (103C) below.

[Formula 184]

(103C)

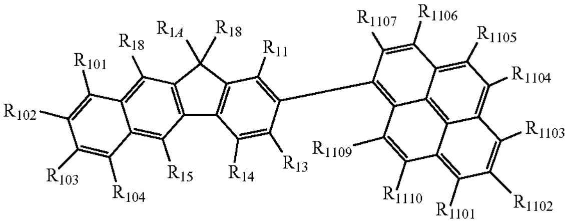

In the formula (103C):

$R_{1A}$, $R_{1B}$, $R_{11}$, $R_{13}$, $R_{14}$, $R_{15}$, and $R_{18}$ respectively represent the same as $R_{1A}$, $R_{1B}$, $R_{11}$, $R_{13}$, $R_{14}$, $R_{15}$, and $R_{18}$ in the formula (1A);

$R_{101}$ to $R_{104}$ each represent the same as $R_{101}$ to $R_{104}$ in the formula (102); and $R_{1101}$ to $R_{1107}$, $R_{1109}$, and $R_{1110}$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a group represented by —N($R_{906}$)($R_{907}$), a substituted or unsubstituted aralkyl group having 7 to 50 carbon atoms, a group represented by —C(=O)$R_{801}$, a group represented by —COO$R_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

In the compound according to the exemplary embodiment, $R_{1101}$ to $R_{1110}$ that are each not a bonding position to $L_1$ are preferably each independently a hydrogen atom or a substituted or unsubstituted aryl group having 6 to 14 ring carbon atoms, and more preferably a hydrogen atom or a substituted or unsubstituted phenyl group.

In the compound according to the exemplary embodiment, $R_{1211}$ or $R_{1212}$ in the formula (120) is preferably a bonding position to $L_1$.

In the compound according to the exemplary embodiment, $R_{1201}$ to $R_{1212}$ that are each not a bonding position to $L_1$ are preferably each independently a hydrogen atom or a substituted or unsubstituted aryl group having 6 to 14 ring carbon atoms, and more preferably a hydrogen atom or a substituted or unsubstituted phenyl group.

In the compound according to the exemplary embodiment, all groups specified as "substituted or unsubstituted" groups are preferably "unsubstituted" groups.

Producing Method of Compound in the Exemplary Embodiment

The compound according to the exemplary embodiment can be produced by application of known substitution reactions and materials depending on a target compound, according to a synthesis method described in Examples described later or in a similar manner as the synthesis method.

Specific Examples of Compound in the Exemplary Embodiment

Specific examples of the compound in the exemplary embodiment include compounds below. However, the invention is by no means limited to the specific examples of the compound. The compound according to the exemplary embodiment whose specific examples are listed below is usable as the first host material of the organic EL device according to the first exemplary embodiment.

[Formula 185]

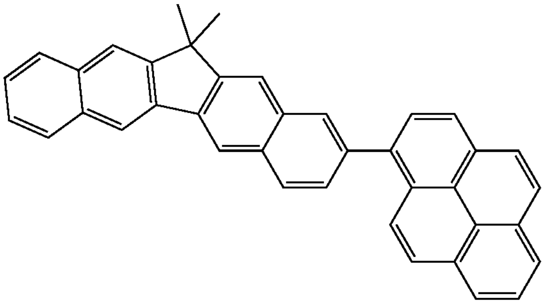
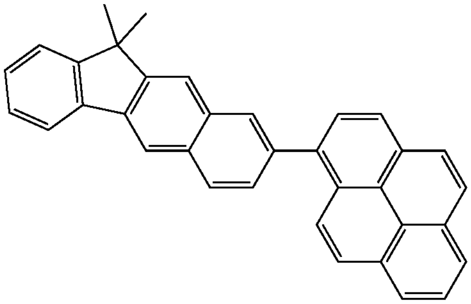
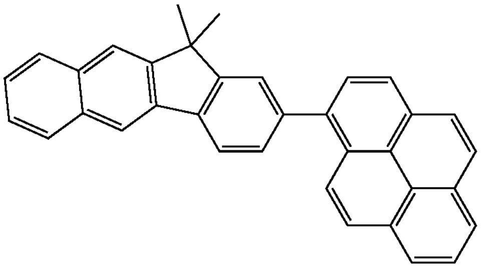
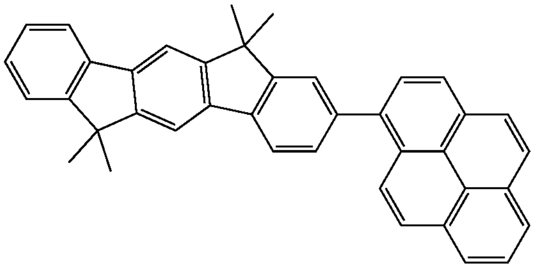
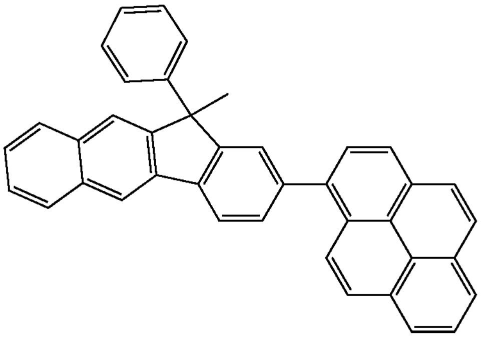
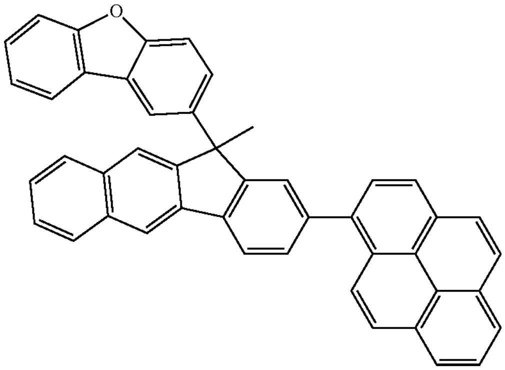
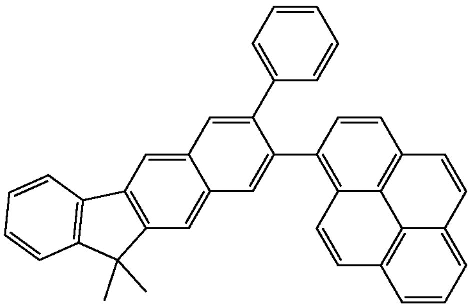
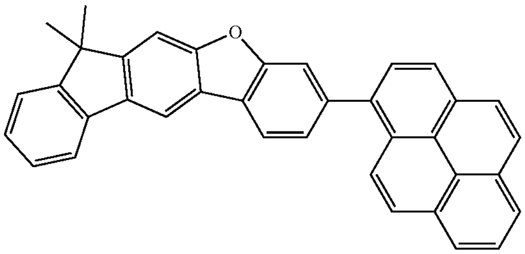

-continued
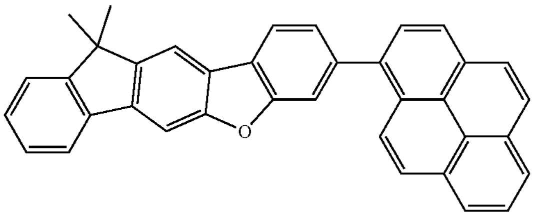
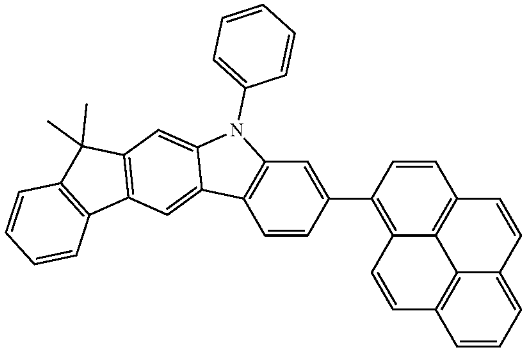
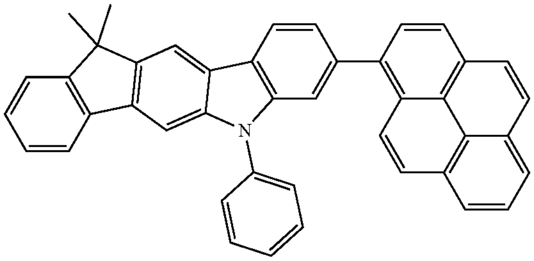
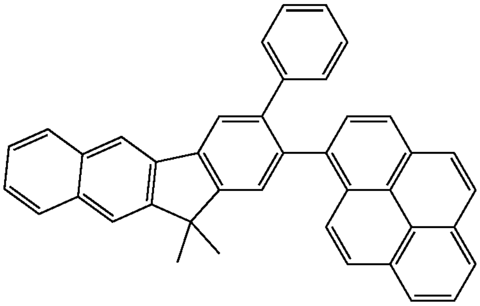
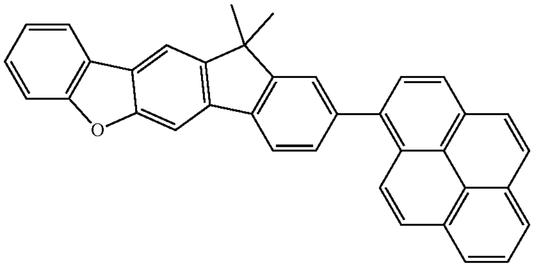
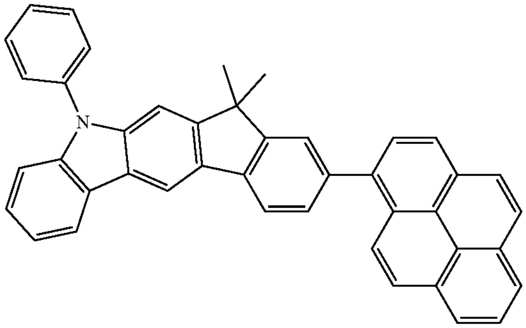
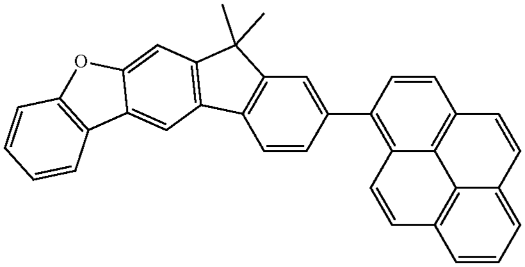
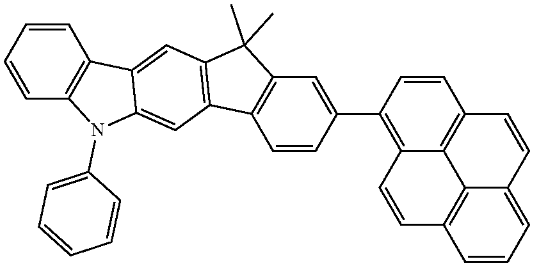
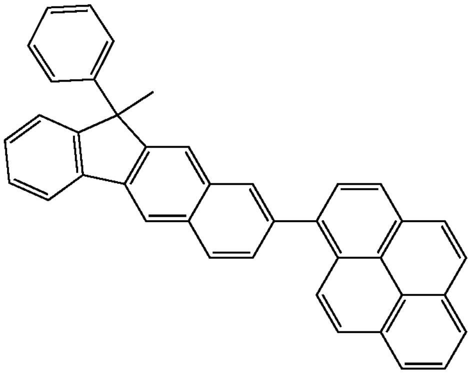
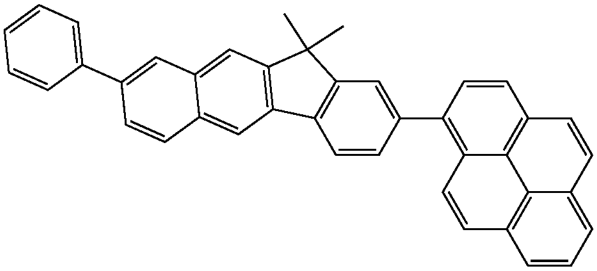

-continued
[Formula 186]
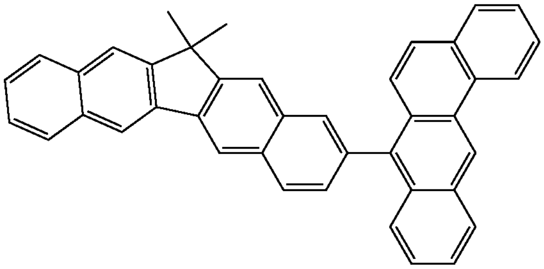
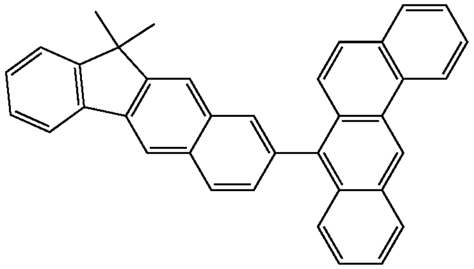
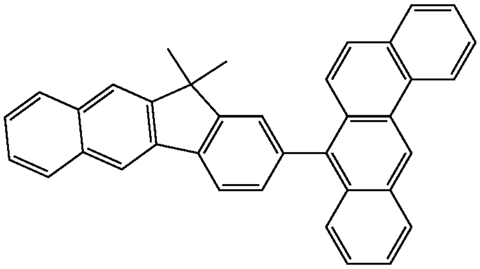
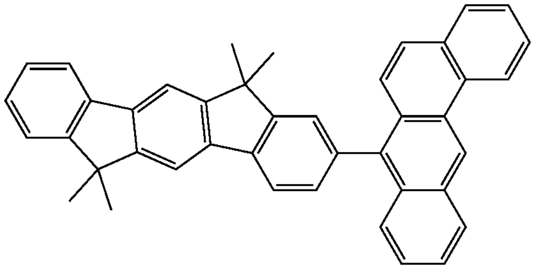
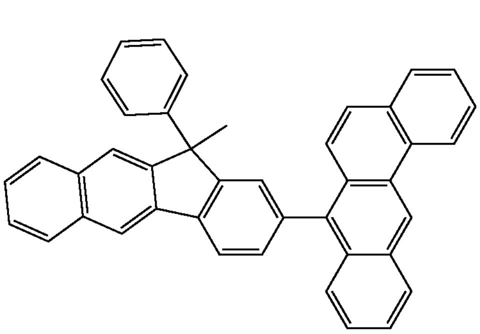
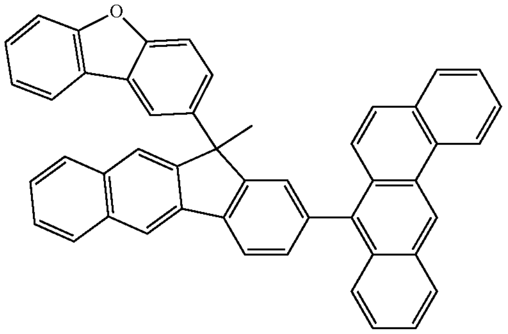
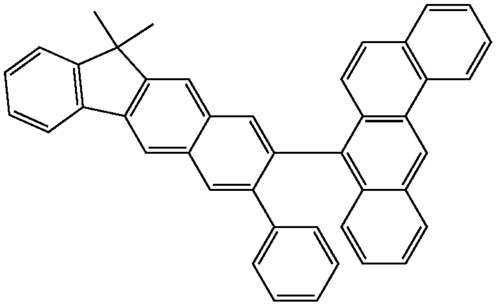
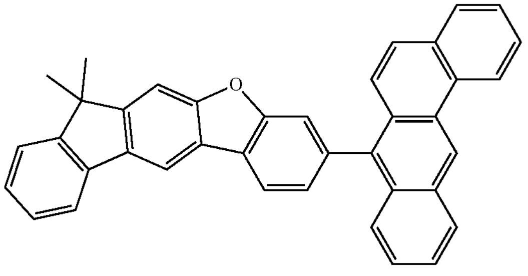
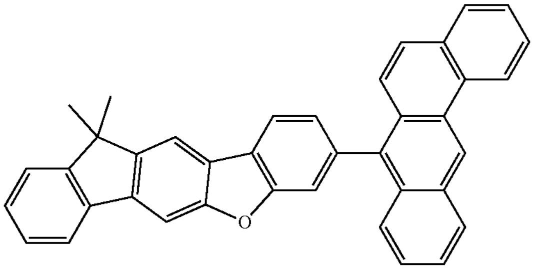
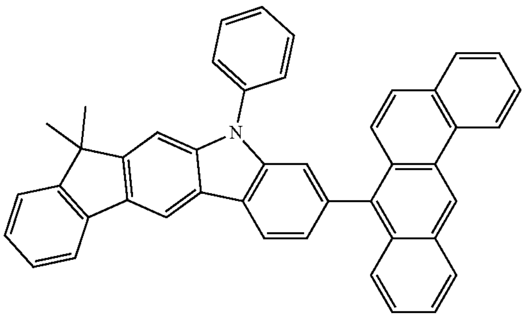

-continued
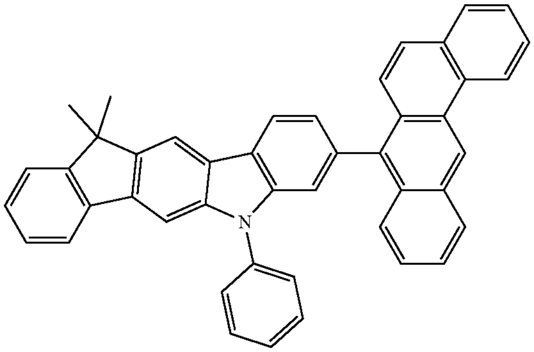
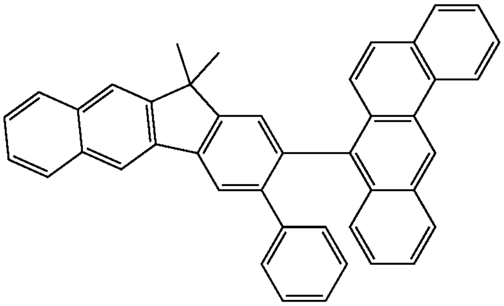
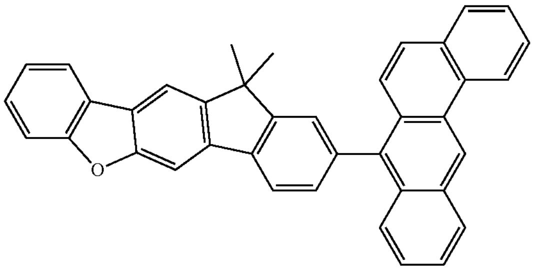
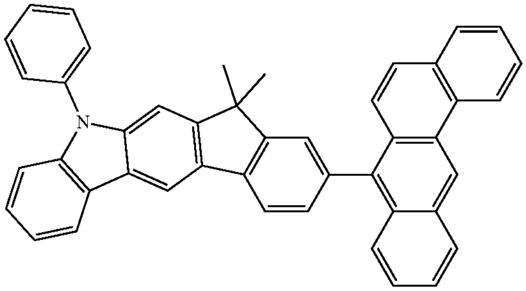
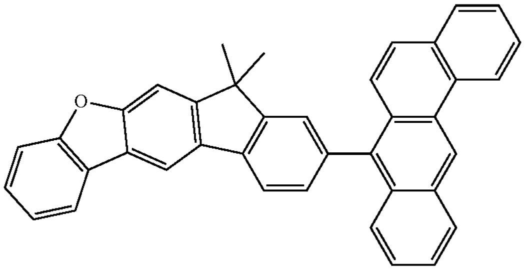
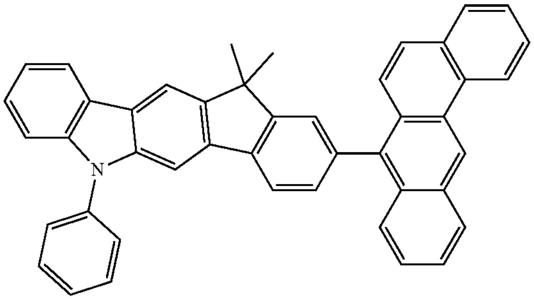
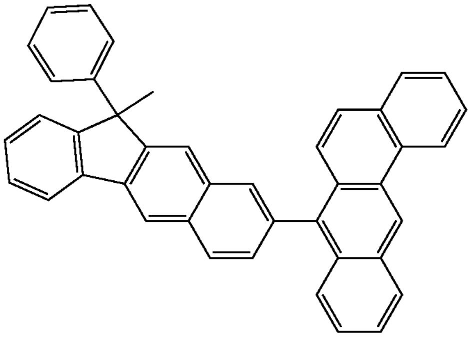
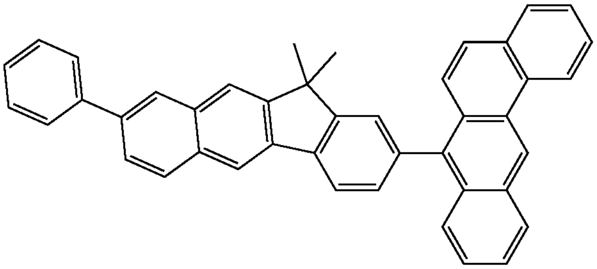
[Formula 187]
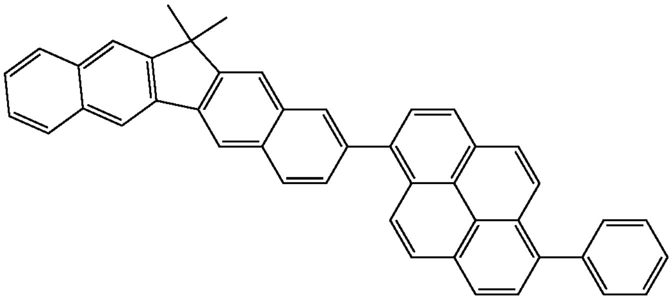

-continued
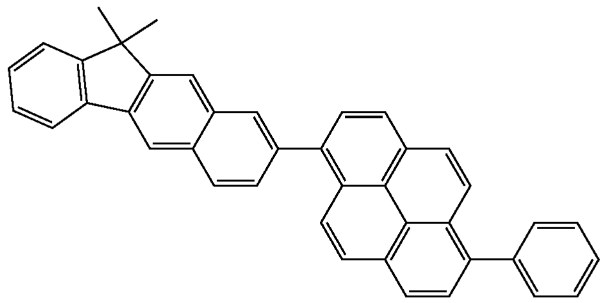
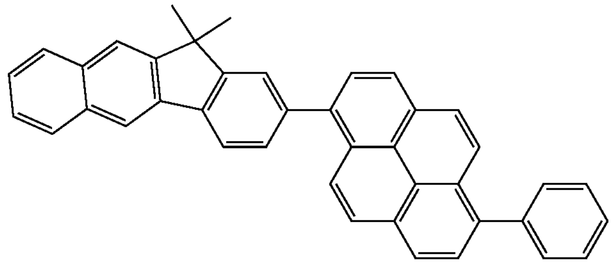
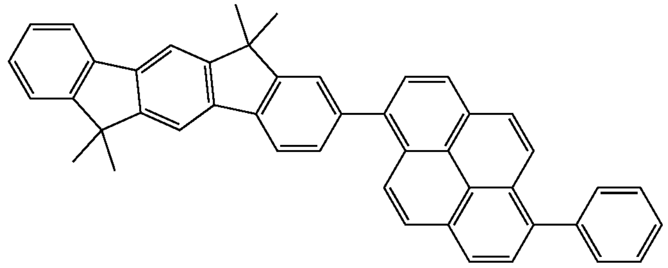
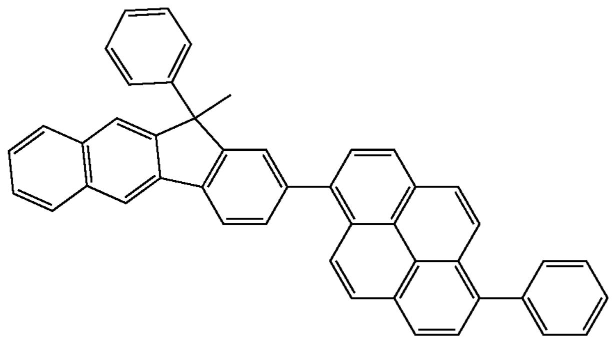
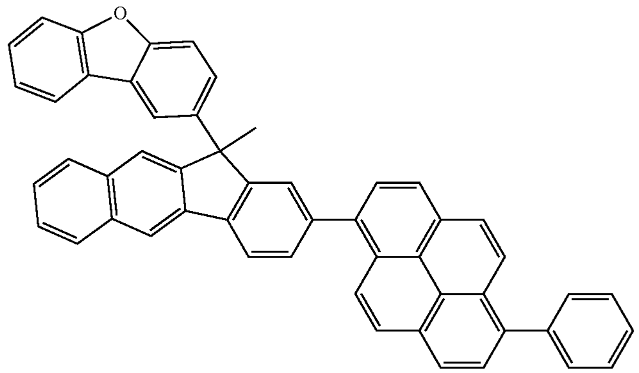

-continued
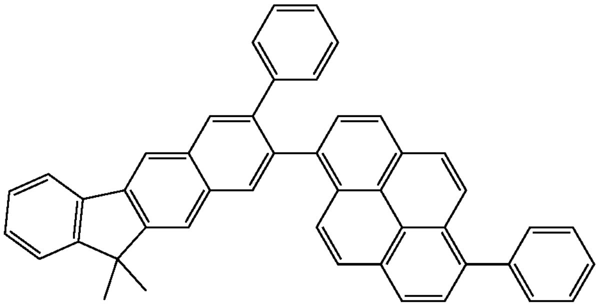
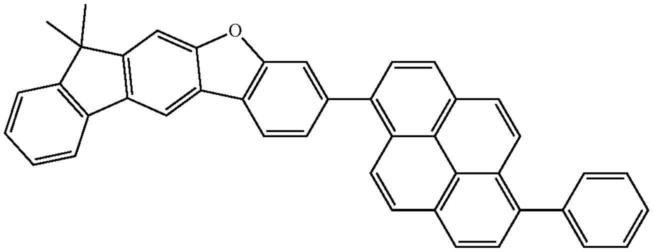
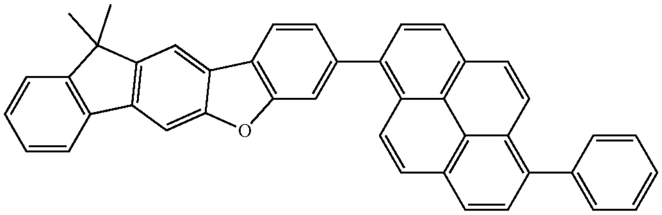
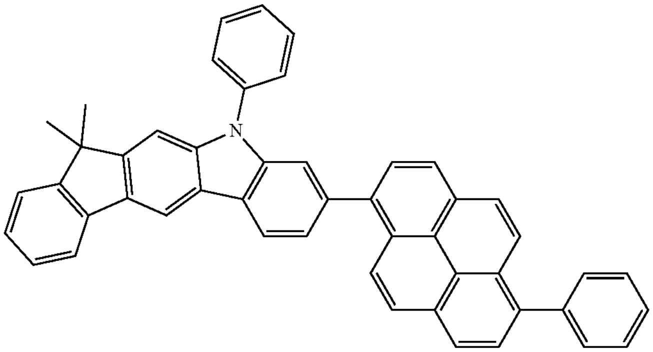
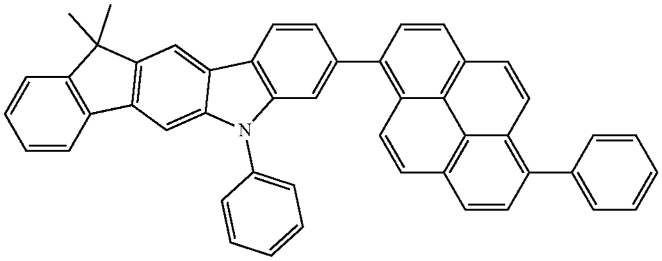
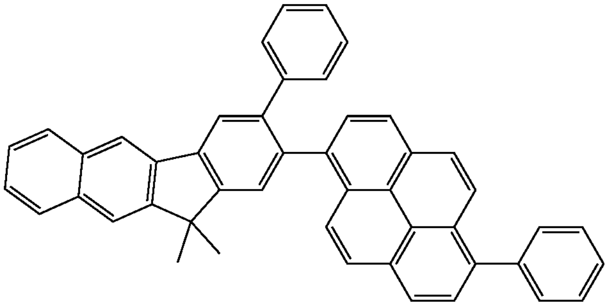

-continued
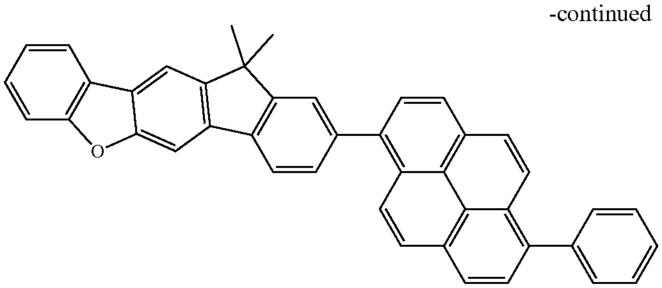
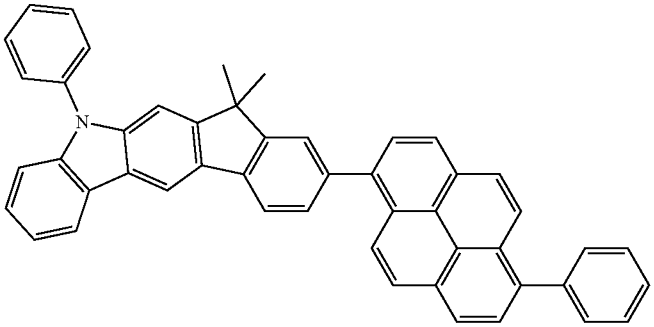
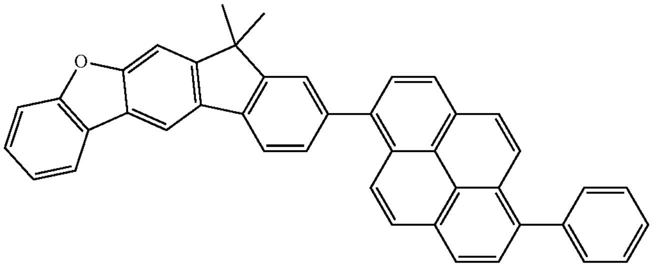
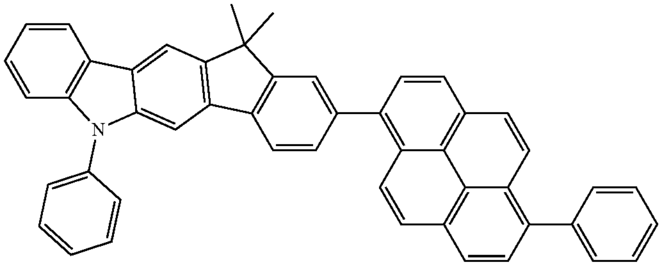
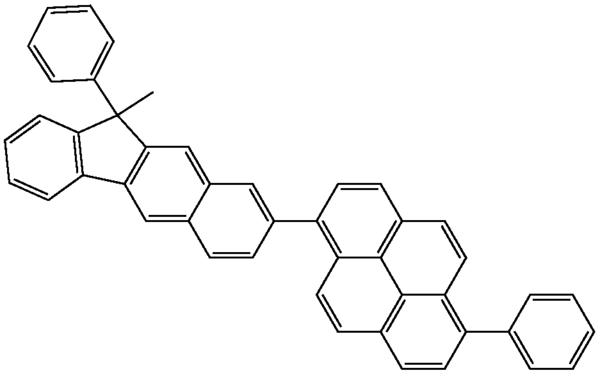

-continued
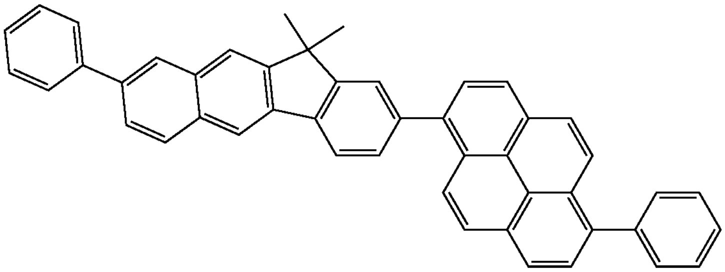
[Formula 188]
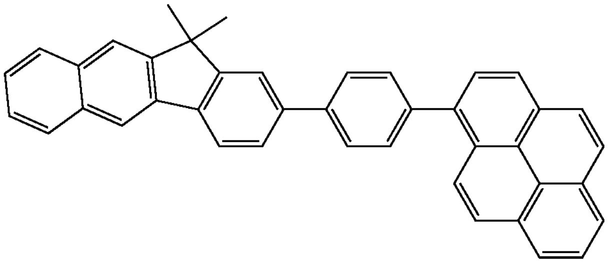
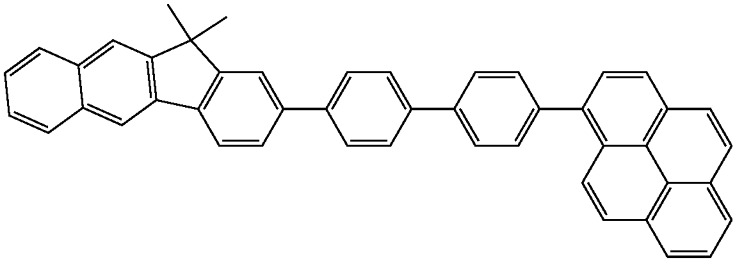
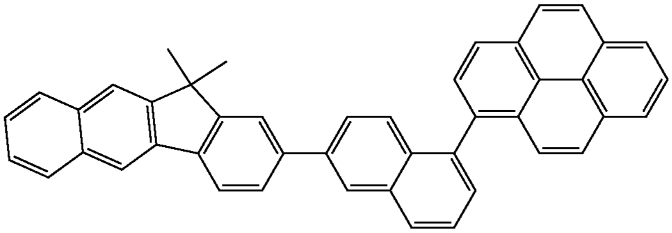
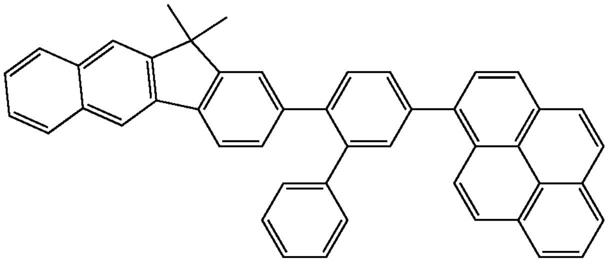
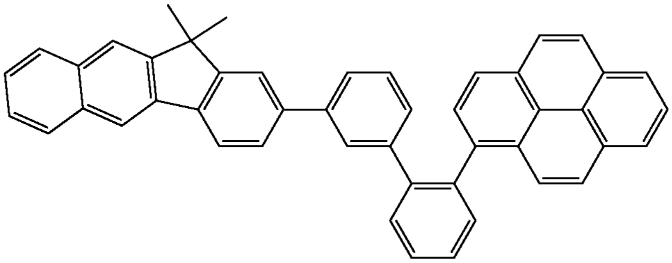

-continued
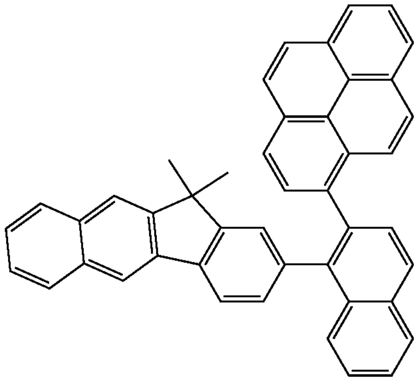
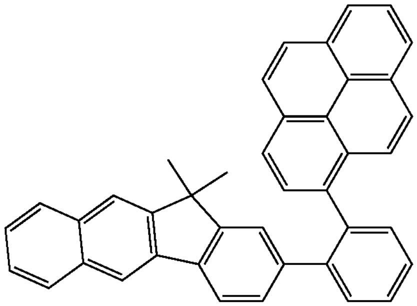
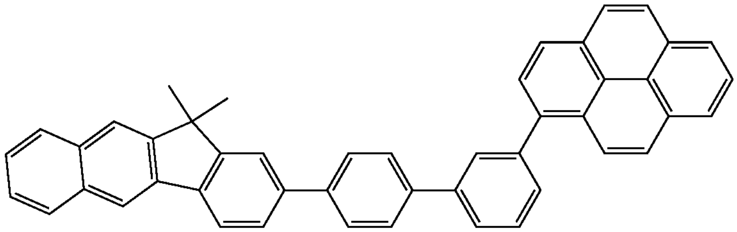
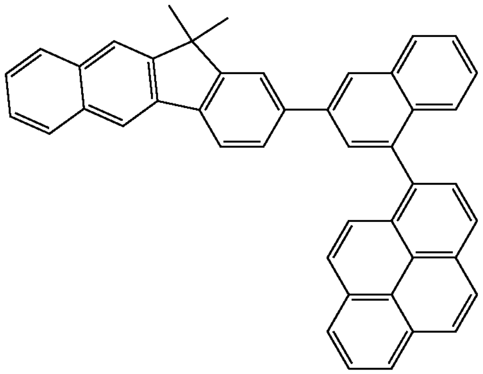
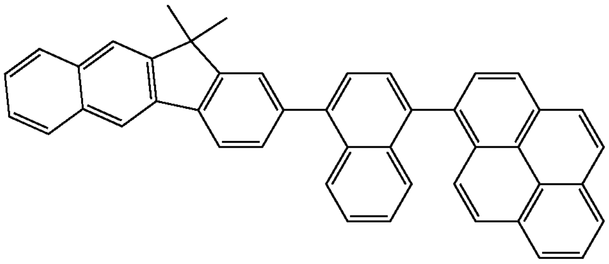
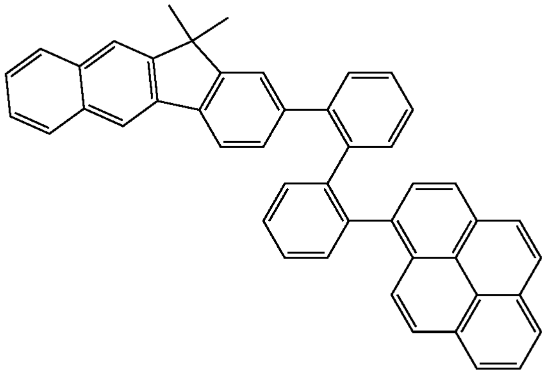
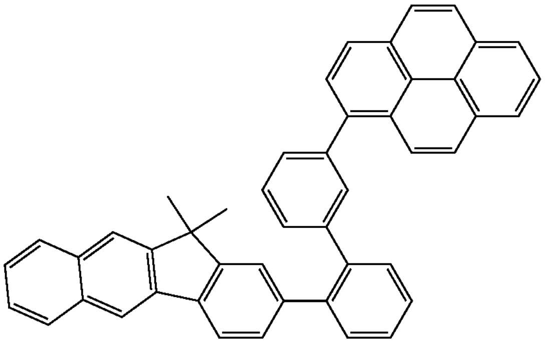

-continued
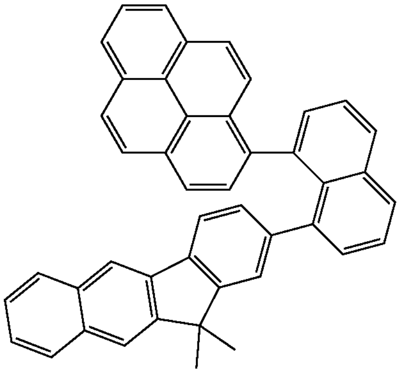
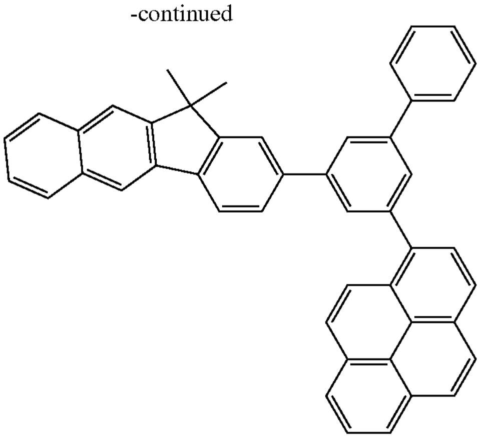
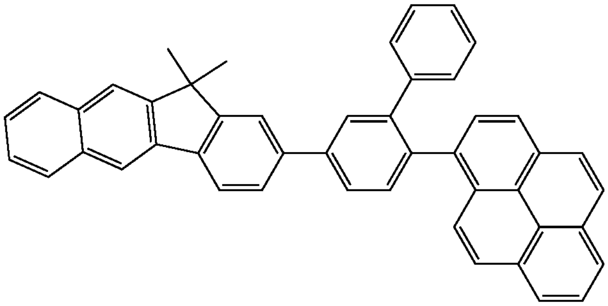
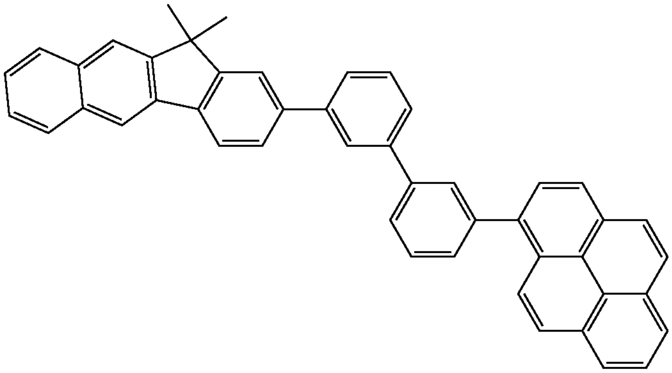
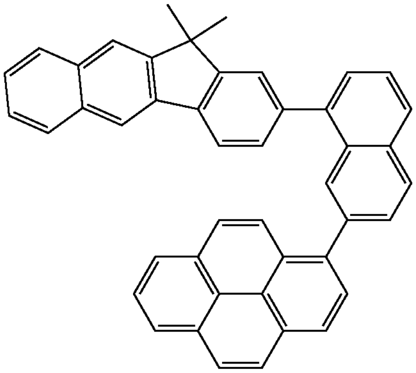
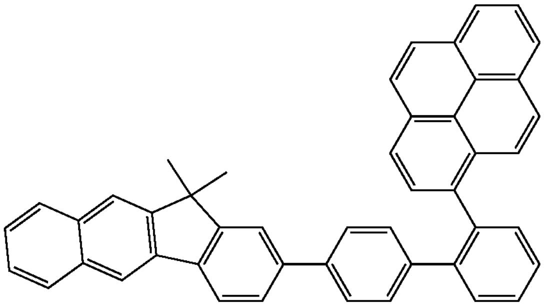
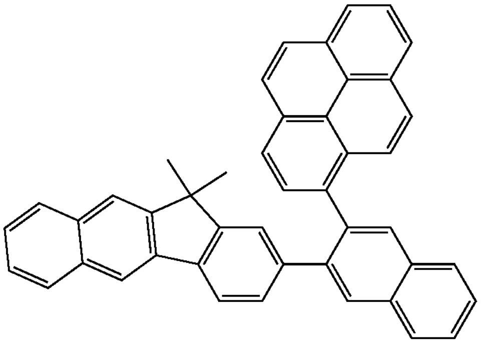

-continued
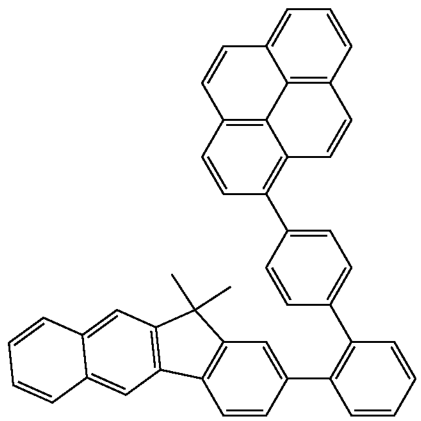
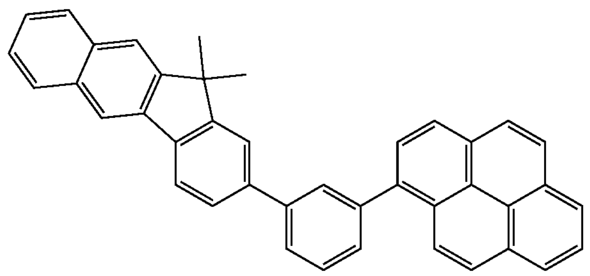
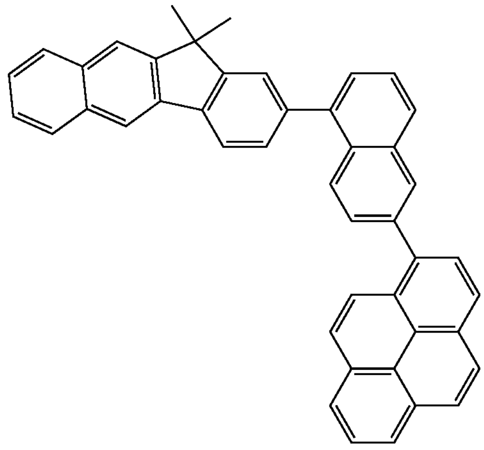
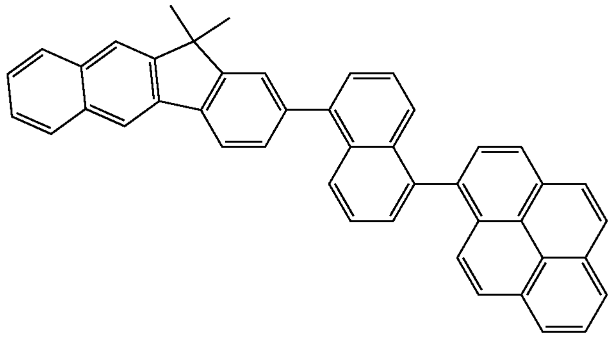
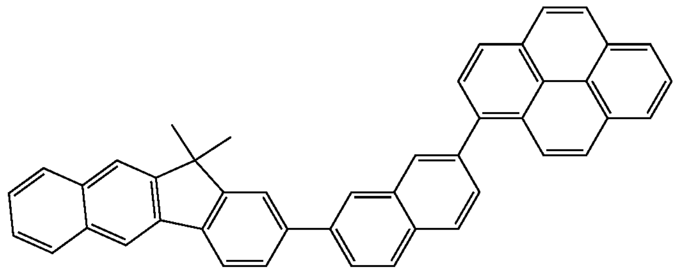
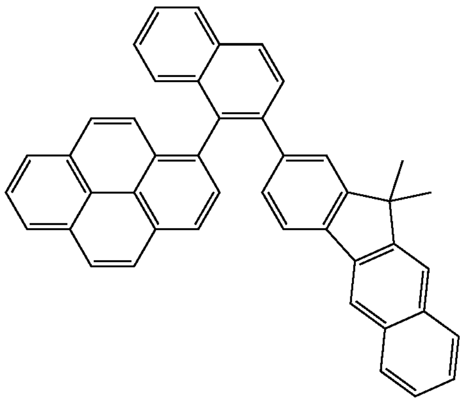

-continued
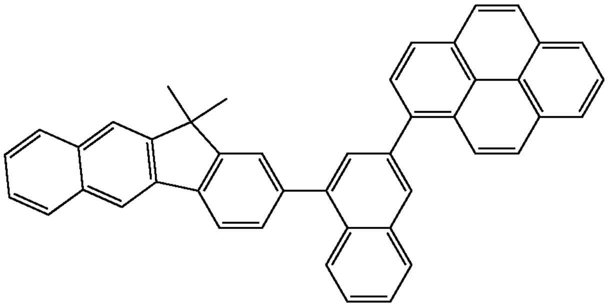
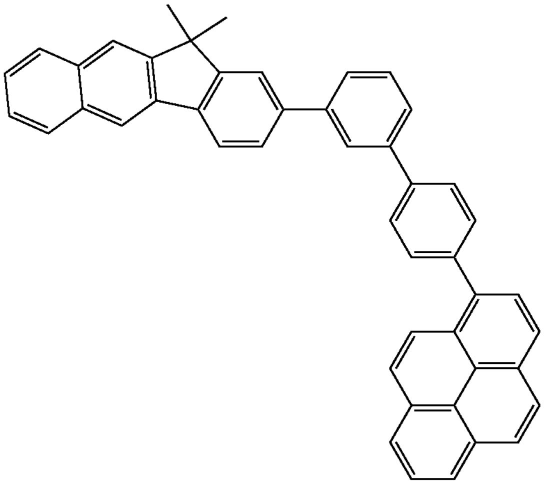
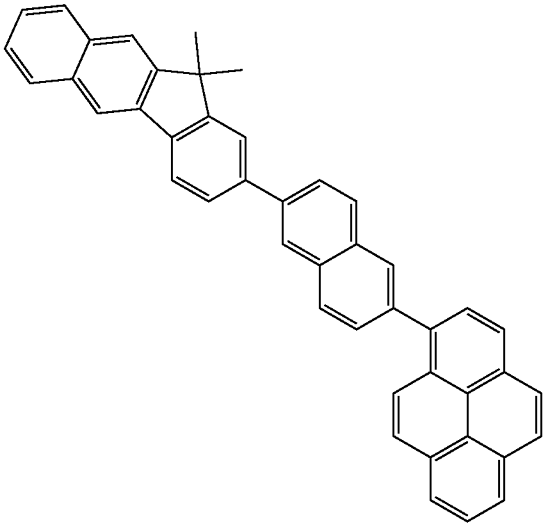
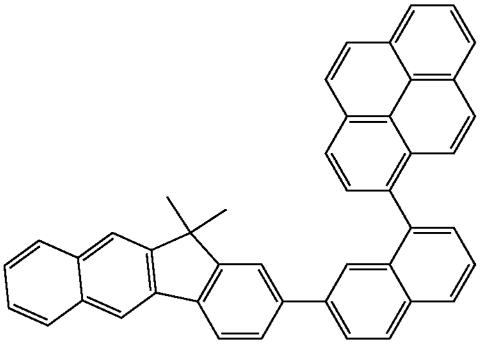
[Formula 189]
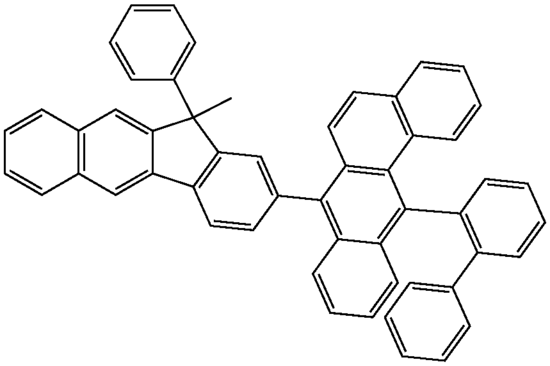
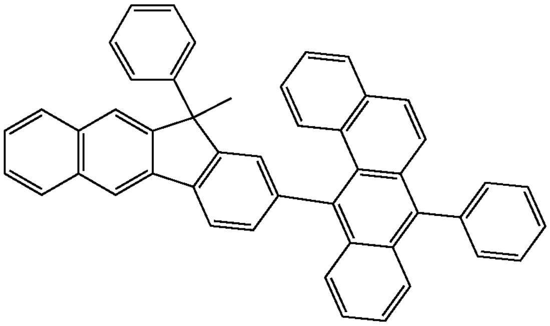

-continued
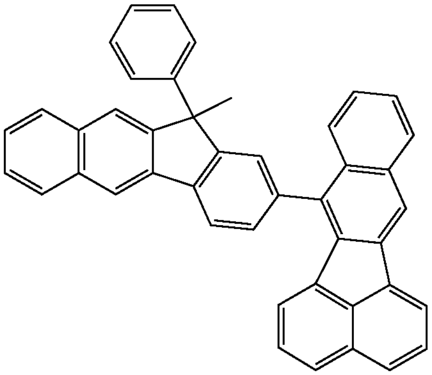
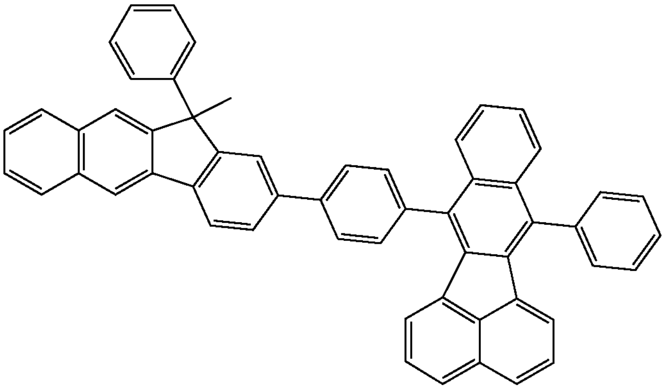
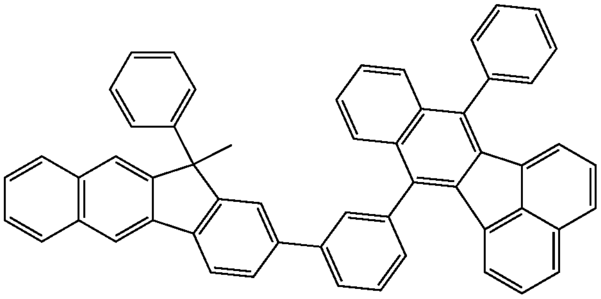
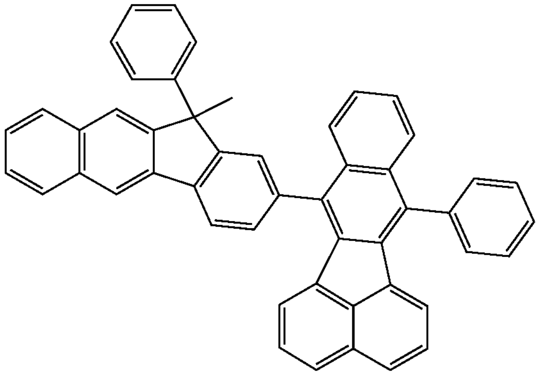
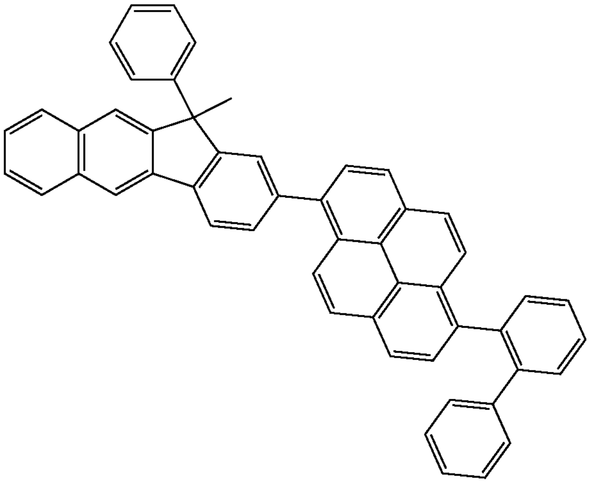
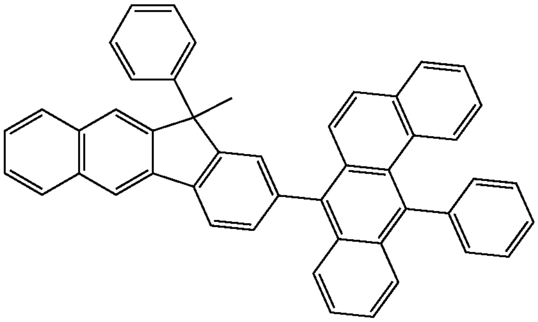

-continued
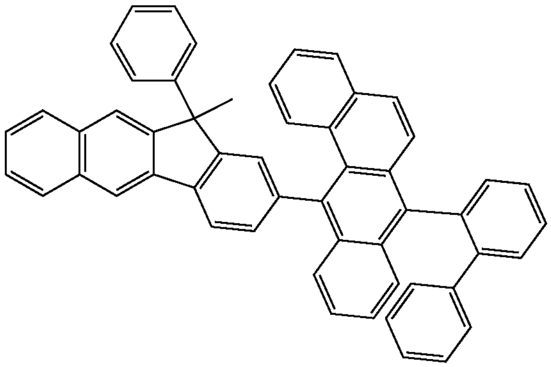
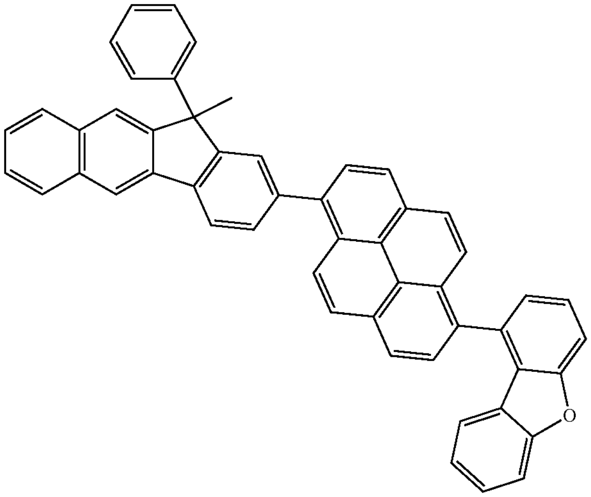
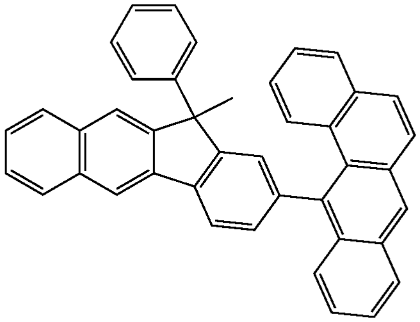
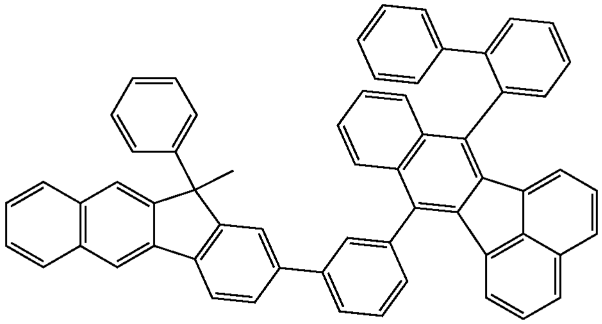
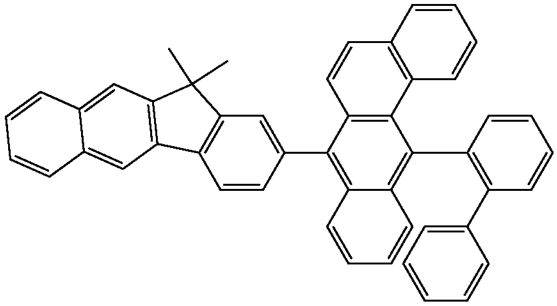
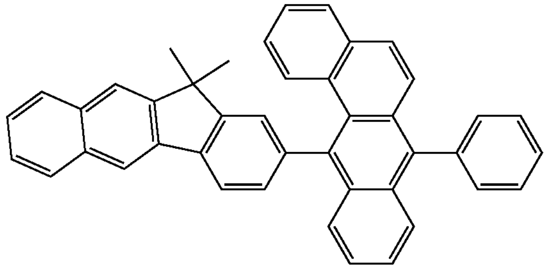
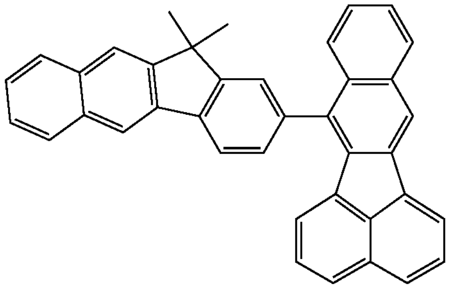
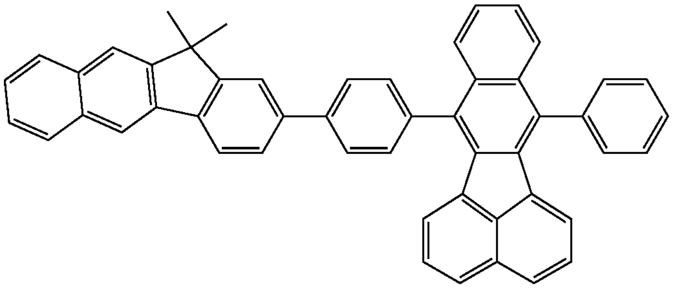
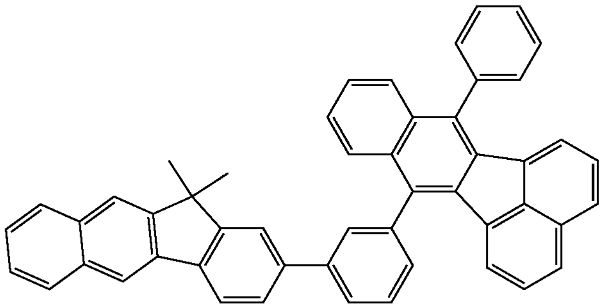
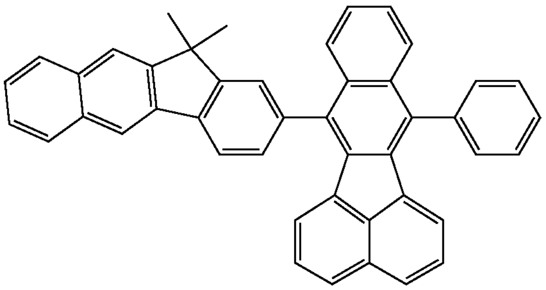

-continued
[Formula 190]
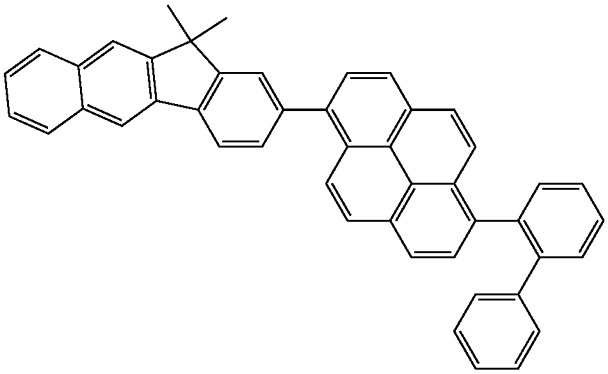
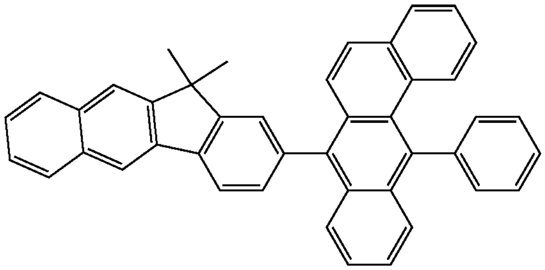
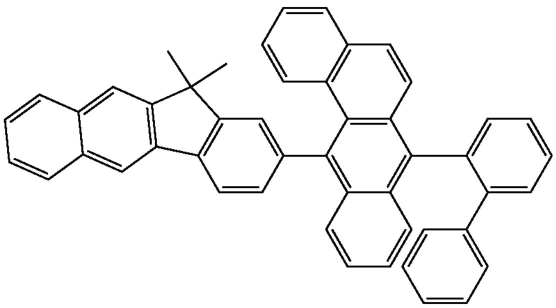
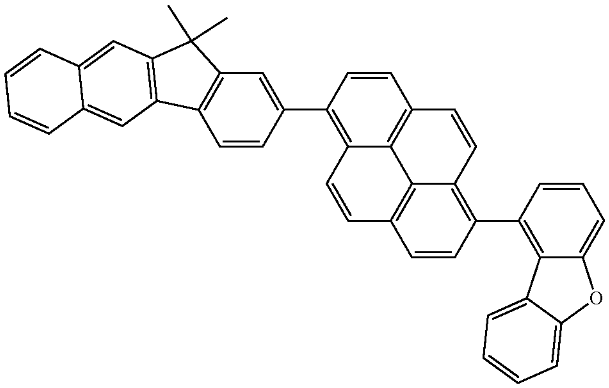
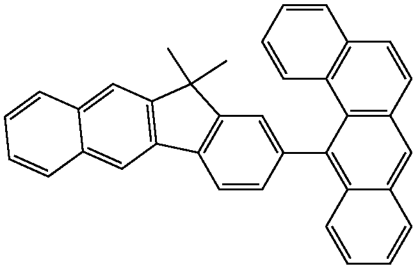
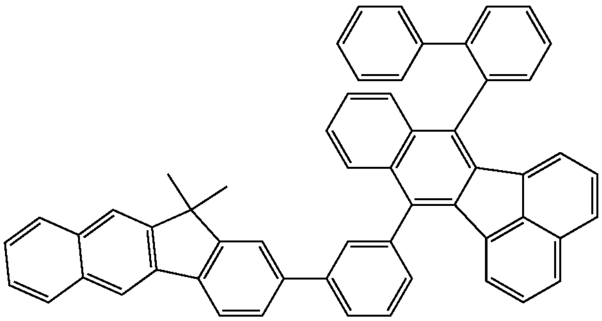
[Formula 191]
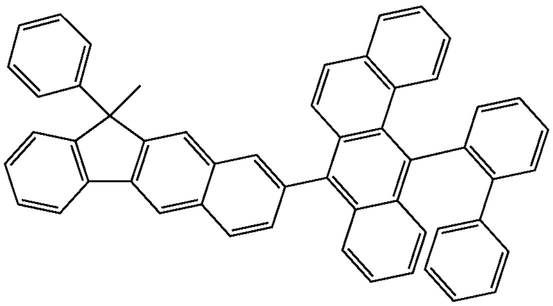
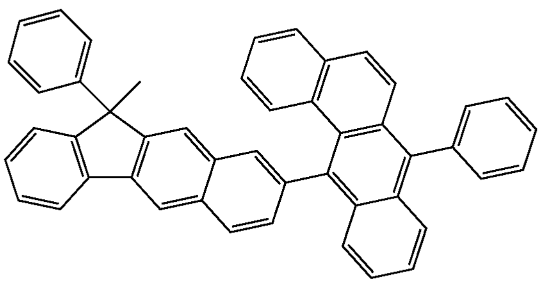

-continued
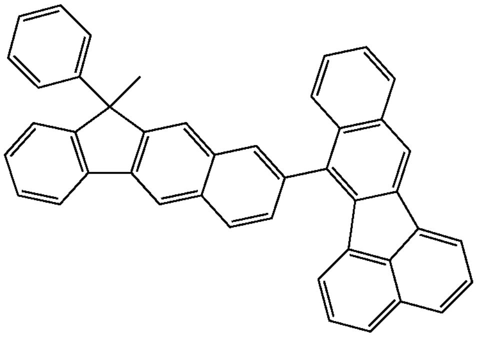
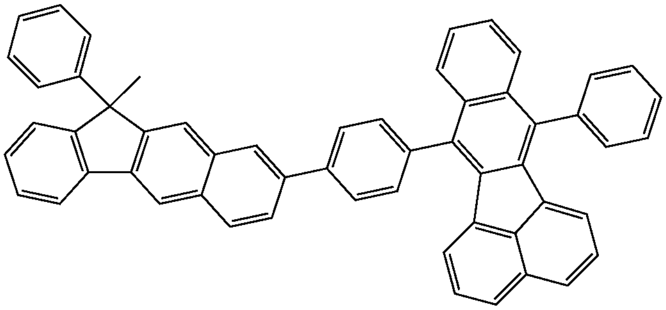
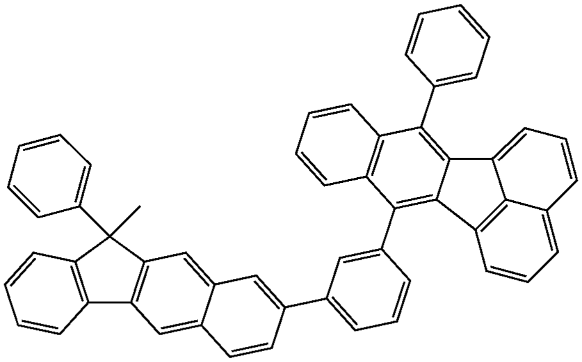
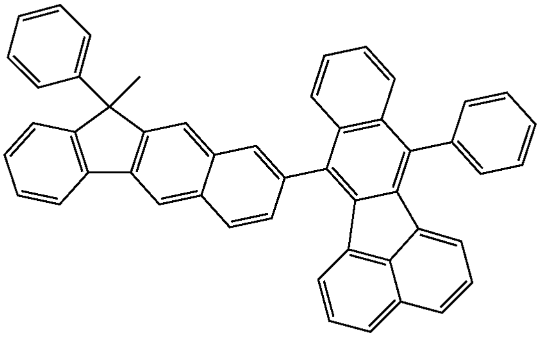
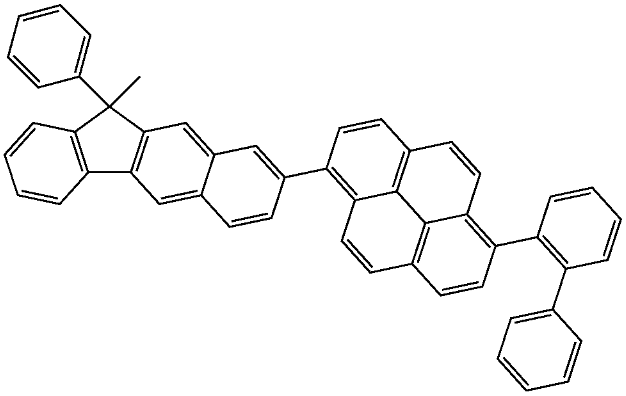
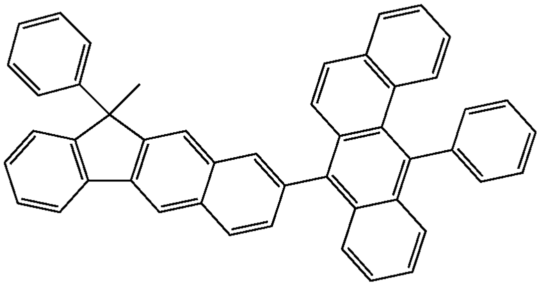
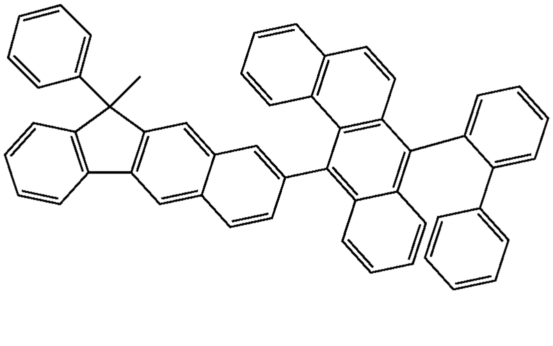
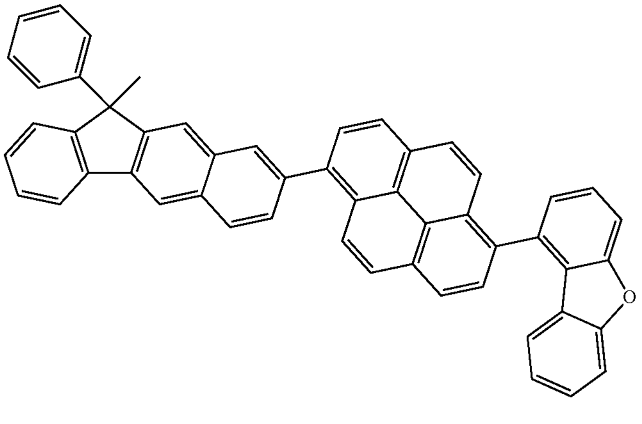

-continued
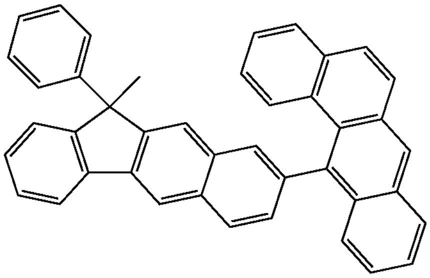
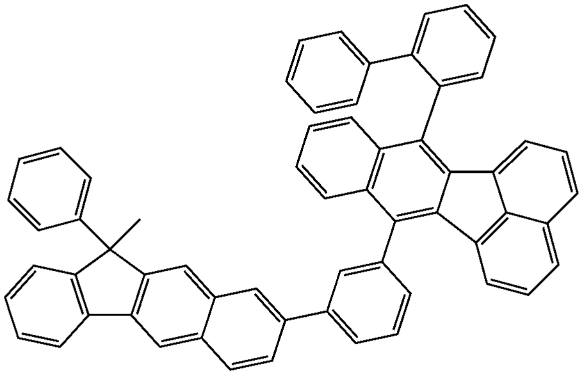
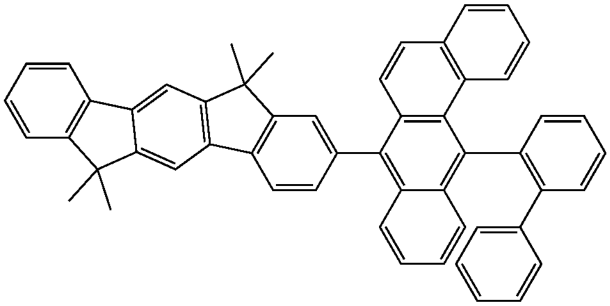
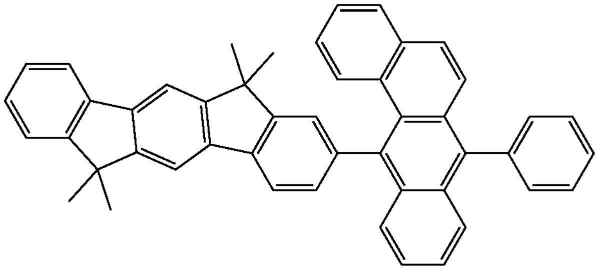
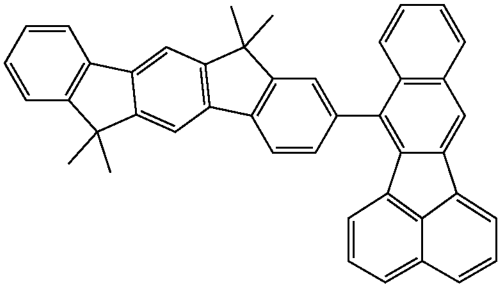
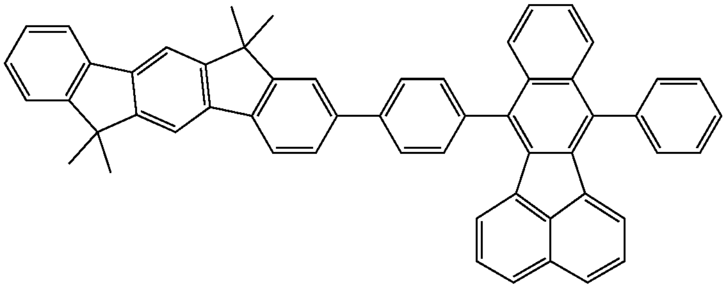
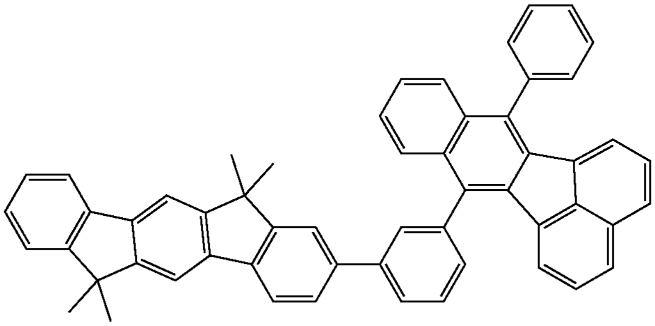

-continued
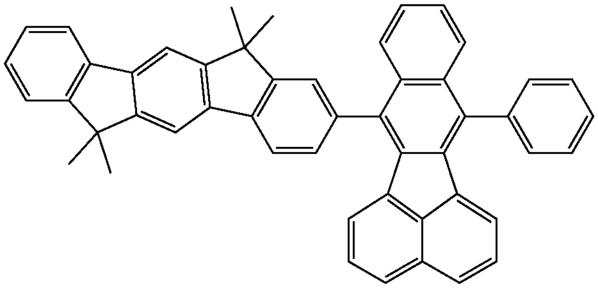
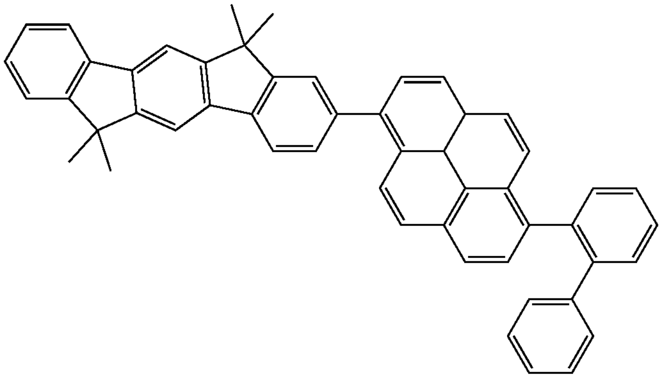
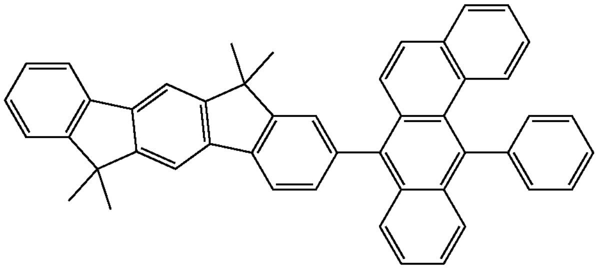
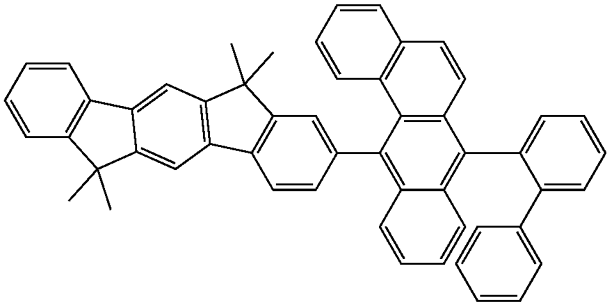
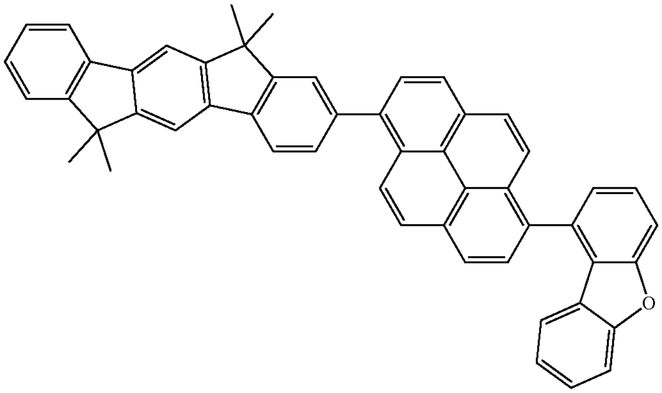
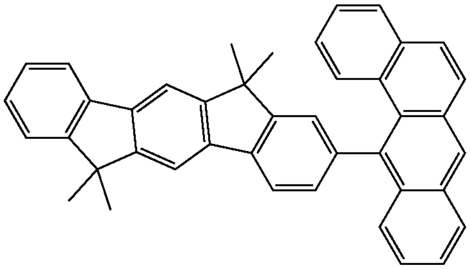

-continued
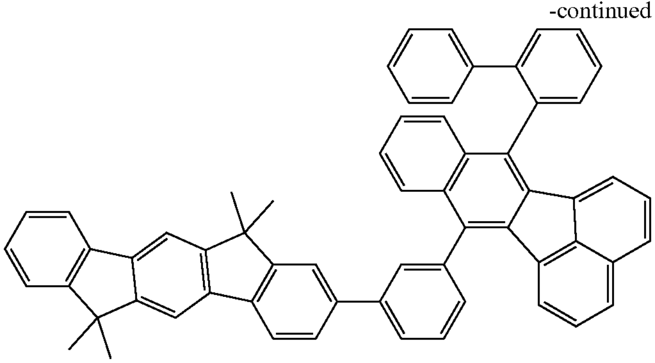
[Formula 192]
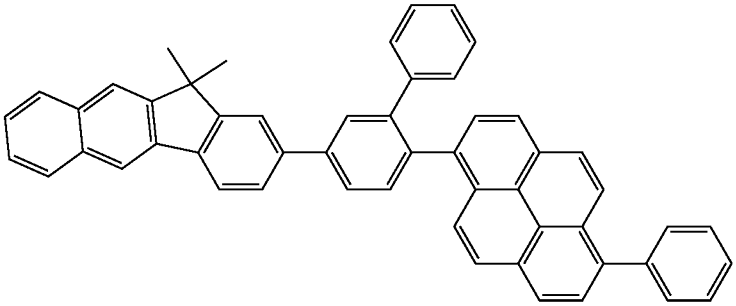
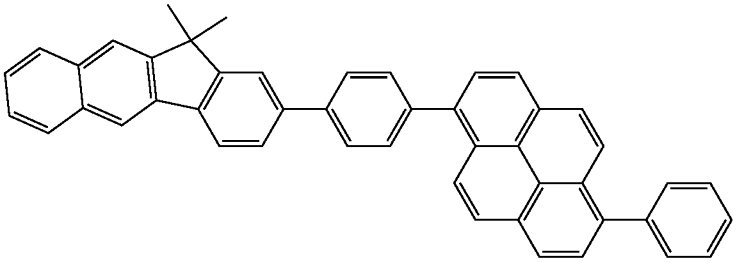
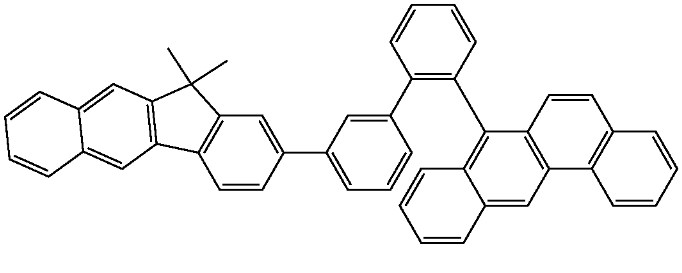
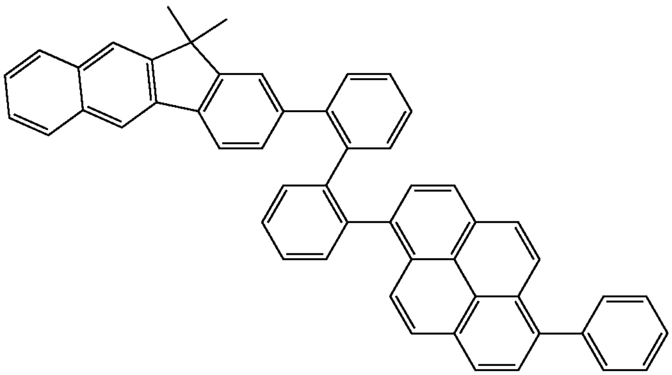

-continued
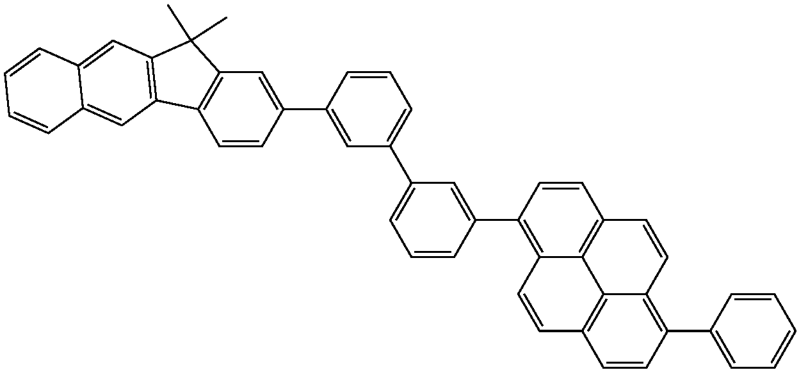
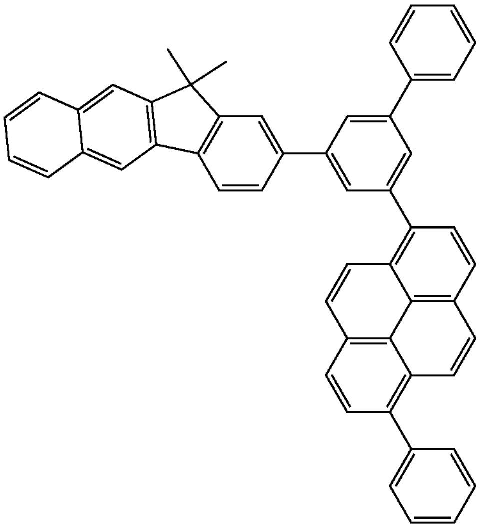
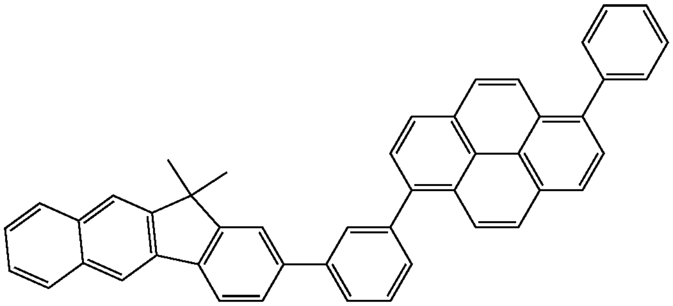
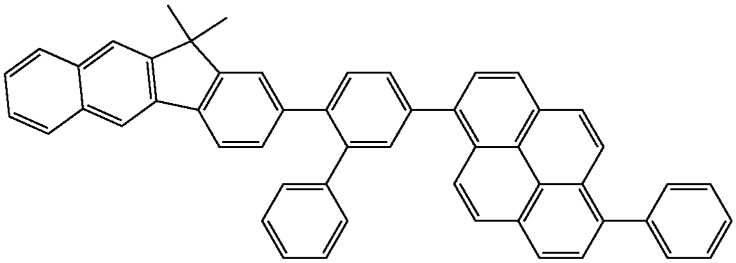
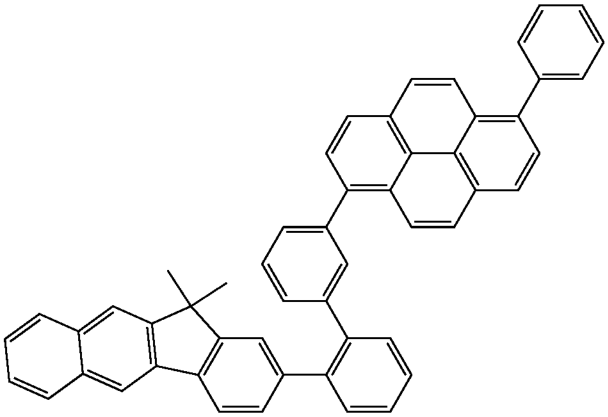

-continued
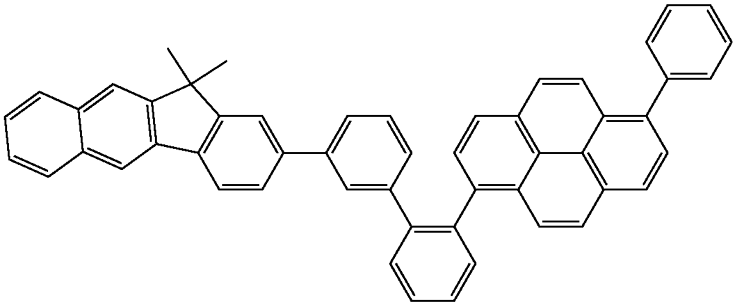
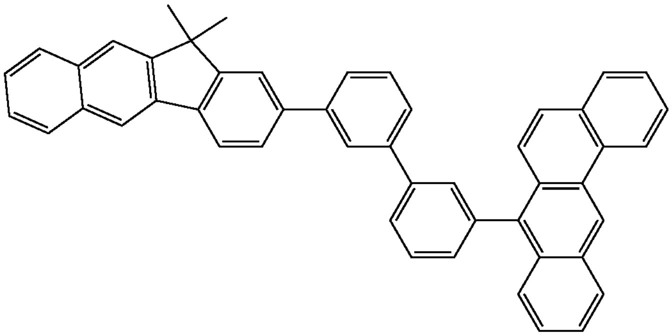
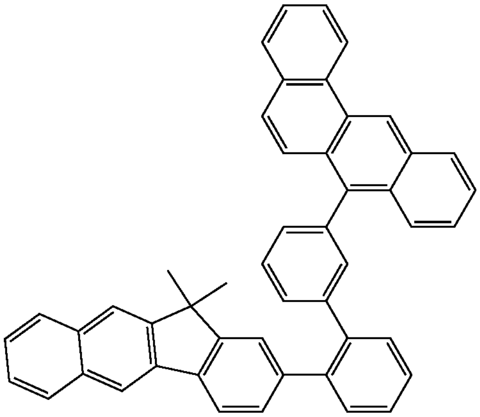
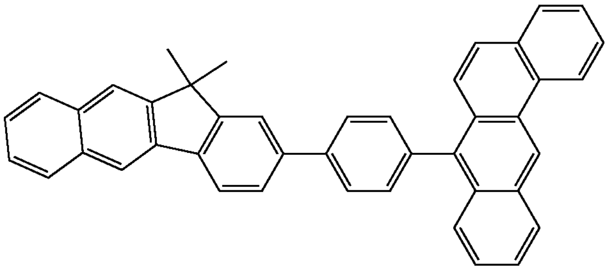
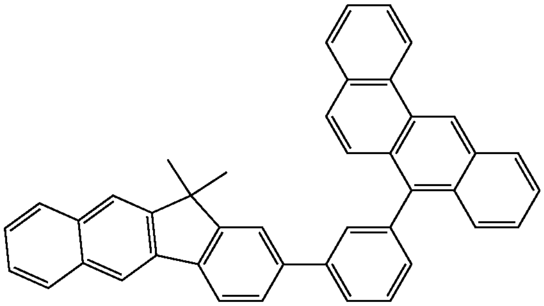
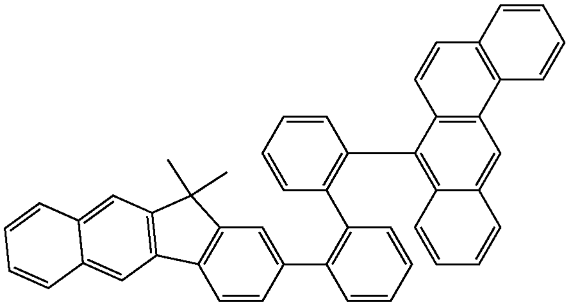
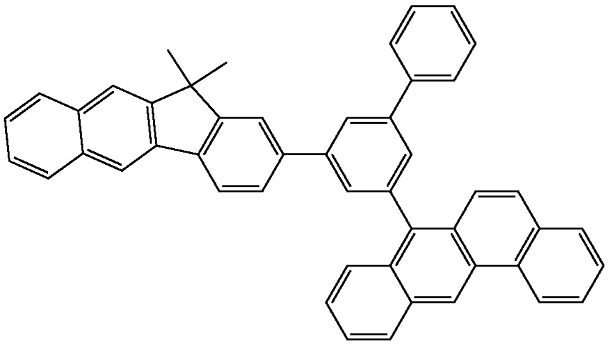

-continued
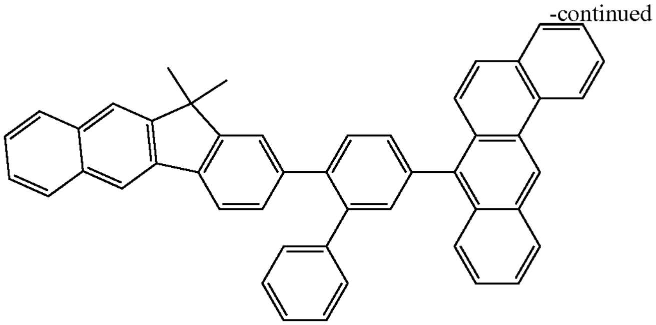
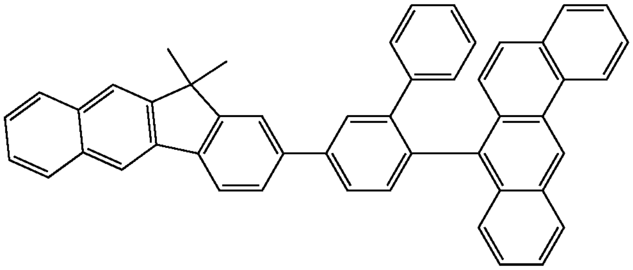
[Formula 193]
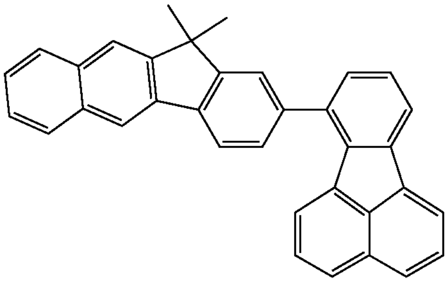
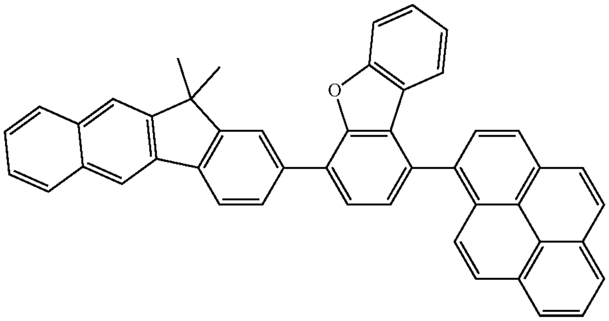
[Formula 194]
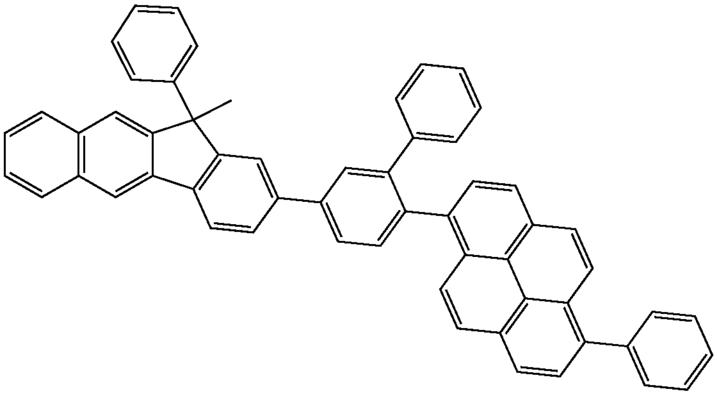

-continued
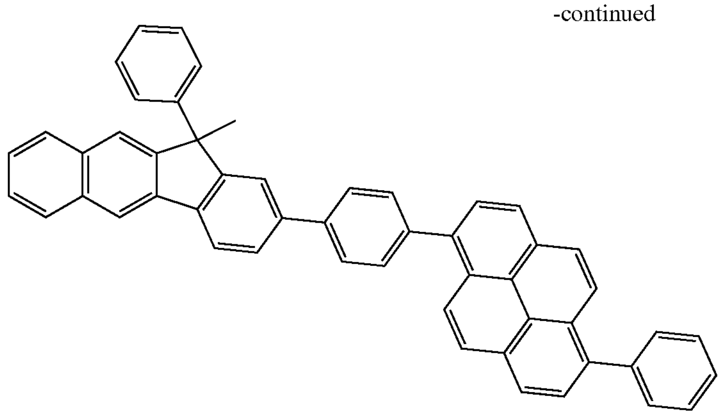
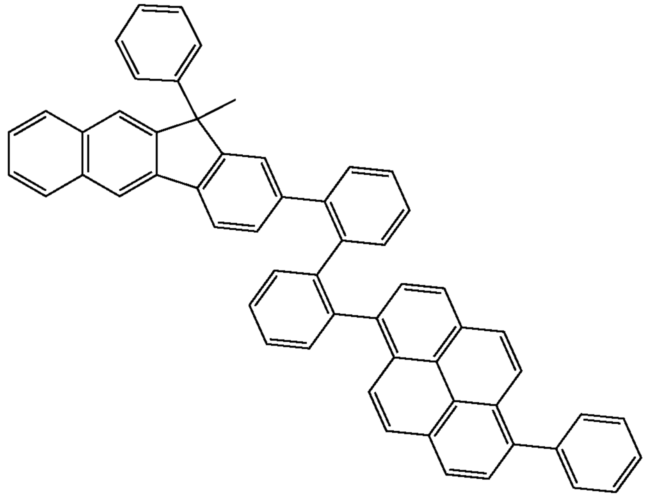
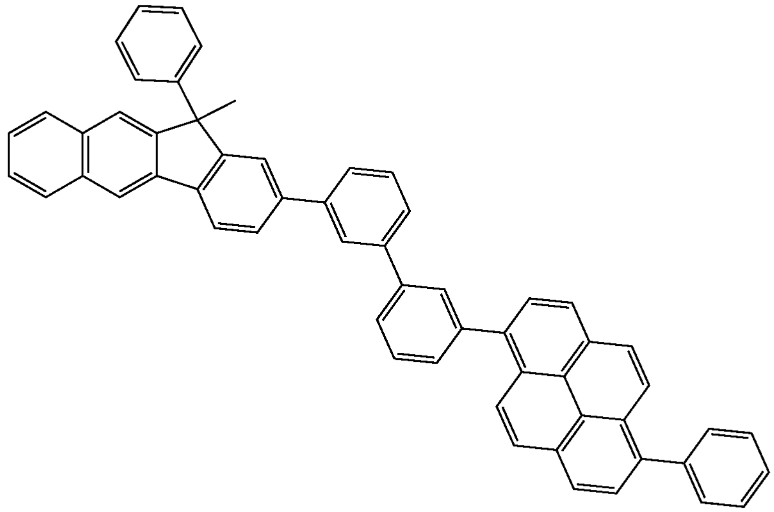

-continued
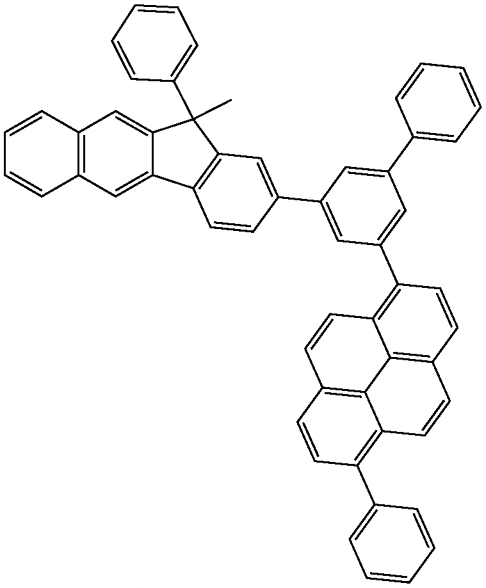
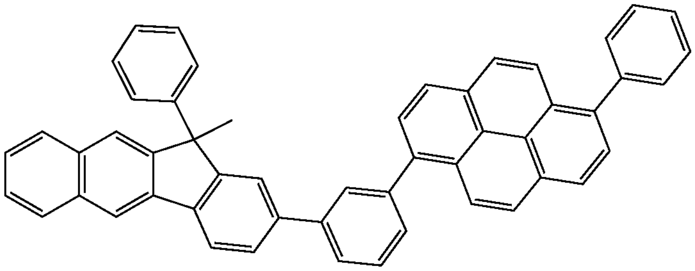
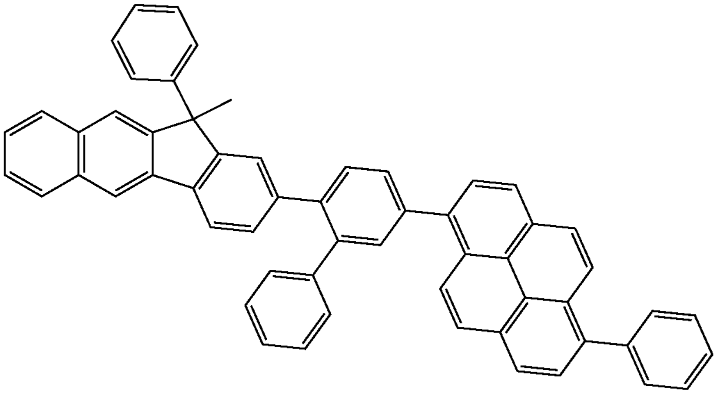
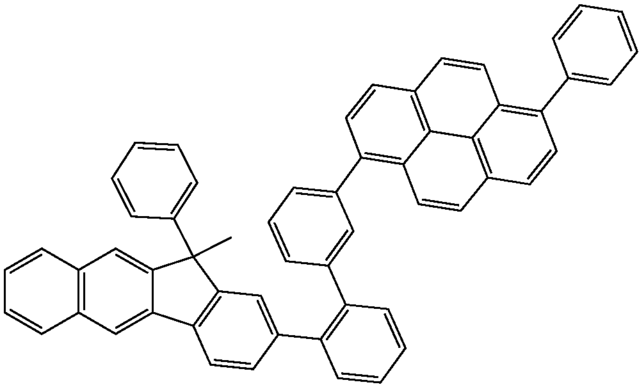
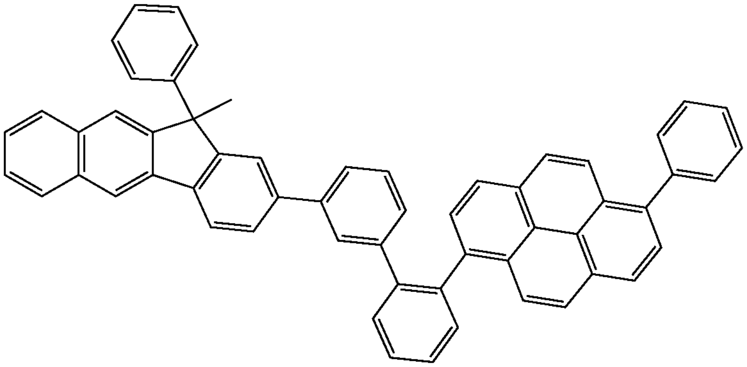

-continued
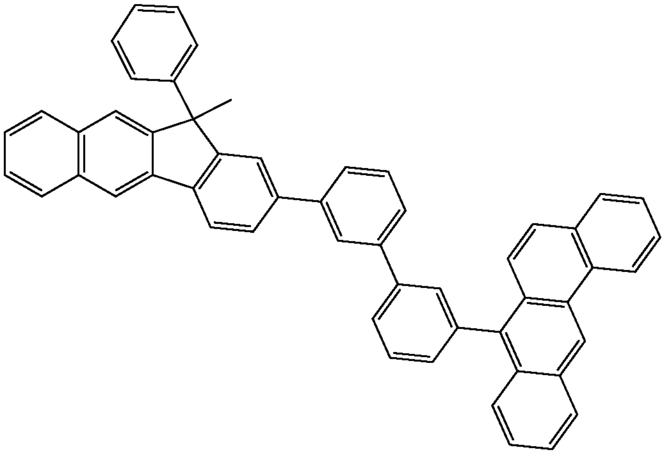
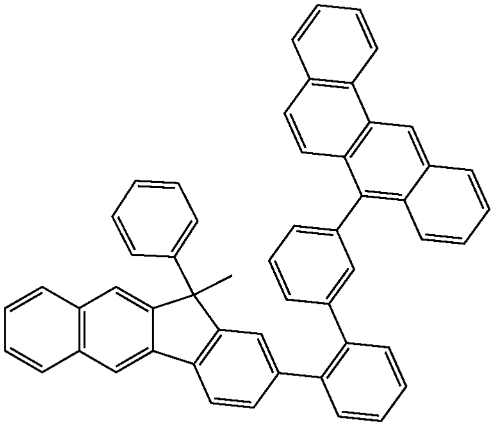
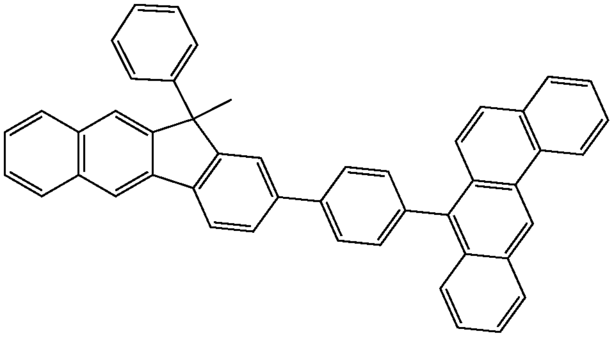
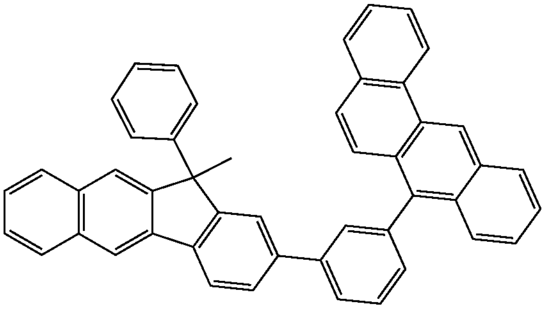
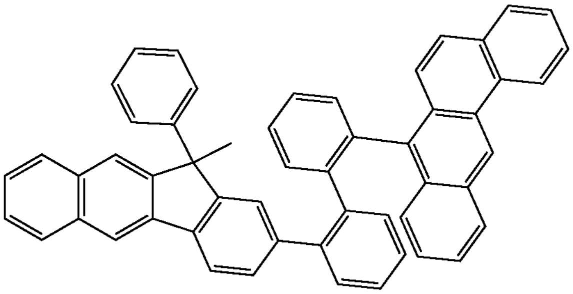
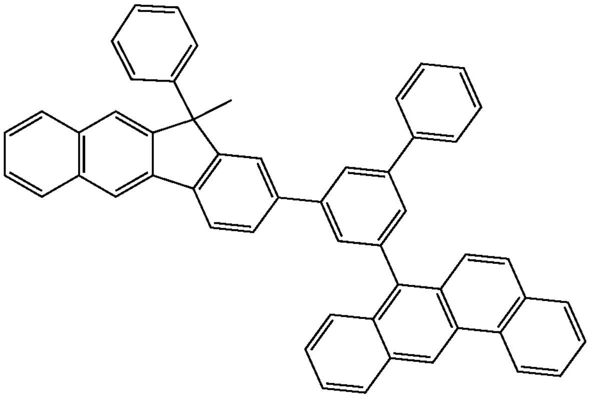
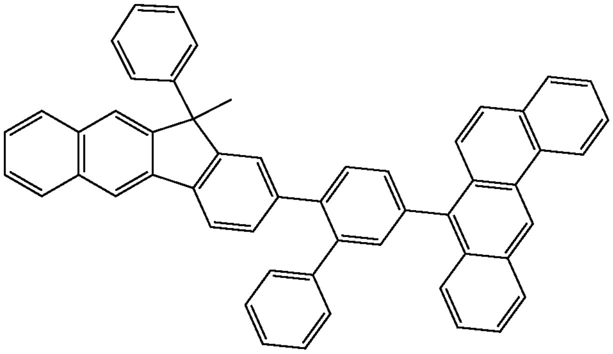

-continued
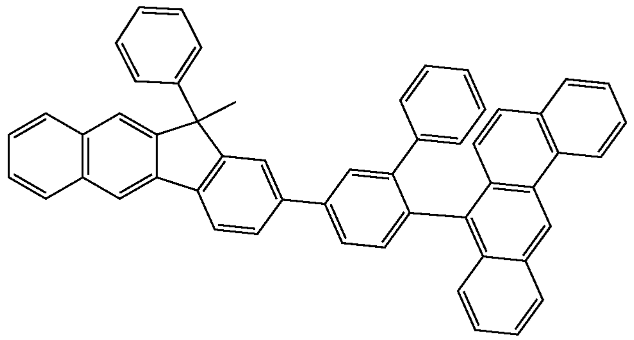
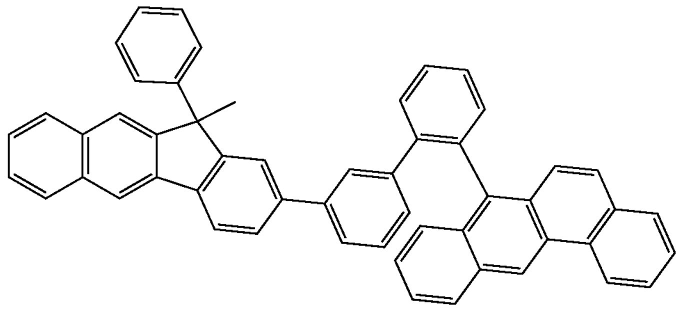
[Formula 195]
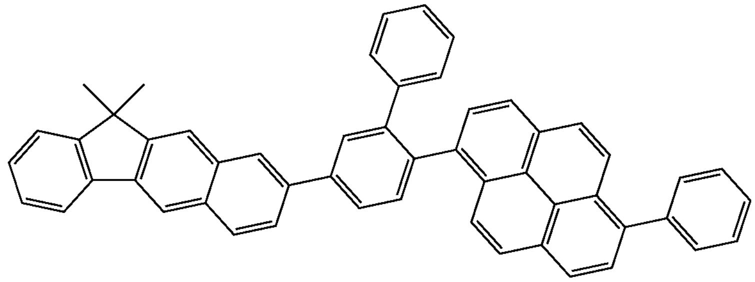
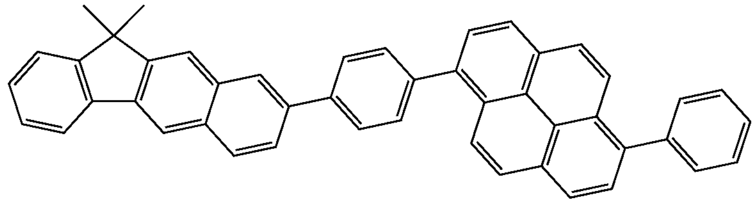
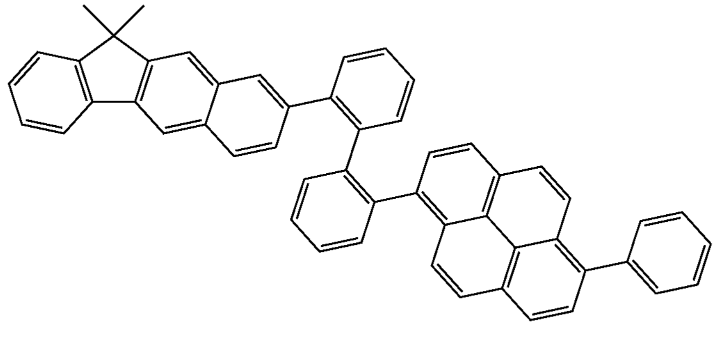

-continued
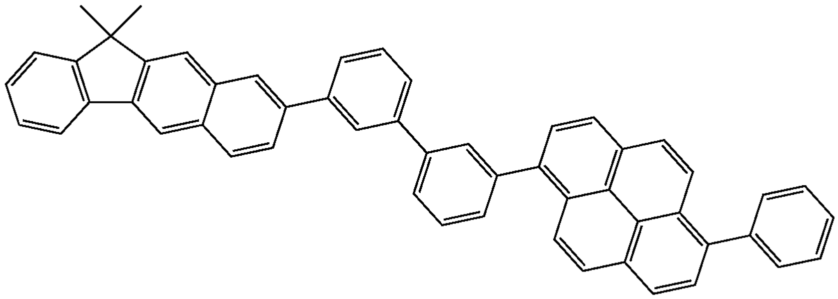
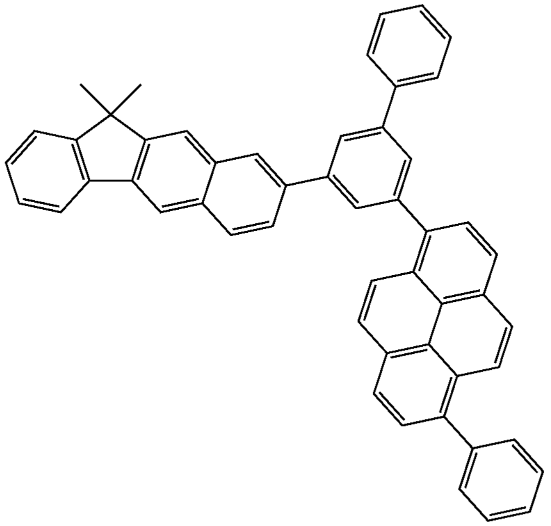
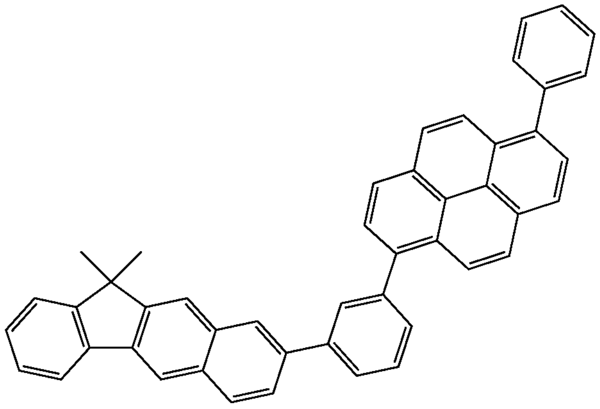
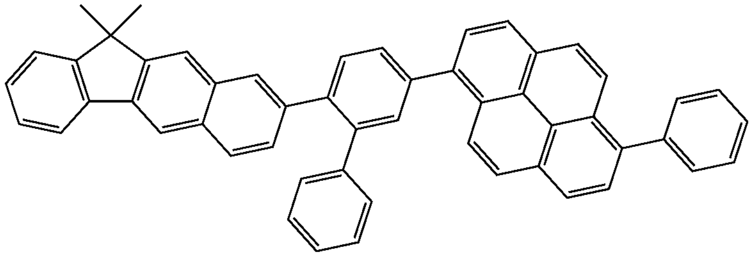
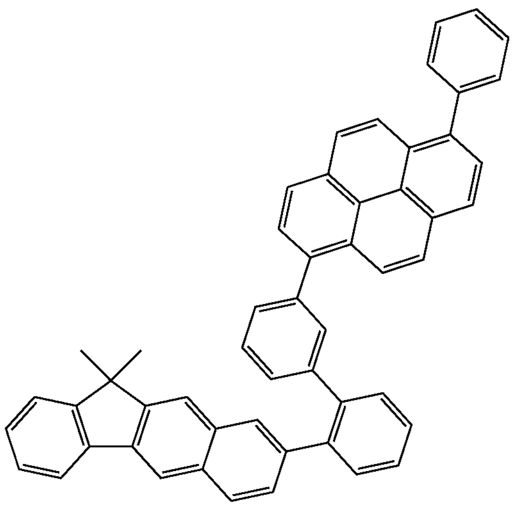

-continued
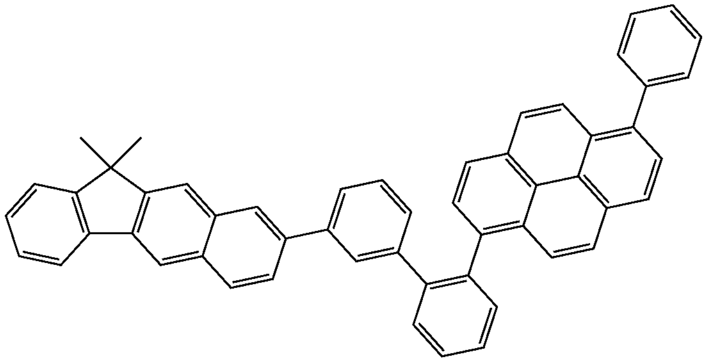
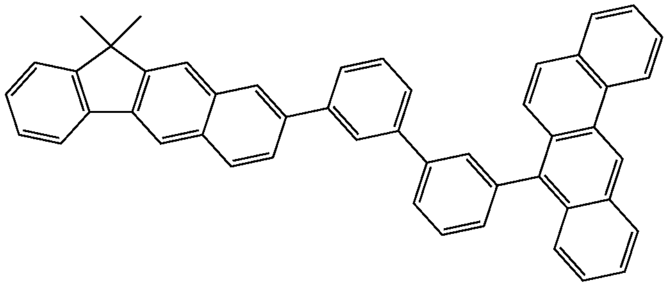
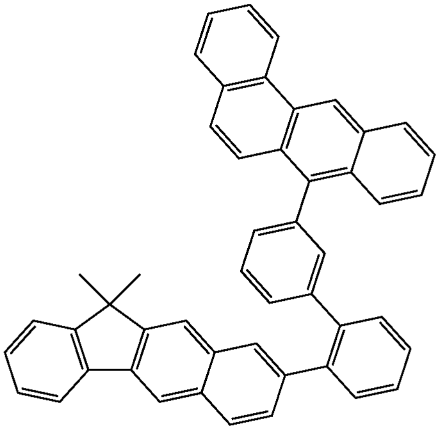
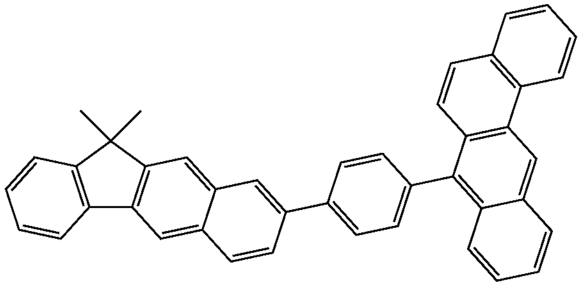
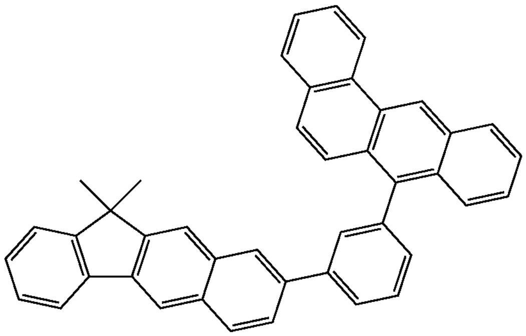
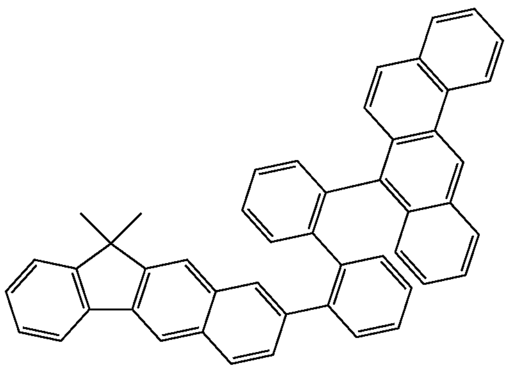
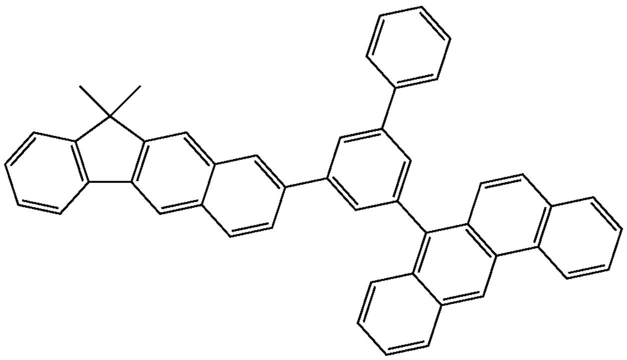

-continued
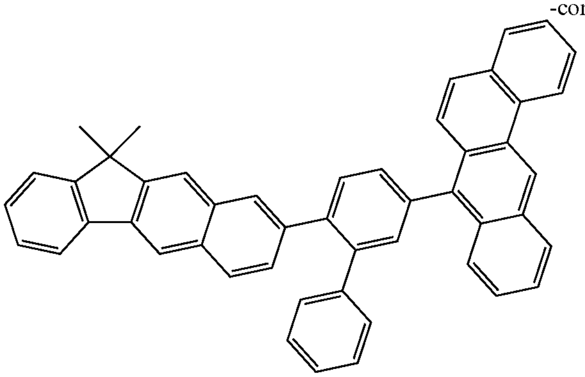
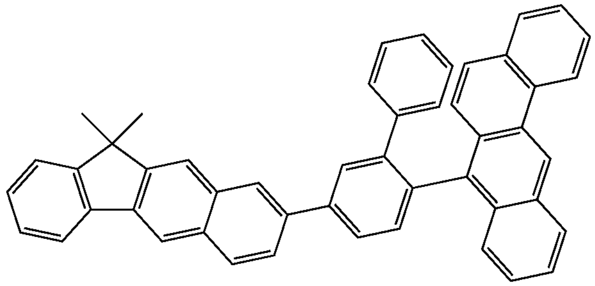
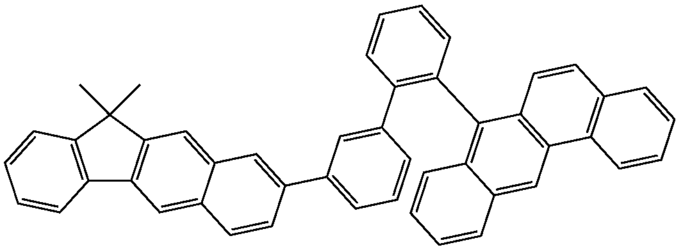
[Formula 196]
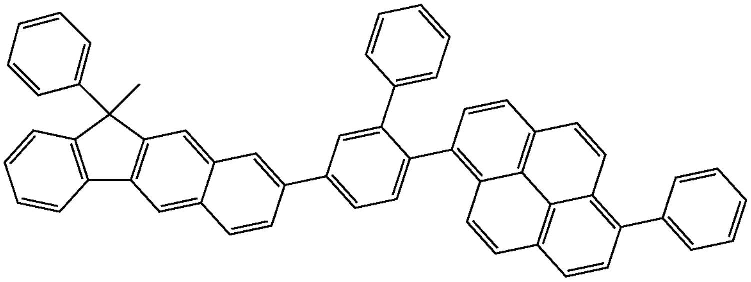
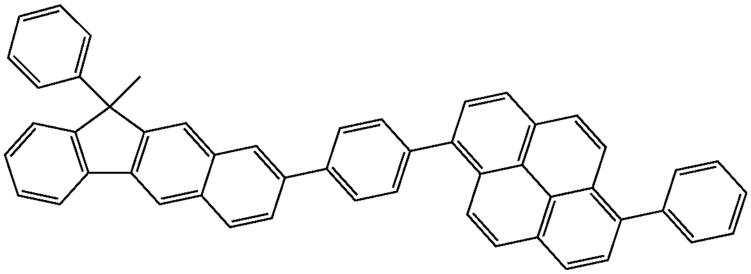
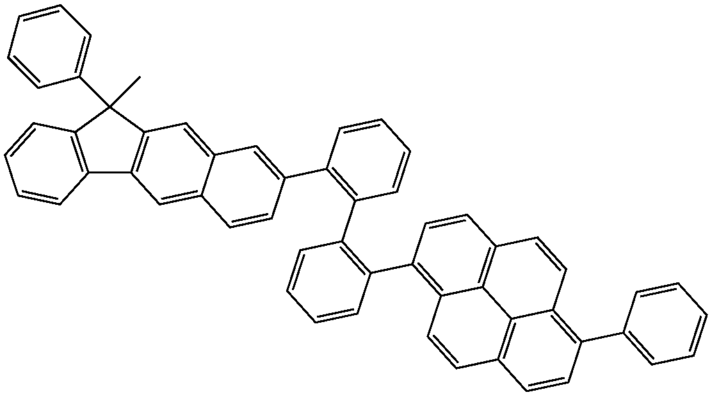

-continued
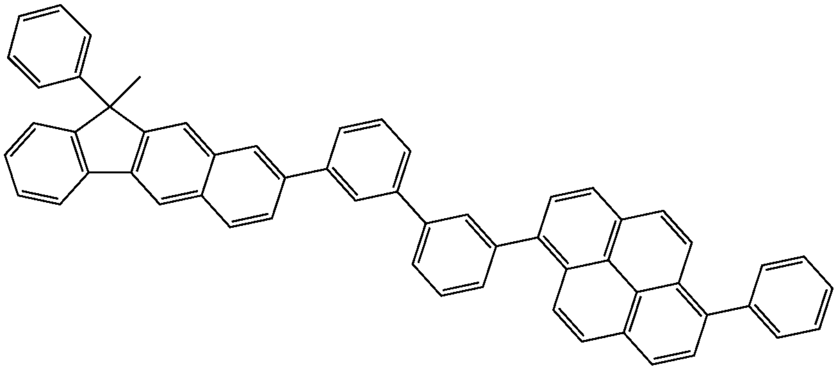
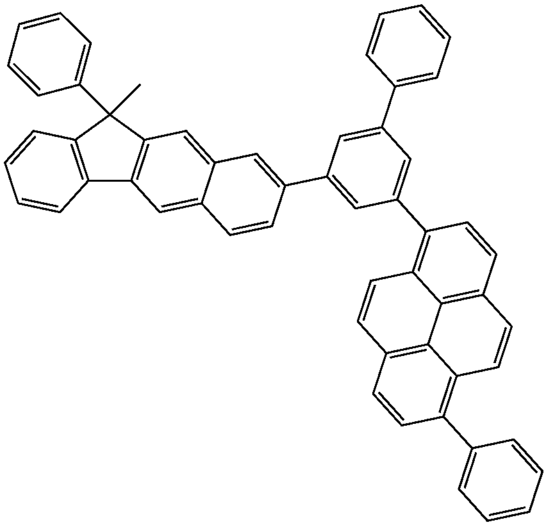
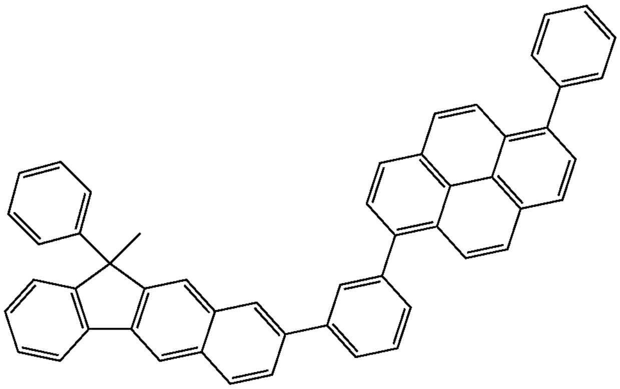
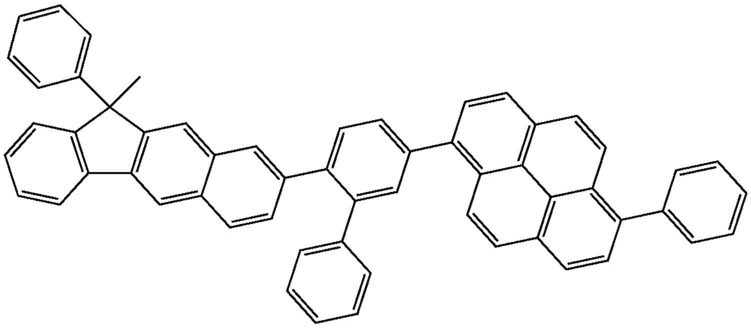
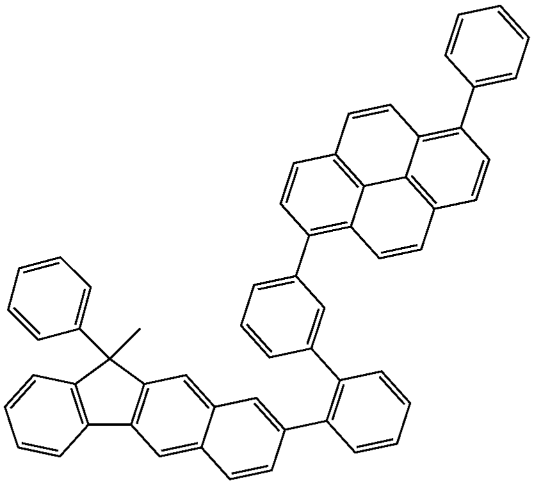

-continued
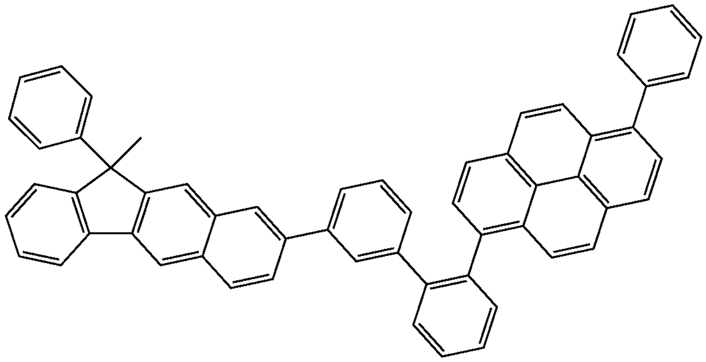
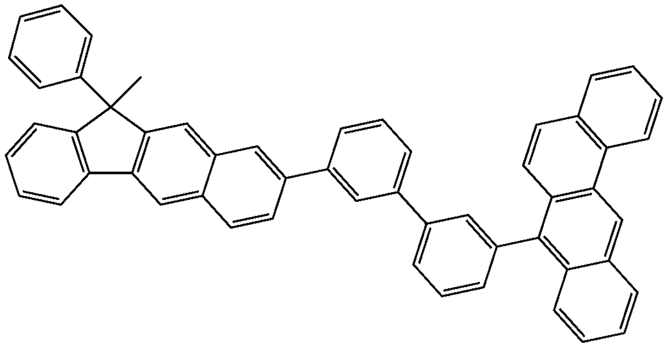 [SMILES: CC1(c2ccccc2)c2ccccc2-c2cc3ccc(-c4cccc(-c5cccc(-c6c7ccccc7cc7c6ccc6ccccc67)c5)c4)cc3cc21]
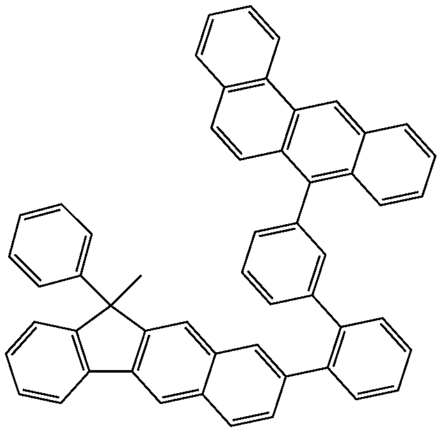
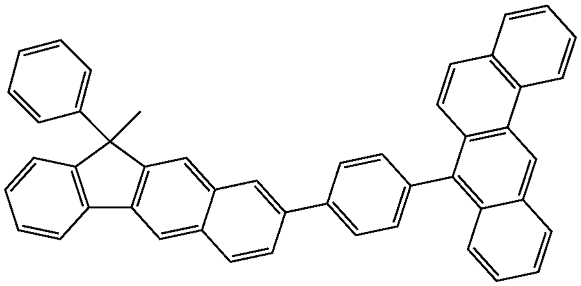
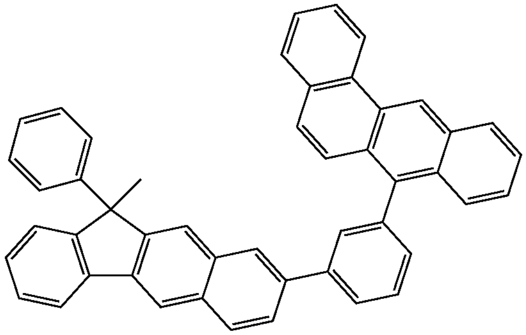
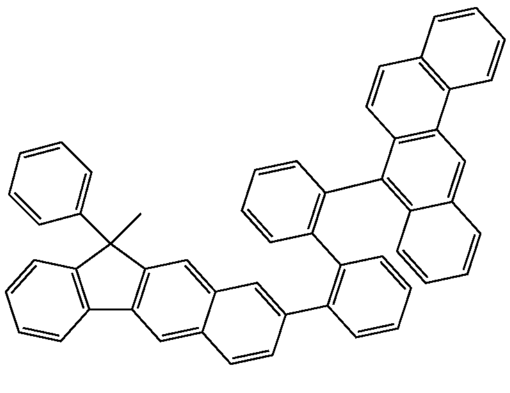

-continued
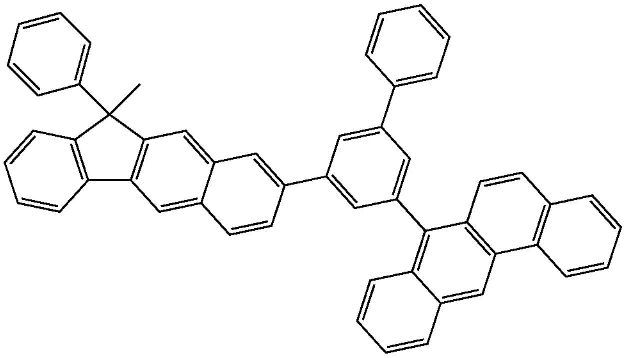
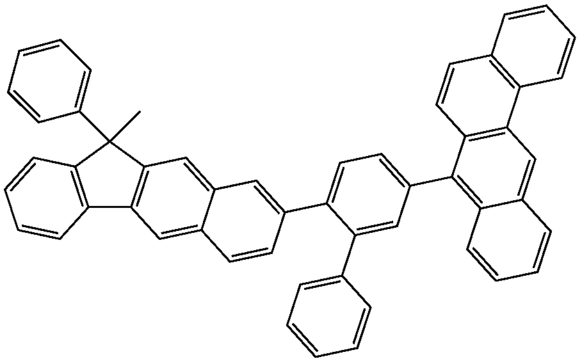
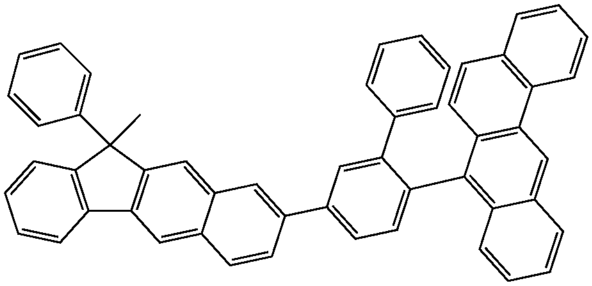
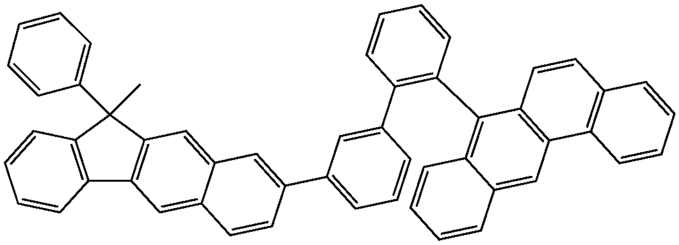
[Formula 197]
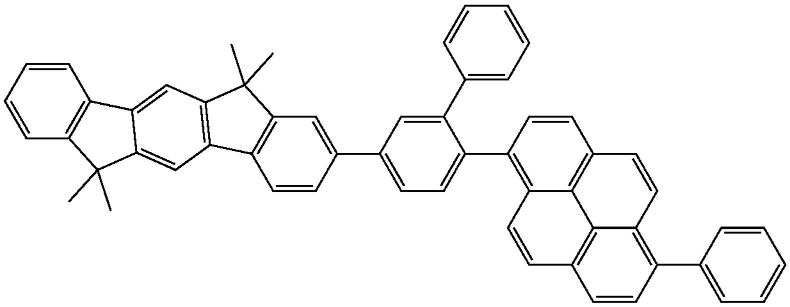
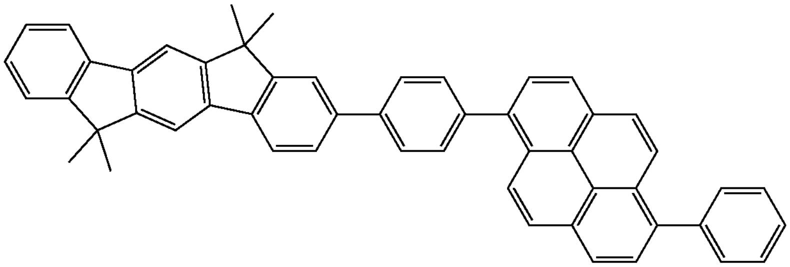

-continued
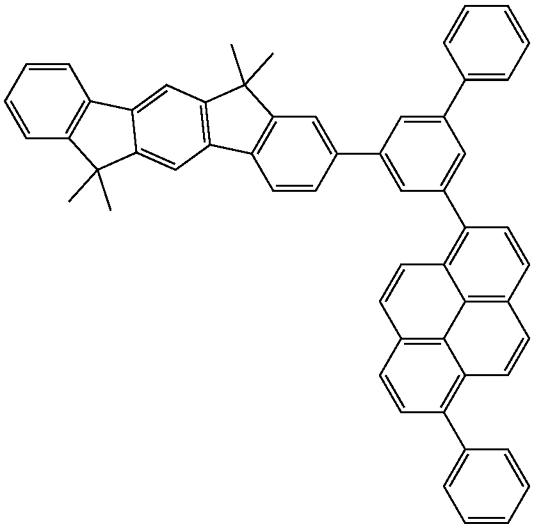
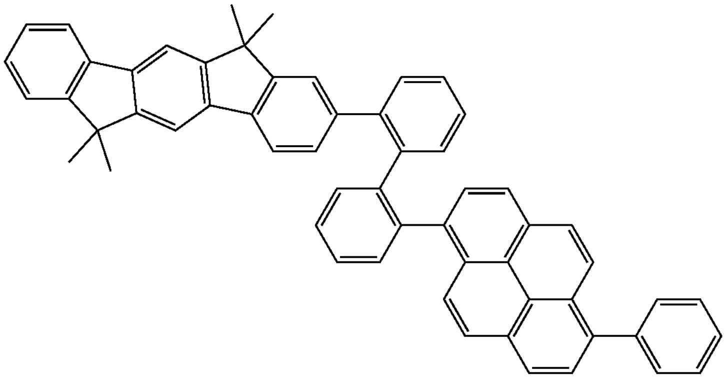
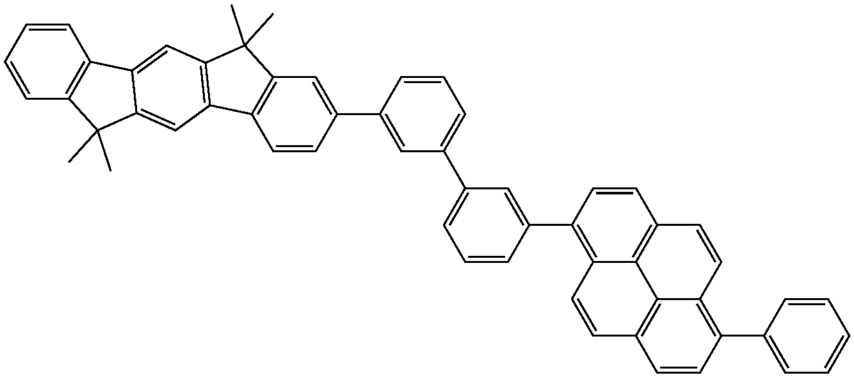

-continued
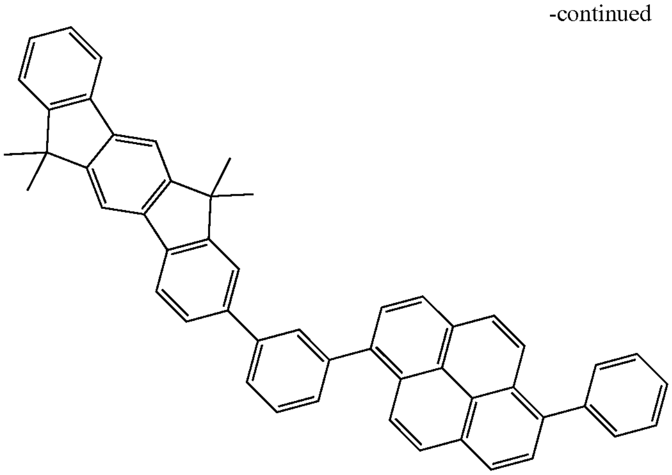
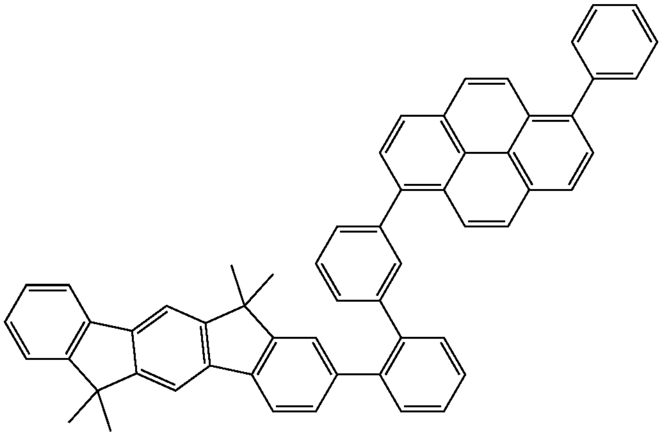
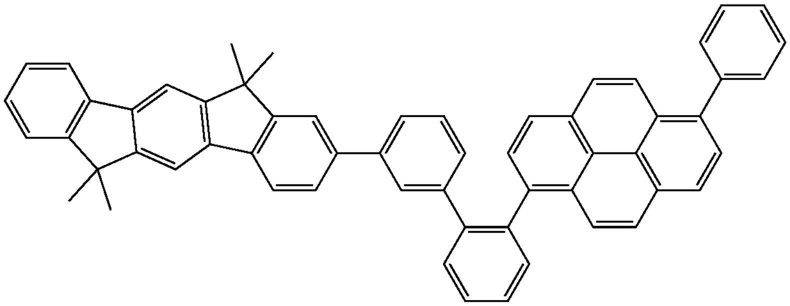
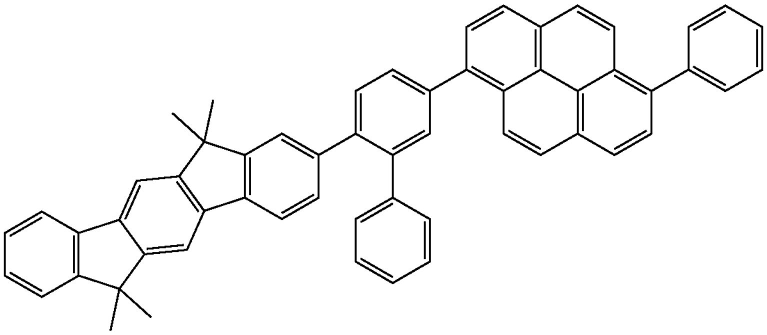

-continued
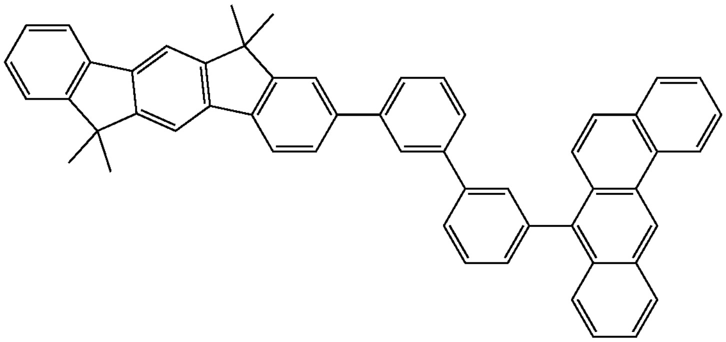
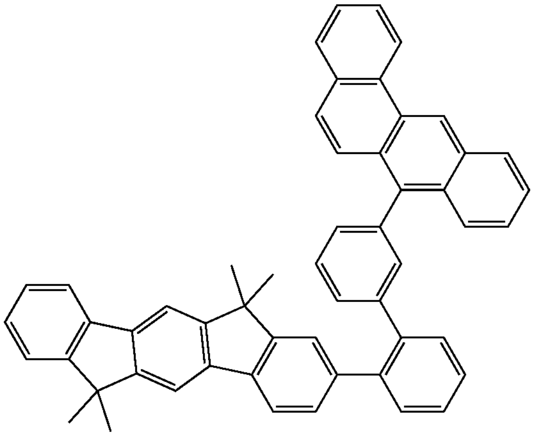
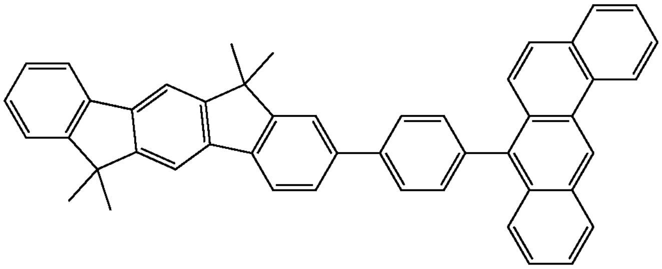
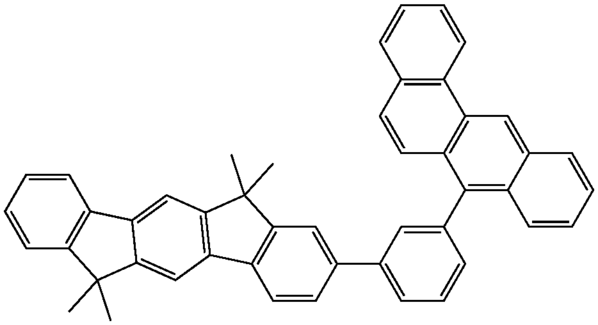
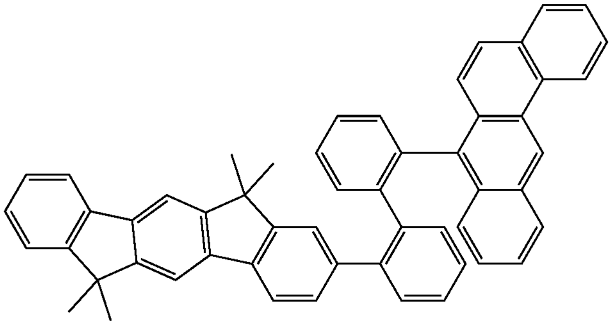

-continued
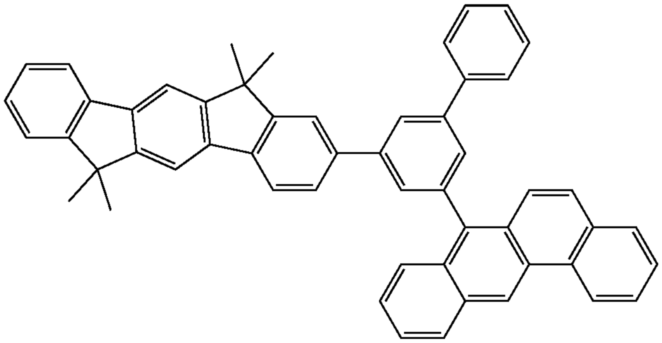
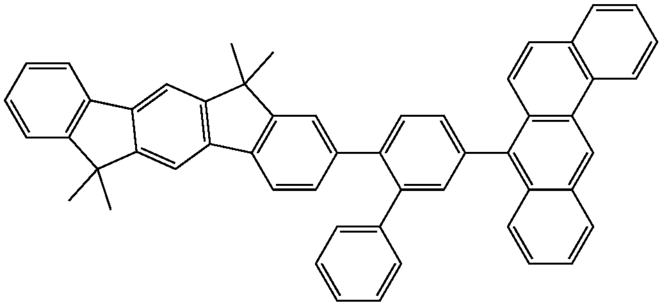
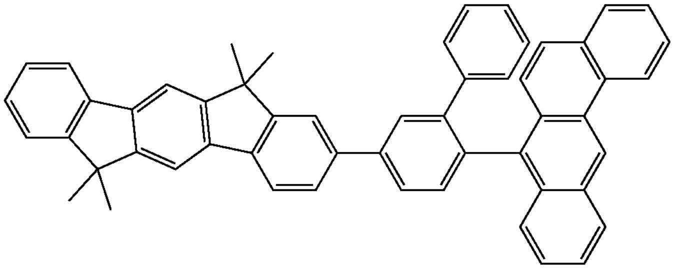
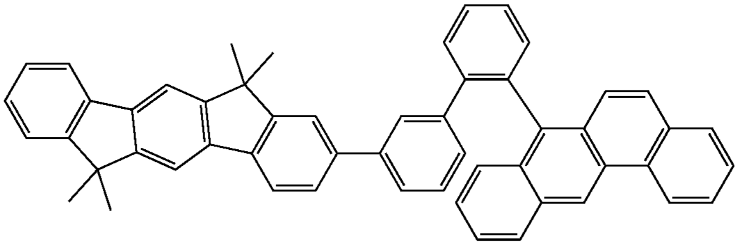
[Formula 198]
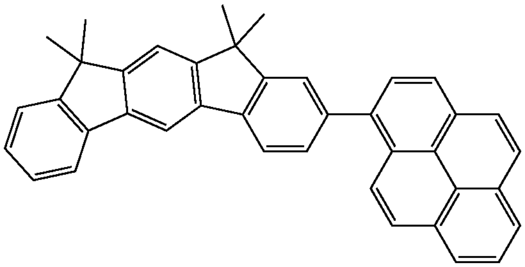
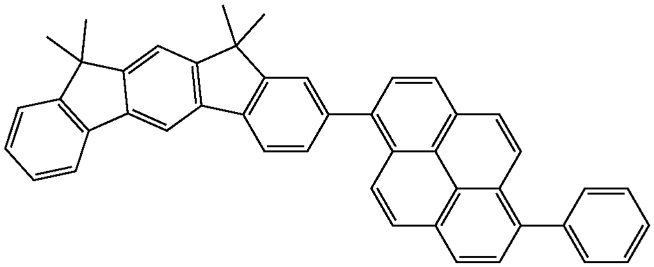

-continued
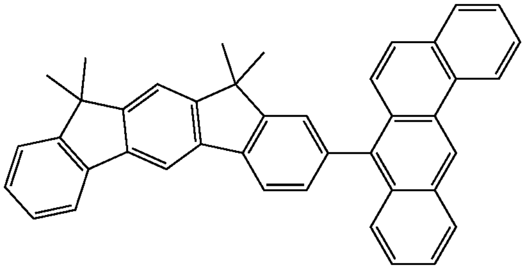
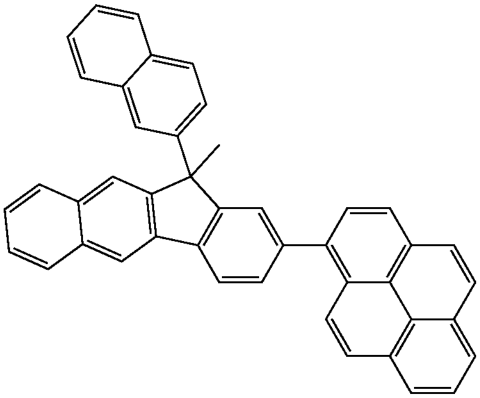
[Formula 199]
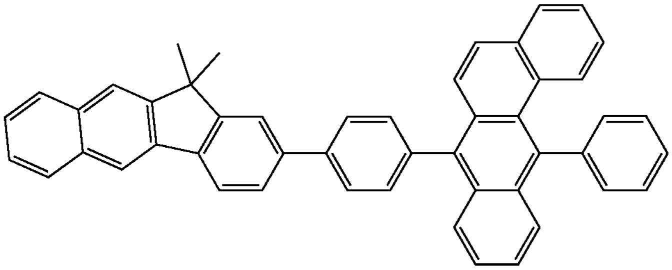
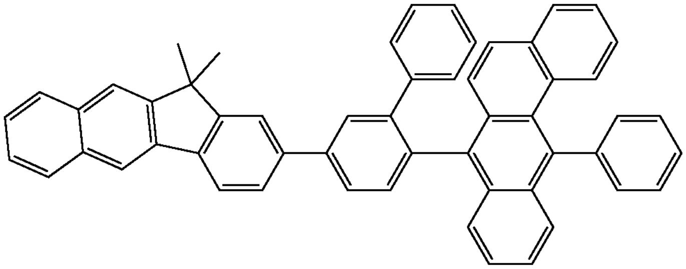
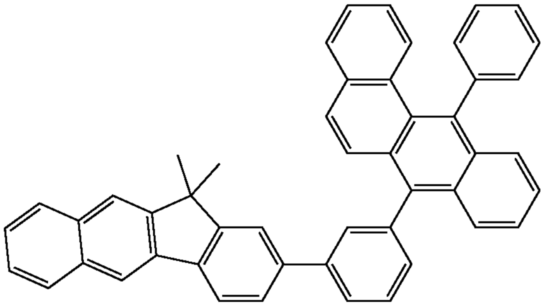
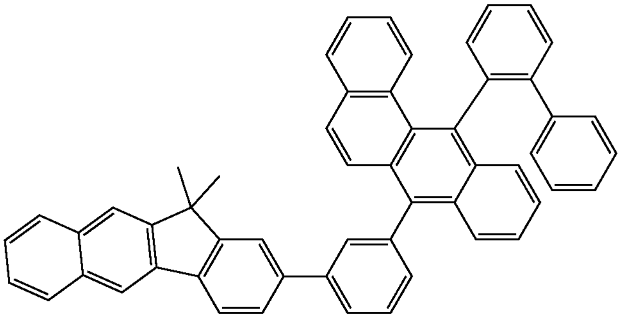
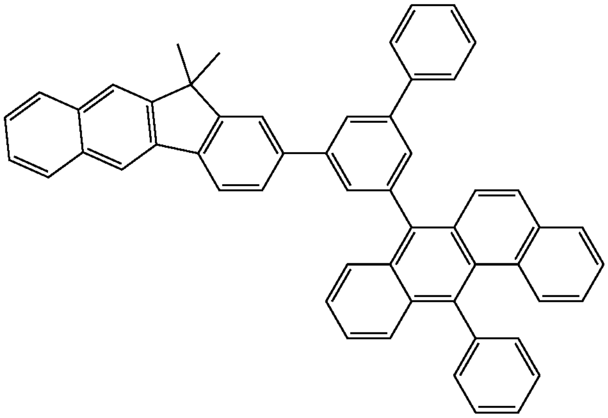

-continued
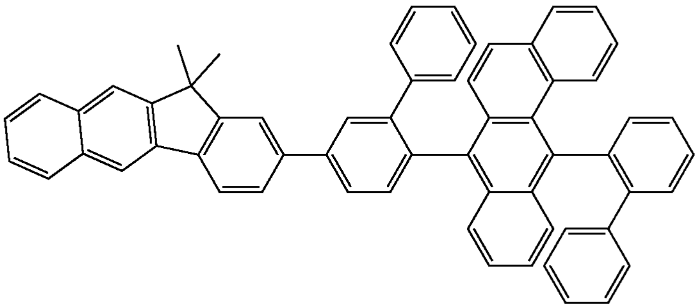
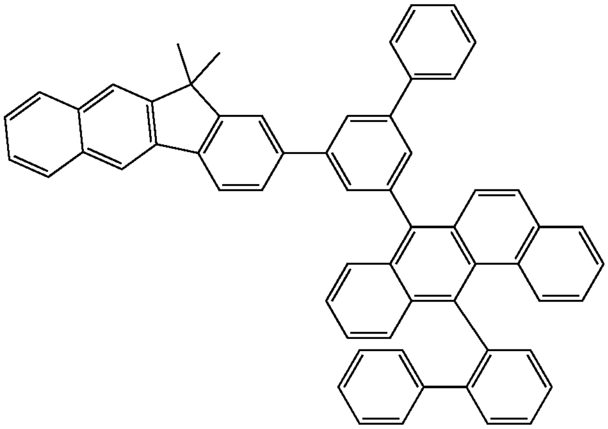
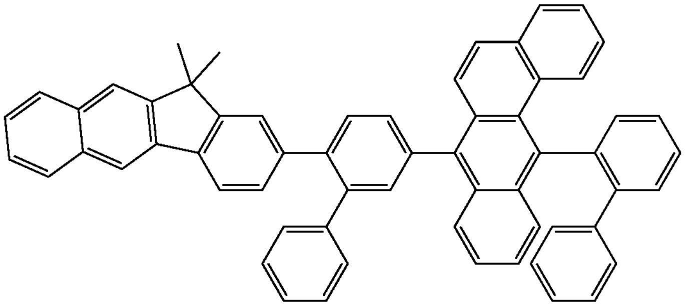
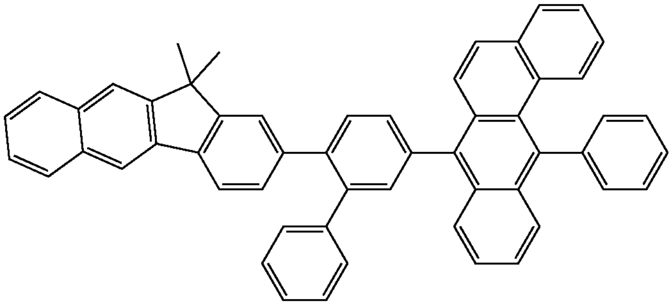
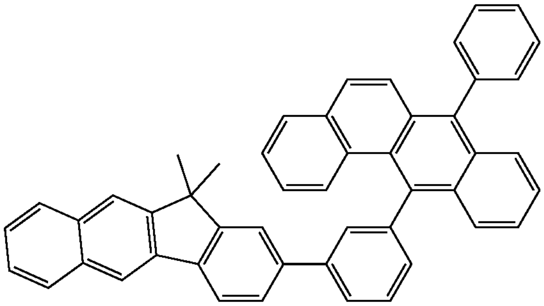

-continued
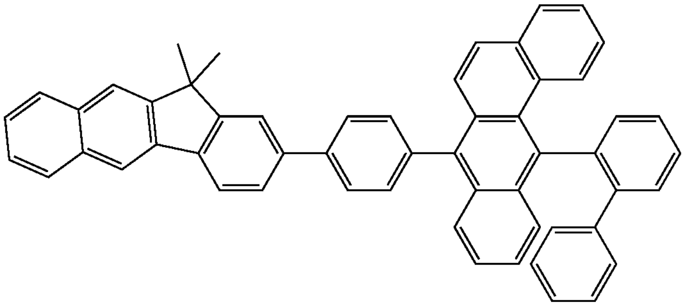
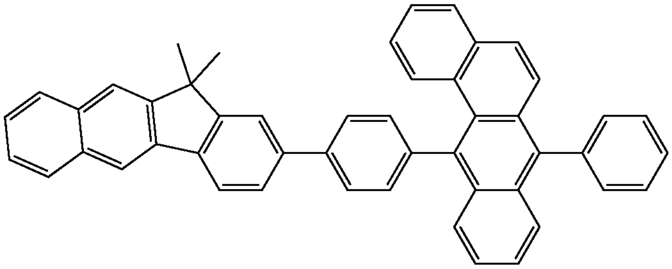
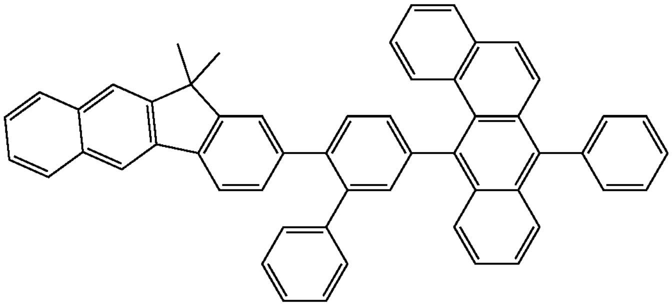
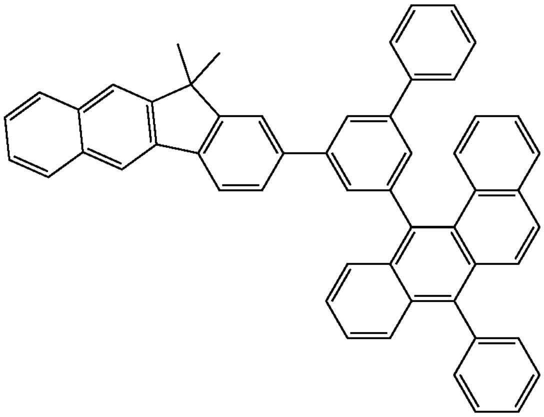
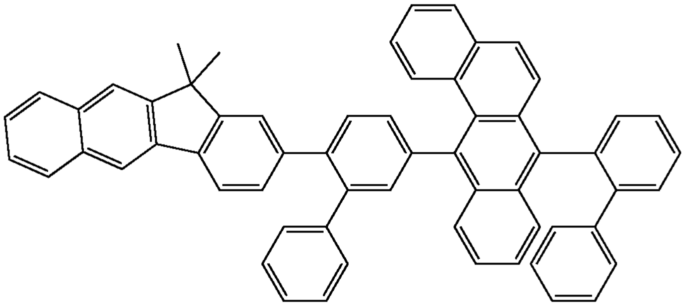

-continued
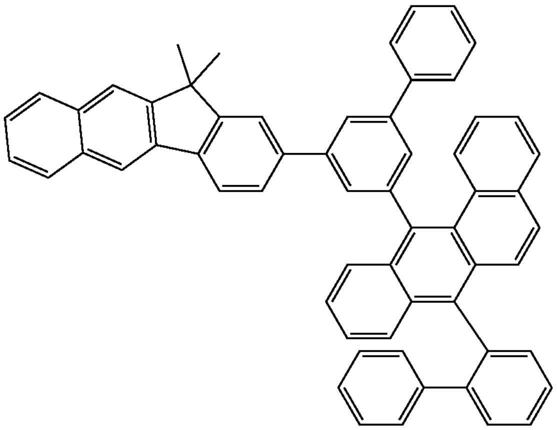
[Formula 200]
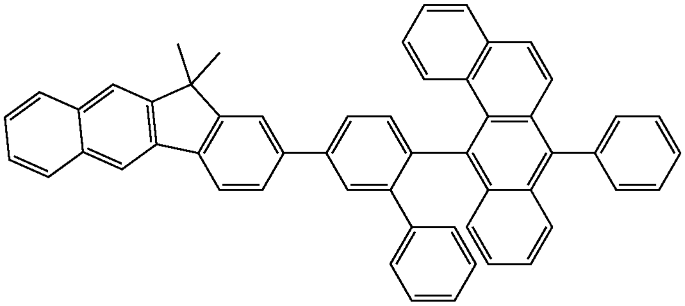
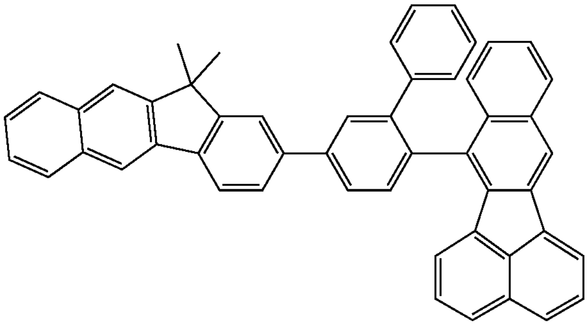
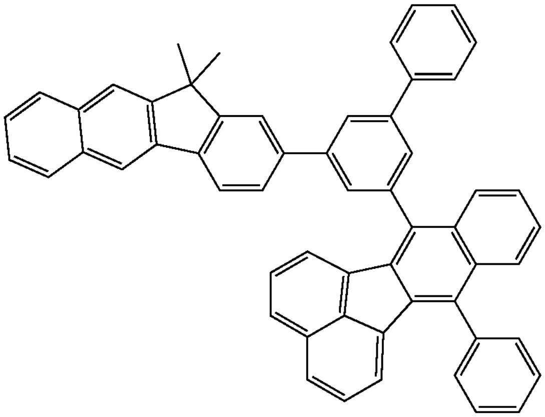
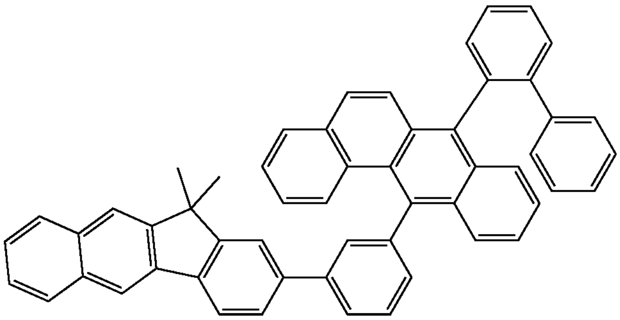

-continued
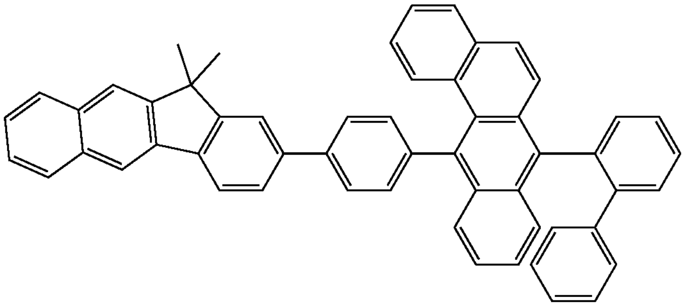
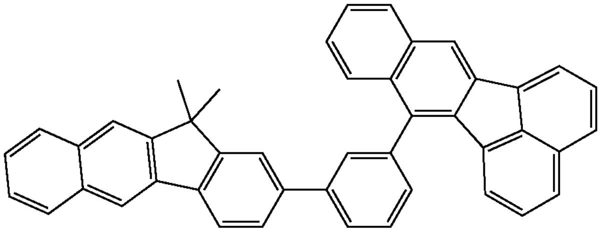
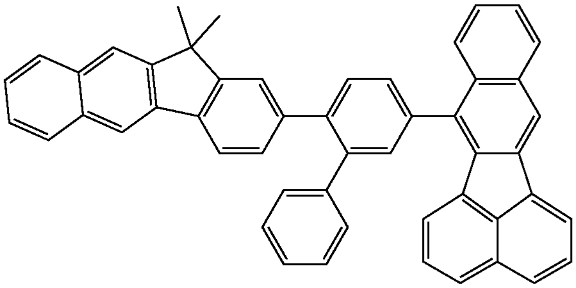
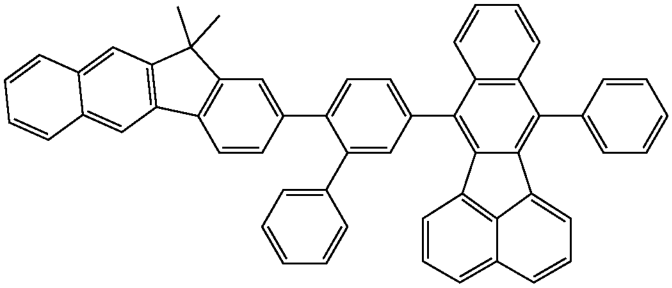
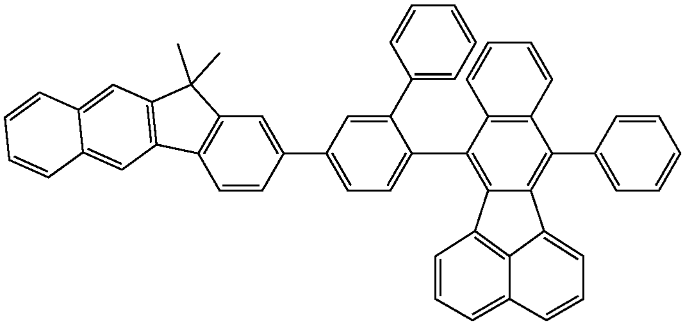

-continued
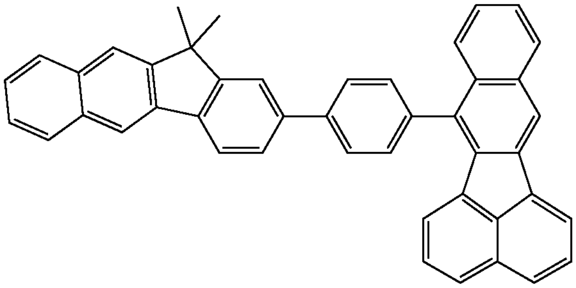
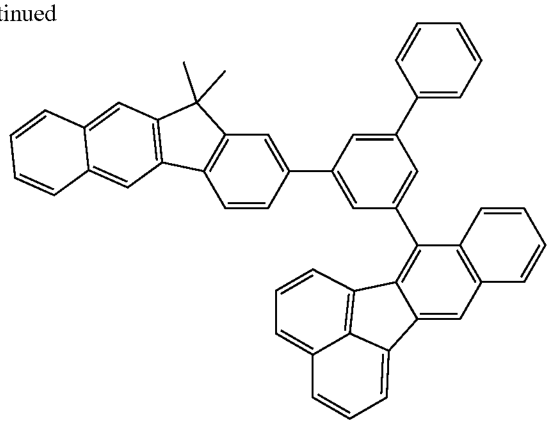
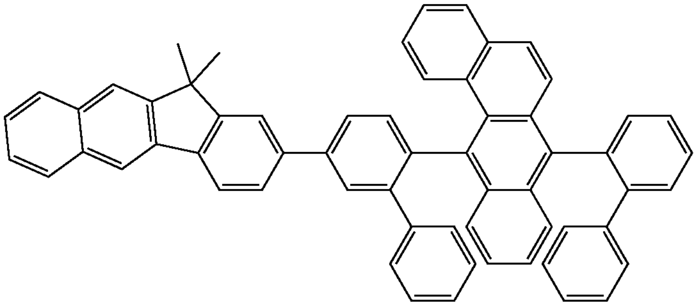
[Formula 201]
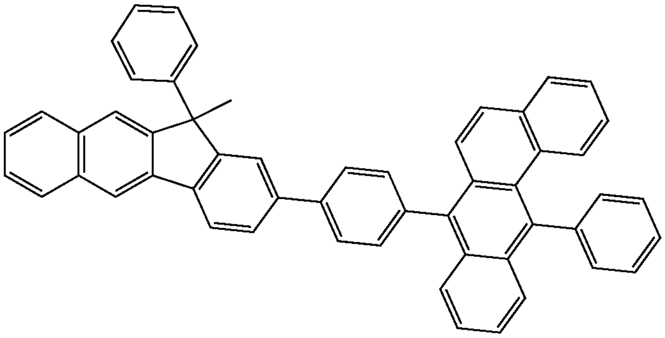
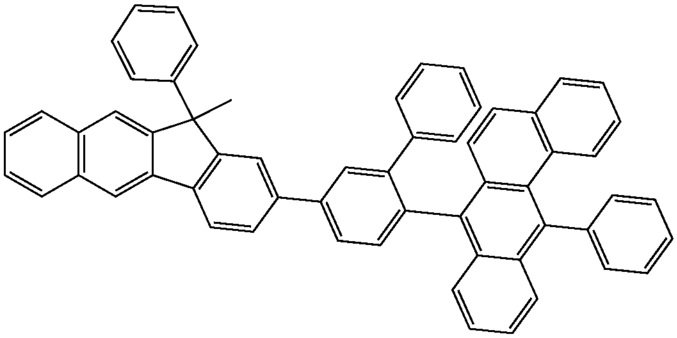
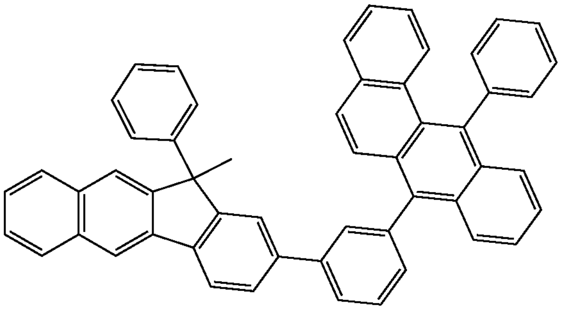

-continued
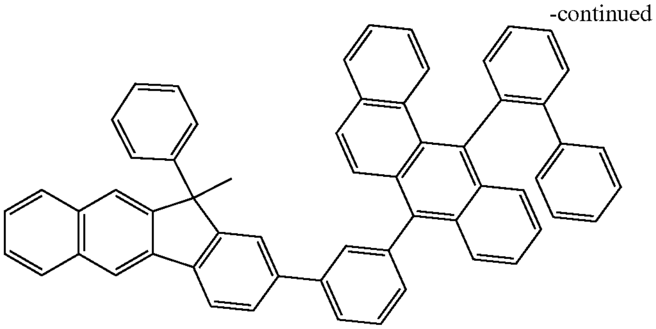
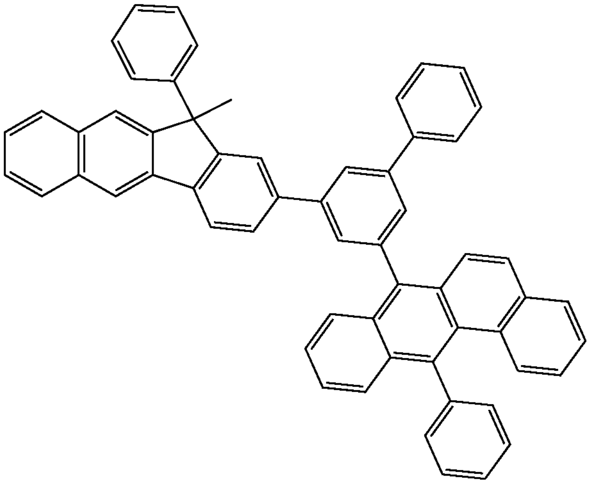
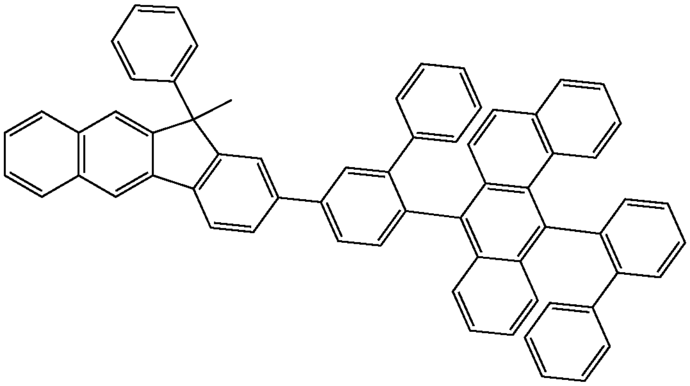
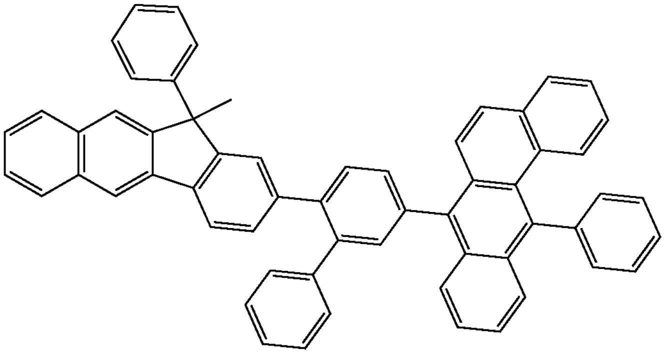

-continued
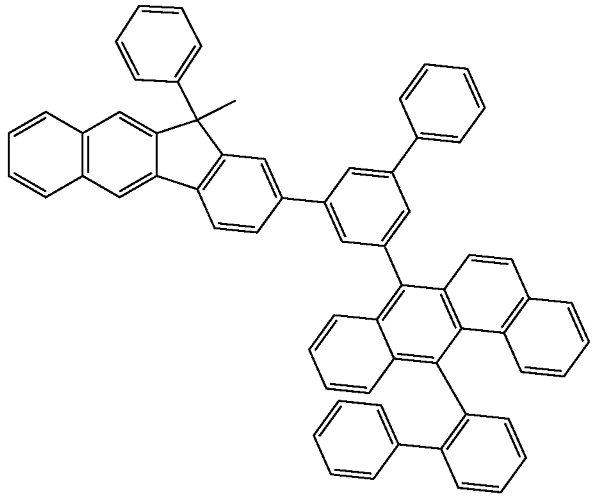
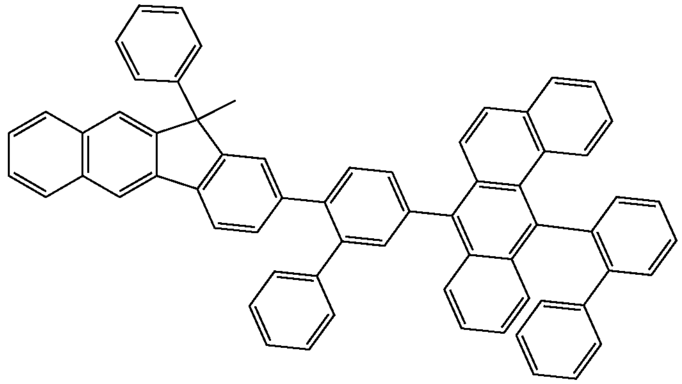
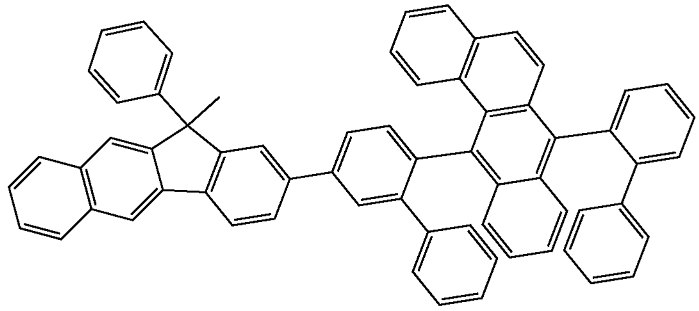
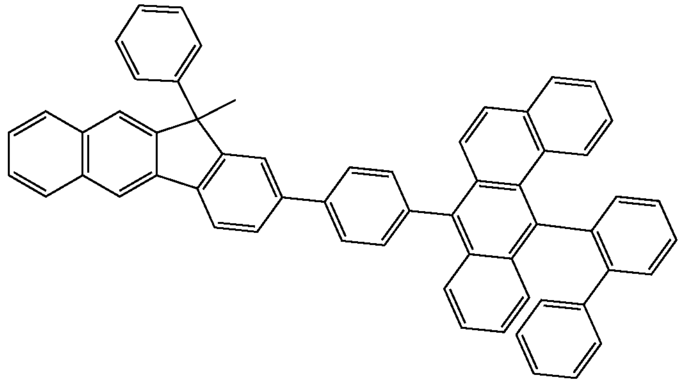

-continued
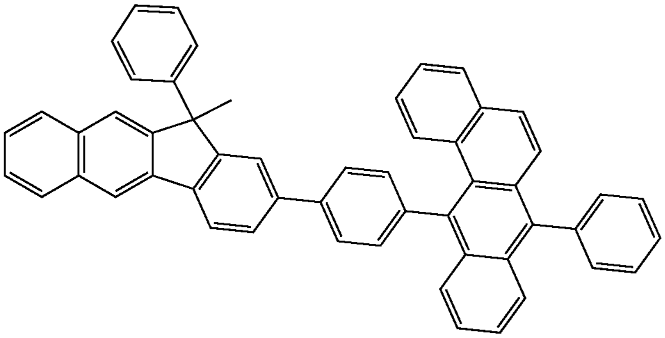
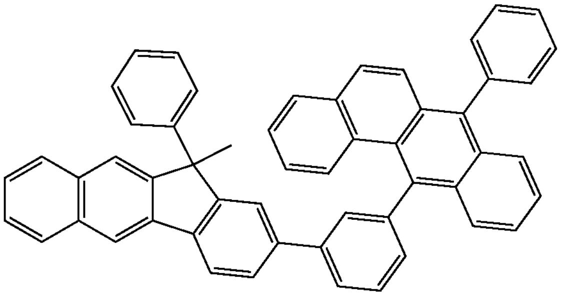
[Formula 202]
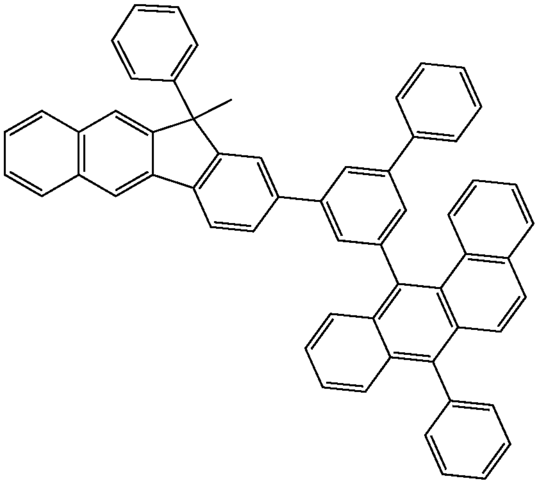
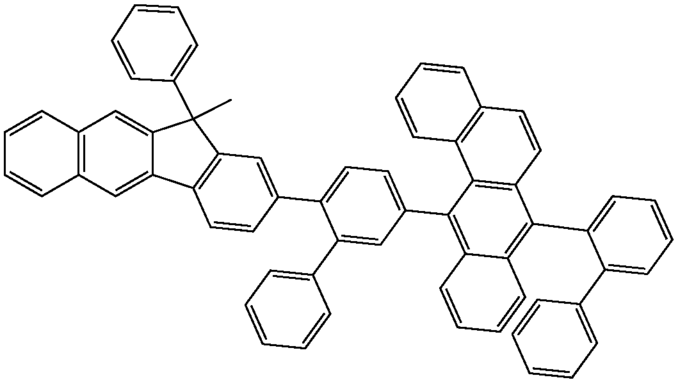

-continued
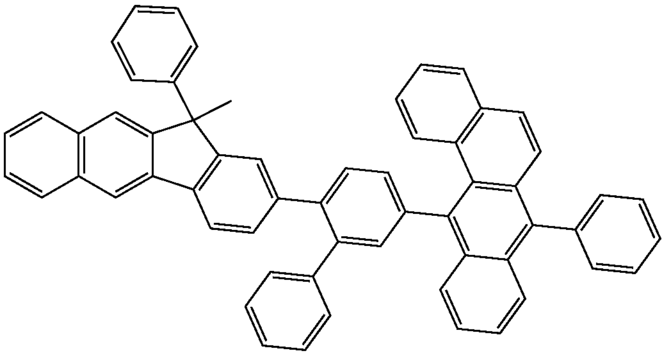
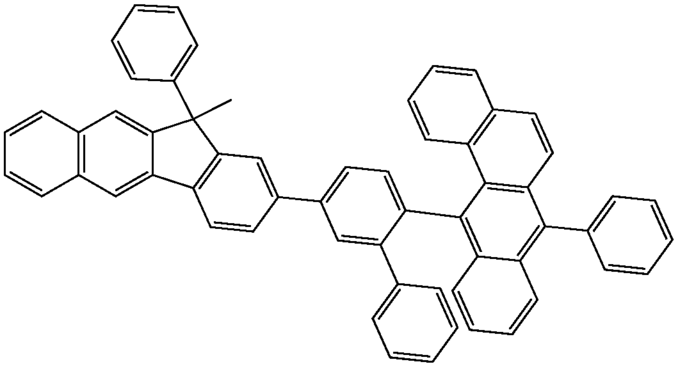
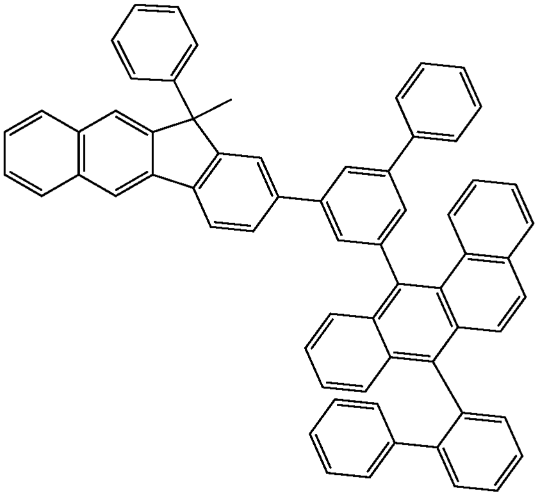
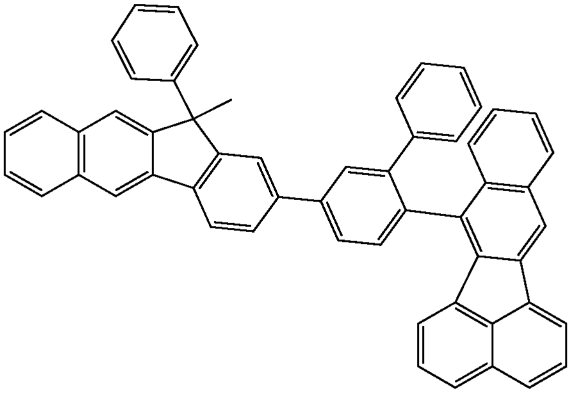
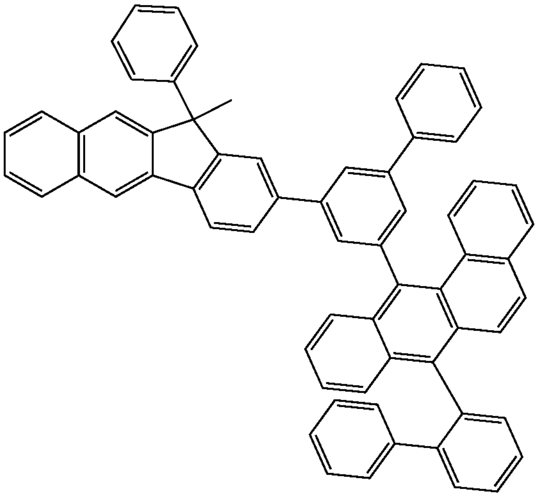
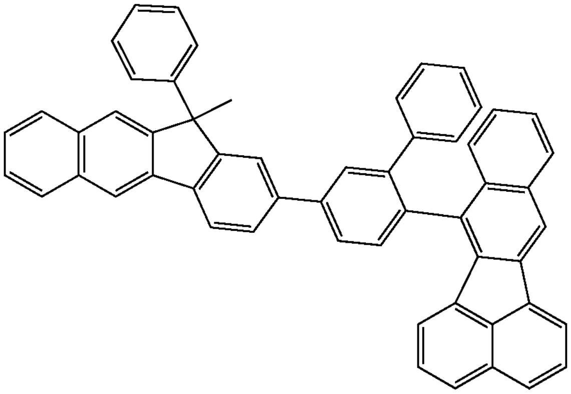

-continued
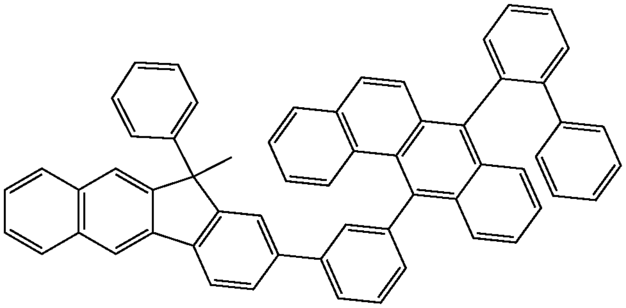
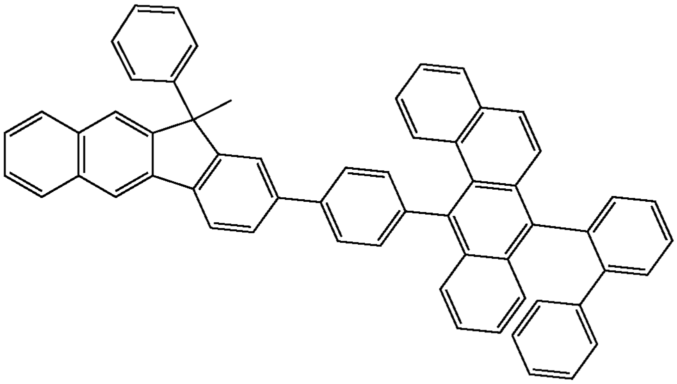
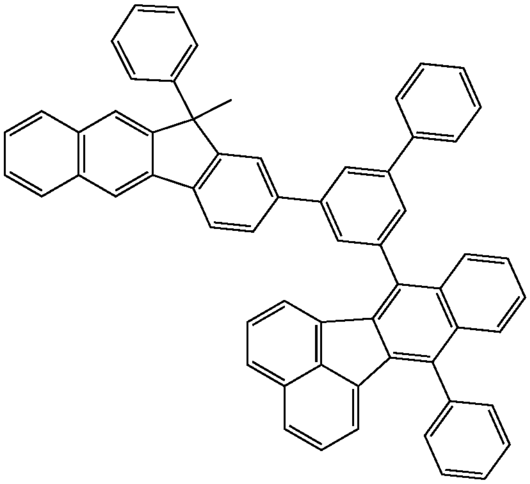
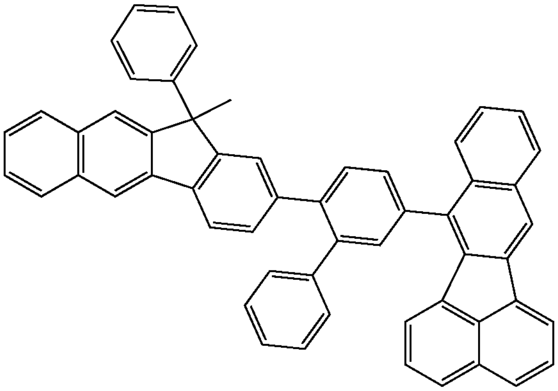
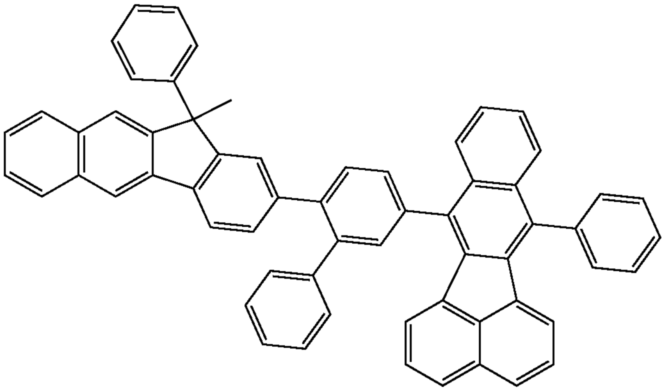

-continued
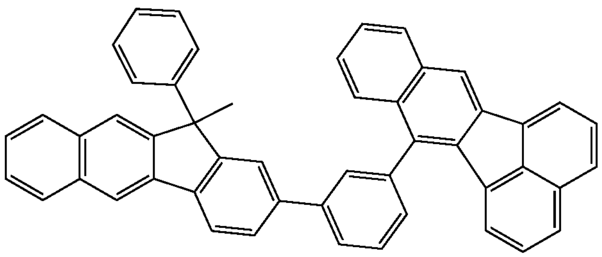
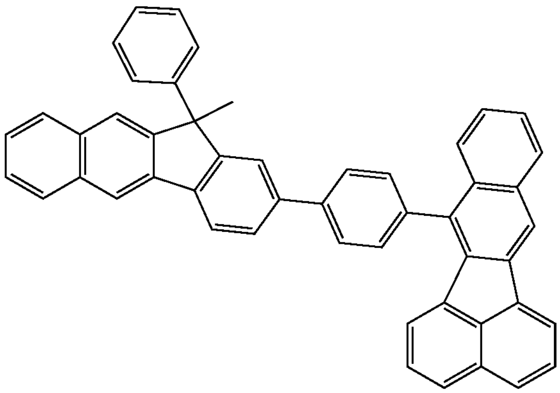
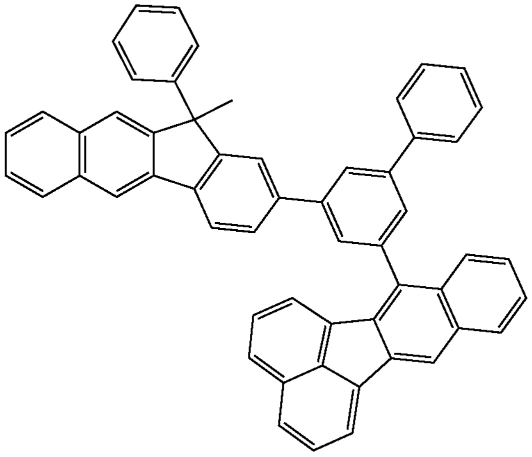
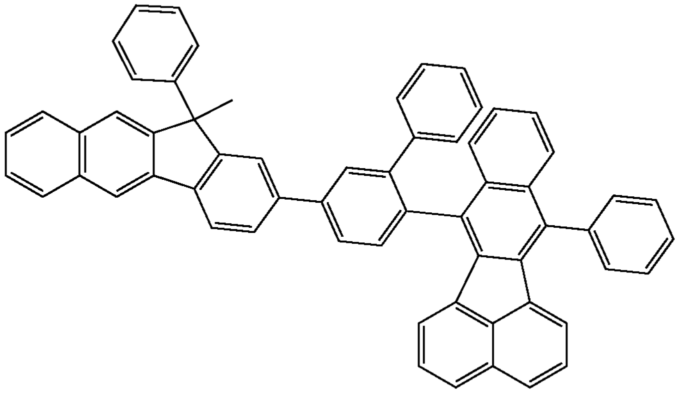
[Formula 203]
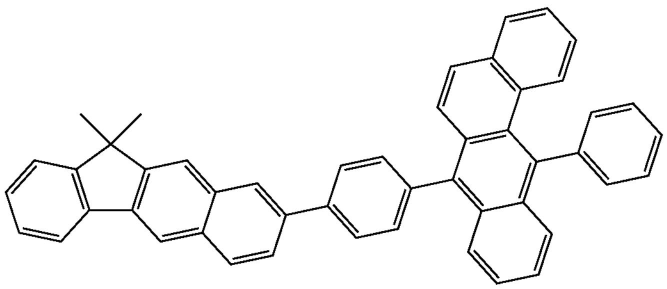

-continued
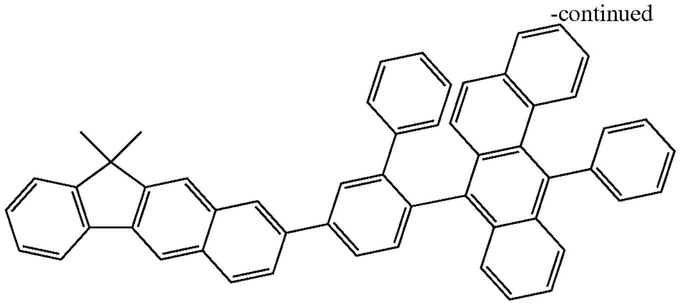
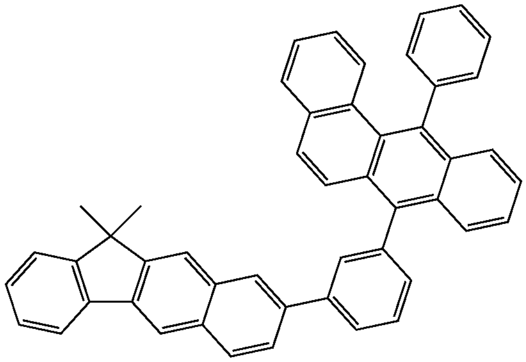
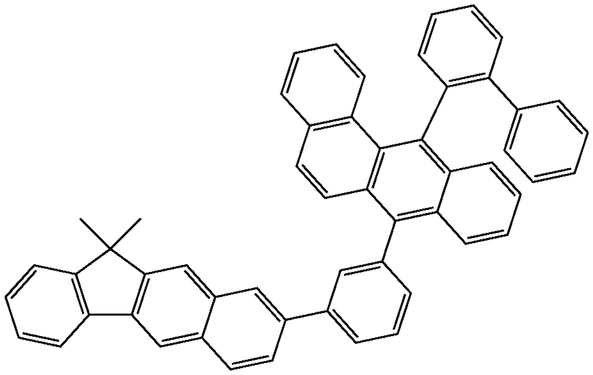
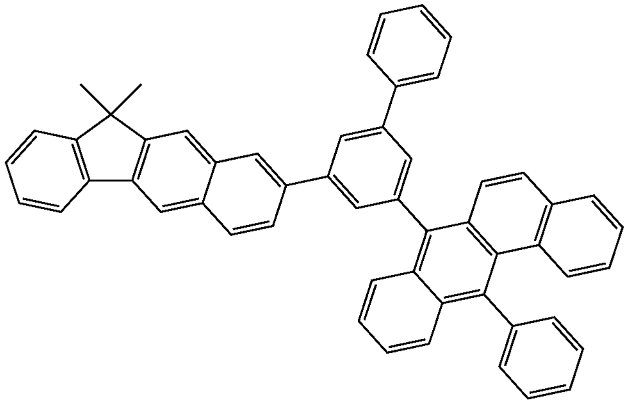
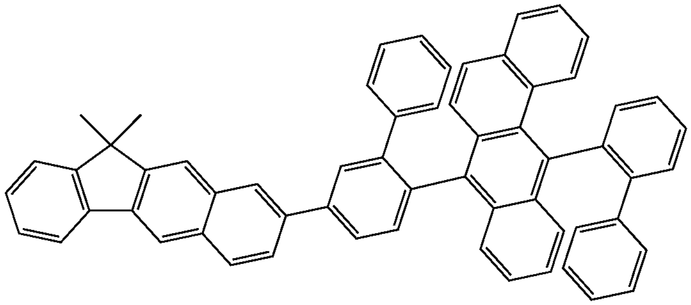
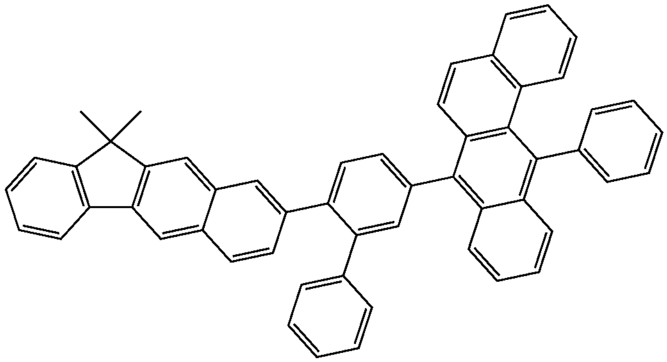

-continued
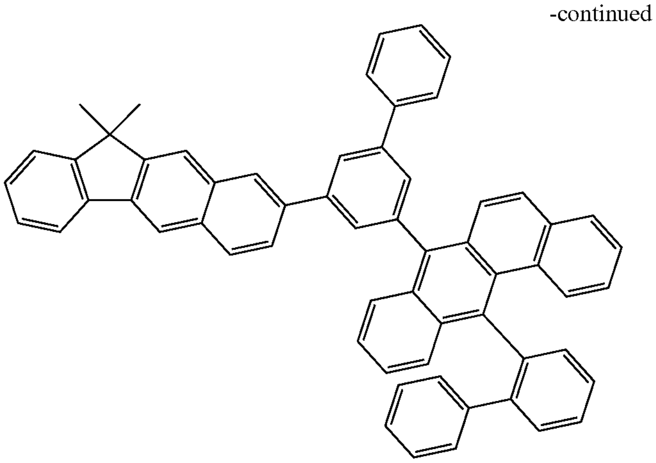
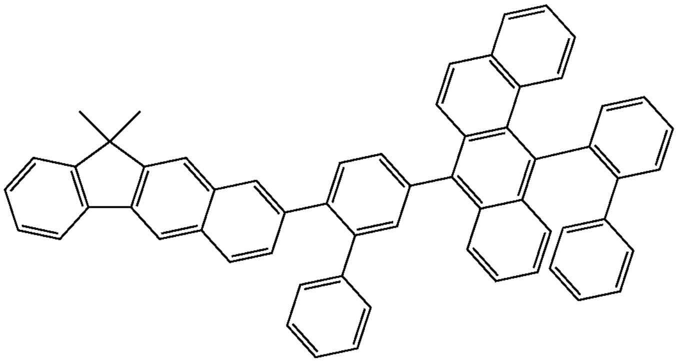
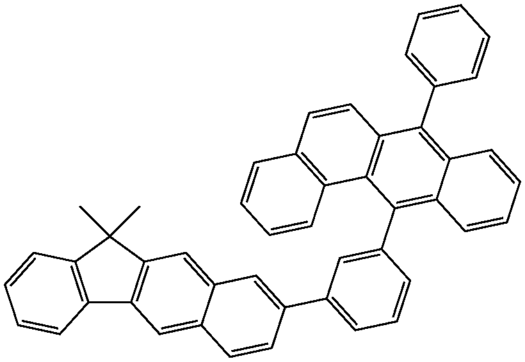
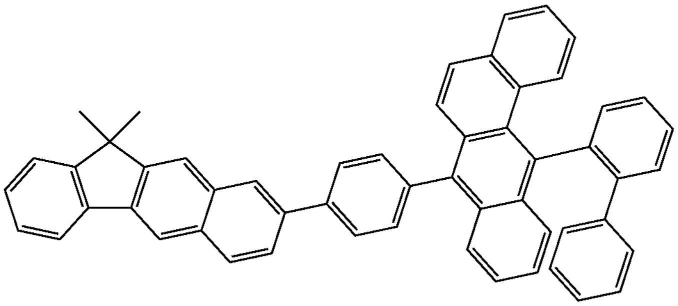
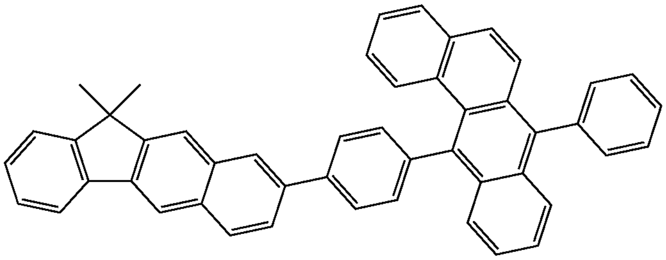

-continued
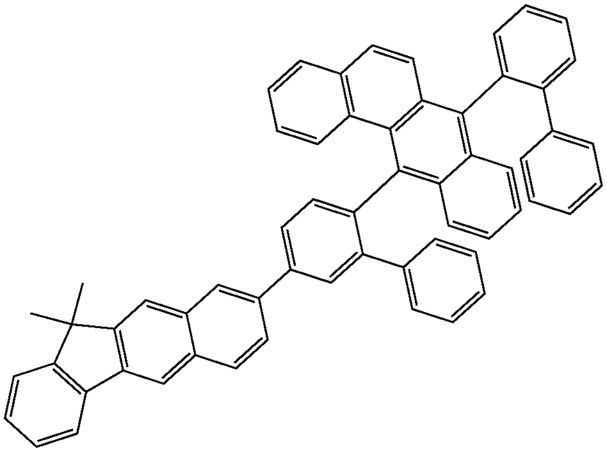
[Formula 204]
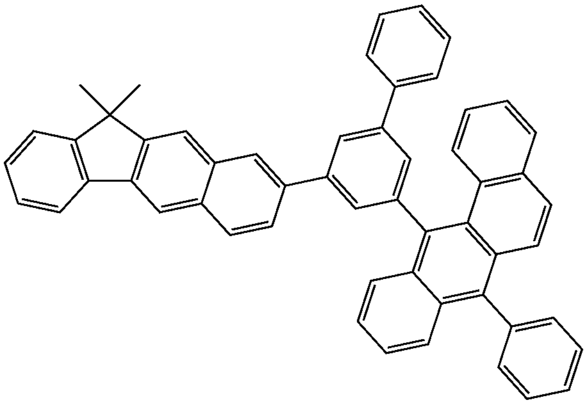
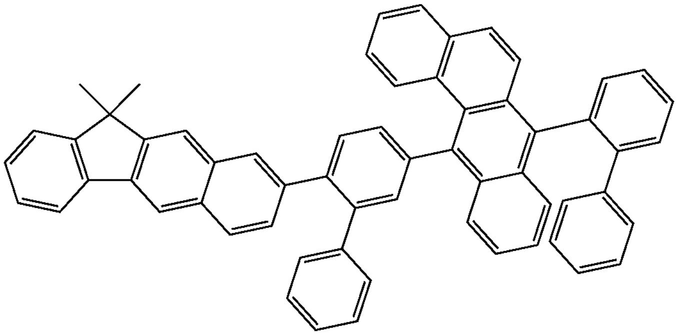
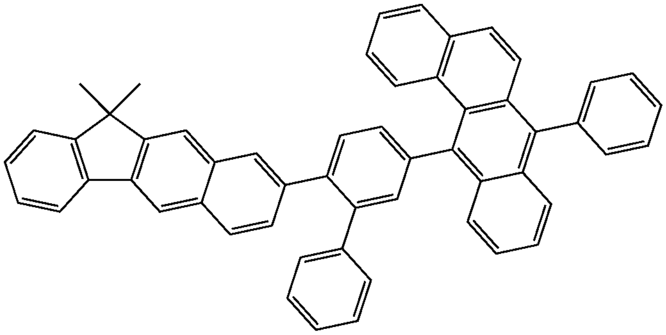

-continued
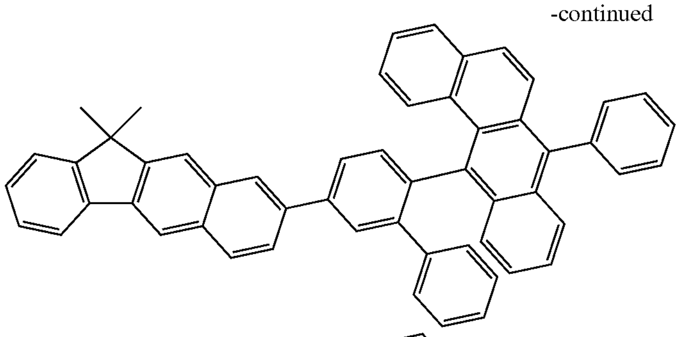
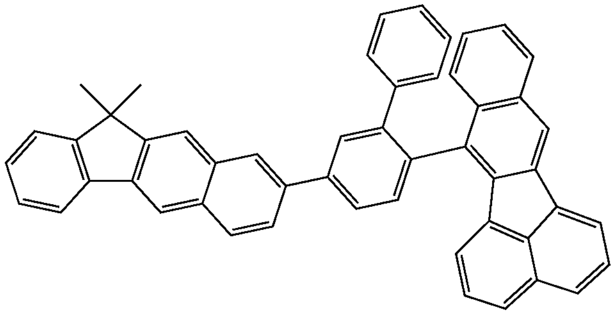
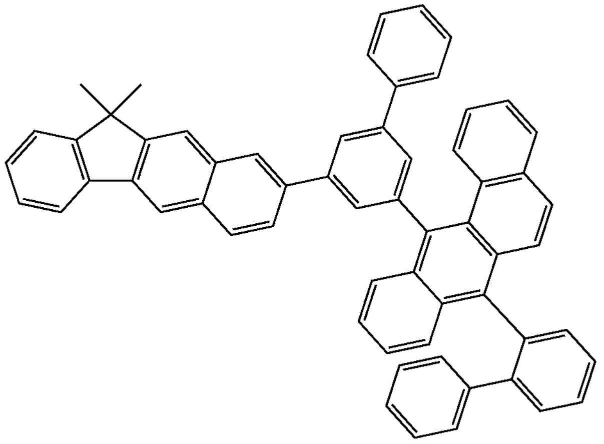
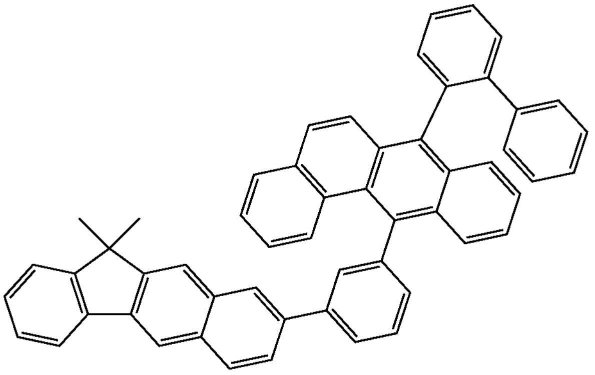
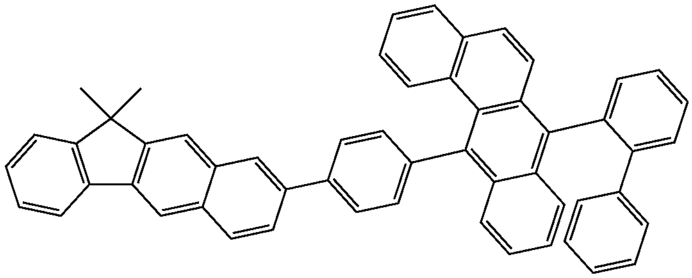
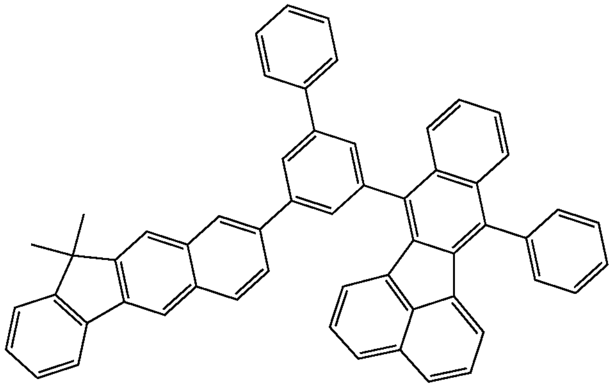

-continued
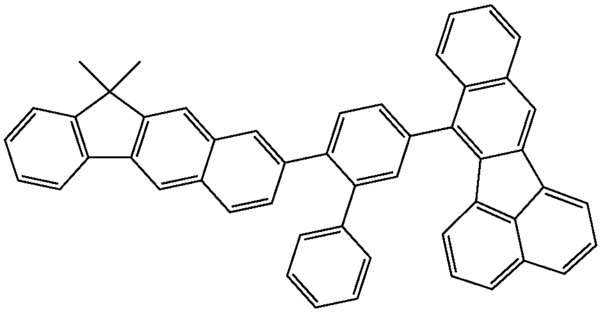
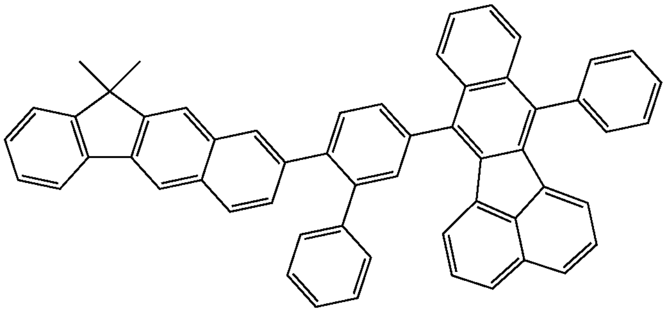
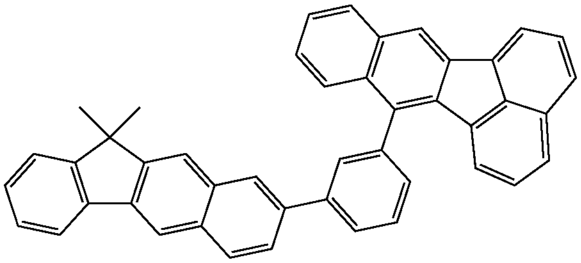
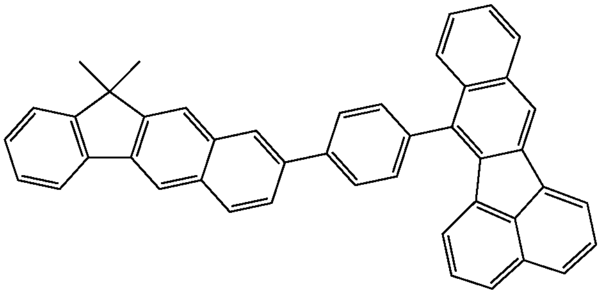
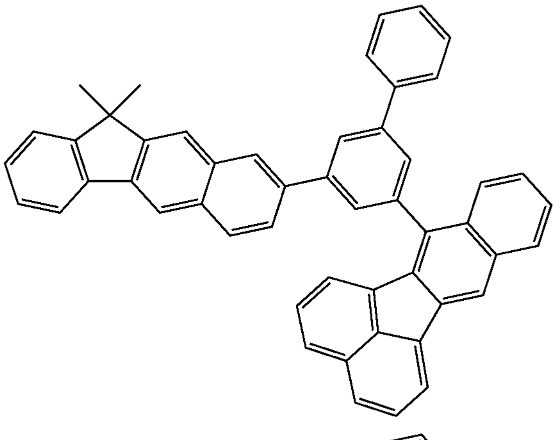
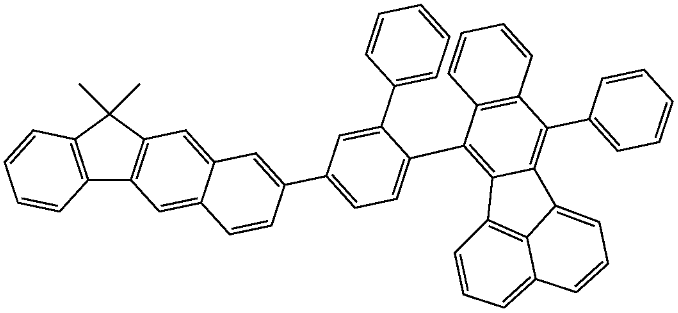

-continued
[Formula 205]
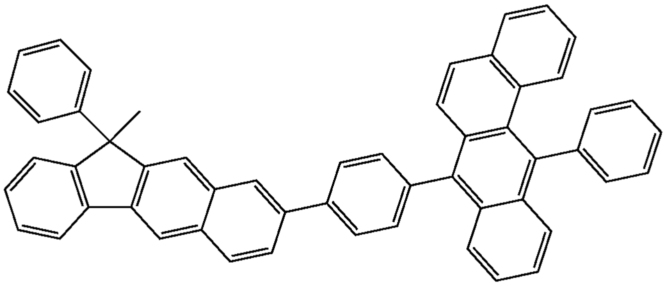
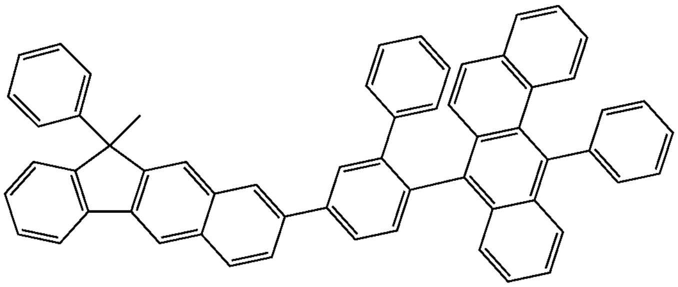
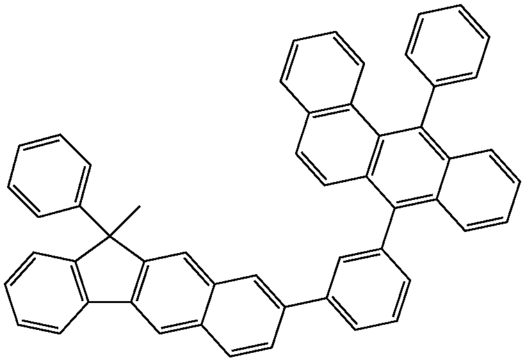
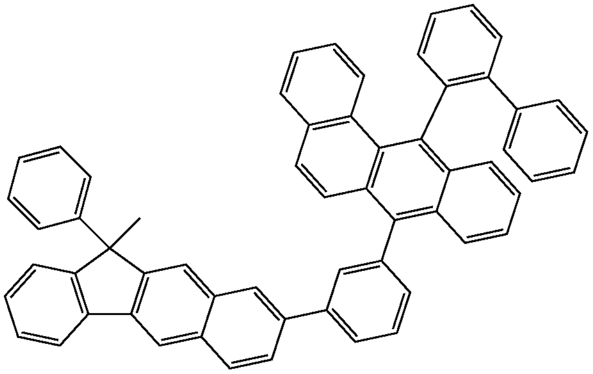
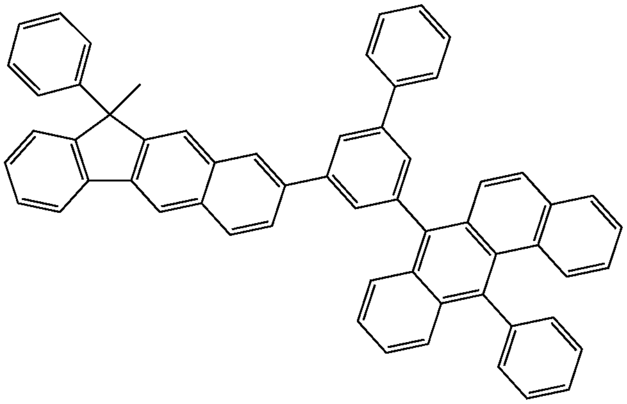
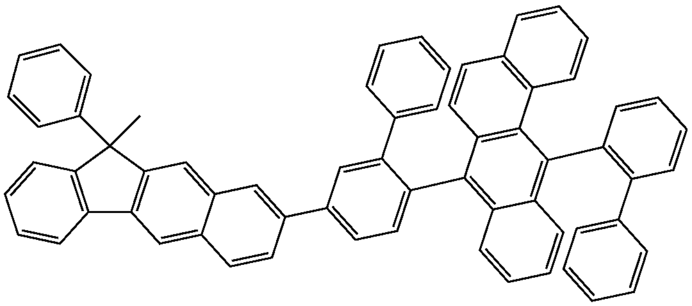

-continued
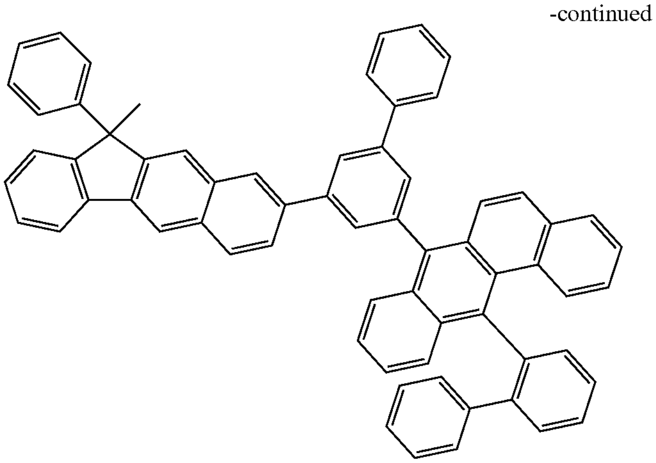
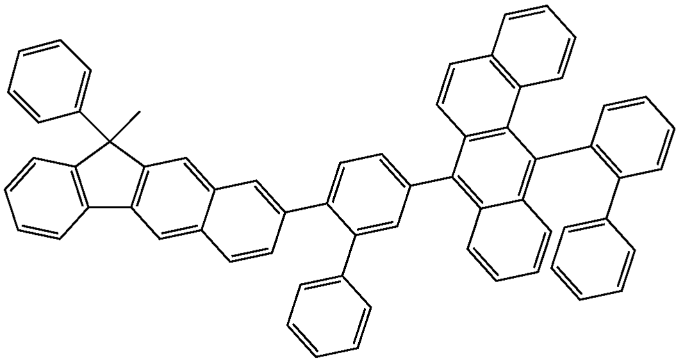
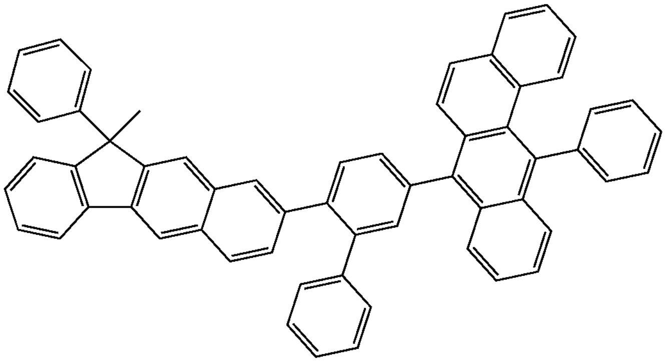
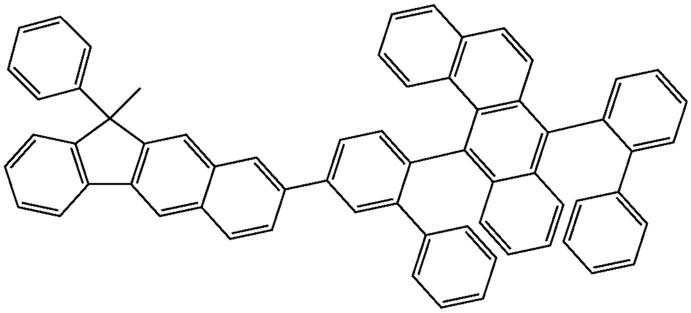

-continued
[Formula 206]
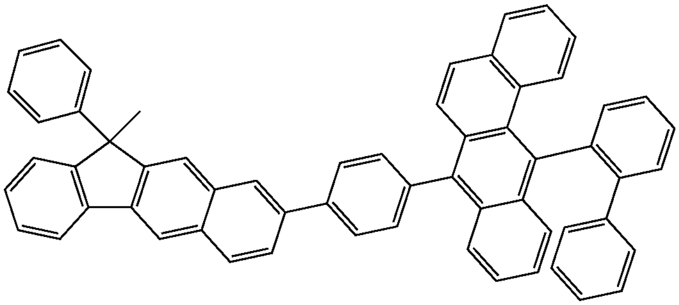
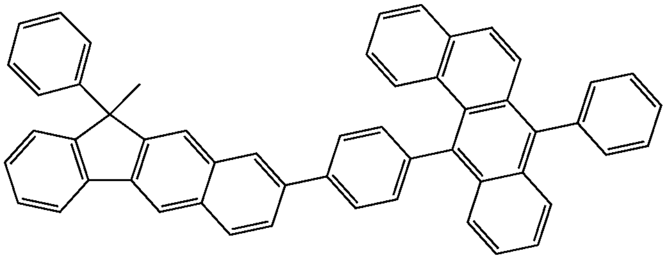
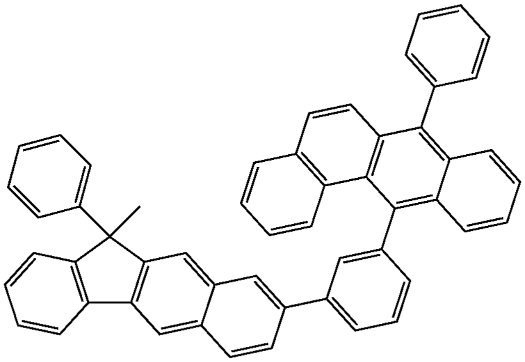
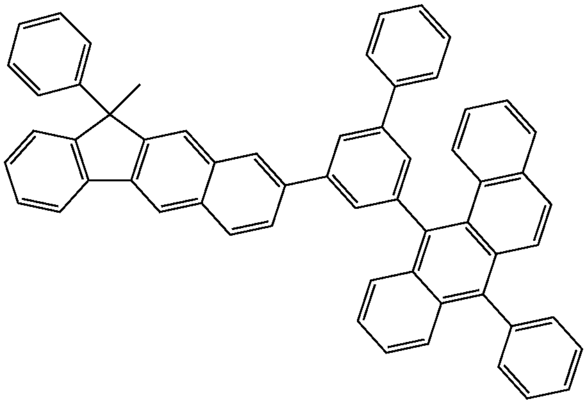
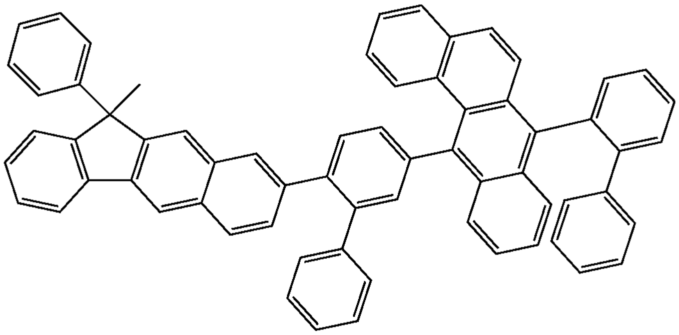

-continued
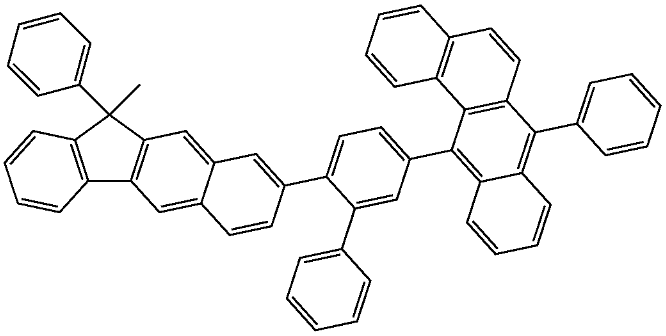
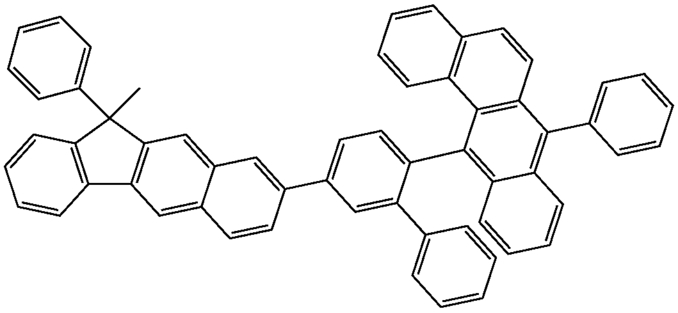
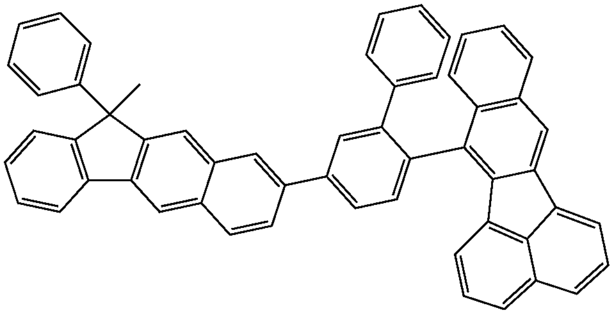
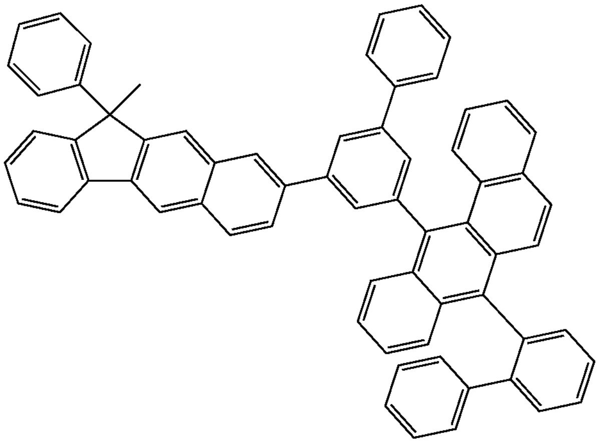

-continued
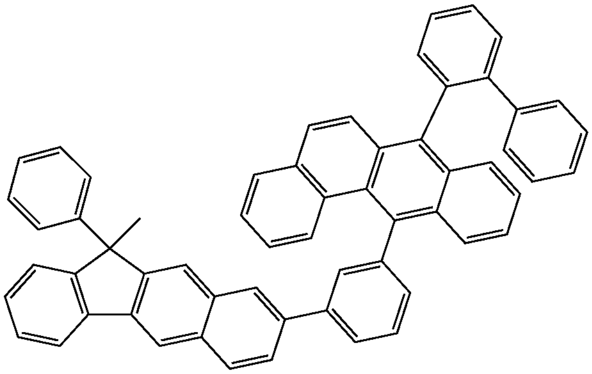
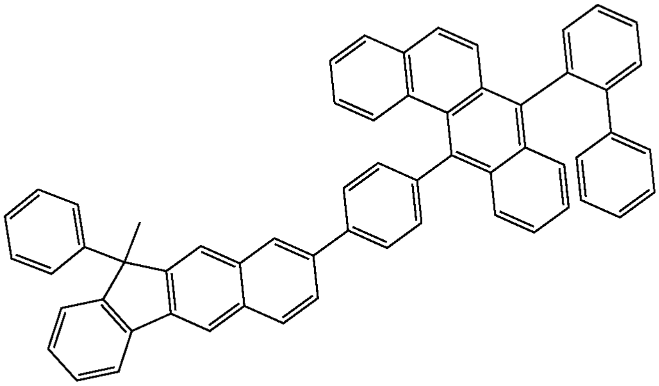
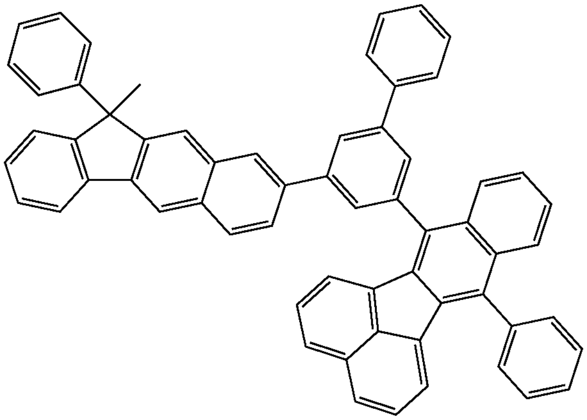
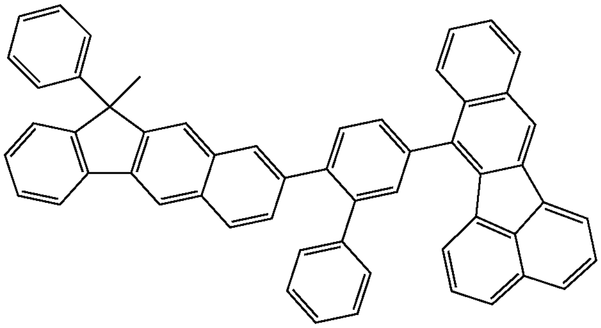

-continued
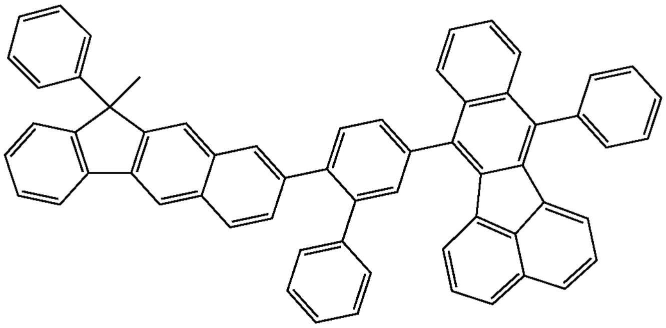
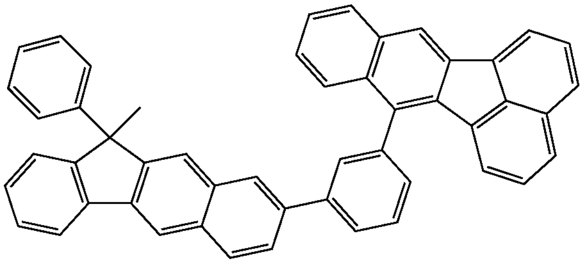
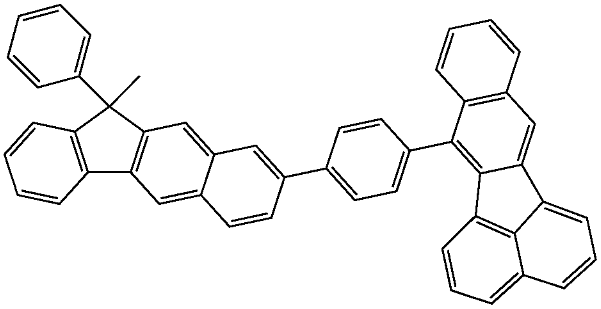
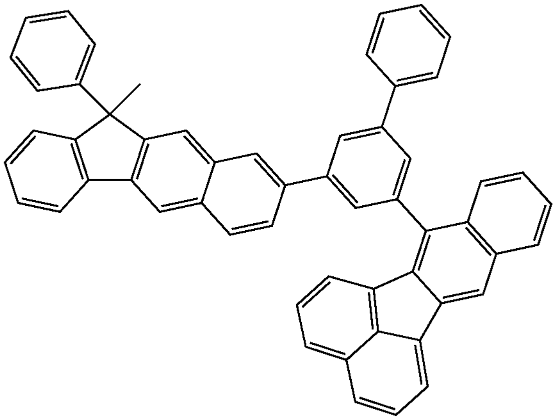
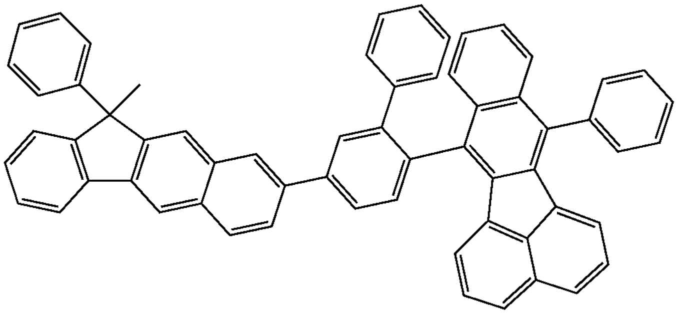
[Formula 207]
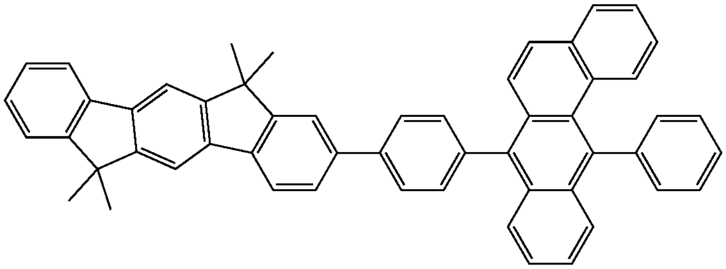

-continued
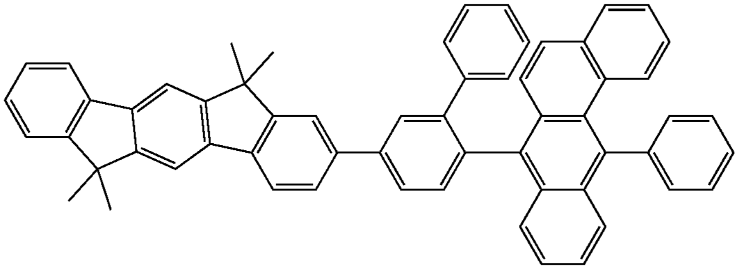
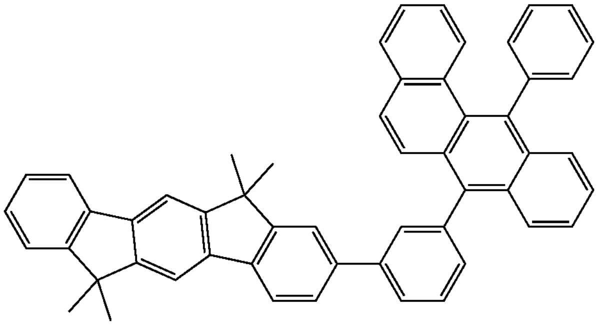
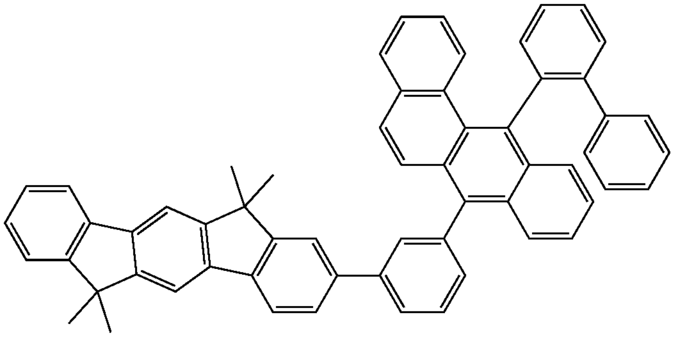
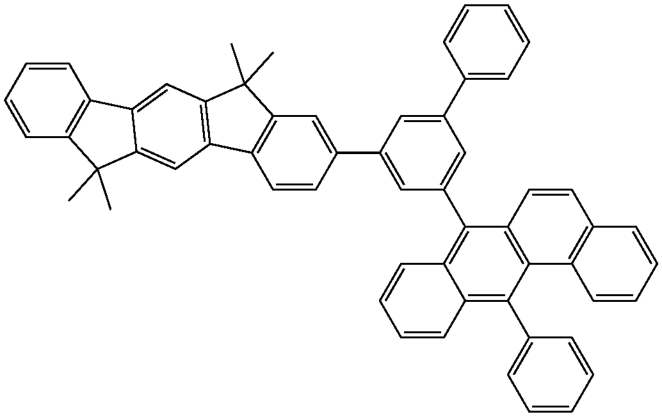
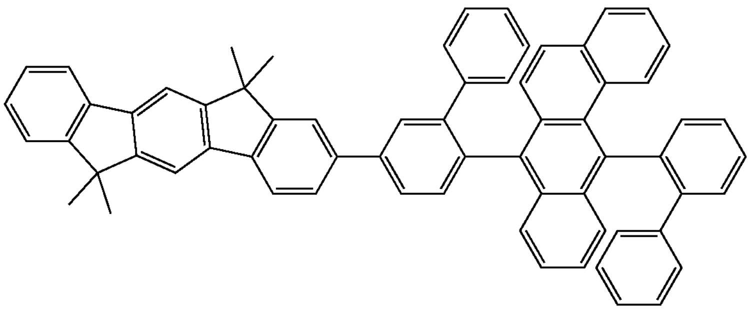

-continued
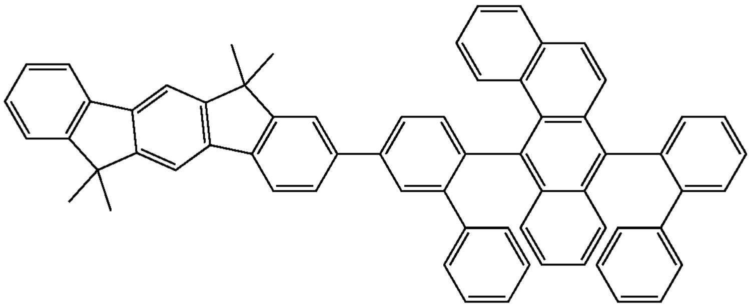
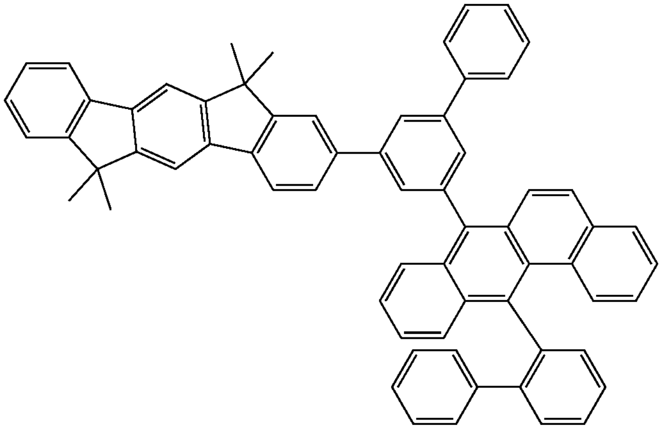
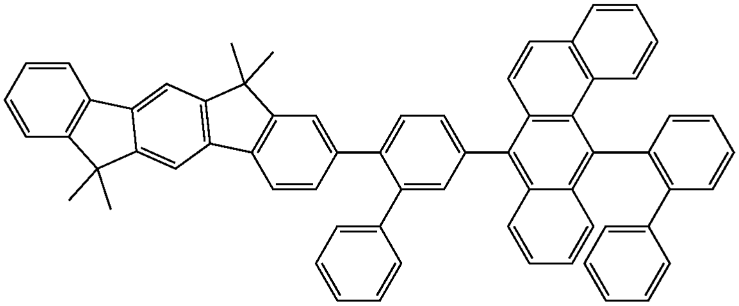
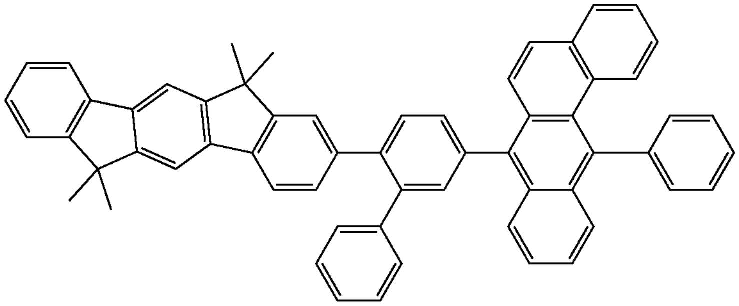
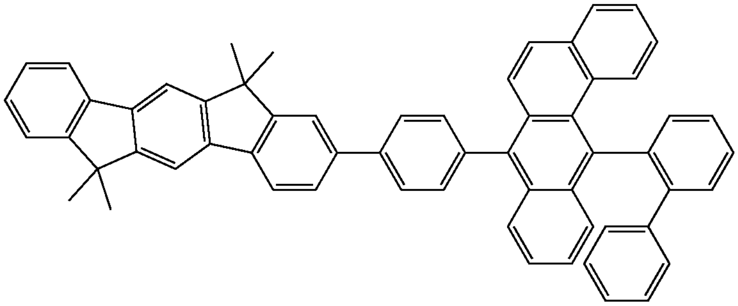

-continued
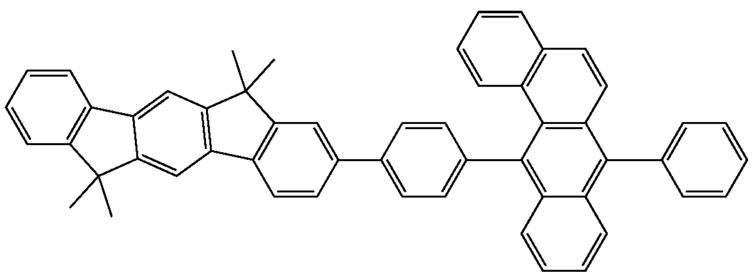
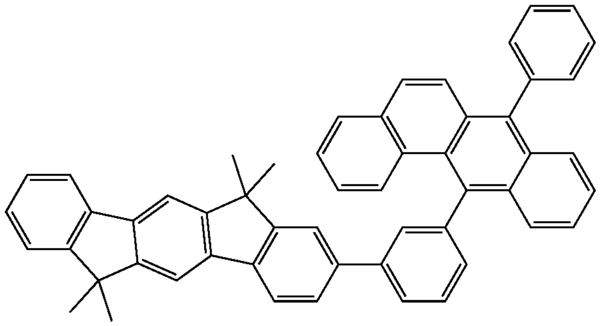
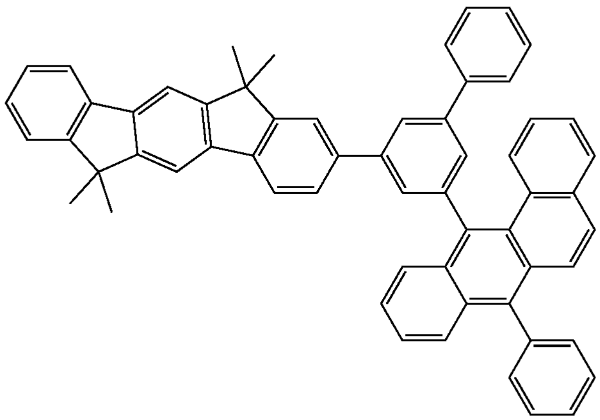
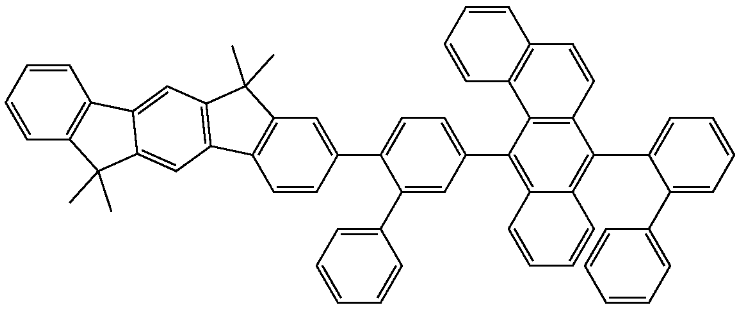
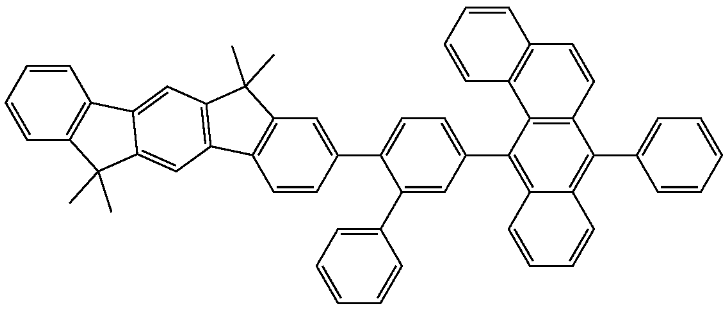

-continued
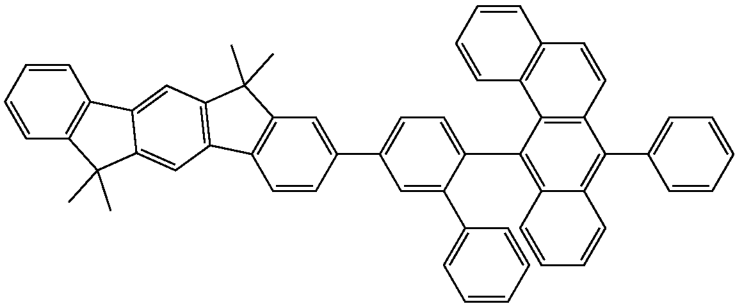
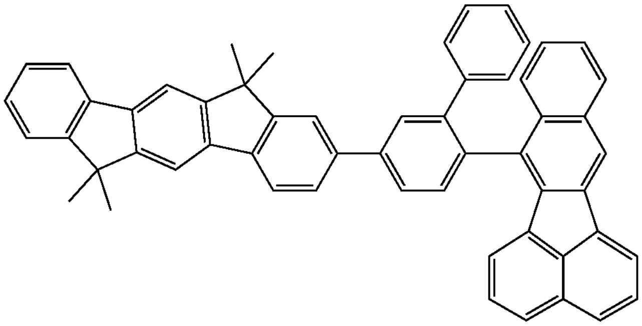
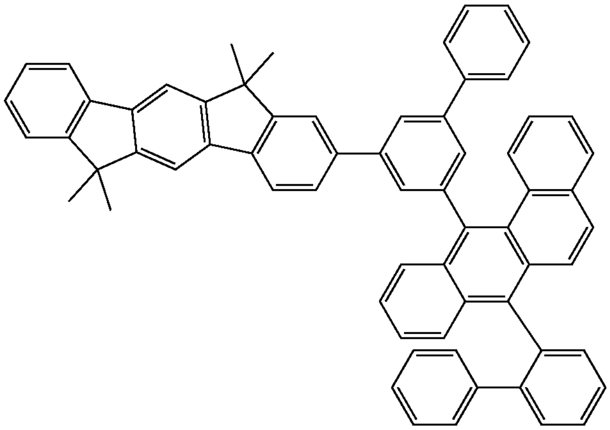
[Formula 208]
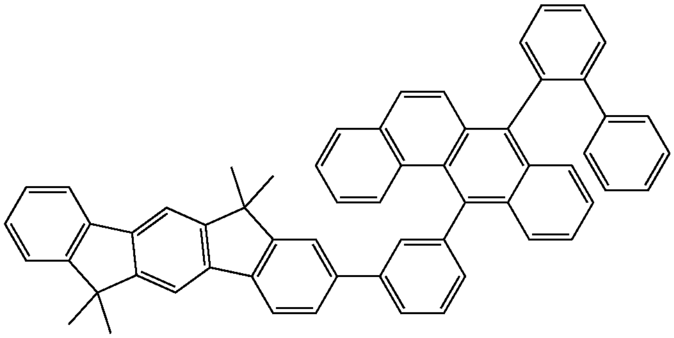

-continued
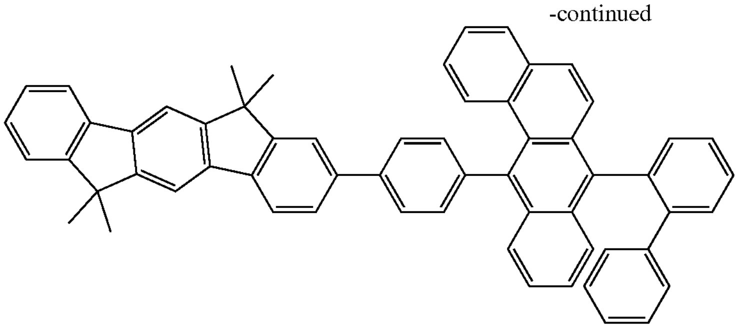
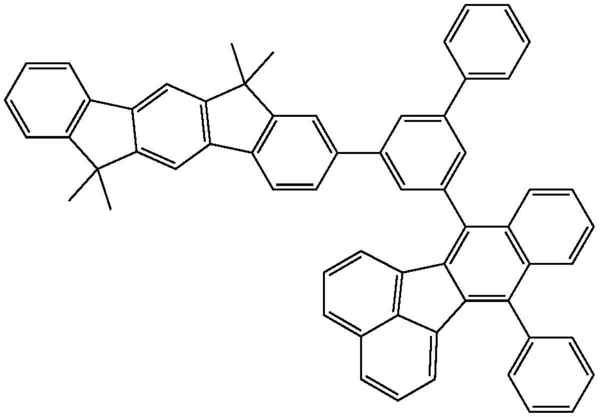
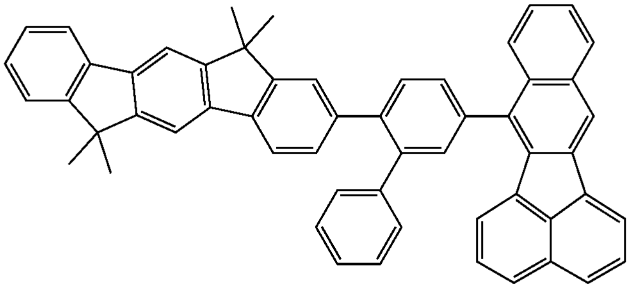
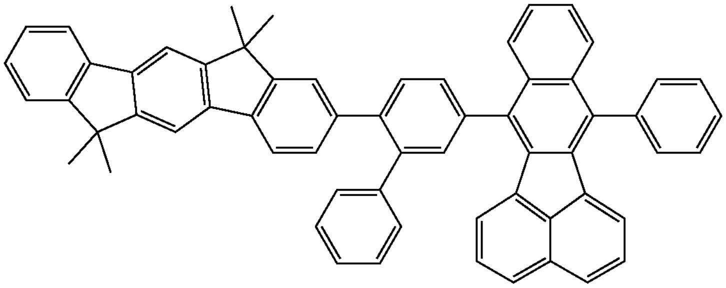
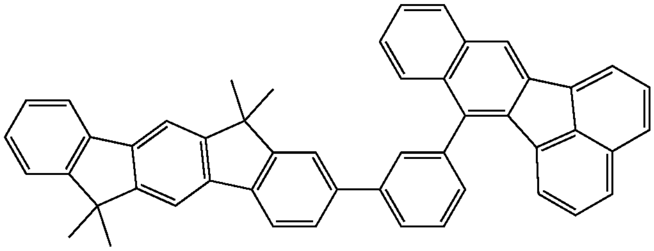

-continued
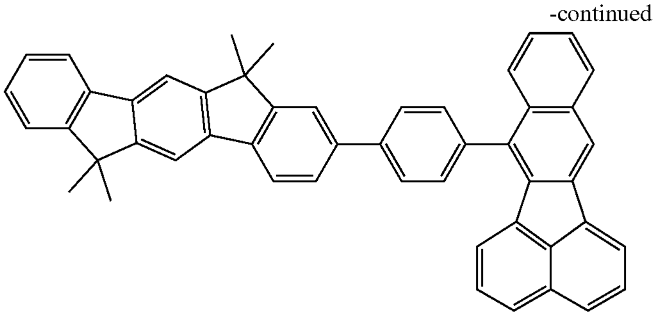
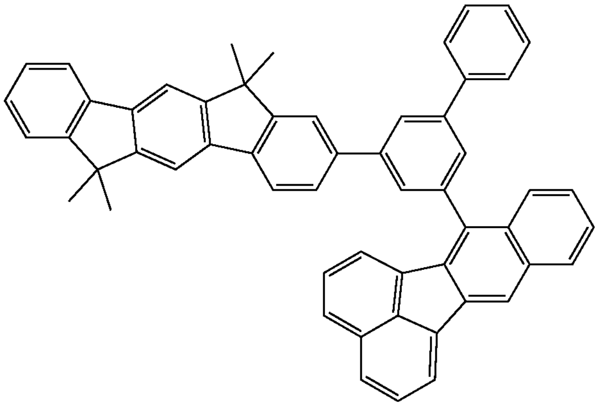
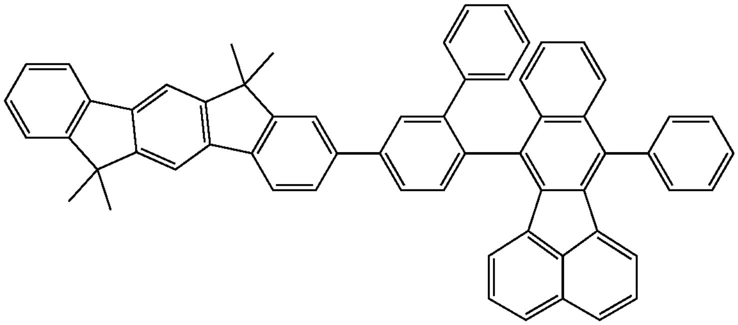
[Formula 209]
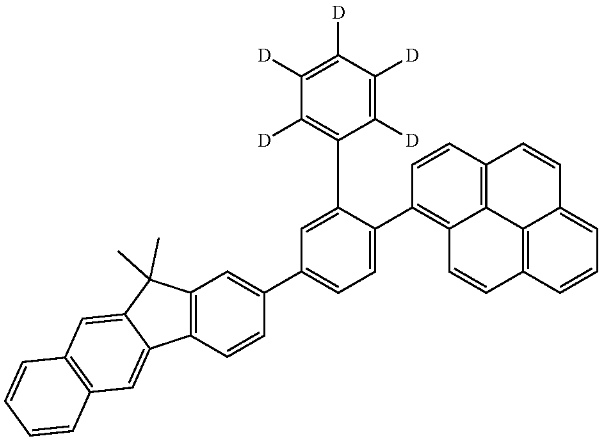

-continued
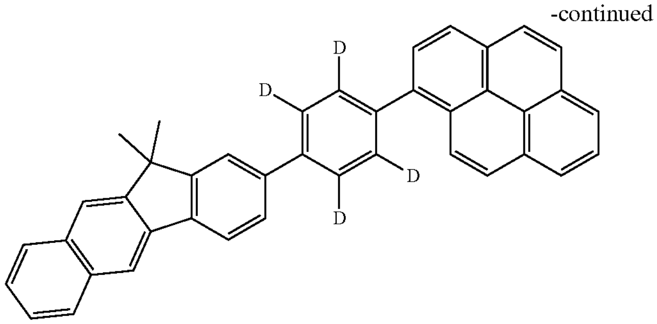
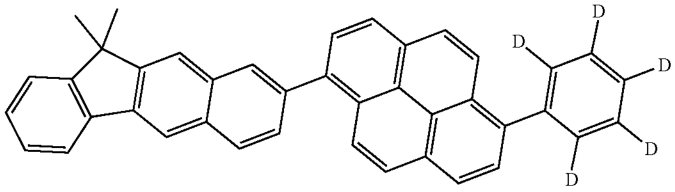
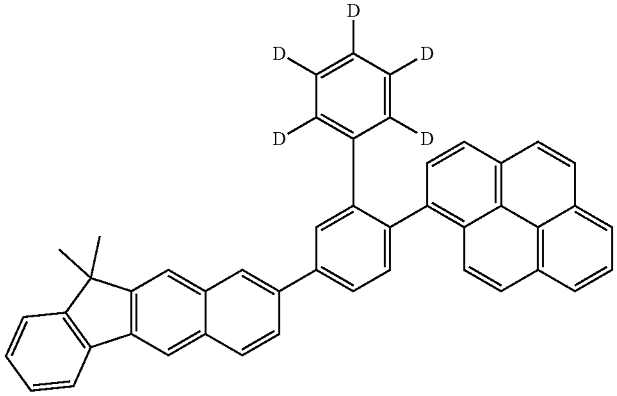
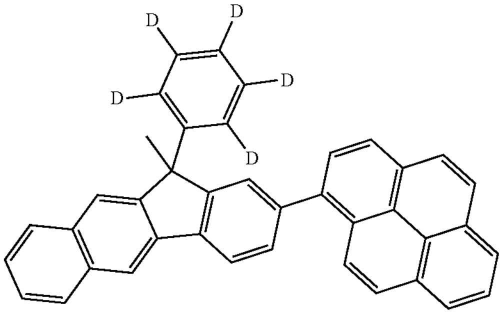
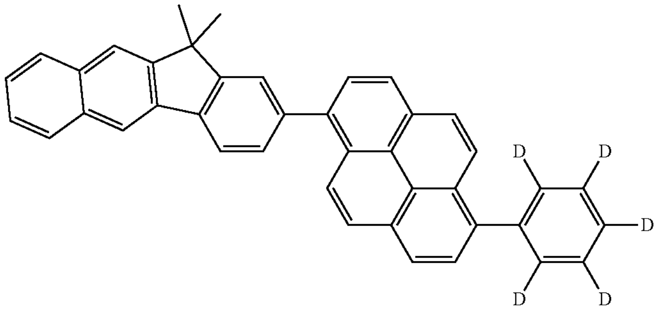
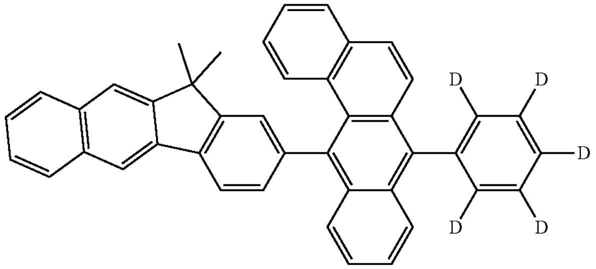
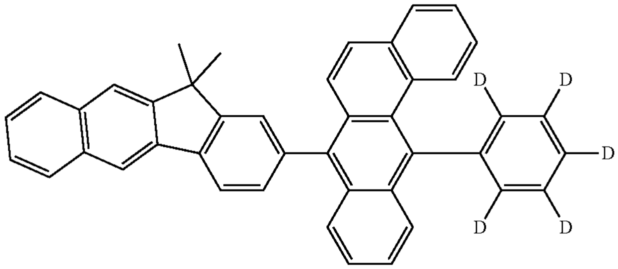

-continued
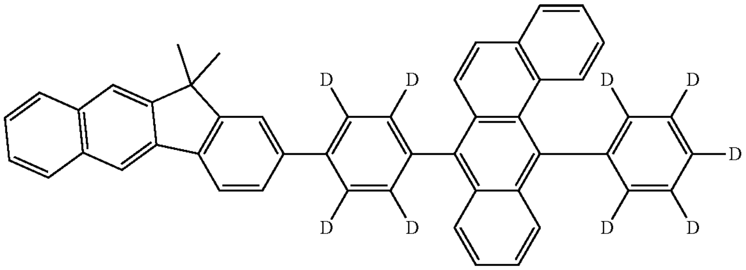
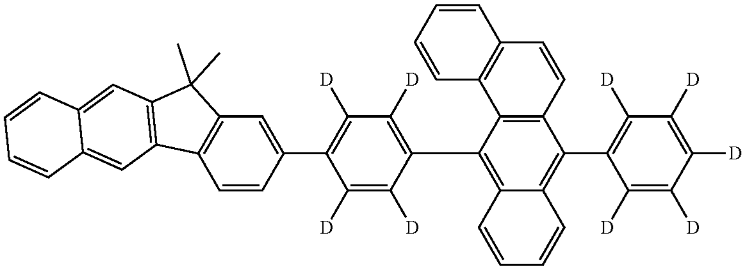
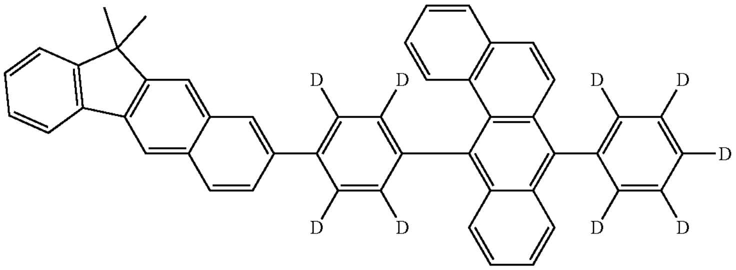
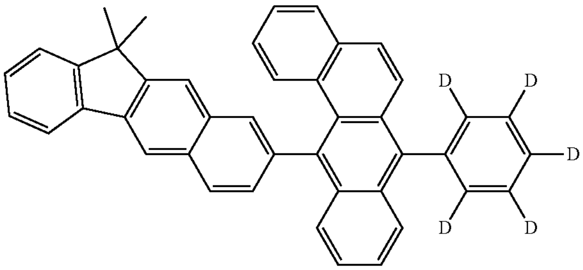
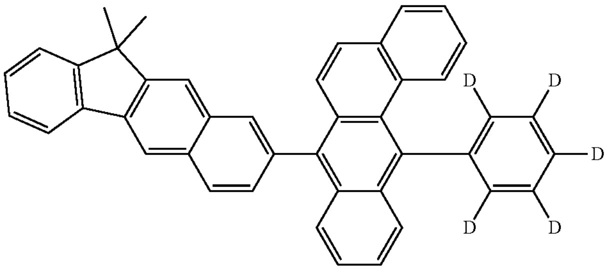
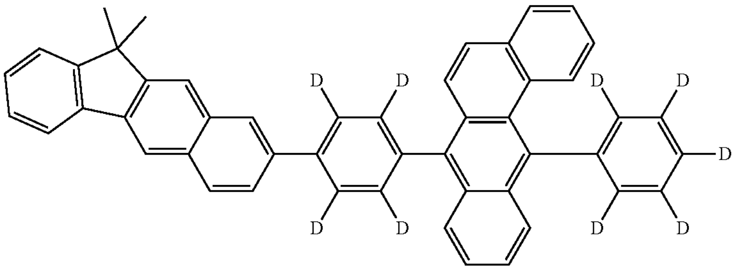

-continued
[Formula 210]
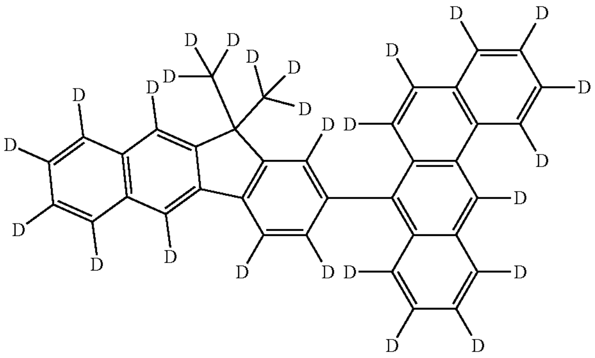
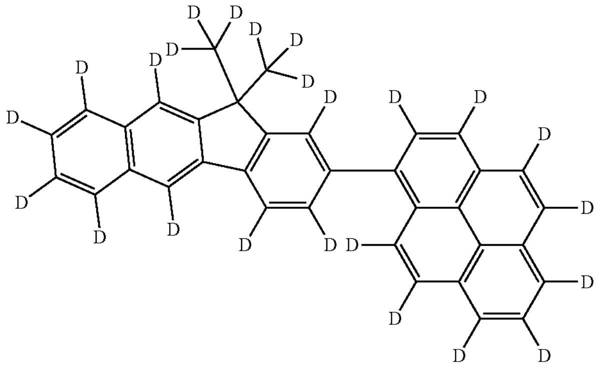
[Formula 211]
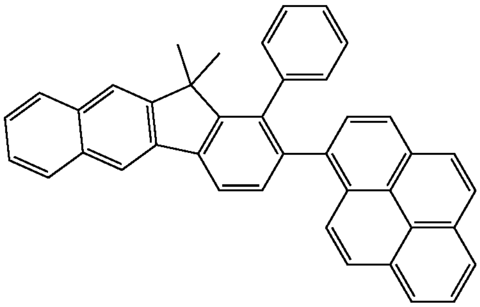
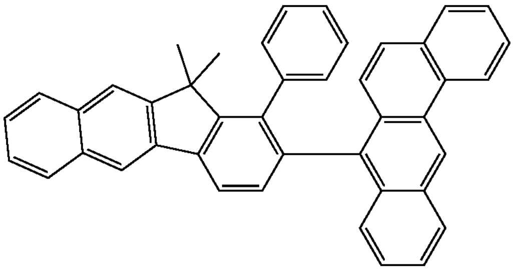
[Formula 212]
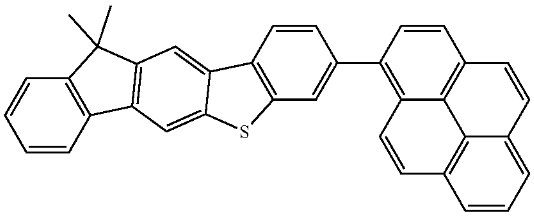
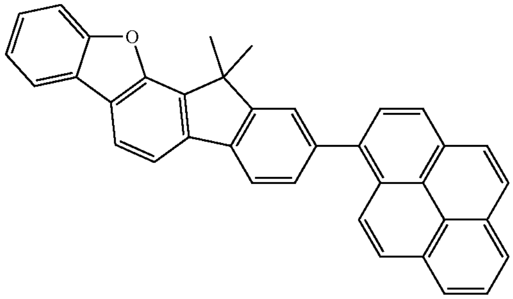
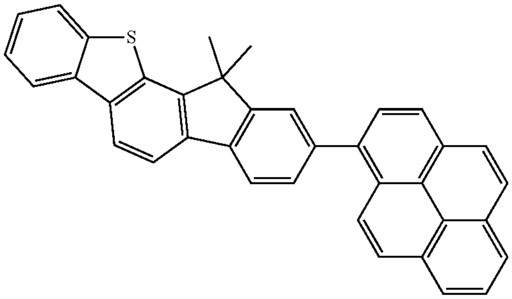
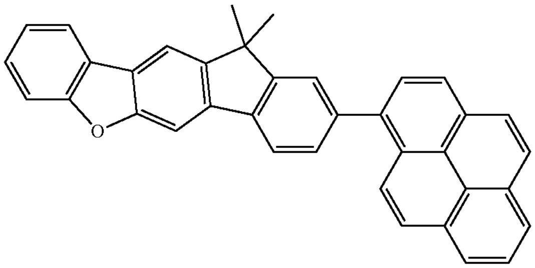

-continued
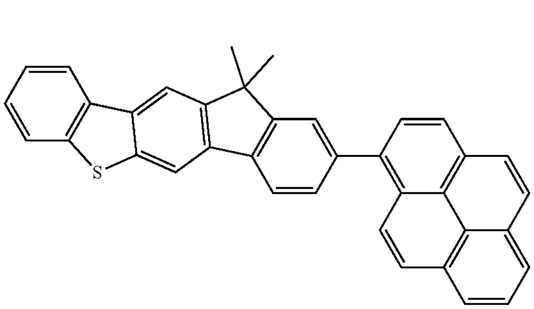
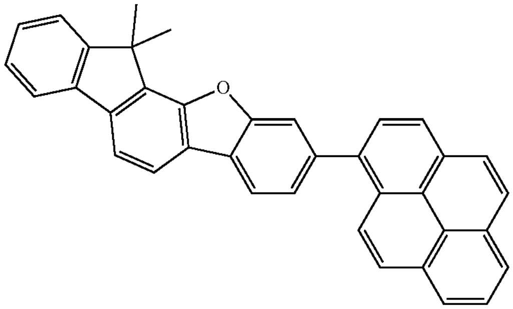
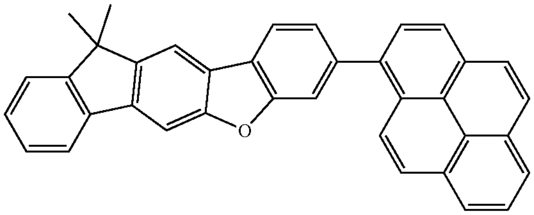
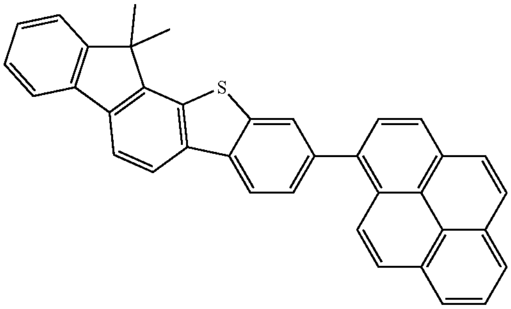
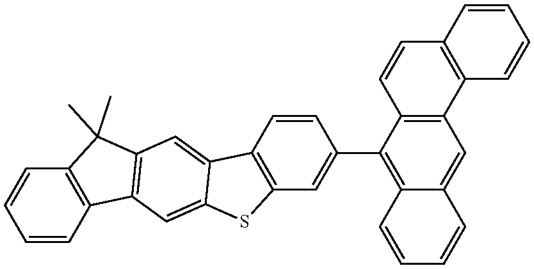
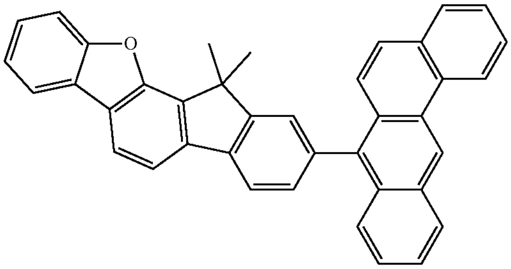
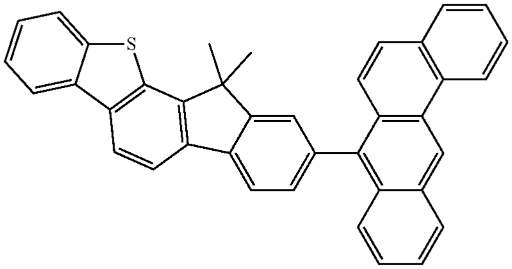
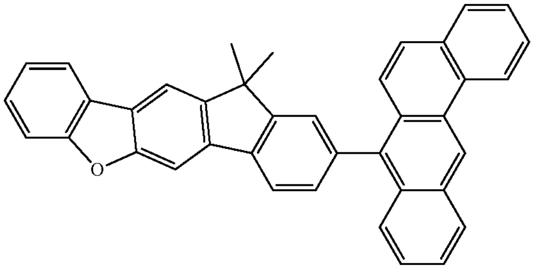
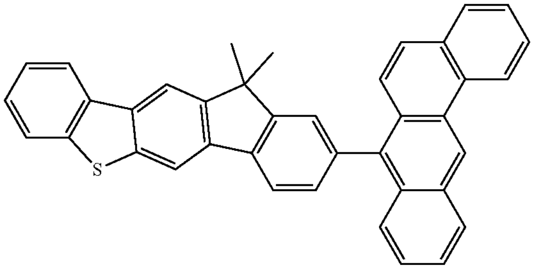
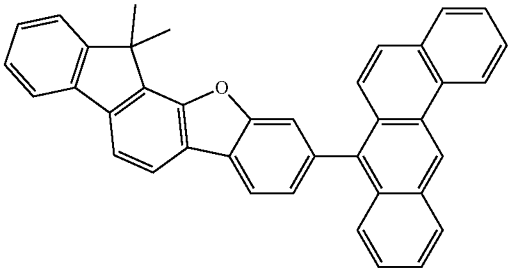
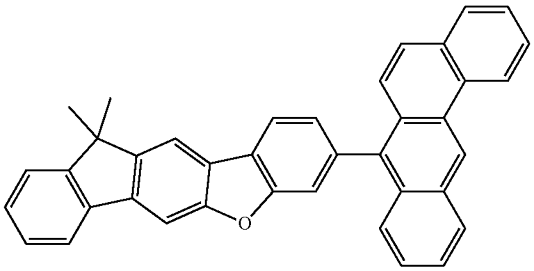
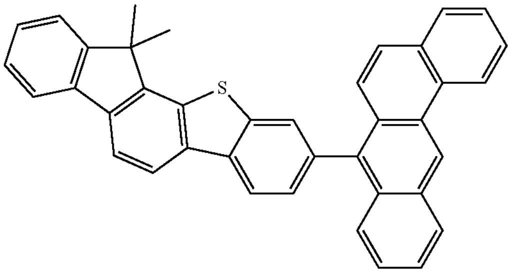

-continued
[Formula 213]
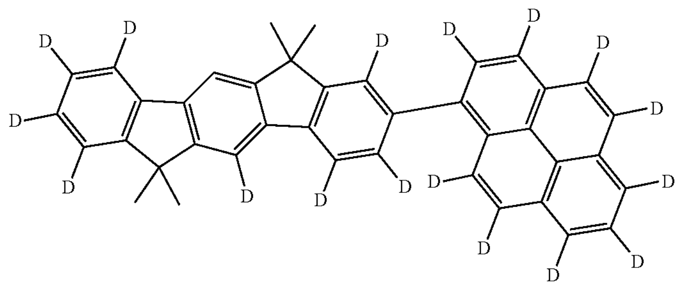
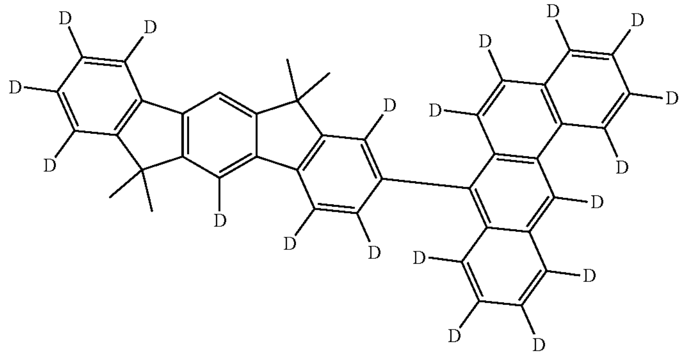
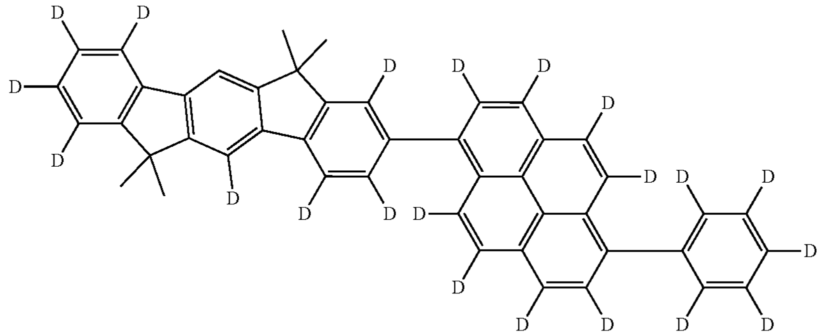
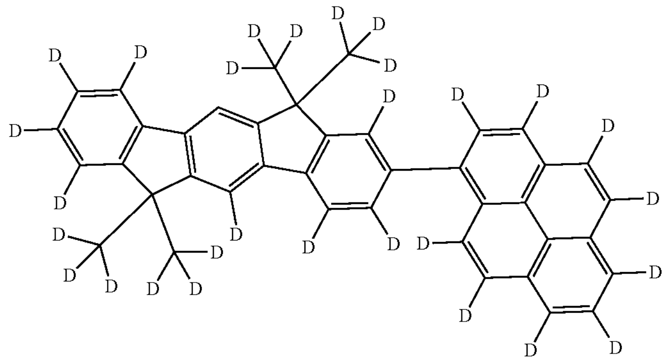
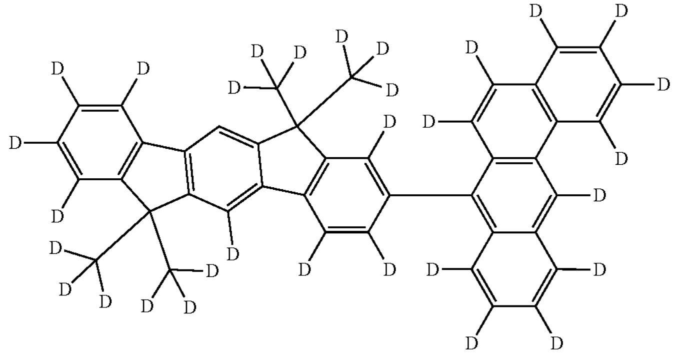

-continued
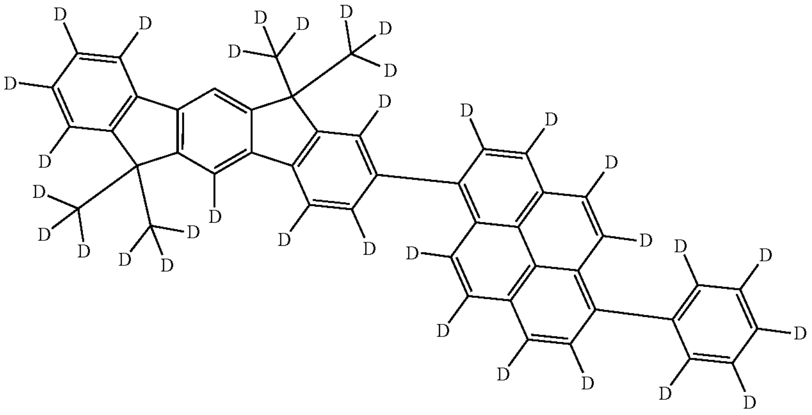
[Formula 214]
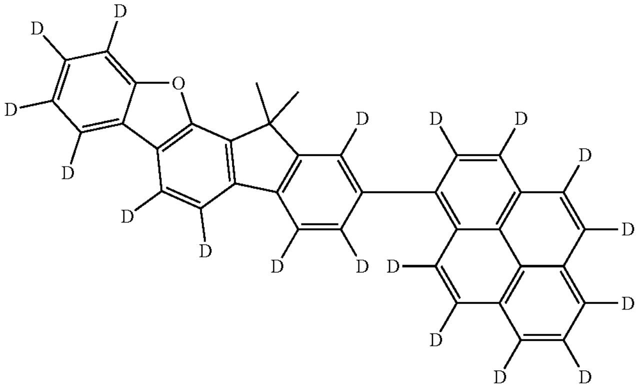
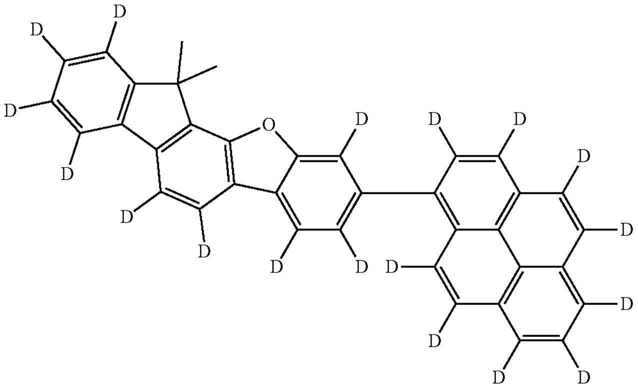
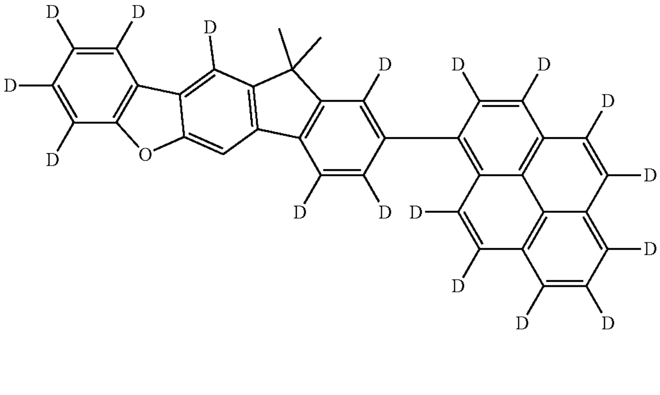

-continued
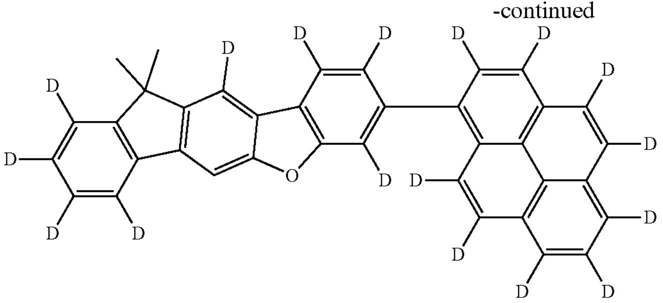
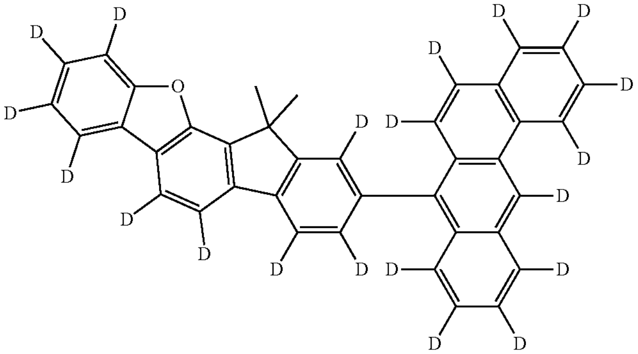
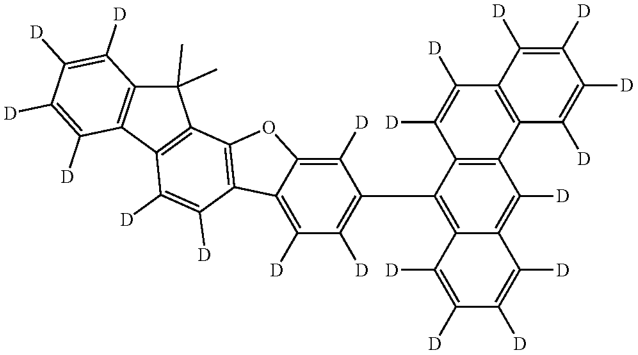
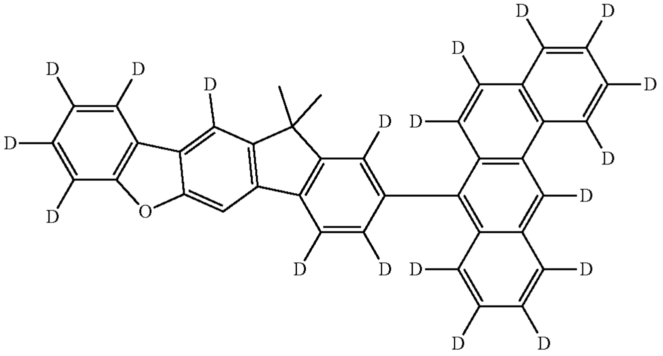
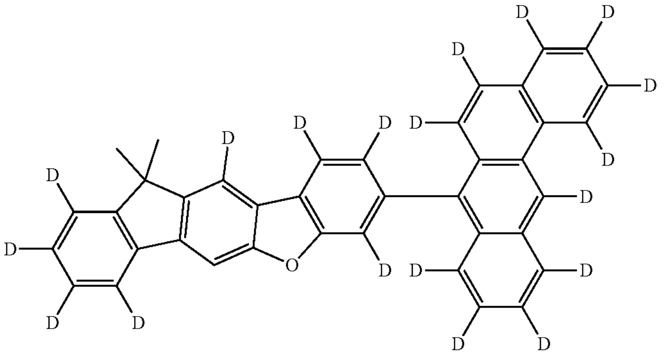 [SMILES: [2H]c1c([2H])c([2H])c2c(c1[2H])-c1cc3oc4c([2H])c(-c5c6c([2H])c([2H])c([2H])c([2H])c6c([2H])c6c5c([2H])c([2H])c5c([2H])c([2H])c([2H])c([2H])c56)c([2H])c([2H])c4c3c([2H])c1C2(C)C]

The compound according to the exemplary embodiment is usable as a material for an organic electroluminescence device.

The compound according to the exemplary embodiment is also usable for at least one organic layer of one or more organic layers provided between an anode and a cathode of an organic EL device. The organic EL device containing the compound according to the exemplary embodiment includes the anode, the cathode, and one or more organic layers between the anode and the cathode, in which preferably at least one organic layer contains the compound according to the exemplary embodiment, more preferably an emitting layer as the organic layer contains the compound according to the exemplary embodiment, still more preferably the emitting layer contains the compound according to the exemplary embodiment as a host material, and still further more preferably the emitting layer further contains a luminescent compound.

The compound according to the exemplary embodiment is also usable as the first host material (first compound) of the organic EL device according to the first exemplary embodiment. The organic EL device using the compound of the exemplary embodiment as the first host material of the first exemplary embodiment includes the anode, the cathode, and an emitting region provided between the anode and the cathode, in which the emitting region includes a first emitting layer and a second emitting layer, the first emitting layer contains the first host material and a first luminescent compound, the second emitting layer contains a second host material and a second luminescent compound, the first host material is a compound represented by the formula (1A), the first host material and the second host material are mutually different, and the first luminescent compound and the second luminescent compound are mutually the same or different.

According to the compound of the exemplary embodiment, performance of the organic electroluminescence device is improvable. The drive voltage of an organic electroluminescence device is reducible and the luminous efficiency is improvable by using the compound according to the exemplary embodiment.

Third Exemplary Embodiment

Compounds

The compound according to the exemplary embodiment is a compound represented by a formula (1C) below. The compound according to the exemplary embodiment may correspond to an example of the first compound as the first host material of the first exemplary embodiment. The compound according to the exemplary embodiment is usable as the first host material.

[Formula 215]

(1C)

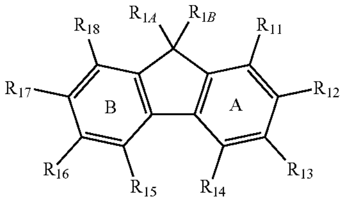

(10C)

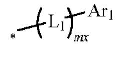

In the formula (1C):

$R_{1A}$ and $R_{1B}$ are each independently a substituted or unsubstituted alkyl group having 1 to 15 carbon atoms, a substituted or unsubstituted aryl group having 6 to 17 ring carbon atoms, or a substituted or unsubstituted heterocyclic group having 5 to 17 ring atoms, at least one of $R_{1A}$ or $R_{1B}$ is a substituted or unsubstituted alkyl group having 1 to 15 carbon atoms;

at least one combination of a combination of $R_{13}$ and $R_{14}$ or a combination of $R_{15}$ and $R_{16}$ are mutually bonded to form a substituted or unsubstituted aryl ring having 6 to 50 ring carbon atoms;

at least one combination of a combination of $R_{11}$ and $R_{12}$ or a combination of $R_{17}$ and $R_{18}$ are mutually bonded to form a substituted or unsubstituted aryl ring having 6 to 50 ring carbon atoms, or not mutually bonded;

only one or two combinations selected from a combination of $R_{11}$ and $R_{12}$, a combination of $R_{13}$ and $R_{14}$, a combination of $R_{15}$ and $R_{16}$, and a combination of $R_{17}$ and $R_{18}$ form the substituted or unsubstituted aryl ring having 6 to 50 ring carbon atoms;

a group represented by the formula (10C) is bonded to the substituted or unsubstituted aryl ring having 6 to 50 ring carbon atoms formed by a combination of $R_{11}$ and $R_{12}$, a combination of $R_{13}$ and $R_{14}$, a combination of $R_{15}$ and $R_{16}$, or a combination of $R_{17}$ and $R_{18}$, or bonded to a ring A or a ring B;

when a combination of $R_{13}$ and $R_{14}$ are mutually bonded and none of a combination of $R_{11}$ and $R_{12}$, a combination of $R_{15}$ and $R_{16}$, and a combination of $R_{17}$ and $R_{18}$ are mutually bonded, a group represented by the formula (10C) is bonded to the substituted or unsubstituted aryl ring having 6 to 50 ring carbon atoms formed by a combination of $R_{13}$ and $R_{14}$ or bonded to the ring A, and when a combination of $R_{15}$ and $R_{16}$ are mutually bonded and none of a combination of $R_{11}$ and $R_{12}$, a combination of $R_{13}$ and $R_{14}$, and a combination of $R_{17}$ and $R_{18}$ are mutually bonded, a group represented by the formula (10C) is bonded to the substituted or unsubstituted aryl ring having 6 to 50 ring carbon atoms formed by a combination of $R_{15}$ and $R_{16}$ or bonded to the ring B;

$R_{11}$ to $R_{18}$ not forming the substituted or unsubstituted aryl ring having 6 to 50 ring carbon atoms are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by $—Si(R_{901})(R_{902})(R_{903})$, a group represented by $—O—(R_{904})$, a group represented by $—S—(R_{905})$, a group represented by $—N(R_{906})(R_{907})$, a substituted or unsubstituted aralkyl group having 7 to 50 carbon atoms, a group represented by $—C(═O)R_{801}$, a group represented by $—COOR_{802}$, a halogen atom, a cyano group, a nitro group, a substituted or unsubstituted aryl group having 6 to 17 ring carbon atoms, a substituted or unsubstituted heterocyclic group having 5 to 17 ring atoms, or a group represented by the formula (10C);

in the formula (10C):

$Ar_1$ is a substituted or unsubstituted aryl group having four or more fused rings or a substituted or unsubstituted heterocyclic group having four or more fused rings;

$L_1$ is a single bond, a substituted or unsubstituted arylene group having 6 to 17 ring carbon atoms, or a substituted or unsubstituted divalent heterocyclic group having 5 to 17 ring atoms;

mx is 0, 1, or 2;

* represents a bonding position to an atom forming a ring of the formula (1C); and a compound represented by the formula (1C) does not have, in a molecule, three or more groups of a substituted or unsubstituted aryl group having four or more fused rings and a substituted or unsubstituted heterocyclic group having four or more fused rings.

In a compound represented by the formula (1C), $R_{901}$, $R_{902}$, $R_{903}$, $R_{904}$, $R_{905}$, $R_{906}$, $R_{907}$, $R_{801}$ and $R_{802}$ are each independently a hydrogen atom, a substituted or unsubstituted alkyl group having 1 to 50 carbon atoms, a substituted or unsubstituted cycloalkyl group having 3 to 50 ring carbon atoms, a substituted or unsubstituted aryl group having 6 to 17 ring carbon atoms, or a substituted or unsubstituted heterocyclic group having 5 to 17 ring atoms, when a plurality of $R_{901}$ are present, the plurality of $R_{901}$ are mutually the same or different;

when a plurality of $R_{902}$ are present, the plurality of $R_{902}$ are mutually the same or different;

when a plurality of $R_{903}$ are present, the plurality of $R_{903}$ are mutually the same or different;

when a plurality of $R_{904}$ are present, the plurality of $R_{904}$ are mutually the same or different;

when a plurality of $R_{905}$ are present, the plurality of $R_{905}$ are mutually the same or different;

when a plurality of $R_{906}$ are present, the plurality of $R_{906}$ are mutually the same or different;

when a plurality of $R_{907}$ are present, the plurality of $R_{907}$ are mutually the same or different;

when a plurality of $R_{801}$ are present, the plurality of $R_{801}$ are mutually the same or different; and when a plurality of $R_{802}$ are present, the plurality of $R_{802}$ are mutually the same or different.

In the compound according to the exemplary embodiment, one or two combinations selected from a combination of $R_{11}$ and $R_{12}$, a combination of $R_{13}$ and $R_{14}$, a combination of $R_{15}$ and $R_{16}$, and a combination of $R_{17}$ and $R_{18}$ form the substituted or unsubstituted aryl ring having 6 to 50 ring carbon atoms, and the rest of the combinations are not bonded to each other.

In the compound according to the exemplary embodiment, an aryl ring formed by mutual bonding of each of a combination of $R_{11}$ and $R_{12}$, a combination of $R_{13}$ and $R_{14}$, a combination of $R_{15}$ and $R_{16}$, and a combination of $R_{17}$ and $R_{18}$ is preferably a substituted or unsubstituted aryl ring having 6 to 18 ring carbon atoms, more preferably a substituted or unsubstituted aryl ring having 6 to 14 ring carbon atoms, and still more preferably a substituted or unsubstituted benzene ring or a substituted or unsubstituted naphthalene ring.

An aryl ring is herein occasionally referred to as an aromatic hydrocarbon ring.

In the exemplary embodiment, the compound represented by the formula (1C) is preferably a compound represented by a formula (110C), (120C), (130C), (140C), (150C), (160C), or (170C) below.

[Formula 216]

(110C)

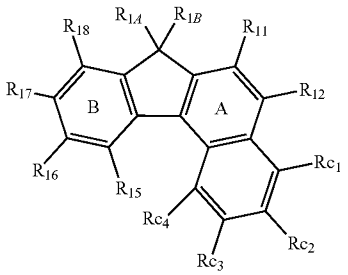

(120C)

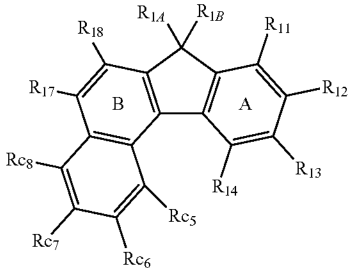

[Formula 217]

(130C)

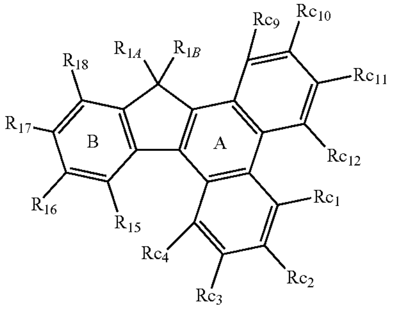

(140C)

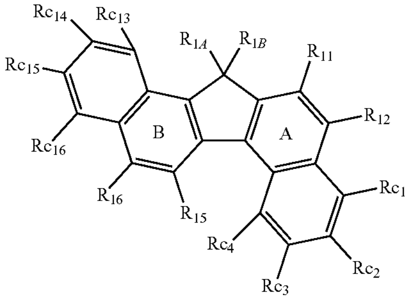

[Formula 218]

(150C)

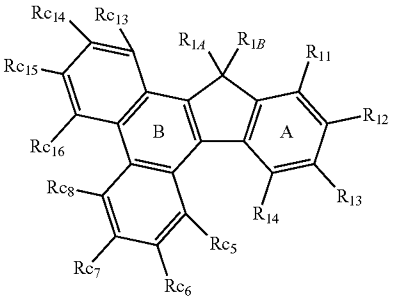

-continued (160C)

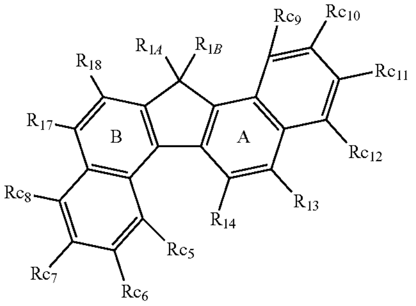

[Formula 219]

(170C)

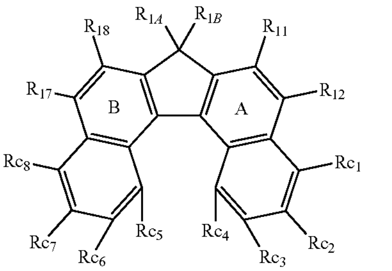

In the formulae (110C), (120C), (130C), (140C), (150C), (160C), and (170C):

$R_{1A}$ and $R_{1B}$ each independently represent the same as $R_{1A}$ and $R_{1B}$ in the formula (1C);

$R_{11}$ to $R_{18}$ and $Rc_1$ to $Rc_{16}$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a group represented by —N($R_{906}$)($R_{907}$), a substituted or unsubstituted aralkyl group having 7 to 50 carbon atoms, a group represented by —C(═O)$R_{801}$, a group represented by —COO$R_{802}$, a halogen atom, a cyano group, a nitro group, a substituted or unsubstituted aryl group having 6 to 17 ring carbon atoms, a substituted or unsubstituted heterocyclic group having 5 to 17 ring atoms, or a group represented by the formula (10C); and at least one of $R_{11}$ to $R_{18}$ or $Rc_1$ to $Rc_{16}$ is a group represented by the formula (10C).

When a combination of $R_{13}$ and $R_{14}$ are mutually bonded and none of a combination of $R_{11}$ and $R_{12}$, a combination of $R_{15}$ and $R_{16}$, and a combination of $R_{17}$ and $R_{18}$ are mutually bonded in the formula (1C), the compound represented by the formula (1C) is exemplified by a compound represented by the formula (110C). In the compound represented by the formula (110C), a group represented by the formula (10C) is bonded to a benzene ring formed by a combination of $R_{13}$ and $R_{14}$, or a ring A. In other words, at least one of $R_{11}$, $R_{12}$, or $Rc_1$ to $Rc_4$ in the formula (110C) is a group represented by the formula (10C).

When a combination of $R_{15}$ and $R_{16}$ are mutually bonded and none of a combination of $R_{11}$ and $R_{12}$, a combination of $R_{13}$ and $R_{14}$, and a combination of $R_{17}$ and $R_{18}$ are mutually bonded in the formula (1C), the compound represented by the formula (1C) is exemplified by a compound represented by the formula (120C). In a compound represented by the formula (120C), a group represented by the formula (10C) is bonded to a benzene ring formed by a combination of $R_{15}$ and $R_{16}$, or a ring B. In other words, at least one of $R_{17}$, $R_{18}$, or $Rc_5$ to $Rc_8$ in the formula (120C) is a group represented by the formula (10C).

In the formula (1C), $R_{12}$ or $R_{17}$ is preferably a group represented by the formula (10C).

In the formula (110C), $R_{12}$ is preferably a group represented by the formula (10C).

In the formula (120C), $R_{17}$ is preferably a group represented by the formula (10C).

In the formula (130C), $R_{17}$ is preferably a group represented by the formula (10C).

In the formula (150C), $R_{12}$ is preferably a group represented by the formula (10C).

In the formula (170C), $R_{12}$ or $R_{17}$ is preferably a group represented by the formula (10C).

In the compound according to the exemplary embodiment, the substituted or unsubstituted aryl group having 6 to 17 ring carbon atoms is preferably a substituted or unsubstituted aryl group having 6 to 14 ring carbon atoms.

In the compound according to the exemplary embodiment, the substituted or unsubstituted heterocyclic group having 5 to 17 ring atoms is preferably a substituted or unsubstituted heterocyclic group having 5 to 14 ring atoms.

In the compound according to the exemplary embodiment, the substituted or unsubstituted arylene group having 6 to 17 ring carbon atoms is preferably a substituted or unsubstituted arylene group having 6 to 14 ring carbon atoms.

In the compound according to the exemplary embodiment, the substituted or unsubstituted divalent heterocyclic group having 5 to 17 ring atoms is preferably a substituted or unsubstituted divalent heterocyclic group having 5 to 14 ring atoms.

In the compound according to the exemplary embodiment, $R_{1A}$ and $R_{1B}$ are preferably each independently a substituted or unsubstituted alkyl group having 1 to 15 carbon atoms or a substituted or unsubstituted aryl group having 6 to 17 ring carbon atoms.

In the compound according to the exemplary embodiment, $R_{1A}$ and $R_{1B}$ are preferably each independently a substituted or unsubstituted alkyl group having 1 to 15 carbon atoms. It makes a drive voltage likely to decrease that $R_{1A}$ and $R_{1B}$ are each a substituted or unsubstituted alkyl group having 1 to 15 carbon atoms.

In the compound according to the exemplary embodiment, $R_{1A}$ and $R_{1B}$ are preferably each independently a substituted or unsubstituted alkyl group having 1 to 10 carbon atoms.

In the compound according to the exemplary embodiment, mx is preferably 0.

In the compound according to the exemplary embodiment, $L_1$ is preferably a single bond or a substituted or unsubstituted arylene group having 6 to 17 ring carbon atoms, and more preferably a single bond or a substituted or unsubstituted phenylene group.

In the compound according to the exemplary embodiment, $R_{11}$ to $R_{18}$ not being a group represented by the formula (10C) are preferably each independently a hydrogen atom or a substituted or unsubstituted alkyl group having 1 to 15 carbon atoms, more preferably a hydrogen atom or a substituted or unsubstituted alkyl group having 1 to 10 carbon atoms, and still more preferably a hydrogen atom.

In the compound according to the exemplary embodiment, $Rc_1$ to $Rc_{16}$ not being a group represented by the formula (10C) are preferably each independently a hydrogen atom or a substituted or unsubstituted alkyl group having 1 to 15 carbon atoms, more preferably a hydrogen atom or a substituted or unsubstituted alkyl group having 1 to 10 carbon atoms, and still more preferably a hydrogen atom.

In the compound according to the exemplary embodiment, $Ar_1$ is preferably a substituted or unsubstituted aryl group having four to six fused rings or a substituted or unsubstituted heterocyclic group having four to six fused rings, and more preferably a substituted or unsubstituted aryl group having four to six fused rings.

In the compound according to the exemplary embodiment, $Ar_1$ is also preferably a group derived from a substituted or unsubstituted fluoranthene ring, a substituted or unsubstituted benzofluoranthene ring, a substituted or unsubstituted benzanthracene ring, or a substituted or unsubstituted benzoxanthene ring.

In the compound according to the exemplary embodiment, $Ar_1$ is also preferably a group represented by the formula (110), (114), (120), (130), (140), (150), (160), (170), (171), (180) or (190).

In the compound according to the exemplary embodiment, $Ar_1$ in the formula (10A) is preferably a group represented by the formula (110) or (120) described in the first exemplary embodiment.

In the compound according to the exemplary embodiment, $Ar_1$ is also preferably a group represented by the formula (111), (112) or (113) described in the first exemplary embodiment.

In the compound according to the exemplary embodiment, $R_{1101}$ to $R_{1110}$ that are each not a bonding position to $L_1$ are preferably each independently a hydrogen atom or a substituted or unsubstituted aryl group having 6 to 14 ring carbon atoms, and more preferably a hydrogen atom or a substituted or unsubstituted phenyl group.

In the compound according to the exemplary embodiment, $R_{1211}$ or $R_{1212}$ in the formula (120) is preferably a bonding position to $L_1$.

In the compound according to the exemplary embodiment, $R_{1201}$ to $R_{1212}$ that are each not a bonding position to $L_1$ are preferably each independently a hydrogen atom or a substituted or unsubstituted aryl group having 6 to 14 ring carbon atoms, and more preferably a hydrogen atom or a substituted or unsubstituted phenyl group.

In the compound according to the exemplary embodiment, all groups specified as "substituted or unsubstituted" groups are preferably "unsubstituted" groups.

Producing Method of Compound in the Exemplary Embodiment

The compound according to the exemplary embodiment can be produced by application of known substitution reactions and materials depending on a target compound, according to a synthesis method described in Examples described later or in a similar manner as the synthesis method.

Specific Examples of Compound in the Exemplary Embodiment

Specific examples of the compound in the exemplary embodiment include compounds below. However, the invention is by no means limited to the specific examples of the compound. The compound according to the exemplary embodiment whose specific examples are listed below is usable as the first host material of the organic EL device according to the first exemplary embodiment.

[Formula 220]

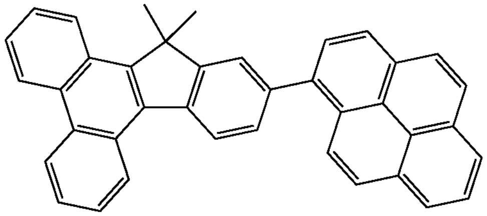

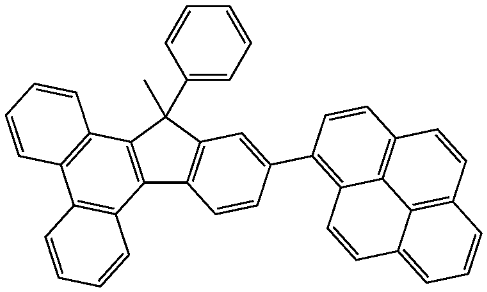

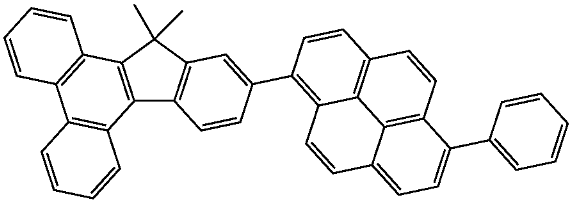

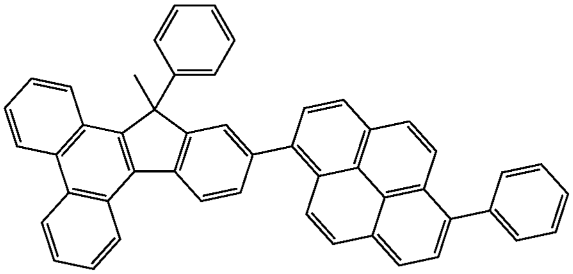

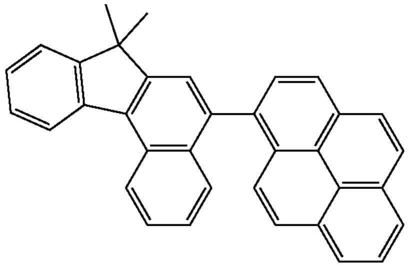

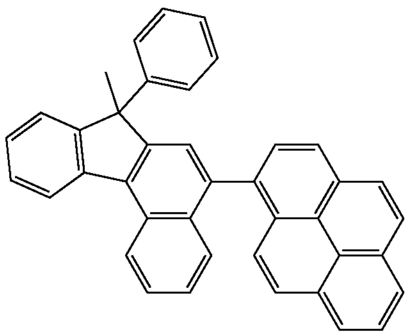

-continued

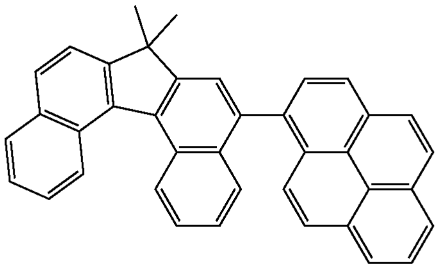

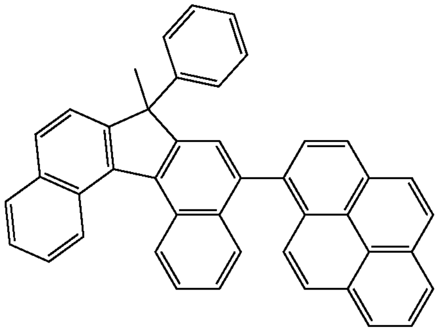

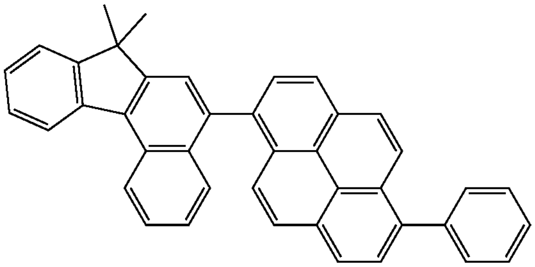

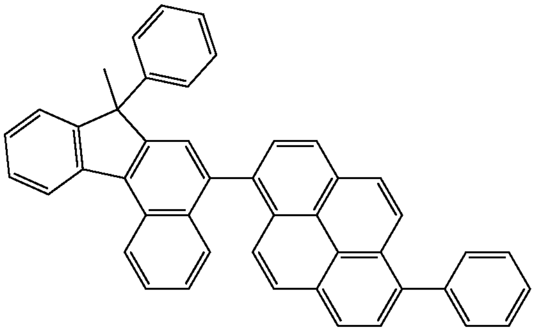

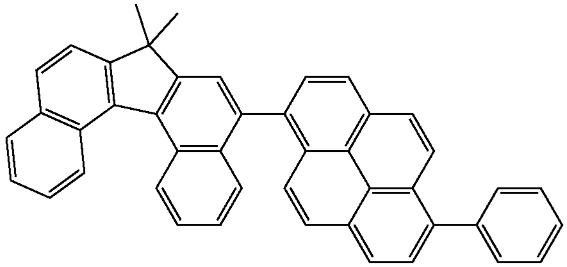

-continued

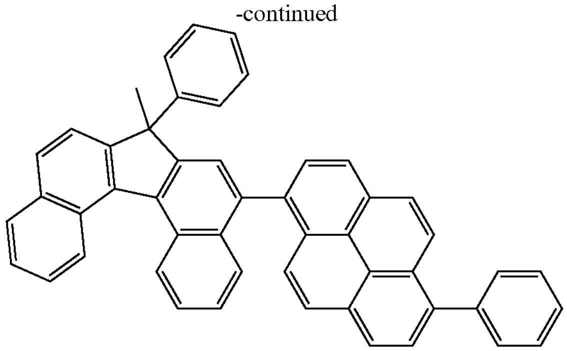

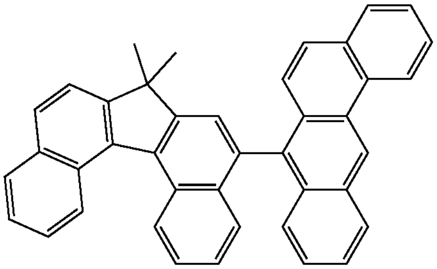

The compound according to the exemplary embodiment is usable as a material for an organic electroluminescence device.

The compound according to the exemplary embodiment is also usable for at least one organic layer of one or more organic layers provided between an anode and a cathode of an organic EL device. The organic EL device containing the compound according to the exemplary embodiment includes the anode, the cathode, and one or more organic layers between the anode and the cathode, in which preferably at least one organic layer contains the compound according to the exemplary embodiment, more preferably an emitting layer as the organic layer contains the compound according to the exemplary embodiment, still more preferably the emitting layer contains the compound according to the exemplary embodiment as a host material, and still further more preferably the emitting layer further contains a luminescent compound.

The compound according to the exemplary embodiment is also usable as the first host material (first compound) of the organic EL device according to the first exemplary embodiment. The organic EL device using the compound of the exemplary embodiment as the first host material of the first exemplary embodiment includes the anode, the cathode, and an emitting region provided between the anode and the cathode, in which the emitting region includes a first emitting layer and a second emitting layer, the first emitting layer contains the first host material and a first luminescent compound, the second emitting layer contains a second host material and a second luminescent compound, the first host material is a compound represented by the formula (1C), the first host material and the second host material are mutually different, and the first luminescent compound and the second luminescent compound are mutually the same or different.

According to the compound of the exemplary embodiment, performance of the organic electroluminescence device is improvable. The drive voltage of an organic electroluminescence device is reducible and the luminous efficiency is improvable by using the compound according to the exemplary embodiment.

Fourth Exemplary Embodiment

Compounds

A compound according to the exemplary embodiment is a compound represented by a formula (1B) below and having a group represented by a formula (10B) below.

[Formula 221]

(1B)

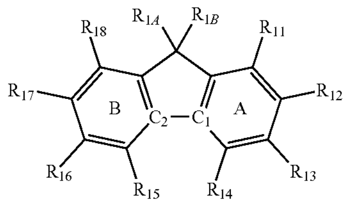

(10B)

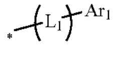

$R_{1A}$, $R_{1B}$, and $R_{11}$ to $R_{18}$ in the formula (1B) are each defined as in the formula (1).

$L_1$, mx, and * in the formula (10B) are each defined as in the formula (10). $Ar_1$ is a substituted or unsubstituted aryl group having four or more fused rings or a substituted or unsubstituted heterocyclic group having four or more fused rings, and $Ar_1$ is not a substituted or unsubstituted pyrenyl group.

A compound represented by the formula (1B) does not have, in a molecule of the first host material, three or more groups of a substituted or unsubstituted aryl group having four or more fused rings and a substituted or unsubstituted heterocyclic group having four or more fused rings.

The compound according to the exemplary embodiment is a compound that may correspond to an example of the first compound as the first host material in the first exemplary embodiment. As the compound according to the exemplary embodiment, a compound in which $Ar_1$ in the first host material of the first exemplary embodiment is not a substituted or unsubstituted pyrenyl group is usable.

Producing Method of Compound in the Exemplary Embodiment

The compound according to the exemplary embodiment can be produced by application of known substitution reactions and materials depending on a target compound, according to a synthesis method described in Examples described later or in a similar manner as the synthesis method.

Specific Examples of Compound in the Exemplary Embodiment

The compound according to the exemplary embodiment is specifically exemplified by a compound in which $Ar_1$ is not a substituted or unsubstituted pyrenyl group, among the specific examples of the first host material of the first exemplary embodiment, the specific examples of the compound of the second exemplary embodiment, and the specific examples of the third exemplary embodiment.

The compound according to the exemplary embodiment is usable as a material for an organic electroluminescence device.

The compound according to the exemplary embodiment is also usable for at least one organic layer of one or more organic layers provided between an anode and a cathode of an organic EL device. The organic EL device containing the compound according to the exemplary embodiment includes the anode, the cathode, and one or more organic layers between the anode and the cathode, in which preferably at least one organic layer contains the compound according to the exemplary embodiment, more preferably an emitting layer as the organic layer contains the compound according to the exemplary embodiment, still more preferably the emitting layer contains the compound according to the exemplary embodiment as a host material, and still further more preferably the emitting layer further contains a luminescent compound.

The compound according to the exemplary embodiment is also usable as the first host material (first compound) of the organic EL device according to the first exemplary embodiment. The organic EL device using the compound of the exemplary embodiment as the first host material of the first exemplary embodiment includes the anode, the cathode, and an emitting region provided between the anode and the cathode, in which the emitting region includes a first emitting layer and a second emitting layer, the first emitting layer contains the first host material and a first luminescent compound, the second emitting layer contains a second host material and a second luminescent compound, the first host material is a compound represented by the formula (1B), the first host material and the second host material are mutually different, and the first luminescent compound and the second luminescent compound are mutually the same or different.

According to the compound of the exemplary embodiment, performance of the organic electroluminescence device is improvable. The drive voltage of an organic electroluminescence device is reducible and the luminous efficiency is improvable by using the compound according to the exemplary embodiment.

Fifth Exemplary Embodiment

Electronic Device

An electronic device according to a fifth exemplary embodiment is installed with any one of the organic EL devices according to any one of the above exemplary embodiments. Examples of the electronic device include a display device and a light-emitting unit. Examples of the display device include a display component (e.g., an organic EL panel module), TV, mobile phone, tablet and personal computer. Examples of the light-emitting unit include an illuminator and a vehicle light.

Modification of Embodiment(s)

The scope of the invention is not limited by the above exemplary embodiments but includes any modification and improvement as long as such modification and improvement are compatible with the invention.

For instance, the number of emitting layers is not limited to two, and more than two emitting layers may be layered. In a case where the organic EL device includes more than two emitting layers, it is only necessary that at least two of the emitting layers should satisfy the requirements mentioned in the above exemplary embodiments. For instance, the rest of the emitting layers may be a fluorescent emitting layer or a phosphorescent emitting layer with use of emission caused by electron transfer from the triplet excited state directly to the ground state.

In a case where the organic EL device includes a plurality of emitting layers, these emitting layers may be mutually adjacently provided, or may form a so-called tandem organic EL device, in which a plurality of emitting units are layered via an intermediate layer.

Specific structure, shape and the like of the components in the invention may be designed in any manner as long as an object of the invention can be achieved.

EXAMPLES

The invention will be described in more detail below with reference to Examples. The scope of the invention is by no means limited to Examples.

Compounds

Structures of compounds represented by the formula (1), (1A), or (1B) and used for producing organic EL devices in Examples 1 to 13 are shown below.

[Formula 222]

BH1-1

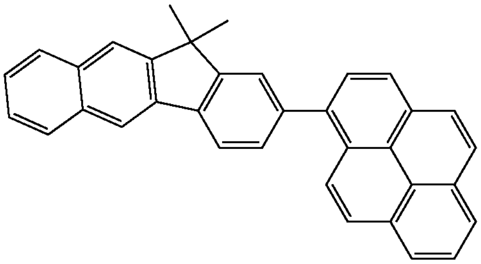

BH1-2

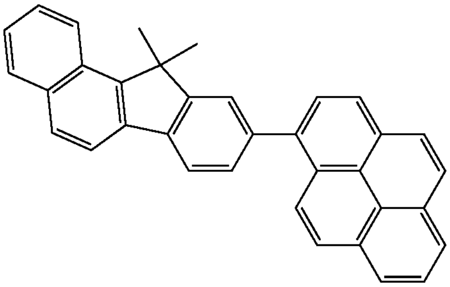

BH1-3

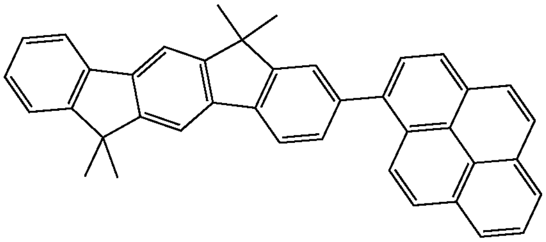

BH1-4

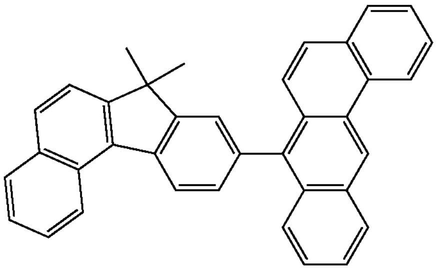

-continued

BH1-5

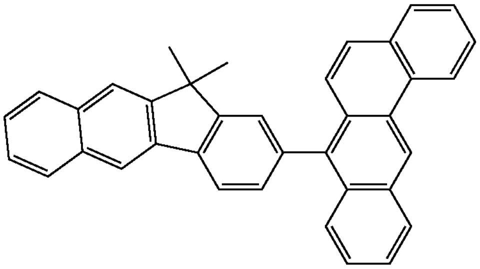

BH1-6

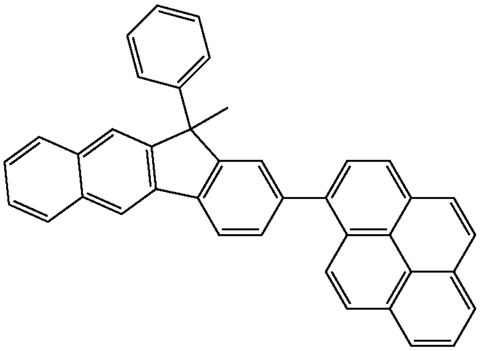

[Formula 223]

BH1-7

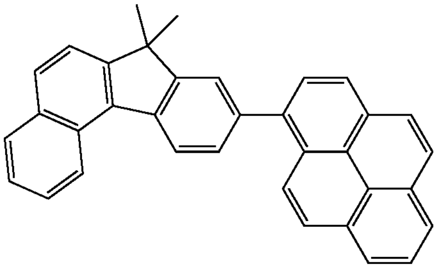

Structures of comparative compounds used for producing organic EL devices in Comparatives 1 and 3 are shown below.

[Formula 224]

BH-R1

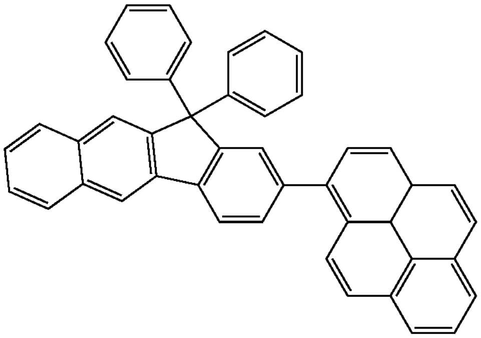

Structures of other compounds used for producing organic EL devices in Examples 1 to 13 and Comparatives 1 to 4 are shown below.

[Formula 225]
HIL-1
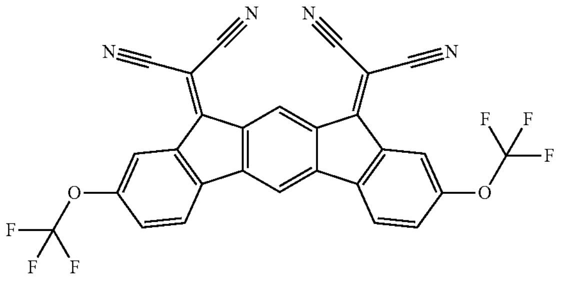
HTL-1
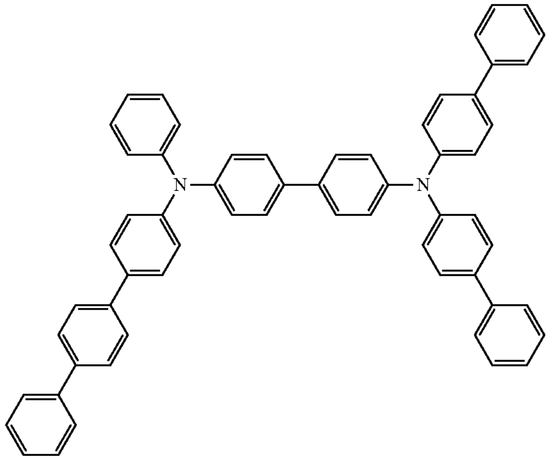
EBL-1
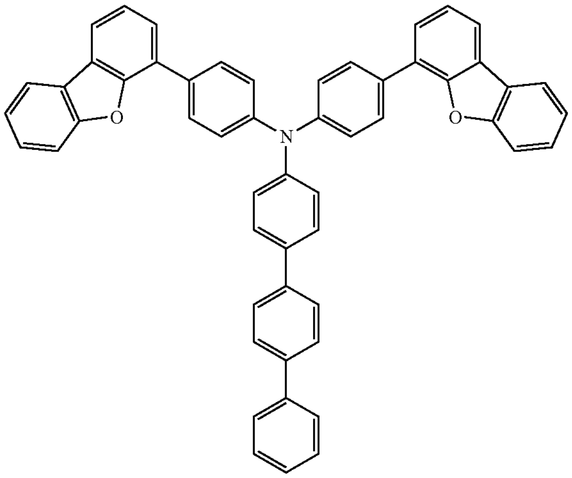
BH-2
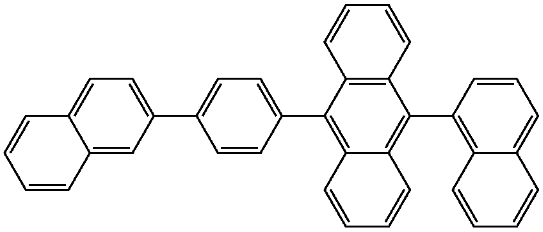
-continued
BD-1
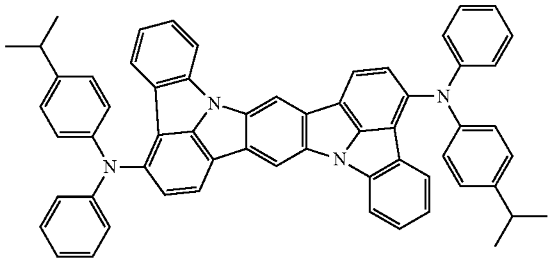
aET-1
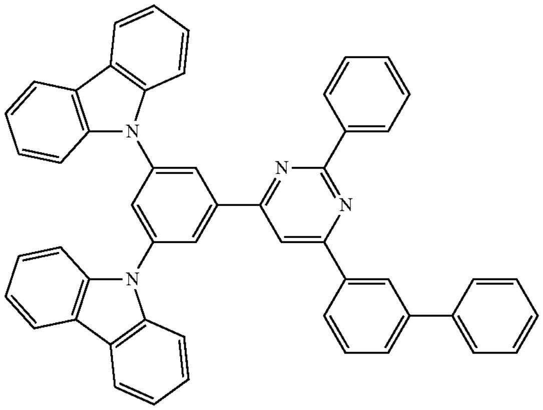
bET-1
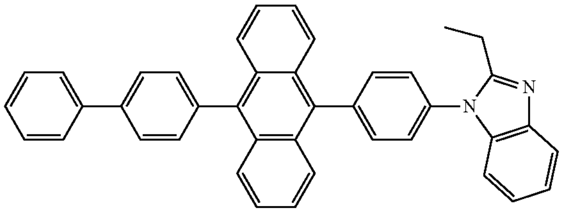
[Formula 226]
HIL-2
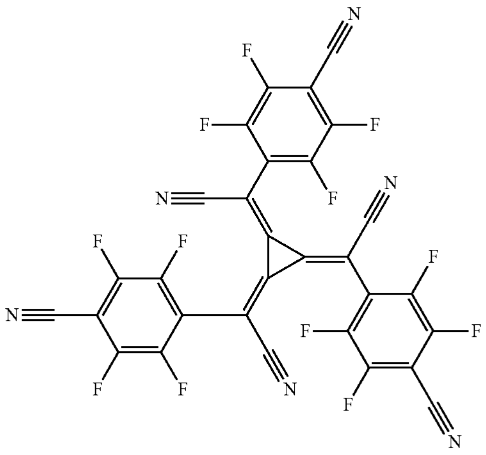

-continued

HTL-2

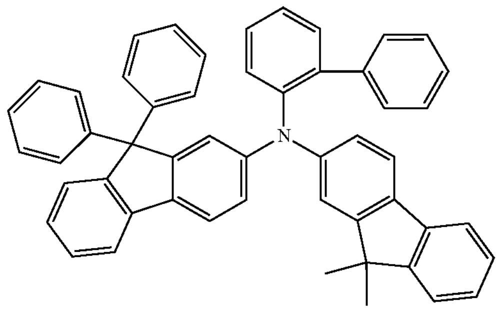

EBL-2

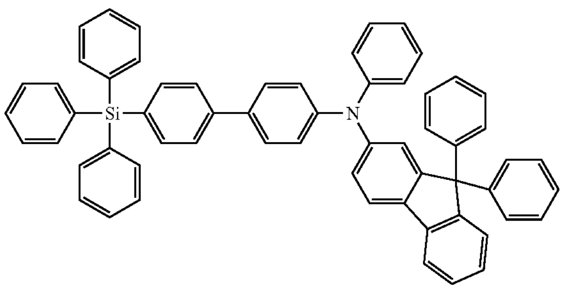

BH2-3

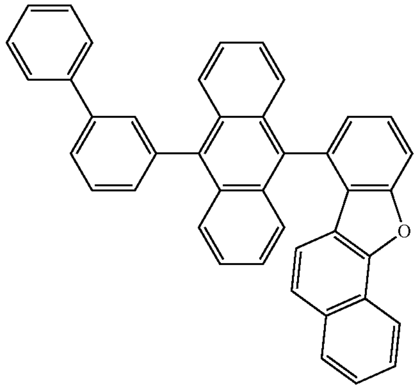

BD-2

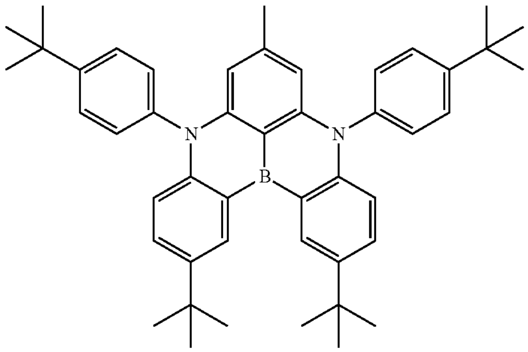

-continued aET-2

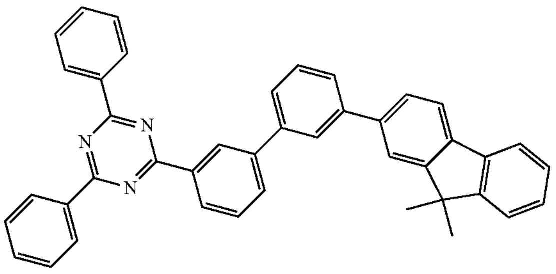

bET-2

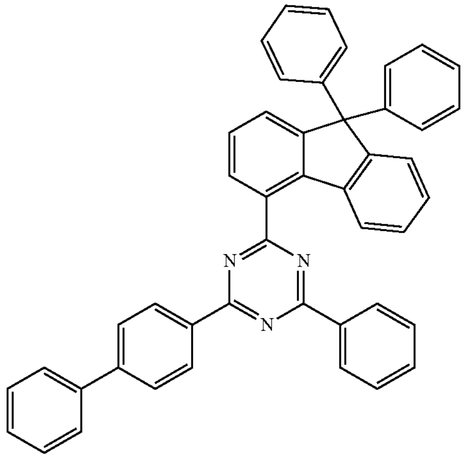

Production of Organic EL Device

The organic EL devices were produced and evaluated as follows.

Example 1

A glass substrate (size: 25 mm×75 mm×1.1 mm thick, produced by Geomatec Co., Ltd.) having an ITO transparent electrode (anode) was ultrasonic-cleaned in isopropyl alcohol for five minutes, and then UV-ozone-cleaned for 30 minutes. The film thickness of the ITO transparent electrode was 130 nm.

After the glass substrate having the transparent electrode line was cleaned, the glass substrate was mounted on a substrate holder of a vacuum deposition apparatus. Firstly, a compound HIL-1 was vapor-deposited on a surface of the glass substrate where the transparent electrode line was provided in a manner to cover the transparent electrode, thereby forming a 5-nm-thick hole injecting layer.

After forming the hole injecting layer, a compound HTL-1 was vapor-deposited on the hole injecting layer to form an 80-nm-thick first hole transporting layer.

After forming the first hole transporting layer, a compound EBL-1 was vapor-deposited on the first hole transporting layer to form a 10-nm-thick second hole transporting layer (also referred to as an electron blocking layer (EBL)).

A compound BH1-1 (first host material) and a compound BD-1 (first luminescent compound) were co-deposited on the second hole transporting layer such that the ratio of the compound BD-1 accounted for 2 mass %, thereby forming a 12.5-nm-thick first emitting layer.

A compound BH-2 (second host material) and the compound BD-1 (second luminescent compound) were co-deposited on the first emitting layer such that the ratio of the compound BD-1 accounted for 2 mass %, thereby forming a 12.5-nm-thick second emitting layer. A ratio $D_{EM1}/D_{EM2}$ of the film thickness of the first emitting layer $D_{EM1}$ to the film thickness of the second emitting layer $D_{EM2}$ was 12.5 nm/12.5 nm=1.

A compound aET-1 was vapor-deposited on the second emitting layer to form a 10-nm-thick first electron transporting layer (also referred to as a hole blocking layer (HBL)).

A compound bET-1 was vapor-deposited on the first electron transporting layer to form a 15-nm-thick second electron transporting layer.

LiF was vapor-deposited on the second electron transporting layer to form a 1-nm-thick electron injecting layer.

Metal (Al) was vapor-deposited on the electron injecting layer to form an 80-nm-thick cathode.

A device arrangement of the organic EL device in Example 1 is roughly shown as follows.

ITO (130)/HIL-1 (5)/HTL-1 (80)/EBL-1 (10)/BH1-1: BD-1 (12.5, 98%:2%)/BH-2:BD-1 (12.5, 98%:2%)/ aET-1 (10)/bET-1 (15)/LiF (1)/Al (80)

In the device arrangement roughly described above, numerals in parentheses represent a film thickness (unit: nm). The numerals (98%:2%) represented by percentage in the same parentheses indicate a ratio (mass %) between the host material (compound BH1-1 or BH-2) and the luminescent compound (compound BD-1) in the first emitting layer or the second emitting layer. Similar notations apply to the description below.

Examples 2 to 6

Organic EL devices in Examples 2 to 6 were each produced in the same manner as the organic EL device in Example 1 except that the compound BH1-1 as the first host material used for forming the first emitting layer was replaced with compounds shown in Table 1.

Comparative 1

An organic EL device in Comparative 1 was produced in the same manner as the organic EL device in Example 1 except that the compound BH1-1 as the first host material used for forming the first emitting layer was replaced with a compound shown in Table 1.

Comparative 2

An organic EL device in Comparative 2 was produced in the same manner as the organic EL device in Example 1 except that a 25-nm thick second emitting layer was formed on the second hole transporting layer without forming the first emitting layer thereon.

Example 7

A glass substrate (size: 25 mm×75 mm×1.1 mm thick, produced by Geomatec Co., Ltd.) having an ITO transparent electrode (anode) was ultrasonic-cleaned in isopropyl alcohol for five minutes, and then UV-ozone-cleaned for 30 minutes. The film thickness of the ITO transparent electrode was 130 nm.

After the glass substrate having the transparent electrode line was cleaned, the glass substrate was mounted on a substrate holder of a vacuum deposition apparatus. Firstly, a compound HTL-2 and a compound HIL-2 were co-deposited on a surface of the glass substrate where the transparent electrode line was provided in a manner to cover the transparent electrode, thereby forming a 10-nm-thick hole injecting layer. The ratios of the compound HTL-2 and the compound HIL-2 in the hole injecting layer were 90 mass % and 10 mass %, respectively.

After forming the hole injecting layer, the compound HTL-2 was vapor-deposited thereon to form an 85-nm-thick first hole transporting layer.

After forming the first hole transporting layer, a compound EBL-2 was vapor-deposited thereon to form a 5-nm-thick second hole transporting layer (also referred to as an electron blocking layer (EBL)).

A compound BH1-1 (first host material) and a compound BD-2 (first luminescent compound) were co-deposited on the second hole transporting layer such that the ratio of the compound BD-2 accounted for 2 mass %, thereby forming a 10-nm-thick first emitting layer.

A compound BH2-3 (second host material) and the compound BD-2 (second luminescent compound) were co-deposited on the first emitting layer such that the ratio of the compound BD-2 accounted for 2 mass %, thereby forming a 10-nm-thick second emitting layer. A ratio $D_{EM1}/D_{EM2}$ of the film thickness of the first emitting layer $D_{EM1}$ to the film thickness of the second emitting layer $D_{EM2}$ was 10 nm/10 nm=1.

A compound aET-2 was vapor-deposited on the second emitting layer to form a 5-nm-thick first electron transporting layer (occasionally also referred to as a hole blocking layer (HBL)).

A compound bET-2 and Liq were co-deposited on the first electron transporting layer to form a 25-nm-thick second electron transporting layer. The ratios of the compound bET-2 and the compound Liq in the second electron transporting layer were each 50 mass %. Liq is an abbreviation of (8-quinolinolato)lithium ((8-Quinolinolato)lithium).

Liq was vapor-deposited on the second electron transporting layer to form a 1-nm-thick electron injecting layer.

Metal (Al) was vapor-deposited on the electron injecting layer to form an 80-nm-thick cathode.

A device arrangement of the organic EL device in Example 7 is roughly shown as follows.

ITO (130)/HTL-2:HIL-2 (10, 90%:10%)/HTL-2 (85)/ EBL-2 (5)/BH1-1:BD-2 (10, 98%:2%)/BH2-3:BD-2 (10, 98%:2%)/aET-2 (5)/bET-2:Liq (25, 50%:50%)/Liq (1)/Al (80)

Examples 8 to 12

Organic EL devices in Examples 8 to 12 were each produced in the same manner as the organic EL device in Example 7 except that the compound BH1-1 as the first host material used for forming the first emitting layer was replaced with compounds shown in Table 2.

Comparative 3

An organic EL device in Comparative 3 was produced in the same manner as the organic EL device in Example 7 except that the compound BH1-1 as the first host material used for forming the first emitting layer was replaced with a compound shown in Table 2.

Comparative 4

An organic EL device in Comparative 4 was produced in the same manner as the organic EL device in Example 7 except that a 20-nm thick second emitting layer was formed on the second hole transporting layer without forming the first emitting layer thereon.

Example 13

An organic EL device in Examples 13 was produced in the same manner as the organic EL device in Example 1 except that the compound BH1-1 as the first host material used for forming the first emitting layer was replaced with a compound shown in Table 3.

Evaluation of Organic EL Devices

The organic EL devices produced were evaluated as follows. Tables 1, 2, and 3 show evaluation results. Tables 1, 2, and 3 also show the singlet energy $S_1$ and the triplet energy $T_1$ of the compounds used in the emitting layers in each Example.

Drive Voltage

The voltage (unit: V) was measured when electric current was applied to between the anode and the cathode of each organic EL device so that the current density was 10 mA/cm$^2$.

External Quantum Efficiency EQE

Voltage was applied to each organic EL device such that a current density was 10 mA/cm$^2$, where spectral radiance spectrum was measured with a spectroradiometer CS-2000 (produced by Konica Minolta, Inc.). The external quantum efficiency EQE (unit: %) was calculated based on the obtained spectral radiance spectra, assuming that the spectra was provided under a Lambertian radiation.

TABLE 1

| | First emitting layer | | | | | | | Second emitting layer | | | | | Device evaluation | |
|---|---|---|---|---|---|---|---|---|---|---|---|---|---|---|
| | First host material | | | First luminescent compound | | | Film thickness [nm] | Second host material | | | Second luminescent compound Name | Film thickness [nm] | Drive voltage [V] | EQE [%] |
| | Name | $S_1$ [eV] | $T_1$ [eV] | Name | $S_1$ [eV] | $T_1$ [eV] | | Name | $S_1$ [eV] | $T_1$ [eV] | | | | |
| Ex. 1 | BH1-1 | 3.15 | 2.10 | BD-1 | 2.73 | 2.29 | 12.5 | BD-2 | 3.01 | 1.87 | BD-1 | 12.5 | 3.26 | 10.5 |
| Ex. 2 | BH1-2 | 3.16 | 2.10 | BD-1 | 2.73 | 2.29 | 12.5 | BD-2 | 3.01 | 1.87 | BD-1 | 12.5 | 3.29 | 10.2 |
| Ex. 3 | BH1-3 | 3.08 | 2.10 | BD-1 | 2.73 | 2.29 | 12.5 | BD-2 | 3.01 | 1.87 | BD-1 | 12.5 | 3.34 | 11.0 |
| Ex. 4 | BH1-4 | 3.12 | 2.08 | BD-1 | 2.73 | 2.29 | 12.5 | BD-2 | 3.01 | 1.87 | BD-1 | 12.5 | 3.25 | 10.7 |
| Ex. 5 | BH1-5 | 3.11 | 2.08 | BD-1 | 2.73 | 2.29 | 12.5 | BD-2 | 3.01 | 1.87 | BD-1 | 12.5 | 3.19 | 10.8 |
| Ex. 6 | BH1-6 | 3.14 | 2.10 | BD-1 | 2.73 | 2.29 | 12.5 | BD-2 | 3.01 | 1.87 | BD-1 | 12.5 | 3.31 | 10.3 |
| Comp. 1 | BH-R1 | 3.13 | 2.09 | BD-1 | 2.73 | 2.29 | 12.5 | BD-2 | 3.01 | 1.87 | BD-1 | 12.5 | 3.35 | 9.8 |
| Comp. 2 | — | — | — | — | — | — | — | BD-2 | 3.01 | 1.87 | BD-1 | 25 | 3.54 | 10.0 |

The organic EL devices in Examples 1 to 6 exhibited the lower drive voltage and the higher luminous efficiency than the organic EL devices in Comparatives 1 and 2.

TABLE 2

| | First emitting layer | | | | | | | Second emitting layer | | | | | Device evaluation | |
|---|---|---|---|---|---|---|---|---|---|---|---|---|---|---|
| | First host material | | | First luminescent compound | | | Film thickness [nm] | Second host material | | | Second luminescent compound Name | Film thickness [nm] | Drive voltage [V] | EQE [%] |
| | Name | $S_1$ [eV] | $T_1$ [eV] | Name | $S_1$ [eV] | $T_1$ [eV] | | Name | $S_1$ [eV] | $T_1$ [eV] | | | | |
| Ex. 7 | BH1-1 | 3.15 | 2.10 | BD-2 | 2.71 | 2.64 | 10 | BH2-3 | 3.01 | 1.79 | BD-2 | 10 | 3.11 | 9.9 |
| Ex. 8 | BH1-2 | 3.16 | 2.10 | BD-2 | 2.71 | 2.64 | 10 | BH2-3 | 3.01 | 1.79 | BD-2 | 10 | 3.14 | 9.5 |
| Ex. 9 | BH1-3 | 3.08 | 2.10 | BD-2 | 2.71 | 2.64 | 10 | BH2-3 | 3.01 | 1.79 | BD-2 | 10 | 3.19 | 10.1 |
| Ex. 10 | BH1-4 | 3.12 | 2.08 | BD-2 | 2.71 | 2.64 | 10 | BH2-3 | 3.01 | 1.79 | BD-2 | 10 | 3.03 | 9.4 |
| Ex. 11 | BH1-5 | 3.11 | 2.08 | BD-2 | 2.71 | 2.64 | 10 | BH2-3 | 3.01 | 1.79 | BD-2 | 10 | 3.13 | 9.4 |
| Ex. 12 | BH1-6 | 3.14 | 2.10 | BD-2 | 2.71 | 2.64 | 10 | BH2-3 | 3.01 | 1.79 | BD-2 | 10 | 3.18 | 10.6 |
| Comp. 3 | BH-R1 | 3.13 | 2.09 | BD-2 | 2.71 | 2.64 | 10 | BH2-3 | 3.01 | 1.79 | BD-2 | 10 | 3.21 | 9.0 |
| Comp. 4 | — | — | — | — | — | — | — | BH2-3 | 3.01 | 1.79 | BD-2 | 20 | 3.21 | 9.2 |

The organic EL devices in Examples 1 to 12 exhibited the lower drive voltage and the higher luminous efficiency than the organic EL devices in Comparatives 3 and 4.

TABLE 3

| | First emitting layer | | | | | | | Second emitting layer | | | | | | |
|---|---|---|---|---|---|---|---|---|---|---|---|---|---|---|
| | First host material | | | First luminescent compound | | | Film | Second host material | | | Second luminescent | Film thick- | Device evaluation | |
| | Name | S1 [eV] | T1 [eV] | Name | S1 [eV] | T1 [eV] | thickness [nm] | Name | S1 [eV] | T1 [eV] | compound Name | ness [nm] | Drive voltage [V] | EQE [%] |
| Ex. 13 | BH1-7 | 3.14 | 2.10 | BD-1 | 2.73 | 2.29 | 12.5 | BH-2 | 3.01 | 1.87 | BD-1 | 12.5 | 3.20 | 10.2 |
| Comp. 1 (re-shown) | BH-R1 | 3.13 | 2.09 | BD-1 | 2.73 | 2.29 | 12.5 | BH-2 | 3.01 | 1.87 | BD-1 | 12.5 | 3.35 | 9.8 |
| Comp. 2 (re-shown) | — | — | — | — | — | — | — | BH-2 | 3.01 | 1.87 | BD-1 | 25 | 3.54 | 10.0 |

The organic EL device in Example 13 exhibited the lower drive voltage and the higher luminous efficiency than the organic EL devices in Comparatives 1 and 2.

Evaluation of Compounds

Triplet Energy $T_1$

A measurement target compound was dissolved in EPA (diethylether:isopentane:ethanol=5:5:2 in volume ratio) at a concentration of 10 μmol/L, and the obtained solution was put in a quartz cell to provide a measurement sample. A phosphorescence spectrum (ordinate axis: phosphorescent luminous intensity, abscissa axis: wavelength) of the measurement sample was measured at a low temperature (77K). A tangent was drawn to the rise of the phosphorescence spectrum close to the short-wavelength region. An energy amount was calculated by a conversion equation (F1) below on a basis of a wavelength value $\lambda_{edge}$ [nm] at an intersection of the tangent and the abscissa axis. The calculated energy amount was defined as triplet energy $T_1$. It should be noted that the triplet energy $T_1$ may have an error of about plus or minus 0.02 eV depending on measurement conditions.

$$T_1\ [\text{eV}]=1239.85/\lambda_{edge} \qquad \text{Conversion Equation (F1):}$$

The tangent to the rise of the phosphorescence spectrum close to the short-wavelength region is drawn as follows. While moving on a curve of the phosphorescence spectrum from the short-wavelength region to the local maximum value closest to the short-wavelength region among the local maximum values of the phosphorescence spectrum, a tangent is checked at each point on the curve toward the long-wavelength of the phosphorescence spectrum. An inclination of the tangent is increased along the rise of the curve (i.e., a value of the ordinate axis is increased). A tangent drawn at a point of the local maximum inclination (i.e., a tangent at an inflection point) is defined as the tangent to the rise of the phosphorescence spectrum close to the short-wavelength region.

A local maximum point where a peak intensity is 15% or less of the maximum peak intensity of the spectrum is not counted as the above-mentioned local maximum peak intensity closest to the short-wavelength region. The tangent drawn at a point that is closest to the local maximum peak intensity closest to the short-wavelength region and where the inclination of the curve is the local maximum is defined as a tangent to the rise of the phosphorescence spectrum close to the short-wavelength region.

For phosphorescence measurement, a spectrophotofluorometer body F-4500 manufactured by Hitachi High-Technologies Corporation was used.

Singlet Energy $S_1$

A toluene solution of a measurement target compound at a concentration of 10 μmol/L was prepared and put in a quartz cell. An absorption spectrum (ordinate axis: absorption intensity, abscissa axis: wavelength) of the thus-obtained sample was measured at a normal temperature (300K). A tangent was drawn to the fall of the absorption spectrum close to the long-wavelength region, and a wavelength value $\lambda_{edge}$ (nm) at an intersection of the tangent and the abscissa axis was assigned to a conversion equation (F2) below to calculate singlet energy.

$$S_1\,[\text{eV}] = 1239.85/\lambda_{edge} \qquad \text{Conversion Equation (F2)}$$

A spectrophotometer (U3310 manufactured by Hitachi, Ltd.) was used for measuring absorption spectrum.

The tangent to the fall of the absorption spectrum close to the long-wavelength region is drawn as follows. While moving on a curve of the absorption spectrum from the local maximum value closest to the long-wavelength region, among the local maximum values of the absorption spectrum, in a long-wavelength direction, a tangent at each point on the curve is checked. An inclination of the tangent is decreased and increased in a repeated manner as the curve falls (i.e., a value of the ordinate axis is decreased). A tangent drawn at a point where the inclination of the curve is the local minimum closest to the long-wavelength region (except when absorbance is 0.1 or less) is defined as the tangent to the fall of the absorption spectrum close to the long-wavelength region.

The local maximum absorbance of 0.2 or less is not counted as the above-mentioned local maximum absorbance closest to the long-wavelength region.

Measurement of Maximum Fluorescence Peak Wavelength (FL-Peak)

A measurement target compound was dissolved in toluene at a concentration of $4.9\times10^{-6}$ mol/L to prepare a toluene solution. Using a fluorescence spectrometer (spectrophotofluorometer F-7000 produced by Hitachi High-Tech Science Corporation), the toluene solution of the measurement target compound was excited at 390 nm, where a maximum fluorescence peak wavelength λ (unit: nm) was measured.

The maximum fluorescence peak wavelength λ of the compound BD-1 was 453 nm.

The maximum fluorescence peak wavelength λ of the compound BD-2 was 455 nm.

Synthesis Examples

Synthesis Example 1: Synthesis of BH1-1

[Formula 227]

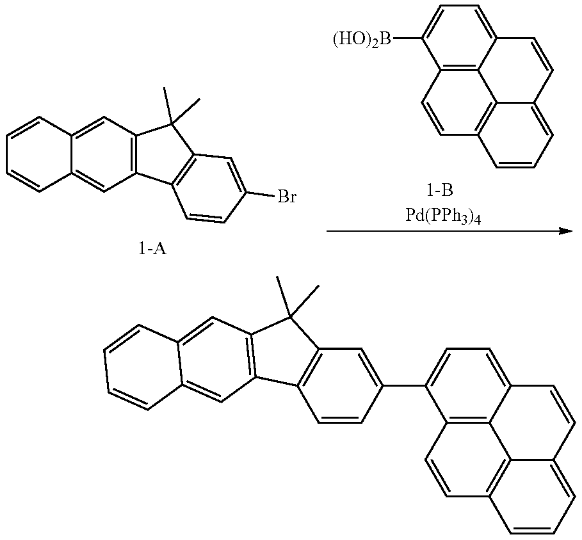

1-A

BH1-1

Under an argon atmosphere, 7.0 g (21.6 mmol) of a compound 1-A, 5.9 g (23.8 mmol) of a compound 1-B, 2.31 g (2.00 mmol) of tetrakis(triphenylphosphine)palladium(0), 5.3 g (100 mmol) of sodium carbonate, 186 ml of 1,4-dioxane, and 31 ml of purified water were put into a flask and heated at 85 degrees C. for eight hours with stirring. After heating with stirring, the obtained solution in the flask was cooled to a room temperature (25 degrees C.). 300 ml of water was added into the flask. The deposited solid was collected by filtration. Subsequently, the obtained solid was purified by silica gel column chromatography to obtain 4.2 g (yield of 44%) of a white solid. The white solid was identified as a compound BH1-1 by analysis according to Liquid Chromatography-Mass spectrometry (LC-MS). In the reaction scheme, tetrakis(triphenylphosphine)palladium (0) is abbreviated as "$Pd(PPh_3)_4$."

Synthesis Example 2: Synthesis of BH1-2

[Formula 228]

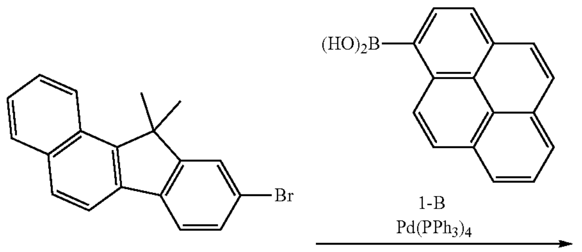

1-C

-continued

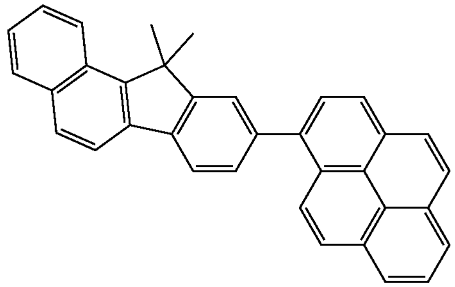

BH1-2

Synthesis Example 2 was performed in the same manner as in Synthesis Example 1 except for using a compound 1-C in place of the compound 1-A in the synthesis of the compound BH1-1 to obtain 1.9 g (yield of 69%) of a white solid.

The white solid was identified as a compound BH1-2 by analysis according to LC-MS.

Synthesis Example 3: Synthesis of BH1-3

[Formula 229]

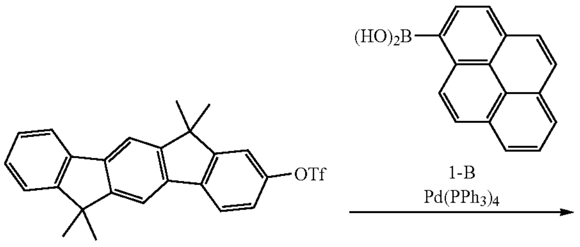

1-D

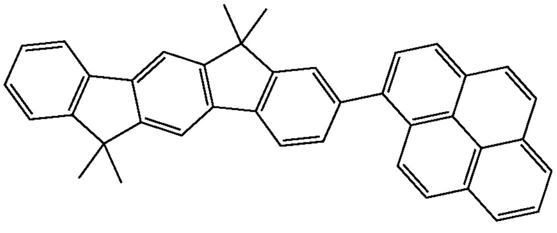

BH1-3

Synthesis Example 3 was performed in the same manner as in Synthesis Example 1 except for using a compound 1-D in place of the compound 1-A in the synthesis of the compound BH1-1 to obtain 2.3 g (yield of 69%) of a white solid.

The white solid was identified as a compound BH1-3 by analysis according to LC-MS.

Synthesis Example 4: Synthesis of BH1-4

[Formula 230]

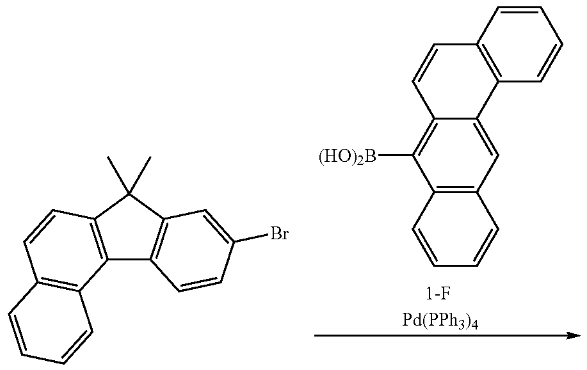

1-E

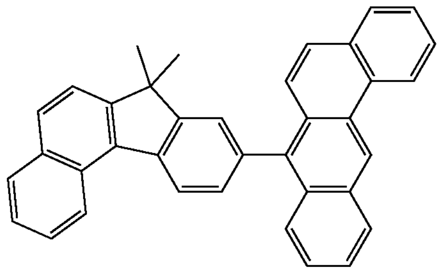

BH1-4

Synthesis Example 4 was performed in the same manner as in Synthesis Example 1 except for using a compound 1-E and a compound 1-F in place of the compound 1-A and the compound 1-B in the synthesis of the compound BH1-1 to obtain 3.9 g (yield of 89%) of a white solid.

The white solid was identified as a compound BH1-4 by analysis according to LC-MS.

Synthesis Example 5: Synthesis of BH1-5

[Formula 231]

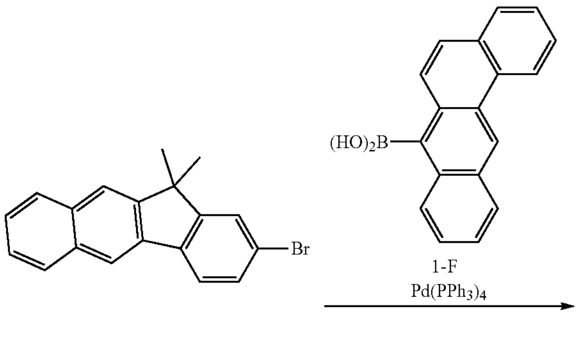

1-A

-continued

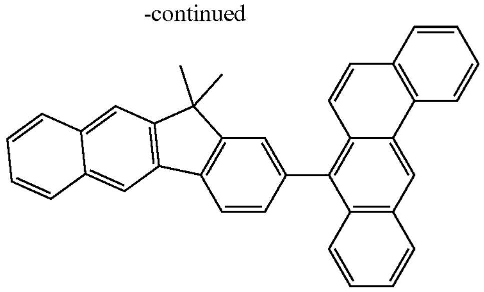

BH1-5

Synthesis Example 5 was performed in the same manner as in Synthesis Example 1 except for using the compound 1-F in place of the compound 1-B in the synthesis of the compound BH1-1 to obtain 2.7 g (yield of 92%) of a white solid.

The white solid was identified as a compound BH1-5 by analysis according to LC-MS.

Synthesis Example 6: Synthesis of BH1-6

[Formula 232]

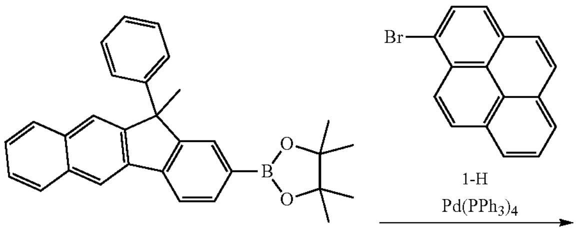

1-G

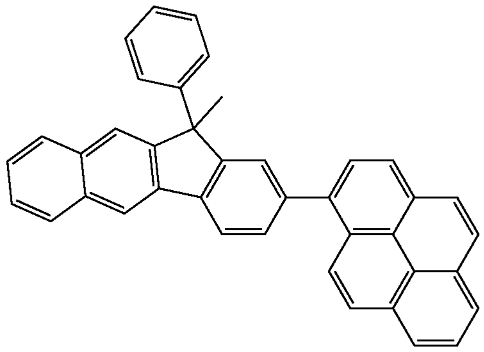

BH1-6

Synthesis Example 6 was performed in the same manner as in Synthesis Example 1 except for using a compound 1-G and a compound 1-H in place of the compound 1-A and the compound 1-B in the synthesis of the compound BH1-1 to obtain 0.9 g (yield of 37%) of a white solid.

The white solid was identified as a compound BH1-6 by analysis according to LC-MS.

Synthesis Example 7: Synthesis of BH1-7

[Formula 233]

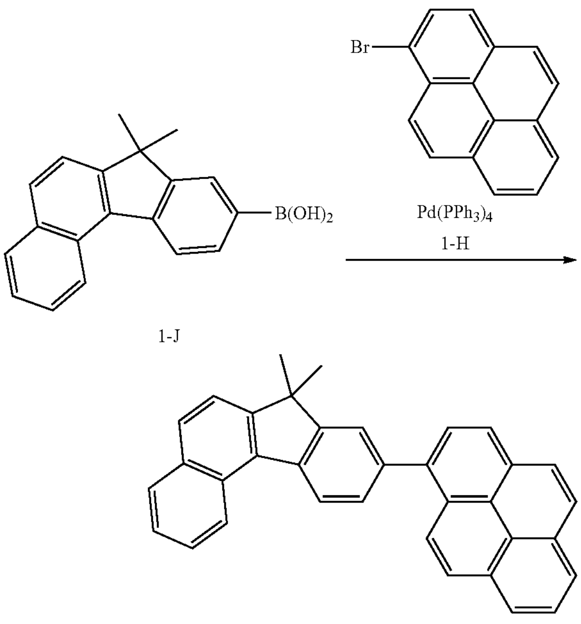

1-J

BH1-7

Synthesis Example 7 was performed in the same manner as in Synthesis Example 1 except for using a compound 1-J and a compound 1-H in place of the compound 1-A and the compound 1-B in the synthesis of the compound BH1-1 to obtain 1.3 g (yield of 47%) of a white solid.

The white solid was identified as a compound BH1-7 by analysis according to LC-MS.

The invention claimed is:

1. An organic electroluminescence device comprising:

an anode;

a cathode; and an emitting region provided between the anode and the cathode, wherein the emitting region comprises a first emitting layer and a second emitting layer, a ratio $D_{EM1}/D_{EM2}$ of a film thickness of the first emitting layer $D_{EM1}$ to a film thickness of the second emitting layer $D_{EM2}$ is in a range from 0.75 to 1.25, the first emitting layer comprises a first host material and a first luminescent compound, the second emitting layer comprises a second host material and a second luminescent compound, the first host material is a compound represented by a formula selected from the group consisting of formula (102), formula (102A), formula (104), formula (105), formula (106), and formula (107), the first host material and the second host material are mutually different, and the first luminescent compound and the second luminescent compound are mutually the same or different, (102)

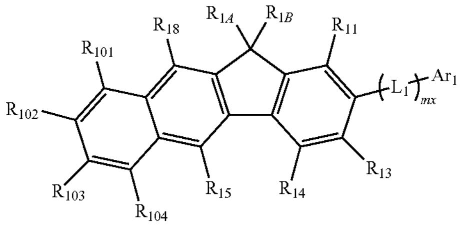

(102A)

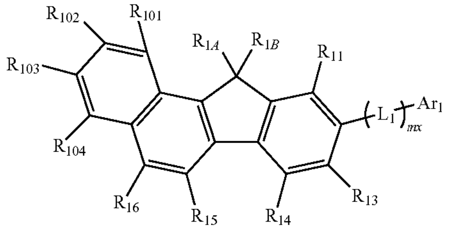

(104)

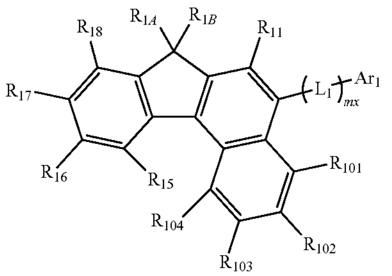

(105)

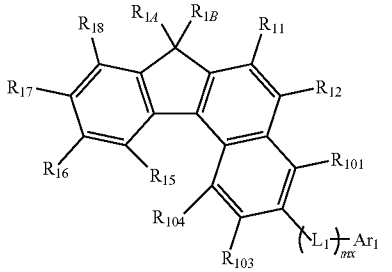

(106)

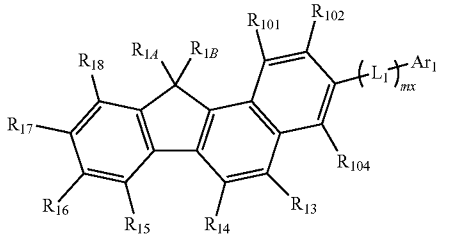

(107)

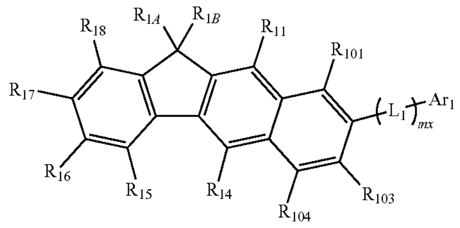

where, in the formula (102), the formula (102A), the formula (104), the formula (105), the formula (106), and the formula (107):

$R_{1A}$ and $R_{1B}$ are each independently a substituted or unsubstituted alkyl group having 1 to 6 carbon atoms, or a substituted or unsubstituted aryl group having 6 to 14 ring carbon atoms;

at least one of $R_{1A}$ or $R_{1B}$ is a substituted or unsubstituted alkyl group having 1 to 6 carbon atoms;

a combination of adjacent $R_{11}$ and $R_{12}$, a combination of adjacent $R_{13}$ and $R_{14}$ and combinations of adjacent two or more of $R_{15}$ to $R_{18}$ are not mutually bonded;

$R_{11}$ to $R_{18}$ and $R_{101}$ to $R_{104}$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a group represented by —N($R_{906}$)($R_{907}$), a substituted or unsubstituted aralkyl group having 7 to 50 carbon atoms, a group represented by —C(=O)$R_{801}$, a group represented by —COO$R_{802}$, a halogen atom, a cyano group, a nitro group, a substituted or unsubstituted aryl group having 6 to 17 ring carbon atoms, or a substituted or unsubstituted heterocyclic group having 5 to 17 ring atoms;

$Ar_1$ is a substituted or unsubstituted aryl group having four or more fused rings or a substituted or unsubstituted heterocyclic group having four or more fused rings;

$L_1$ is a single bond, a substituted or unsubstituted arylene group having 6 to 17 ring carbon atoms, or a substituted or unsubstituted divalent heterocyclic group having 5 to 17 ring atoms;

mx is 0;

the first host material does not have, in a molecule, three or more groups of a substituted or unsubstituted aryl group having four or more fused rings and a substituted or unsubstituted heterocyclic group having four or more fused rings, in the first host material, $R_{901}$, $R_{902}$, $R_{903}$, $R_{904}$, $R_{905}$, $R_{906}$, $R_{907}$, $R_{801}$ and $R_{802}$ are each independently a hydrogen atom, a substituted or unsubstituted alkyl group having 1 to 50 carbon atoms, a substituted or unsubstituted cycloalkyl group having 3 to 50 ring carbon atoms, a substituted or unsubstituted aryl group having 6 to 17 ring carbon atoms, or a substituted or unsubstituted heterocyclic group having 5 to 17 ring atoms, when a plurality of $R_{901}$ are present, the plurality of $R_{901}$ are mutually the same or different;

when a plurality of $R_{902}$ are present, the plurality of $R_{902}$ are mutually the same or different;

when a plurality of $R_{903}$ are present, the plurality of $R_{903}$ are mutually the same or different;

when a plurality of $R_{904}$ are present, the plurality of $R_{904}$ are mutually the same or different;

when a plurality of $R_{905}$ are present, the plurality of $R_{905}$ are mutually the same or different;

when a plurality of $R_{906}$ are present, the plurality of $R_{906}$ are mutually the same or different;

when a plurality of $R_{907}$ are present, the plurality of $R_{907}$ are mutually the same or different;

when a plurality of $R_{801}$ are present, the plurality of $R_{801}$ are mutually the same or different; and when a plurality of $R_{802}$ are present, the plurality of $R_{802}$ are mutually the same or different.

2. The organic electroluminescence device according to claim 1, wherein $R_{1A}$ and $R_{1B}$ are each independently a substituted or unsubstituted alkyl group having 1 to 6 carbon atoms.

3. The organic electroluminescence device according to claim 1, wherein the first host material is a compound represented by the formula (102) or the formula (102A).

4. The organic electroluminescence device according to claim 3, wherein the first host material is a compound represented by a formula (103) or (103A)

(103)

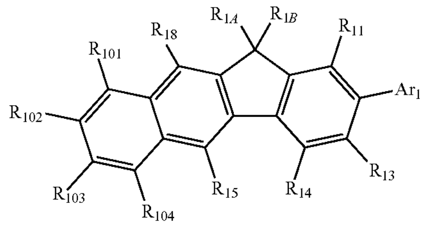

(103A)

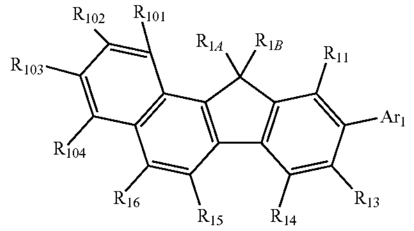

where: in the formula (103) or the formula (103A):

$R_{1A}$, $R_{1B}$, $R_{11}$, $R_{13}$, $R_{14}$, $R_{15}$, $R_{16}$, $R_{17}$, and $R_{18}$ respectively represent the same as $R_{1A}$, $R_{1B}$, $R_{11}$, $R_{13}$, $R_{14}$, $R_{15}$, $R_{16}$, $R_{17}$, and $R_{18}$ in the formula (102) or the formula (102A);

$R_{101}$ to $R_{104}$ each represent the same as $R_{101}$ to $R_{104}$ in the formula (102) or the formula (102A); and $Ar_1$ represents the same as $Ar_1$ in the formula (102) or the formula (102A).

5. The organic electroluminescence device according to claim 4, wherein the first host material is a compound represented by a formula (103C) below, (103C)

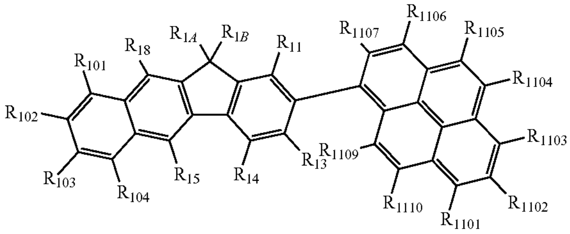

where, in the formula (103C):

$R_{1A}$, $R_{1B}$, $R_{11}$, $R_{13}$, $R_{14}$, $R_{15}$, and $R_{18}$ respectively represent the same as $R_{1A}$, $R_{1B}$, $R_{11}$, $R_{13}$, $R_{14}$, $R_{15}$, and $R_{18}$ in the formula (102);

$R_{101}$ to $R_{104}$ each represent the same as $R_{101}$ to $R_{104}$ in the formula (102); and $R_{1101}$ to $R_{1107}$, $R_{1109}$, and $R_{1110}$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —$Si(R_{901})(R_{902})(R_{903})$, a group represented by —O—$(R_{904})$, a group represented by —S—$(R_{905})$, a group represented by —$N(R_{906})(R_{907})$, a substituted or unsubstituted aralkyl group having 7 to 50 carbon atoms, a group represented by —C(═O)$R_{801}$, a group represented by —$COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

6. The organic electroluminescence device according to claim 1, wherein $Ar_1$ is a group represented by a formula (110) or (120) below, (110)

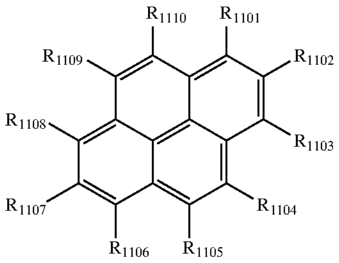

where: in the formula (110): one of $R_{1101}$ to $R_{1110}$ is a bonding position to $L_1$; and $R_{1101}$ to $R_{1110}$ not being the bonding position to $L_1$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —$Si(R_{901})(R_{902})(R_{903})$, a group represented by —O—$(R_{904})$, a group represented by —S—$(R_{905})$, a group represented by —$N(R_{906})(R_{907})$, a substituted or unsubstituted aralkyl group having 7 to 50 carbon atoms, a group represented by —C(═O)$R_{801}$, a group represented by —$COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms, (120)

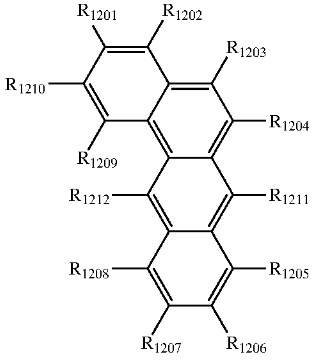

where: in the formula (120): one of $R_{1201}$ to $R_{1212}$ is a bonding position to $L_1$; and $R_{1201}$ to $R_{1212}$ not being the bonding position to $L_1$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —$Si(R_{901})(R_{902})(R_{903})$, a group represented by —O—$(R_{904})$, a group represented by —S—$(R_{905})$, a group represented by —$N(R_{906})(R_{907})$, a substituted or unsubstituted aralkyl group having 7 to 50 carbon atoms, a group represented by —C(═O)$R_{801}$, a group represented by —$COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

7. The organic electroluminescence device according to claim 1, wherein a triplet energy of the first host material $T_1(H1)$ and a triplet energy of the second host material $T_1(H2)$ satisfy a relationship of a numerical formula (Numerical Formula 1) below, $$T_1(H1) > T_1(H2). \quad \text{(Numerical Formula 1)}$$

8. An electronic device comprising the organic electroluminescence device according to claim 1.

9. A compound represented by a formula selected from the group consisting of formula (102), formula (102A), formula (106), and formula (107), (102)

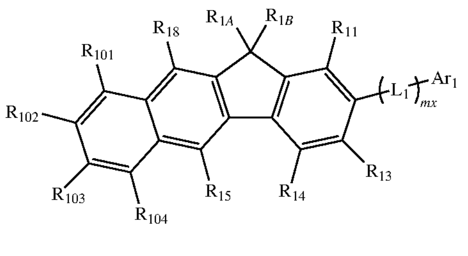

-continued (102A)

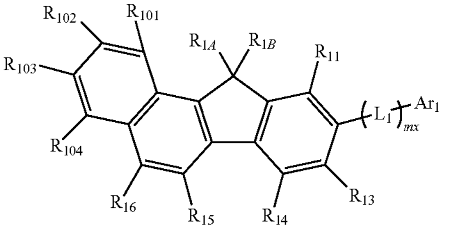

(106)

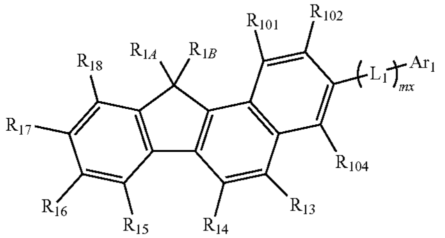

(107)

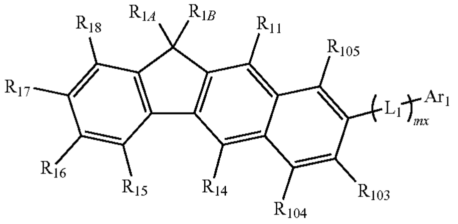

where, in the formula (102), the formula (102A), the formula (106), or the formula (107):

$R_{1A}$ and $R_{1B}$ are each independently a substituted or unsubstituted alkyl group having 1 to 6 carbon atoms, or a substituted or unsubstituted aryl group having 6 to 14 ring carbon atoms, at least one of $R_{1A}$ or $R_{1B}$ is a substituted or unsubstituted alkyl group having 1 to 6 carbon atoms;

a combination of adjacent $R_{13}$ and $R_{14}$ and combinations of adjacent two or more of $R_{15}$ to $R_{18}$ are not mutually bonded;

$R_{11}$, $R_{13}$ to $R_{18}$ and $R_{101}$ to $R_{104}$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a group represented by —N($R_{906}$)($R_{907}$), a substituted or unsubstituted aralkyl group having 7 to 50 carbon atoms, a group represented by —C(=O)$R_{801}$, a group represented by —COO$R_{802}$, a halogen atom, a cyano group, a nitro group, a substituted or unsubstituted aryl group having 6 to 17 ring carbon atoms, or a substituted or unsubstituted heterocyclic group having 5 to 17 ring atoms, $Ar_1$ is an unsubstituted aryl group having four or more fused rings or a substituted or unsubstituted heterocyclic group having four or more fused rings;

$L_1$ is a single bond, a substituted or unsubstituted arylene group having 6 to 17 ring carbon atoms, or a substituted or unsubstituted divalent heterocyclic group having 5 to 17 ring atoms;

mx is 0; and $R_{901}$, $R_{902}$, $R_{903}$, $R_{904}$, $R_{905}$, $R_{906}$, $R_{907}$, $R_{801}$, and $R_{802}$ are each independently a hydrogen atom, a substituted or unsubstituted alkyl group having 1 to 50 carbon atoms, a substituted or unsubstituted cycloalkyl group having 3 to 50 ring carbon atoms, a substituted or unsubstituted aryl group having 6 to 17 ring carbon atoms, or a substituted or unsubstituted heterocyclic group having 5 to 17 ring atoms;

when a plurality of $R_{901}$ are present, the plurality of $R_{901}$ are mutually the same or different;

when a plurality of $R_{902}$ are present, the plurality of $R_{902}$ are mutually the same or different;

when a plurality of $R_{903}$ are present, the plurality of $R_{903}$ are mutually the same or different;

when a plurality of $R_{904}$ are present, the plurality of $R_{904}$ are mutually the same or different;

when a plurality of $R_{905}$ are present, the plurality of $R_{905}$ are mutually the same or different;

when a plurality of $R_{906}$ are present, the plurality of $R_{906}$ are mutually the same or different;

when a plurality of $R_{907}$ are present, the plurality of $R_{907}$ are mutually the same or different;

when a plurality of $R_{801}$ are present, the plurality of $R_{801}$ are mutually the same or different; and when a plurality of $R_{802}$ are present, the plurality of $R_{802}$ are mutually the same or different.

10. The compound according to claim 9, wherein the compound is a compound represented by the formula (102) or a compound represented by the formula (102A).

11. The compound according to claim 9, wherein the compound is a compound represented by a formula (103) or a formula (103A) below, (103)

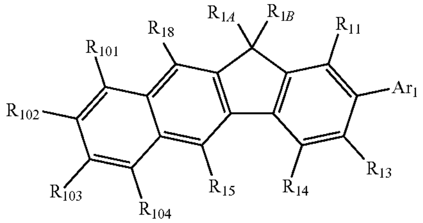

(103A)

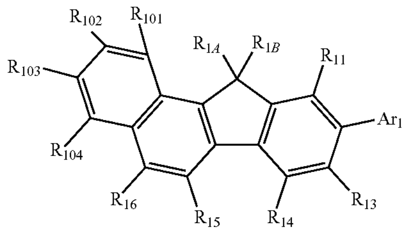

where: in the formulae (103) and (103A):

$R_{1A}$, $R_{1B}$, $R_{11}$, $R_{13}$, $R_{14}$, $R_{15}$, $R_{16}$, and $R_{18}$ respectively represent the same as $R_{1A}$, $R_{1B}$, Ru, $R_{13}$, $R_{14}$, $R_{15}$, $R_{16}$, and $R_{18}$ in the formula (102) or the formula (102A);

$R_{101}$ to $R_{104}$ each represent the same as $R_{101}$ to $R_{104}$ in the formula (102) or the formula (102A); and $Ar_1$ represents the same as $Ar_1$ in the formula (102) or the formula (102A).

12. The compound according to claim 11, wherein the compound is a compound represented by a formula (103C) below, (103C)

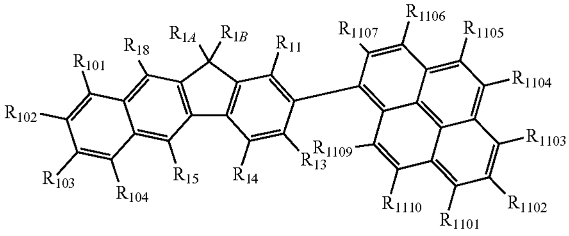

where, in the formula (103C):

$R_{1A}$, $R_{1B}$, $R_{11}$, $R_{13}$, $R_{14}$, $R_{15}$, and $R_{18}$ respectively represent the same as $R_{1A}$, $R_{1B}$, $R_{11}$, $R_{13}$, $R_{14}$, $R_{15}$, and $R_{18}$ in the formula (102);

$R_{101}$ to $R_{104}$ each represent the same as $R_{101}$ to $R_{104}$ in the formula (102); and $R_{1101}$ to $R_{1107}$, $R_{1109}$, and $R_{1110}$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a group represented by —N($R_{906}$)($R_{907}$), a substituted or unsubstituted aralkyl group having 7 to 50 carbon atoms, a group represented by —C(=O)$R_{801}$, a group represented by —COO$R_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

13. The compound according to claim 9, wherein $Ar_1$ is a group represented by a formula (110) or (120) below, (110)

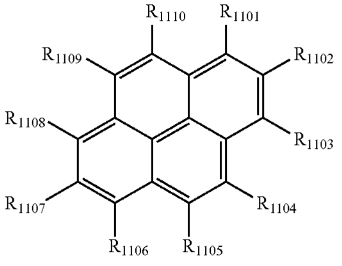

where: in the formula (110): one of $R_{1101}$ to $R_{1110}$ is a bonding position to $L_1$; and $R_{1101}$ to $R_{1110}$ not being the bonding position to $L_1$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a group represented by —N($R_{906}$)($R_{907}$), a substituted or unsubstituted aralkyl group having 7 to 50 carbon atoms, a group represented by —C(=O)$R_{801}$, a group represented by —COO$R_{802}$, a halogen atom, a cyano group, a nitro group, a substituted or unsubstituted aryl group having 6 to 17 ring carbon atoms, or a substituted or unsubstituted heterocyclic group having 5 to 17 ring atoms, (120)

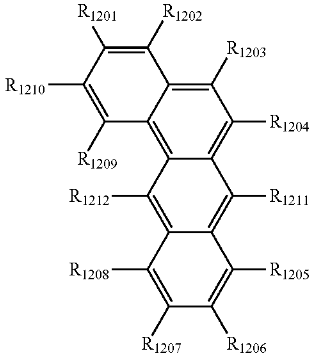

where: in the formula (120): one of $R_{1201}$ to $R_{1212}$ is a bonding position to $L_1$; and $R_{1201}$ to $R_{1212}$ not being the bonding position to $L_1$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by —Si($R_{901}$)($R_{902}$)($R_{903}$), a group represented by —O—($R_{904}$), a group represented by —S—($R_{905}$), a group represented by —N($R_{906}$)($R_{907}$), a substituted or unsubstituted aralkyl group having 7 to 50 carbon atoms, a group represented by —C(=O)$R_{801}$, a group represented by —COO$R_{802}$, a halogen atom, a cyano group, a nitro group, a substituted or unsubstituted aryl group having 6 to 17 ring carbon atoms, or a substituted or unsubstituted heterocyclic group having 5 to 17 ring atoms.

14. The compound according to claim 9, wherein $R_{1A}$ and $R_{1B}$ are each independently a substituted or unsubstituted alkyl group having 1 to 6 carbon atoms.

15. A compound represented by a formula selected from the group consisting of formula (110C), formula (120C), formula (130C), formula (140C), formula (150C), formula (160C) and formula (170C):

-continued (110C)

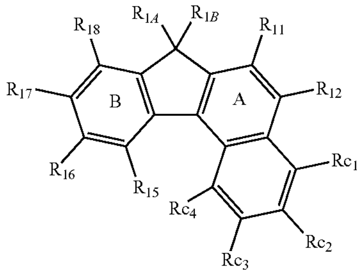

(120C)

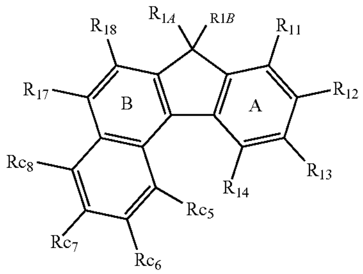

(130C)

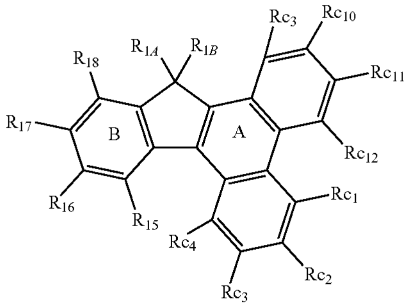

(140C)

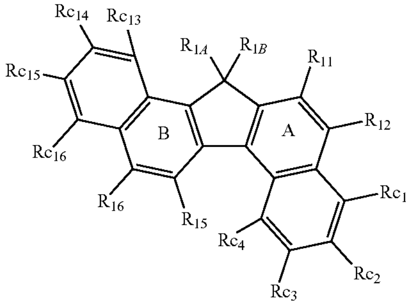

(150C)

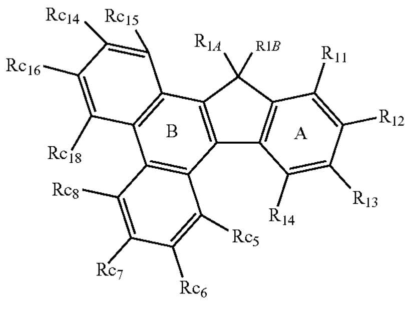

(160C)

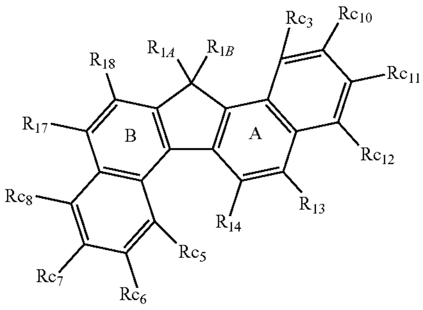

(170C)

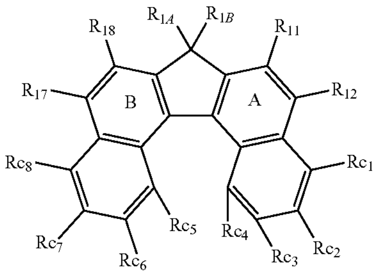

where, in the formula (110C), the formula (120C), the formula (130C), the formula (140C), the formula (150C), the formula (160C) and the formula (170C):

$R_{1A}$ and $R_{1B}$ are each independently a substituted or unsubstituted alkyl group having 1 to 15 carbon atoms, a substituted or unsubstituted aryl group having 6 to 17 ring carbon atoms, or a substituted or unsubstituted heterocyclic group having 5 to 17 ring atoms;

at least one of $R_{1A}$ or $R_{1B}$ is a substituted or unsubstituted alkyl group having 1 to 15 carbon atoms;

$R_{11}$ to $R_{18}$ and $R_{C1}$ to $R_{C16}$ are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by $-Si(R_{901})(R_{902})(R_{903})$, a group represented by $-O-(R_{904})$, a group represented by $-S-(R_{905})$, a group represented by $-N(R_{906})(R_{907})$, a substituted or unsubstituted aralkyl group having 7 to 50 carbon atoms, a group represented by $-C(=O)R_{801}$, a group represented by $-COOR_{802}$, a halogen atom, a cyano group, a nitro group, a substituted or unsubstituted aryl group having 6 to 17 ring carbon atoms, a substituted or unsubstituted heterocyclic group having 5 to 17 ring atoms, or a group represented by a formula (10C),

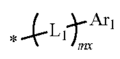

(10C)

in the formula (110C), at least one of $R_{11}$, $R_{12}$ and $Rc_1$ to $Rc_4$ is a group represented by the formula (10C), in the formula (120C), at least one of $R_{17}$, $R_{18}$ and $Rc_5$ to $Rc_8$ is a group represented by formula (10C);

in the formula (130C), (140C), (150C), (160C), or (170C), at least one of $R_{11}$ to $R_{18}$ and $Rc_1$ to $Rc_6$ is a group represented by the formula (10C);

in the formula (1° C.):

$Ar_1$ is a substituted or unsubstituted aryl group having four or more fused rings or a substituted or unsubstituted heterocyclic group having four or more fused rings;

$L_1$ is a single bond, or a substituted or unsubstituted phenylene group;

mx is 0, 1, or 2;

* represents a bonding position; and the compound does not have, in a molecule, three or more groups of a substituted or unsubstituted aryl group having four or more fused rings and a substituted or unsubstituted heterocyclic group having four or more fused rings, $R_{901}$, $R_{902}$, $R_{903}$, $R_{904}$, $R_{905}$, $R_{906}$, $R_{907}$, $R_{801}$ and $R_{802}$ are each independently a hydrogen atom, a substituted or unsubstituted alkyl group having 1 to 50 carbon atoms, a substituted or unsubstituted cycloalkyl group having 3 to 50 ring carbon atoms, a substituted or unsubstituted aryl group having 6 to 17 ring carbon atoms, or a substituted or unsubstituted heterocyclic group having 5 to 17 ring atoms;

when a plurality of $R_{901}$ are present, the plurality of $R_{901}$ are mutually the same or different;

when a plurality of $R_{902}$ are present, the plurality of $R_{902}$ are mutually the same or different;

when a plurality of $R_{903}$ are present, the plurality of $R_{903}$ are mutually the same or different;

when a plurality of $R_{904}$ are present, the plurality of $R_{904}$ are mutually the same or different;

when a plurality of $R_{905}$ are present, the plurality of $R_{905}$ are mutually the same or different;

when a plurality of $R_{906}$ are present, the plurality of $R_{906}$ are mutually the same or different;

when a plurality of $R_{907}$ are present, the plurality of $R_{907}$ are mutually the same or different;

when a plurality of $R_{801}$ are present, the plurality of $R_{801}$ are mutually the same or different; and when a plurality of $R_{802}$ are present, the plurality of $R_{802}$ are mutually the same or different.

16. A compound represented by a formula (1B) below, (1B)

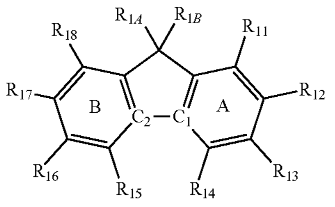

(10B)

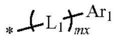

where: in the formula (1B):

$R_{1A}$ and $R_{1B}$ are each independently a substituted or unsubstituted alkyl group having 1 to 6 carbon atoms, or a substituted or unsubstituted aryl group having 6 to 14 ring carbon atoms, at least one of $R_{1A}$ or $R_{1B}$ is a substituted or unsubstituted alkyl group having 1 to 6 carbon atoms;

only one or two combinations selected from combinations of adjacent two or more of $R_{11}$ to $R_{14}$ and combinations of adjacent two or more of $R_{15}$ to $R_{18}$ are mutually bonded to form a substituted or unsubstituted monocyclic ring, or mutually bonded to form a substituted or unsubstituted fused ring;

when a substituted or unsubstituted monocyclic ring or a substituted or unsubstituted fused ring is formed with a ring A, a group represented by the formula (10B) is bonded to a carbon atom bonded to $R_{12}$ or, of carbon atoms forming the monocyclic ring with the ring A and the fused ring with the ring A, a carbon atom farthest from a carbon atom $C_1$ of the ring A, the carbon atom $C_1$ being bonded with a single bond to a carbon atom $C_2$ of a ring B;

when a substituted or unsubstituted monocyclic ring or a substituted or unsubstituted fused ring is formed with not the ring A but the ring B, a group represented by the formula (10B) is bonded to a carbon atom bonded to $R_{12}$;

$R_{12}$ not bonded with a group represented by the formula (10B), and $R_{11}$, $R_{13}$, $R_{14}$ and $R_{15}$ to $R_{18}$ forming neither the substituted or unsubstituted monocyclic ring nor the substituted or unsubstituted fused ring are each independently a hydrogen atom, a substituted or unsubstituted alkyl group having 1 to 50 carbon atoms, a substituted or unsubstituted haloalkyl group having 1 to 50 carbon atoms, a substituted or unsubstituted alkenyl group having 2 to 50 carbon atoms, a substituted or unsubstituted alkynyl group having 2 to 50 carbon atoms, a substituted or unsubstituted cycloalkyl group having 3 to 50 ring carbon atoms, a group represented by $-Si(R_{901})(R_{902})(R_{903})$, a group represented by $-O-(R_{904})$, a group represented by $-S-(R_{905})$, a group represented by $-N(R_{906})(R_{907})$, a substituted or unsubstituted aralkyl group having 7 to 50 carbon atoms, a group represented by $-C(=O)R_{801}$, a group represented by $-COOR_{802}$, a halogen atom, a cyano group, a nitro group, a substituted or unsubstituted aryl group having 6 to 17 ring carbon atoms, or a substituted or unsubstituted heterocyclic group having 5 to 17 ring atoms, in the formula (10B):

$Ar_1$ is a group derived from an unsubstituted benzanthracene ring;

$L_1$ is a single bond, a substituted or unsubstituted arylene group having 6 to 17 ring carbon atoms, or a substituted or unsubstituted divalent heterocyclic group having 5 to 17 ring atoms;

mx is 0;

* represents a bonding position to an atom forming a ring of the formula (1B); and a compound represented by the formula (1B) does not have, in a molecule, three or more groups of a substituted or unsubstituted aryl group having four or more fused rings and a substituted or unsubstituted heterocyclic group having four or more fused rings, in a compound represented by the formula (1B), $R_{901}$, $R_{902}$, $R_{903}$, $R_{904}$, $R_{905}$, $R_{906}$, $R_{907}$, $R_{801}$ and $R_{802}$ are each independently a hydrogen atom, a substituted or unsubstituted alkyl group having 1 to 50 carbon atoms, a substituted or unsubstituted cycloalkyl group having 3 to 50 ring carbon atoms, a substituted or unsubstituted aryl group having 6 to 17 ring carbon atoms, or a substituted or unsubstituted heterocyclic group having 5 to 17 ring atoms, when a plurality of $R_{901}$ are present, the plurality of $R_{901}$ are mutually the same or different;

when a plurality of $R_{902}$ are present, the plurality of $R_{902}$ are mutually the same or different;

when a plurality of $R_{903}$ are present, the plurality of $R_{903}$ are mutually the same or different;

when a plurality of $R_{904}$ are present, the plurality of $R_{904}$ are mutually the same or different;

when a plurality of $R_{906}$ are present, the plurality of $R_{905}$ are mutually the same or different;

when a plurality of $R_{907}$ are present, the plurality of $R_{907}$ are mutually the same or different;

when a plurality of $R_{907}$ are present, the plurality of $R_{907}$ are mutually the same or different;

when a plurality of $R_{801}$ are present, the plurality of $R_{801}$ are mutually the same or different; and when a plurality of $R_{802}$ are present, the plurality of $R_{802}$ are mutually the same or different.

* * * * *